(12) United States Patent
Volin

(10) Patent No.: US 11,293,196 B1
(45) Date of Patent: Apr. 5, 2022

(54) SIX-DEVICE-IN-ONE ROBOT-ASSEMBLED ARTHRITIC-ASSISTING NOISE-CANCELING FRICTION-REDUCING DOG-RUN-ADAPTABLE ANTI-WOBBLING GAZEBO

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 17/480,767

(22) Filed: Sep. 21, 2021

(51) Int. Cl.
| | |
|---|---|
| *E04H 15/02* | (2006.01) |
| *E04H 15/50* | (2006.01) |
| *E04F 10/02* | (2006.01) |
| *G09F 15/00* | (2006.01) |
| *A47B 47/00* | (2006.01) |
| *F16B 25/10* | (2006.01) |
| *A01K 15/02* | (2006.01) |
| *A01K 1/02* | (2006.01) |
| *A01K 1/00* | (2006.01) |
| *A01G 9/16* | (2006.01) |

(52) U.S. Cl.
CPC .............. *E04H 15/02* (2013.01); *A01G 9/16* (2013.01); *A01K 1/0035* (2013.01); *A01K 1/02* (2013.01); *A01K 15/027* (2013.01); *A47B 47/00* (2013.01); *E04F 10/02* (2013.01); *E04H 15/50* (2013.01); *F16B 25/10* (2013.01); *G09F 15/0012* (2013.01)

(58) Field of Classification Search
CPC ......... E04H 15/02; E04H 15/44; E04H 15/32; A01G 9/16; A01K 1/0035; A01K 1/02; A01K 15/027

USPC .................... 119/502, 504, 512–514; 135/95
See application file for complete search history.

(56) References Cited

U.S. PATENT DOCUMENTS

| | | | |
|---|---|---|---|
| 3,085,586 A | 4/1963 | McDonough | |
| 3,199,518 A | 8/1965 | Glidewell | |
| 4,885,891 A | 12/1989 | Lynch | |
| 4,947,884 A | 8/1990 | Lynch | |
| 5,035,253 A | 7/1991 | Bortles | |
| 5,063,876 A * | 11/1991 | Harris .................. | A01K 15/027 |
| | | | 119/513 |
| 5,244,001 A | 9/1993 | Dubunsky | |
| D365,884 S | 1/1996 | Dennis | |
| 5,511,572 A | 4/1996 | Carter | |
| 6,141,934 A | 11/2000 | Zeigler | |
| D445,916 S | 7/2001 | Pritchard | |
| 6,283,136 B1 | 9/2001 | Chen | |
| 6,470,902 B1 | 10/2002 | Carter | |
| 6,502,597 B2 | 1/2003 | Carter | |
| 6,994,099 B2 * | 2/2006 | Goldwitz .............. | E04H 15/322 |
| | | | 135/115 |
| 7,178,542 B2 | 2/2007 | Carter | |
| 7,775,229 B2 | 8/2010 | Sy-Facunda | |
| 7,836,907 B2 | 11/2010 | Carter | |
| 7,836,908 B2 | 11/2010 | Sy-Facunda | |
| 8,215,326 B2 | 7/2012 | Park | |

(Continued)

*Primary Examiner* — Yvonne R Abbott-Lewis

(57) ABSTRACT

A six device-in-one robot-assembled arthritic-assisting noise-canceling friction-reducing dog-run-adaptable anti-wobbling gazebo which includes an adjustable canopy, foldable trusses and posts, and robotically formed connectors which connect the trusses and include a rivet tail fare noise canceling connector system, a robot assembled heat expandable, cold contractible interlocking anti-wobbling spiral saw screw system, a cone shielding intersector system, and post centering, tick preventing water discharging sleeve system.

20 Claims, 220 Drawing Sheets

(56) References Cited

U.S. PATENT DOCUMENTS

| | | |
|---|---|---|
| 8,220,477 B2 | 7/2012 | Park |
| D670,003 S | 10/2012 | Lovley, II |
| 8,418,711 B2 | 4/2013 | Park |
| 8,544,489 B2 | 10/2013 | Choi |
| 8,616,226 B2 | 12/2013 | Ma |
| 8,701,692 B2 | 4/2014 | Holland |
| 8,776,815 B2 | 7/2014 | Park |
| 8,978,680 B2 | 3/2015 | Kayser |
| 9,103,138 B2 | 8/2015 | Lovley, II |
| 9,528,292 B1 | 12/2016 | Lovley, II |
| 9,556,639 B2 | 1/2017 | Hunt |
| D785,201 S | 4/2017 | Hassman |
| 9,995,056 B2 | 6/2018 | Yang |
| 10,344,494 B2 | 7/2019 | Volin |
| 10,609,895 B2 * | 4/2020 | Ishisako ................. A01K 1/035 |
| 11,002,037 B2 | 5/2021 | Carter |
| 11,072,942 B2 | 7/2021 | Dotterweich |
| 2006/0266401 A1 | 11/2006 | Wu |
| 2007/0240748 A1 | 10/2007 | Bae |
| 2011/0308559 A1 | 12/2011 | Ma |
| 2016/0168874 A1 | 6/2016 | Lovley, II |

* cited by examiner

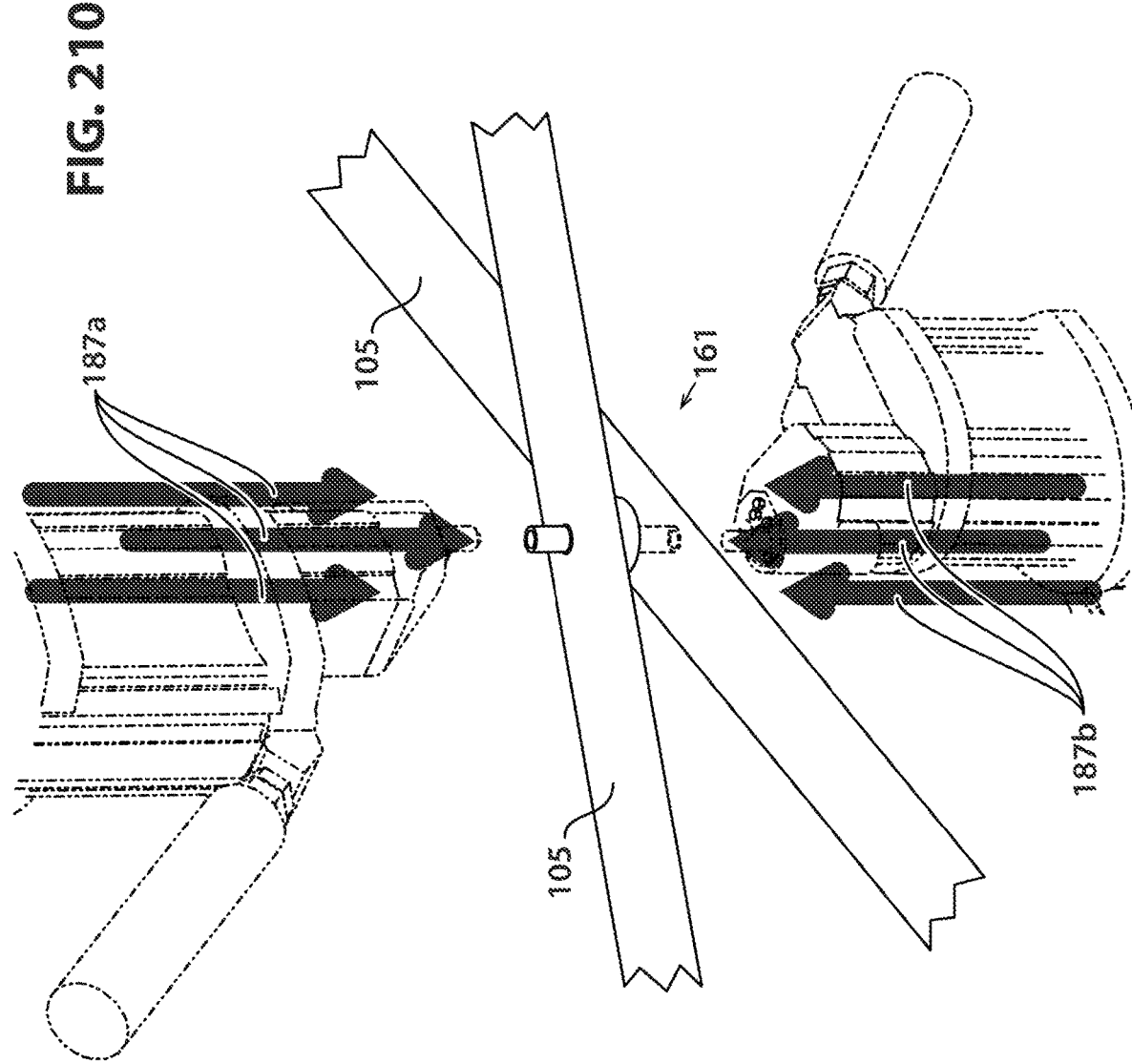

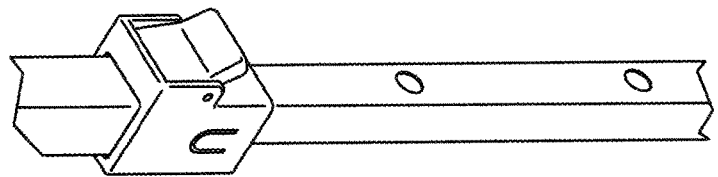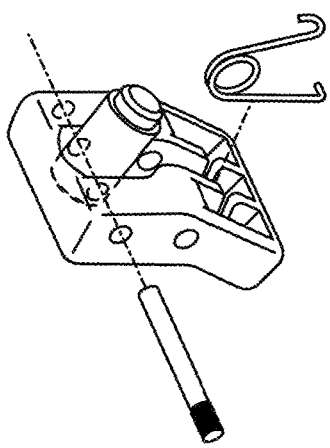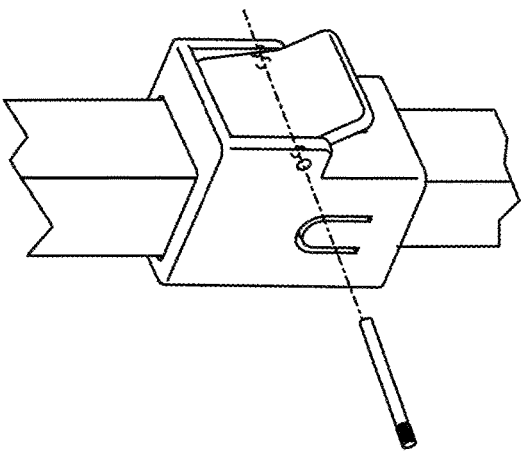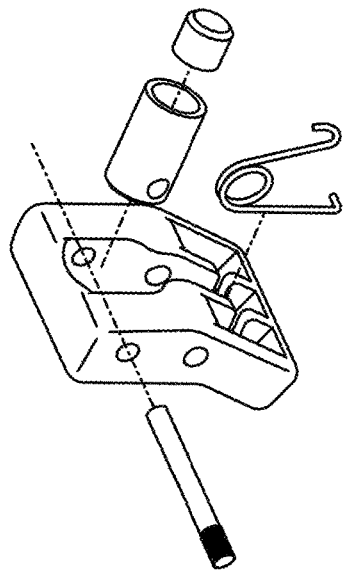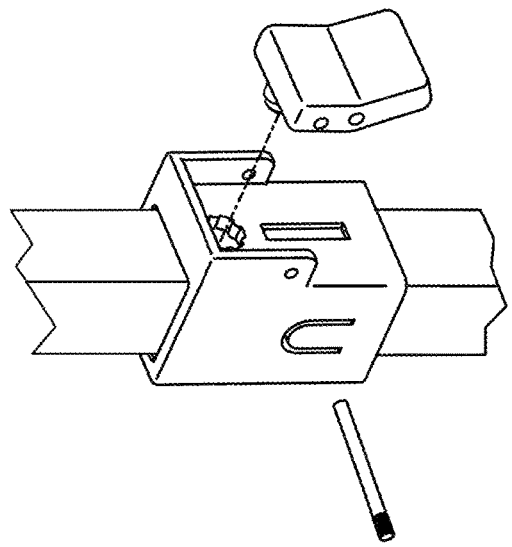

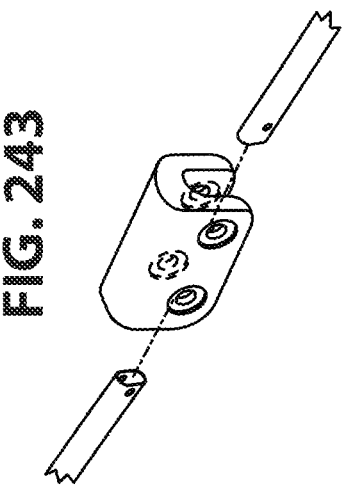
FIG. 241
FIG. 242
FIG. 243
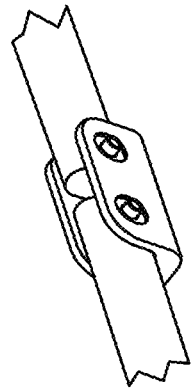
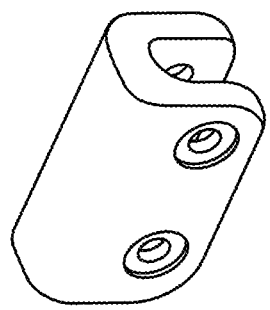
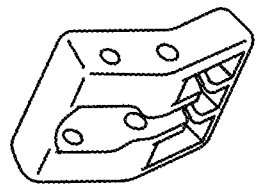
FIG. 245
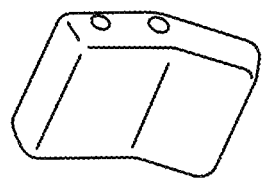
FIG. 246
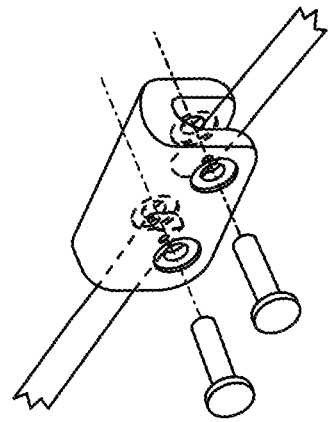
FIG. 244

SIX-DEVICE-IN-ONE ROBOT-ASSEMBLED ARTHRITIC-ASSISTING NOISE-CANCELING FRICTION-REDUCING DOG-RUN-ADAPTABLE ANTI-WOBBLING GAZEBO

FIELD OF THE INVENTION

The present invention relates to a collapsible popup, which is cheap to produce, is easy to ship as one unit, requires no assembly, and can be quickly and easily be unfolded. Particularly, the present invention relates to a six-device-in-one robot-assembled arthritic-assisting noise-canceling friction-reducing dog-run-adaptable anti-wobbling gazebo, which comprises:

1) Robot-assembled arthritic-assisting noise-canceling friction-reducing dog-run-adaptable anti-wobbling gazebo system,
2) Robot-assembled automatically-making-rivet-tail-flare noise-canceling injury-preventing top-connector system,
3) Robot-assembled heat-expandable cold-contractable interlocking anti-wobbling spiral-saw screw system,
4) Robot-assembled injury-preventing cone-shielding central intersector system,
5) Robot-assembled injury-preventing cone-shielding upper intersector system,
6) Robot-assembled arthritic-assisting injury-preventing cone-shielding lower intersector system,
7) Robot-assembled arthritic-assisting injury-preventing post-centering tick-preventing water-discharging sleeve system,
8) Robot-assembled noise-canceling injury-preventing rust-preventing truss-centering cover-cushion system,
9) Robot-assembled arthritic-assisting noise-canceling injury-preventing rust-preventing truss-centering cup-cushion system,
10) Robot-assembled arthritic-assisting noise-canceling circular-cushion system, and
11) Robot-assembled injury-preventing rust-preventing caterpillar-cover system.

DESCRIPTION OF THE PRIOR ART

A number of collapsible popups have been introduced.

U.S. Pat. No. 3,085,586, issued 1963 Apr. 16, to Elon D. McDonough, refers to a portable structure of the type employing a foldable frame and a flexible covering for the frame. An object of this invention is to provide a foldable structure which is adapted to form an enclosure for large areas, which structure is of economical and light weight construction and which can be readily collapsed and disassembled for compact storage and transportation.

U.S. Pat. No. 3,199,518, issued 1965 Aug. 10, to Herman A. Glidewell, describes a collapsible and foldable frame which may be employed as a shelter when suitable covering material is placed thereover. The device is primarily intended as a collapsible frame over which camouflage material can be placed to provide a hunting blind, but could, of course, be employed as a frame over which any desired covering material (such as tarpaulin) could be placed to provide protection against the weather.

U.S. Pat. No. 4,885,891, issued 1989 Dec. 12, to James P. Lynch, relates to an extendible scissors truss such as may be utilized in a collapsible canopy structure wherein the extendible scissors truss has members pivotally connected to form truss cells. The reinforcement member has first and second end portions joined by a linking portion to form a Z-like configuration.

U.S. Pat. No. 4,947,884, issued 1990 Aug. 14, to James P. Lynch, relates to a canopy shelter which has a plurality of corner support forming legs that may be positioned on a support surface. Scissor assemblies interconnect adjacent ones of the corner supports and are each pivotally connected at one portion to the top ends of the respective corner supports and are each pivotally connected at another portion to slide brackets slideably mounted on each of the respective corner supports. Roof support members are pivotally connected to a respective slide bracket on a corner support. Thus, the framework may be collapsed in a stored state yet expanded to an expanded state by spreading the corner members apart from one another.

U.S. Pat. No. 5,035,253, issued 1991 Jul. 30, to Allan D. Bortles, demonstrates a rain runoff awning for collecting runoff from a tent canopy. Fabric is stretched between and secured to outwardly extending arms which are attached to the canopy frame. The fabric forms a gutter or trough along an edge of the canopy for receiving runoff from the canopy and directing the runoff away from entrance and exit areas of the canopy.

U.S. Pat. No. 5,244,001, issued 1993 Sep. 14, to James P. Lynch, describes an expandable framework structure which can be folded for storage and expanded for use, especially as a canopy when a covering is placed on top of the framework. The framework includes a plurality of upright supports and a plurality of edge scissor assemblies that interconnect adjacent ones of the upright supports.

U.S. Pat. No. 5,511,572, issued 1996 Apr. 30, to Mark C. Carter, describes a collapsible shelter which includes a truss and canopy framework that permits a flexible, collapsible canopy to be moved between a raised position and a lowered position. The collapsible shelter includes at least three legs supporting flexible poles removably mounted to the tops of the legs and forming the framework of the canopy. X-shaped truss pairs of link members are connected to each of the legs on each side of the shelter between adjacent legs.

U.S. Pat. No. 6,141,934, issued 2000 Nov. 7, to Theodore R. Zeigler, depicts a folding frame system which includes a roof assembly including at least three pivotably attached strut pairs, adjacent pairs of the at least three pivotably attached strut pairs defining at least three corners of the roof assembly. The roof assembly is movable between a roof assembly closed position in which struts of the at least three strut pairs are disposed parallel to each other and a roof assembly open position in which struts of the at least three strut pairs are locked in non-parallel positions and ends of the struts of each strut pair of the at least three strut pairs define a rectangle.

U.S. Pat. No. 6,283,136, issued 2001 Sep. 4, to Fengchun Chen, refers to a collapsible tent which comprises top connecting means at the top of the tent; a plurality of upright legs; a slider slideably received on each upright leg; upper roof support bars pivotally connected to the top connecting means; lower roof support bars which each are connected at one end to its respective upper roof support bar and at the other end to a top of its respective upright leg.

U.S. Pat. No. 6,470,902, issued 2002 Oct. 29, to Mark C. Carter, discloses a quickly erectable canopy shelters include a plurality of legs connected together by an extendible perimeter assembly of link members. The roof structure is formed by a pole members pivotally mounted to the upper ends of the legs so as to extend across the shelter, and movable between a lowered position and a raised, upwardly arching position. The pole members are pivotally coupled to a central hub, and each of the pole members is formed of pole sections hinged to permit downward folding and upward unfolding until they are fully extended.

U.S. Pat. No. 6,502,597, issued 2003 Jan. 7, to Mark C. Carter, describes a lightweight erectable canopy shelters include a plurality of legs connected together by an extendible perimeter assembly of link members. In one embodiment, the roof structure is formed by a pole members pivotally mounted to the upper ends of the legs so as to extend across the shelter, and movable between a lowered position and a raised, upwardly arching position. The pole members are pivotally coupled to a central hub, and each of the pole members comprises pole sections hinged to permit downward folding and upward unfolding until they are fully extended.

U.S. Pat. No. 7,178,542, issued 2007 Feb. 20, to Mark C. Carter, demonstrates a lightweight erectable canopy shelters which include a plurality of legs connected together by an extendible perimeter assembly of link members. In one embodiment, the roof structure is formed by a pole members pivotally mounted to the upper ends of the legs so as to extend across the shelter, and movable between a lowered position and a raised, upwardly arching position.

U.S. Pat. No. 7,775,229, issued 2010 Aug. 17, to Ron Sy-Facunda, relates to technology of the present application which provides a collapsible canopy shelter having one or more side awnings that are pivotally coupled to the canopy frame. The canopy shelter for this has reinforced eaves for additional structural integrity, as well as at least one collapsible ventilation flap in the canopy cover that is capable of moving between a closed position and an open position to ventilate air from beneath the canopy cover as desired. Further, the collapsible canopy shelter comprises a canopy frame with a robust, spring-loaded pull latch, allowing the user to quickly and easily assemble and, collapse the shelter without risking injury.

U.S. Pat. No. 7,836,907, issued 2010 Nov. 23, to Mark C. Carter, refers to a quickly erectable dome shelter which includes an extendible perimeter truss assembly with link members connected between adjacent legs, a central truss assembly of link members, and a roof framework, including pairs of curved upper and lower peak truss members, that is movable between a lowered, collapsed configuration and a raised, upwardly arching position.

U.S. Pat. No. 7,836,908, issued 2010 Nov. 23, to Ron Sy-Facunda, relates to technology of the present application which provides a canopy with an automatic roof structure having improved structural stability. The canopy comprises a plurality of vertical support posts connected by trusses. A plurality of roof support rods extend from the vertical support posts to a central hub. At least one of the roof support rods has a cantilever support extending from the associated slide or thereabouts to a pivot on the roof support rod. The canopy also comprises central truss supports and stubs extending from the connection of the lateral trusses to the central hub. The canopy has an expanded, open configuration and a collapsed, closed configuration.

U.S. Pat. No. 8,215,326, issued 2012 Jul. 10, to Bumjun Park, outlines a collapsible shelter assembly which includes plurality of legs with each of the legs having an upper, a lower end and an axis. A truss system links each pair of legs together and defines a perimeter. Rods are adapted for supporting a cover and brackets are adapted for attaching the rods to the legs. Each of the brackets has a base adapted for attachment to the upper end one of the legs and a coupler mounted to the base for attaching one of the rods. Each bracket is configured so that at least one of the base and the coupler is rotatable relative to the leg axis.

U.S. Pat. No. 8,220,477, issued 2012 Jul. 17, to Lindy Park, refers to a collapsible canopy frame having an improved roof and support structure. A collapsible canopy frame according to one embodiment includes a plurality of side poles; a plurality of edge scissor assemblies coupling adjacent side poles of the plurality of side poles to one another; a center pole for supporting a covering; a plurality of center pole ribs each coupling the center pole to a respective side pole of the plurality of side poles; and a plurality of center scissor assemblies coupling the plurality of edge scissor assemblies to the center pole.

U.S. Pat. No. 8,418,711, issued 2013 Apr. 16, to Bumjun Park, demonstrates a collapsible canopy support which includes beams for supporting a canopy with each beam having a plurality of elongated beam segments coupled together to form the beam. A segment coupler provides for pivotally coupling a first beam segment to a second beam segment. A segment locking assembly is adapted for selectively securing the first beam segment relative to the second beam segment.

U.S. Pat. No. 8,544,489, issued 2013 Oct. 1, to Kwan Jun Choi, refers to a collapsible tent structure which includes a plurality of poles coupled with a plurality of linkages. The tent structure also includes a plurality of rods where each rod is pivotally coupled to each pole on one end and pivotally coupled to a hub on an opposite end. A plurality of struts are further included in the tent structure and each strut is pivotally coupled to each rod on one end and pivotally coupled to each pole on an opposite end, and a locking mechanism is coupled to each of the rods.

U.S. Pat. No. 8,616,226, issued 2013 Dec. 31, to Oliver Ma, refers to a shelter that includes a slider and a strut mechanism mounted on support posts of the shelter that automatically actuate and extend from the side of the support posts when the shelter is expanded from its collapsed state. The strut mechanism provides support for an eave that extends outside from all or a portion of the perimeter of the shelter defined by the corners of the support posts. An automatic hard-stop mechanism is incorporated into the support posts that prevent the eave sliders and strut mechanisms from becoming over-extended.

U.S. Pat. No. 8,701,692, issued 2014 Apr. 22, to Allen Holland, demonstrates a collapsible shelter which includes an improved attachment of the roof poles to the legs. A shelter frame has a leg at each corner. Each leg may have an angled top edge or surface. A scissor assembly attaches adjacent legs to each other. An offset link pivotally attaches the roof poles to the legs, adjacent to the top of each leg. The roof poles can be rigidly attached to the offset link. Extension poles are attached to the roof poles with a bungee or similar elastic element.

U.S. Pat. No. 8,776,815, issued 2014 Jul. 15, to Bumjun Park, relates to a collapsible shelter assembly which includes legs, a truss system, a cover, cover supporting rods and mounting brackets. Each of the legs has an upper and a lower end. The truss system is configured to link each pair of legs together and define a base perimeter.

U.S. Pat. No. 8,978,680, issued 2015 Mar. 17, to Matt Kayser, demonstrates an erectable canopy framework comprising a base frame and a roof frame. The roof frame is operative to support a canopy above the base frame and is removably mountable to the base frame. The base frame includes a plurality of upright support members, a plurality of cross members, each interconnecting adjacent upright support members, and a plurality of mounts disposed on the upright support members.

U.S. Pat. No. 9,103,138, issued 2015 Aug. 11, to Jack B. Lovley, II, demonstrates a collapsible canopy structure includes one or more eaves, one or more fixed eave mounts, one or more sliding eave mounts and one or more vertical poles. Each of the vertical poles has a top end and a bottom end. Each of the vertical poles is connected by at least one of the one or more eaves.

U.S. Pat. No. 9,528,292, issued 2016 Dec. 27, to Jack B. Lovley, II, refers to a canopy which includes a frame assembly having a perimeter frame portion, a central frame portion and multiple legs. The frame assembly also includes one or more overhang frame portions, each of which can include a main overhang frame member and a strut. Each overhang frame portion can extend diagonally from the associated corner of the frame assembly.

U.S. Pat. No. 9,556,639, issued 2017 Jan. 31, to David Lewis Hunt, refers to a portable shelter framing system which is disclosed herein. The portable shelter framing system includes a plurality of corner support members; a plurality of crossbeam members, each of the crossbeam members configured to be connected between a pair of the plurality of corner support members without the use of tools.

U.S. Pat. No. 9,995,056, issued 2018 Jun. 12, to Shanghai Yang, refers to a collapsible canopy frame which includes a plurality of side and central supports and a plurality of telescopic legs. A single activation feature provides for the extension and retraction, and the locking and unlocking of the canopy frame. A fixed bracket and a sliding bracket located at the upper end of each telescopic leg provide the connection of the telescopic legs to the side and central supports and to each other. The single activation feature includes an upper and a lower hub and when they joined together facilitate the extension and locking of canopy frame; as the lower hub is disengaged from the upper hub, the gazebo frame becomes unlocked and capable of being retracted. Each telescopic leg includes a plurality of telescopic sections that extend and retract through a cable system or a tape-driven system connected to the sliding bracket and which links the telescopic sections to each other.

U.S. Pat. No. 10,344,494, issued 2019 Jul. 9, to Dee Volin, refers to an 11-device-in-one system (which can be used as 360-degree-rotatable rollable portable lockable collapsible expandable carport, green house, gazebo, storage, attic, awnings, tent, workshop, outdoor tables, booth, and RV port) comprises: round bars; square bars releasably attached to the round bars; 360-degree rotatable lockable wheels rotatably attached to the round bars; canvas roof panels; canvas side panels; canvas end panels; canvas gap-covering panels; panel-lifting VELCRO (hook and loop fasteners) sewn to the side and gap-covering panels; panel-sealing zippers sewn to the end panels (for forming doors); panel-sealing grommets attached to the roof, side, and end panels; bungee cords and balls inserted through the grommets (for attaching the roof, side, and end panels together); first telescopic arms foldably and releasably attached to the round bars;

second telescopic arms foldably attached to the first telescopic arms; feet welded to the second telescopic arms (for attaching to each other over the roof panels to form the frames for booth signs); and toes welded to the round bars (for releasably locking the feet thereon to form the frames for awnings and tables).

U.S. Pat. No. 11,002,037, issued 2021 May 11, to Mark C. Carter, refers to a portable room which includes multiples sides and a roof attached to the multiple sides. The protavel room also includes a flexible strap attached to the roof. The flexible strap includes a fastener to attach to a peak structure of a portable shelter.

U.S. Pat. No. 11,072,942, issued 2021 Jul. 27, to Martin Dotterweich, refers to a novel canopy frame hub, or bracket, that features insert openings on all four sides as well as leg adjustments. The frame hub encompasses a leg of a traditional canopy frame and may be adjusted vertically to a desired height by sliding the bracket along the frame leg. The hub may then be fixated at the desired height via the twisting of the fixed screw inserted through an opening in one side of the hub.

U.S. Pat. No. D365,884, issued 1996 Jan. 2, to Ronald N. Dennis, depicts an ornamental design for a cloth-covered canopy.

U.S. Pat. No. D445,916, issued 2001 Jul. 31, to Nicholas Mark Reginald Pritchard, depicts an ornamental design for a portable shelter structure.

U.S. Pat. No. D670,003, issued 2012 Oct. 30, to Jack B Lovley, II, depicts an ornamental design for a canopy.

U.S. Pat. No. D785,201, issued 2017 Apr. 25, to Ellen Hassman, depicts an ornamental design for a gazebo canopy.

U.S. Publication No. 20060266401, published 2006 Nov. 30, by Weidan Wu, relates to a tarpaulin shelter with collapsible doorframes, including doorframes, the lower end of which is connected to the base and the upper end is connected with corner joint and cross beam, characterized in that the doorframe includes at least three upright poles, in which at least a set of x-scissor member are arranged between the middle upright pole and each side upright pole, said scissor is composed of two cross rods of which the middle portions are mutually hinged together.

U.S. Publication No. 20070240748, published 2007 Oct. 18, by Sang-Jin Bae, reveals a canopy includes a plurality of height-adjustable support frames including upper and lower frames; a bottom fixture inserted/fixed in each lower frame; a fixed two-point connection member fixed to each upper frame; a height-adjustable movable two-point connection member installed to each upper frame; three-point connection members positioned between the upper frames respectively; upper and lower four-point connection members positioned in the middle of the support frames respectively and having a vertically-installed anti-drooping frame; and pivoting frames whose both ends are connected to each connection member and whose center portion is hinged pivotally.

U.S. Publication No. 20110308559, published 2011 Dec. 22, by Oliver Ma, relates to a shelter that includes a slider and a strut mechanism mounted on support posts of the shelter that automatically actuate and extend from the side of the support posts when the shelter is expanded from its collapsed state. The strut mechanism provides support for an eave that extends outside from all or a portion of the perimeter of the shelter defined by the corners of the support posts.

U.S. Publication No. 20160168874, published 2016 Jun. 16, by Jack B. Lovley, II, reveals a collapsible canopy has a collapsible frame and a canopy cover supported by the collapsible frame. In some configurations, the frame includes telescopic legs having three or more stages. An automatic lock release is carried by one of the legs and automatically releases a lock between two other of the legs. A relative inner leg can include a cap having a resilient portion that contacts an inner surface of a relative outer leg to increase a lateral rigidity of the leg assembly. At least one of the eave cross members can have an end portion having an abutting extension that contacts an adjacent cross member to limit lateral deflection of the eave. The abutting extension can be positioned between eave cross members that incorporate a bracket for supporting a center support that extends from the eave toward a center or interior of the canopy.

Disadvantages of the Prior Art

The prior art have failed to solve many problems associated with collapsible popup, as follows:
1) No prior art mention or disclose any collapsible popup, having
   adjustable canopy 102.
   Therefore, the prior art of collapsible popup:
   a) Is not capable of protecting occupants and property users from weather elements;
   b) Is not capable of functioning as a greenhouse (see FIG. 3, FIG. 4, FIG. 138, and FIG. 139);
   c) Is not capable of functioning as a cover for a dog-run in the direction of arrow 169
      (see FIG. 5, FIG. 6, FIG. 140, and FIG. 141);
   d) Is not capable of functioning as a surface for an advertisement sign
      (see FIG. 7, FIG. 8, FIG. 129, and FIG. 130);
   e) Is not capable of functioning as an awning cover
      (see FIG. 9, FIG. 10, FIG. 131, and FIG. 132); and
   f) Is not capable of functioning as ceiling-mounted overhead storage
      (see FIG. 11, FIG. 12, FIG. 133, and FIG. 134).
2) No prior art mention or disclose any collapsible popup, having
   dog-run-adaptable anti-wobbling foldable lower posts 107.
   Therefore, the prior art of collapsible popup:
   a) Is not capable of foldably and slidably raising and lowering to increase and decrease the height of the six-device-in-one robot-assembled arthritic-assisting noise-canceling friction-reducing dog-run-adaptable anti-wobbling gazebo; and
   b) Is not capable of supporting sidewalls of dog-run.
3) No prior art mention or disclose any collapsible popup, having
   top robot-assembled automatically-flaring-and-shielding-rivet-tail injury-preventing hammer-shields 114.
   Therefore, the prior art of collapsible popup:
   a) Is not capable of providing a limiting surface for robot-assembled heat-expandable cold-contractable anti-wobbling screws 117 to stop in the directions of arrows 171a, 171f, 171g, 171h, 171i, and 171j (see FIG. 145, FIG. 149, FIG. 150, and FIG. 153); and
   b) Is not capable of preventing injury by covering the robot-assembled heat-expandable cold-contractable interlocking cones 120.
4) No prior art mention or disclose any collapsible popup, having
   robot-assembled heat-expandable cold-contractable anti-wobbling screws 117.
   Therefore, the prior art of collapsible popup:
   a) Is not capable of saving manufacturing time by eliminating the need for nuts and bolts
      (see FIG. 146 (Prior Art), FIG. 155 (Prior Art), FIG. 162 (Prior Art), and FIG. 169 (Prior Art));
   b) Is not capable of saving manufacturing man-hours by robotically manufacturing
      in the directions of arrows 172a, 172b, 172c, and 172d
      (see FIG. 154, FIG. 158, FIG. 168, and FIG. 177);
   c) Is not capable of saving end-consumer assembly time by robotically pre-installing robot-assembled heat-expandable cold-contractable anti-wobbling screws 117, at the factory
      in the directions of arrows 172a, 172b, 172c, and 172d
      (see FIG. 154, FIG. 158, FIG. 168, and FIG. 177); and
   d) Is not capable of increasing overall production output of the six-device-in-one robot-assembled arthritic-assisting noise-canceling friction-reducing dog-run-adaptable anti-wobbling gazebo by robotically decreasing per-unit production time.
5) No prior art mention or disclose any collapsible popup, having
   robot-assembled heat-expandable cold-contractable spirally-threading spiral saws 118.
   Therefore, the prior art of collapsible popup:
   Is not capable of robotically and heatingly expanding and tapping threads into top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
      in the directions of arrows 171a, 173a, and 173b
      (see FIG. 144).
6) No prior art mention or disclose any collapsible popup, having
   robot-assembled heat-expandable cold-contractable spiral-teeth 119.
   Therefore, the prior art of collapsible popup:
   Is not capable of robotically and speedily cutting through plastic connector material
      to decrease production time, and
      to increase production output
      in the directions of arrows 171a, 173a, and 173b
      (see FIG. 144).
7) No prior art mention or disclose any collapsible popup, having
   robot-assembled heat-expandable cold-contractable interlocking cones 120.
   Therefore, the prior art of collapsible popup:
   a) Is not capable of robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132 in the directions of arrows 171a, 173a, and 173b
      (see FIG. 144);
   b) Is not capable of expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133 in the directions of arrows 171a, 173c, 173d, and 173e
      (see FIG. 145); and c) Is not capable of eliminating the need for the usage of nuts and bolts
to robotically lessen the assembly time, and
to robotically lessen assembly cost
(see FIG. 146 (Prior Art), FIG. 155 (Prior Art), FIG. 162 (Prior Art), and FIG. 169 (Prior Art)).
8) No prior art mention or disclose any collapsible popup, having
robot-assembled heat-expandable cold-contractable interlocking spiral locks 121.
Therefore, the prior art of collapsible popup:
a) Is not capable of robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132 in the directions of arrows 171*a*, 173*a*, and 173*b*
(see FIG. 144); and
b) Is not capable of expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
in the directions of arrows 171*a*, 173*c*, 173*d*, and 173*e*
(see FIG. 145).
9) No prior art mention or disclose any collapsible popup, having
central robot-assembled automatically-flaring-and-shielding-cone-head injury-preventing hammer-shields 125.
Therefore, the prior art of collapsible popup:
a) Is not capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place
in the directions of arrows 174*a*, 174*f*, 174*g*, 174*h*, 174*i*, and 174*j*
(see FIG. 156, FIG. 157, FIG. 159, FIG. 160, and FIG. 161); and
b) Is not capable of preventing injury by coving the robot-assembled heat-expandable cold-contractable interlocking cones 120.
10) No prior art mention or disclose any collapsible popup, having
upper robot-assembled automatically-flaring-and-shielding-cone-head injury-preventing hammer-shields 129.
Therefore, the prior art of collapsible popup:
a) Is not capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place; and
b) Is not capable of preventing injury by coving the robot-assembled heat-expandable cold-contractable interlocking cones 120 in the directions of arrows 175*a*, 175*f*, 175*g*, 175*h*, 175*i*, and 175*j*
(see FIG. 163, FIG. 164, FIG. 165, FIG. 166, and FIG. 167).
11) No prior art mention or disclose any collapsible popup, having
lower robot-assembled cone-shielding injury-preventing hammer-shields 133.
Therefore, the prior art of collapsible popup:
a) Is not capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place, and
b) Is not capable of preventing injury by coving the robot-assembled heat-expandable cold-contractable interlocking cones 120
in the directions of arrows 176*a*, 176*f*, 176*g*, 176*h*, 176*i*, and 176*j*
(see FIG. 170, FIG. 171, FIG. 172, FIG. 173, FIG. 174, FIG. 175, and FIG. 176).
12) No prior art mention or disclose any collapsible popup, having
lower robot-assembled arthritic-assisting height-adjusting dog-run-panel-rope hooks 134.
Therefore, the prior art of collapsible popup:
a) Is not capable of allowing an arthritic to deploy and retract the six-device-in-one robot-assembled arthritic-assisting noise-canceling friction-reducing dog-run-adaptable anti-wobbling gazebo without the need to close the hand
in the directions of arrows 177*a*, 177*b*, 177*c*, 177*d*, 177*e*, and 177*f*
(see FIG. 178, FIG. 179, and FIG. 180); and
b) Is not capable of attaching a rope or strap to support a dog run
in the direction of arrow 178
(see FIG. 181).
13) No prior art mention or disclose any collapsible popup, having
sleeve robot-assembled post-centering clamps 143.
Therefore, the prior art of collapsible popup:
Is not capable of centering dog-run-adaptable anti-wobbling foldable lower posts 107 within dog-run-adaptable anti-wobbling foldable upper posts 106.
14) No prior art mention or disclose any collapsible popup, having
sleeve robot-assembled tick-preventing downward teeth 144.
Therefore, the prior art of collapsible popup:
Is not capable of preventing ticks from getting inside dog-run-adaptable anti-wobbling foldable upper posts 106.
15) No prior art mention or disclose any collapsible popup, having
sleeve robot-assembled water-discharging grooves 145.
Therefore, the prior art of collapsible popup:
Is not capable of allowing water to discharge out of dog-run-adaptable anti-wobbling foldable upper posts 106
in the directions of arrows 181*a* and 181*b*
(see FIG. 188).
16) No prior art mention or disclose any collapsible popup, having sleeve robot-assembled arthritic-assisting height-adjusting dog-run-panel-rope hooks 146.

Therefore, the prior art of collapsible popup:
   a) Is not capable of allowing an arthritic to deploy and retract the six-device-in-one robot-assembled arthritic-assisting noise-canceling friction-reducing dog-run-adaptable anti-wobbling gazebo without bending the fingers
      (see FIG. 191); and
   b) Is not capable of attaching a rope or strap to support a dog run in the direction of arrow 182
      (see FIG. 193).

17) No prior art mention or disclose any collapsible popup, having
   robot-assembled rust-preventing truss-end covers 154.
   Therefore, the prior art of collapsible popup:
      a) Is not capable of eliminating the need for nuts and bolts
         to save manufacturing cost,
         to save manufacturing time,
         to save end-user assembly time, and
         to increase overall production output;
      b) Is not capable of eliminating the need for washers
         to save manufacturing cost,
         to save manufacturing time,
         to save end-user assembly time, and
         to increase overall production output;
      c) Is not capable of eliminating the need for 50 truss-end-plugs, from prior art
         to save manufacturing cost,
         to save manufacturing time,
         to save end-user assembly time, and
         to increase overall production output;
      d) Is not capable of preventing water and insects from entering into dog-run-adaptable anti-wobbling foldable corner trusses 104; and
      e) Is not capable of preventing injury by covering sharp metal edges.

18) No prior art mention or disclose any collapsible popup, having
   robot-assembled heat-expandable cold-contractable double-tail cover-cushion rivets 157.
   Therefore, the prior art of collapsible popup:
      a) Is not capable of decreasing assembly man hours by being robotically factory-installed;
      b) Is not capable of decreasing end-user assembly time by being robotically factory-installed;
      c) Is not capable of eliminating need for washers;
      c) Is not capable of creating a locking ridge when robotically heat-stamped eliminating need for nuts and bolts
         in the directions of arrows 185a, 185b, 185c, and 185d
         (see FIG. 197, FIG. 198, and FIG. 199); and
      d) Is not capable of creating a locking ridge when robotically heat-stamped securely and pivotably locking two dog-run-adaptable anti-wobbling foldable side trusses 105 together
         in the directions of arrows 185a, 185b, 185c, and 185d
         (see FIG. 197, FIG. 198, and FIG. 199).

19) No prior art mention or disclose any collapsible popup, having
   robot-assembled noise-canceling cup-cushion 159.
   Therefore, the prior art of collapsible popup:
      a) Is not capable of eliminating the need for nuts and bolts
         to save manufacturing cost,
         to save manufacturing time,
         to save end-user assembly time, and
         to increase overall production output
         in the directions of arrows 186a, 186b, and 186c
         (see FIG. 203, FIG. 204, FIG. 205, and FIG. 206);
      b) Is not capable of eliminating the need for washers
         to save manufacturing cost,
         to save manufacturing time,
         to save end-user assembly time, and
         to increase overall production output
         in the directions of arrows 186a, 186b, and 186c
         (see FIG. 203, FIG. 204, FIG. 205, and FIG. 206);
      c) Is not capable of eliminating the need for 50 truss-end-plugs, from prior art
         to save manufacturing cost,
         to save manufacturing time,
         to save end-user assembly time, and
         to increase overall production output
         in the directions of arrows 186a, 186b, and 186c
         (see FIG. 203, FIG. 204, FIG. 205, and FIG. 206);
      d) Is not capable of preventing water and insects from entering into dog-run-adaptable anti-wobbling foldable corner trusses 104; and
      e) Is not capable of preventing injury by covering sharp metal edges.

20) No prior art mention or disclose any collapsible popup, having
   robot-assembled noise-canceling circular-cushion 162.
   Therefore, the prior art of collapsible popup:
      a) Is not capable of providing a washer between two dog-run-adaptable anti-wobbling foldable side trusses 105;
      b) Is not capable of pivotably connecting two dog-run-adaptable anti-wobbling foldable side trusses 105 together;
      c) Is not capable of eliminating the need for nuts and bolts
         to save manufacturing cost,
         to save manufacturing time,
         to save end-user assembly time, and
         to increase overall production output
         in the directions of arrows 187a, 187b, 187c, 187d, 187e, and 186f
         (see FIG. 207, FIG. 208, FIG. 209, and FIG. 210); and
      d) Is not capable of eliminating the need for washers
         to save manufacturing cost,
         to save manufacturing time,
         to save end-user assembly time, and
         to increase overall production output
         in the directions of arrows 187a, 187b, 187c, 187d, 187e, and 186f
         (see FIG. 207, FIG. 208, FIG. 209, and FIG. 210).

21) No prior art mention or disclose any collapsible popup, having
   robot-assembled double-tail built-in circular-cushion rivets 163.
   Therefore, the prior art of collapsible popup:
      a) Is not capable of pivotably connecting two dog-run-adaptable anti-wobbling foldable side trusses 105 together;
      b) Is not capable of being robotically installed to lessen the assembly man hours
         in the directions of arrows 187a, 187b, 187c, 187d, 187e, and 186f
         (see FIG. 207, FIG. 208, FIG. 209, and FIG. 210);

c) Is not capable of being robotically installed to lessen end-user assembly time
in the directions of arrows 187a, 187b, 187c, 187d, 187e, and 186f
(see FIG. 207, FIG. 208, FIG. 209, and FIG. 210); and
d) Is not capable of being robotically heat-stamped automatically creating a locking ridge eliminating the need for nuts
in the directions of arrows 187a, 187b, 187c, 187d, 187e, and 186f
(see FIG. 207, FIG. 208, FIG. 209, and FIG. 210).

Objects and Advantages of the Invention

The present invention substantially departs from the conventional concepts and designs of the prior art. In doing so, the present invention provides the six-device-in-one robot-assembled arthritic-assisting noise-canceling friction-reducing dog-run-adaptable anti-wobbling gazebo, having many unique and significant features, functions, and advantages, which overcome all the disadvantages of the prior art, as follows:

1) It is an object of the new invention to provide a six-device-in-one robot-assembled arthritic-assisting noise-canceling friction-reducing dog-run-adaptable anti-wobbling gazebo, having adjustable canopy 102.
   Therefore, the six-device-in-one robot-assembled arthritic-assisting noise-canceling friction-reducing dog-run-adaptable anti-wobbling gazebo:
   a) Is capable of protecting occupants and property users from weather elements;
   b) Is capable of functioning as a greenhouse
      (see FIG. 3, FIG. 4, FIG. 138, and FIG. 139);
   c) Is capable of functioning as a cover for a dog-run in the direction of arrow 169
      (see FIG. 5, FIG. 6, FIG. 140, and FIG. 141);
   d) Is capable of functioning as a surface for an advertisement sign
      (see FIG. 7, FIG. 8, FIG. 129, and FIG. 130);
   e) Is capable of functioning as an awning cover
      (see FIG. 9, FIG. 10, FIG. 131, and FIG. 132); and
   f) Is capable of functioning as ceiling-mounted overhead storage
      (see FIG. 11, FIG. 12, FIG. 133, and FIG. 134).
2) It is another object of the new invention to provide a six-device-in-one robot-assembled arthritic-assisting noise-canceling friction-reducing dog-run-adaptable anti-wobbling gazebo, having
   dog-run-adaptable anti-wobbling foldable lower posts 107.
   Therefore, the six-device-in-one robot-assembled arthritic-assisting noise-canceling friction-reducing dog-run-adaptable anti-wobbling gazebo:
   a) Is capable of foldably and slidably raising and lowering
      to increase and decrease the height of the six-device-in-one robot-assembled arthritic-assisting noise-canceling friction-reducing dog-run-adaptable anti-wobbling gazebo; and
   b) Is capable of supporting sidewalls of dog-run.
3) It is another object of the new invention to provide a six-device-in-one robot-assembled arthritic-assisting noise-canceling friction-reducing dog-run-adaptable anti-wobbling gazebo, having
   top robot-assembled automatically-flaring-and-shielding-rivet-tail injury-preventing hammer-shields 114.
   Therefore, the six-device-in-one robot-assembled arthritic-assisting noise-canceling friction-reducing dog-run-adaptable anti-wobbling gazebo:
   a) Is capable of providing a limiting surface for robot-assembled heat-expandable cold-contractable anti-wobbling screws 117 to stop
      in the directions of arrows 171a, 171f, 171g, 171h, 171i, and 171j
      (see FIG. 145, FIG. 149, FIG. 150, and FIG. 153); and
   b) Is capable of preventing injury by covering the robot-assembled heat-expandable cold-contractable interlocking cones 120.
4) It is a further object of the new invention to provide a six-device-in-one robot-assembled arthritic-assisting noise-canceling friction-reducing dog-run-adaptable anti-wobbling gazebo, having
   robot-assembled heat-expandable cold-contractable anti-wobbling screws 117.
   Therefore, the six-device-in-one robot-assembled arthritic-assisting noise-canceling friction-reducing dog-run-adaptable anti-wobbling gazebo:
   a) Is capable of saving manufacturing time by eliminating the need for nuts and bolts
      (see FIG. 146 (Prior Art), FIG. 155 (Prior Art), FIG. 162 (Prior Art), and FIG. 169 (Prior Art));
   b) Is capable of saving manufacturing man-hours by robotically manufacturing
      in the directions of arrows 172a, 172b, 172c, and 172d
      (see FIG. 154, FIG. 158, FIG. 168, and FIG. 177);
   c) Is capable of saving end-consumer assembly time by robotically pre-installing robot-assembled heat-expandable cold-contractable anti-wobbling screws 117, at the factory
      in the directions of arrows 172a, 172b, 172c, and 172d
      (see FIG. 154, FIG. 158, FIG. 168, and FIG. 177); and
   d) Is capable of increasing overall production output of the six-device-in-one robot-assembled arthritic-assisting noise-canceling friction-reducing dog-run-adaptable anti-wobbling gazebo by robotically decreasing per-unit production time.
5) It is an even further object of the new invention to provide a six-device-in-one robot-assembled arthritic-assisting noise-canceling friction-reducing dog-run-adaptable anti-wobbling gazebo, having
   robot-assembled heat-expandable cold-contractable spirally-threading spiral saws 118.
   Therefore, the six-device-in-one robot-assembled arthritic-assisting noise-canceling friction-reducing dog-run-adaptable anti-wobbling gazebo:
   Is capable of robotically and heatingly expanding and tapping threads into top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
      in the directions of arrows 171a, 173a, and 173b
      (see FIG. 144).
6) It is another object of the new invention to provide a six-device-in-one robot-assembled arthritic-assisting noise-canceling friction-reducing dog-run-adaptable anti-wobbling gazebo, having robot-assembled heat-expandable cold-contractable spiral-teeth 119.

Therefore, the six-device-in-one robot-assembled arthritic-assisting noise-canceling friction-reducing dog-run-adaptable anti-wobbling gazebo:

Is capable of robotically and speedily cutting through plastic connector material
to decrease production time, and
to increase production output
in the directions of arrows 171*a*, 173*a*, and 173*b*
(see FIG. 144).

7) It is yet another object of the new invention to provide a six-device-in-one robot-assembled arthritic-assisting noise-canceling friction-reducing dog-run-adaptable anti-wobbling gazebo, having
robot-assembled heat-expandable cold-contractable interlocking cones 120.

Therefore, the six-device-in-one robot-assembled arthritic-assisting noise-canceling friction-reducing dog-run-adaptable anti-wobbling gazebo:

a) Is capable of robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
in the directions of arrows 171*a*, 173*a*, and 173*b*
(see FIG. 144);

b) Is capable of expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
in the directions of arrows 171*a*, 173*c*, 173*d*, and 173*e*
(see FIG. 145); and c) Is capable of eliminating the need for the usage of nuts and bolts
to robotically lessen the assembly time, and
to robotically lessen assembly cost
(see FIG. 146 (Prior Art), FIG. 155 (Prior Art), FIG. 162 (Prior Art), and FIG. 169 (Prior Art)).

8) It is still yet another object of the new invention to provide a six-device-in-one robot-assembled arthritic-assisting noise-canceling friction-reducing dog-run-adaptable anti-wobbling gazebo, having
robot-assembled heat-expandable cold-contractable interlocking spiral locks 121.

Therefore, the six-device-in-one robot-assembled arthritic-assisting noise-canceling friction-reducing dog-run-adaptable anti-wobbling gazebo:

a) Is capable of robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
in the directions of arrows 171*a*, 173*a*, and 173*b*
(see FIG. 144); and b) Is capable of expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
in the directions of arrows 171*a*, 173*c*, 173*d*, and 173*e*
(see FIG. 145).

9) It is still yet an even further object of the new invention to provide a six-device-in-one robot-assembled arthritic-assisting noise-canceling friction-reducing dog-run-adaptable anti-wobbling gazebo, having
central robot-assembled automatically-flaring-and-shielding-cone-head injury-preventing hammer-shields 125.

Therefore, the six-device-in-one robot-assembled arthritic-assisting noise-canceling friction-reducing dog-run-adaptable anti-wobbling gazebo:

a) Is capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place
in the directions of arrows 174*a*, 174*f*, 174*g*, 174*h*, 174*i*, and 174*j*
(see FIG. 156, FIG. 157, FIG. 159, FIG. 160, and FIG. 161); and b) Is capable of preventing injury by coving the robot-assembled heat-expandable cold-contractable interlocking cones 120.

10) It is still yet an even further object of the new invention to provide a six-device-in-one robot-assembled arthritic-assisting noise-canceling friction-reducing dog-run-adaptable anti-wobbling gazebo, having
upper robot-assembled automatically-flaring-and-shielding-cone-head injury-preventing hammer-shields 129.

Therefore, the six-device-in-one robot-assembled arthritic-assisting noise-canceling friction-reducing dog-run-adaptable anti-wobbling gazebo:

a) Is capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place; and b) Is capable of preventing injury by coving the robot-assembled heat-expandable cold-contractable interlocking cones 120
in the directions of arrows 175*a*, 175*f*, 175*g*, 175*h*, 175*i*, and 175*j*
(see FIG. 163, FIG. 164, FIG. 165, FIG. 166, and FIG. 167).

11) It is still yet an even further object of the new invention to provide a six-device-in-one robot-assembled arthritic-assisting noise-canceling friction-reducing dog-run-adaptable anti-wobbling gazebo, having
lower robot-assembled cone-shielding injury-preventing hammer-shields 133.

Therefore, the six-device-in-one robot-assembled arthritic-assisting noise-canceling friction-reducing dog-run-adaptable anti-wobbling gazebo:
   a) Is capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place, and
   b) Is capable of preventing injury by coving the robot-assembled heat-expandable cold-contractable interlocking cones 120
      in the directions of arrows 176*a*, 176*f*, 176*g*, 176*h*, 176*i*, and 176*j*
      (see FIG. 170, FIG. 171, FIG. 172, FIG. 173, FIG. 174, FIG. 175, and FIG. 176).
12) It is still yet an even further object of the new invention to provide a six-device-in-one robot-assembled arthritic-assisting noise-canceling friction-reducing dog-run-adaptable anti-wobbling gazebo, having
   lower robot-assembled arthritic-assisting height-adjusting dog-run-panel-rope hooks 134.
Therefore, the six-device-in-one robot-assembled arthritic-assisting noise-canceling friction-reducing dog-run-adaptable anti-wobbling gazebo:
   a) Is capable of allowing an arthritic to deploy and retract the six-device-in-one robot-assembled arthritic-assisting noise-canceling friction-reducing dog-run-adaptable anti-wobbling gazebo without the need to close the hand
      in the directions of arrows 177*a*, 177*b*, 177*c*, 177*d*, 177*e*, and 177*f*
      (see FIG. 178, FIG. 179, and FIG. 180); and
   b) Is capable of attaching a rope or strap to support a dog run
      in the direction of arrow 178
      (see FIG. 181).
13) It is still yet an even further object of the new invention to provide a six-device-in-one robot-assembled arthritic-assisting noise-canceling friction-reducing dog-run-adaptable anti-wobbling gazebo, having
   sleeve robot-assembled post-centering clamps 143.
Therefore, the six-device-in-one robot-assembled arthritic-assisting noise-canceling friction-reducing dog-run-adaptable anti-wobbling gazebo:
   Is capable of centering dog-run-adaptable anti-wobbling foldable lower posts 107 within dog-run-adaptable anti-wobbling foldable upper posts 106.
14) It is still yet an even further object of the new invention to provide a six-device-in-one robot-assembled arthritic-assisting noise-canceling friction-reducing dog-run-adaptable anti-wobbling gazebo, having
   sleeve robot-assembled tick-preventing downward teeth 144.
Therefore, the six-device-in-one robot-assembled arthritic-assisting noise-canceling friction-reducing dog-run-adaptable anti-wobbling gazebo:
   Is capable of preventing ticks from getting inside dog-run-adaptable anti-wobbling foldable upper posts 106.
15) It is still yet an even further object of the new invention to provide a six-device-in-one robot-assembled arthritic-assisting noise-canceling friction-reducing dog-run-adaptable anti-wobbling gazebo, having
   sleeve robot-assembled water-discharging grooves 145.
Therefore, the six-device-in-one robot-assembled arthritic-assisting noise-canceling friction-reducing dog-run-adaptable anti-wobbling gazebo:
   Is capable of allowing water to discharge out of dog-run-adaptable anti-wobbling foldable upper posts 106
   in the directions of arrows 181*a* and 181*b*
   (see FIG. 188).
16) It is still yet an even further object of the new invention to provide a six-device-in-one robot-assembled arthritic-assisting noise-canceling friction-reducing dog-run-adaptable anti-wobbling gazebo, having
   sleeve robot-assembled arthritic-assisting height-adjusting dog-run-panel-rope hooks 146.
Therefore, the six-device-in-one robot-assembled arthritic-assisting noise-canceling friction-reducing dog-run-adaptable anti-wobbling gazebo:
   a) Is capable of allowing an arthritic to deploy and retract the six-device-in-one robot-assembled arthritic-assisting noise-canceling friction-reducing dog-run-adaptable anti-wobbling gazebo without bending the fingers
      (see FIG. 191); and
   b) Is capable of attaching a rope or strap to support a dog run
      in the direction of arrow 182
      (see FIG. 193).
17) It is still yet an even further object of the new invention to provide a six-device-in-one robot-assembled arthritic-assisting noise-canceling friction-reducing dog-run-adaptable anti-wobbling gazebo, having
   robot-assembled rust-preventing truss-end covers 154.
Therefore, the six-device-in-one robot-assembled arthritic-assisting noise-canceling friction-reducing dog-run-adaptable anti-wobbling gazebo:
   a) Is capable of eliminating the need for nuts and bolts
      to save manufacturing cost,
      to save manufacturing time,
      to save end-user assembly time, and
      to increase overall production output;
   b) Is capable of eliminating the need for washers
      to save manufacturing cost,
      to save manufacturing time,
      to save end-user assembly time, and
      to increase overall production output;
   c) Is capable of eliminating the need for 50 truss-end-plugs, from prior art
      to save manufacturing cost,
      to save manufacturing time,
      to save end-user assembly time, and
      to increase overall production output;
   d) Is capable of preventing water and insects from entering into dog-run-adaptable anti-wobbling foldable corner trusses 104; and
   e) Is capable of preventing injury by covering sharp metal edges.
18) It is still yet an even further object of the new invention to provide a six-device-in-one robot-assembled arthritic-assisting noise-canceling friction-reducing dog-run-adaptable anti-wobbling gazebo, having
   robot-assembled heat-expandable cold-contractable double-tail cover-cushion rivets 157.
Therefore, the six-device-in-one robot-assembled arthritic-assisting noise-canceling friction-reducing dog-run-adaptable anti-wobbling gazebo:
   a) Is capable of decreasing assembly man hours by being robotically factory-installed;

b) Is capable of decreasing end-user assembly time by being robotically factory-installed;

c) Is capable of eliminating need for washers;

d) Is capable of creating a locking ridge when robotically heat-stamped eliminating need for nuts and bolts
in the directions of arrows 185a, 185b, 185c, and 185d
(see FIG. 197, FIG. 198, and FIG. 199); and e) Is capable of creating a locking ridge when robotically heat-stamped securely and pivotably locking two dog-run-adaptable anti-wobbling foldable side trusses 105 together
in the directions of arrows 185a, 185b, 185c, and 185d
(see FIG. 197, FIG. 198, and FIG. 199).

19) It is still yet an even further object of the new invention to provide a six-device-in-one robot-assembled arthritic-assisting noise-canceling friction-reducing dog-run-adaptable anti-wobbling gazebo, having robot-assembled noise-canceling cup-cushion 159.

Therefore, the six-device-in-one robot-assembled arthritic-assisting noise-canceling friction-reducing dog-run-adaptable anti-wobbling gazebo:

a) Is capable of eliminating the need for nuts and bolts
to save manufacturing cost,
to save manufacturing time,
to save end-user assembly time, and
to increase overall production output
in the directions of arrows 186a, 186b, and 186c
(see FIG. 203, FIG. 204, FIG. 205, and FIG. 206);

b) Is capable of eliminating the need for washers
to save manufacturing cost,
to save manufacturing time,
to save end-user assembly time, and
to increase overall production output
in the directions of arrows 186a, 186b, and 186c
(see FIG. 203, FIG. 204, FIG. 205, and FIG. 206);

c) Is capable of eliminating the need for 50 truss-end-plugs, from prior art
to save manufacturing cost,
to save manufacturing time,
to save end-user assembly time, and
to increase overall production output
in the directions of arrows 186a, 186b, and 186c
(see FIG. 203, FIG. 204, FIG. 205, and FIG. 206);

d) Is capable of preventing water and insects from entering into dog-run-adaptable anti-wobbling foldable corner trusses 104; and e) Is capable of preventing injury by covering sharp metal edges.

20) It is still yet an even further object of the new invention to provide a six-device-in-one robot-assembled arthritic-assisting noise-canceling friction-reducing dog-run-adaptable anti-wobbling gazebo, having robot-assembled noise-canceling circular-cushion 162.

Therefore, the six-device-in-one robot-assembled arthritic-assisting noise-canceling friction-reducing dog-run-adaptable anti-wobbling gazebo:

a) Is capable of providing a washer between two dog-run-adaptable anti-wobbling foldable side trusses 105;

b) Is capable of pivotably connecting two dog-run-adaptable anti-wobbling foldable side trusses 105 together;

c) Is capable of eliminating the need for nuts and bolts
to save manufacturing cost,
to save manufacturing time,
to save end-user assembly time, and
to increase overall production output
in the directions of arrows 187a, 187b, 187c, 187d, 187e, and 186f
(see FIG. 207, FIG. 208, FIG. 209, and FIG. 210); and d) Is capable of eliminating the need for washers
to save manufacturing cost,
to save manufacturing time,
to save end-user assembly time, and
to increase overall production output
in the directions of arrows 187a, 187b, 187c, 187d, 187e, and 186f
(see FIG. 207, FIG. 208, FIG. 209, and FIG. 210).

21) It is still yet an even further object of the new invention to provide a six-device-in-one robot-assembled arthritic-assisting noise-canceling friction-reducing dog-run-adaptable anti-wobbling gazebo, having robot-assembled double-tail built-in circular-cushion rivets 163.

Therefore, the six-device-in-one robot-assembled arthritic-assisting noise-canceling friction-reducing dog-run-adaptable anti-wobbling gazebo:

a) Is capable of pivotably connecting two dog-run-adaptable anti-wobbling foldable side trusses 105 together;

b) Is capable of being robotically installed to lessen the assembly man hours
in the directions of arrows 187a, 187b, 187c, 187d, 187e, and 186f
(see FIG. 207, FIG. 208, FIG. 209, and FIG. 210);

c) Is capable of being robotically installed to lessen end-user assembly time
in the directions of arrows 187a, 187b, 187c, 187d, 187e, and 186f
(see FIG. 207, FIG. 208, FIG. 209, and FIG. 210); and d) Is capable of being robotically heat-stamped automatically creating a locking ridge eliminating the need for nuts
in the directions of arrows 187a, 187b, 187c, 187d, 187e, and 186f
(see FIG. 207, FIG. 208, FIG. 209, and FIG. 210).

Other objects and advantages of the present invention will become apparent from a consideration of the accompanying drawings and ensuing description.

SUMMARY OF THE INVENTION

A six-device-in-one robot-assembled arthritic-assisting noise-canceling friction-reducing dog-run-adaptable anti-wobbling gazebo comprises:

an adjustable canopy for protecting occupants and property users from weather elements and functioning as a greenhouse and a cover for a dog-run and a surface for an advertisement sign and an awning cover and ceiling-mounted overhead storage, foldable top trusses, foldable corner trusses robotically attached to the foldable top trusses, foldable side trusses, foldable upper posts, foldable lower posts slidably inserted within the foldable upper posts for supporting sidewalls of a dog-run, feet robotically welded to the foldable lower posts, foot holes robotically drilled into the feet, truss holes robotically drilled into the foldable top trusses, the foldable corner trusses, and the foldable side trusses, robot-assembled screws robotically inserted into top robot-assembled holes and central robot-assembled holes and upper robot-assembled holes and lower robot-assembled holes for saving manufacturing time by eliminating need for nuts and bolts and manufacturing man-hours by robotically manufacturing and end-consumer assembly time by robotically pre-installing the screws at factories and increasing overall production output of the gazebo, robot-assembled spiral saws formed to the robot-assembled screws, robot-assembled spiral-teeth formed to the robot-assembled spiral saws, robot-assembled interlocking cones formed to the robot-assembled screws, robot-assembled interlocking locks formed to the robot-assembled interlocking cones, top robot-assembled connectors robotically heated up to expand and robotically heat-riveted to the foldable top trusses, top robot-assembled holes robotically heated up to expand and robotically molded in the top robot-assembled connectors, top robot-assembled hammer-shields robotically heated up to expand and robotically molded on the top robot-assembled connectors covering at least one of the top robot-assembled holes, top robot-assembled double-tail rivets robotically heated up to expand and robotically heat-hammered through the robot-assembled holes against the robot-assembled hammer-shields such that the hammer-shields automatically bend the top double-tail rivets to secure the top robot-assembled connectors to the top trusses and automatically shield the top double-tail rivets, at least one central robot-assembled intersector robotically heated up to expand and robotically heat-screwed to the foldable top trusses, central robot-assembled holes robotically heated up to expand and robotically molded in the central robot-assembled intersectors and the robot-assembled screws robotically heated up to expand and inserted into the central robot-assembled holes, central robot-assembled hammer-shields robotically heated up to expand and robotically molded on the central robot-assembled intersectors to cover at least one of the central robot-assembled holes for automatically stopping the robot-assembled screws allowing the robot-assembled interlocking cones and the robot-assembled interlocking locks to expand and lock into place and preventing injury by coving said robot-assembled interlocking cones, upper robot-assembled intersectors robotically heated up to expand and robotically heat-screwed to the foldable top trusses, the foldable side trusses, and robotically assembled to the foldable upper posts, upper robot-assembled holes robotically heated up to expand and robotically molded in the upper robot-assembled intersectors, the robot-assembled screws robotically heated up to expand and inserted into the upper robot-assembled holes, upper robot-assembled hammer-shields robotically heated up to expand and robotically molded on the upper robot-assembled intersectors to cover at least one of the upper robot-assembled holes robot-assembled interlocking cones and said robot-assembled heat-expandable cold-contractable interlocking spiral locks for robotically and heatingly boring through the top robot-assembled heat-expandable cold-contractable holes and expanding and locking when impacted by the top robot-assembled hammer-shields and eliminating need for nuts and bolts to robotically lessen manufacturing time and assembly cost, lower robot-assembled intersectors robotically heated up to expand and robotically heat-screwed to the foldable corner trusses, the foldable side trusses, and robotically and slidably attached to the foldable upper posts, lower robot-assembled holes robotically heated up to expand and robotically molded in the lower robot-assembled intersectors, to cover at least one of the lower robot-assembled holes, the robot-assembled screws robotically heated up to expand and inserted into the lower robot-assembled holes, lower robot-assembled hammer-shields robotically heated up to expand and robotically molded on the lower robot-assembled intersectors to cover at least one of the lower robot-assembled holes for automatically stopping the robot-assembled screws allowing the robot-assembled interlocking cones and the robot-assembled interlocking locks to expand and lock into place and preventing injury by coving said robot-assembled interlocking cones, lower robot-assembled height-adjusting hooks robotically and pivotably secured to the lower robot-assembled intersectors, lower robot-assembled height-adjusting nipples robotically and pivotably secured to the lower robot-assembled height-adjusting hooks, lower robot-assembled nipple tips robotically inserted within the lower robot-assembled height-adjusting nipples, lower robot-assembled nipple-securing pins robotically heated up to expand and robotically heat-pressed through the lower robot-assembled height-adjusting hooks and through the lower robot-assembled height-adjusting nipples, lower robot-assembled hook-securing pins robotically heated up to expand and robotically heat-pressed into the lower robot-assembled intersectors and through the lower robot-assembled height-adjusting hooks, a lower robot-assembled hook spring robotically springingly inserted between the lower robot-assembled intersectors and the lower robot-assembled height-adjusting hooks, lower robot-assembled tunnels robotically molded into the lower robot-assembled intersectors, robot-assembled sleeves robotically assembled to the foldable upper posts, sleeve robot-assembled clamps robotically molded to the robot-assembled sleeves, sleeve robot-assembled downward teeth robotically molded to the sleeve robot-assembled clamps, sleeve robot-assembled grooves robotically molded into the sleeve robot-assembled clamps, sleeve robot-assembled height-adjusting hooks robotically and pivotably secured to the robot-assembled sleeves, sleeve robot-assembled jacks robotically assembled to the sleeve robot-assembled height-adjusting hooks, sleeve robot-assembled grooved nipples robotically formed to the sleeve robot-assembled jacks, sleeve robot-assembled jack-securing pins robotically heated up to expand and robotically heat-pressed through the sleeve robot-assembled height-adjusting hooks and through the sleeve robot-assembled jacks, sleeve robot-assembled hook-securing pins robotically heated up to expand and robotically heat-pressed into the robot-assembled sleeves and through the sleeve robot-assembled height-adjusting hooks, a sleeve robot-assembled hook spring robotically springingly inserted between the robot-assembled sleeves and the robot-assembled height-adjusting hooks, sleeve robot-assembled flower-shaped nipple-centering holes robotically molded into the robot-assembled sleeves, robot-assembled truss-end covers and a robot-assembled cup-cushion each robotically assembled to the foldable corner trusses for eliminating need for nuts and bolts to save manufacturing cost and manufacturing time and end-user assembly time and increase overall production output, and eliminating need for washers to save manufacturing cost and end-user assembly time and increase overall production output, and eliminating need for 50 truss-end plugs from prior art gazebos save manufacturing cost and time and end-user assembly time and increase overall production output, and preventing water and insects from entering into the foldable corner trusses and for preventing injury by covering sharp metal edges, a robot-assembled cover-cushion robotically formed to the robot-assembled truss-end covers, robot-assembled cover-cushion edges robotically formed to the robot-assembled cover-cushion, robot-assembled double-tail cover-cushion rivets robotically heated up to expand and robotically heat-hammered through the robot-assembled truss-end covers automatically bend the robot-assembled double-tail cover-cushion rivets to secure the robot-assembled double-tail cover-cushion rivets to the foldable corner trusses, and automatically shield the robot-assembled double-tail cover-cushion rivets for decreasing assembly man hours by being robotically factory-installed and end-user assembly time by being robotically factory-installed and eliminating need for washers and creating locking ridge when robotically heat-stamped eliminating need for nuts and bolts and locking two foldable side trusses together, cup-cushion edges robotically formed into the robot-assembled cup-cushion, a robot-assembled circular-cushion robotically assembled to the foldable side trusses, and robot-assembled circular-cushion rivets robotically formed into the robot-assembled circular-cushion for pivotably connecting two foldable side trusses together and being robotically installed to lessen assembly man hours and end-user assembly time and being robotically heat-stamped to automatically create a locking ridge eliminating need for nuts and bolts.

BRIEF DESCRIPTION OF THE DRAWINGS

FIG. 207, FIG. 208, FIG. 209, and FIG. 210 illustrate perspective and cross-sectional views demonstrating the robotic assembly of robot-assembled arthritic-assisting noise-canceling circular-cushion system.

FIG. 227, FIG. 228, FIG. 229, FIG. 230, FIG. 231, FIG. 232, FIG. 233, FIG. 234, FIG. 235, and FIG. 236 illustrate perspective views of equivalent variations of various components of robot-assembled arthritic-assisting injury-preventing post-centering tick-preventing water-discharging sleeve system.

FIG. 241, FIG. 242, FIG. 243, and FIG. 244 illustrate perspective views of equivalent variations of robot-assembled automatically-making-rivet-tail-flare noise-canceling injury-preventing top-connector system.

FIG. 245, FIG. 246, FIG. 247, FIG. 248, FIG. 249, FIG. 250, FIG. 251, and FIG. 252 illustrate perspective views of equivalent variations of lower robot-assembled arthritic-assisting height-adjusting dog-run-panel-rope hooks and sleeve robot-assembled arthritic-assisting height-adjusting dog-run-panel-rope hooks.

DETAILED DESCRIPTION OF THE INVENTION

Figure 1:
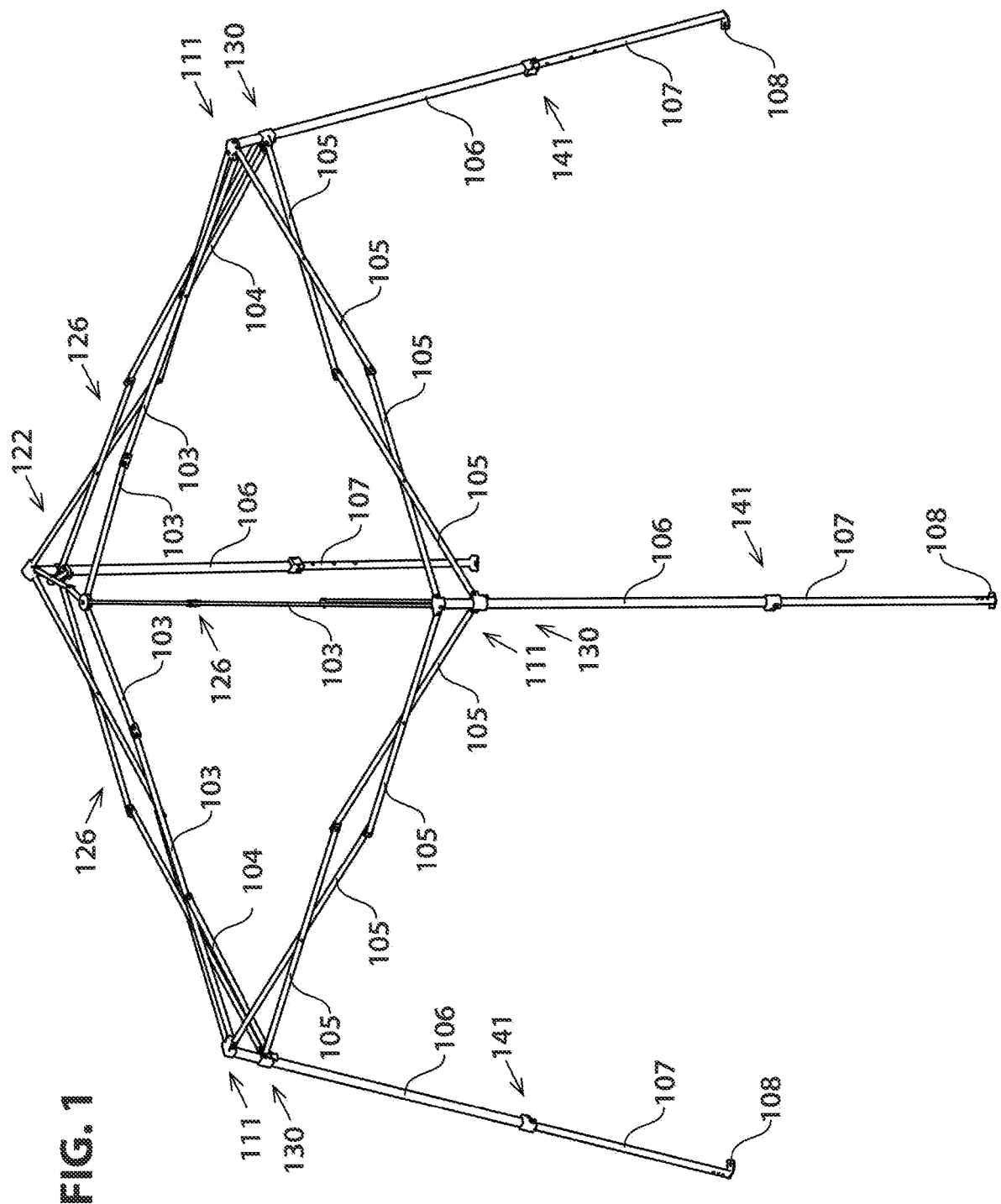
FIG. 1, FIG. 2, FIG. 3, FIG. 4, FIG. 5, FIG. 6A, FIG. 6B, FIG. 7, FIG. 8, FIG. 9, FIG. 10, FIG. 11, and FIG. 12 illustrate perspective, side, top views of various assemblies and functions of the six-device-in-one robot-assembled arthritic-assisting noise-canceling friction-reducing dog-run-adaptable anti-wobbling gazebo.
Figure 2:
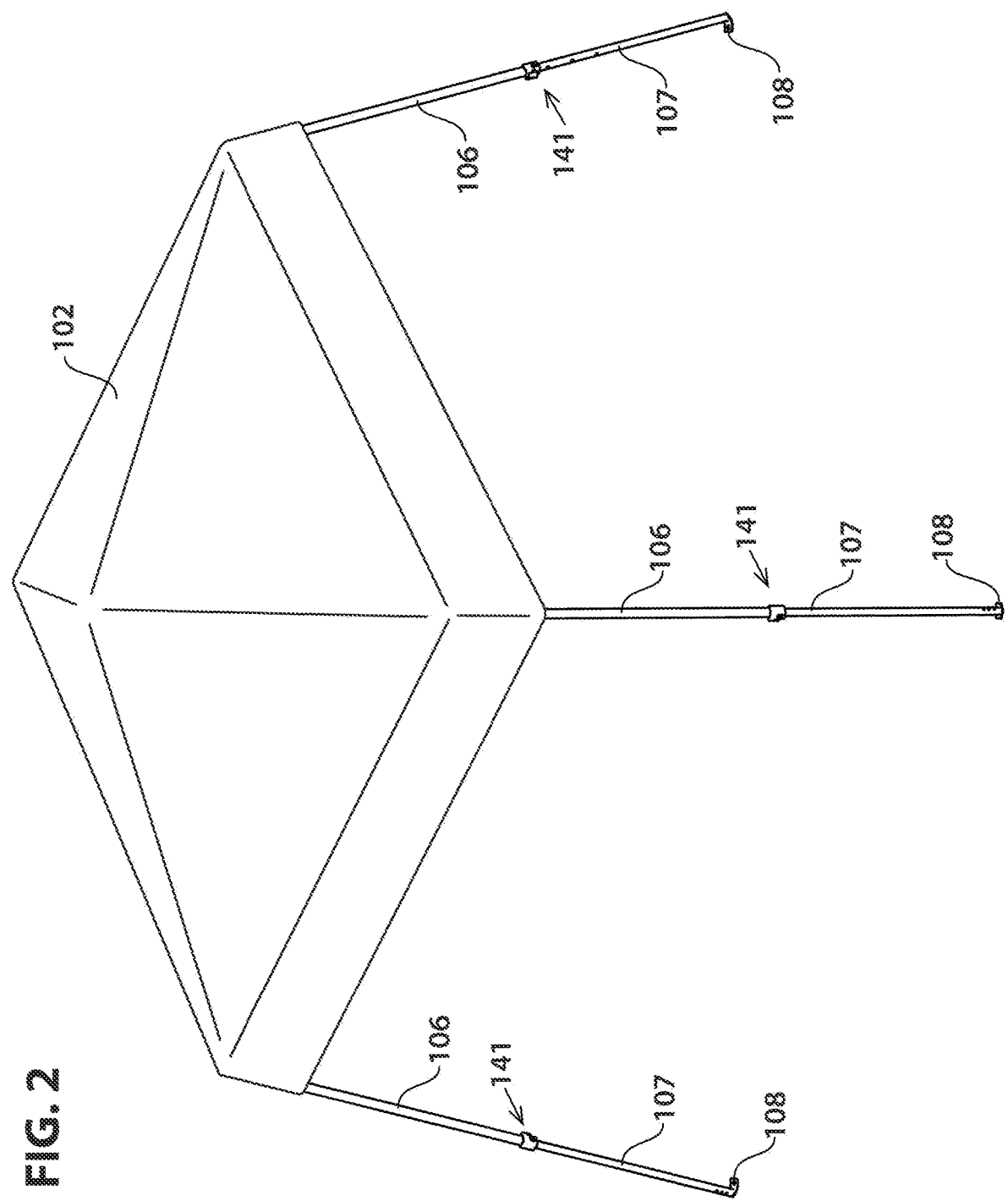
Figure 3:
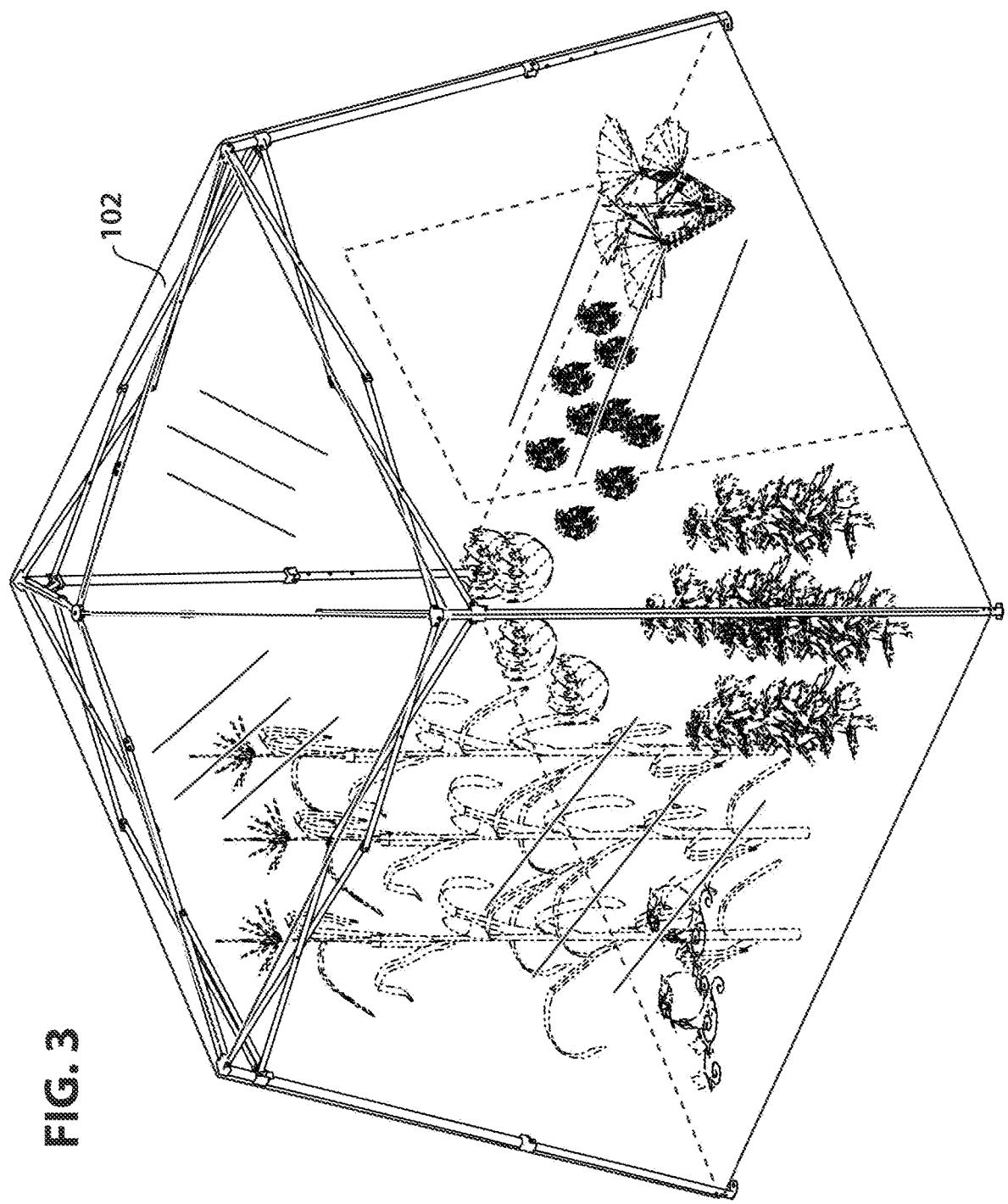
Figure 4:
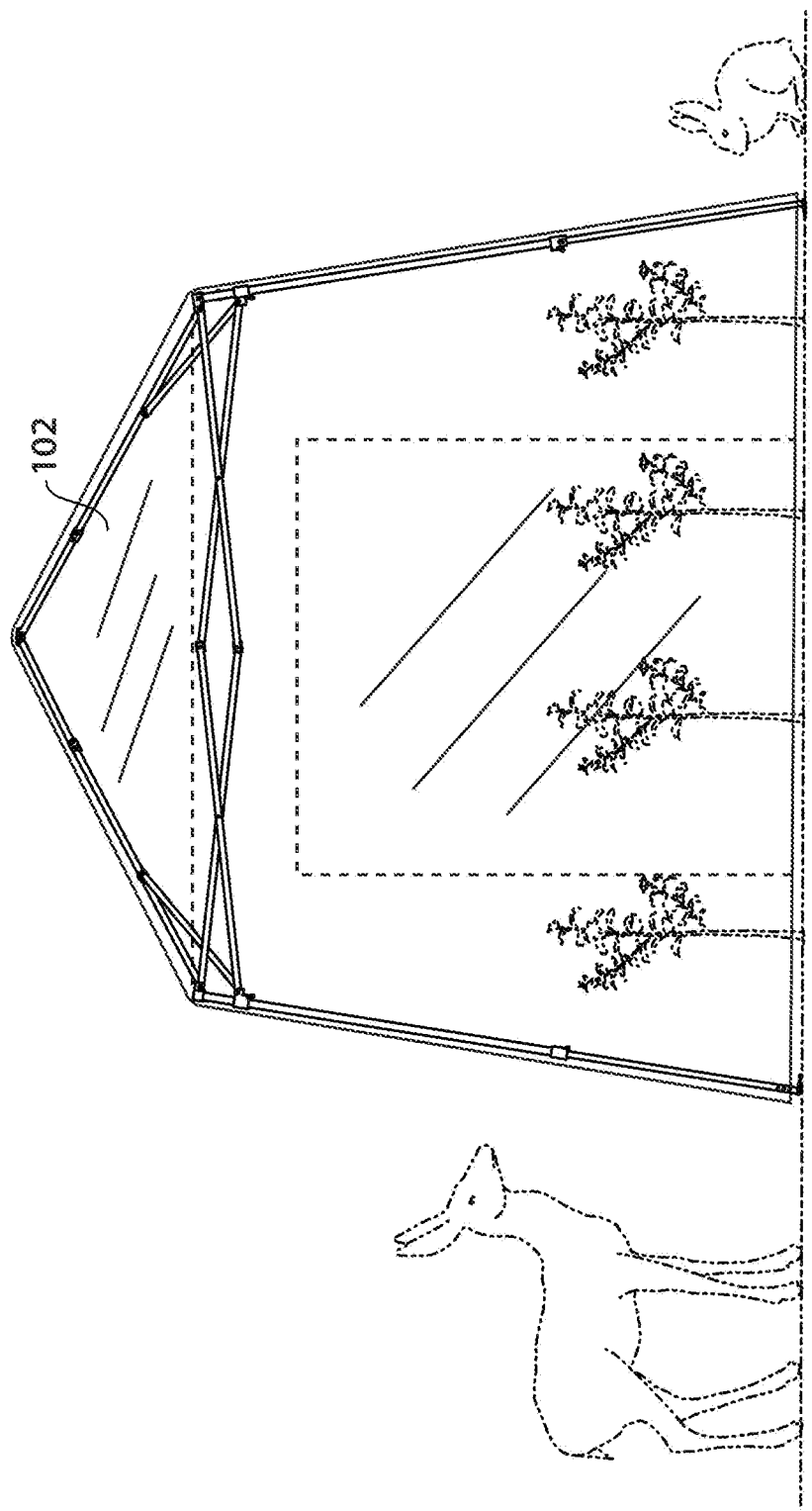
Figure 5:
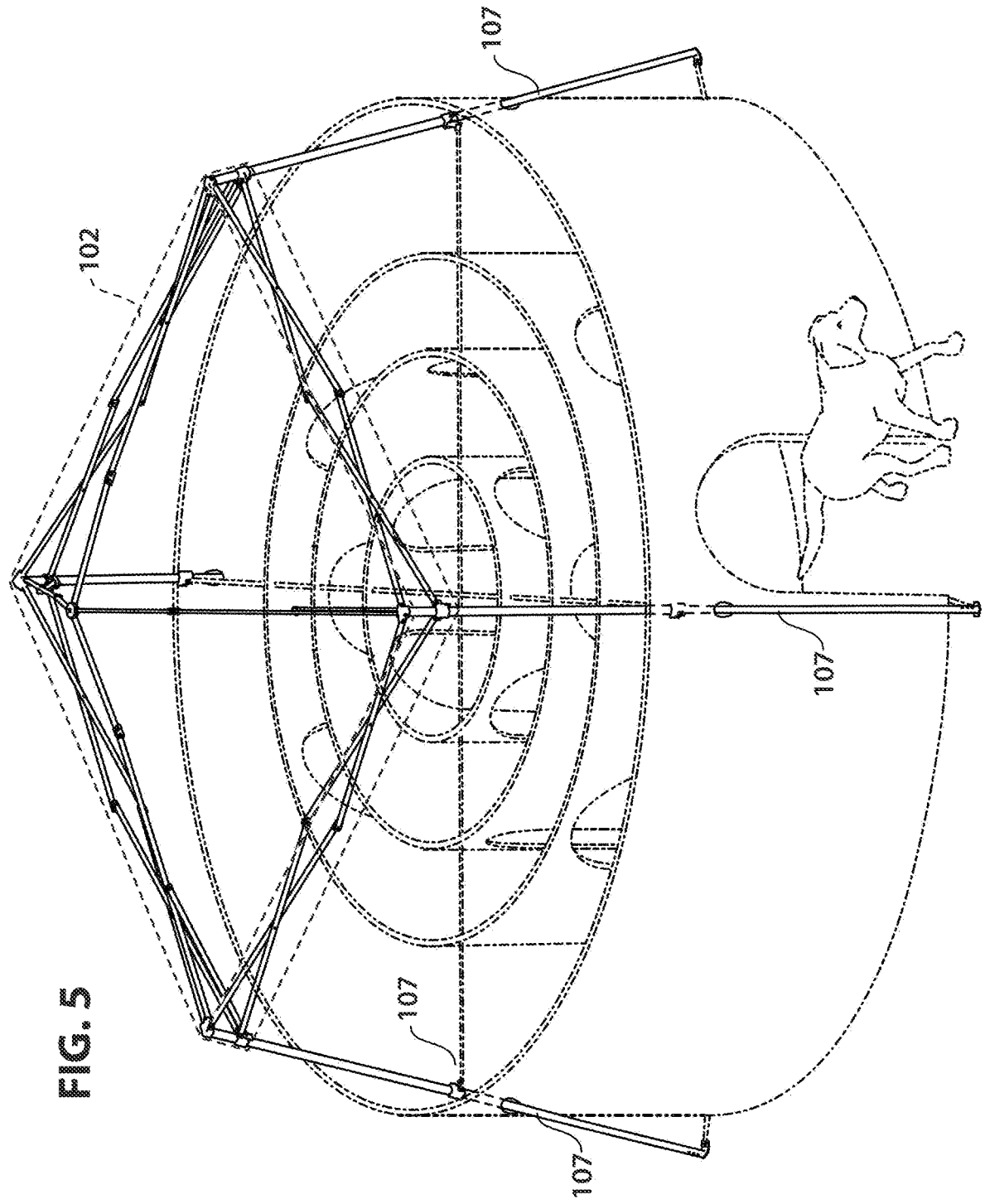
Figure 6A:
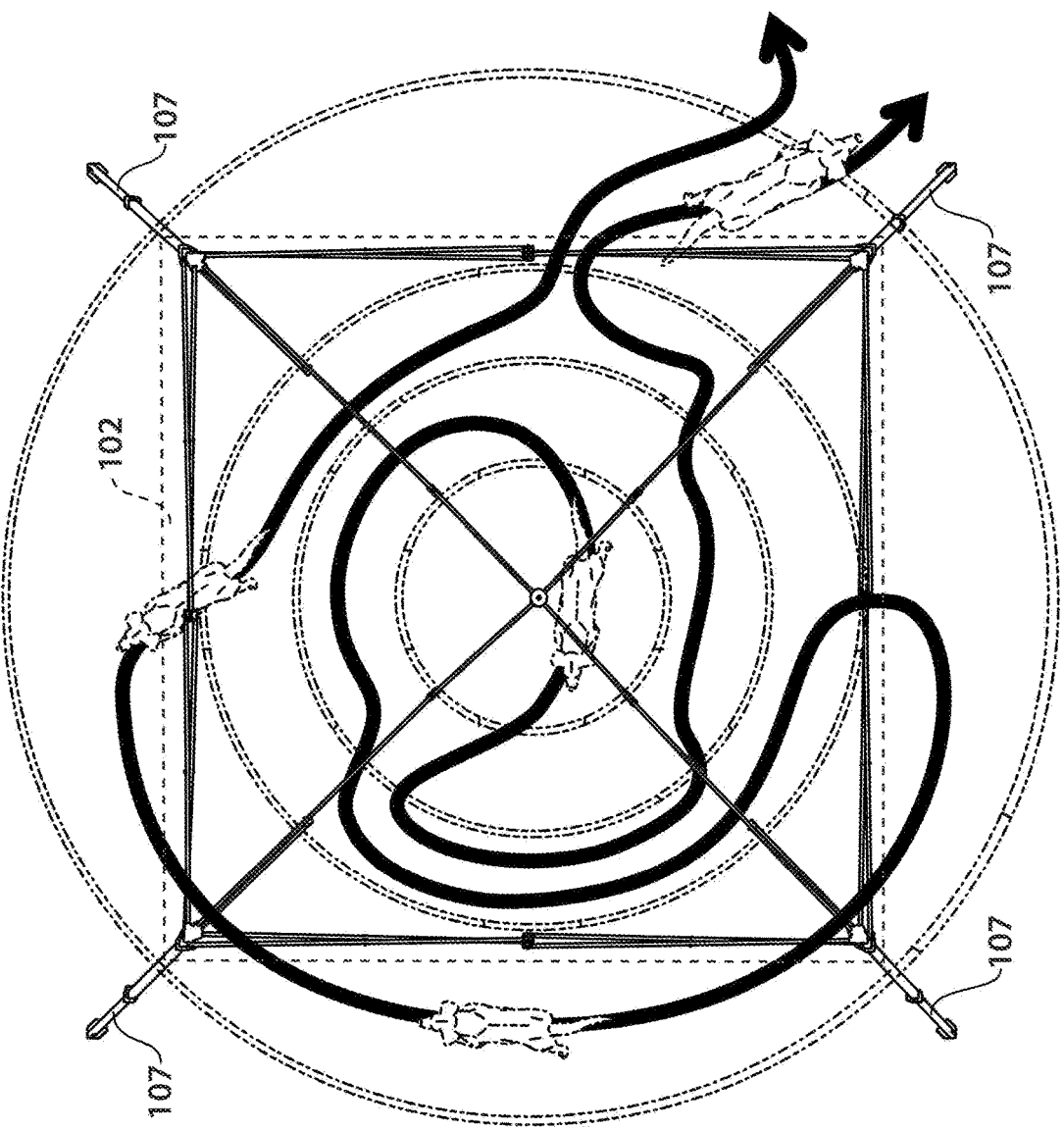
Figure 6B:
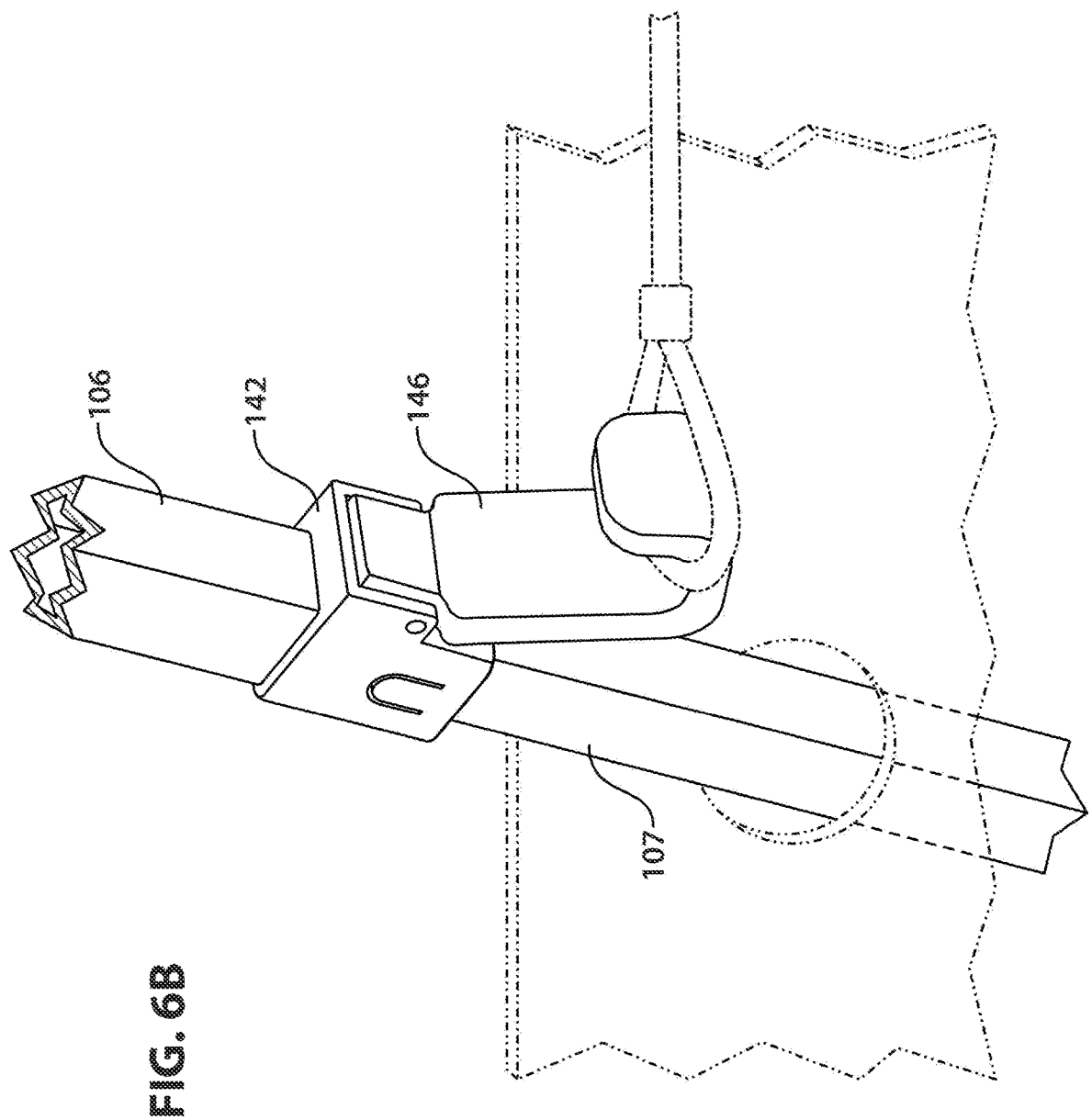
Figure 7:
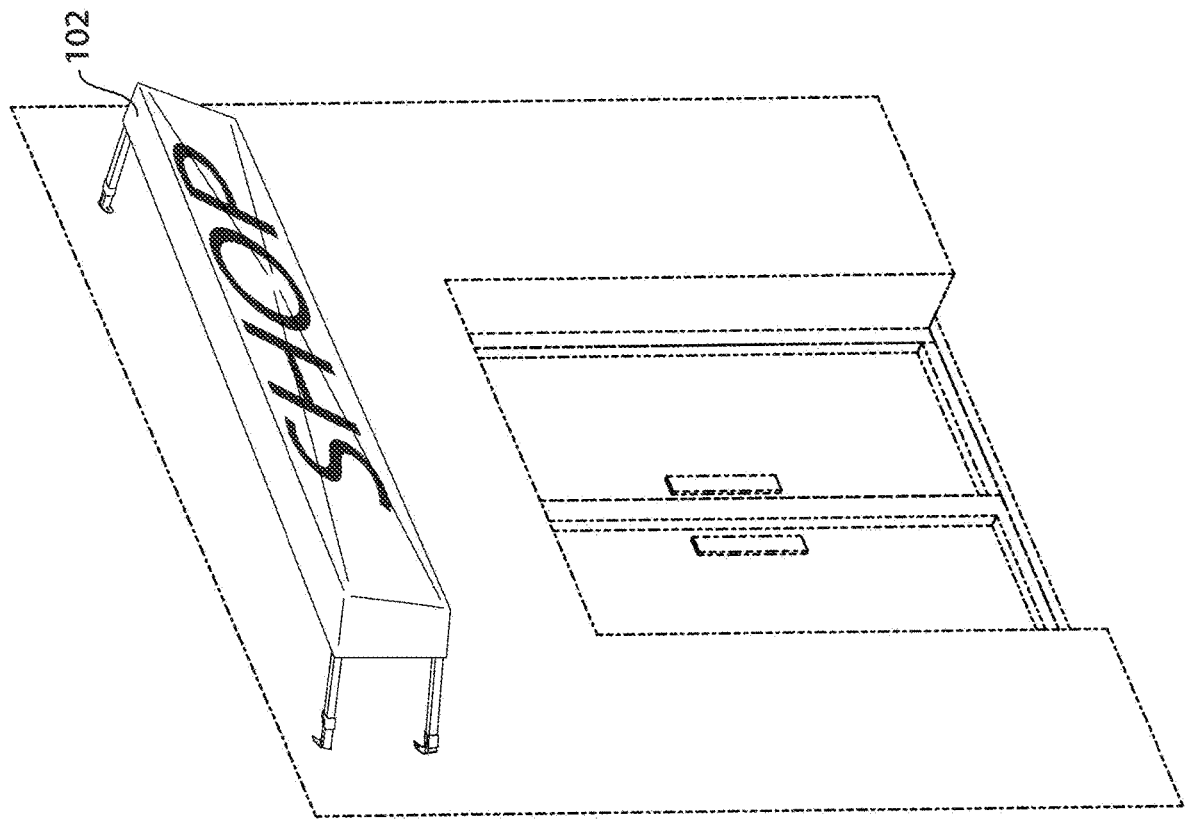
Figure 8:
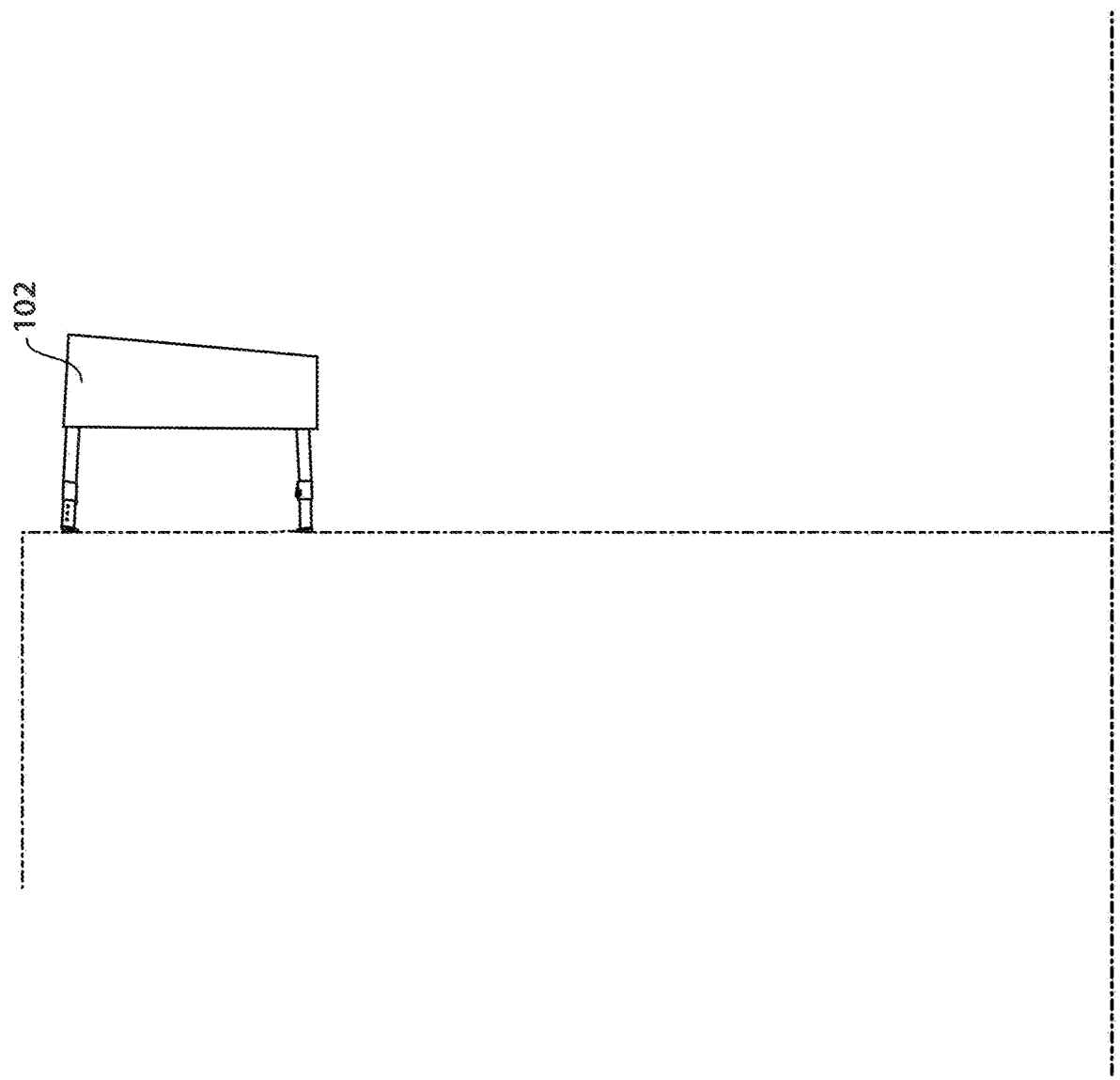
Figure 9:
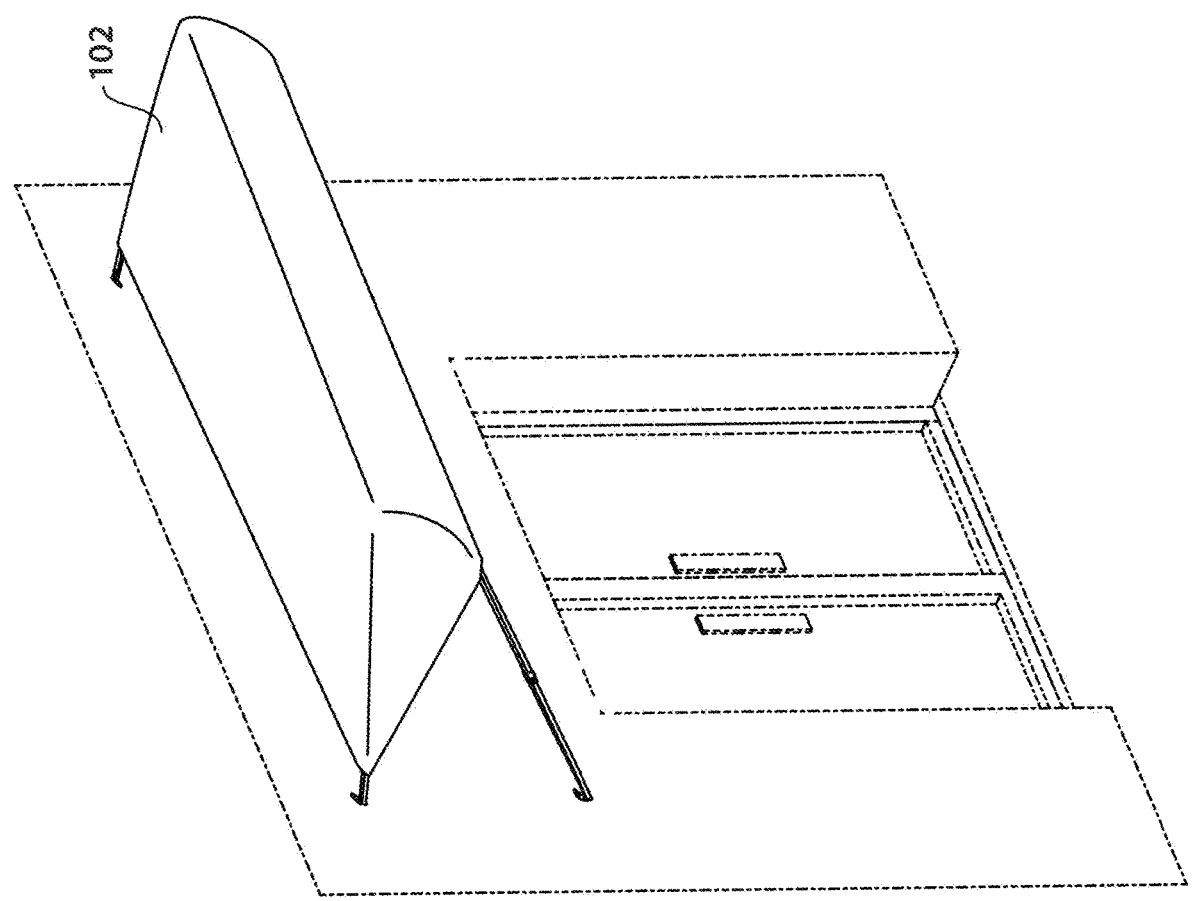
Figure 10:
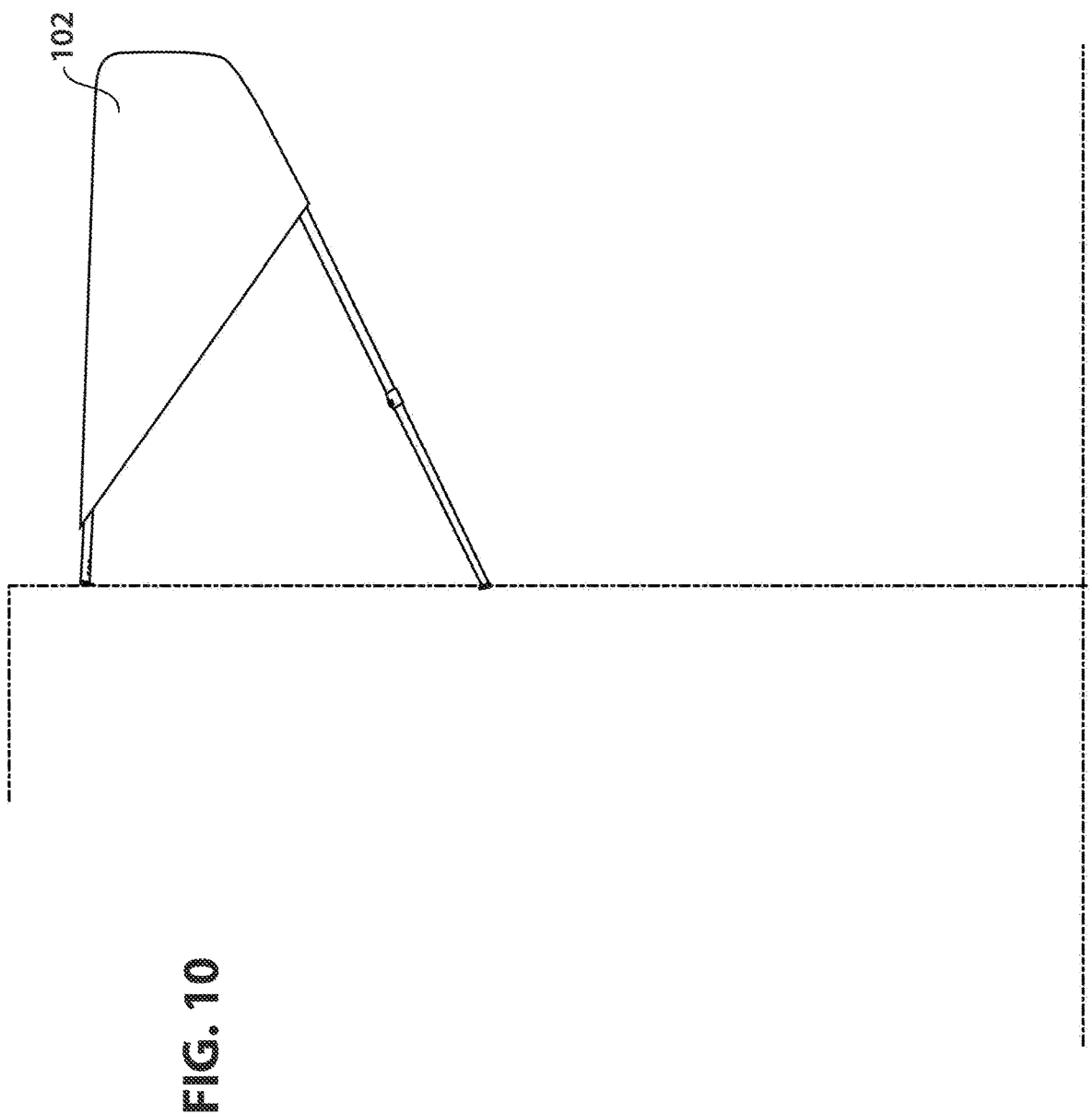
Figure 11:
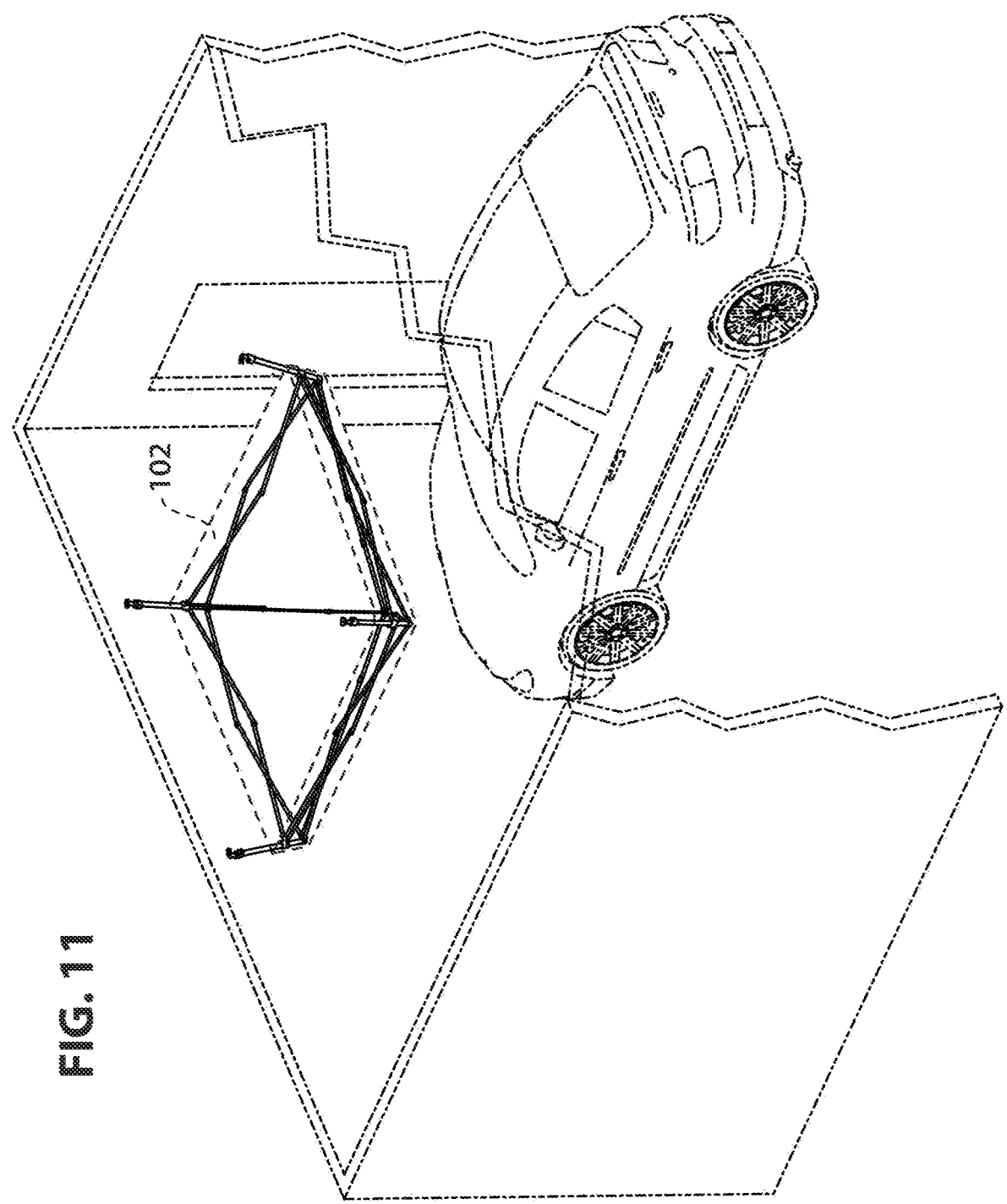
Figure 12:
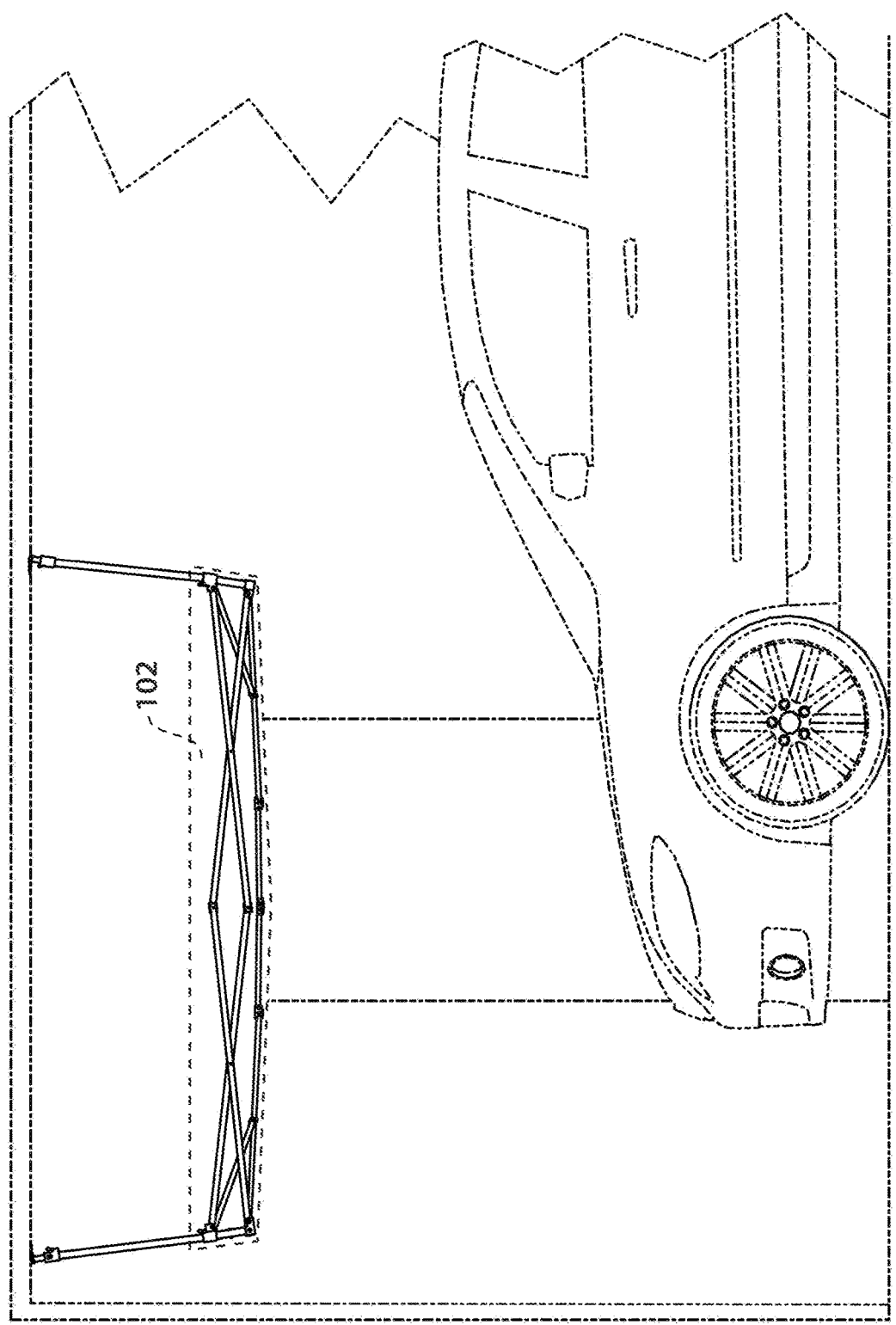
Figure 13:
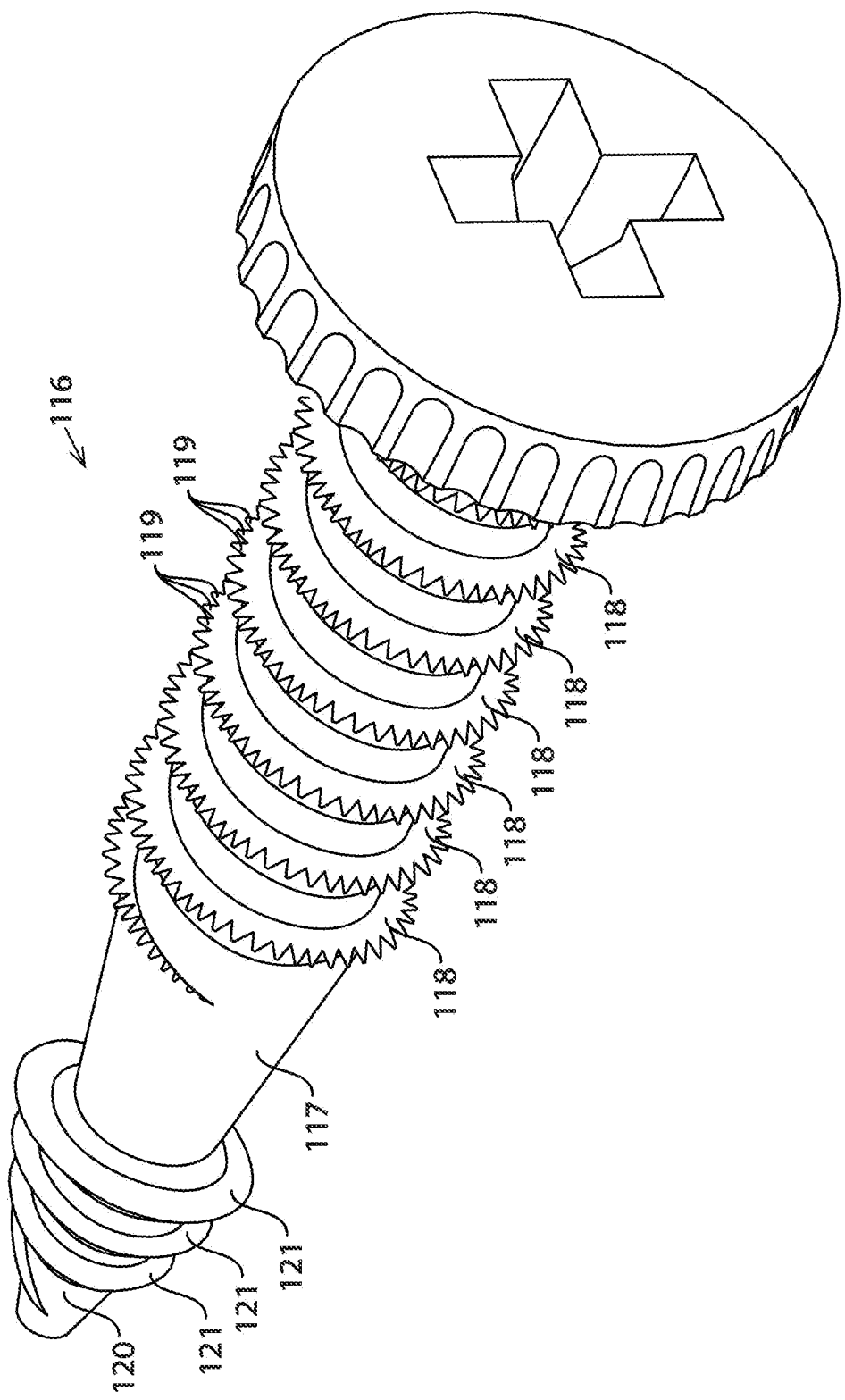
FIG. 13 and FIG. 14 illustrate perspective views of robot-assembled heat-expandable cold-contractable anti-wobbling screws.
Figure 14:
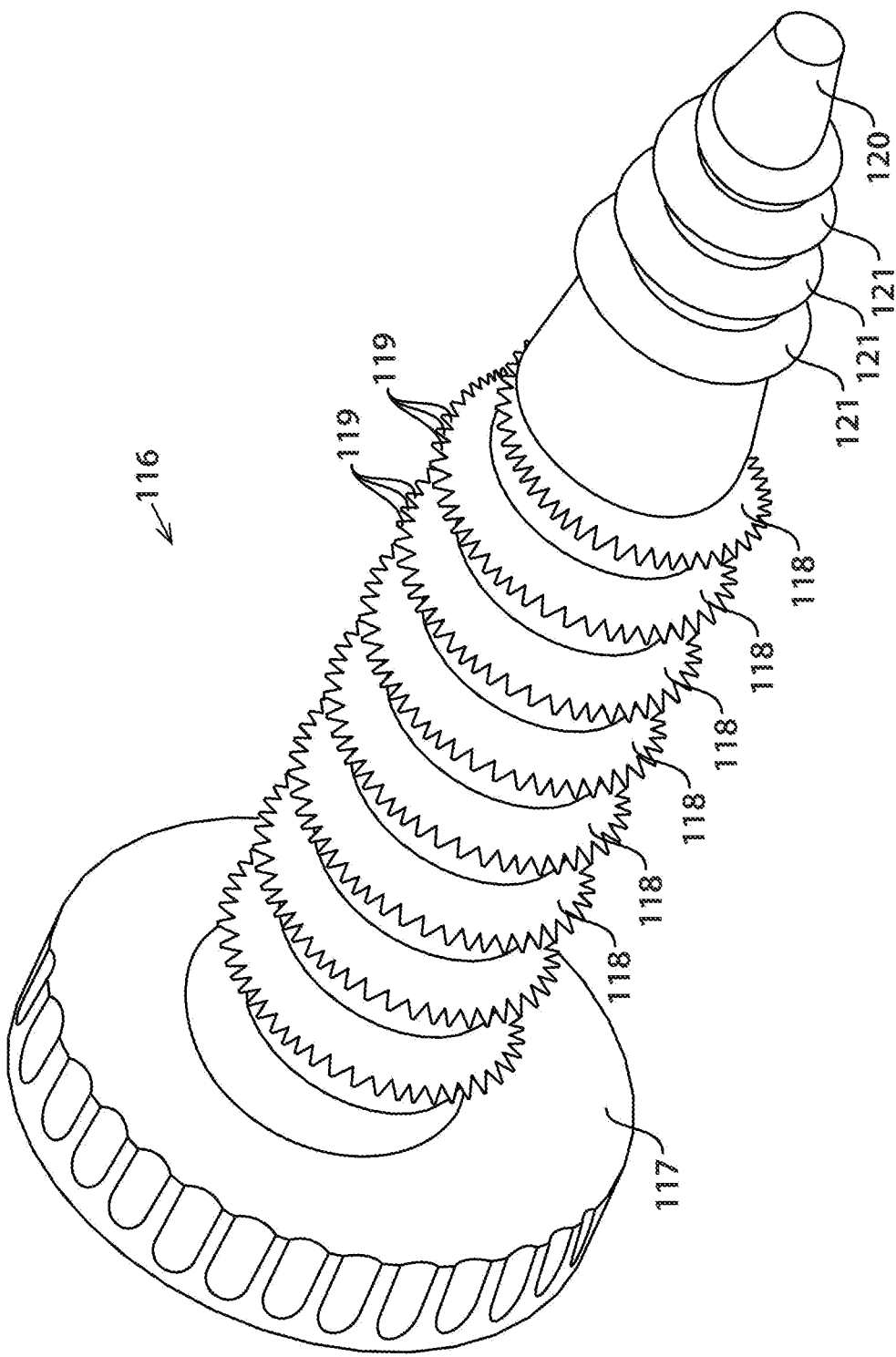
Figure 15:
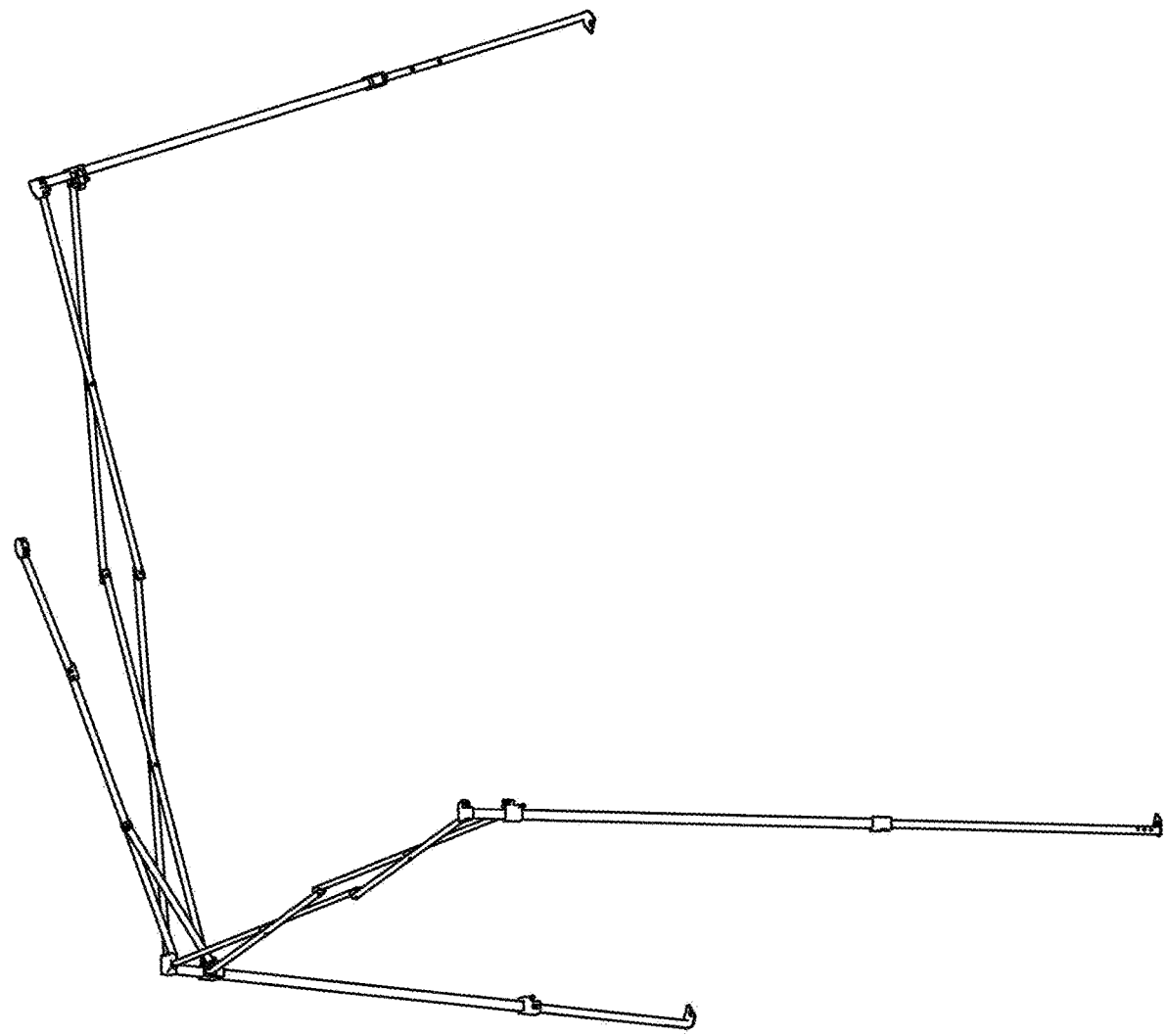
FIG. 15, FIG. 16, FIG. 17, FIG. 18, FIG. 19, and FIG. 20 illustrate perspective view of robot-assembled automatically-making-rivet-tail-flare noise-canceling injury-preventing top-connector system and its components.
Figure 16:
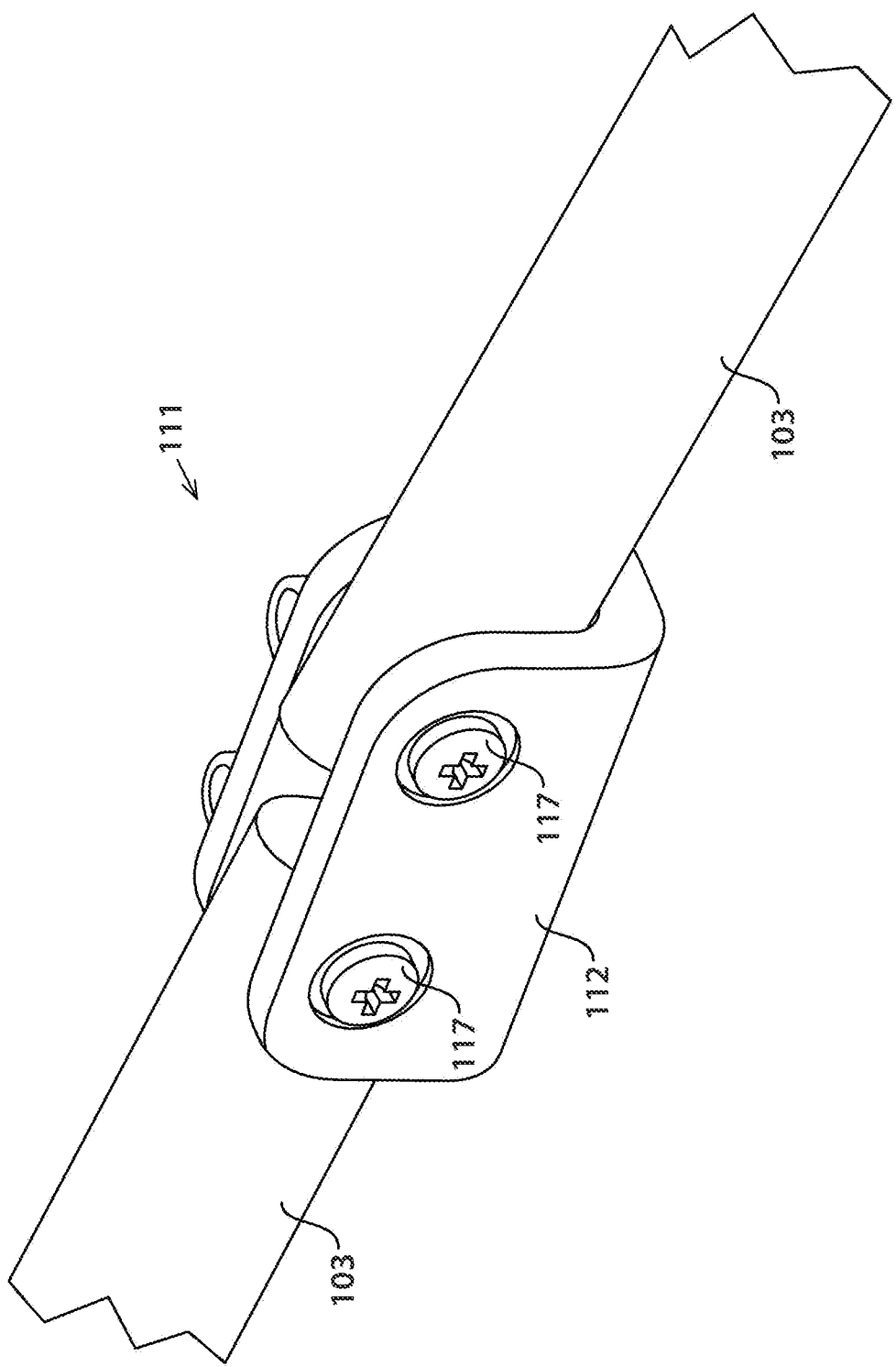
Figure 17:
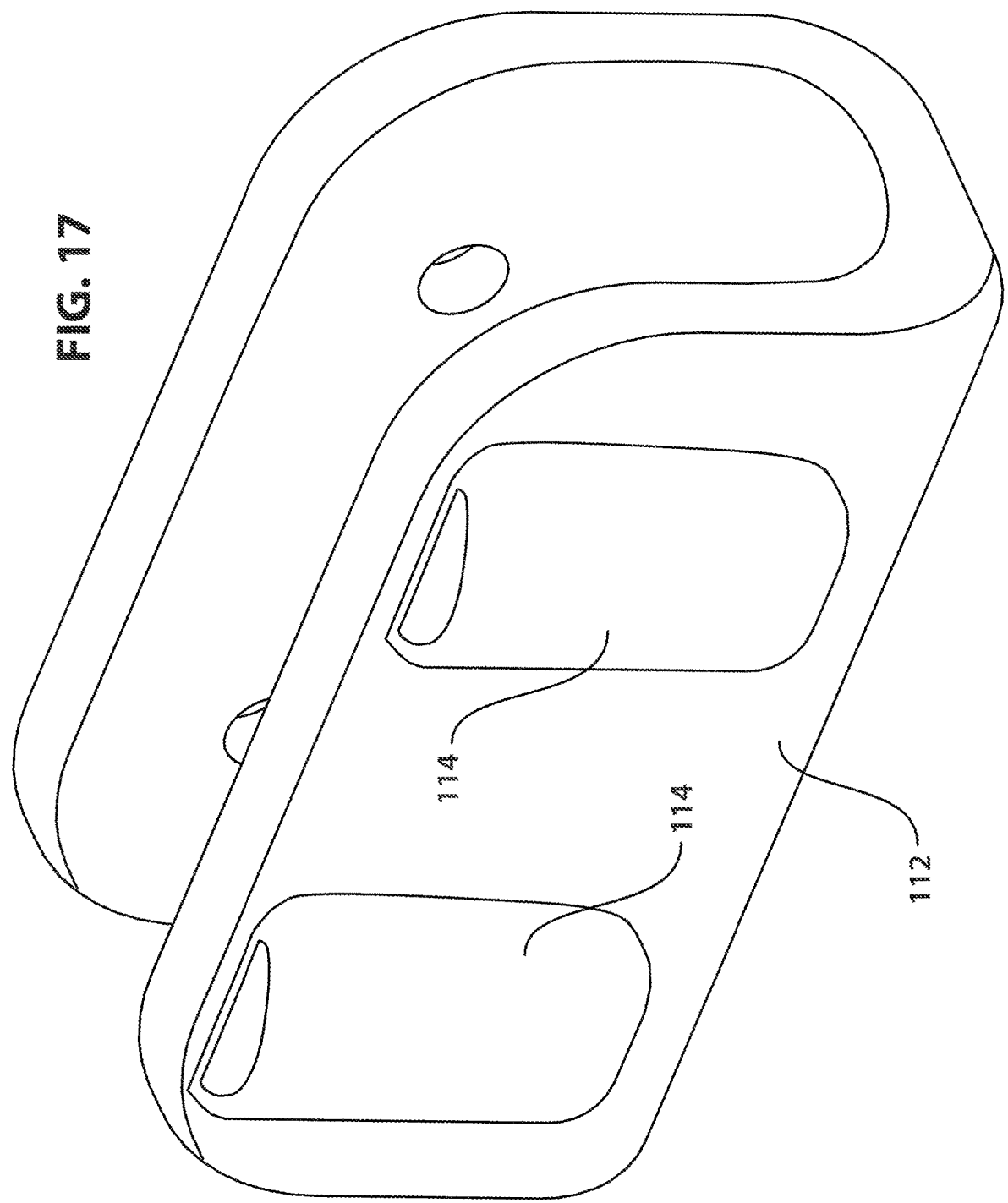
Figure 18:
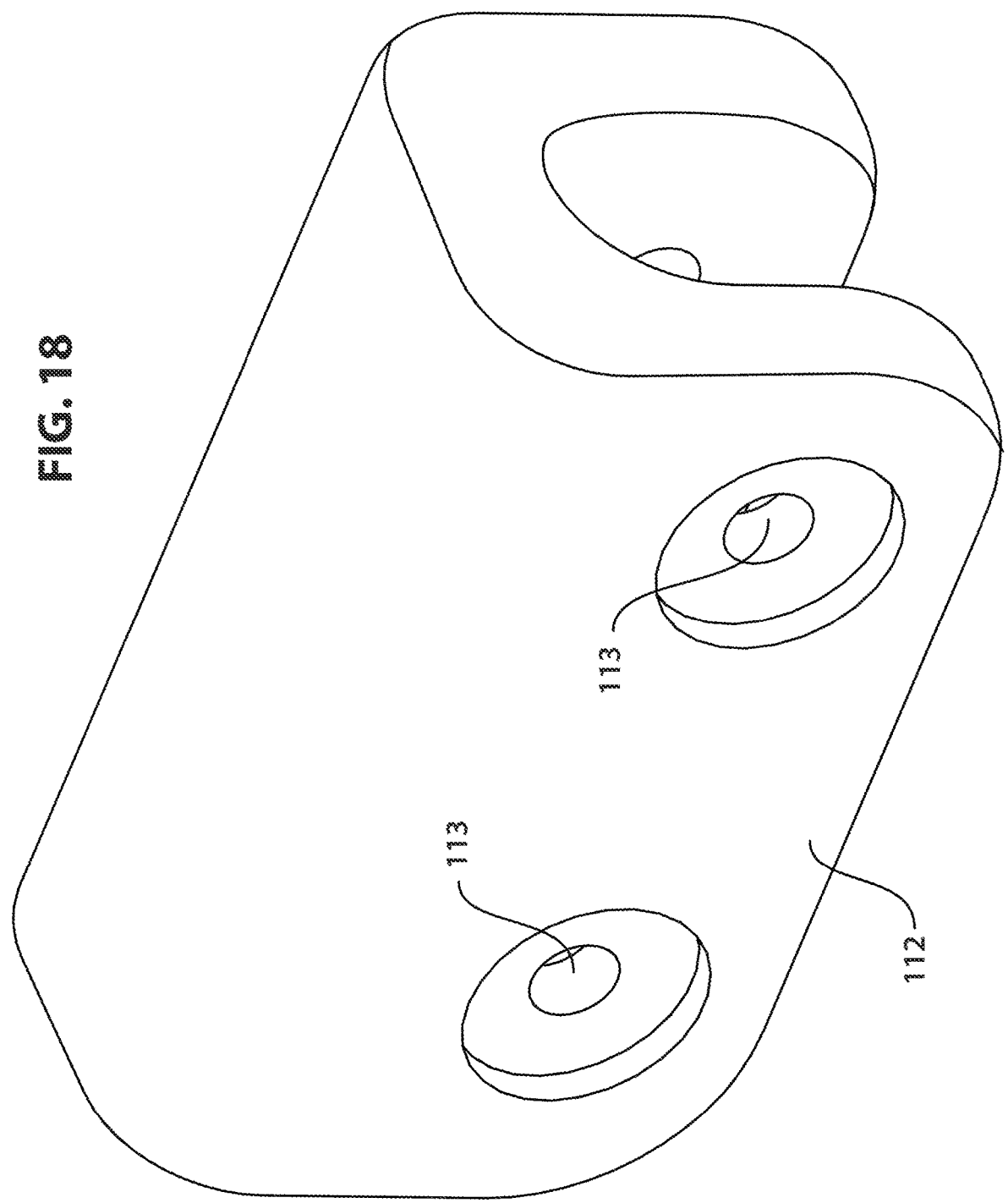
Figure 19:
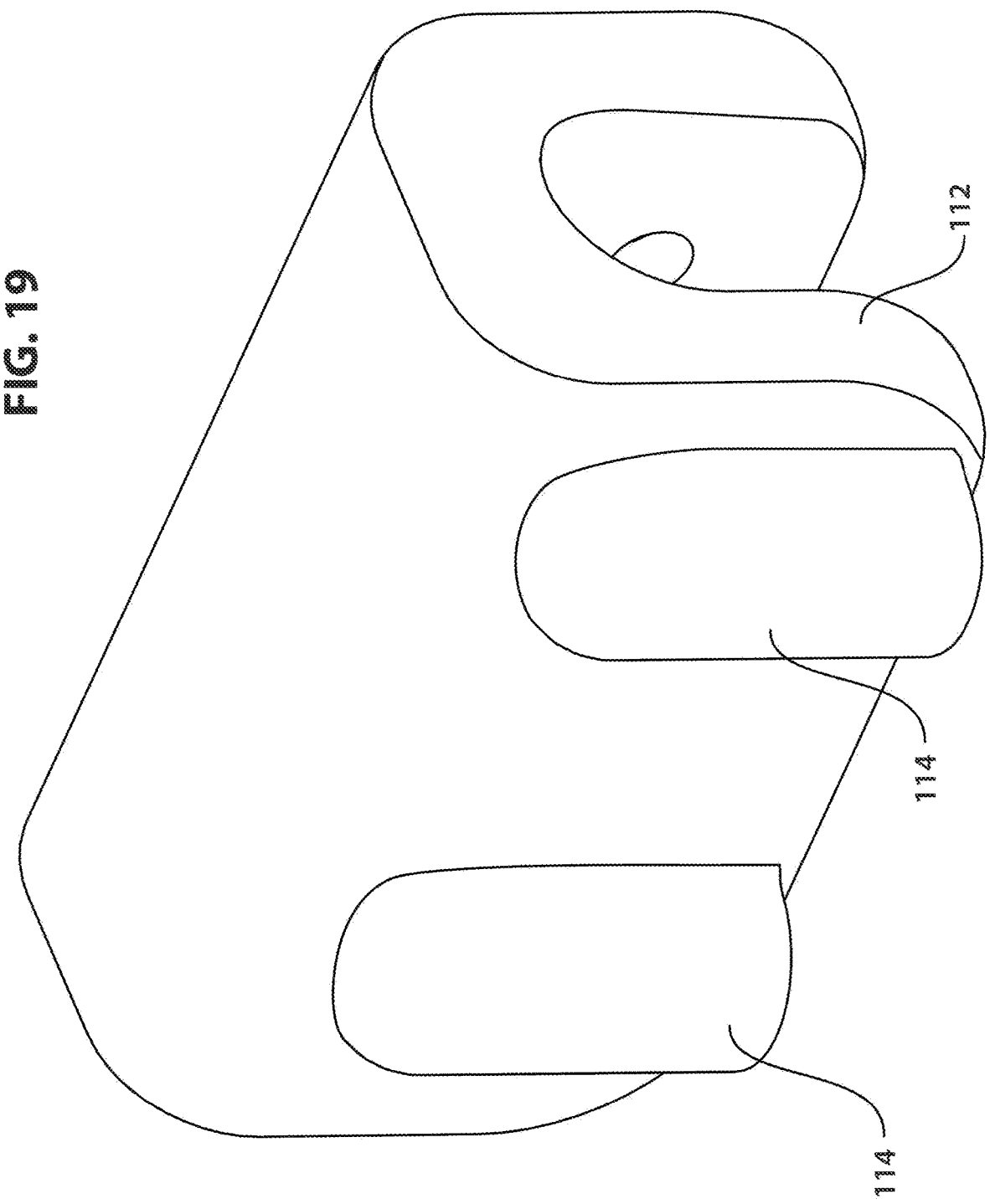
Figure 20:
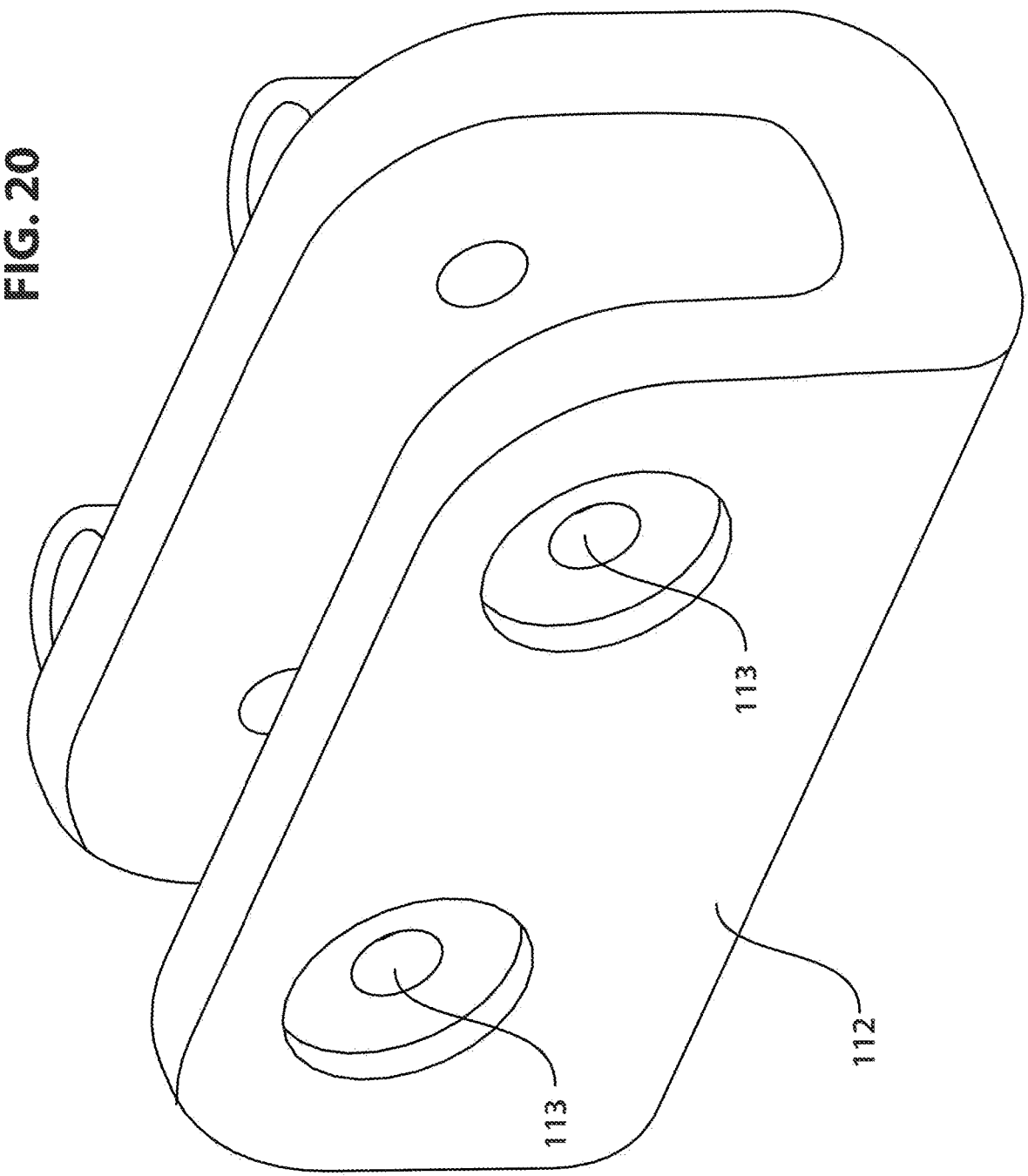
Figure 21:
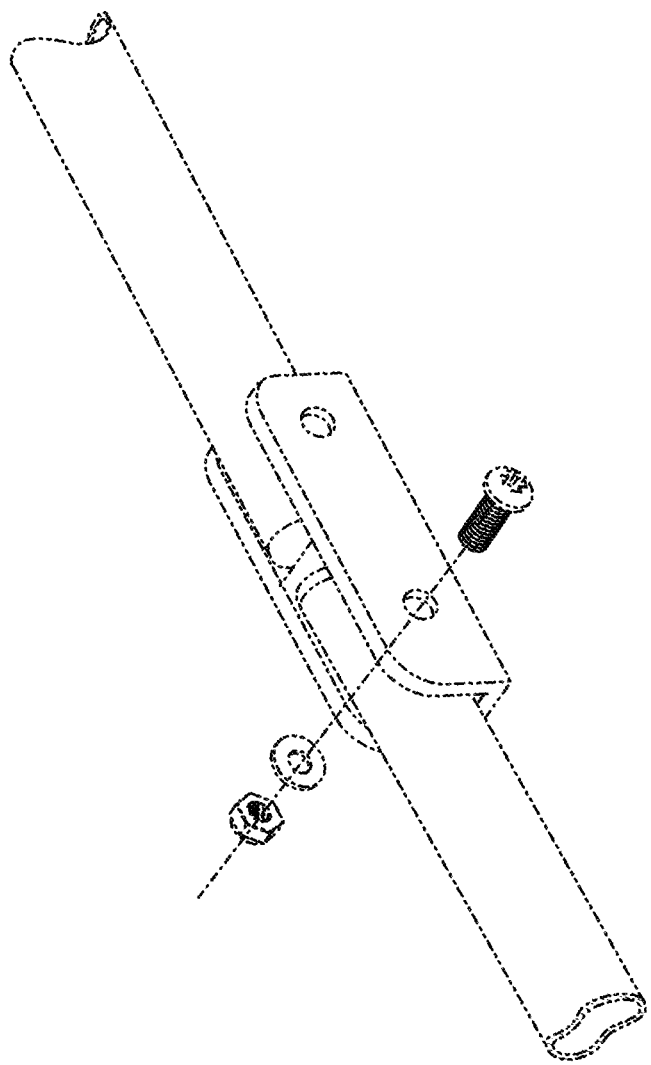
FIG. 21 (Prior Art) illustrates a perspective view of prior art of robot-assembled automatically-making-rivet-tail-flare noise-canceling injury-preventing top-connector system.
Figure 22:
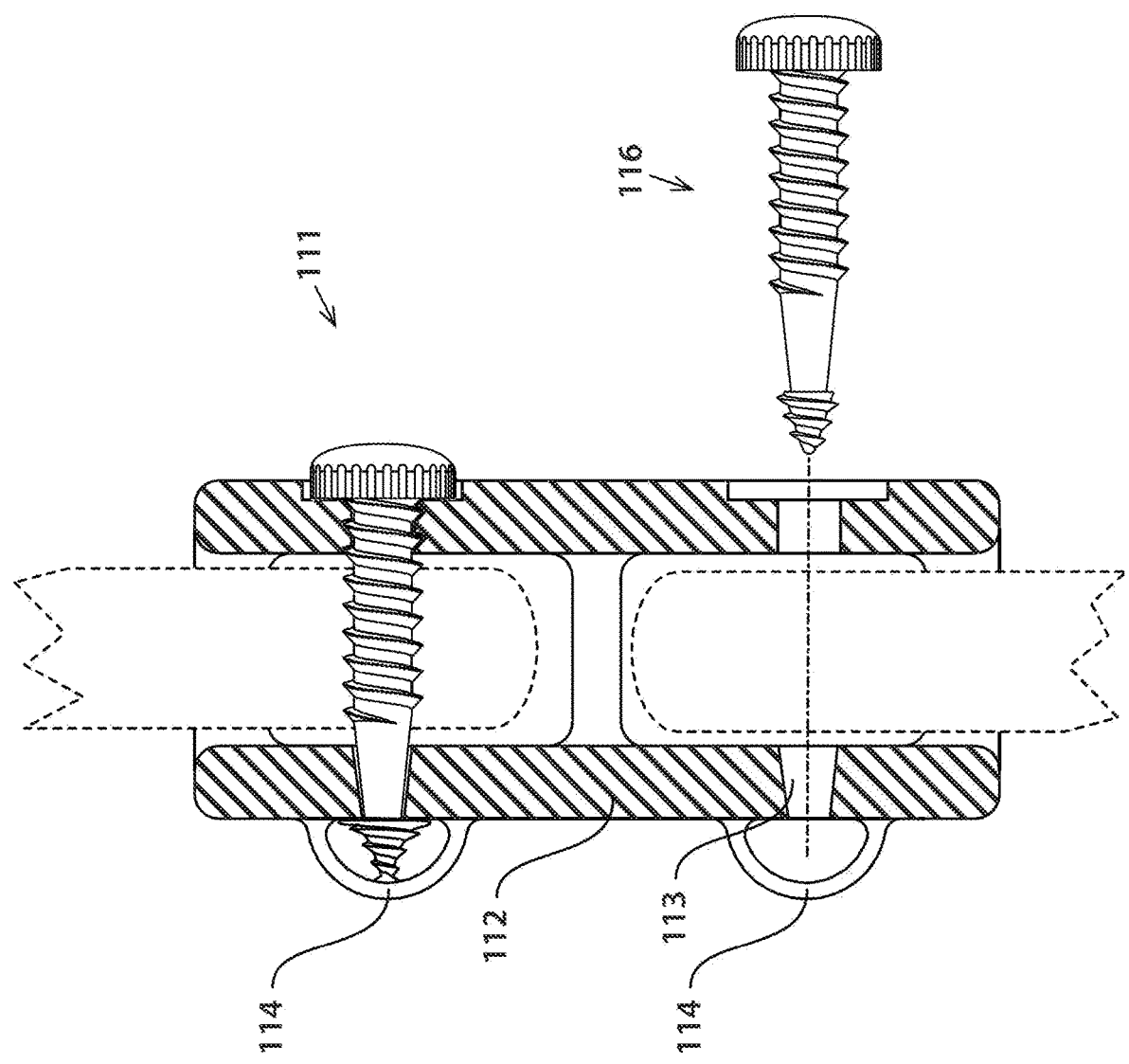
FIG. 22, FIG. 23, FIG. 24, FIG. 25, and FIG. 26 illustrate cross-sectional views of robot-assembled automatically-making-rivet-tail-flare noise-canceling injury-preventing top-connector system demonstrating how robot-assembled heat-expandable cold-contractable anti-wobbling screws are inserted therein.
Figure 23:
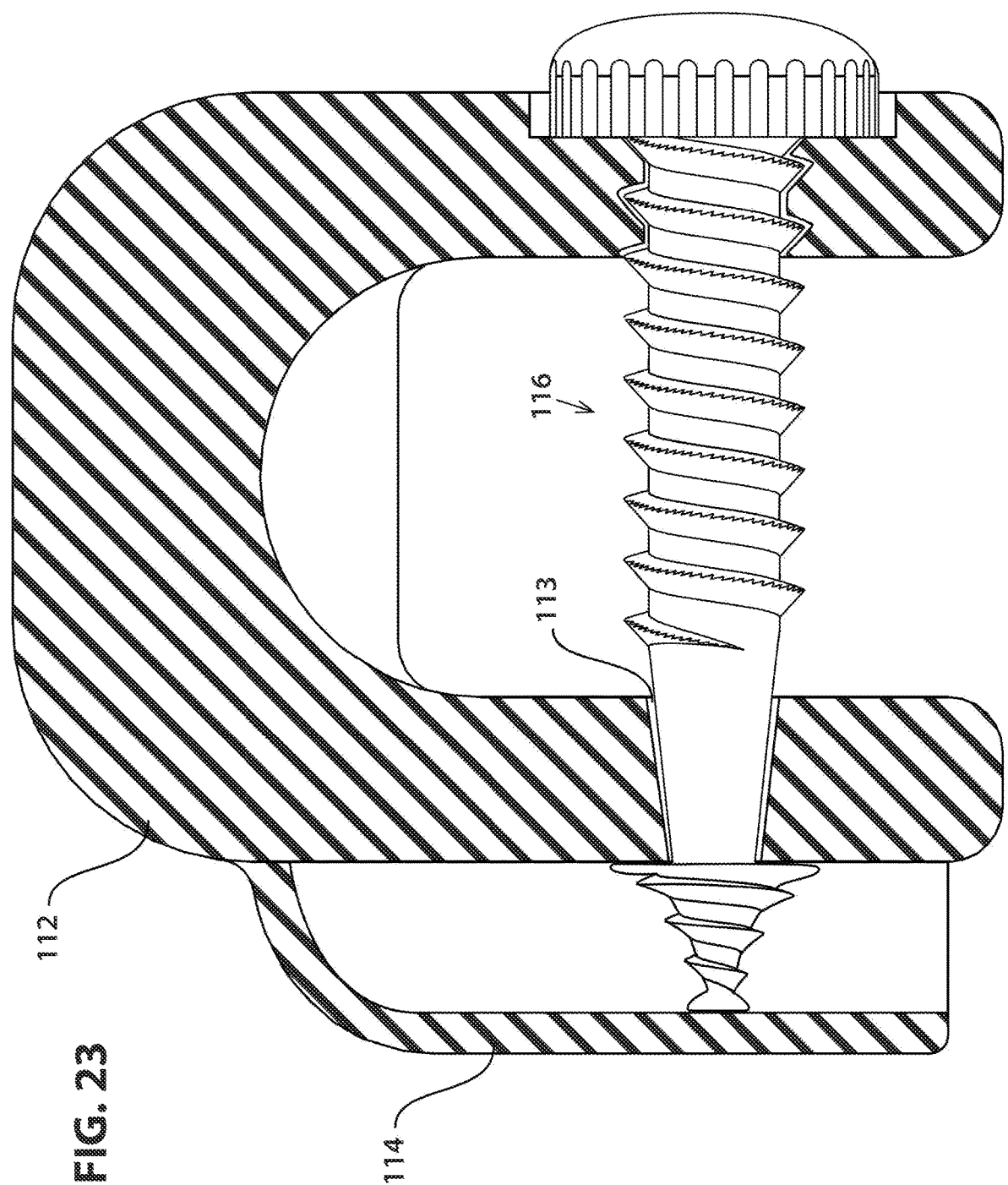
Figure 24:
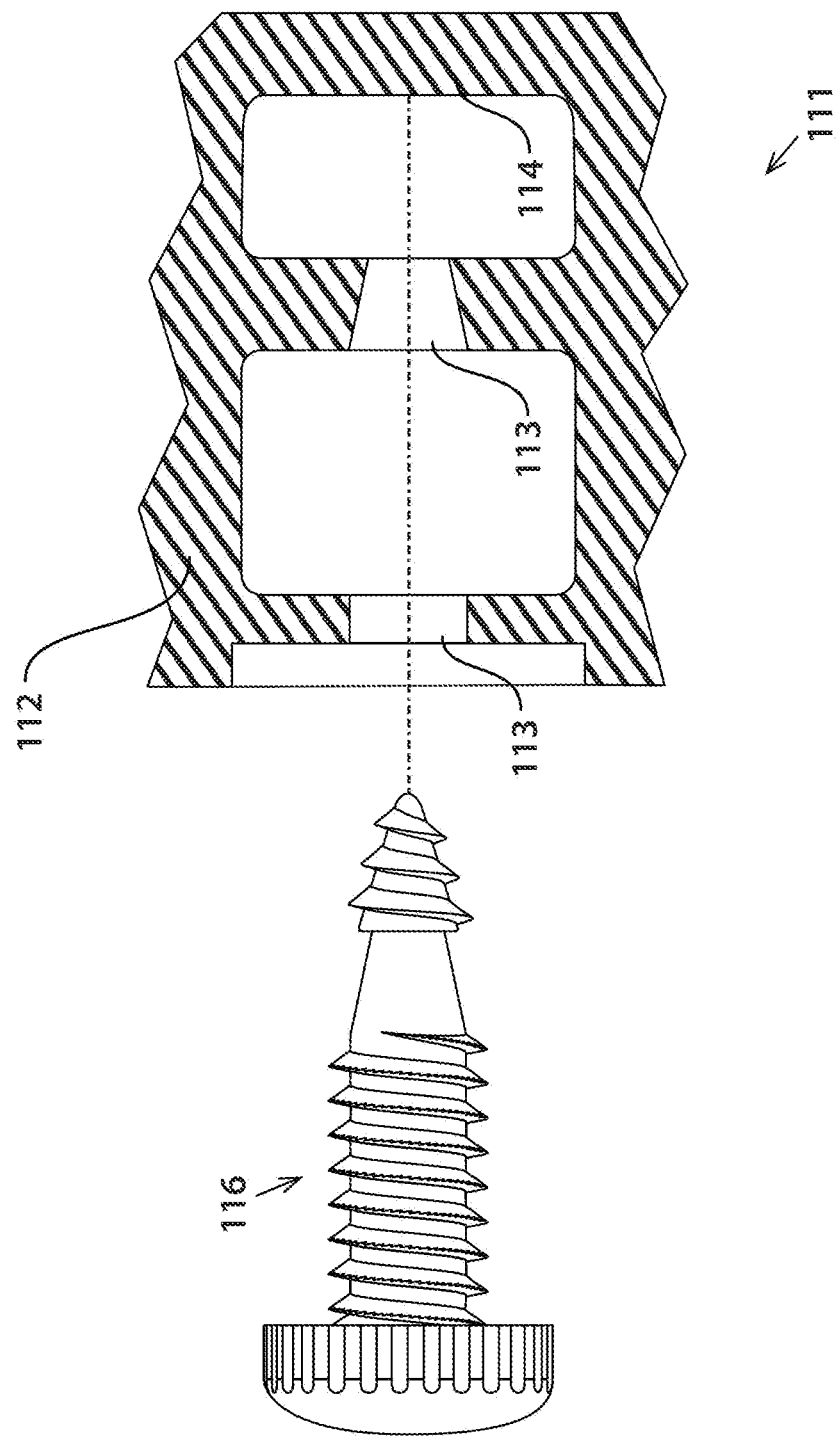
Figure 25:
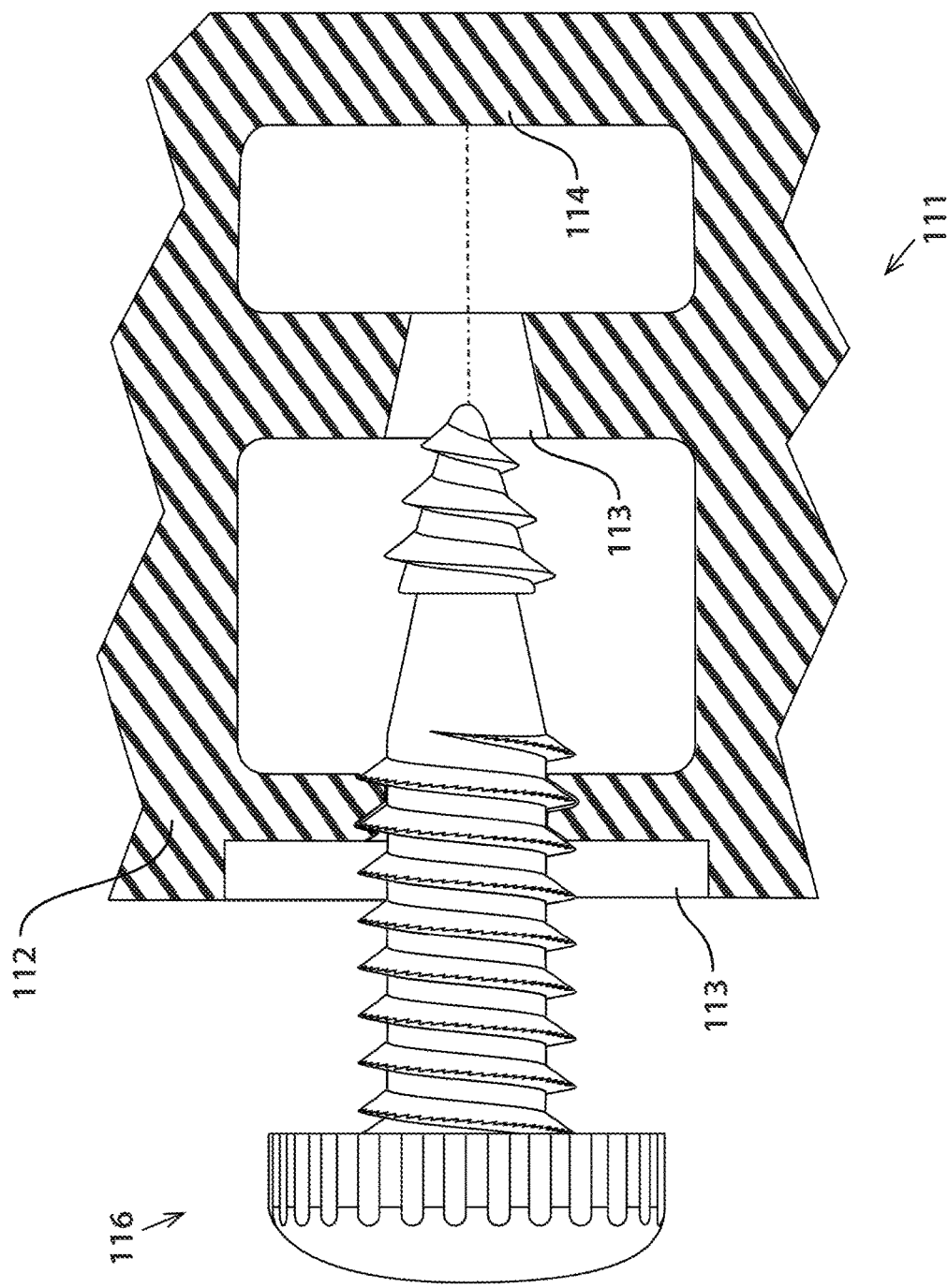
Figure 26:
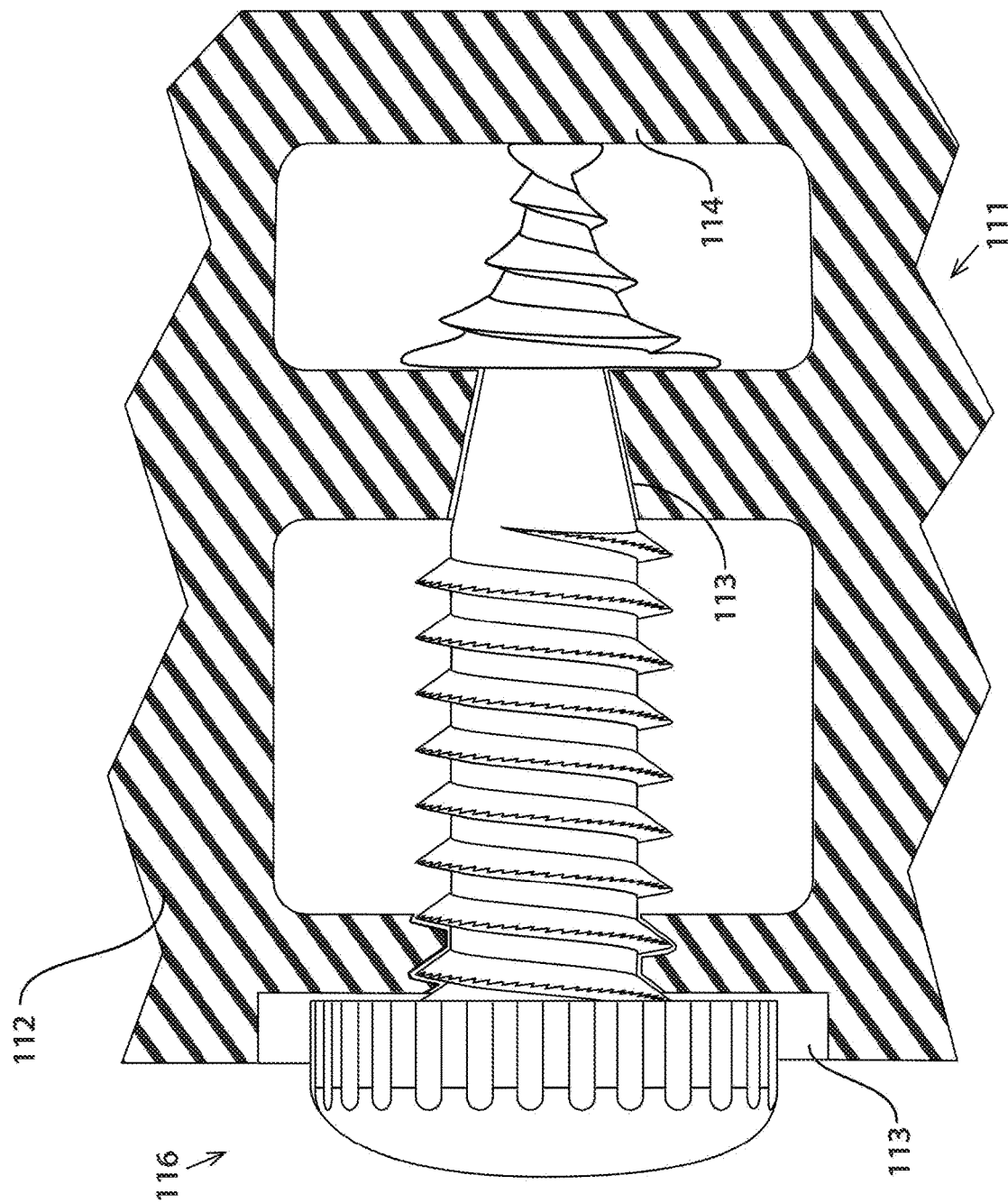
Figure 27:
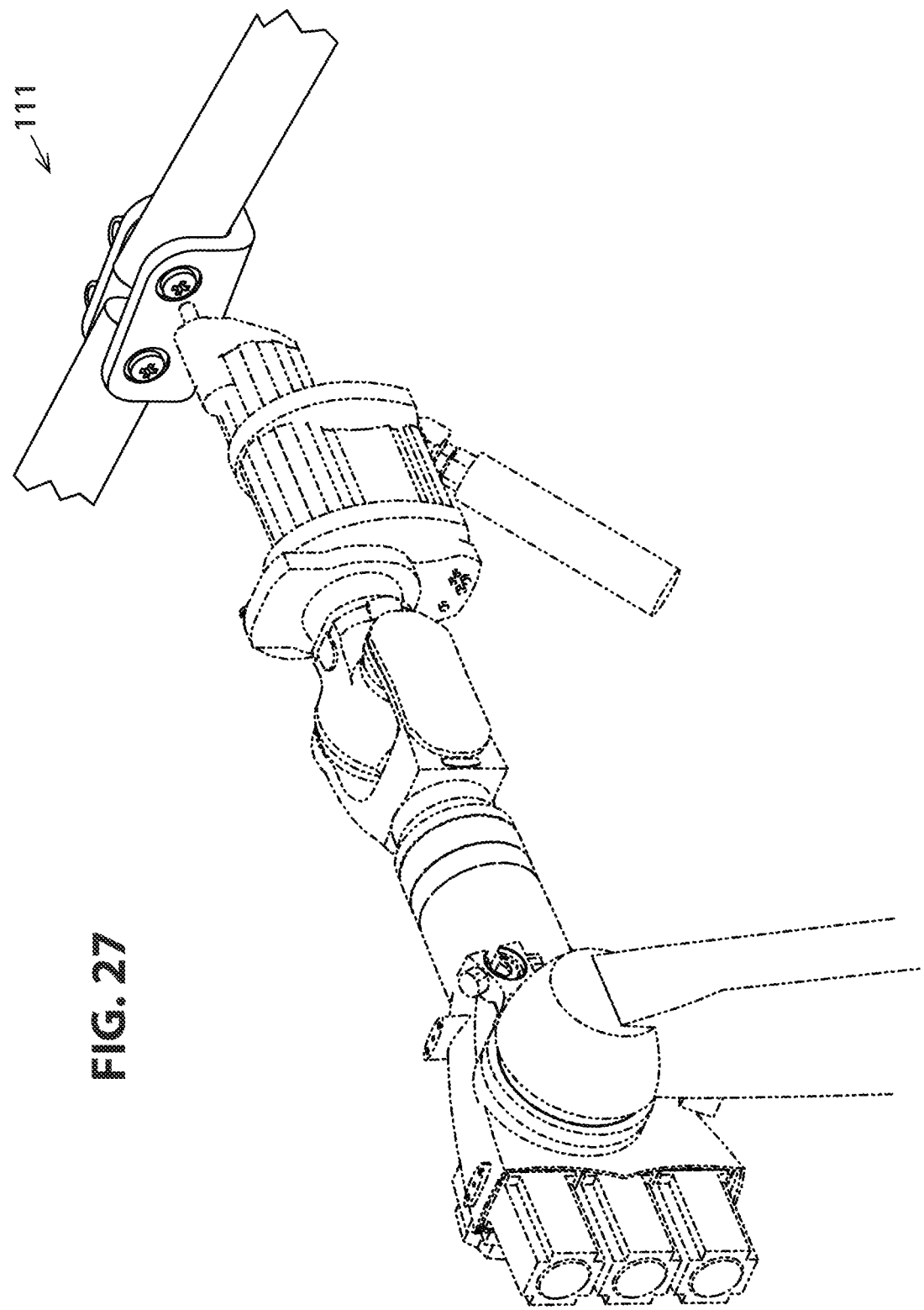
FIG. 27 illustrates a perspective view of how robot-assembled automatically-making-rivet-tail-flare noise-canceling injury-preventing top-connector system is robotically manufactured.
Figure 28:
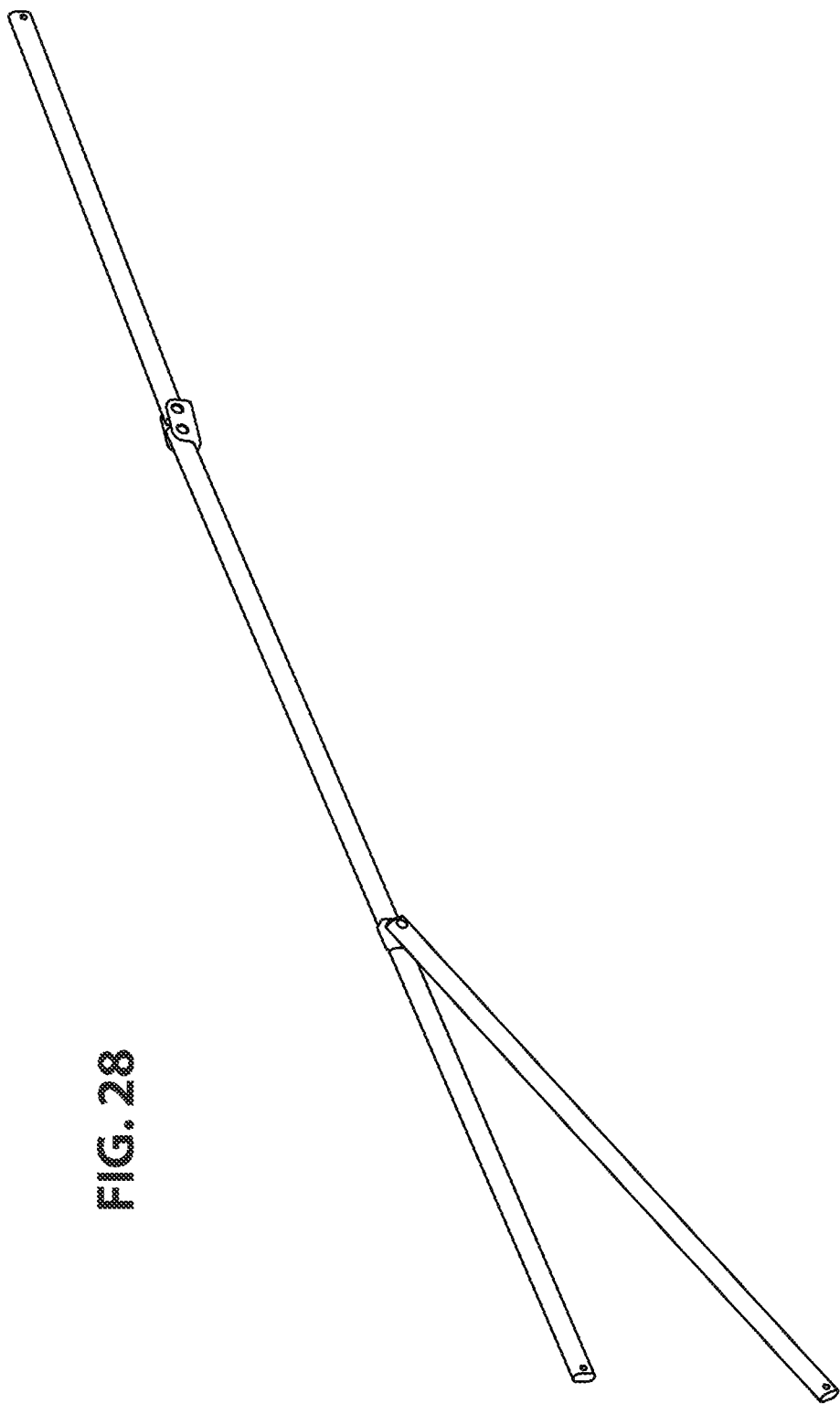
FIG. 28, FIG. 29, and FIG. 30 illustrate perspective views of dog-run-adaptable anti-wobbling foldable corner trusses 104.
Figure 29:
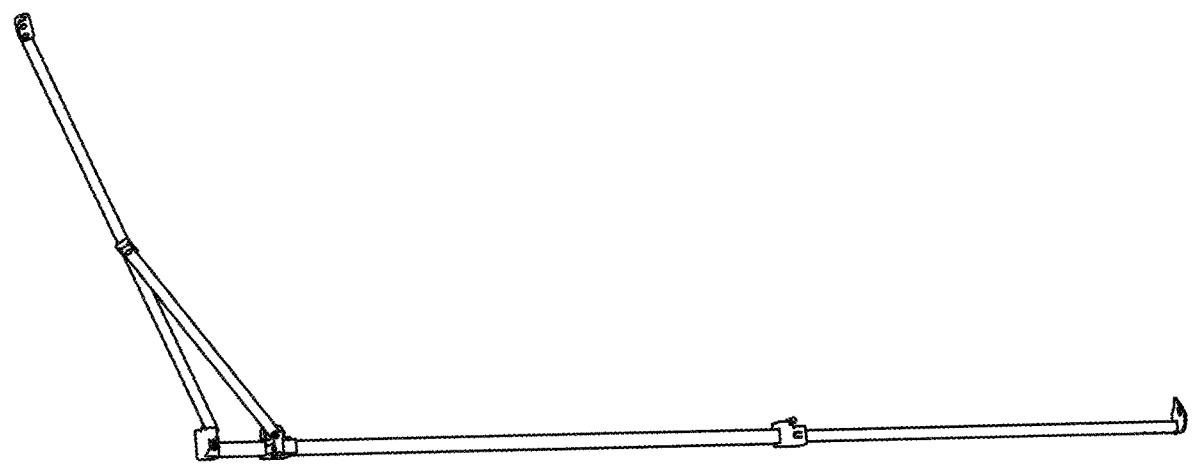
Figure 30:
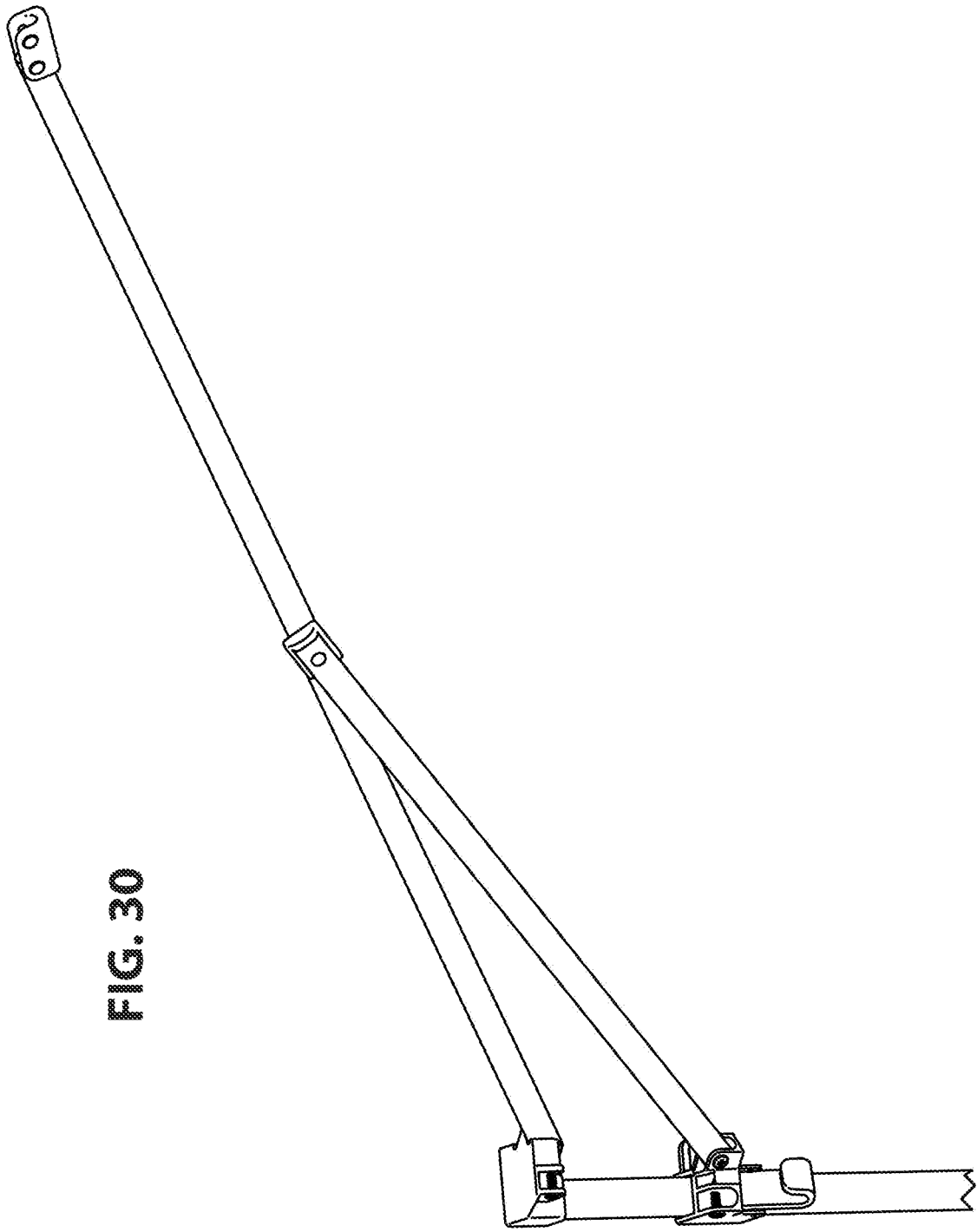
Figure 31:
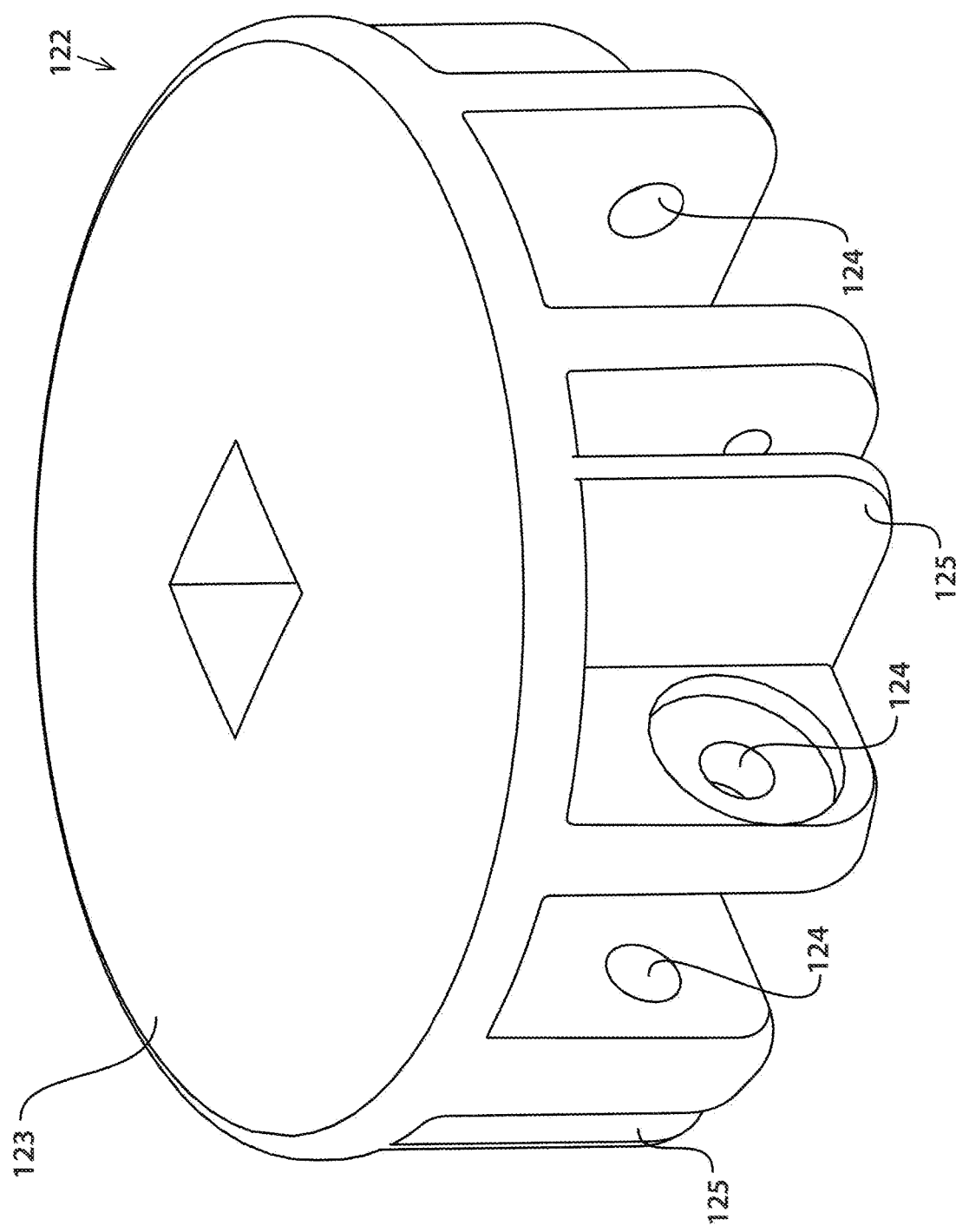
FIG. 31, FIG. 32, FIG. 33, FIG. 34, FIG. 35, FIG. 36, and FIG. 37 illustrate perspective views of robot-assembled injury-preventing cone-shielding central intersector system.
Figure 32:
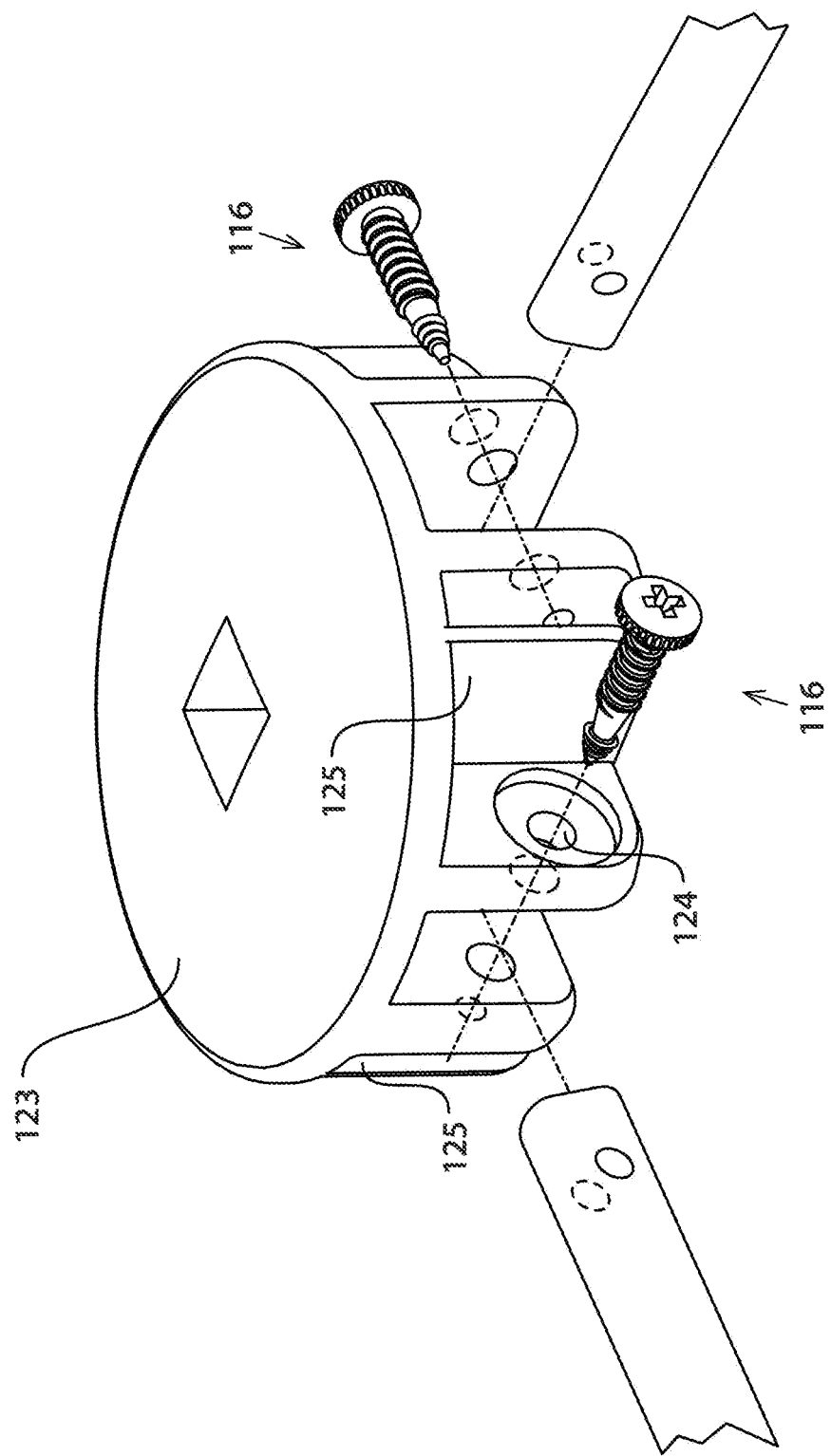
Figure 33:
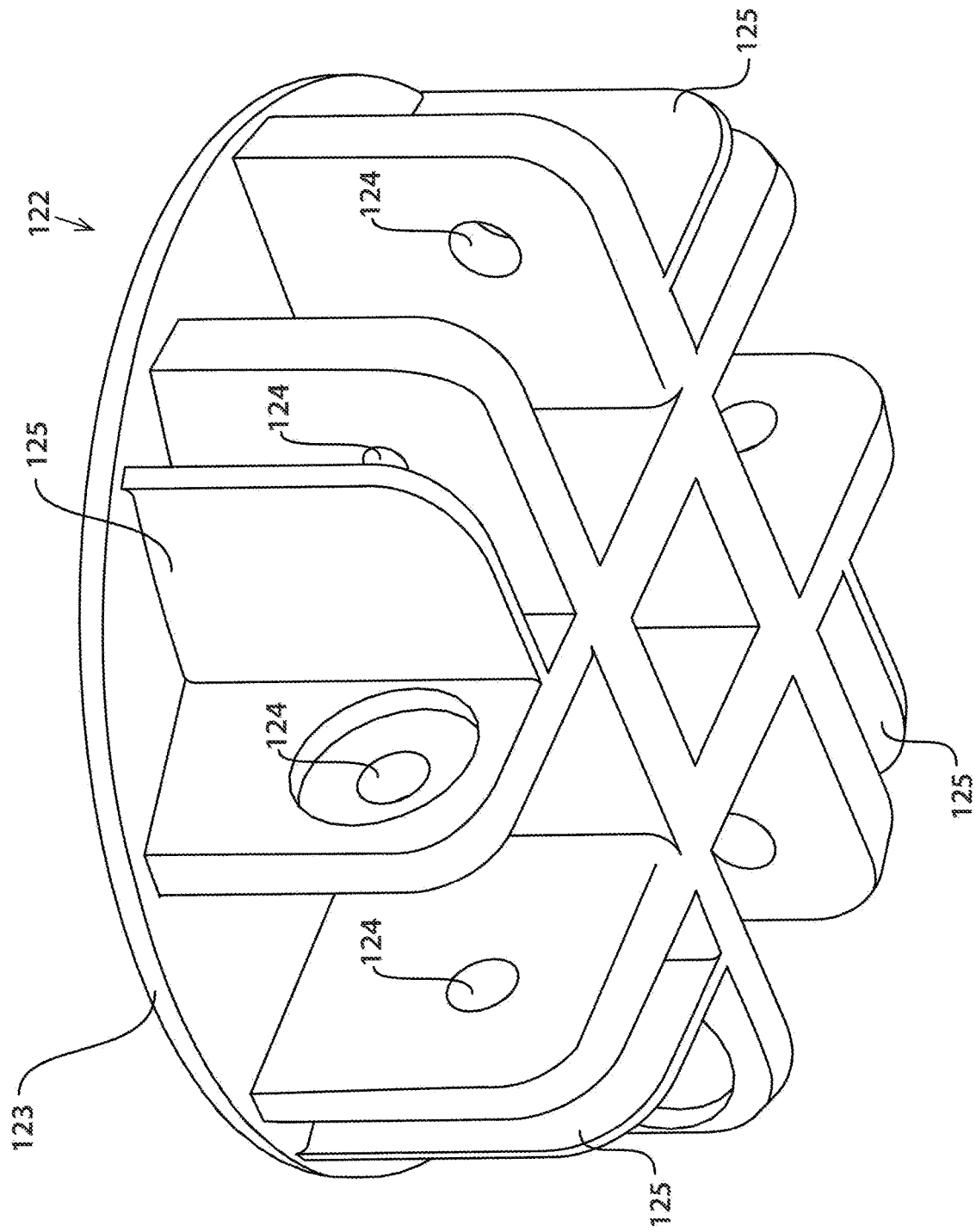
Figure 34:
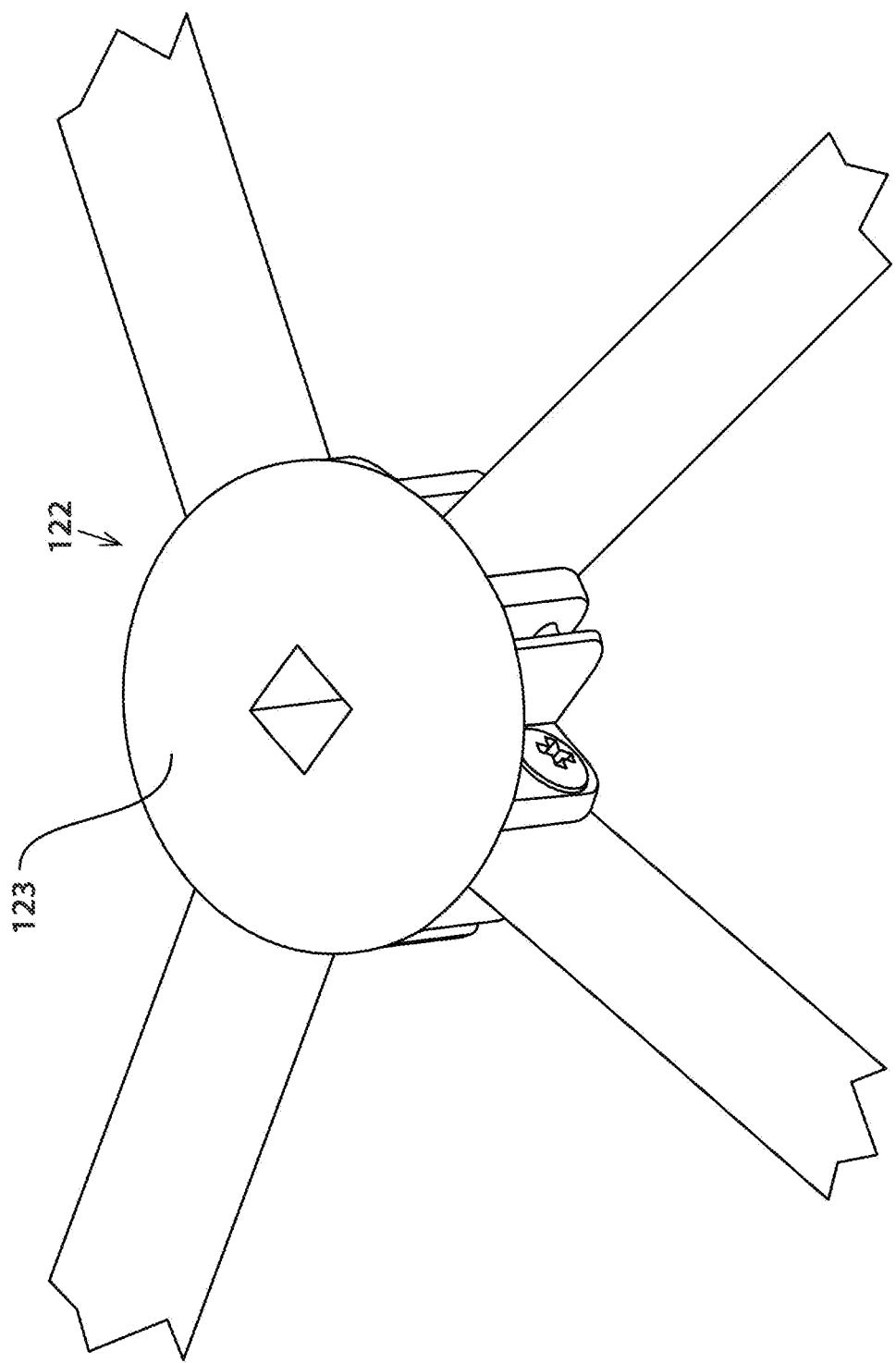
Figure 35:
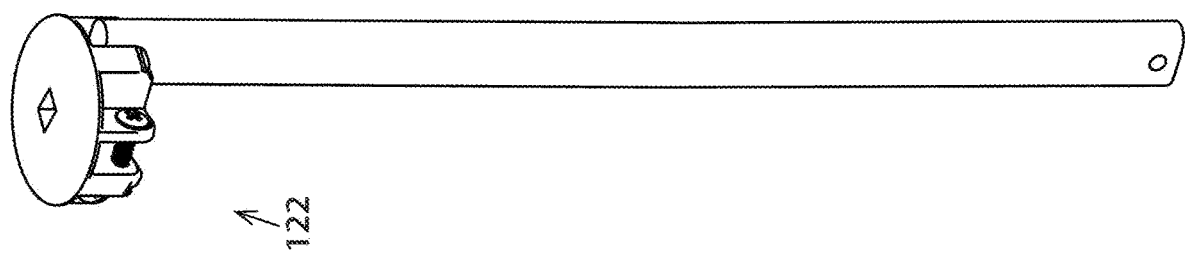
Figure 36:
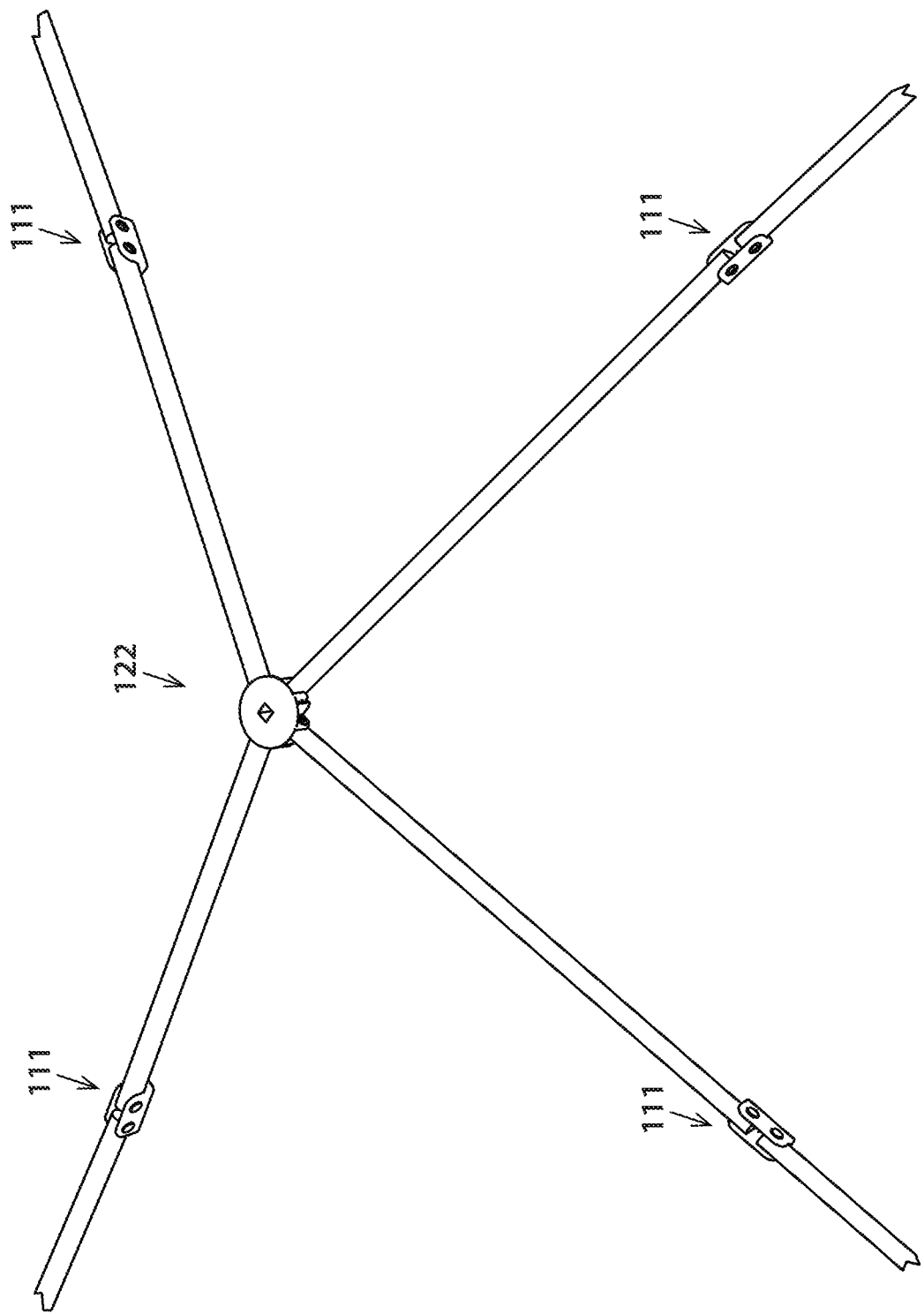
Figure 37:
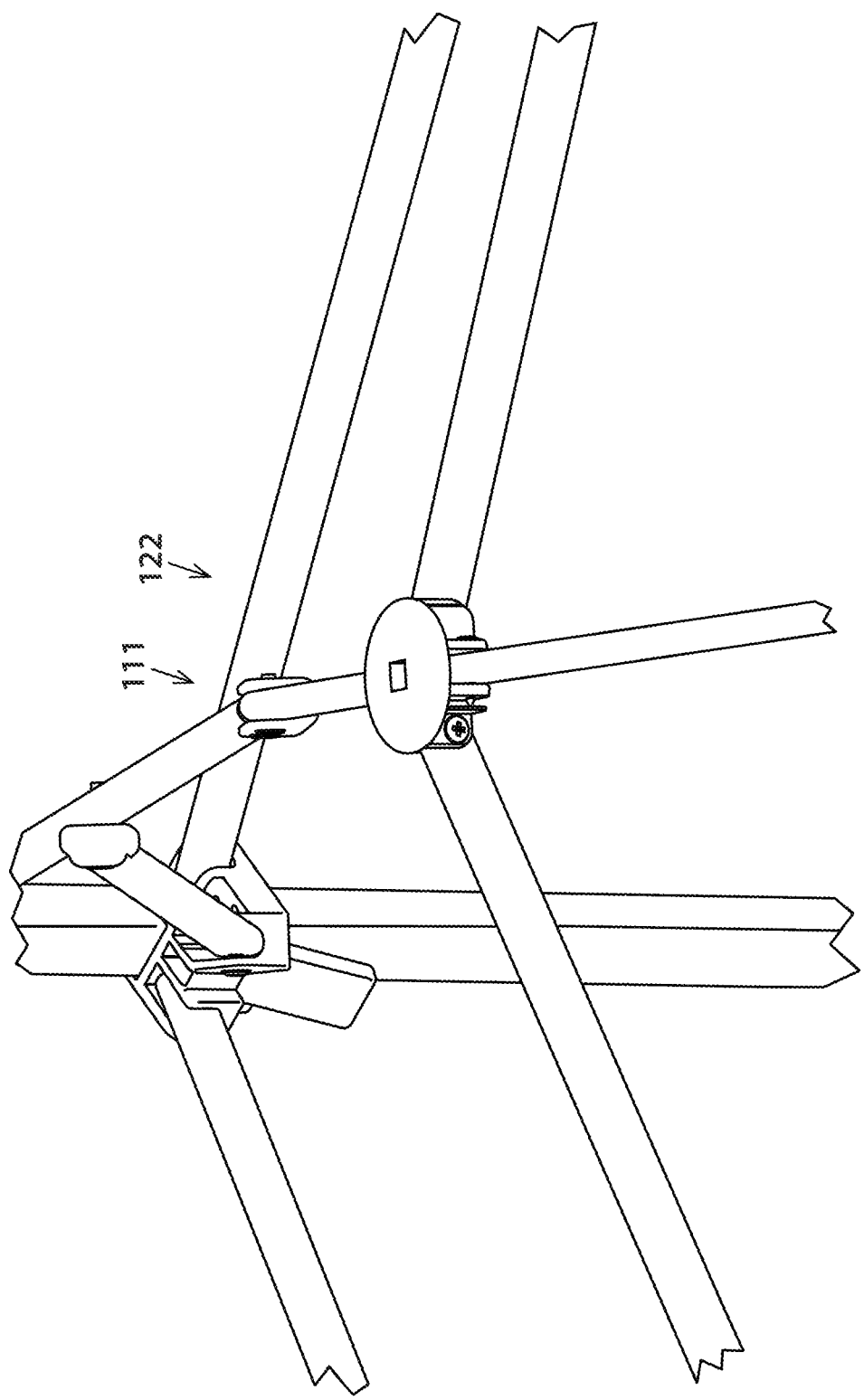
Figure 38:
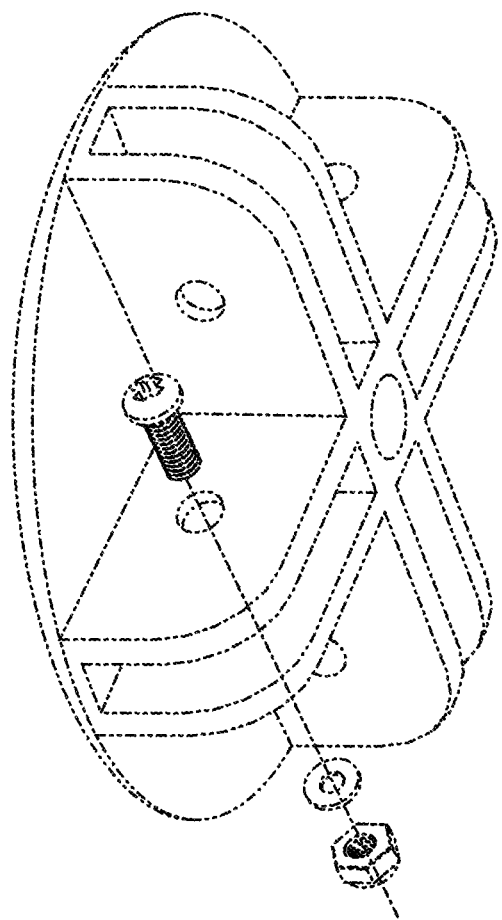
FIG. 38 (Prior Art) illustrates a perspective view of prior art of robot-assembled injury-preventing cone-shielding central intersector system.
Figure 39:
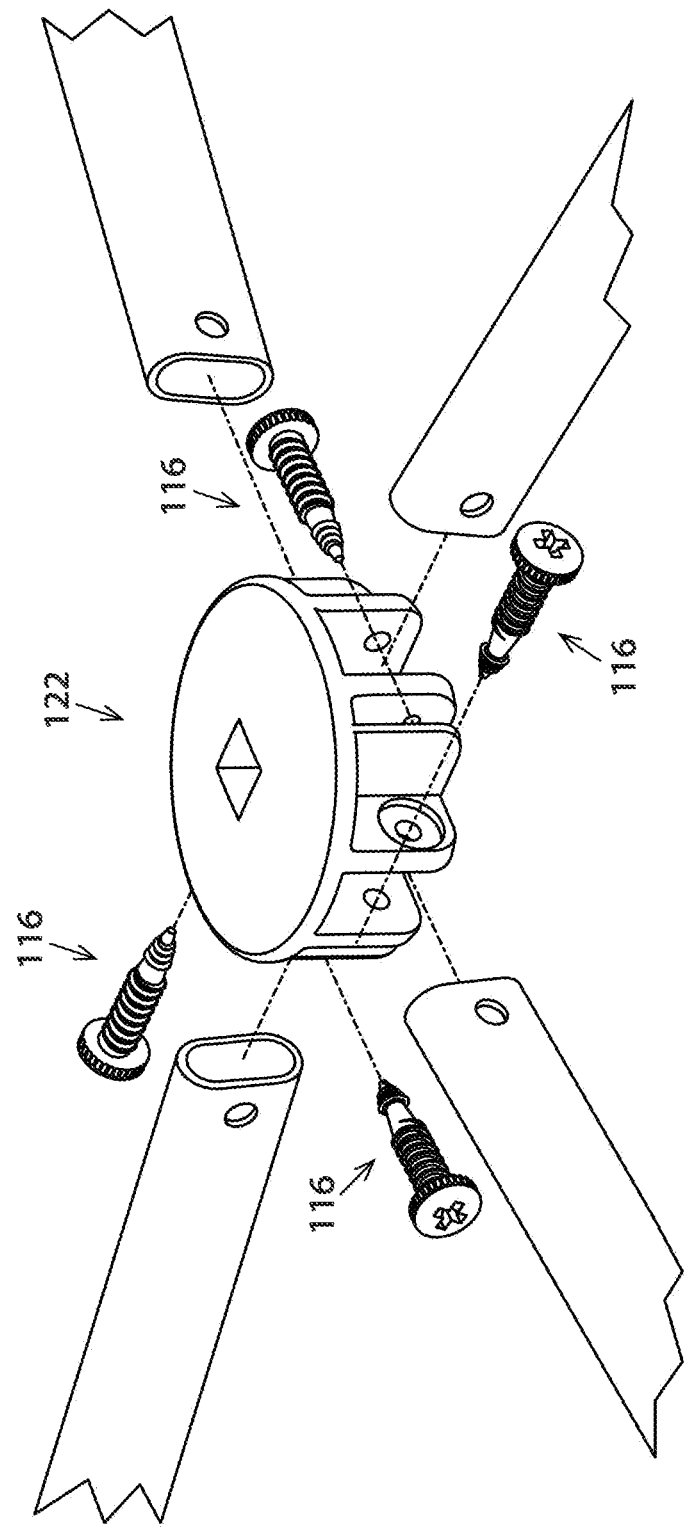
FIG. 39 illustrates a perspective view of robot-assembled injury-preventing cone-shielding central intersector system 122 demonstrating how robot-assembled heat-expandable cold-contractable anti-wobbling screws are inserted therein.
Figure 40:
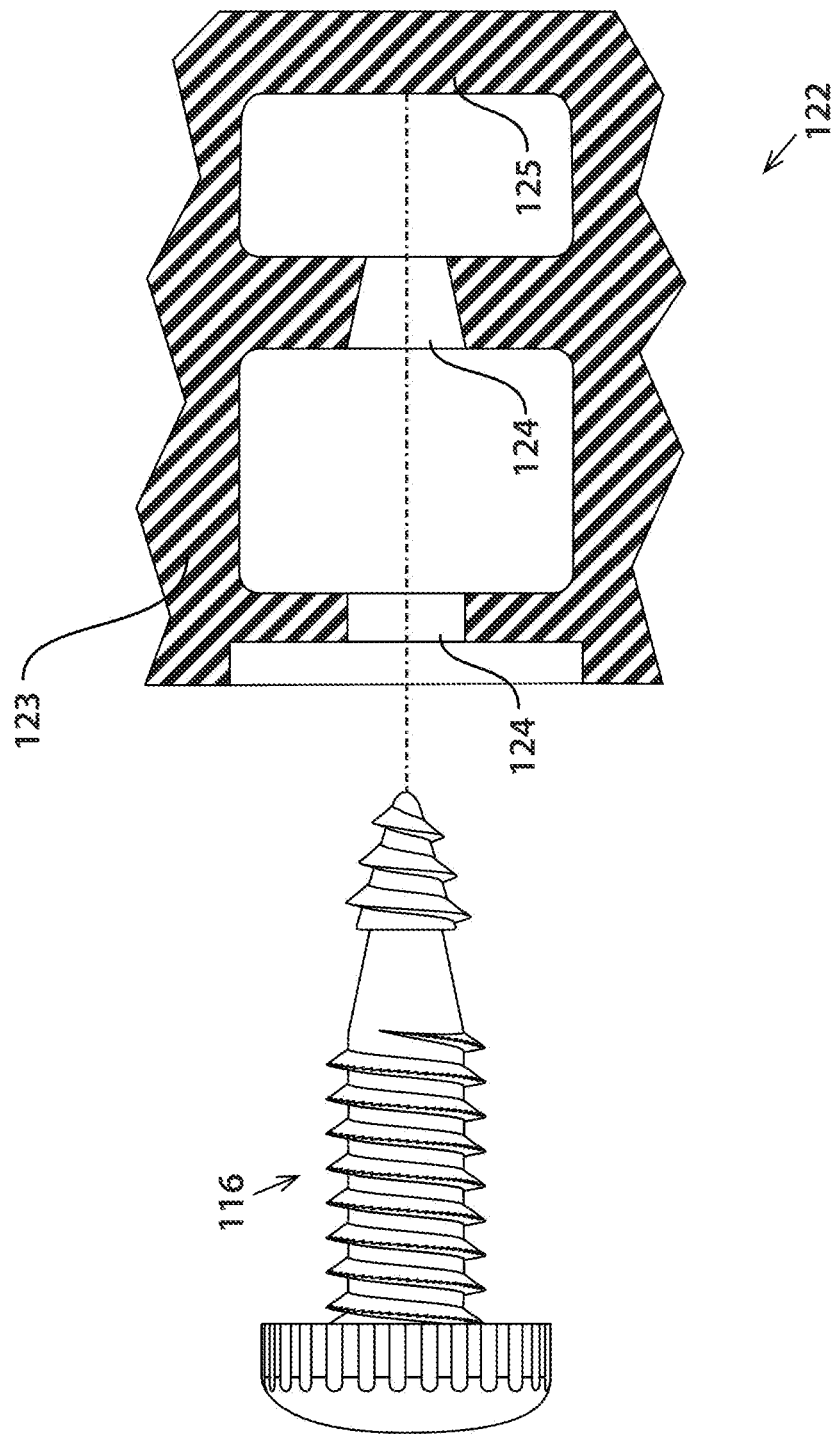
FIG. 40, FIG. 41, and FIG. 42 illustrate cross-sectional views of robot-assembled injury-preventing cone-shielding central intersector system demonstrating how robot-assembled heat-expandable cold-contractable anti-wobbling screws are inserted therein.
Figure 41:
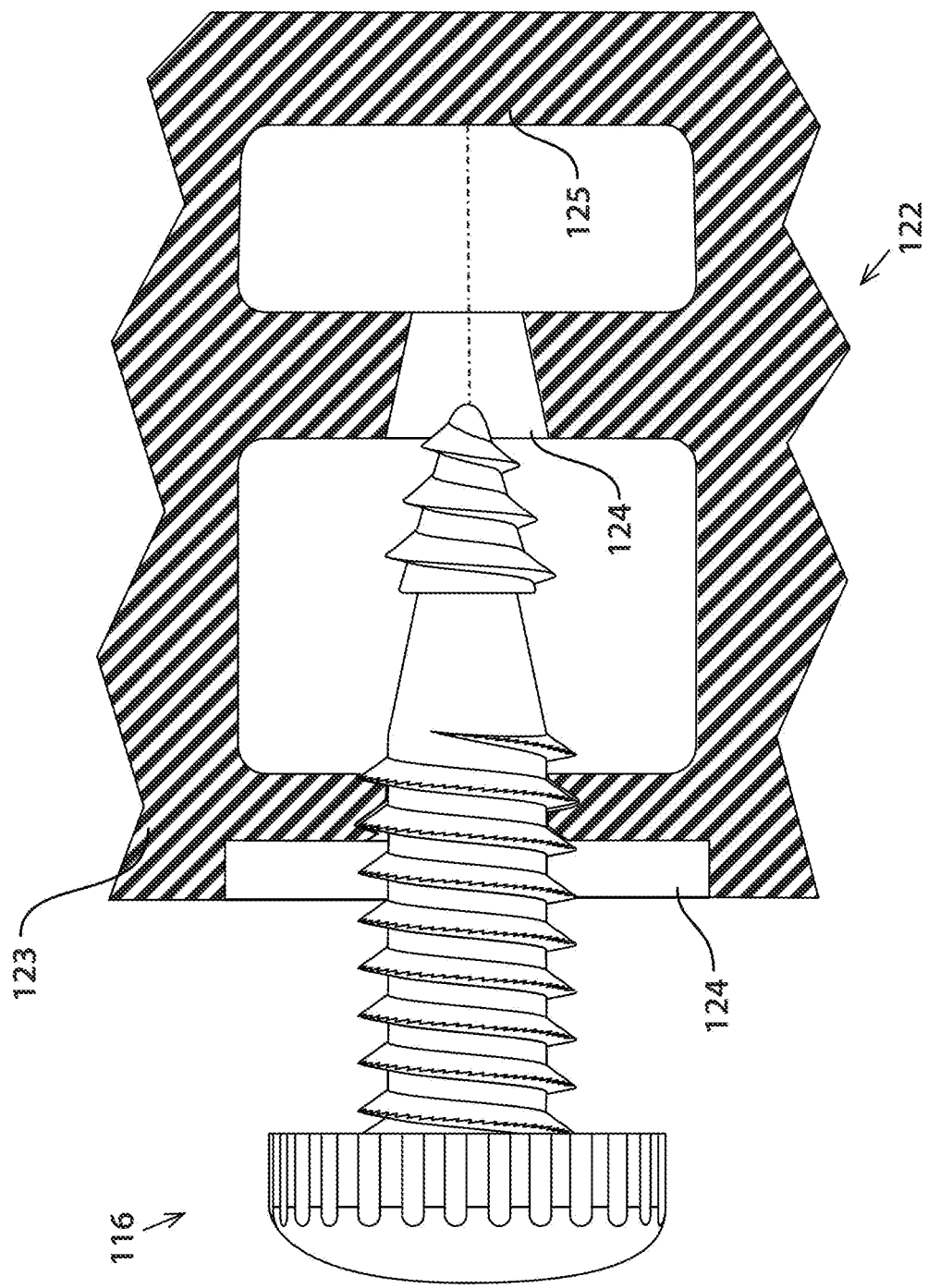
Figure 42:
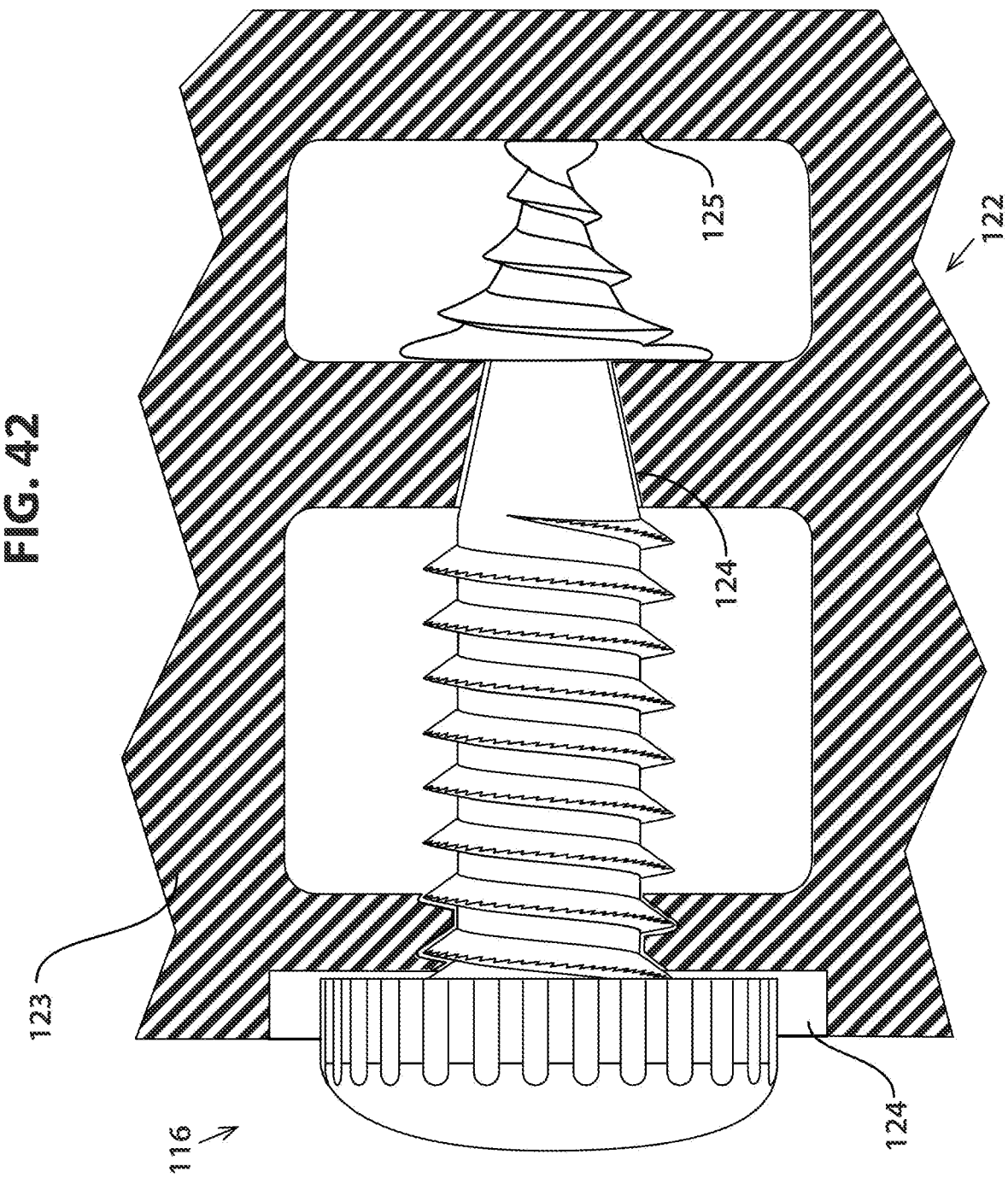
Figure 43:
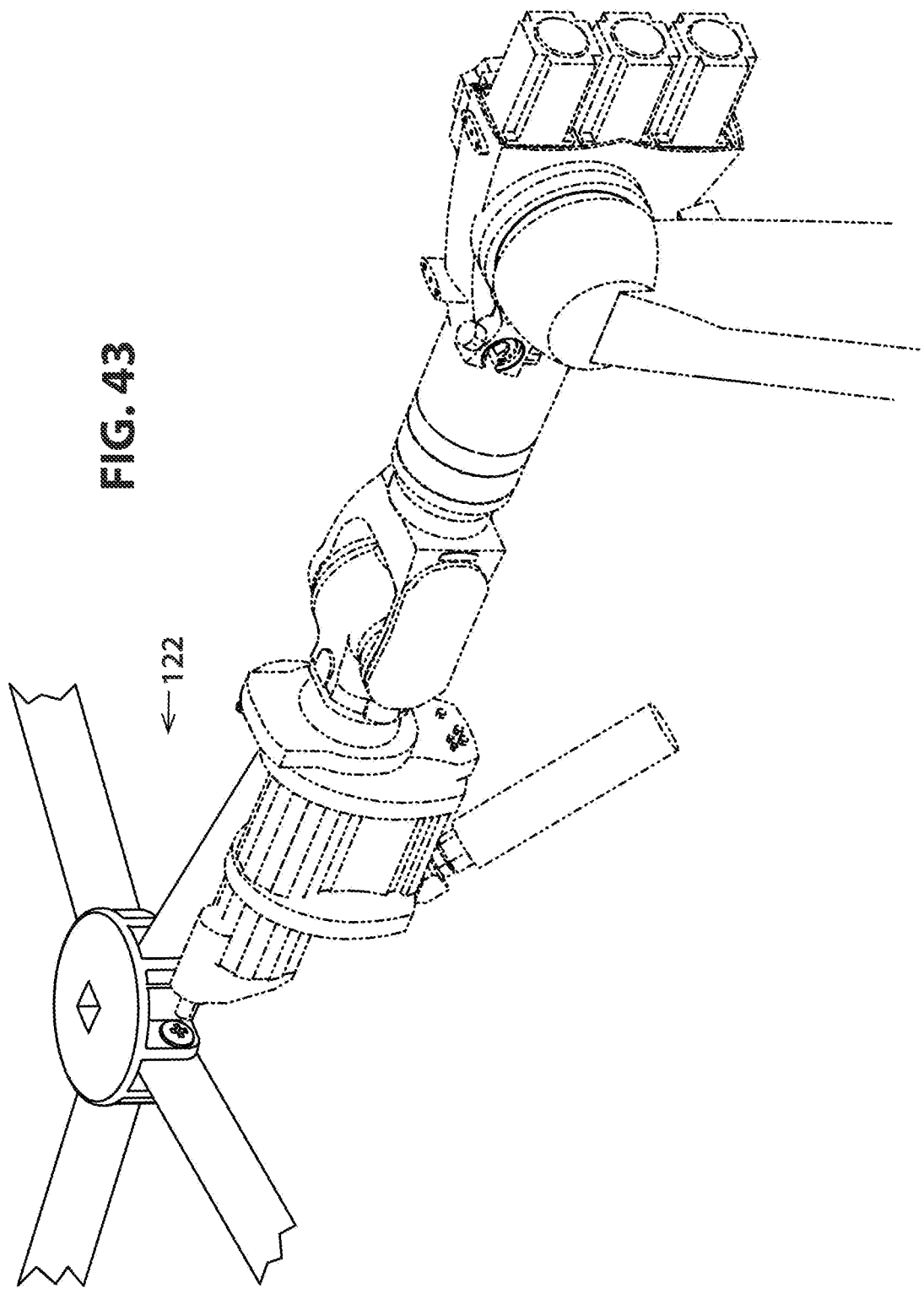
FIG. 43 illustrates a perspective view of how robot-assembled injury-preventing cone-shielding central intersector system is robotically manufactured.
Figure 44:
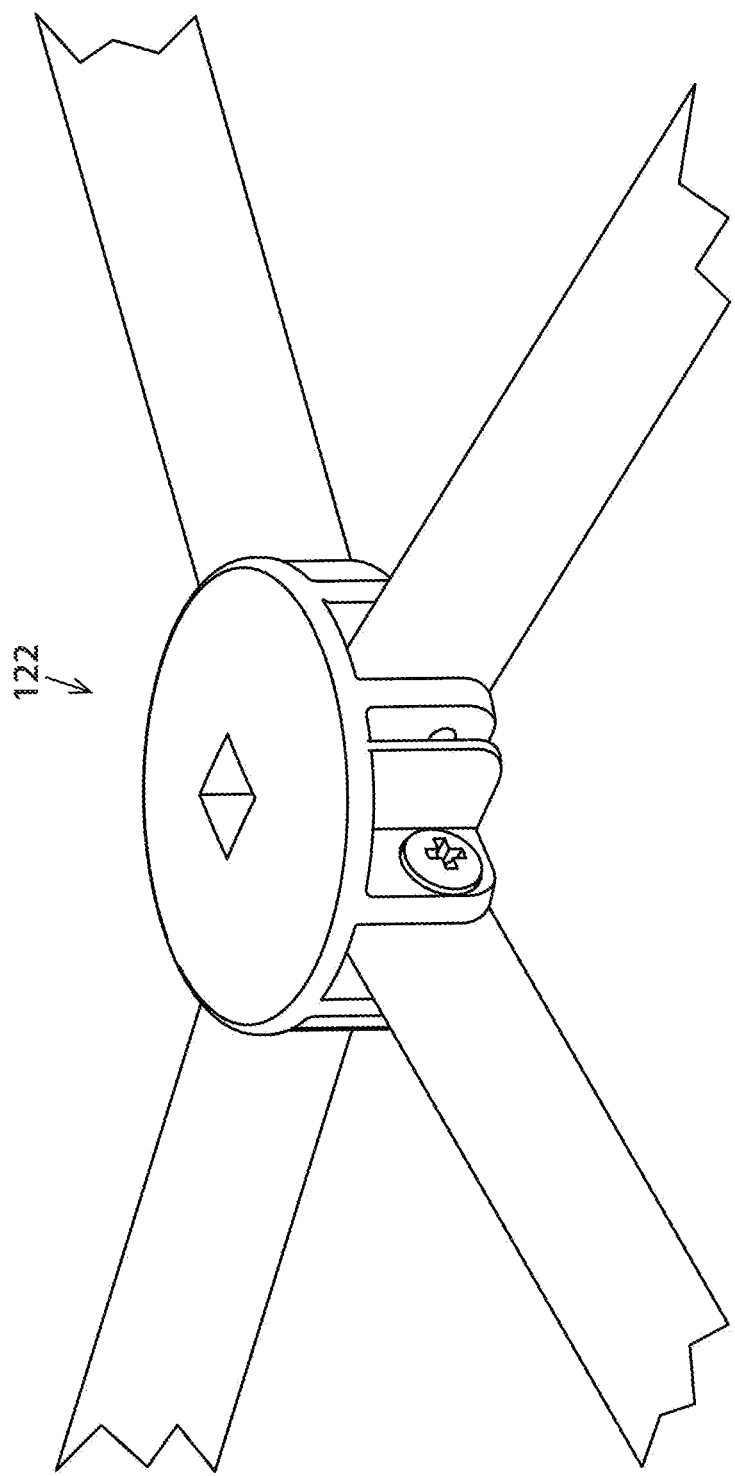
FIG. 44, and FIG. 45 illustrate perspective views of robot-assembled injury-preventing cone-shielding central intersector system.
Figure 45:
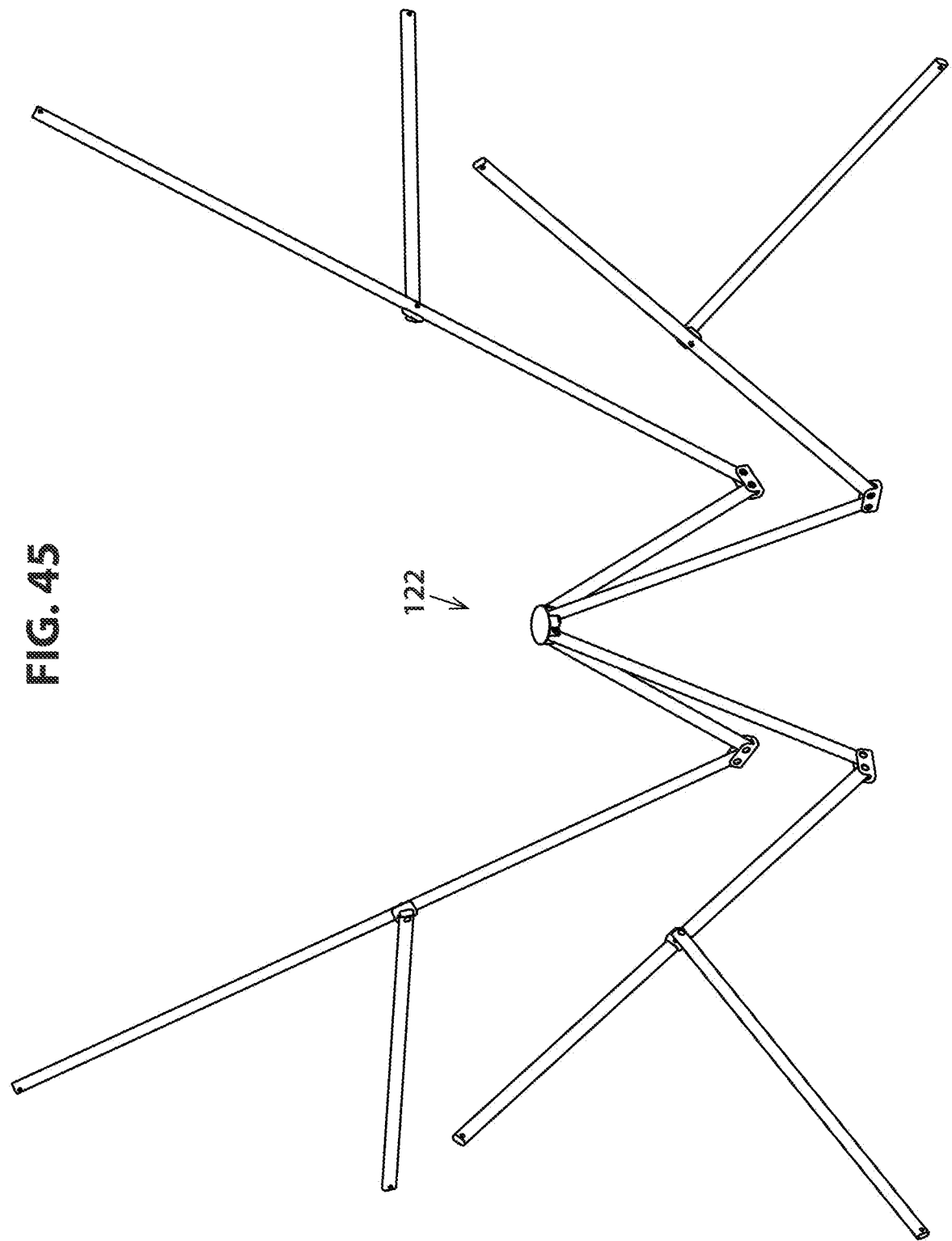
Figure 46:
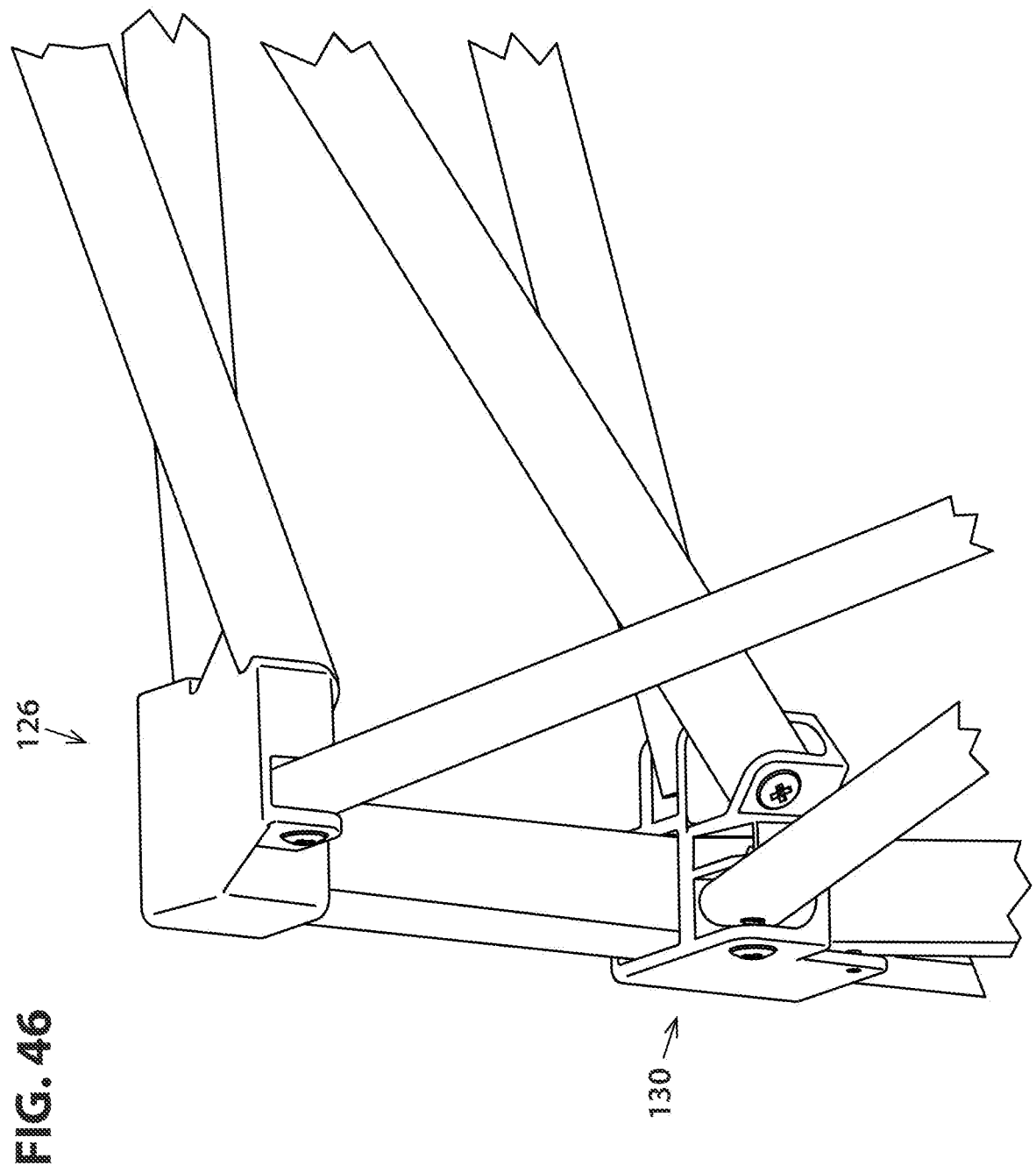
FIG. 46, FIG. 47, FIG. 48, FIG. 49, FIG. 50, and FIG. 51 illustrate perspective views of robot-assembled injury-preventing cone-shielding upper intersector system.
Figure 47:
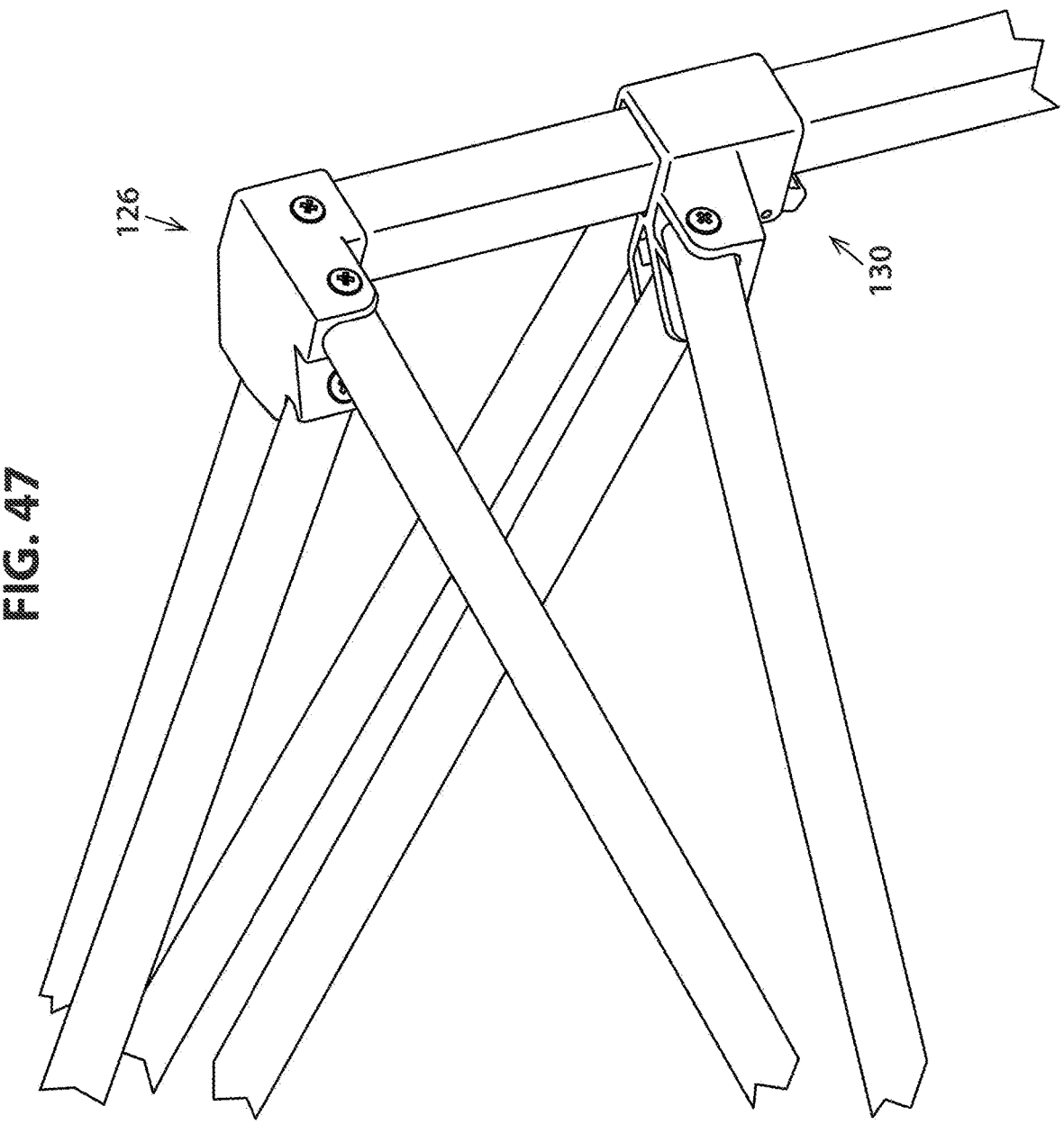
Figure 48:
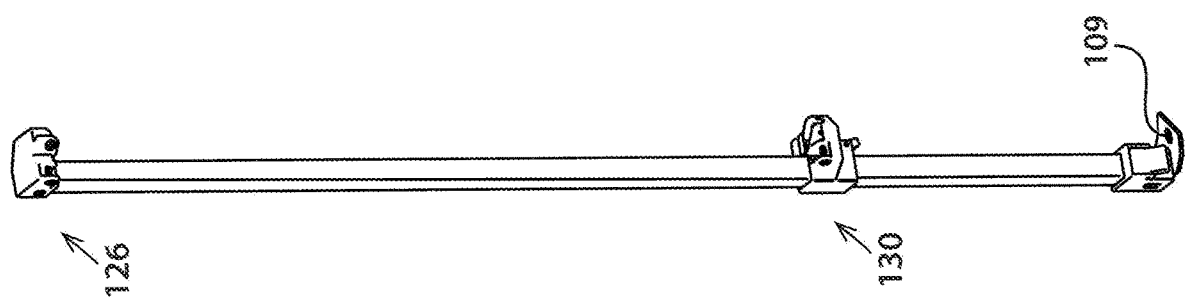
Figure 49:
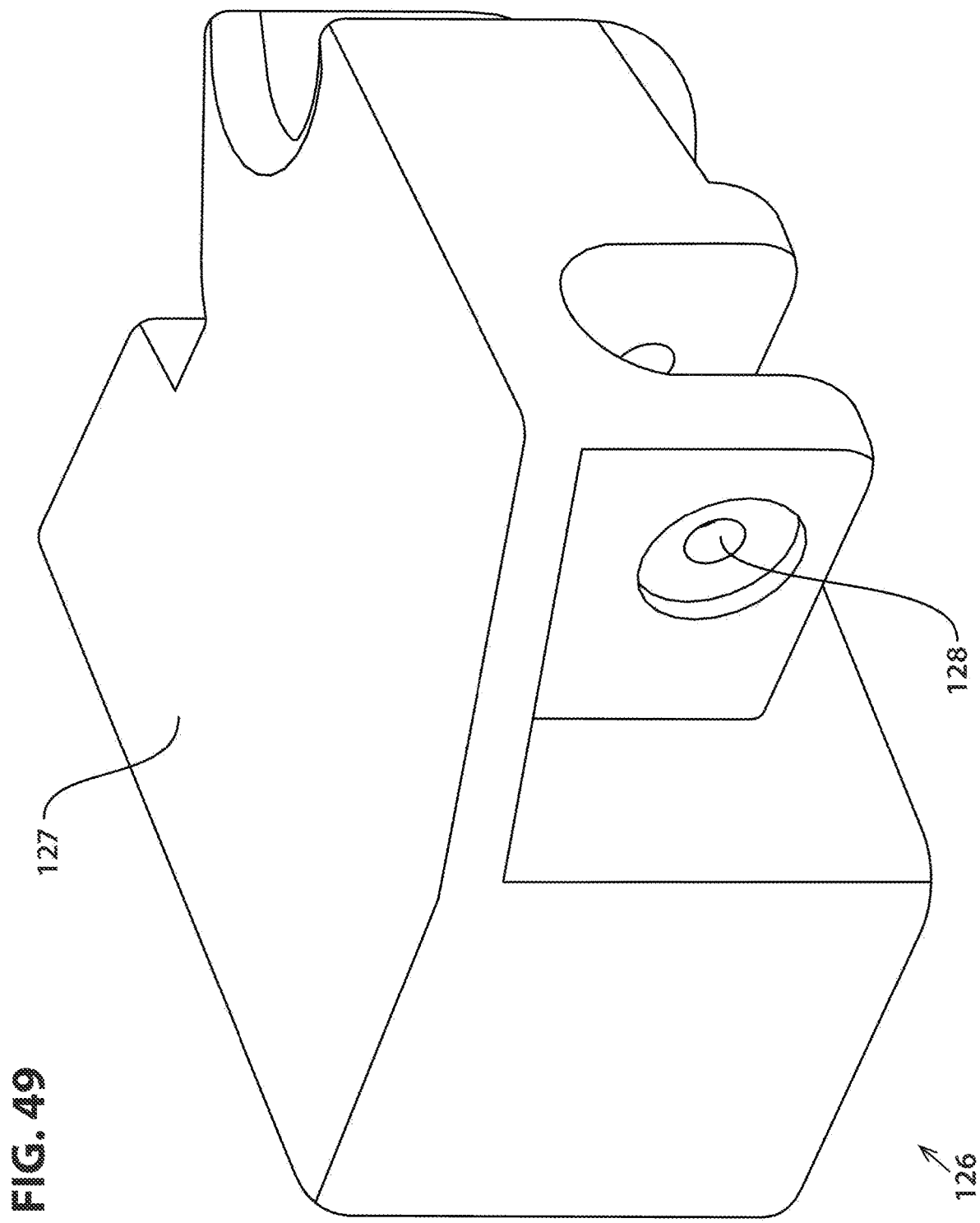
Figure 50:
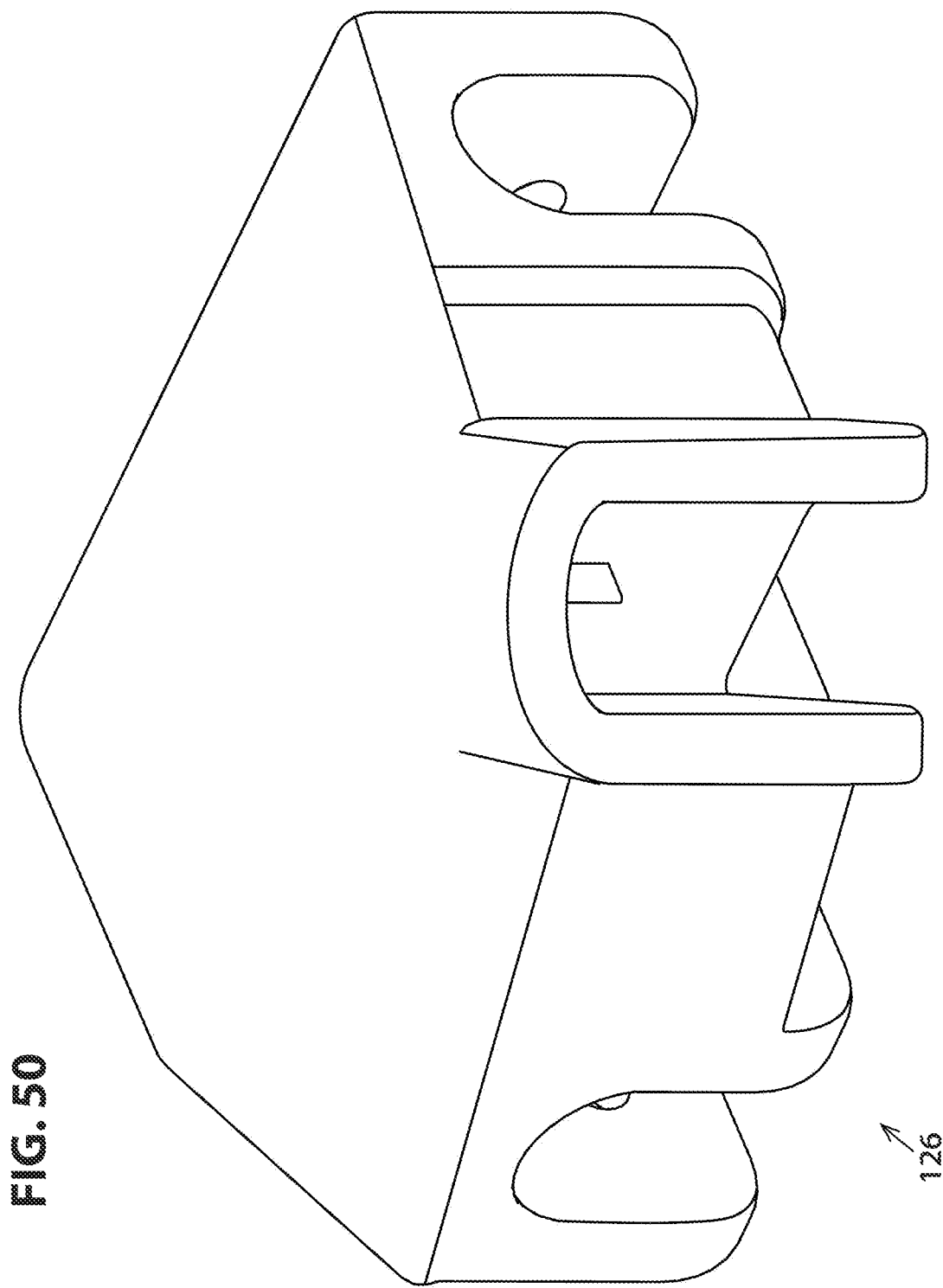
Figure 51:
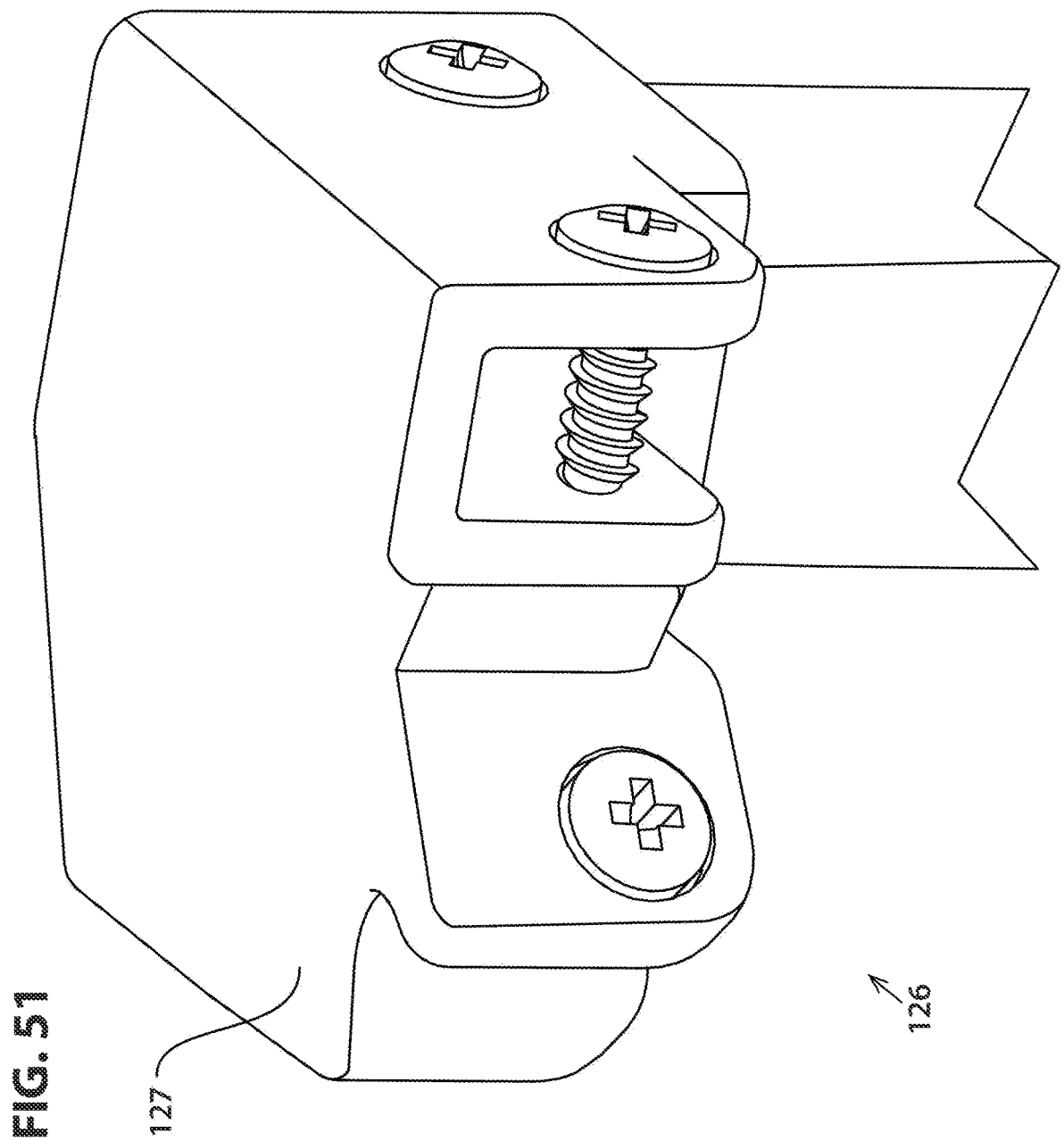
Figure 52:
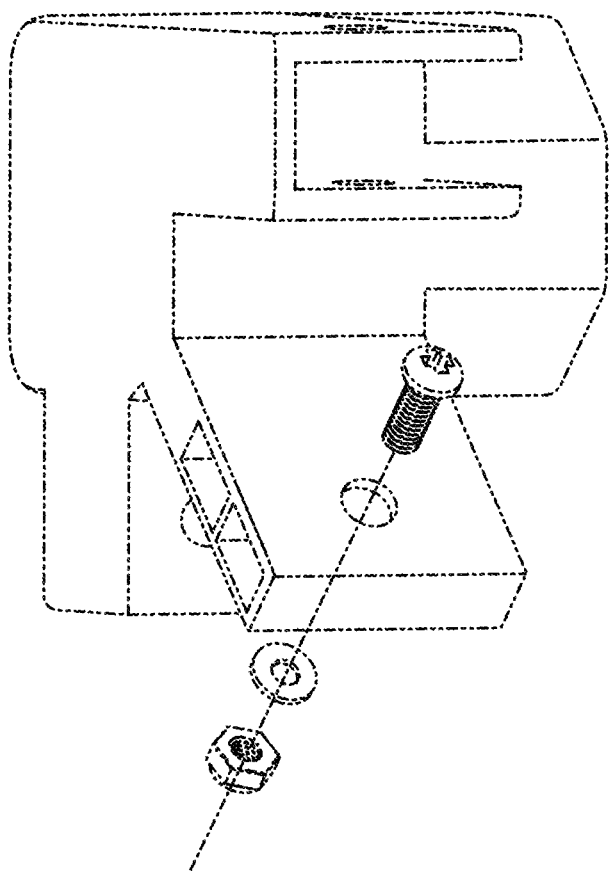
FIG. 52 (Prior Art) illustrates a perspective view of prior art of robot-assembled injury-preventing cone-shielding upper intersector system.
Figure 53:
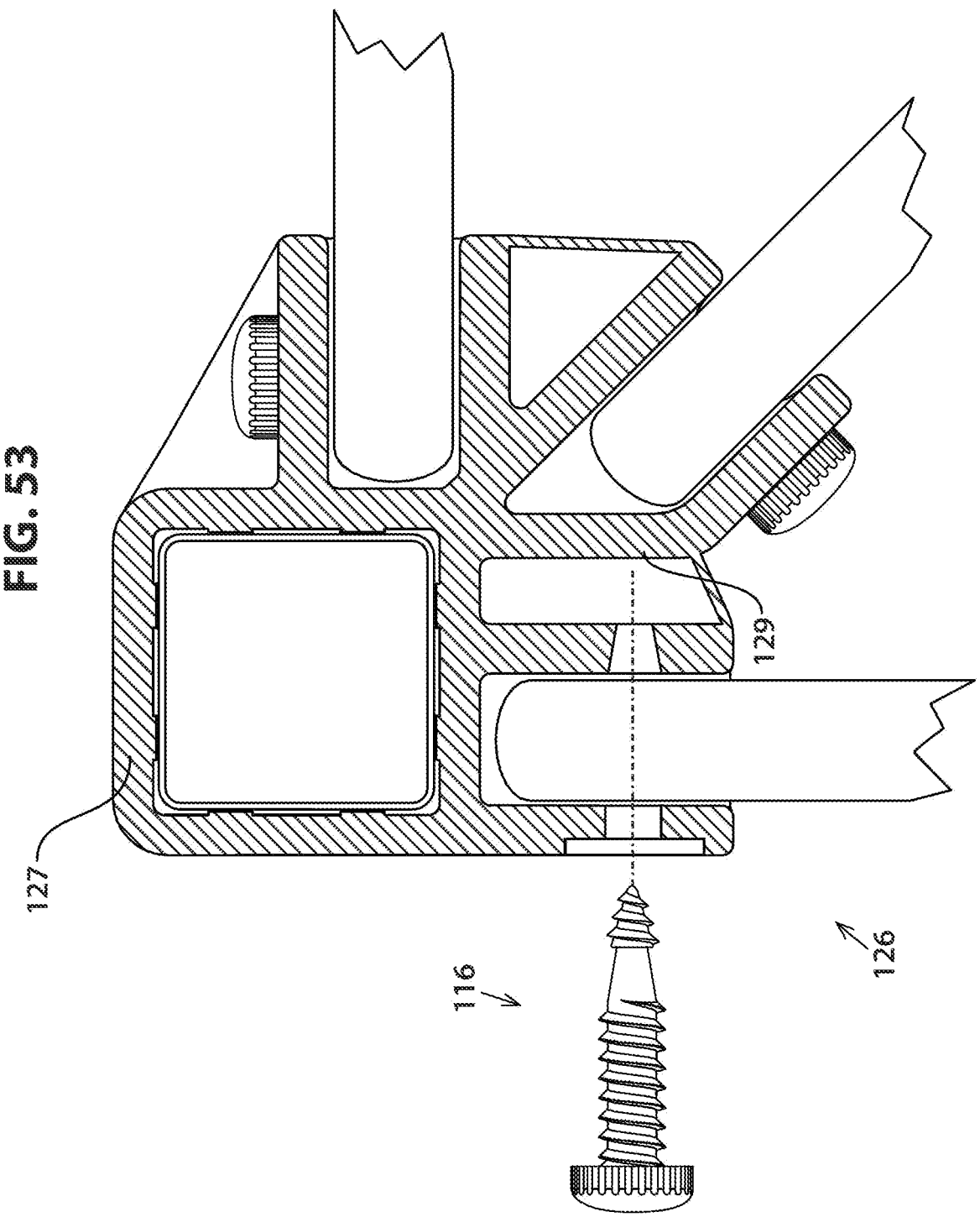
FIG. 53, FIG. 54, FIG. 55, FIG. 56, FIG. 57, FIG. 58, and FIG. 59 illustrate cross-sectional views of robot-assembled injury-preventing cone-shielding upper intersector system demonstrating how robot-assembled heat-expandable cold-contractable anti-wobbling screws are inserted therein.
Figure 54:
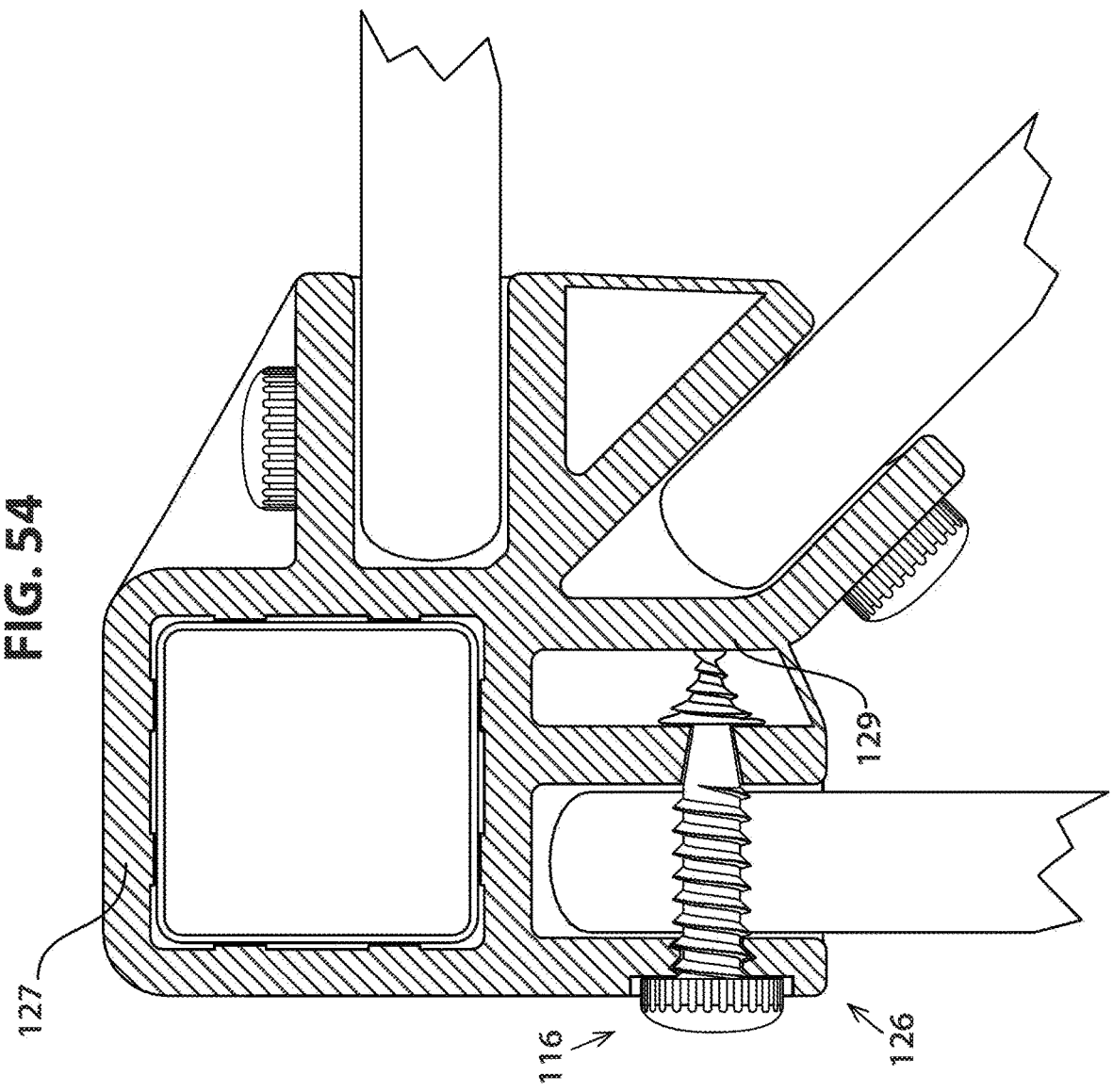
Figure 55:
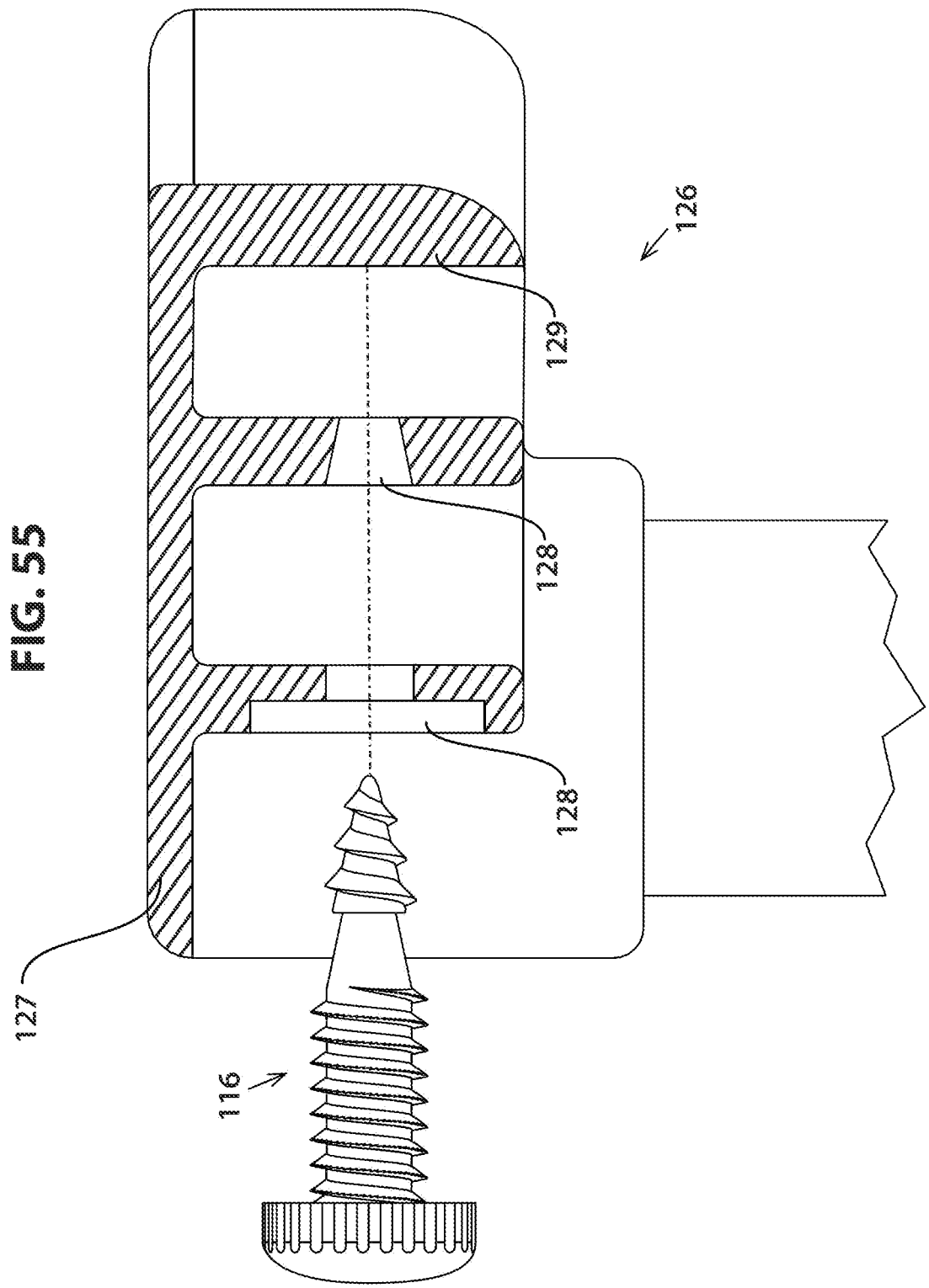
Figure 56:
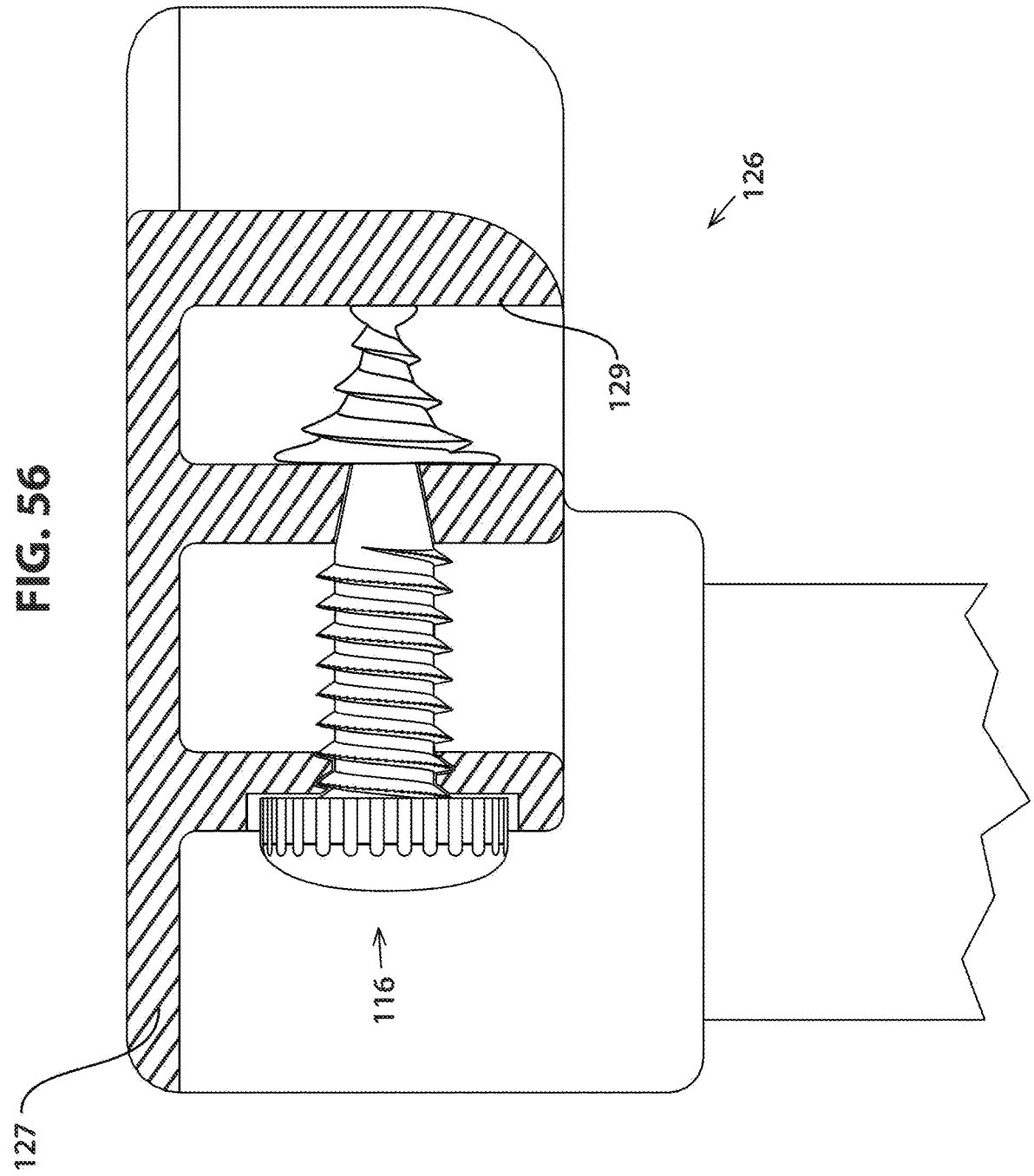
Figure 57:
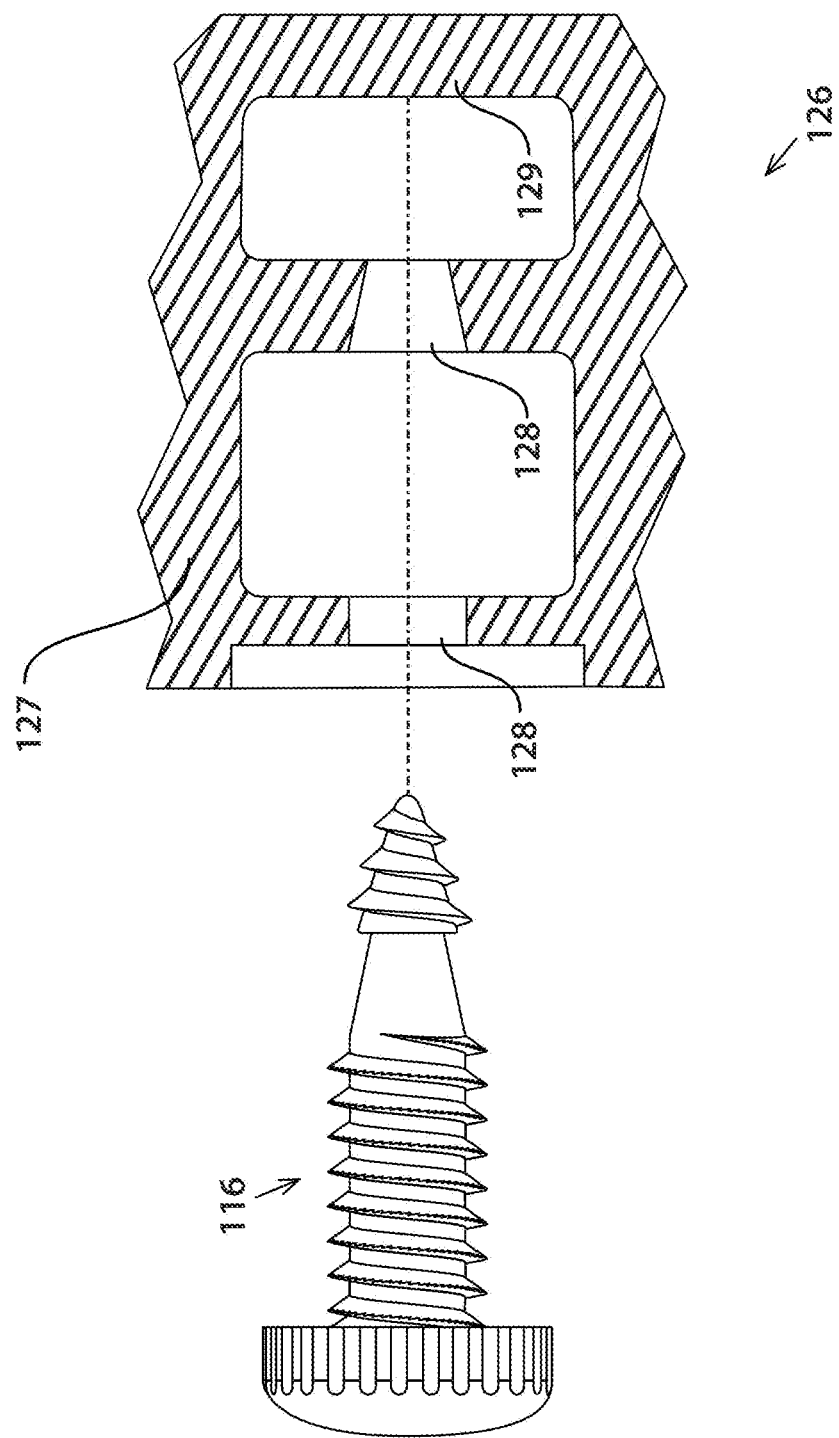
Figure 58:
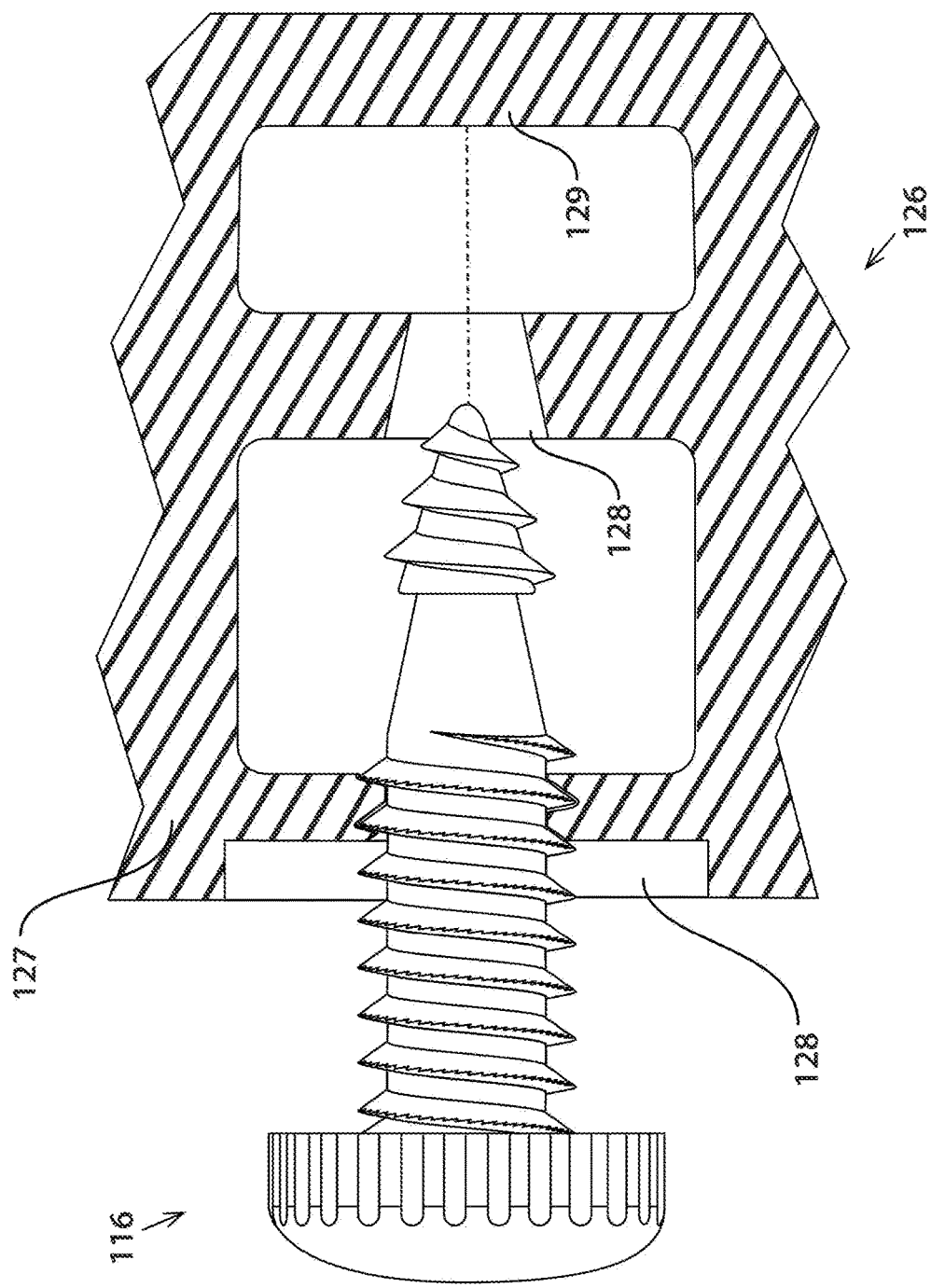
Figure 59:
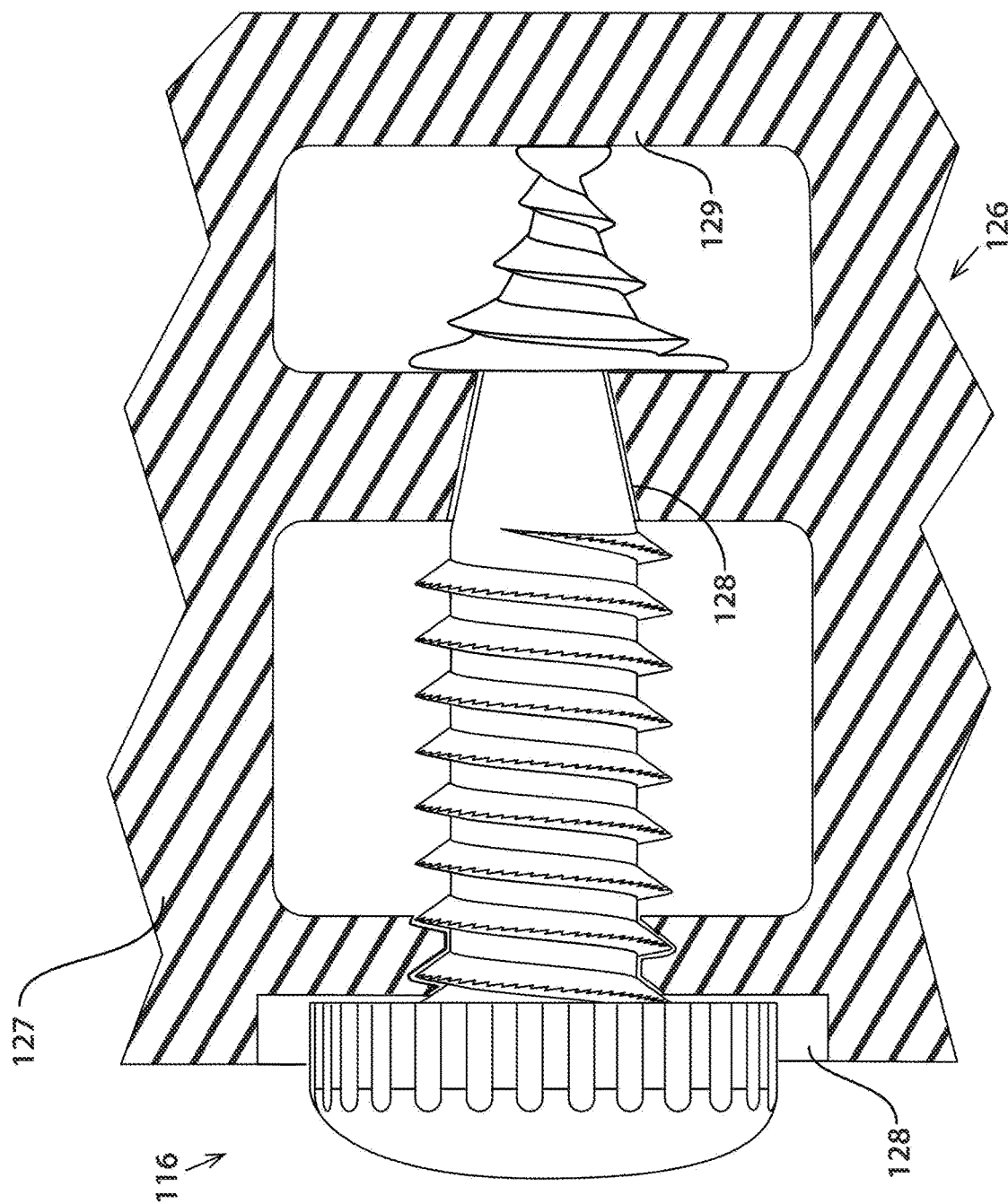
Figure 60:
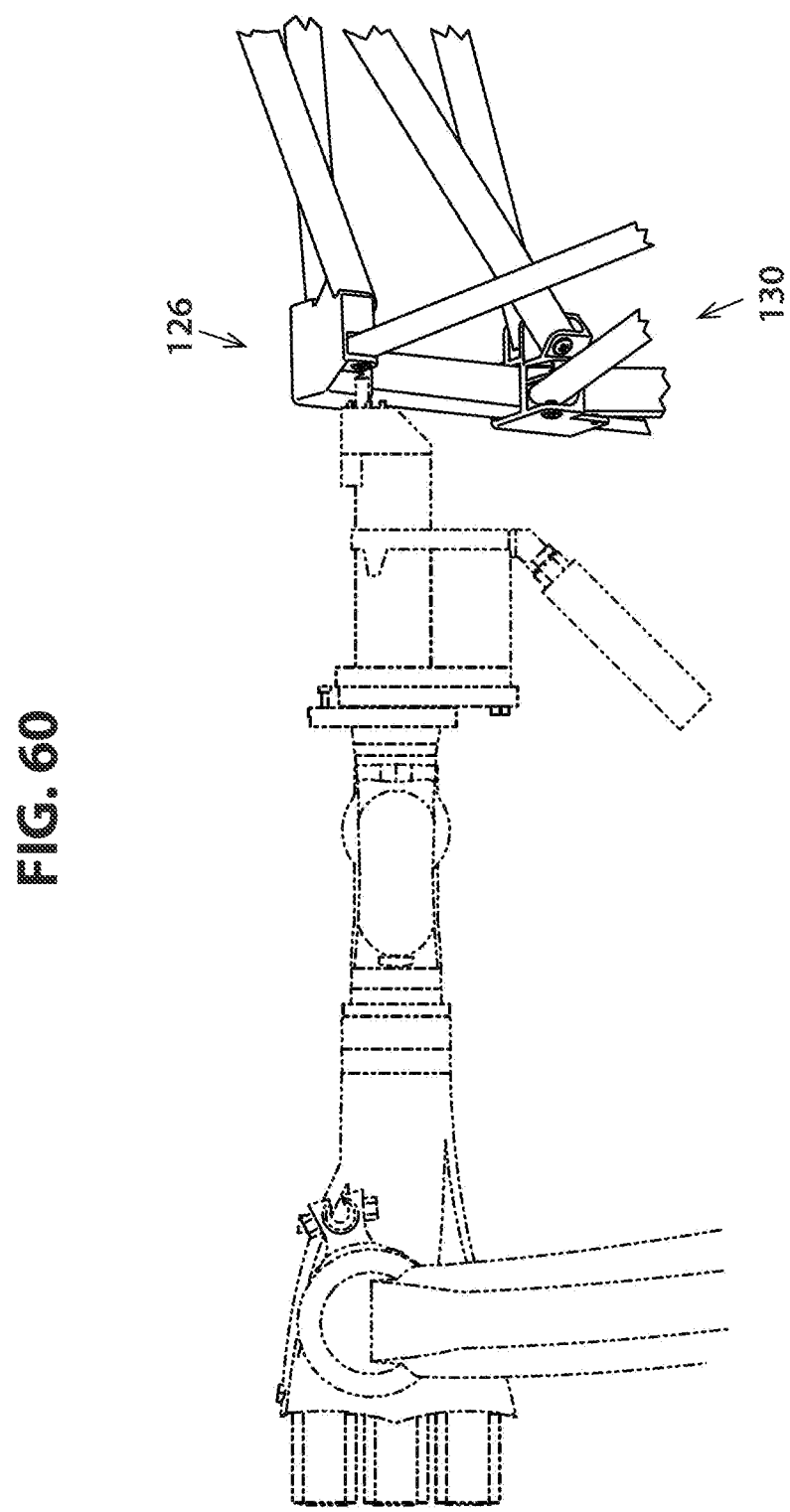
FIG. 60 illustrates a perspective view of how robot-assembled injury-preventing cone-shielding upper intersector system is robotically manufactured.
Figure 61:
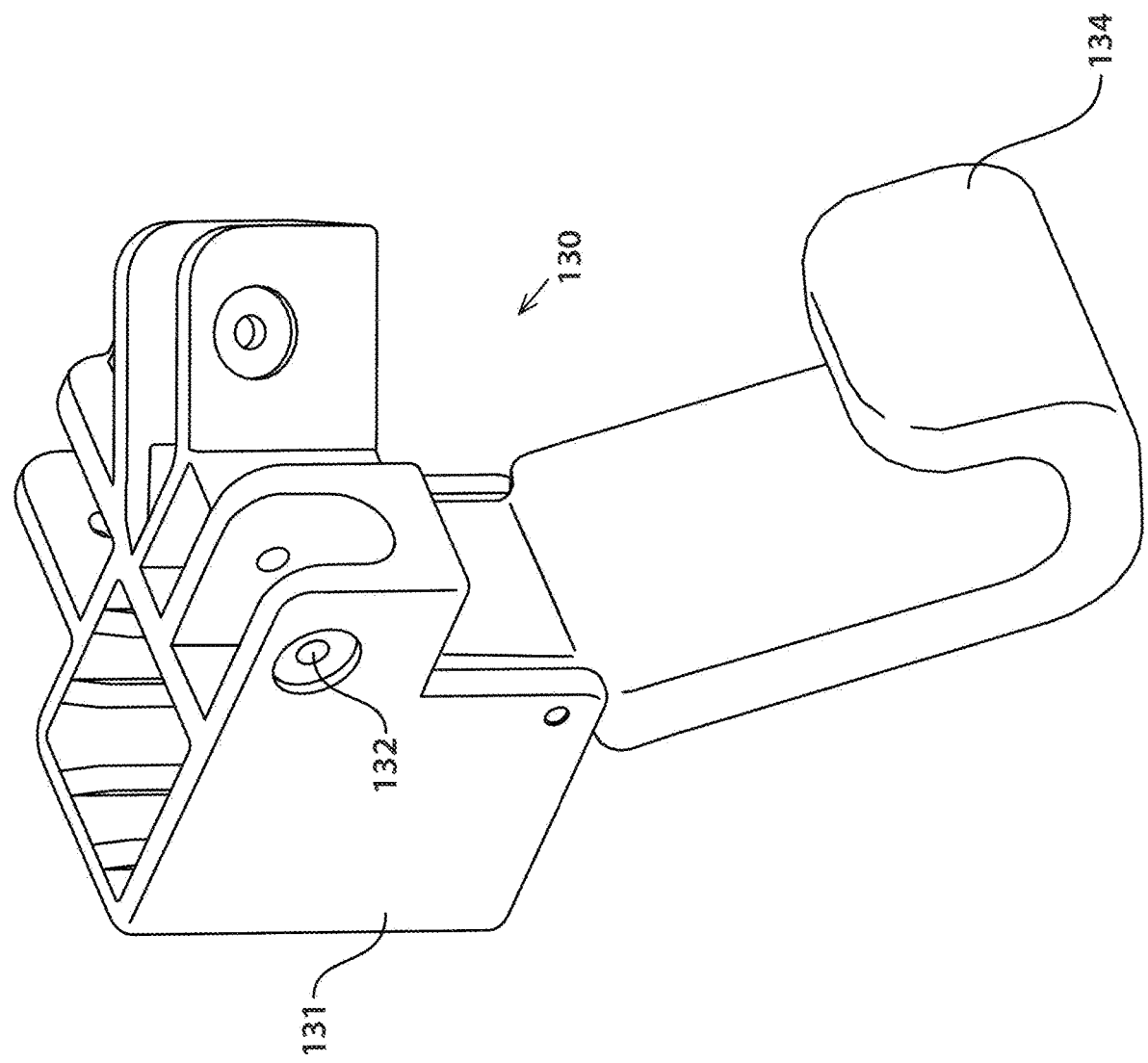
FIG. 61 illustrates a perspective view of robot-assembled arthritic-assisting injury-preventing cone-shielding lower intersector system.
Figure 62:
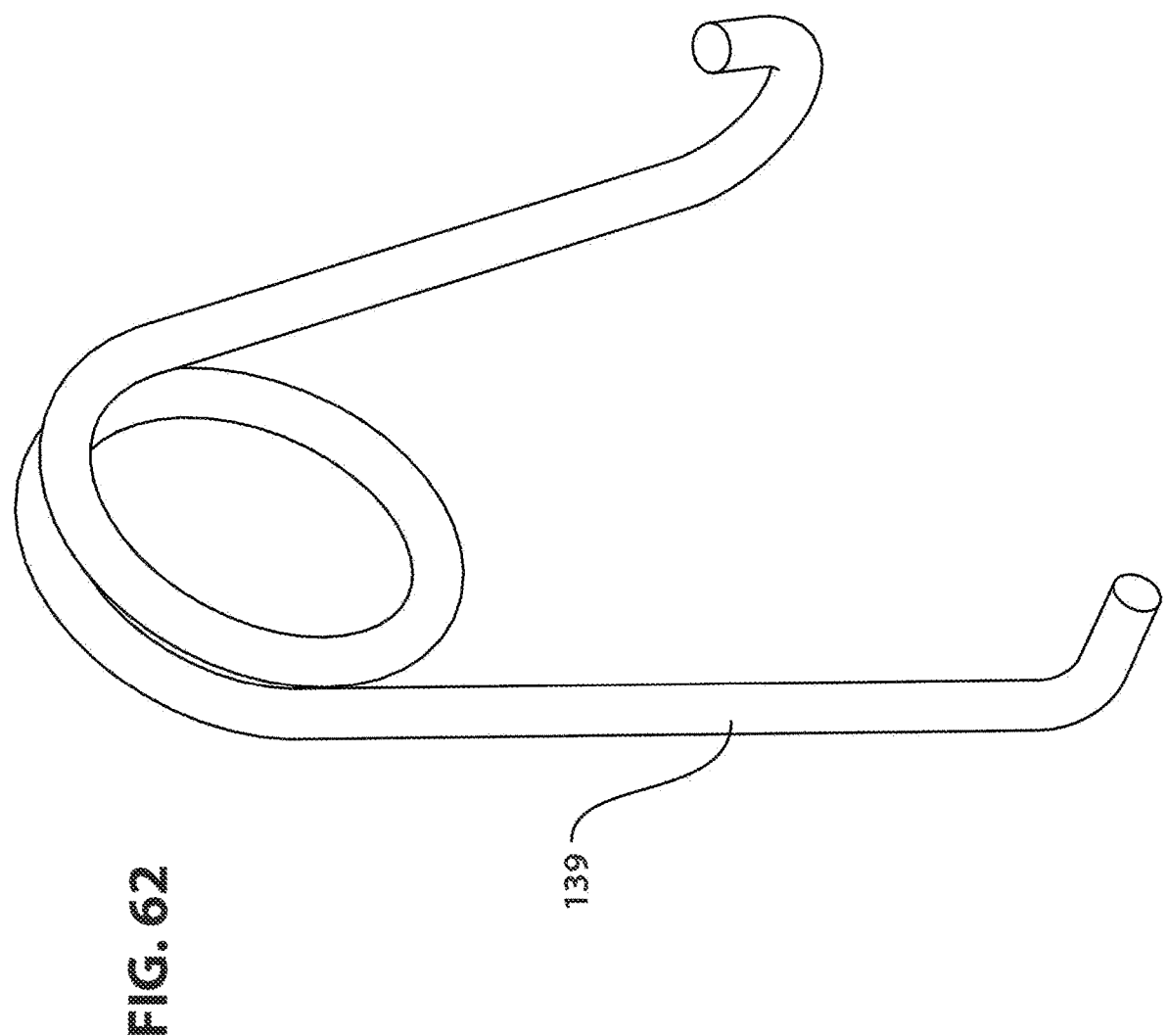
FIG. 62, and FIG. 63 illustrate perspective views of lower robot-assembled hook spring.
Figure 63:
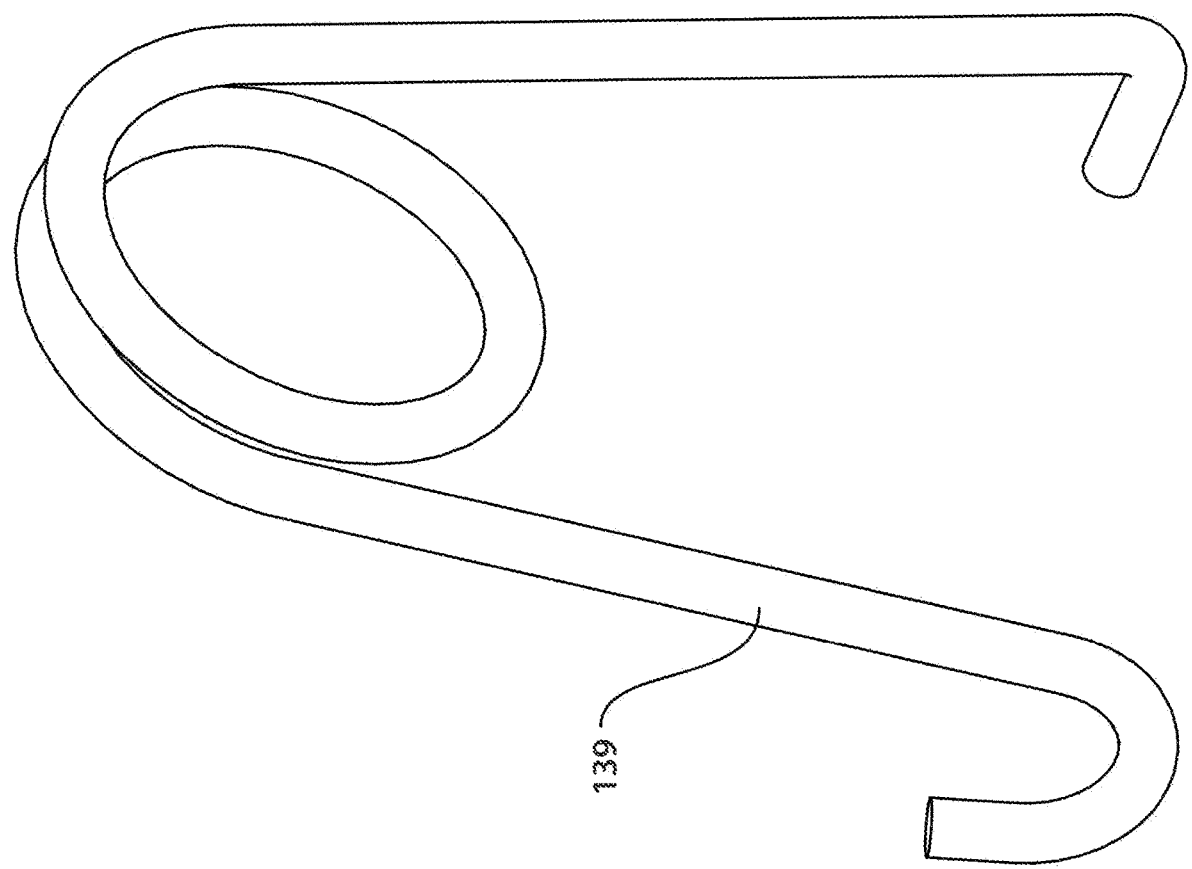
Figure 64:
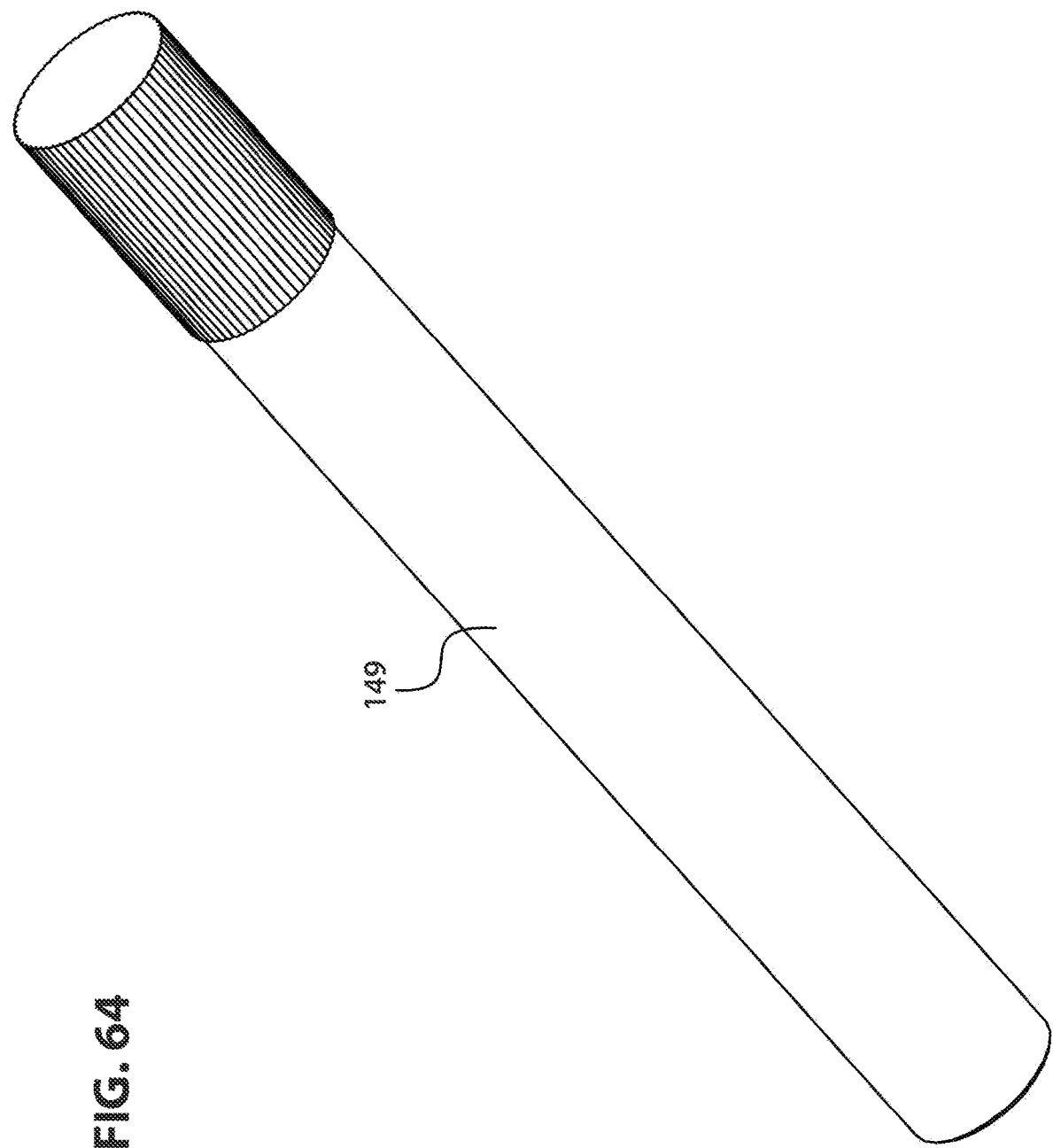
FIG. 64, and FIG. 65 illustrate perspective views of lower robot-assembled self-securing nipple-securing pins and lower robot-assembled self-securing hook-securing pins, respectively.
Figure 65:
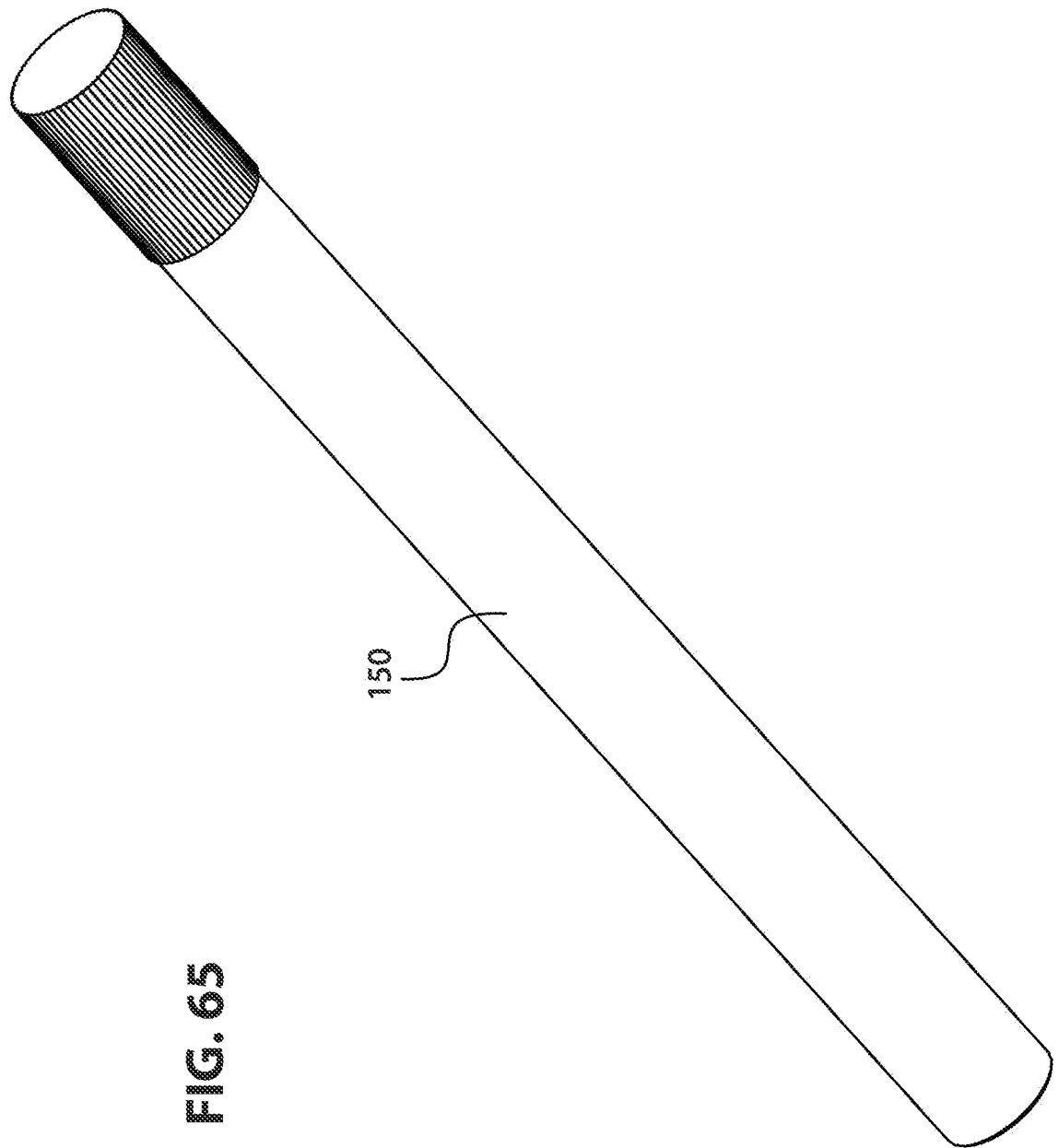
Figure 66:
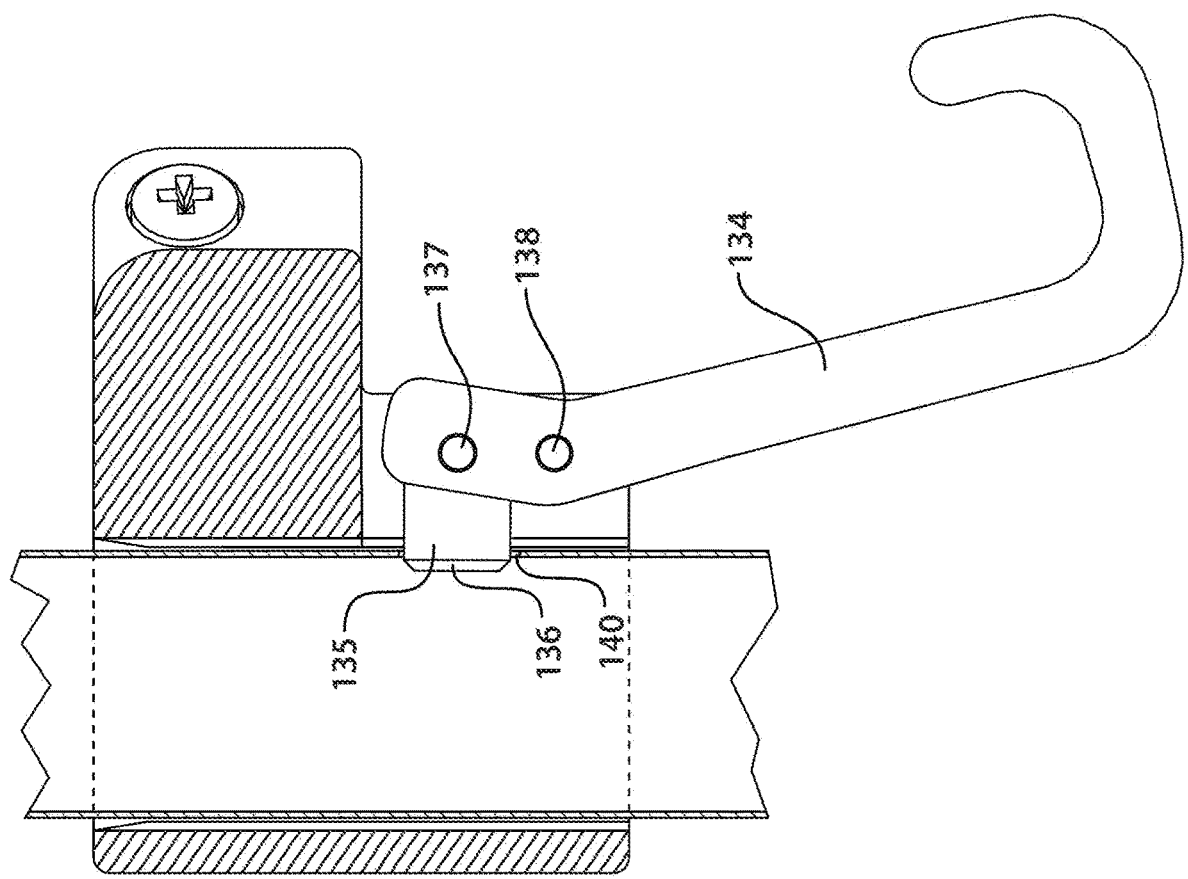
FIG. 66 illustrates a cross-sectional view of robot-assembled arthritic-assisting injury-preventing cone-shielding lower intersector system.
Figure 67:
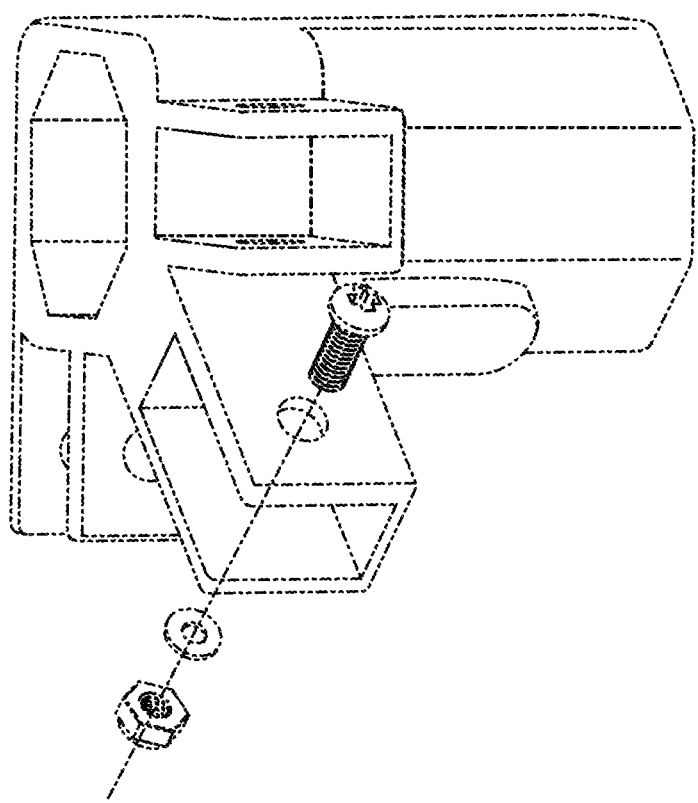
FIG. 67 (Prior Art) illustrates a perspective view of prior art of robot-assembled arthritic-assisting injury-preventing cone-shielding lower intersector system.
Figure 68:
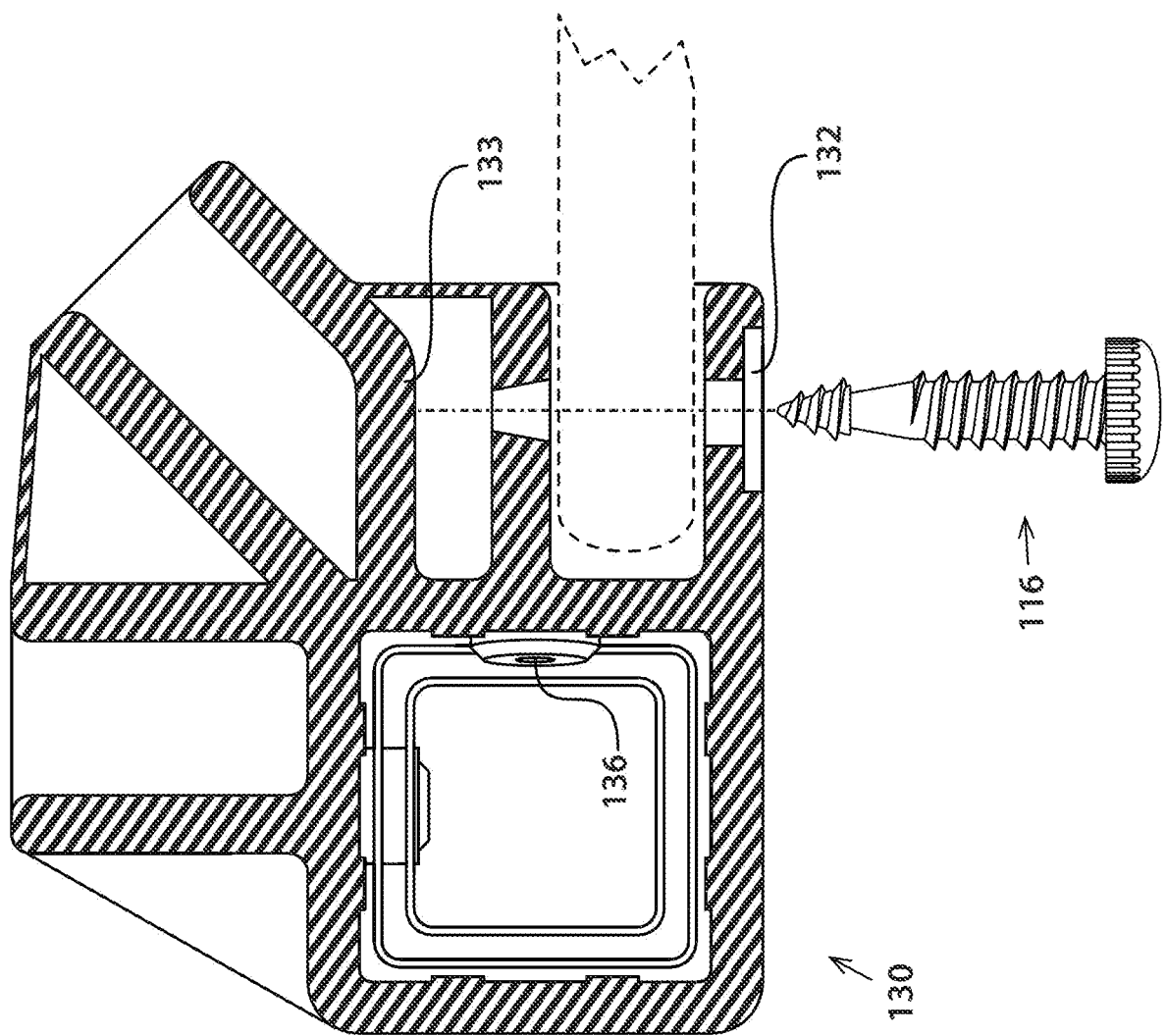
FIG. 68, FIG. 69, FIG. 70, FIG. 71, and FIG. 72 illustrate cross-sectional views of robot-assembled arthritic-assisting injury-preventing cone-shielding lower intersector system demonstrating how robot-assembled heat-expandable cold-contractable anti-wobbling screws are inserted therein.
Figure 69:
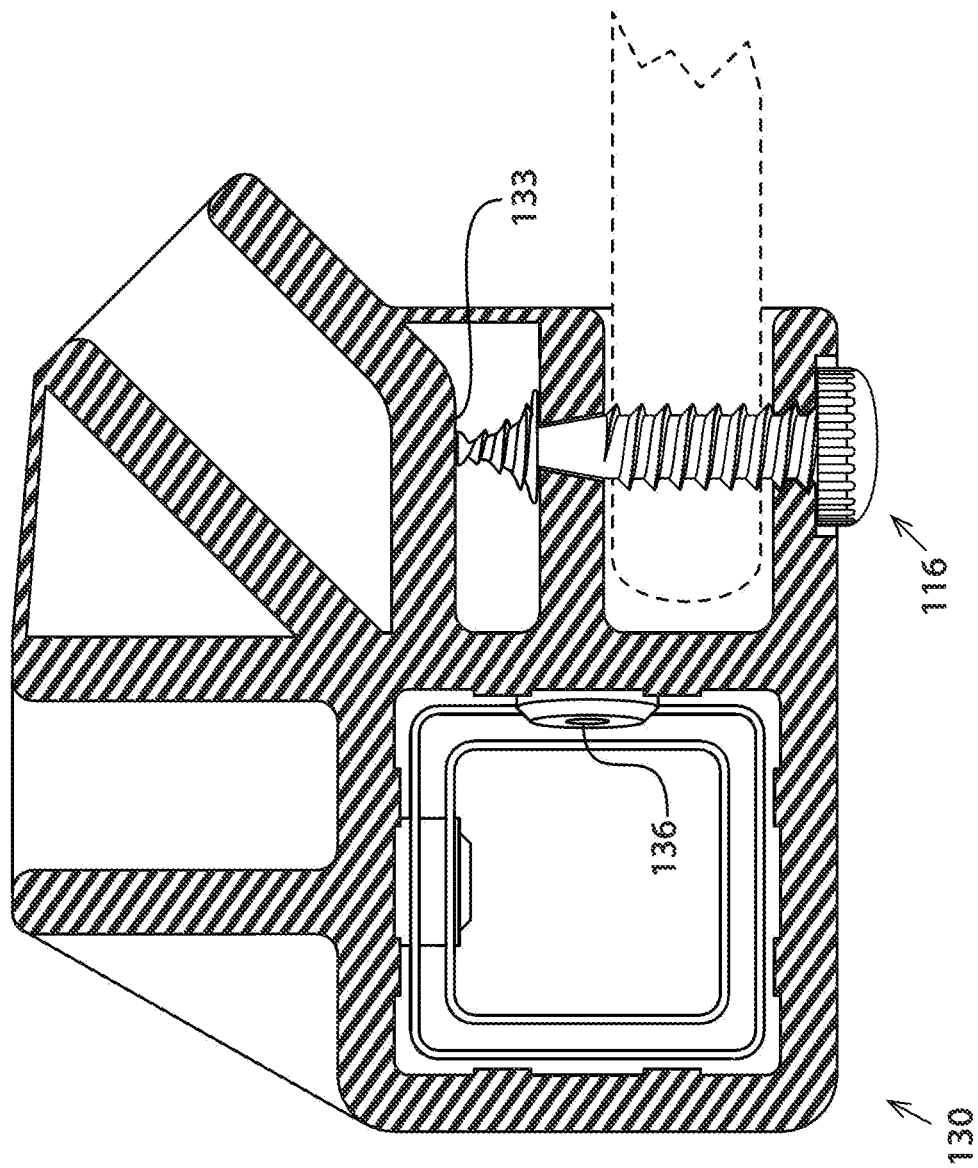
Figure 70:
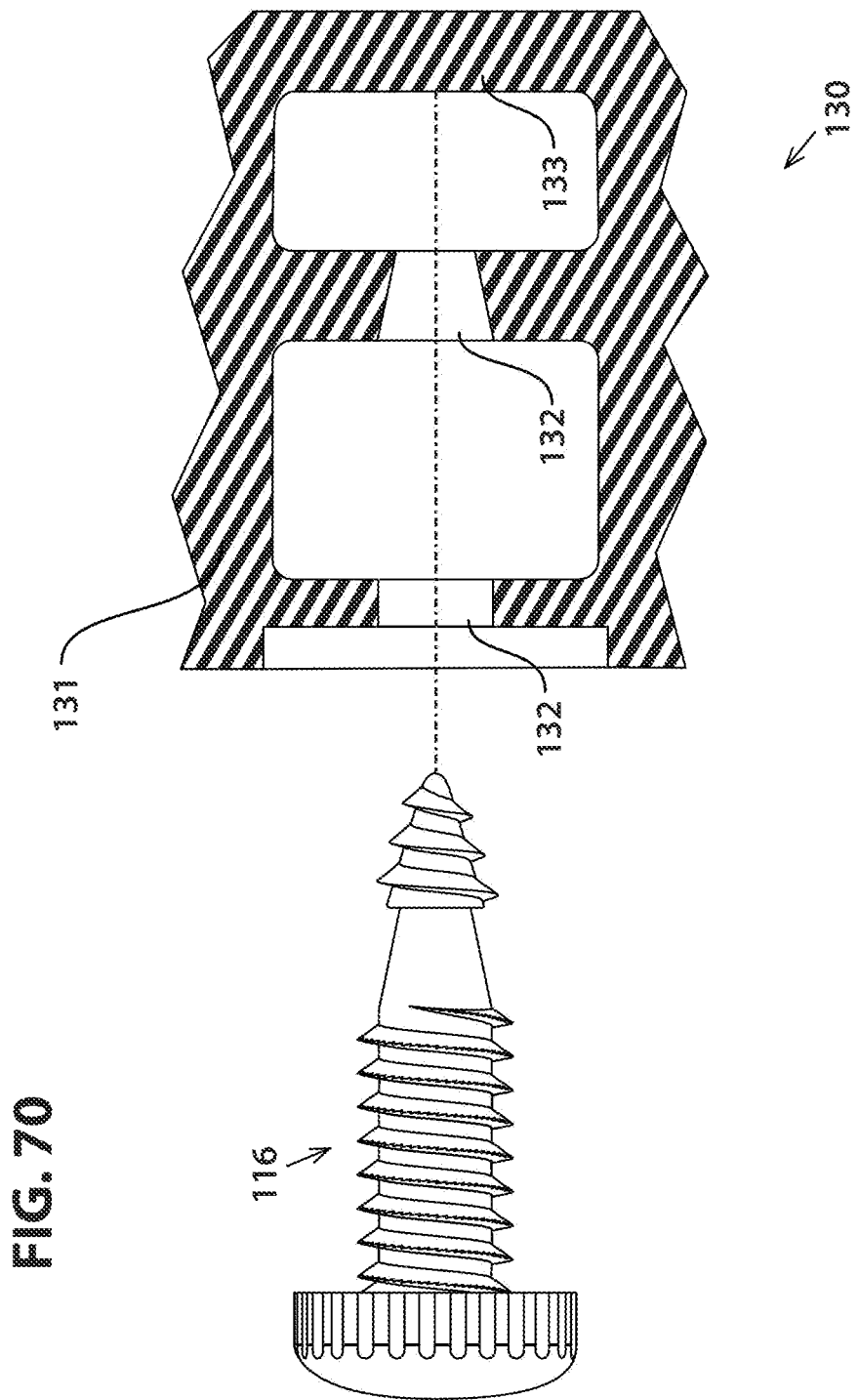
Figure 71:
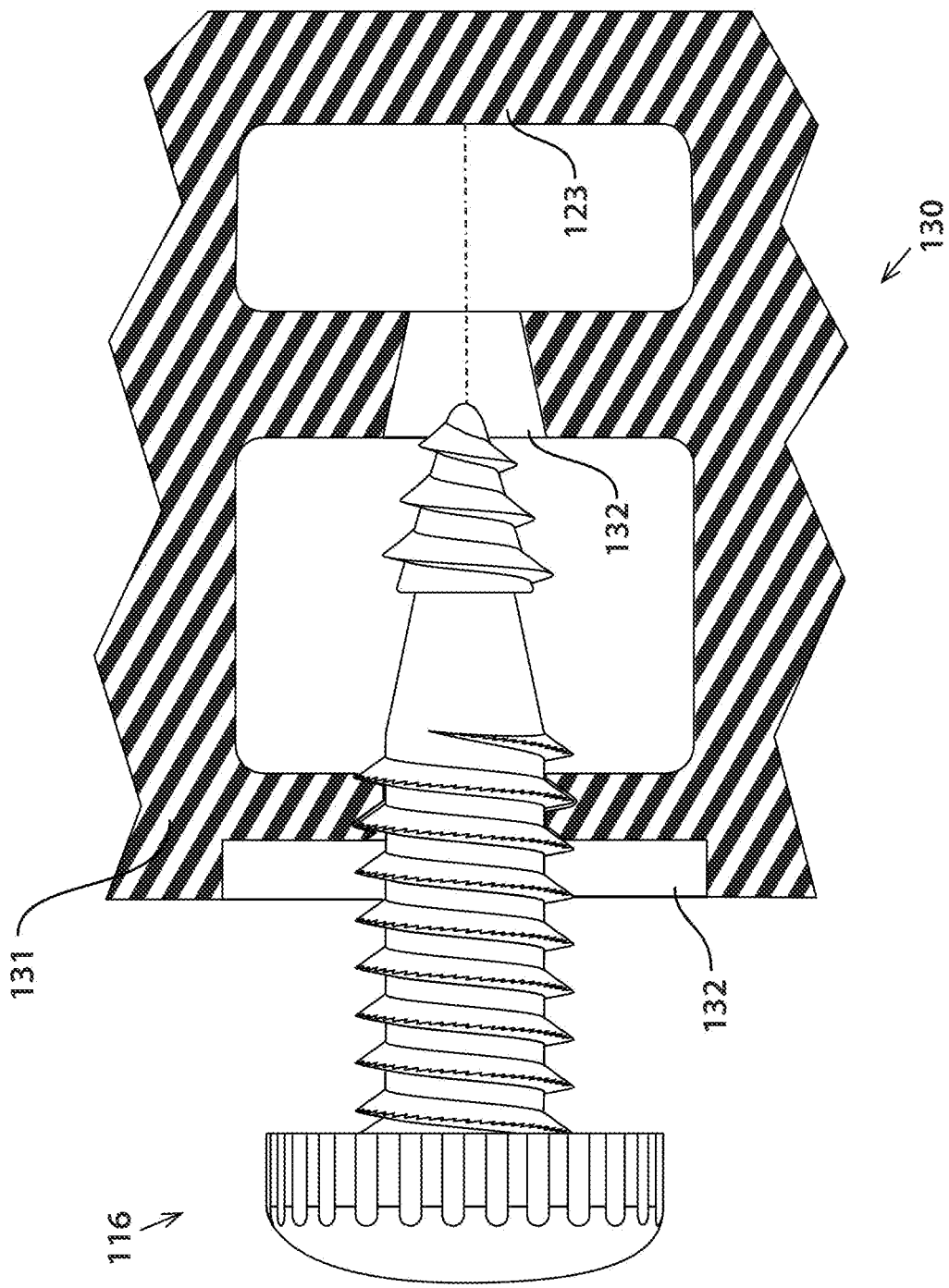
Figure 72:
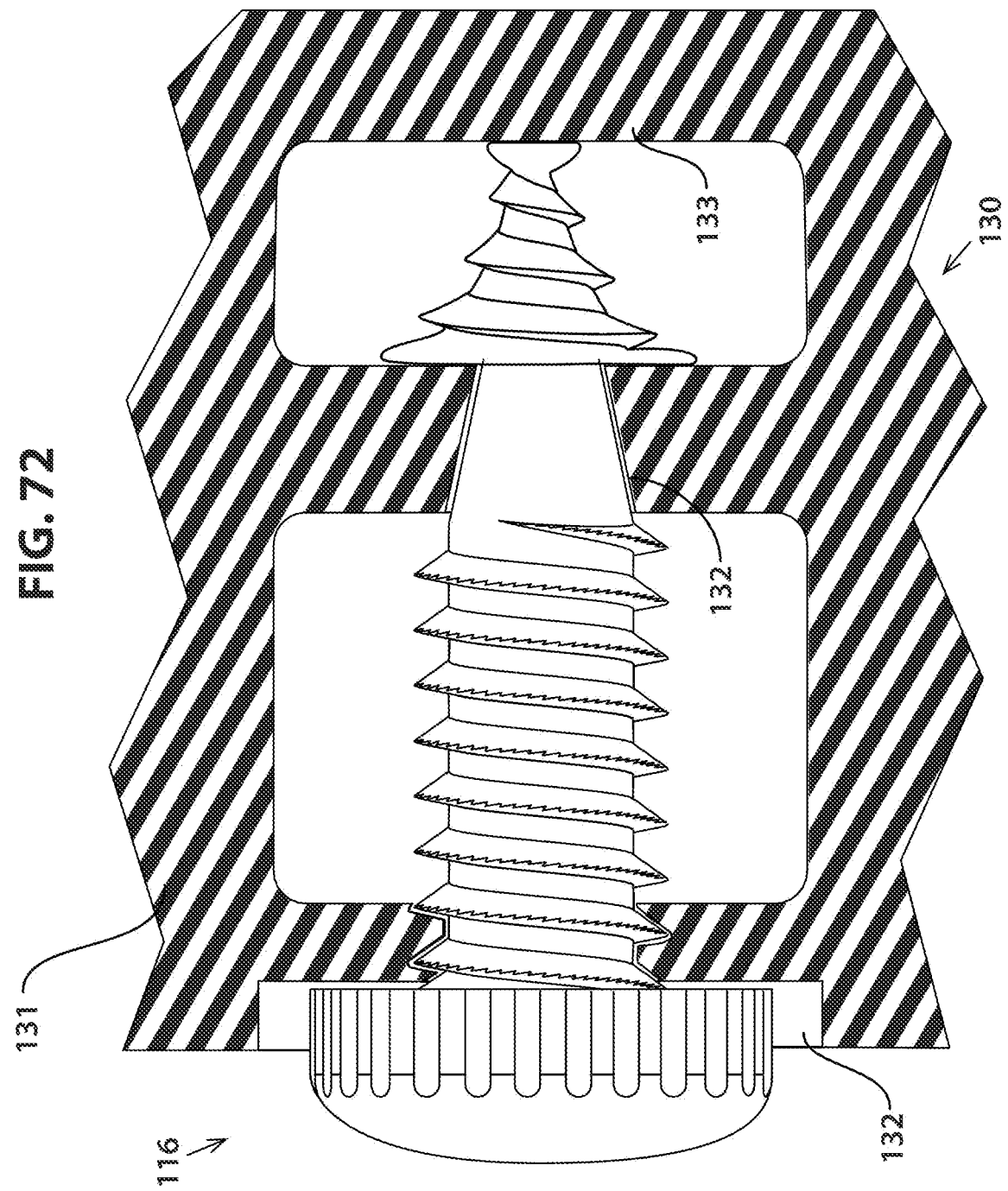
Figure 73:
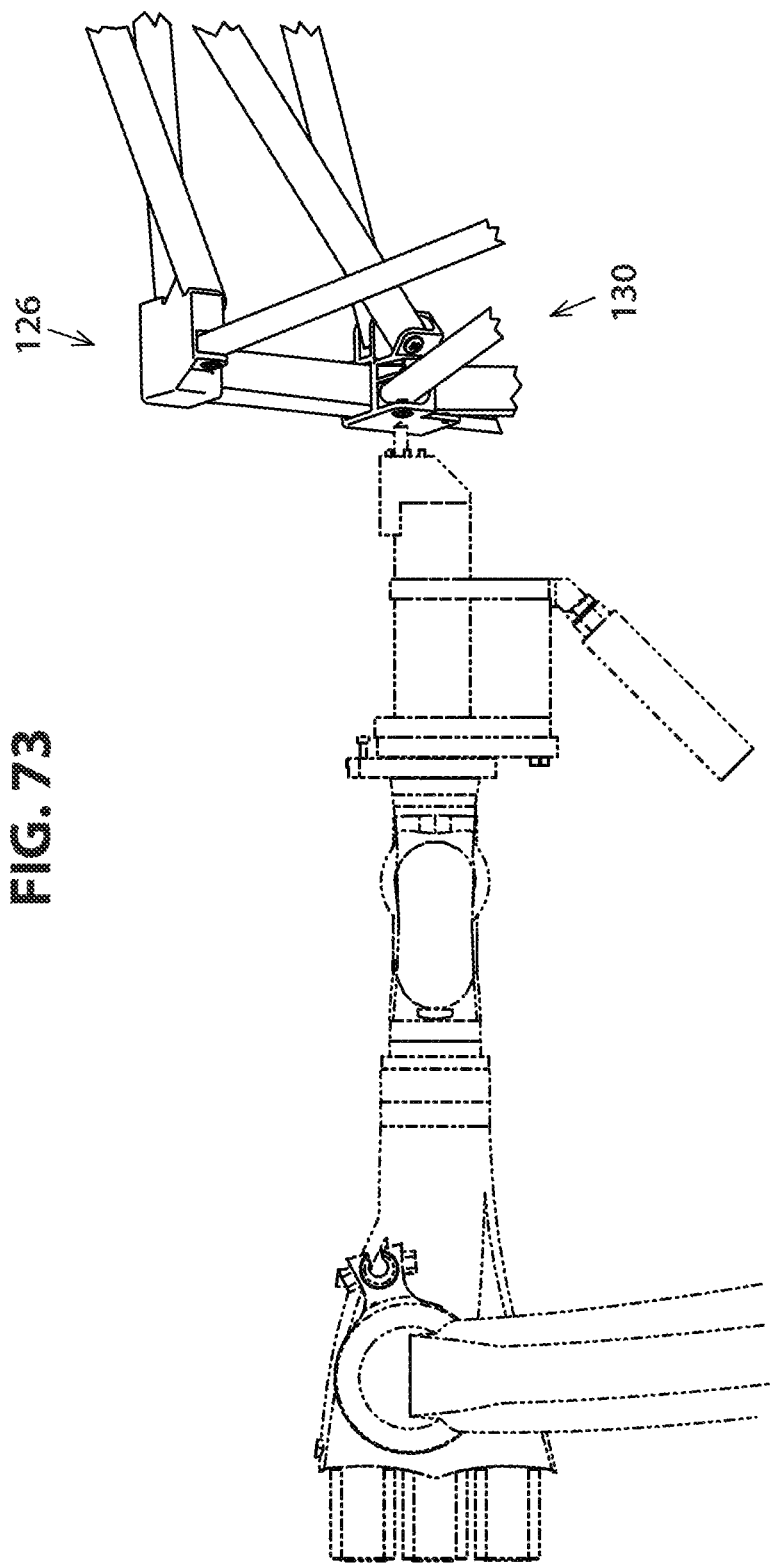
FIG. 73 illustrates a perspective view of how robot-assembled arthritic-assisting injury-preventing cone-shielding lower intersector system is robotically manufactured.
Figure 74:
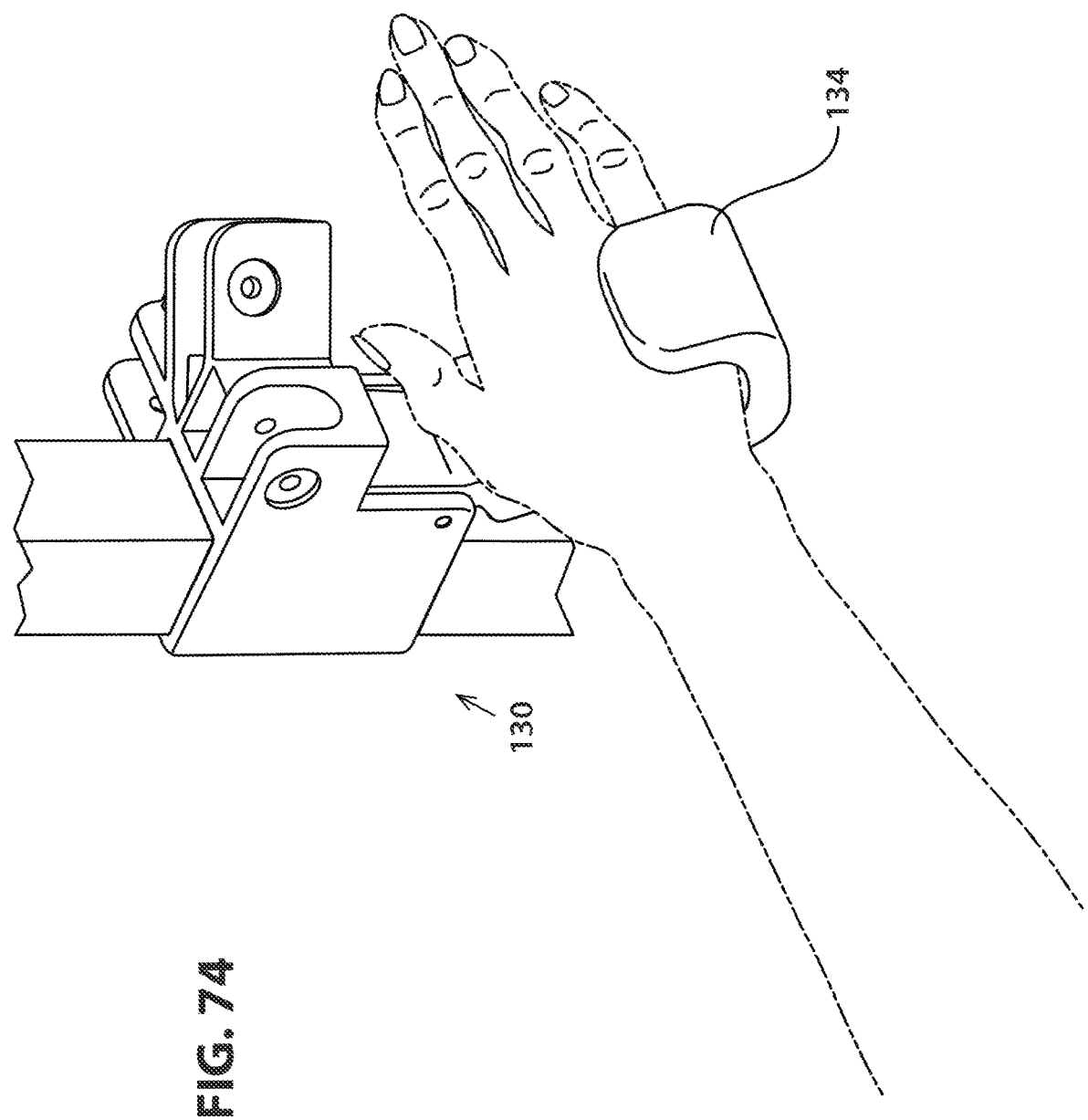
FIG. 74 illustrates a perspective view demonstrating how an arthritic can operate lower robot-assembled arthritic-assisting height-adjusting dog-run-panel-rope hooks without the need to close the hand.
Figure 75:
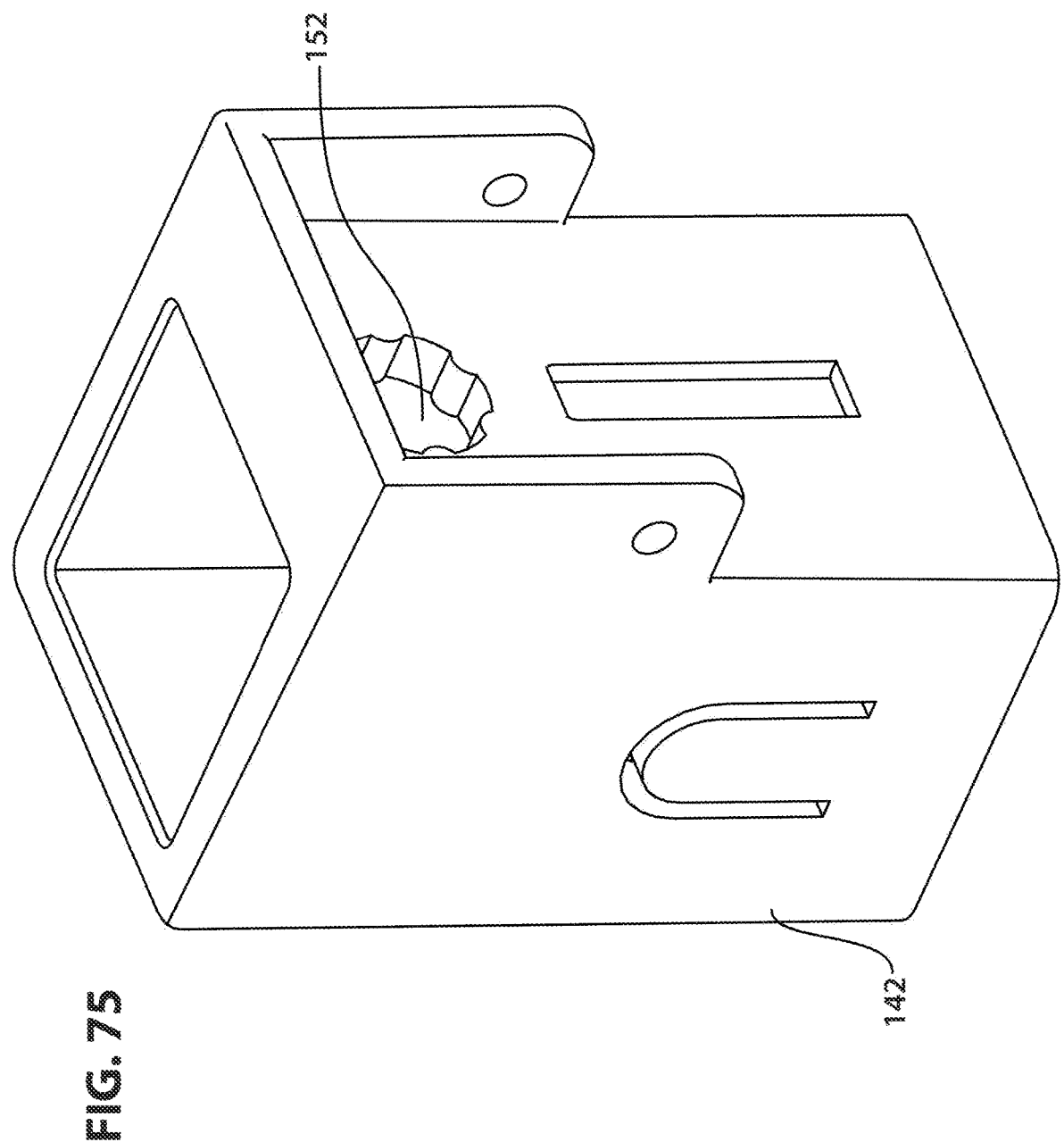
FIG. 75, FIG. 76, FIG. 77, FIG. 78, FIG. 79, FIG. 80, and FIG. 81 illustrate perspective views demonstrating components of robot-assembled arthritic-assisting injury-preventing post-centering tick-preventing water-discharging sleeve system.
Figure 76:
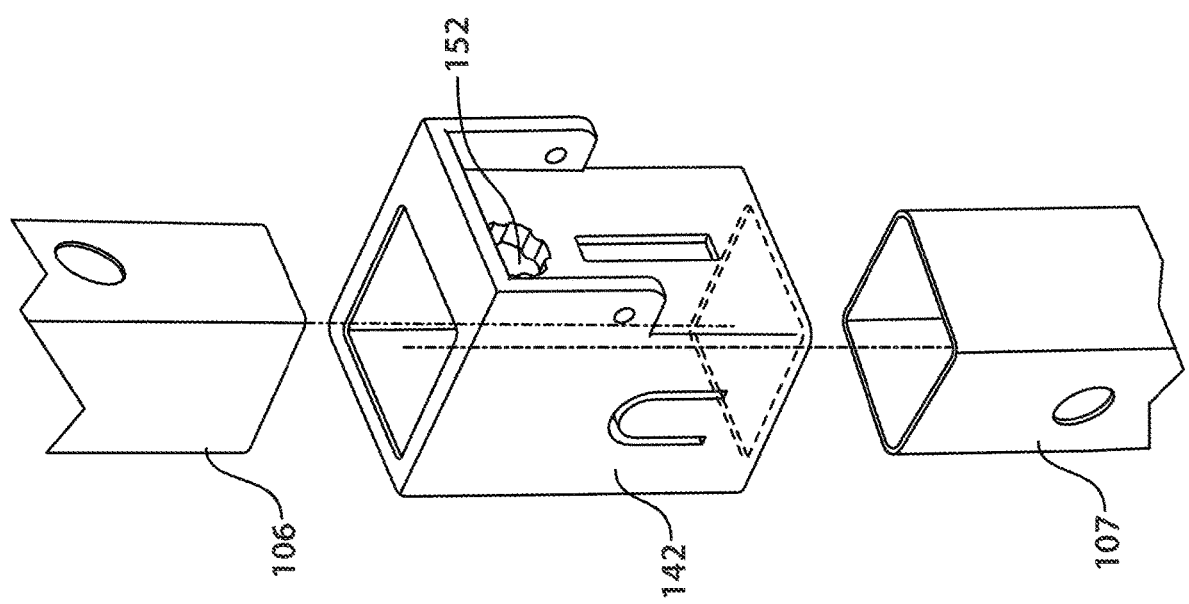
Figure 77:
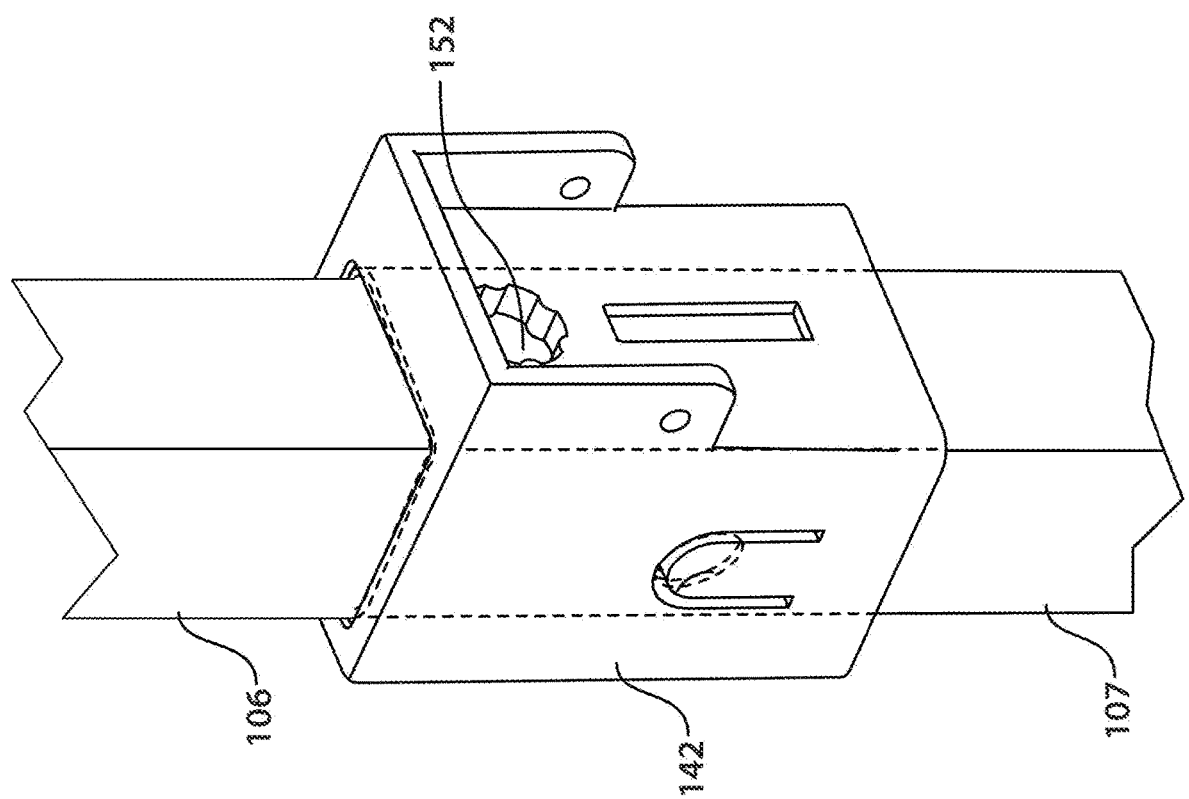
Figure 78:
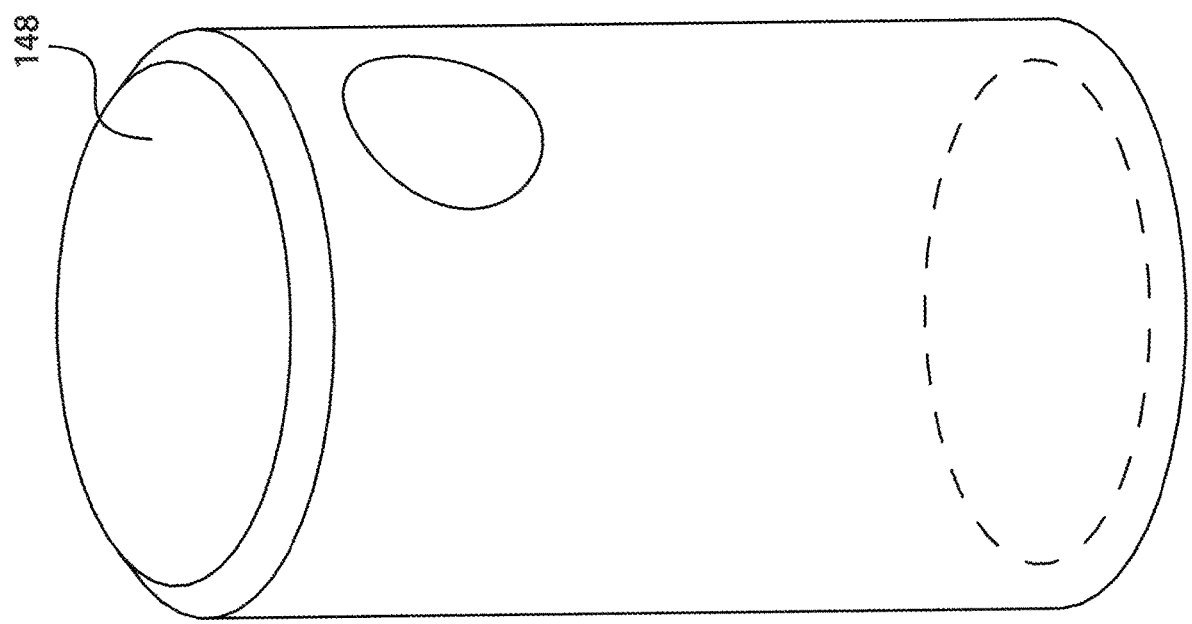
Figure 79:
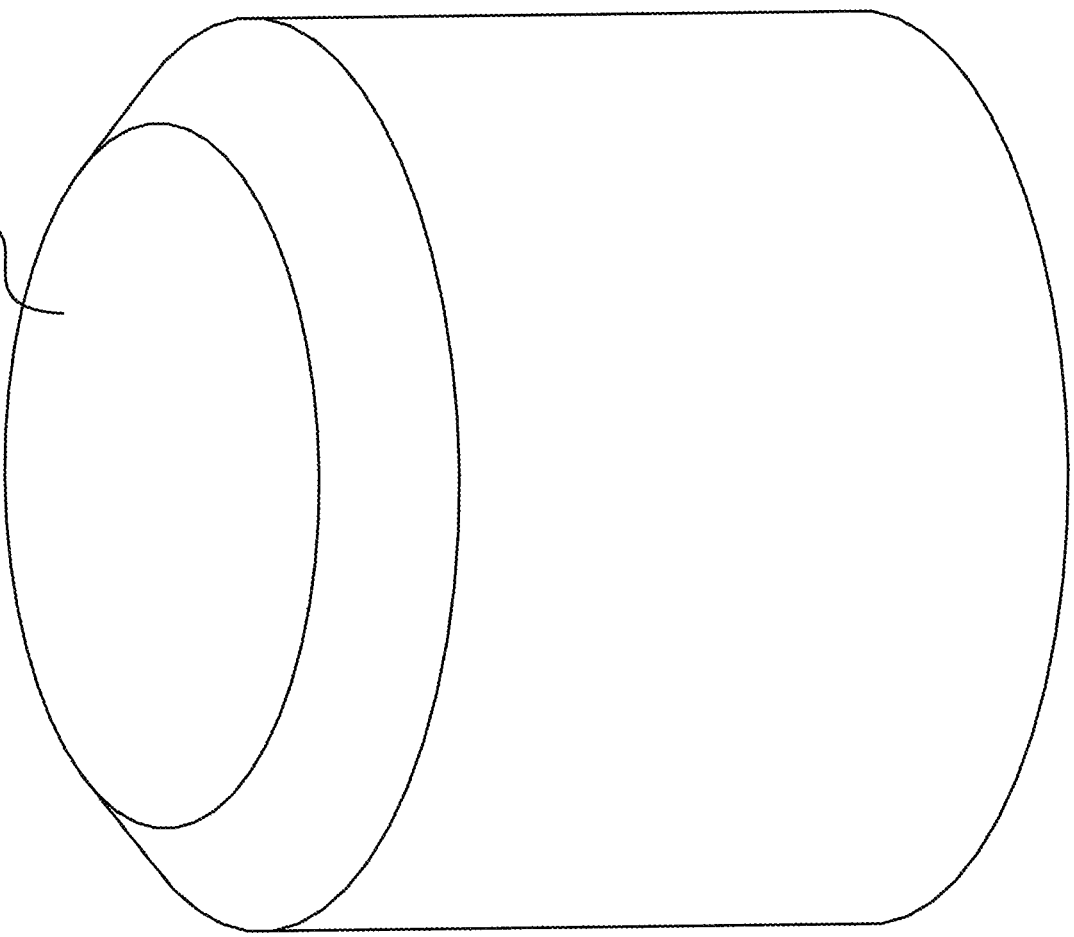
Figure 80:
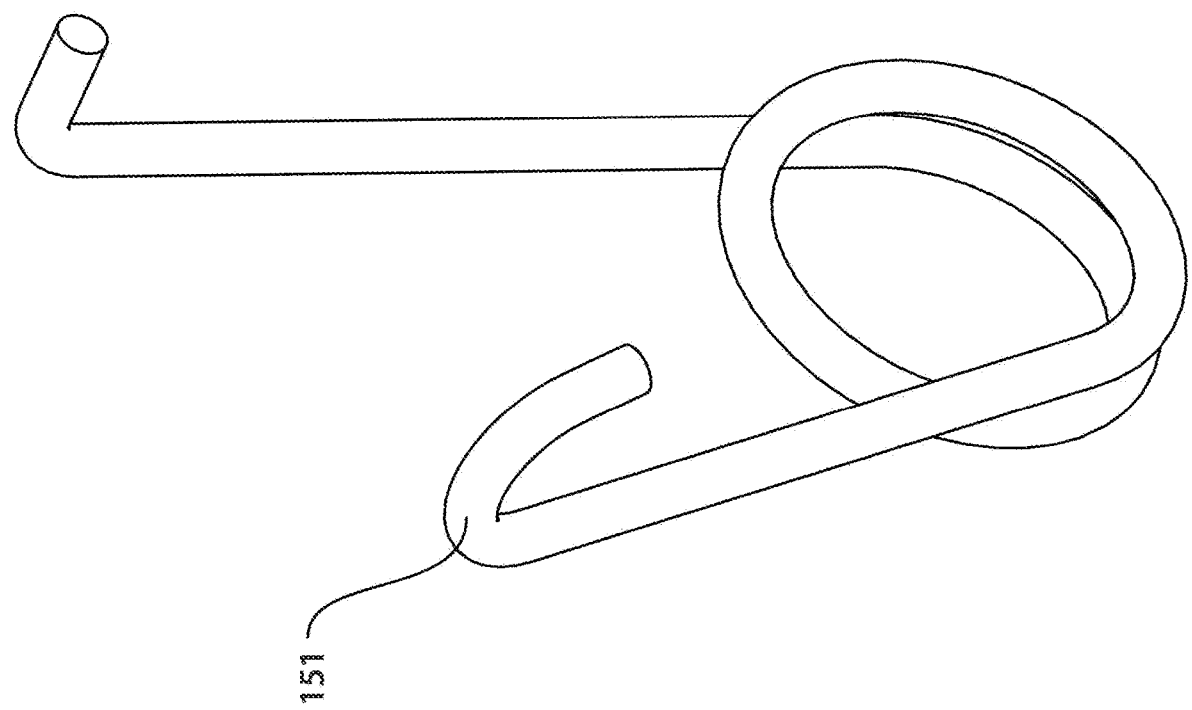
Figure 81:
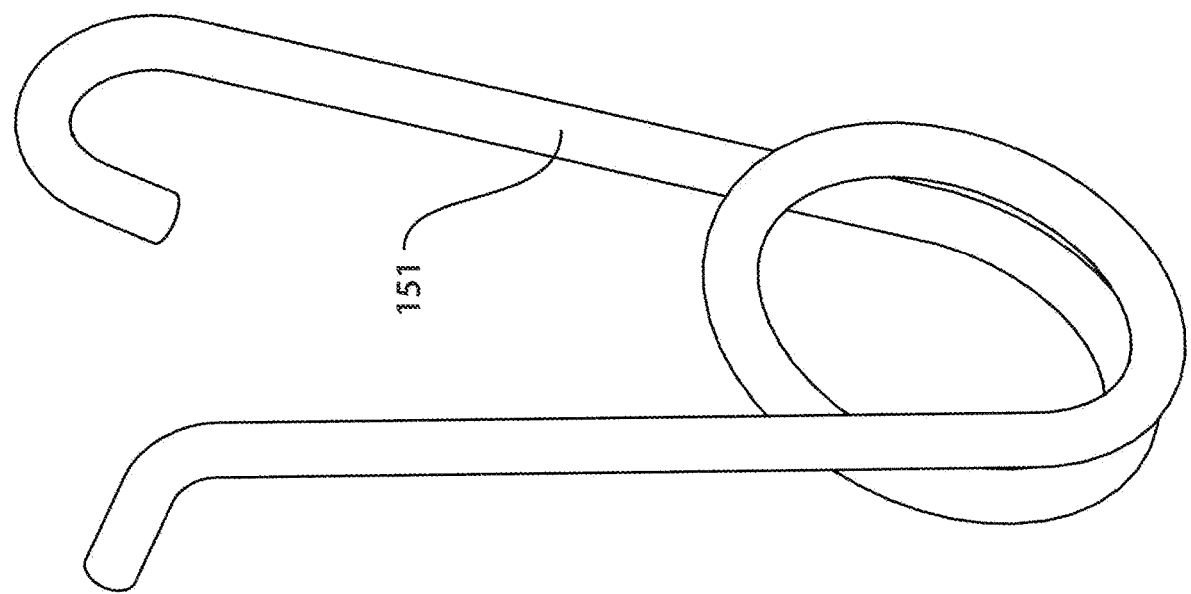
Figure 82:
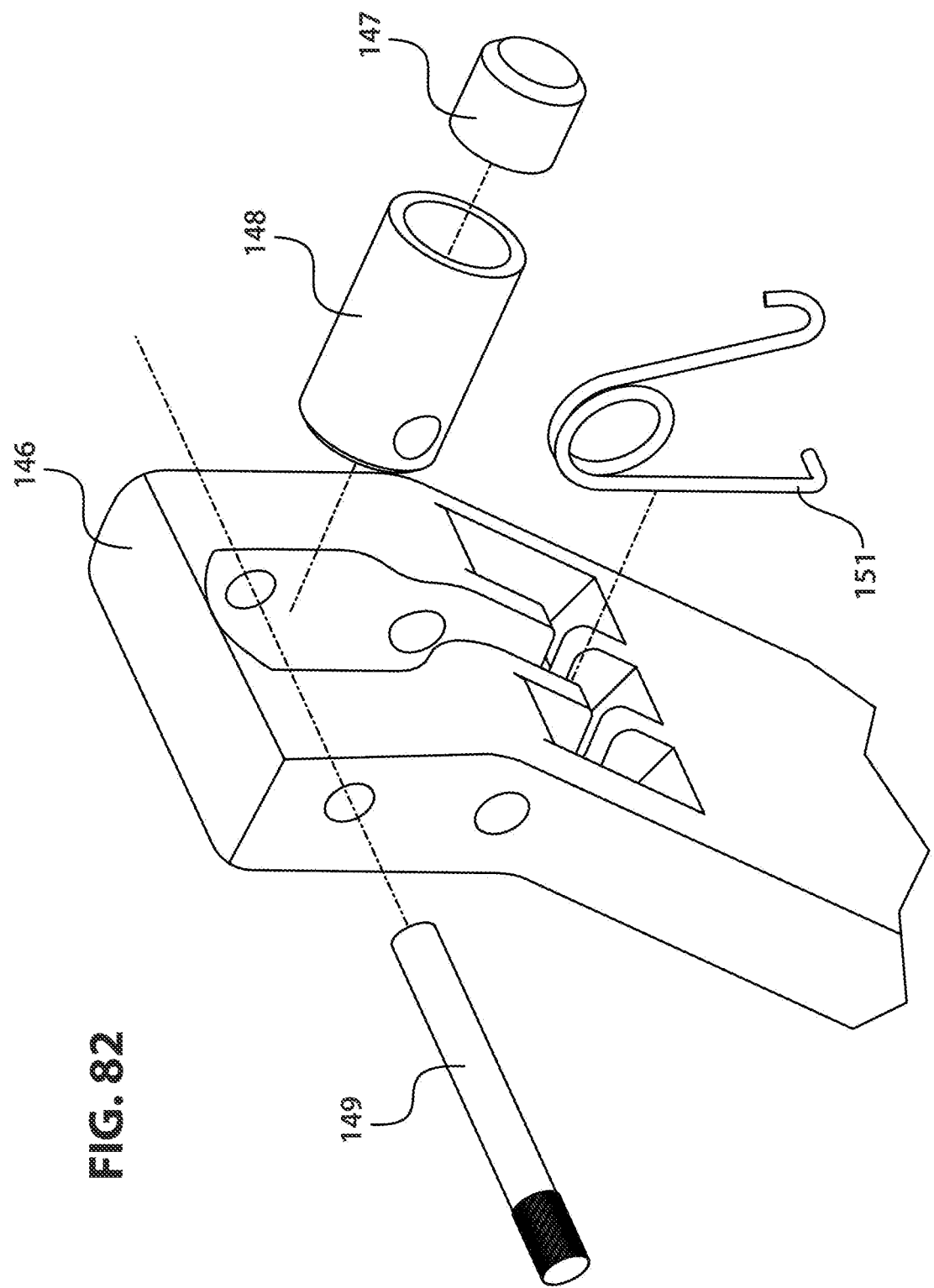
FIG. 82 and FIG. 83 illustrate perspective views demonstrating the assembly of robot-assembled arthritic-assisting injury-preventing post-centering tick-preventing water-discharging sleeve system.
Figure 83:
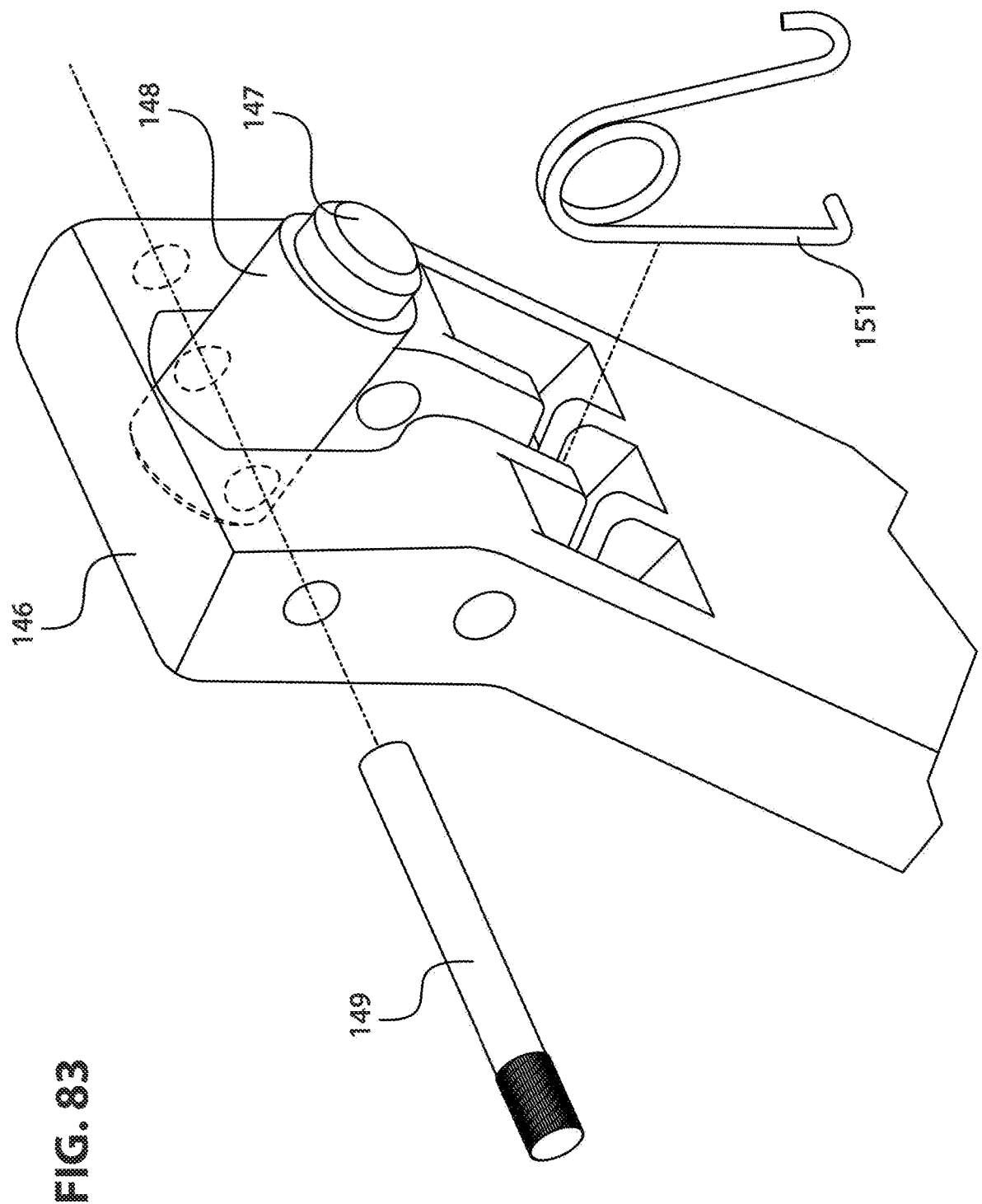
Figure 84:
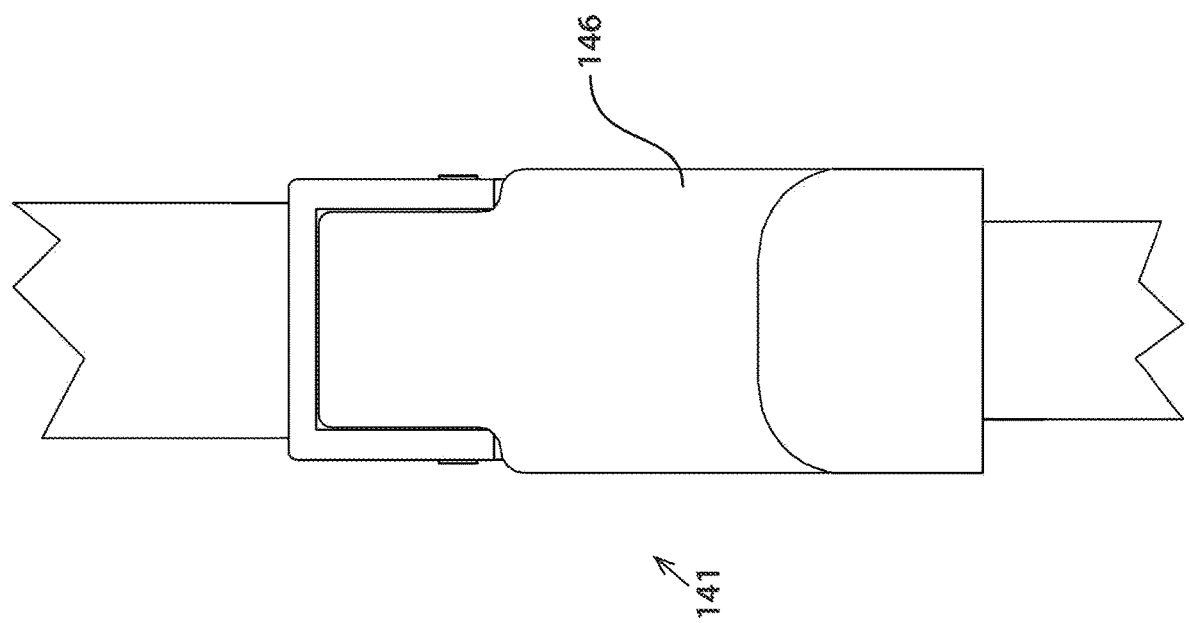
FIG. 84 and FIG. 85 illustrate front and side views of sleeve robot-assembled arthritic-assisting height-adjusting dog-run-panel-rope hooks.
Figure 85:
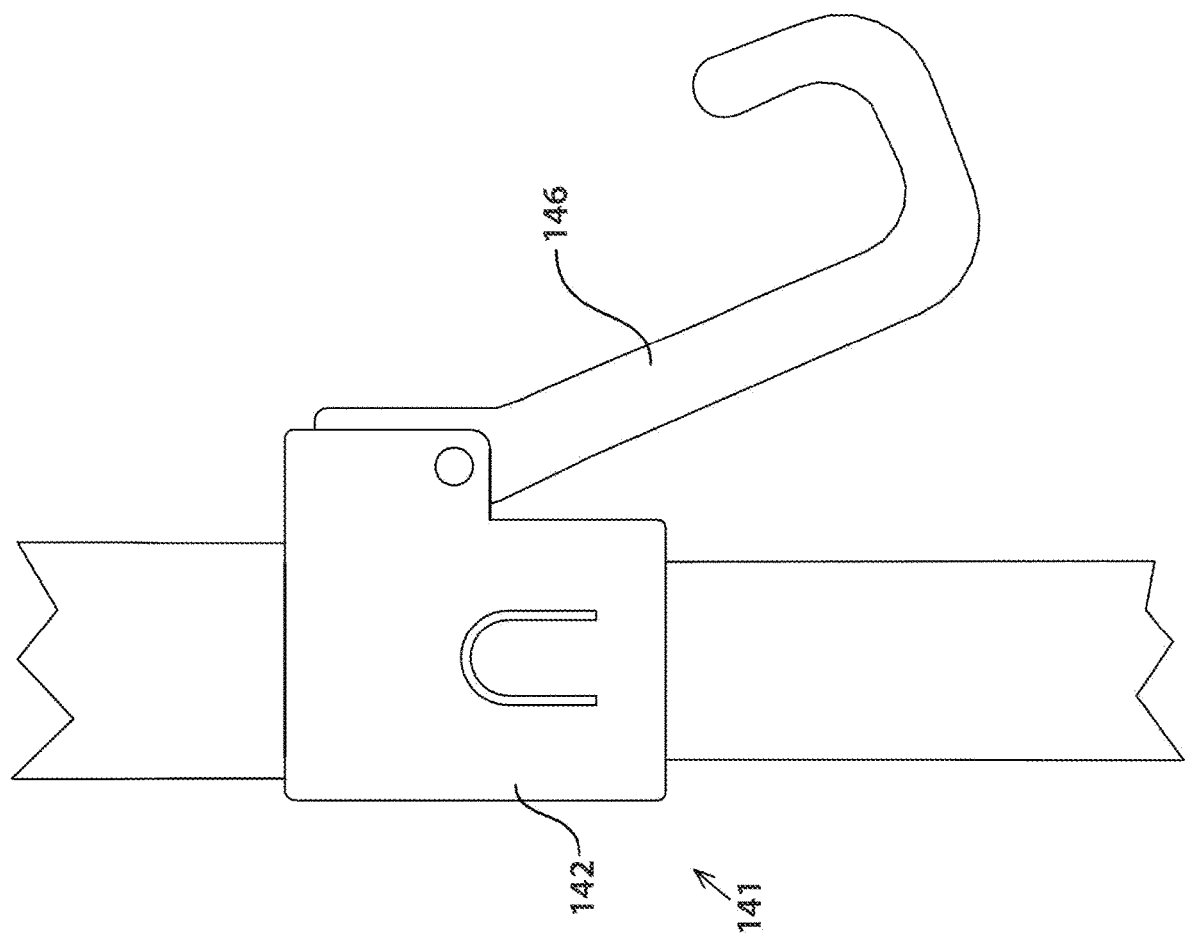
Figure 86:
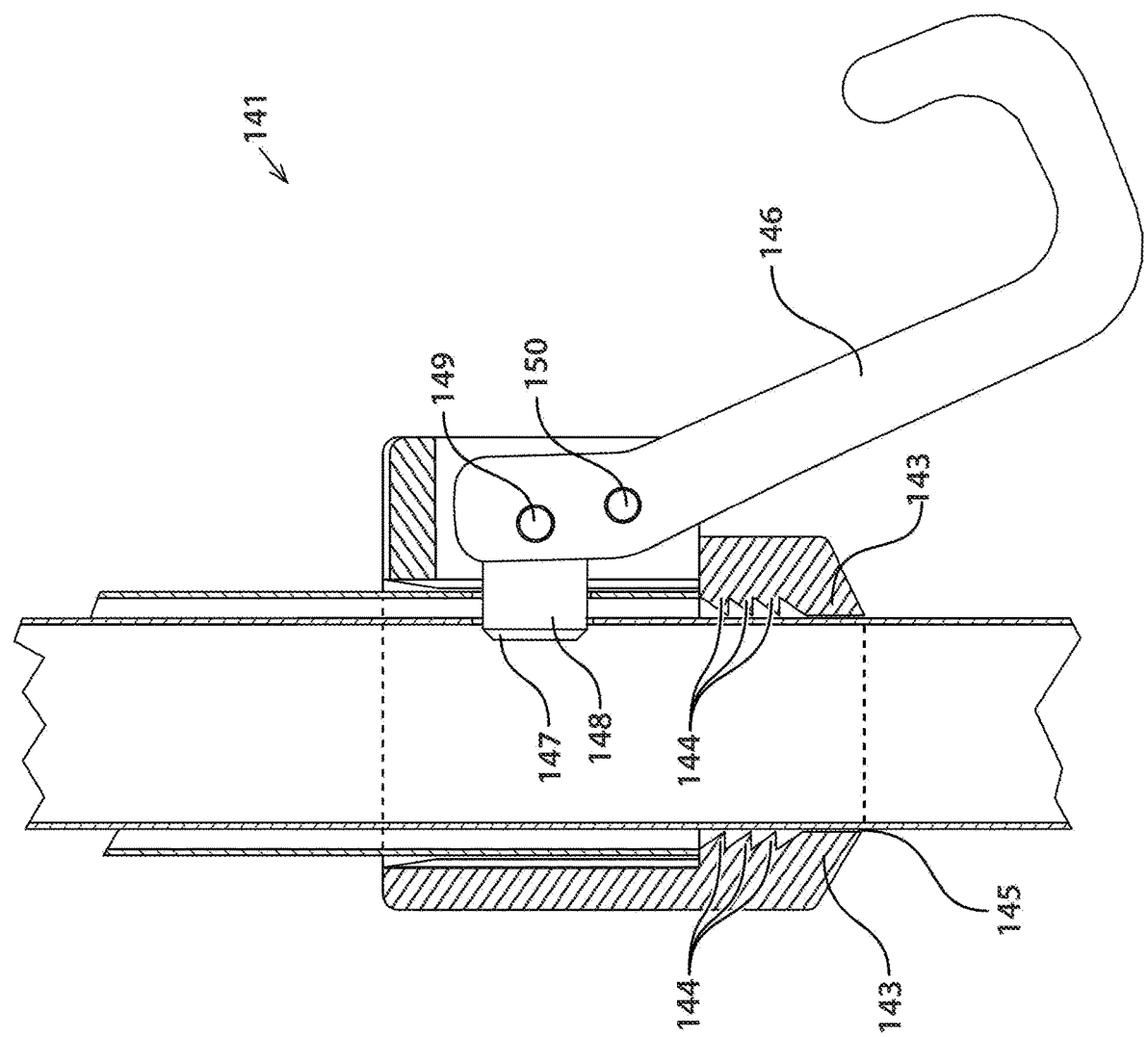
FIG. 86 and FIG. 87 illustrate cross-sectional views demonstrating sleeve robot-assembled post-centering clamps, sleeve robot-assembled tick-preventing downward teeth, and sleeve robot-assembled water-discharging grooves.
Figure 87:
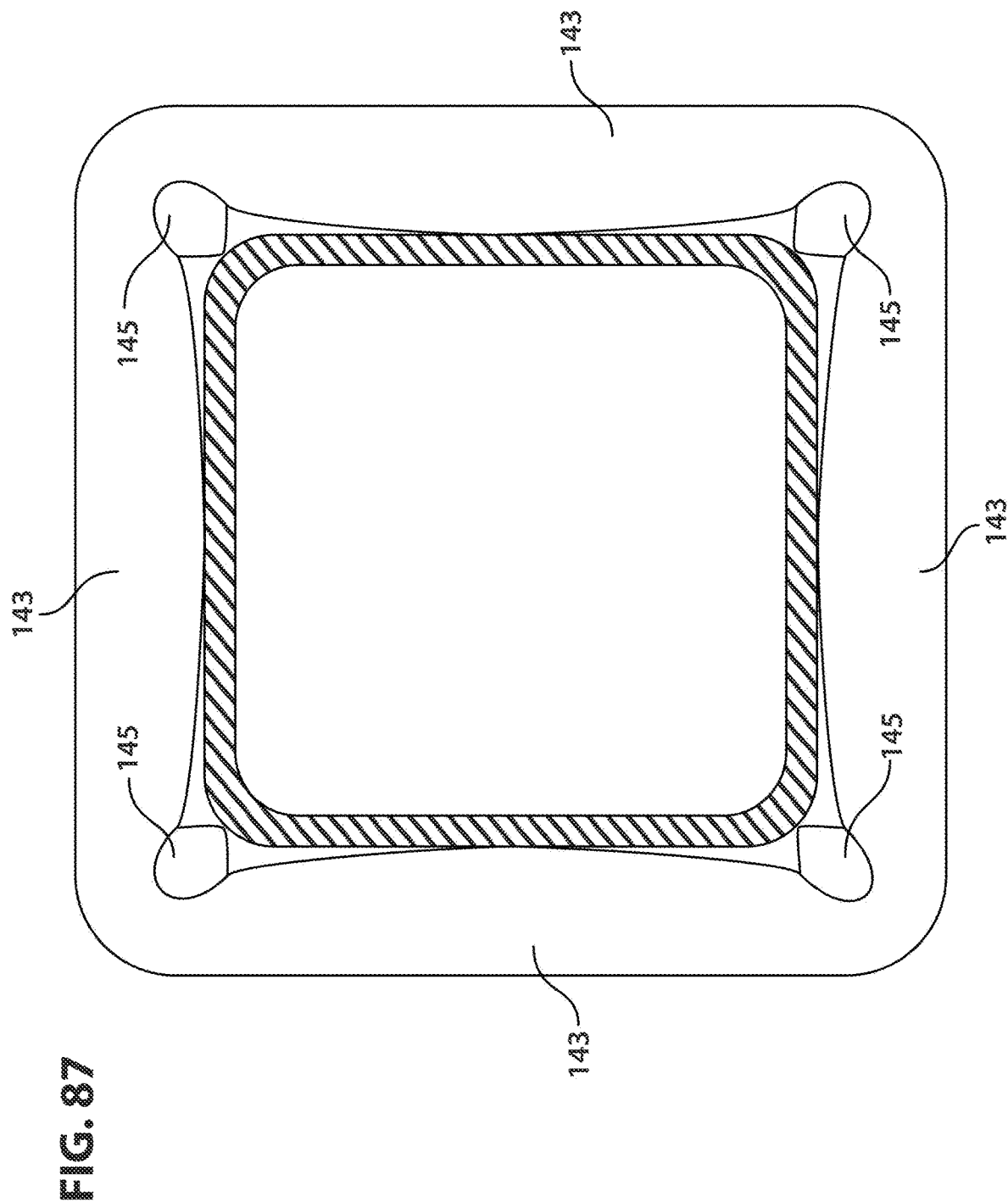
Figure 88:
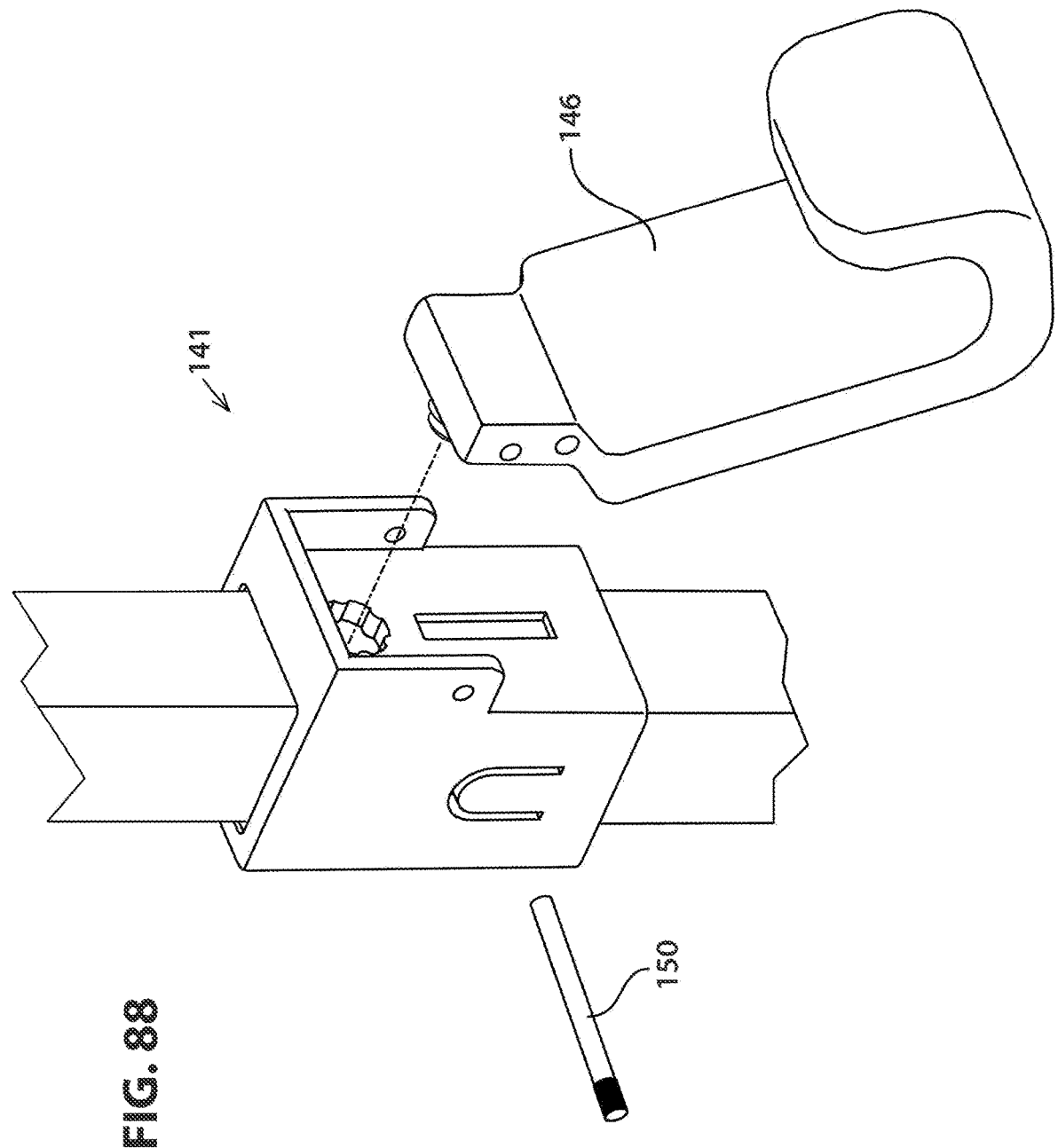
FIG. 88 and FIG. 89 illustrate perspective views demonstrating the assembly of robot-assembled arthritic-assisting injury-preventing post-centering tick-preventing water-discharging sleeve system.
Figure 89:
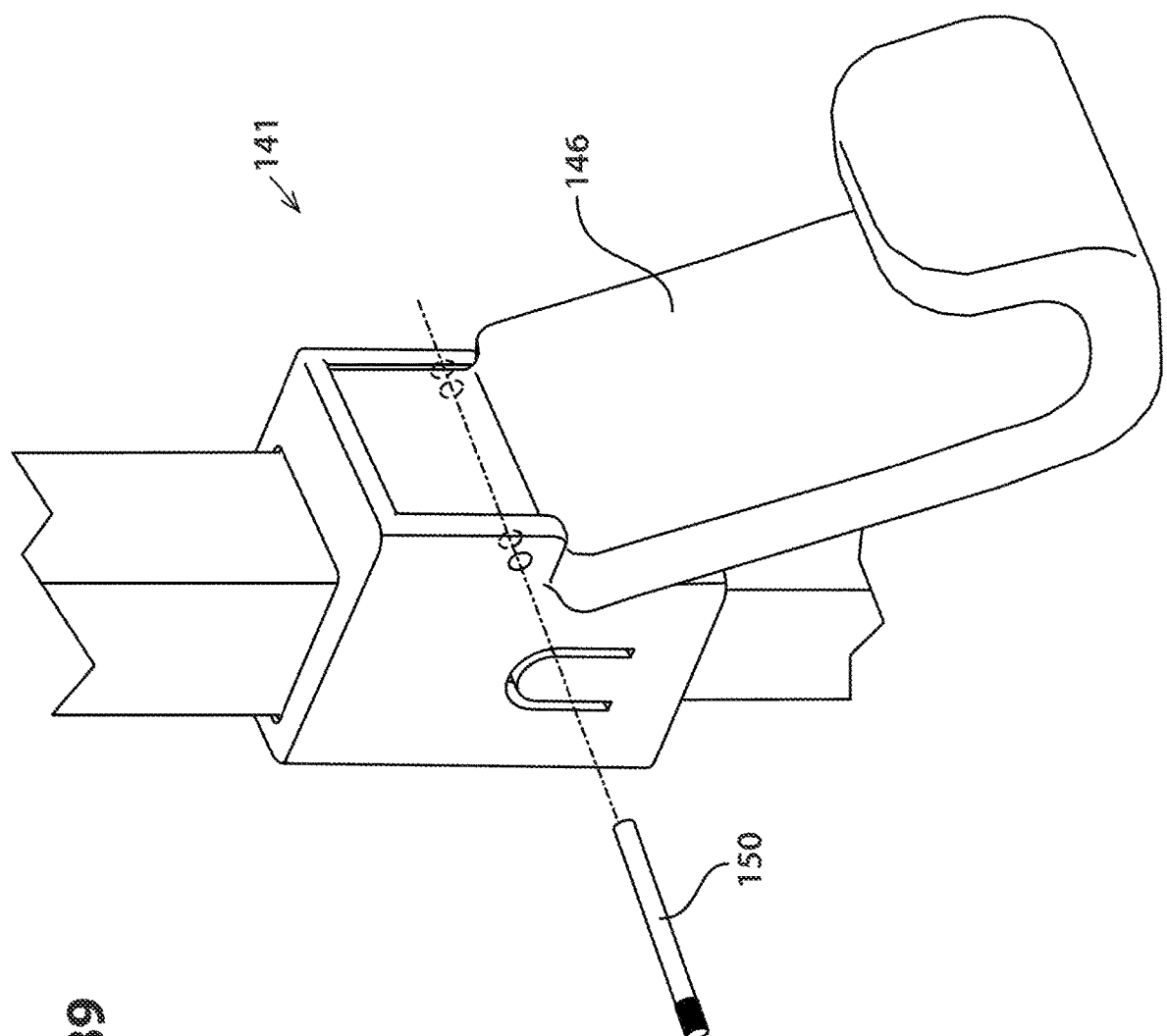
Figure 90:
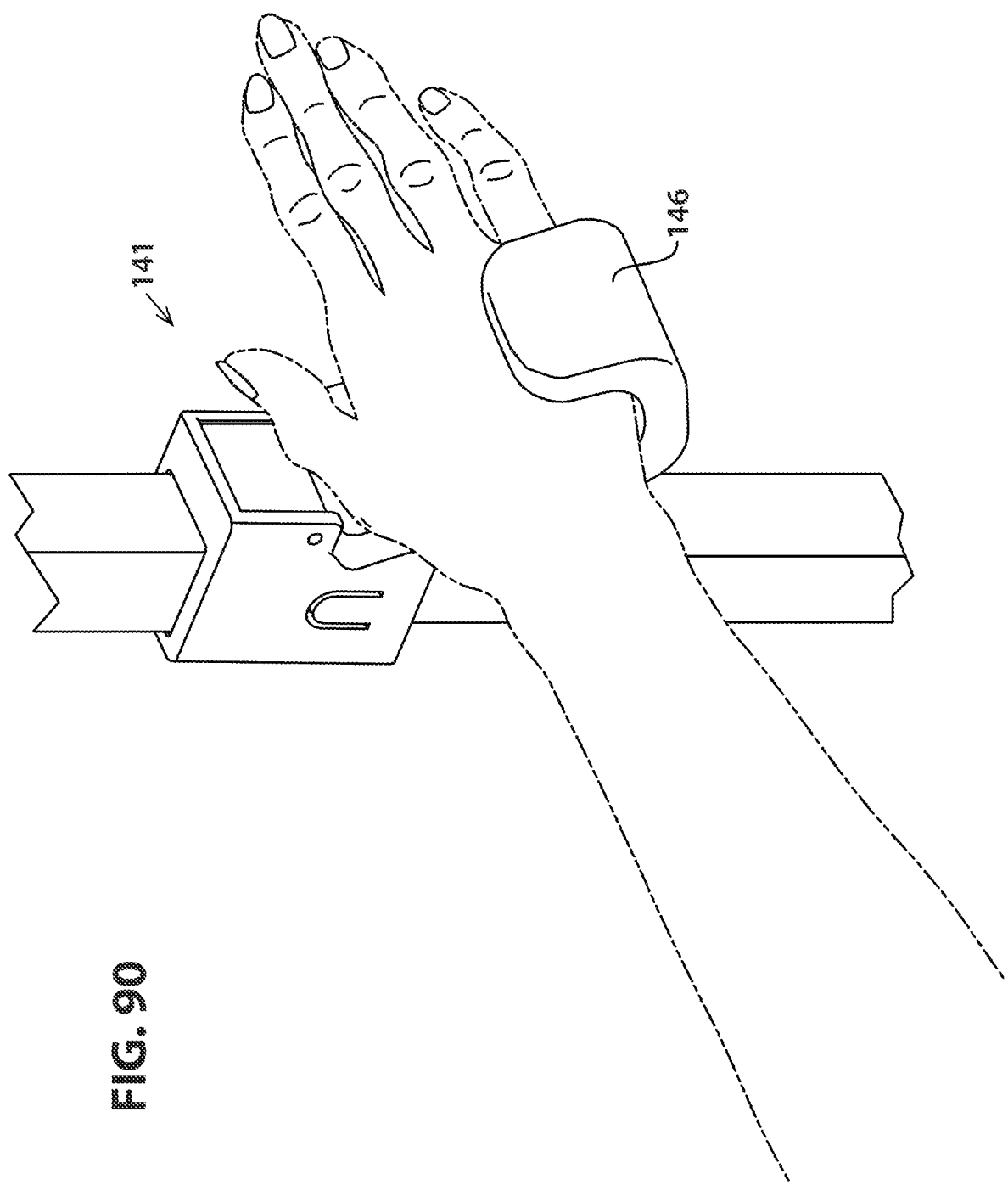
FIG. 90 illustrates a perspective view demonstrating how an arthritic can operate sleeve robot-assembled arthritic-assisting height-adjusting dog-run-panel-rope hooks without the need to close the hand.
Figure 91:
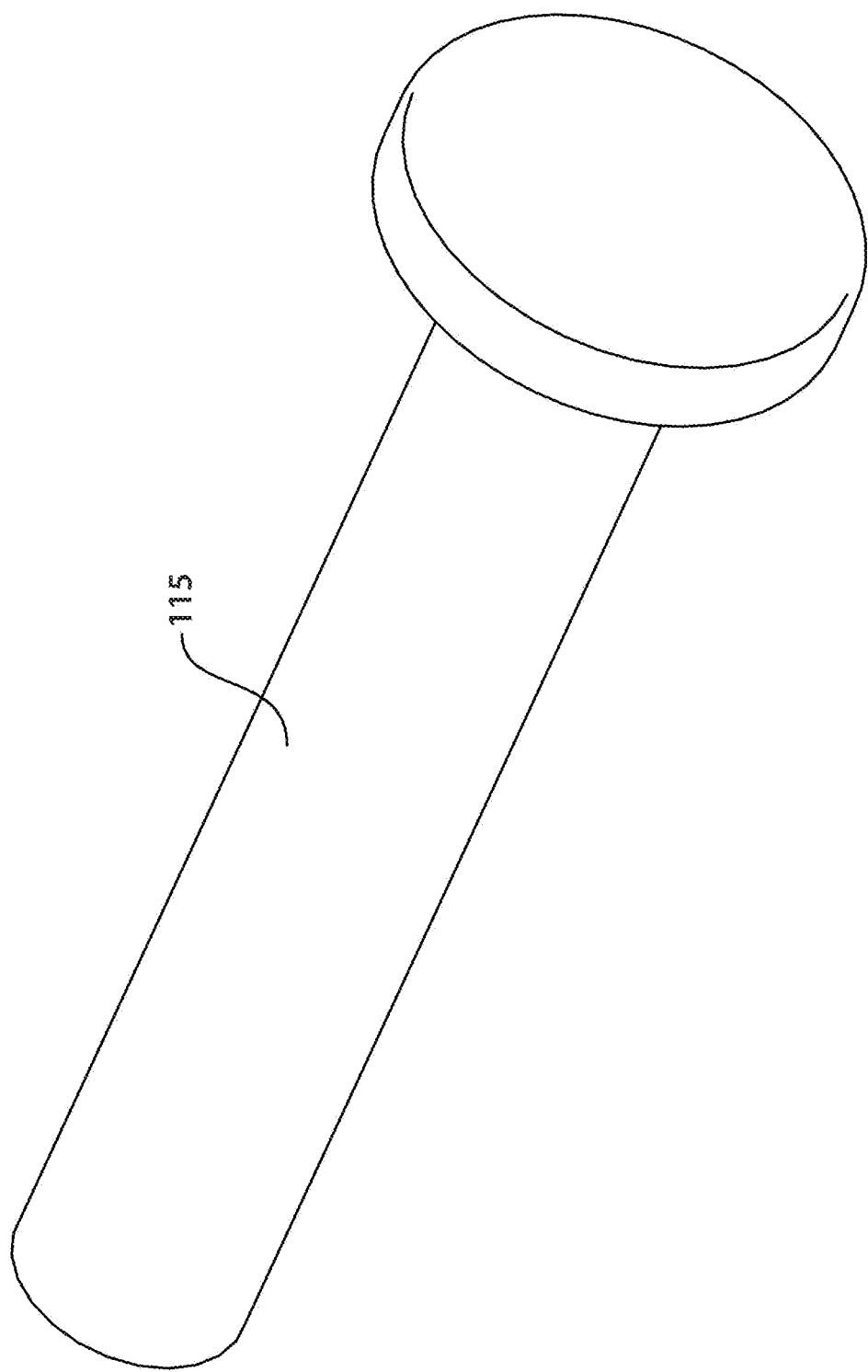
FIG. 91, FIG. 92, FIG. 93, and FIG. 94 illustrate perspective views of top robot-assembled heat-expandable cold-contractable double-tail rivets and robot-assembled heat-expandable cold-contractable double-tail cover-cushion rivets, respectively.
Figure 92:
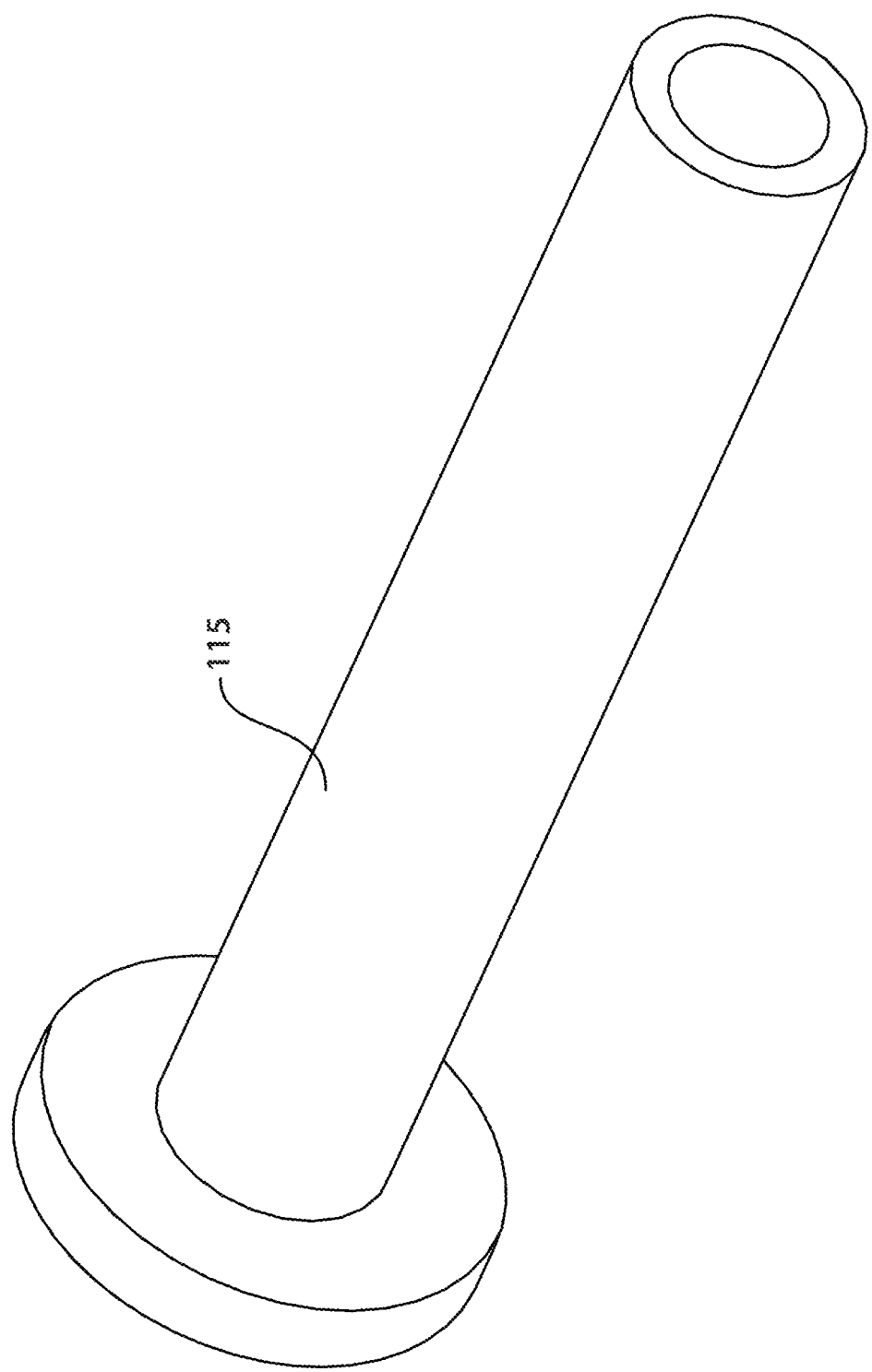
Figure 93:
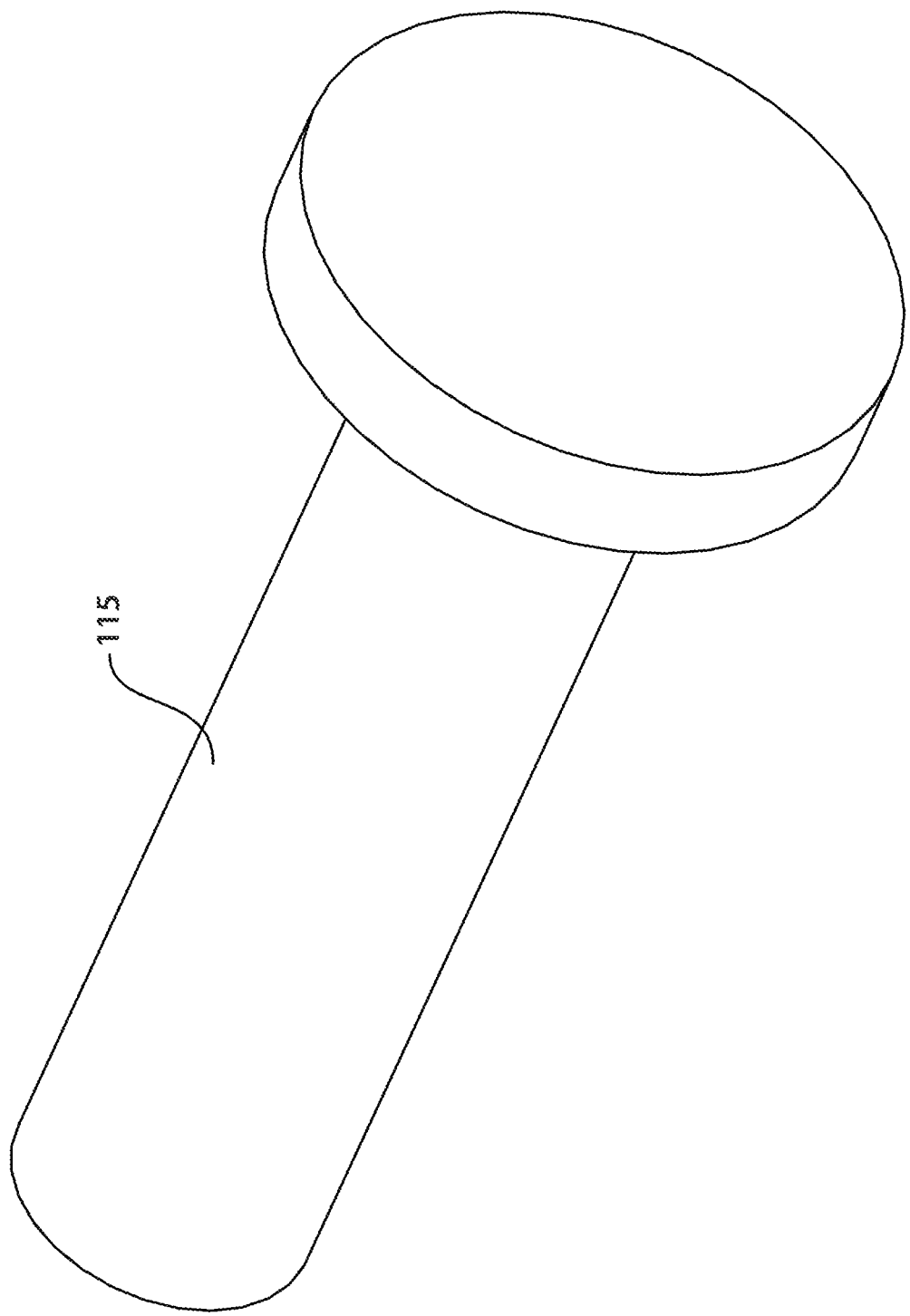
Figure 94:
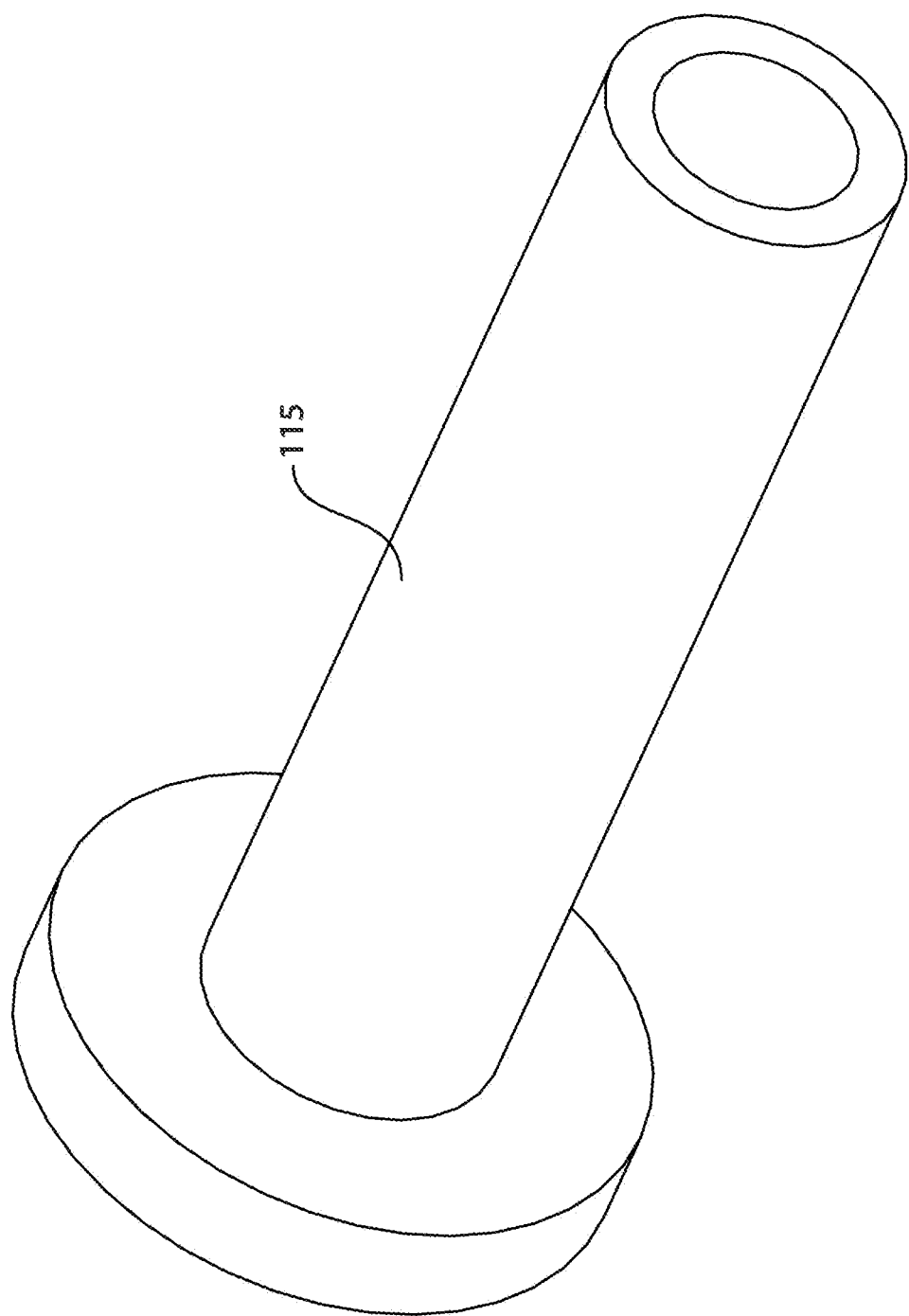
Figure 95:
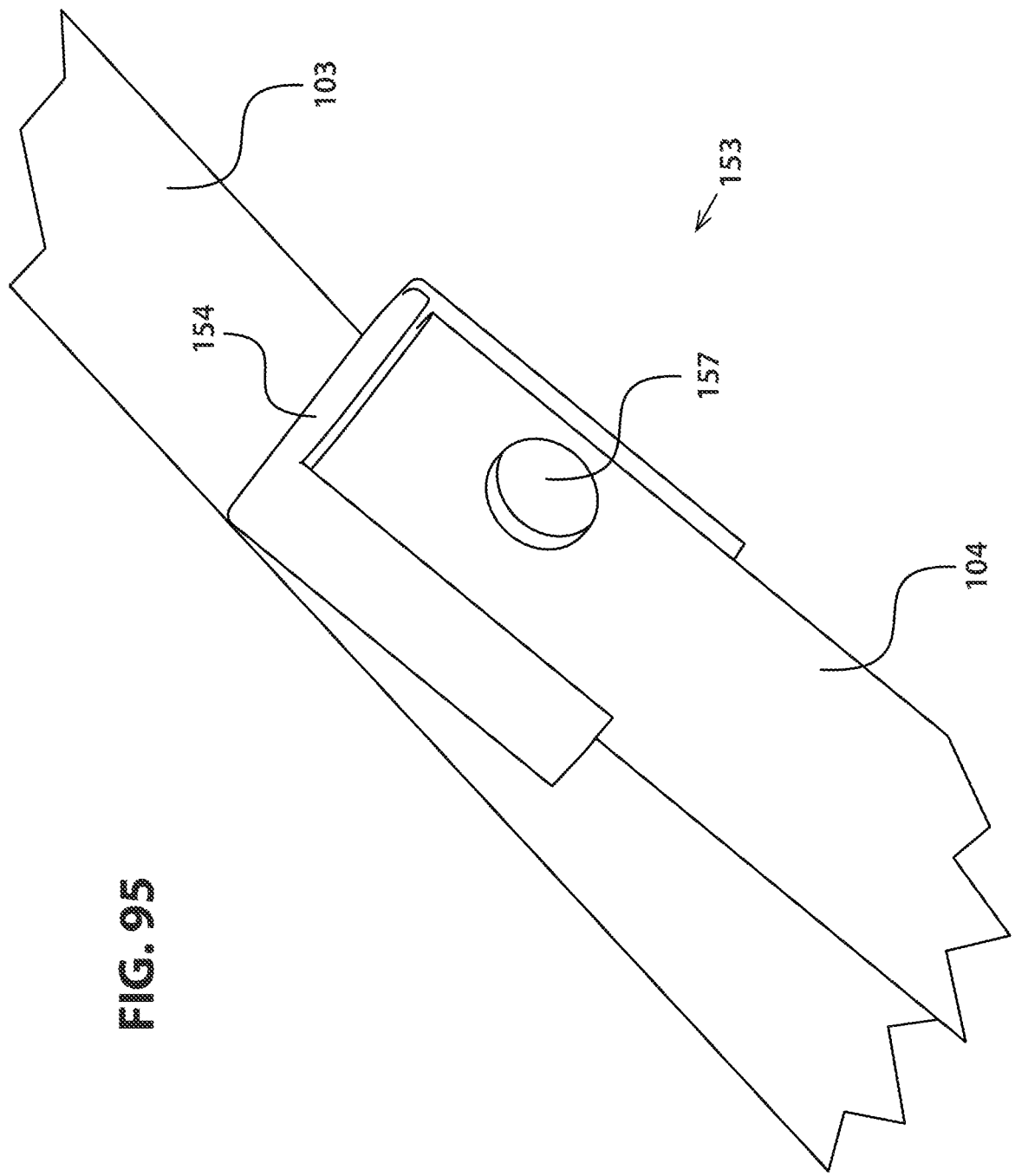
FIG. 95, FIG. 96, and FIG. 97 illustrate perspective views of robot-assembled noise-canceling injury-preventing rust-preventing truss-centering cover-cushion system.
Figure 96:
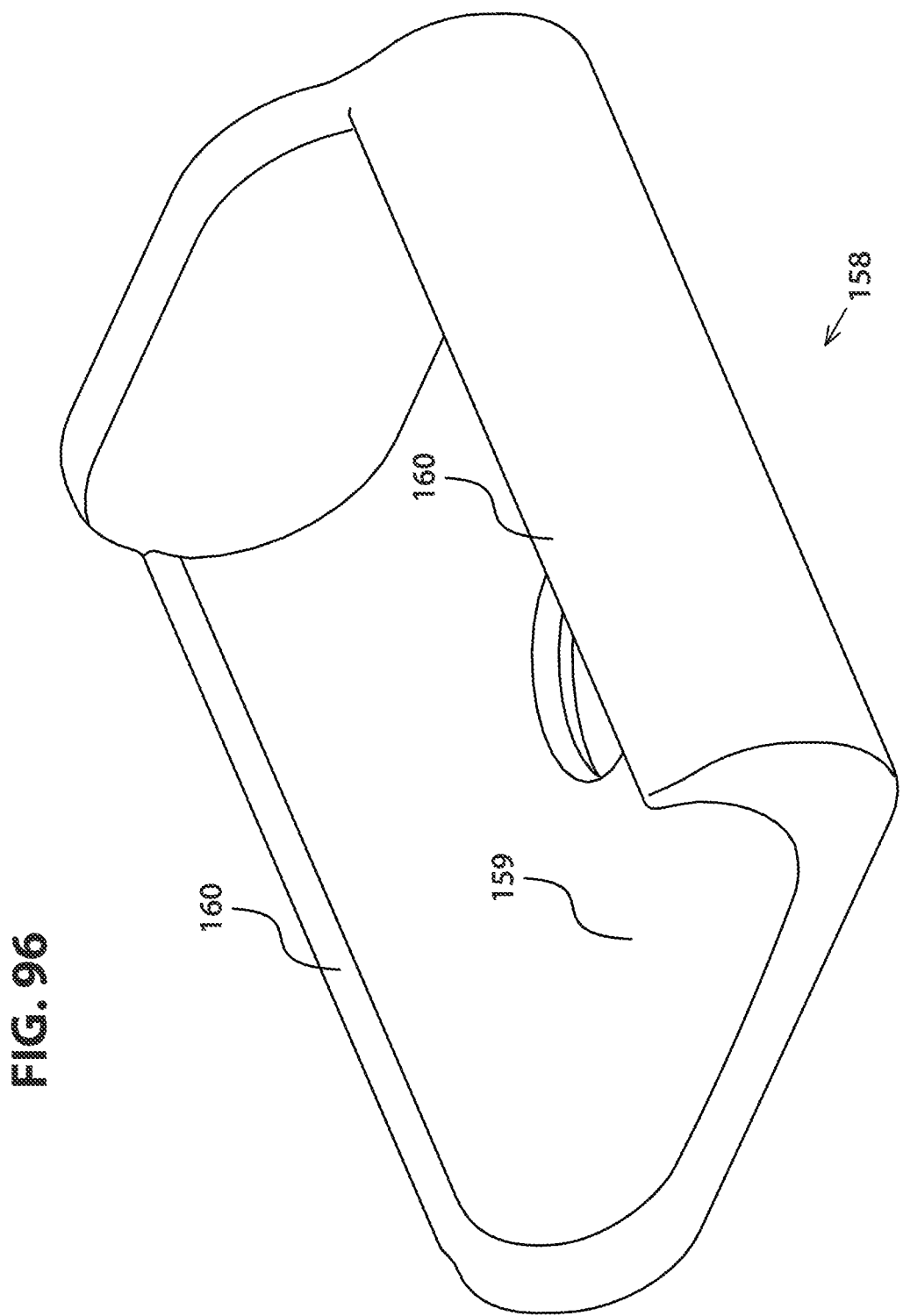
Figure 97:
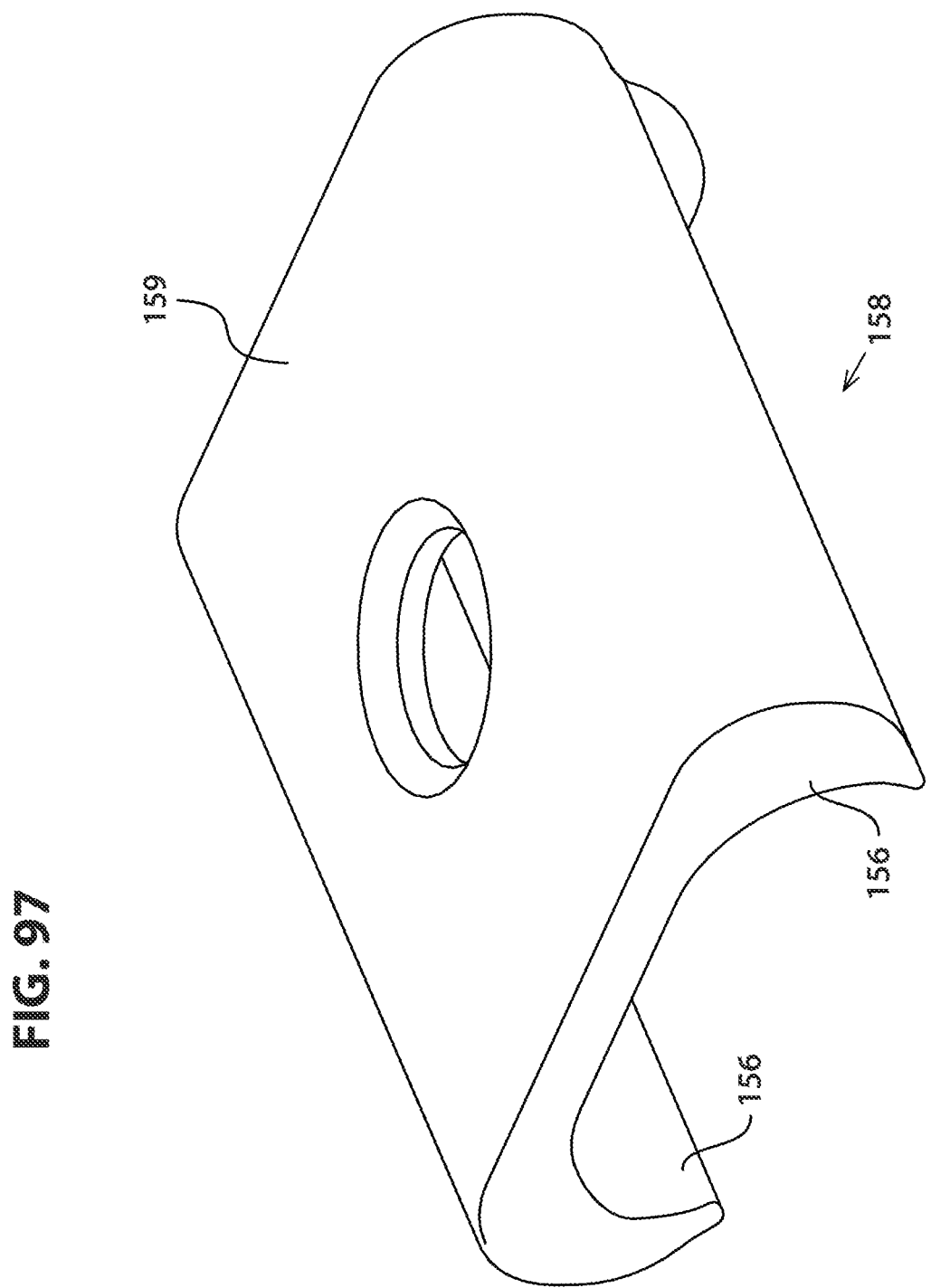
Figure 98:
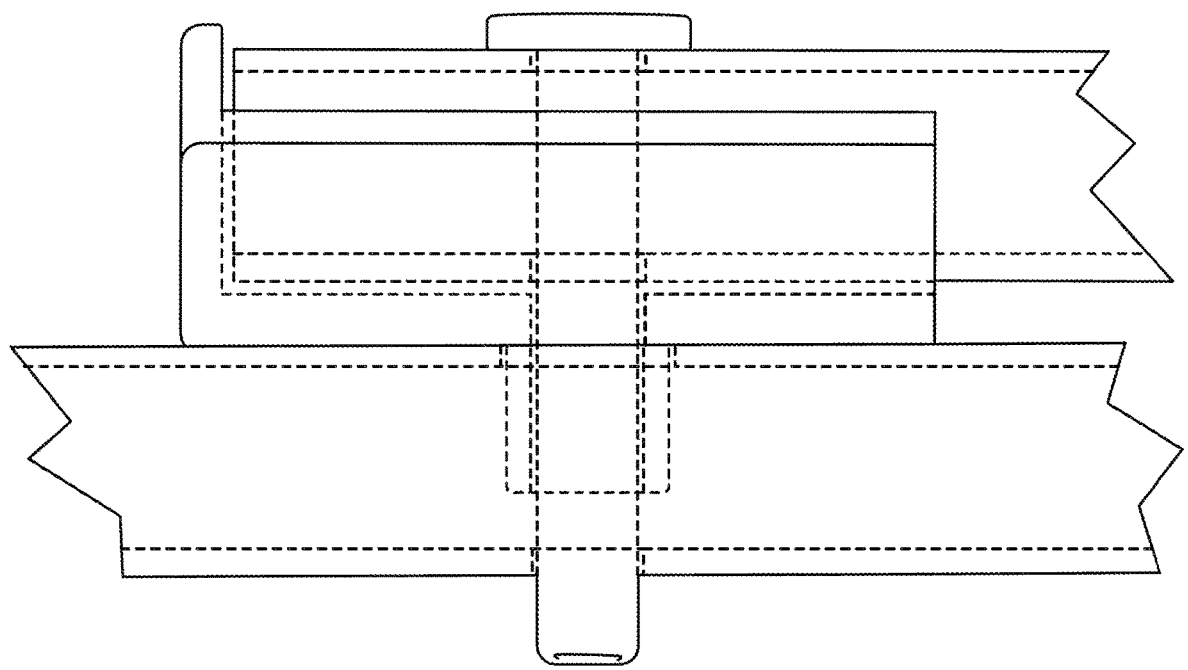
FIG. 98 illustrates a cross-sectional view of robot-assembled noise-canceling injury-preventing rust-preventing truss-centering cover-cushion system.
Figure 99:
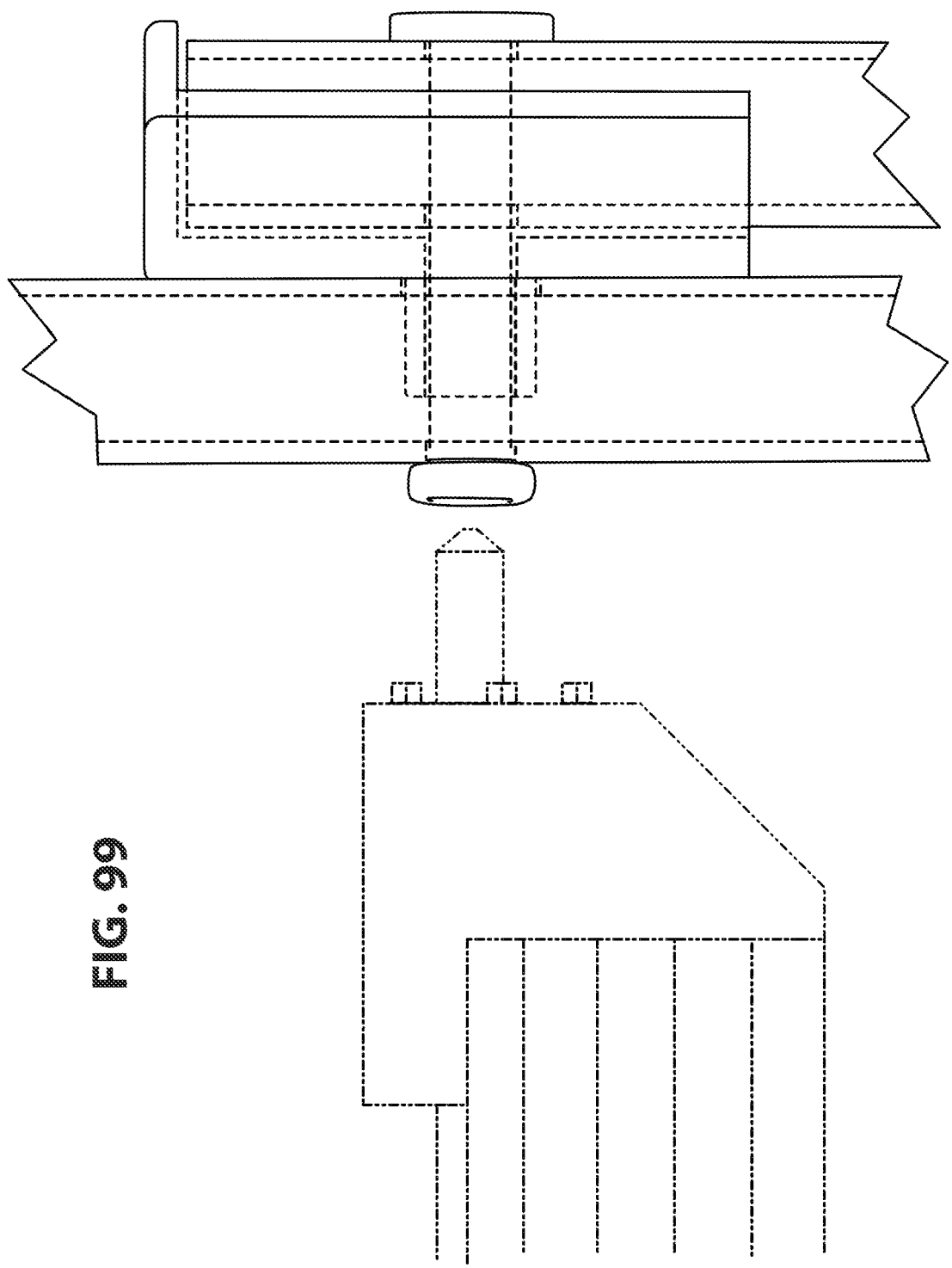
FIG. 99 and FIG. 100 illustrate cross-sectional and perspective views of how robot-assembled noise-canceling injury-preventing rust-preventing truss-centering cover-cushion system is robotically installed.
Figure 100:
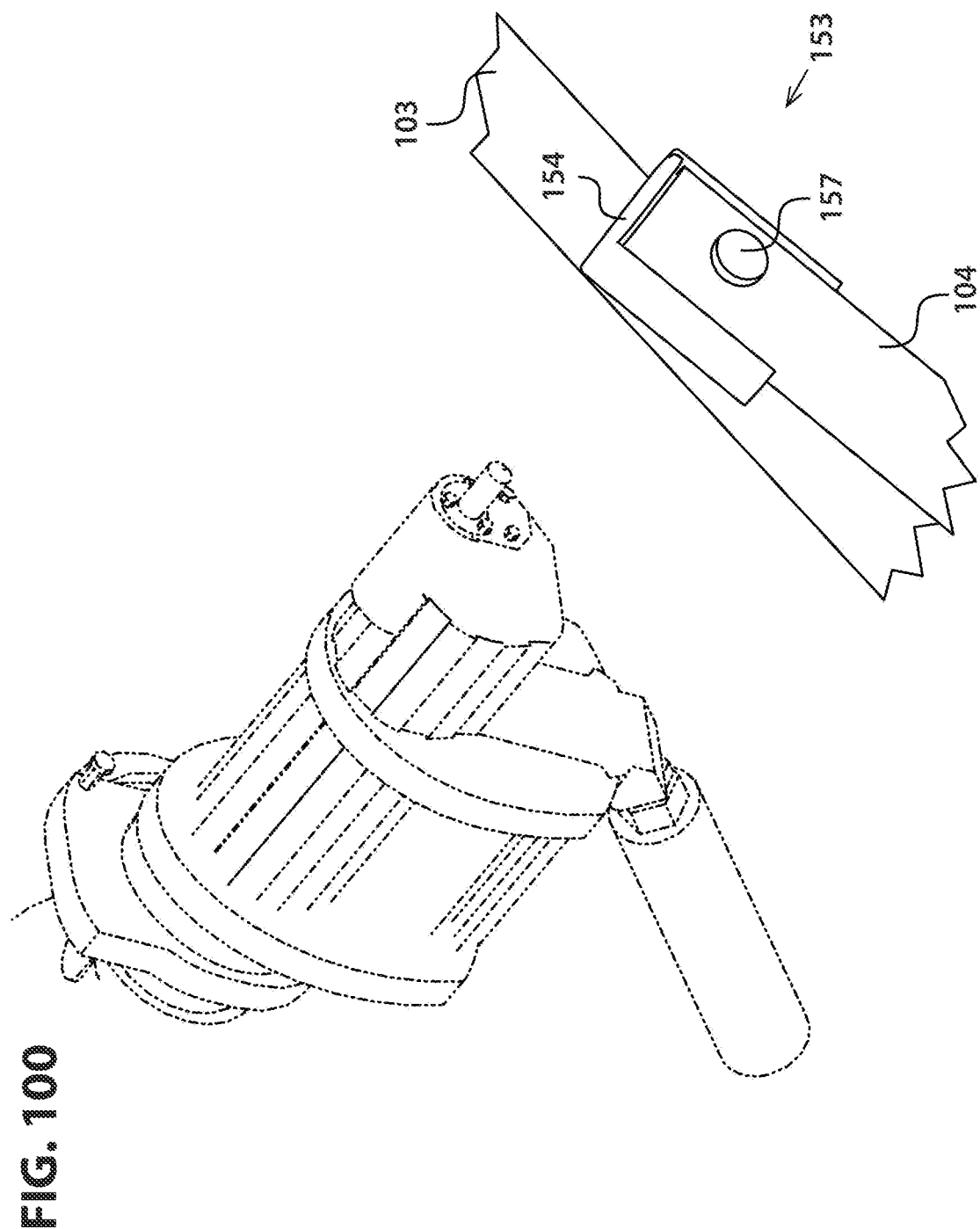
Figure 101:
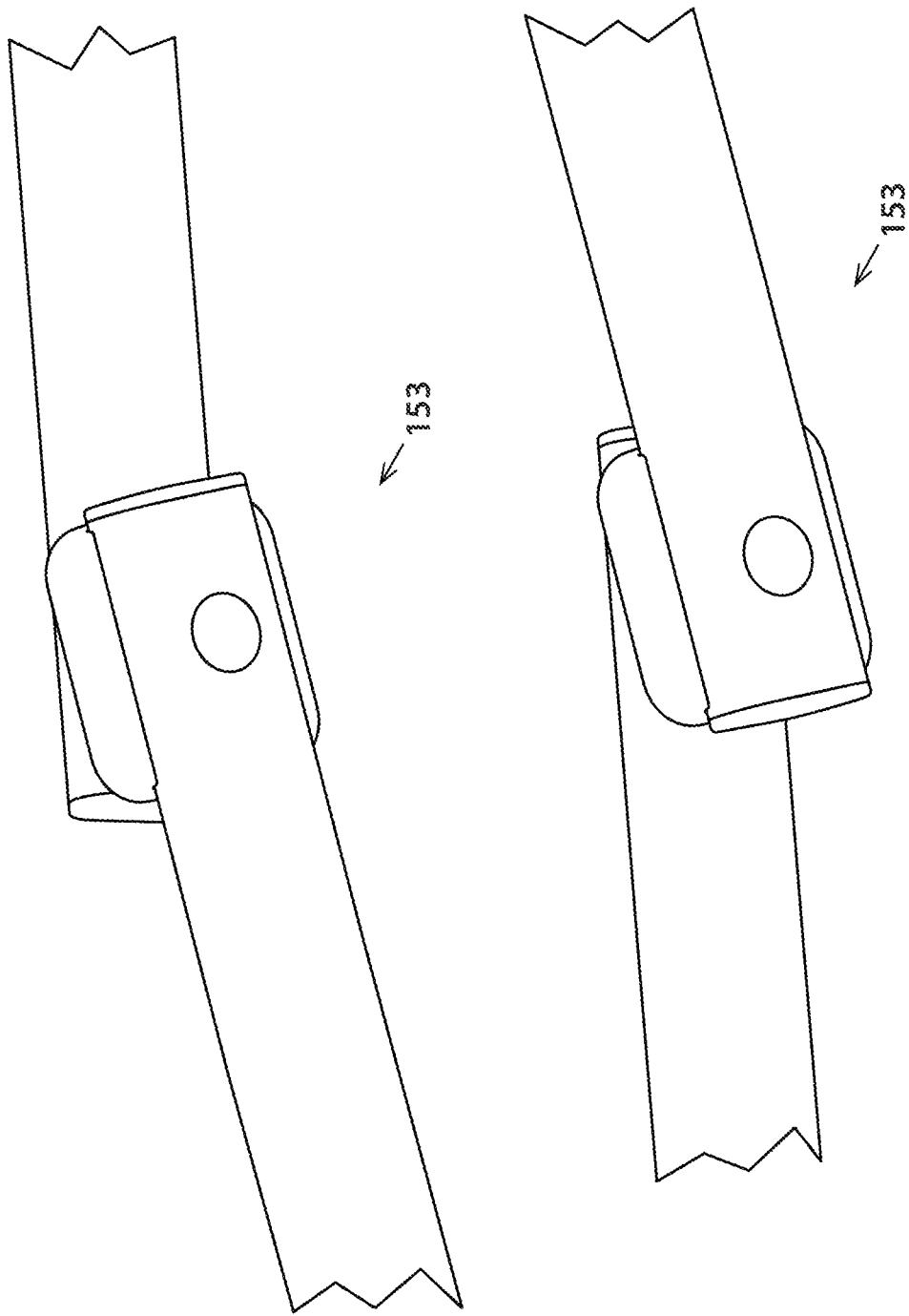
FIG. 101 and FIG. 102 illustrate perspective views of robot-assembled arthritic-assisting noise-canceling injury-preventing rust-preventing truss-centering cup-cushion system.
Figure 102:
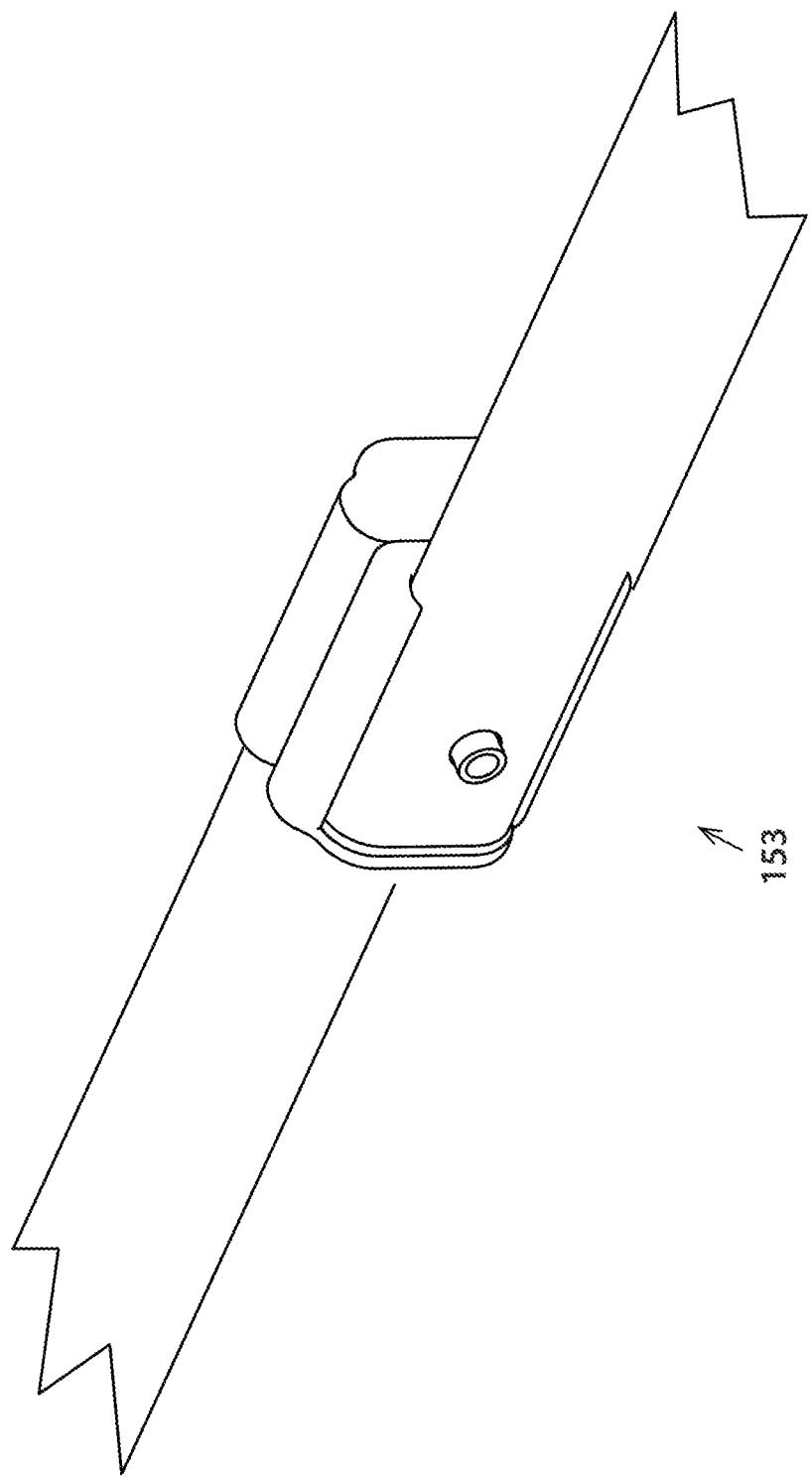
Figure 103:
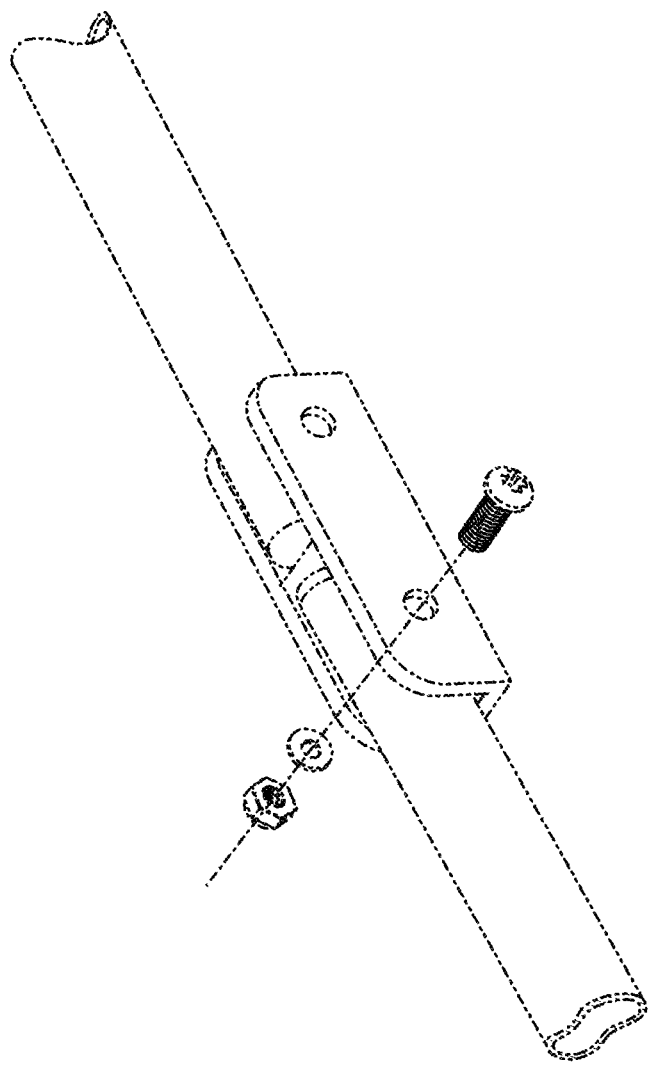
FIG. 103 (Prior Art) illustrates a perspective view of prior art demonstrating how screws, washers and nuts are used for assembly.
Figure 104:
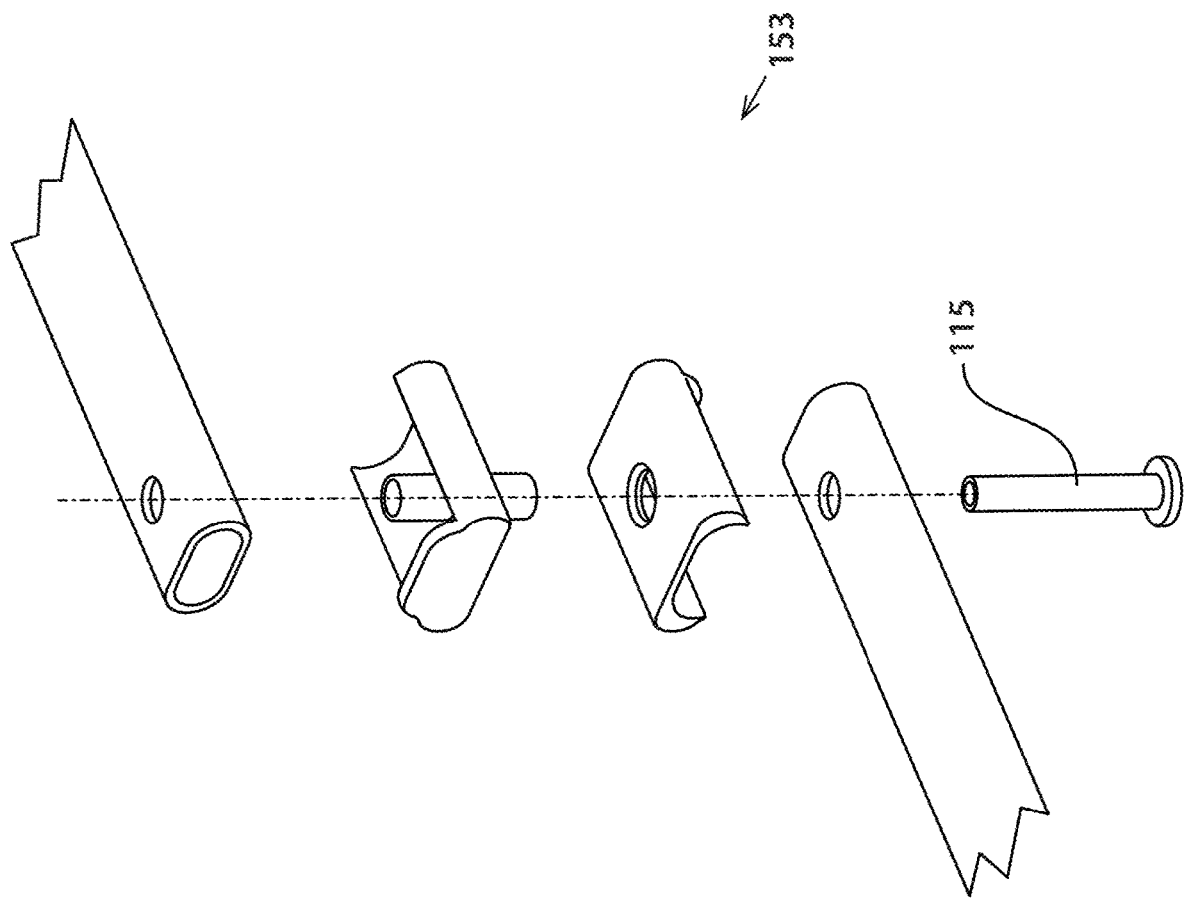
FIG. 104, FIG. 105, FIG. 106, FIG. 107, and FIG. 108 illustrate perspective views of robot-assembled arthritic-assisting noise-canceling injury-preventing rust-preventing truss-centering cup-cushion system, its components and assembly.
Figure 105:
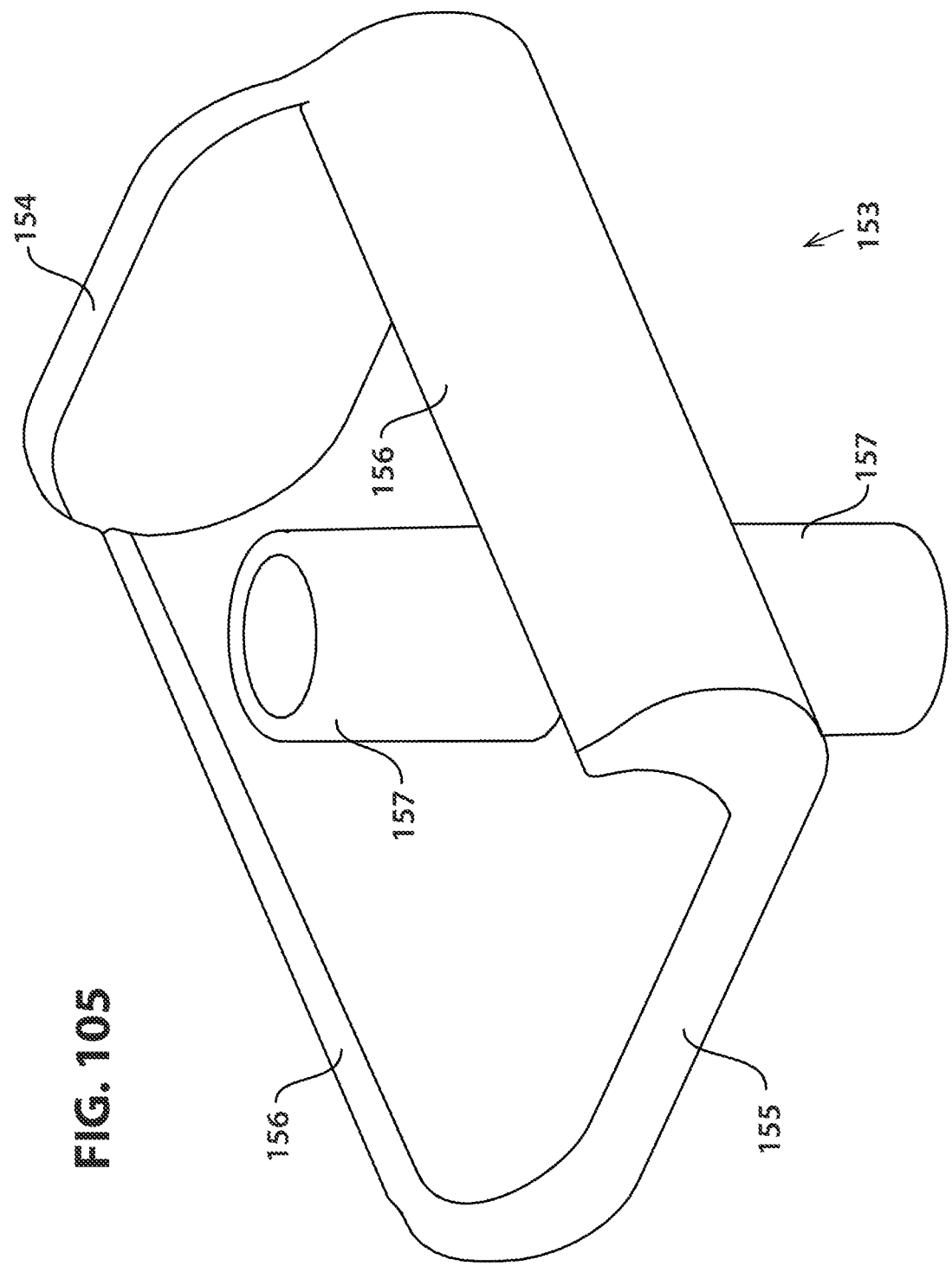
Figure 106:
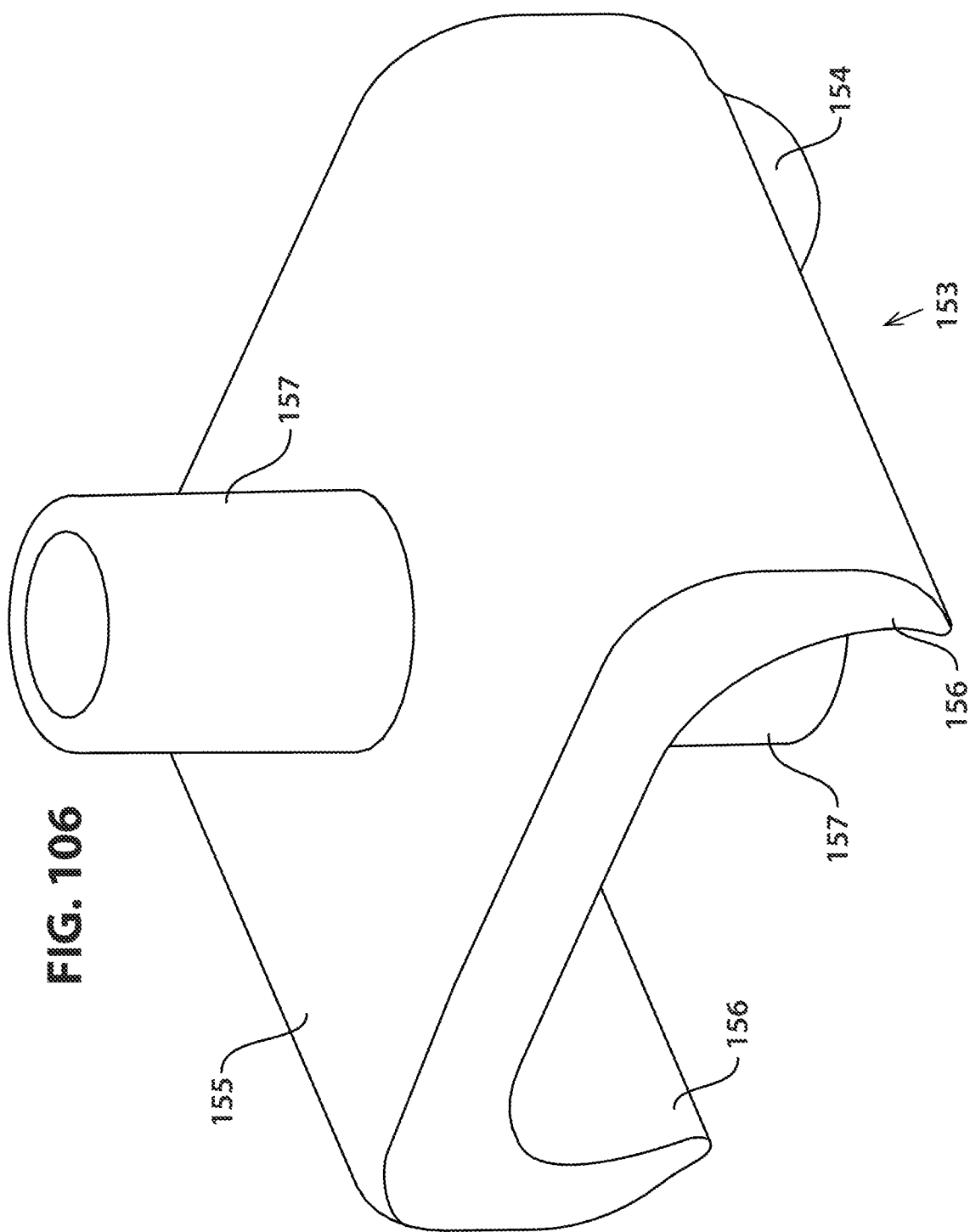
Figure 107:
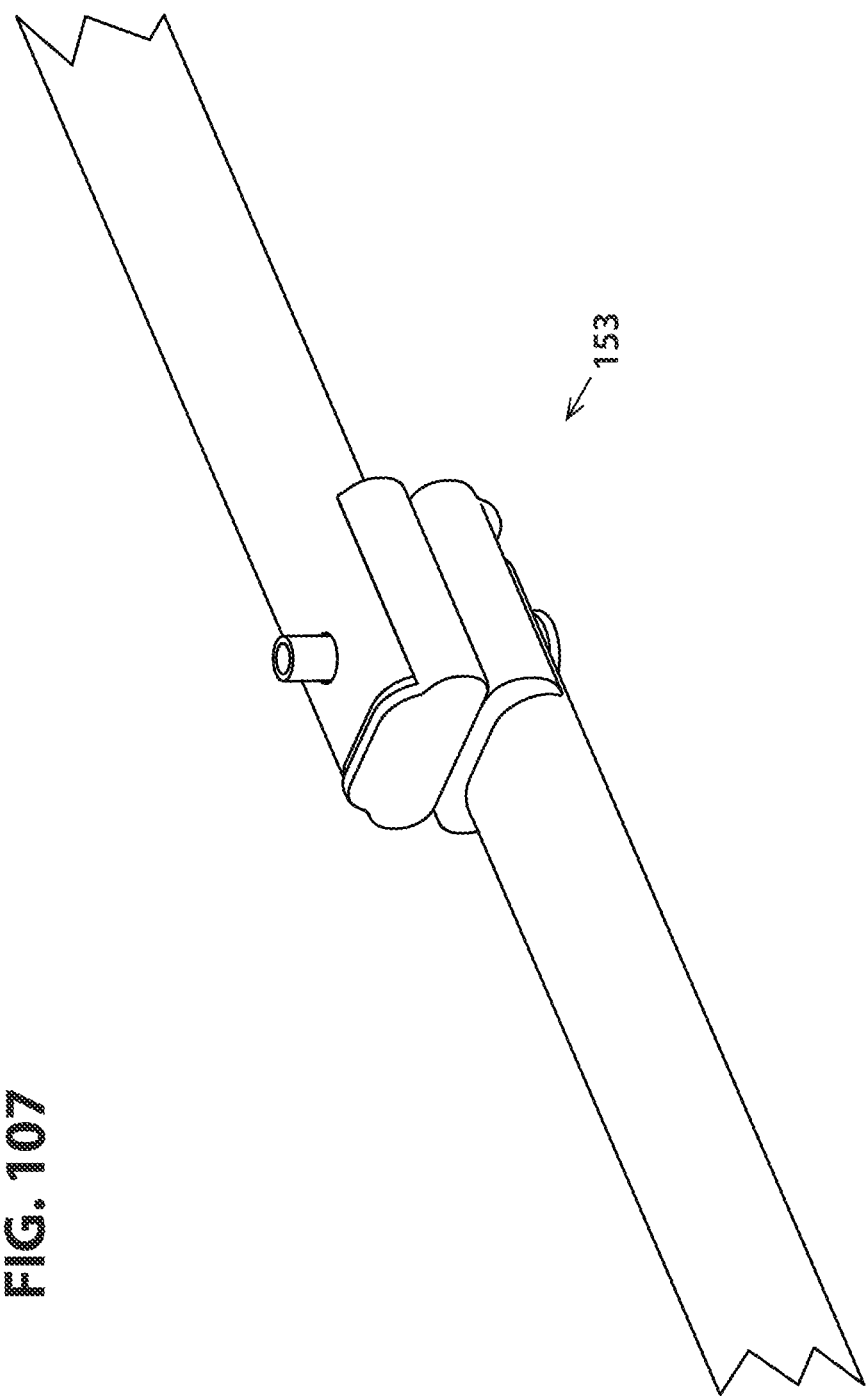
Figure 108:
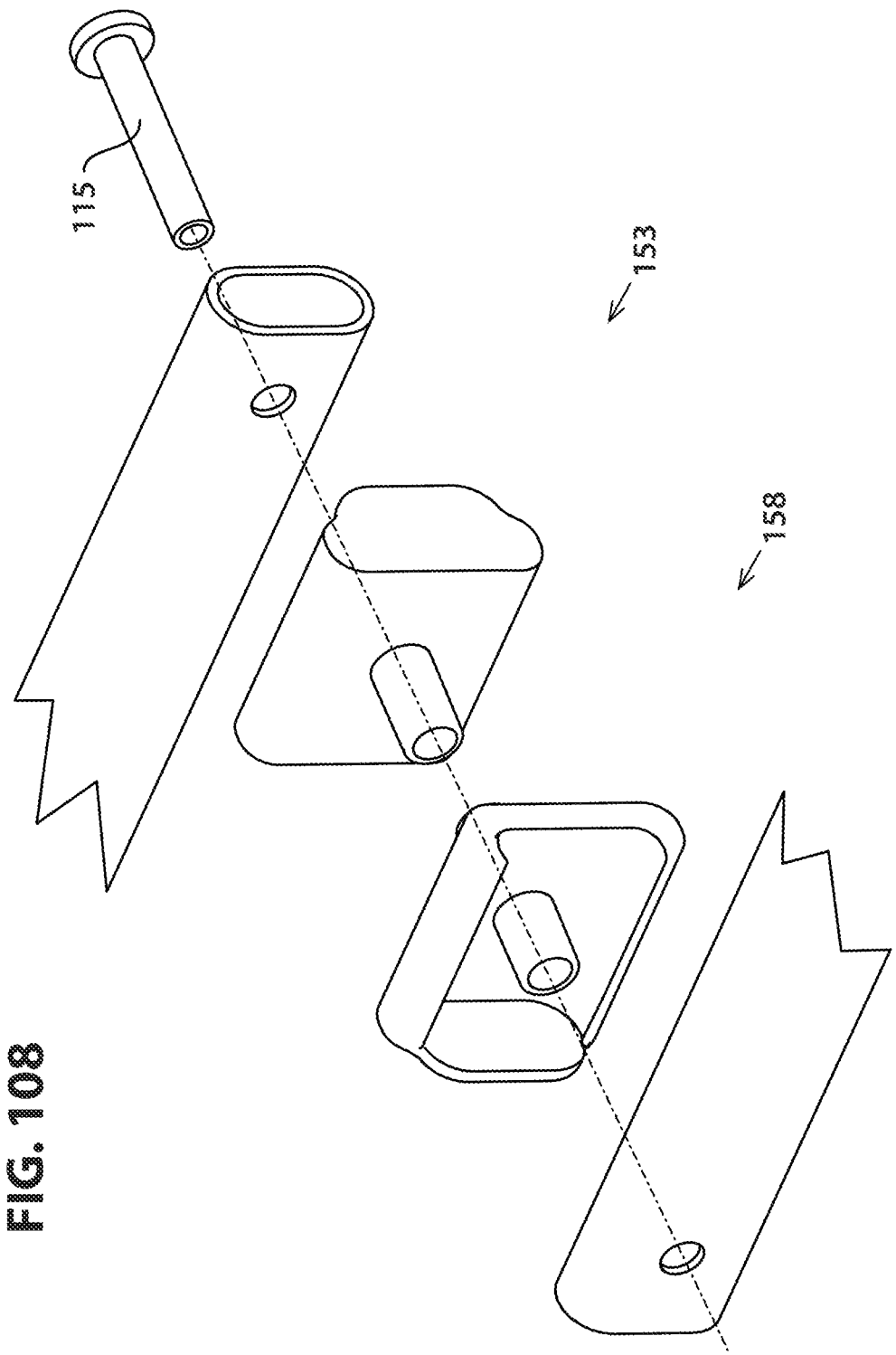
Figure 109:
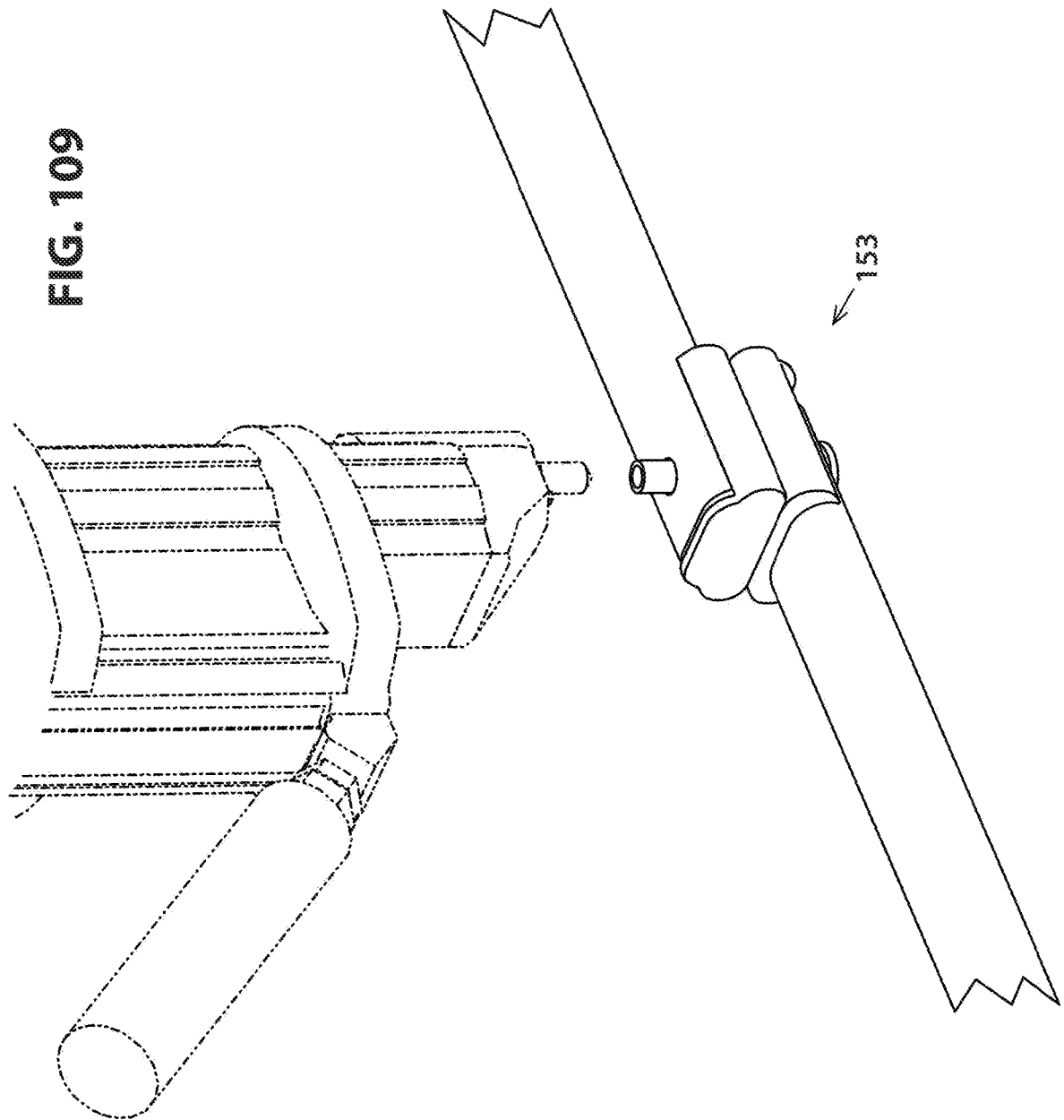
FIG. 109 illustrates a perspective view of how robot-assembled arthritic-assisting injury-preventing cone-shielding lower intersector system is robotically manufactured.
Figure 110:
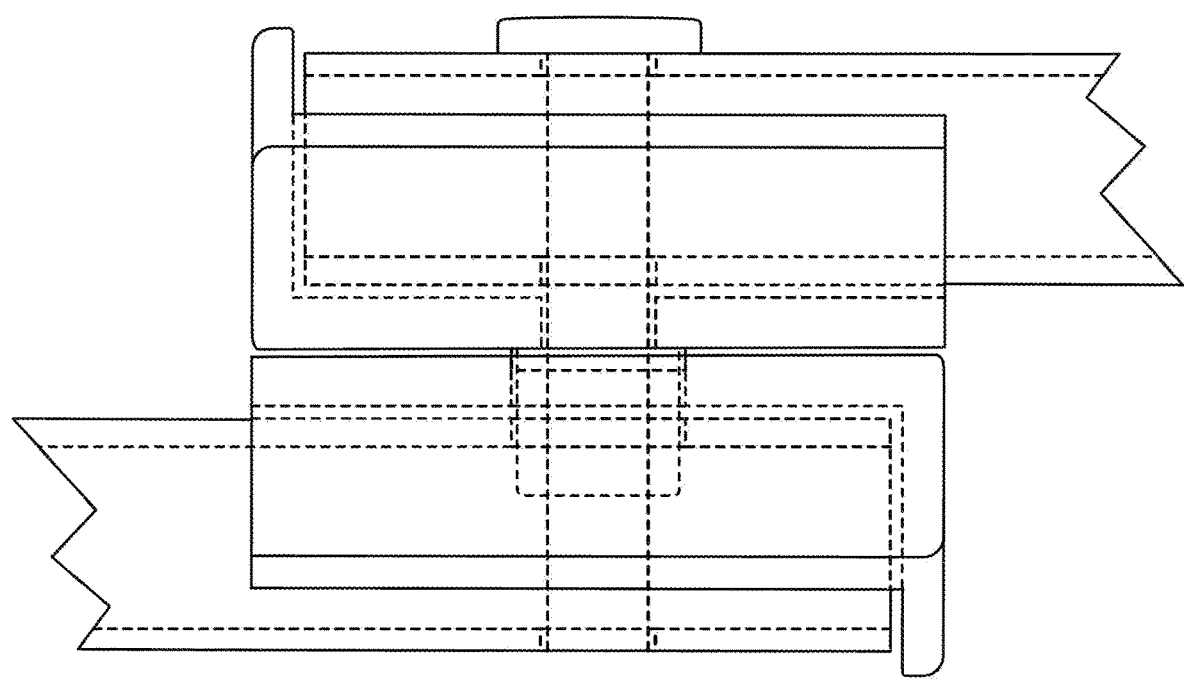
FIG. 110 and FIG. 111 illustrate cross-sectional views demonstrating how a manufacturing robot is used to heat-press robot-assembled heat-expandable cold-contractable double-tail cover-cushion rivets to lock them in place.
Figure 111:
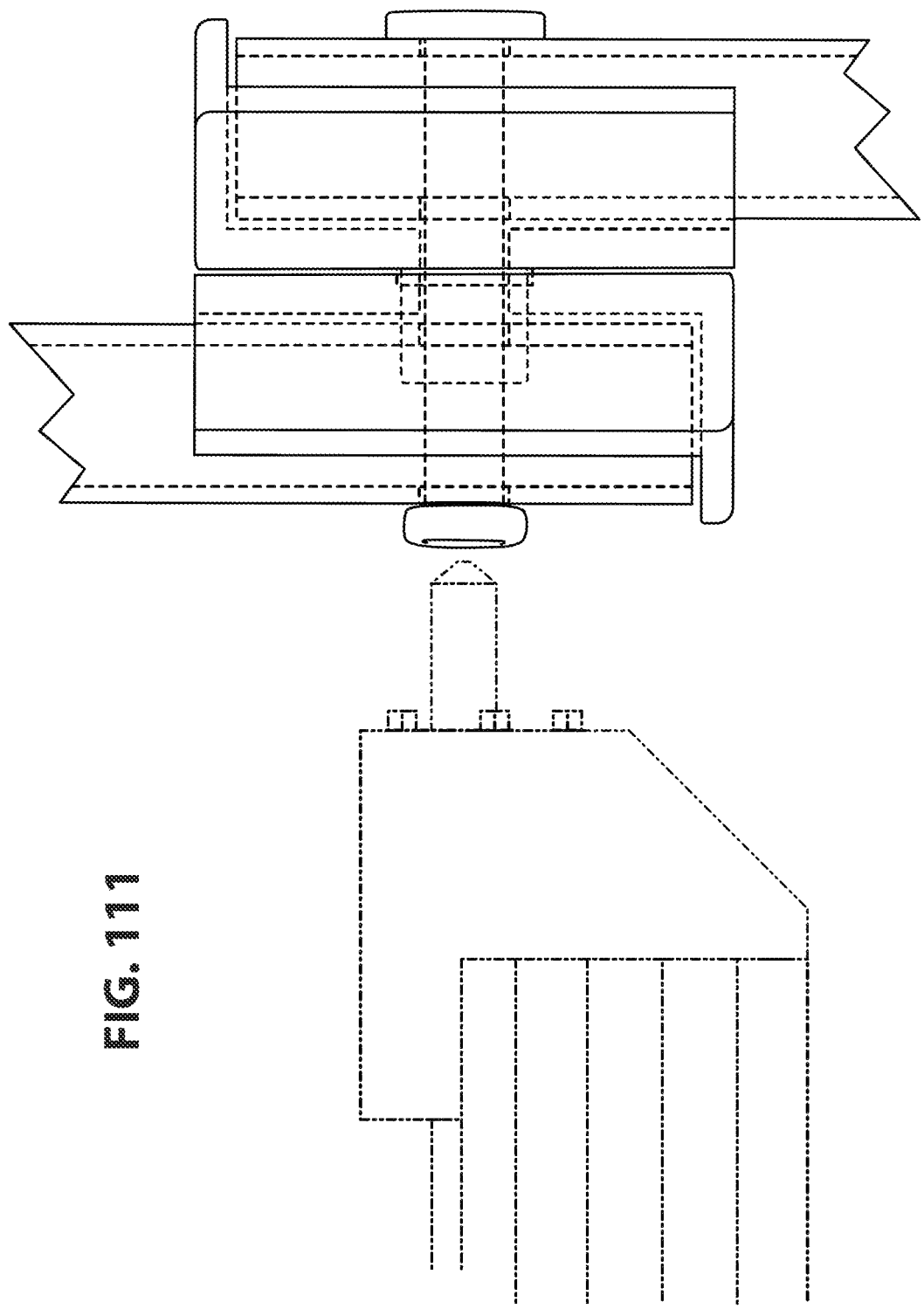
Figure 112:
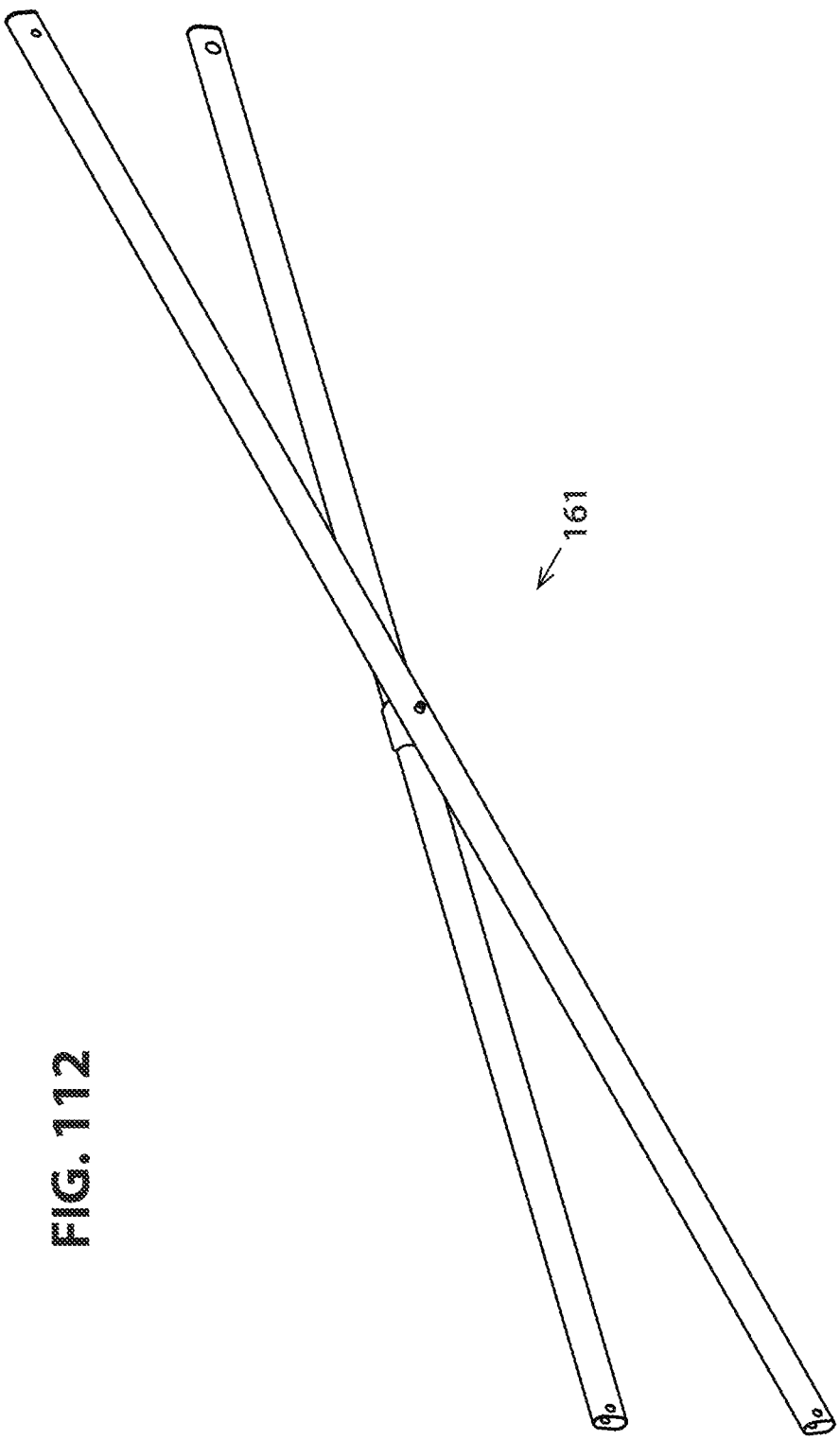
FIG. 112, FIG. 113, FIG. 114, and FIG. 115 illustrate perspective views demonstrating the various components of robot-assembled arthritic-assisting noise-canceling circular-cushion system and the assembly thereof.
Figure 113:
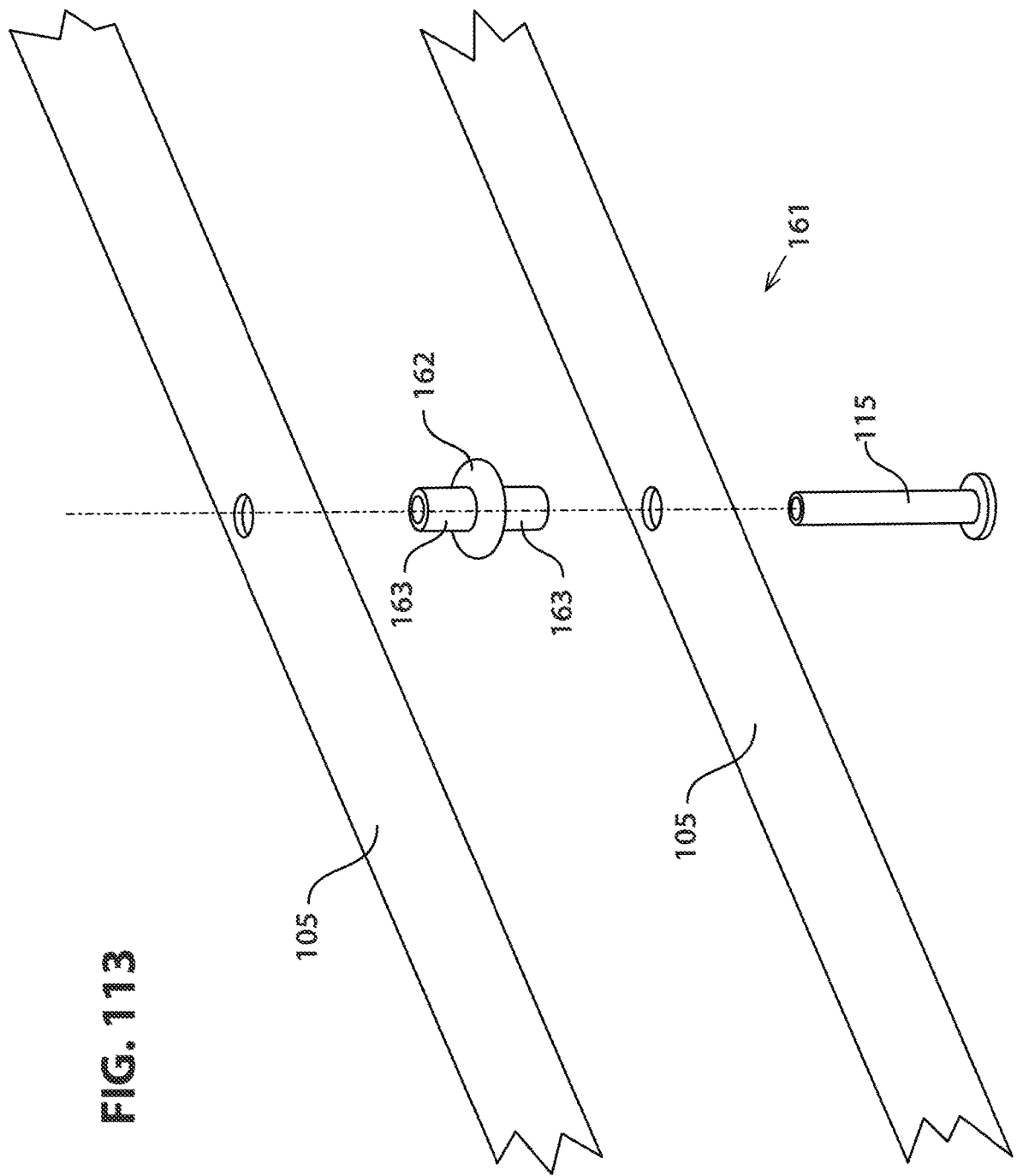
Figure 114:
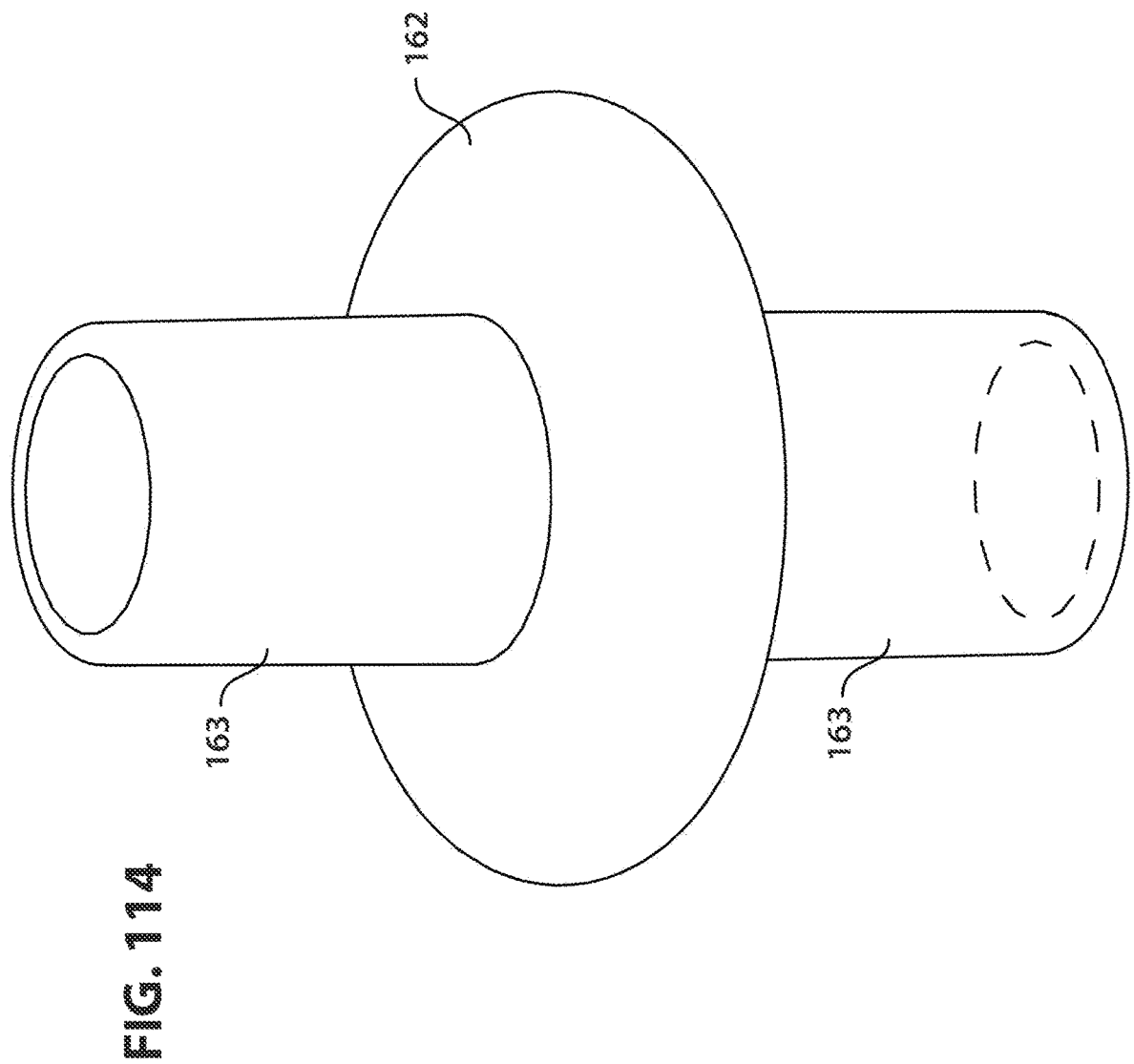
Figure 115:
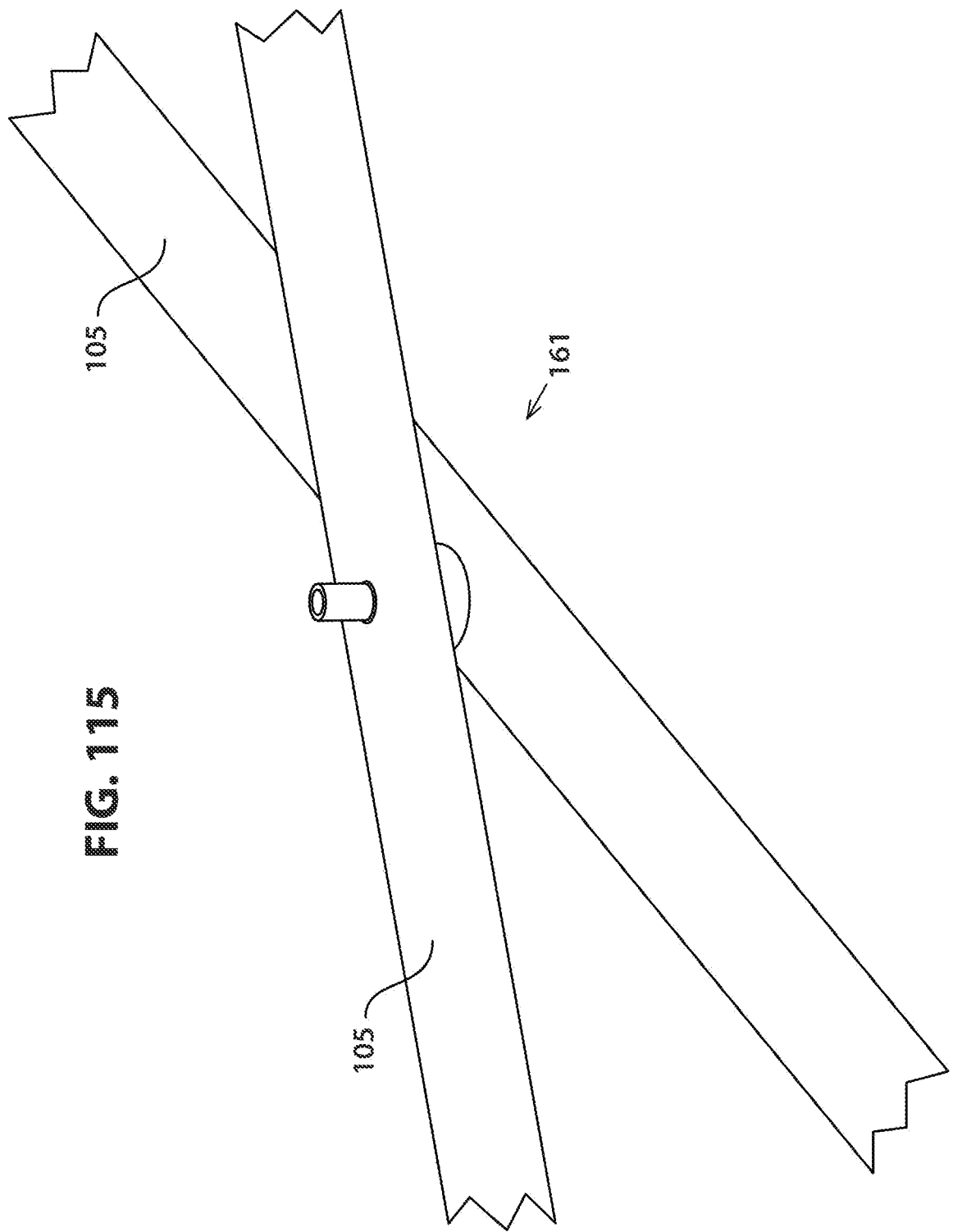
Figure 116:
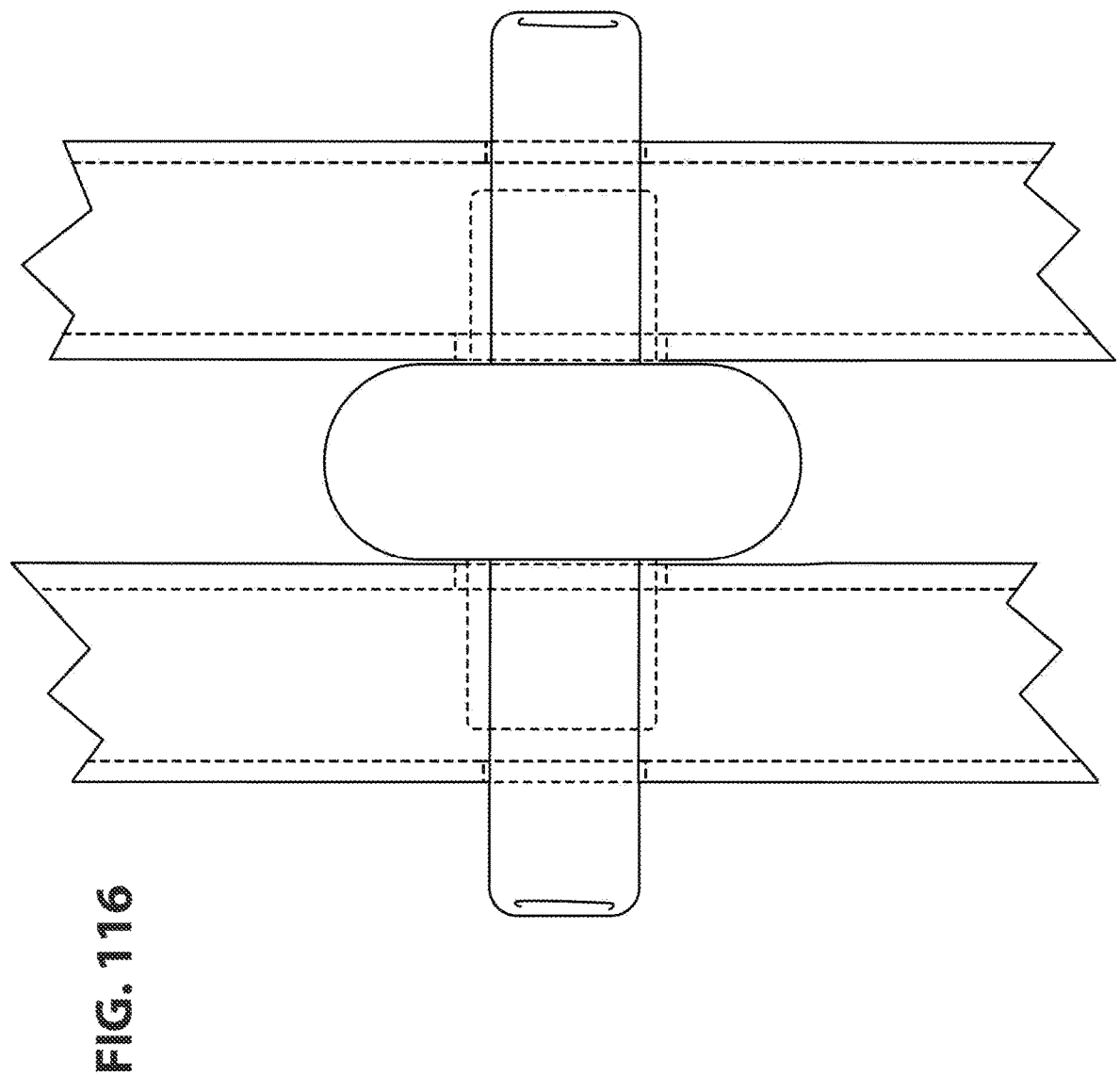
FIG. 116 and FIG. 117 illustrate cross-sectional views demonstrating how a manufacturing robot is used to heat-press robot-assembled double-tail built-in circular-cushion rivets to lock them in place.
Figure 117:
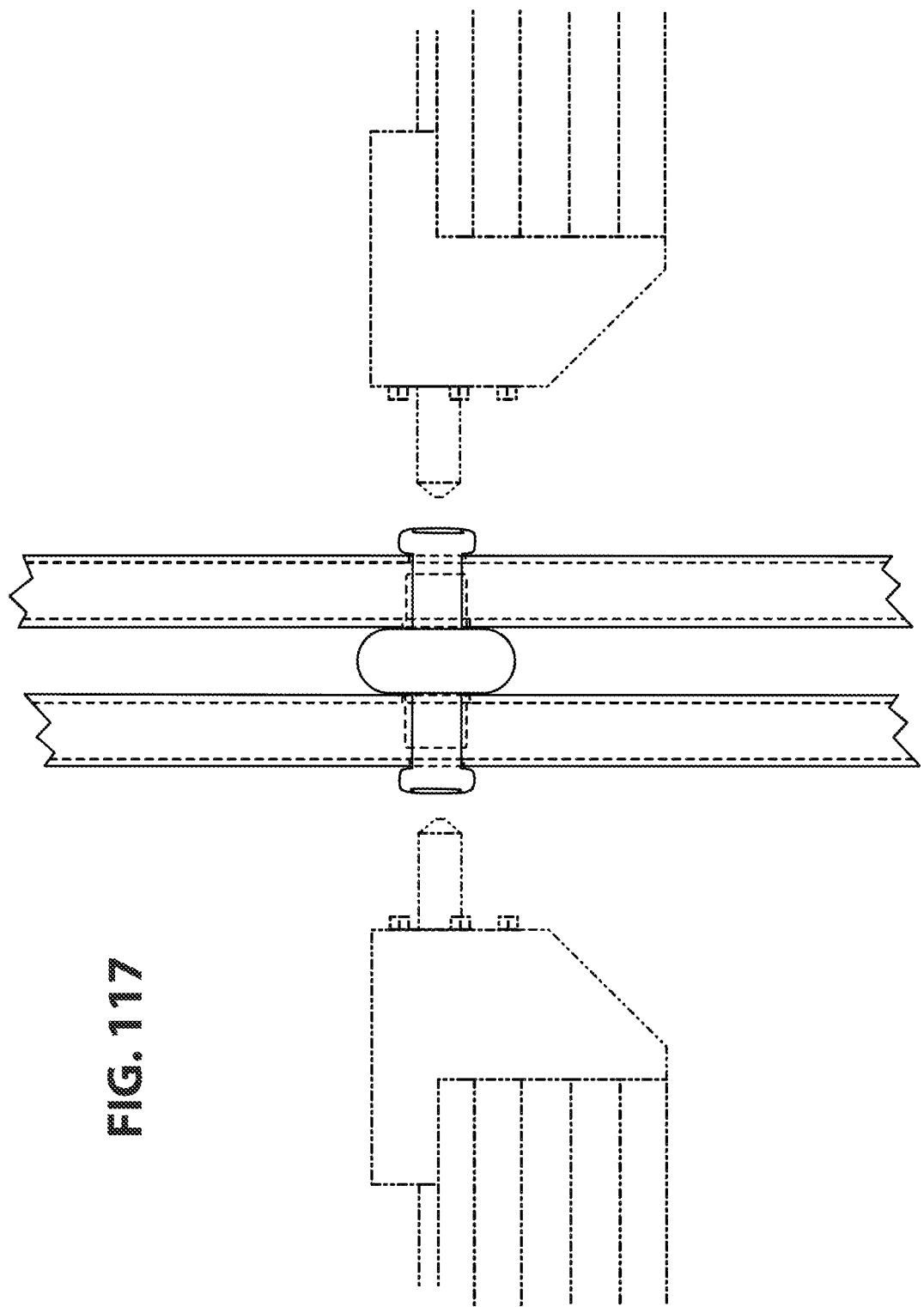
Figure 118:
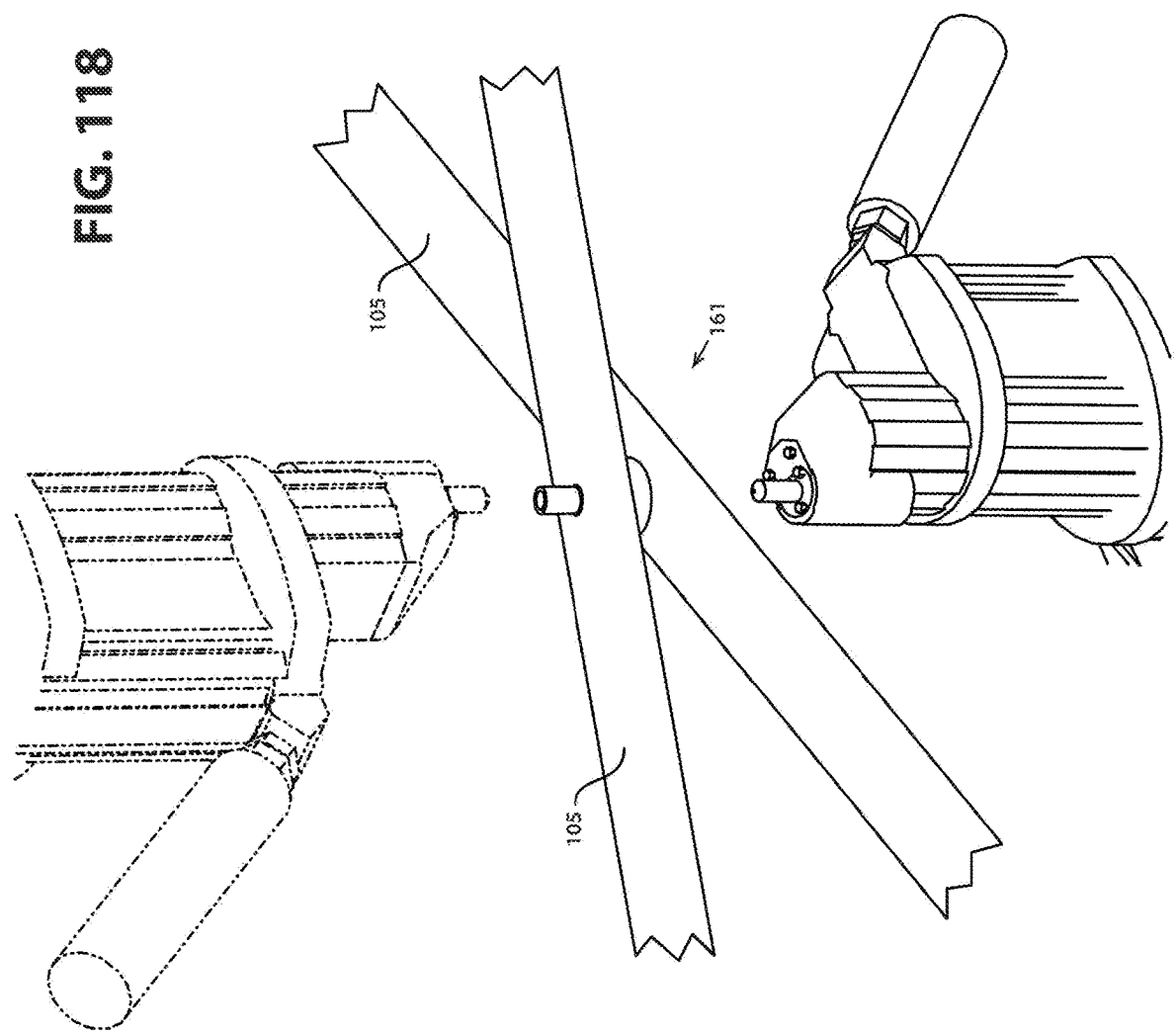
FIG. 118 illustrates a perspective view of how Robot-assembled arthritic-assisting noise-canceling circular-cushion system is robotically manufactured.
Figure 119:
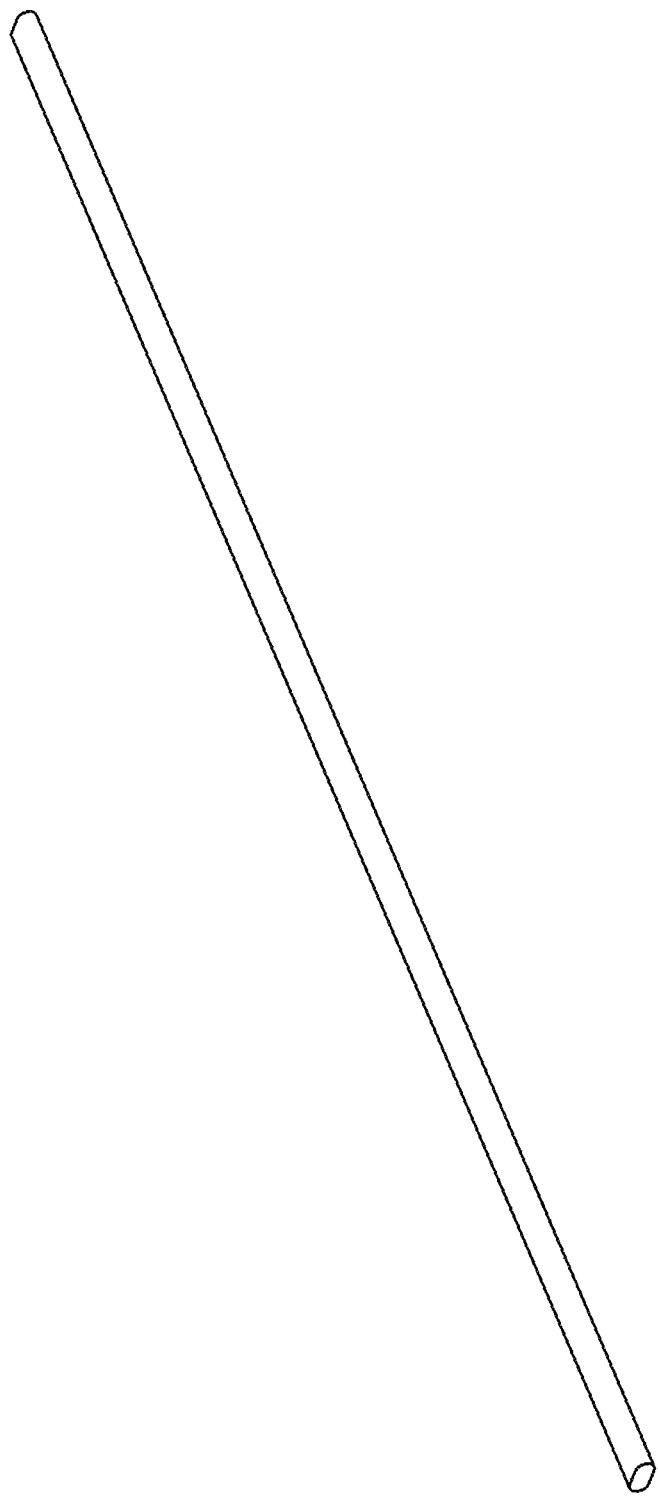
FIG. 119, FIG. 120, FIG. 121, FIG. 122, FIG. 123, and FIG. 124 illustrate perspective views of dog-run-adaptable anti-wobbling foldable top trusses, dog-run-adaptable anti-wobbling foldable corner trusses, and dog-run-adaptable anti-wobbling foldable side trusses, respectively.
Figure 120:
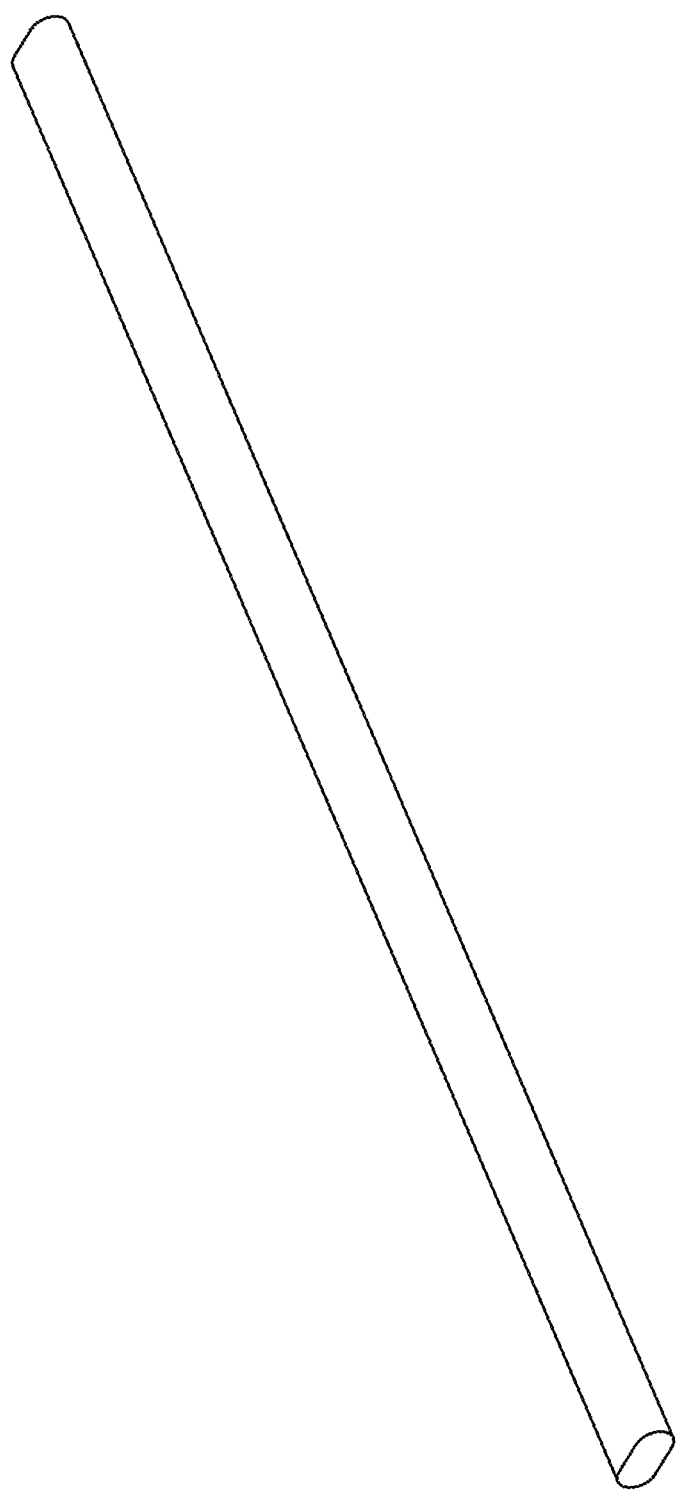
Figure 121:
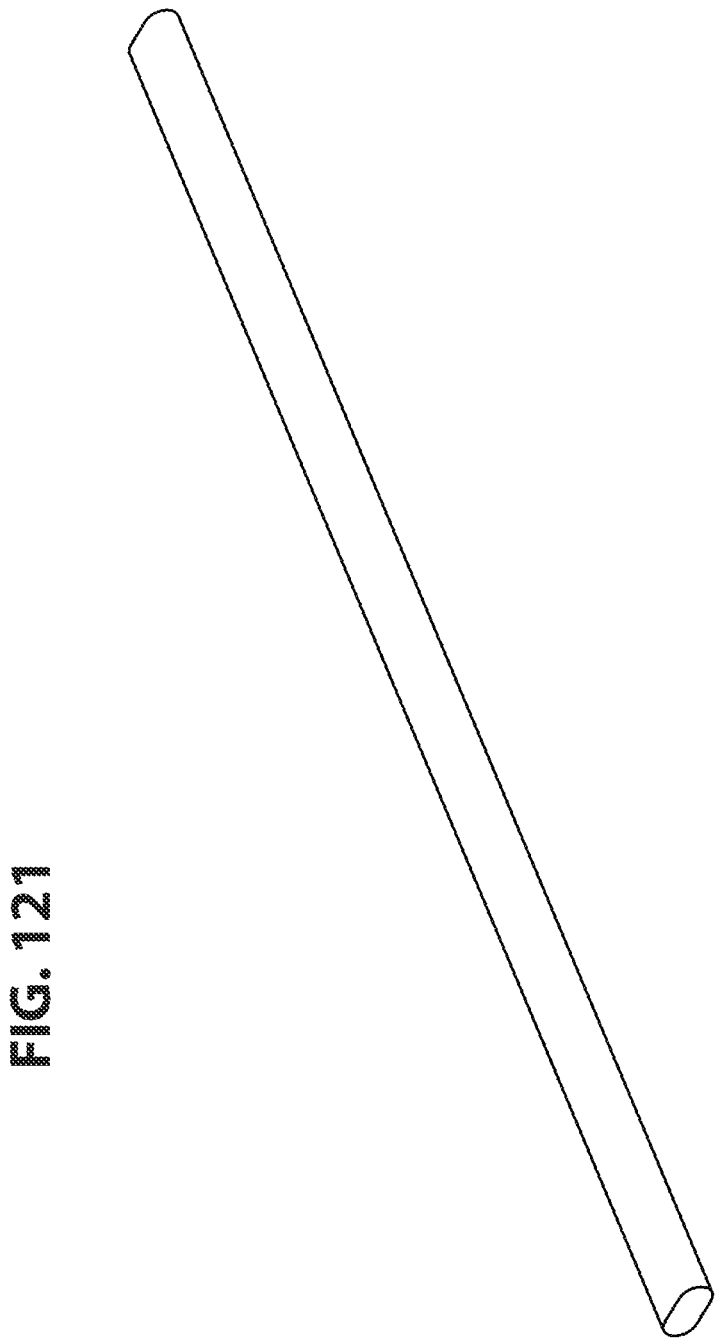
Figure 122:
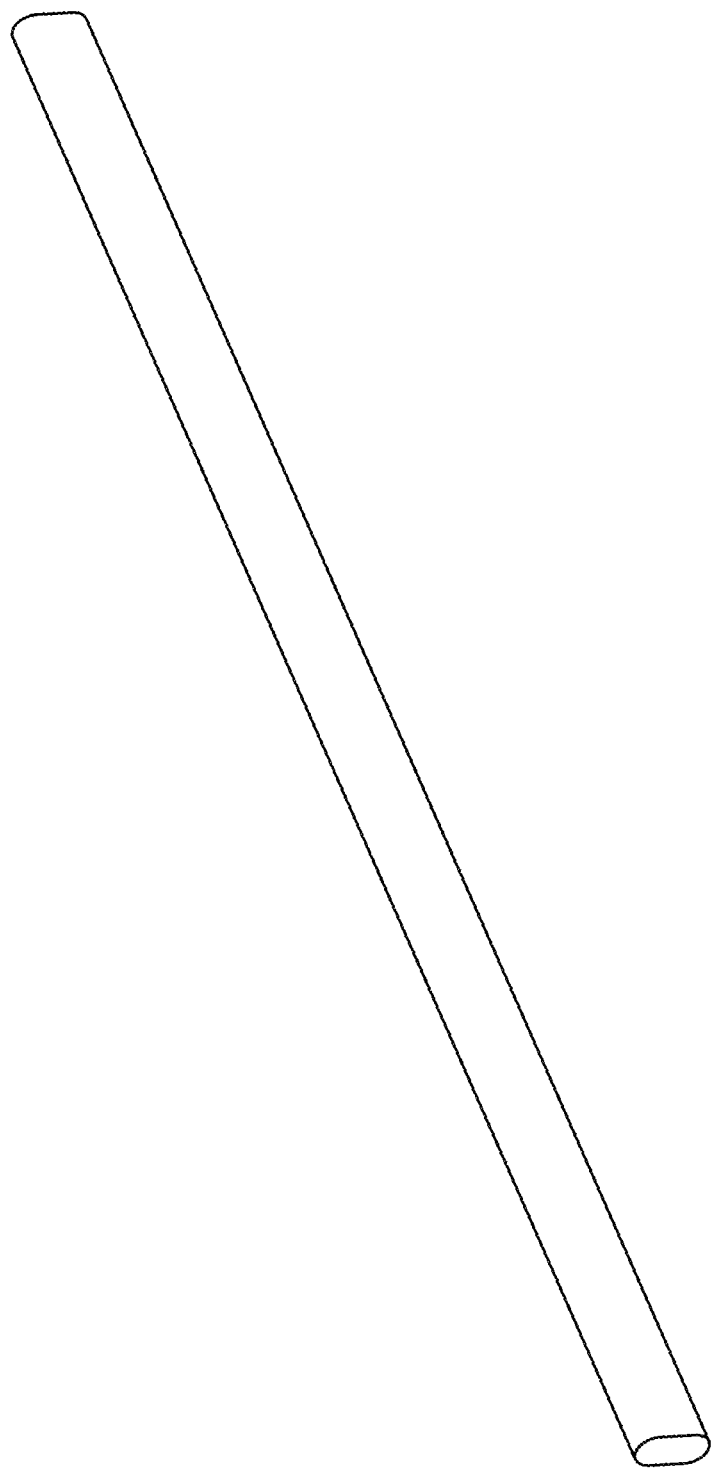
Figure 123:
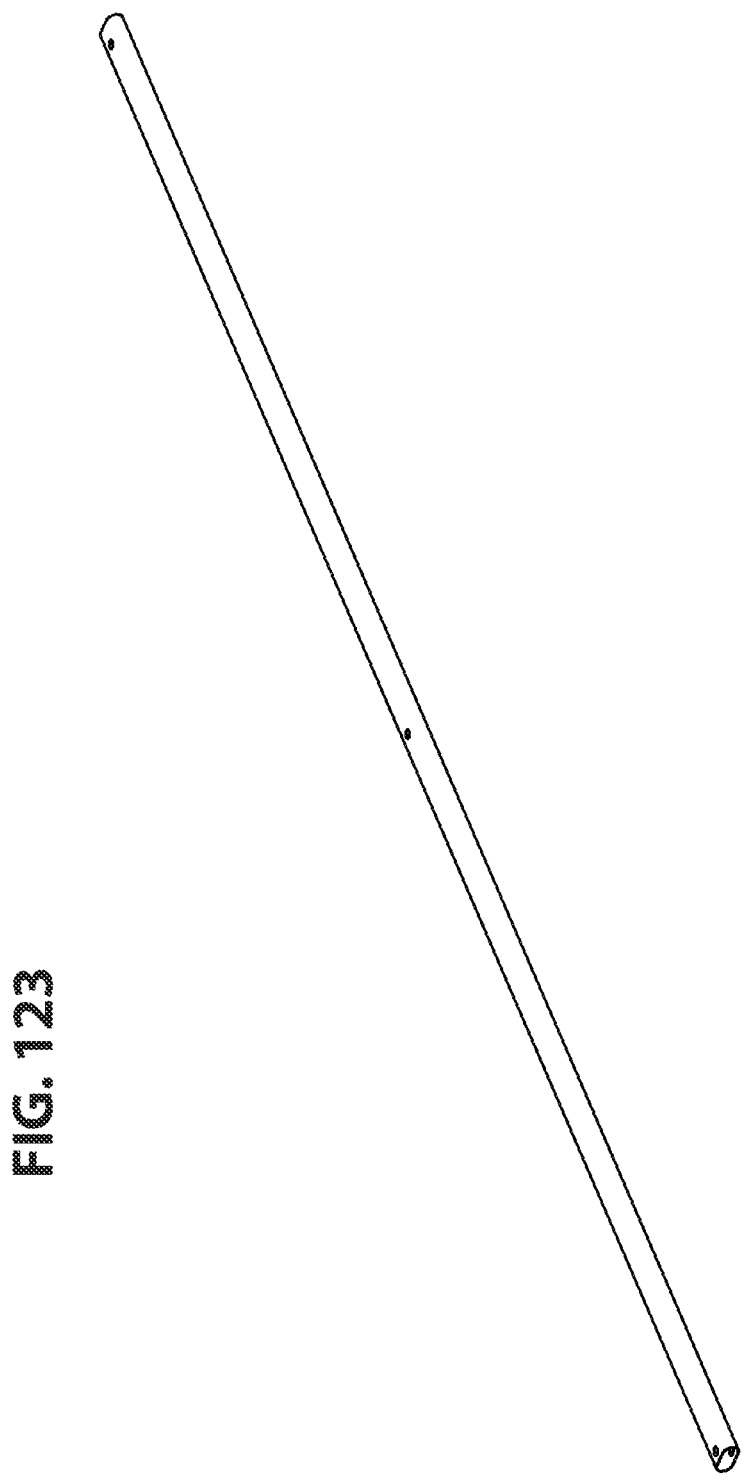
Figure 124:
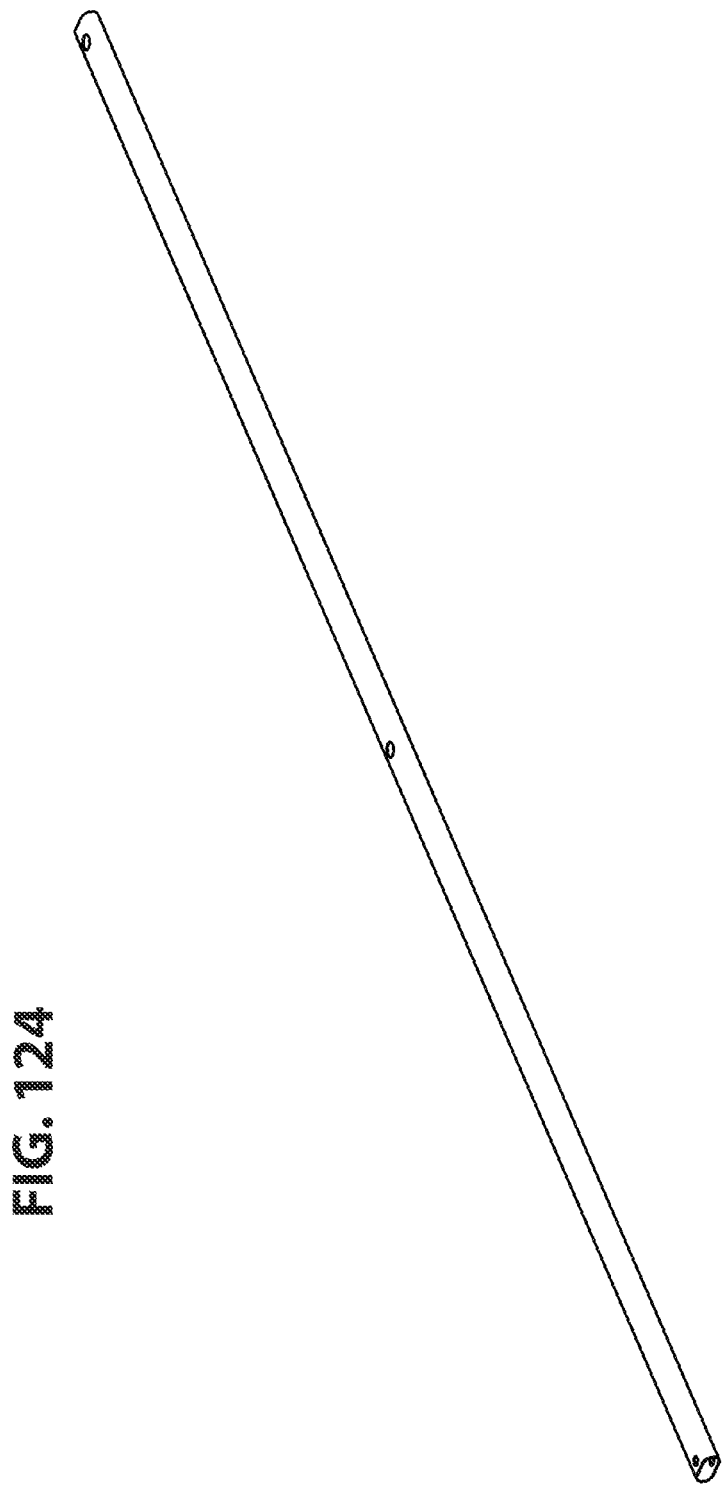
Figure 125:
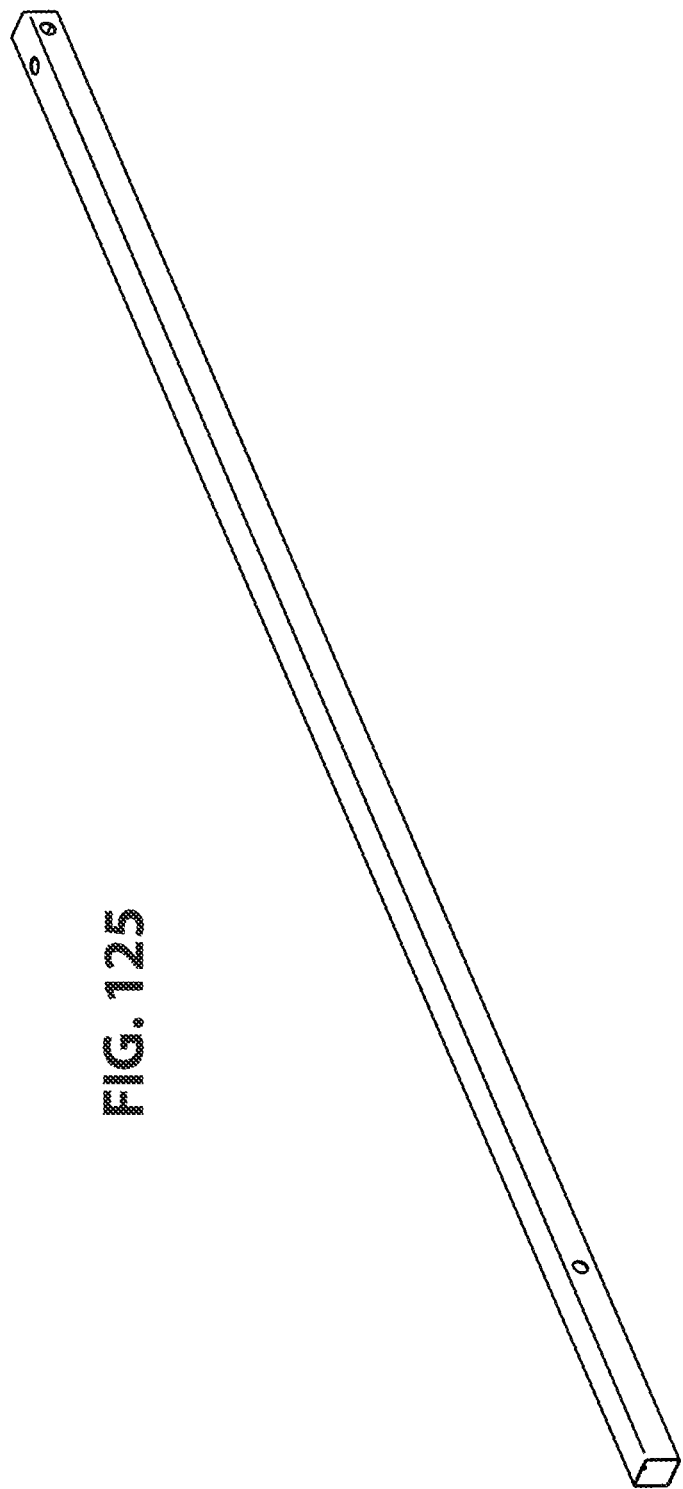
FIG. 125, FIG. 126, FIG. 127, and FIG. 128 illustrate perspective views of dog-run-adaptable anti-wobbling foldable upper posts, dog-run-adaptable anti-wobbling foldable lower posts, dog-run-adaptable anti-wobbling arthritic-assisting feet, and dog-run-adaptable anti-wobbling arthritic-assisting foot holes, respectively.
Figure 126:
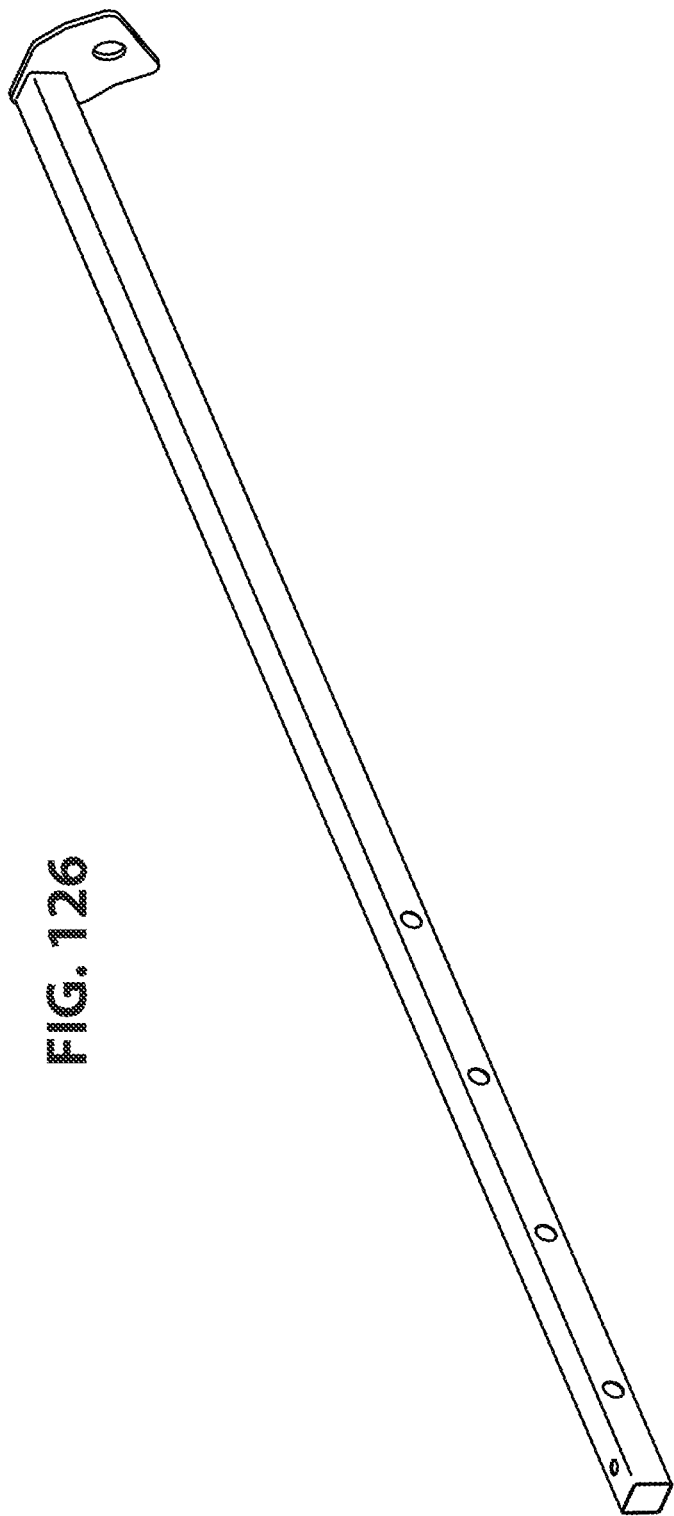
Figure 127:
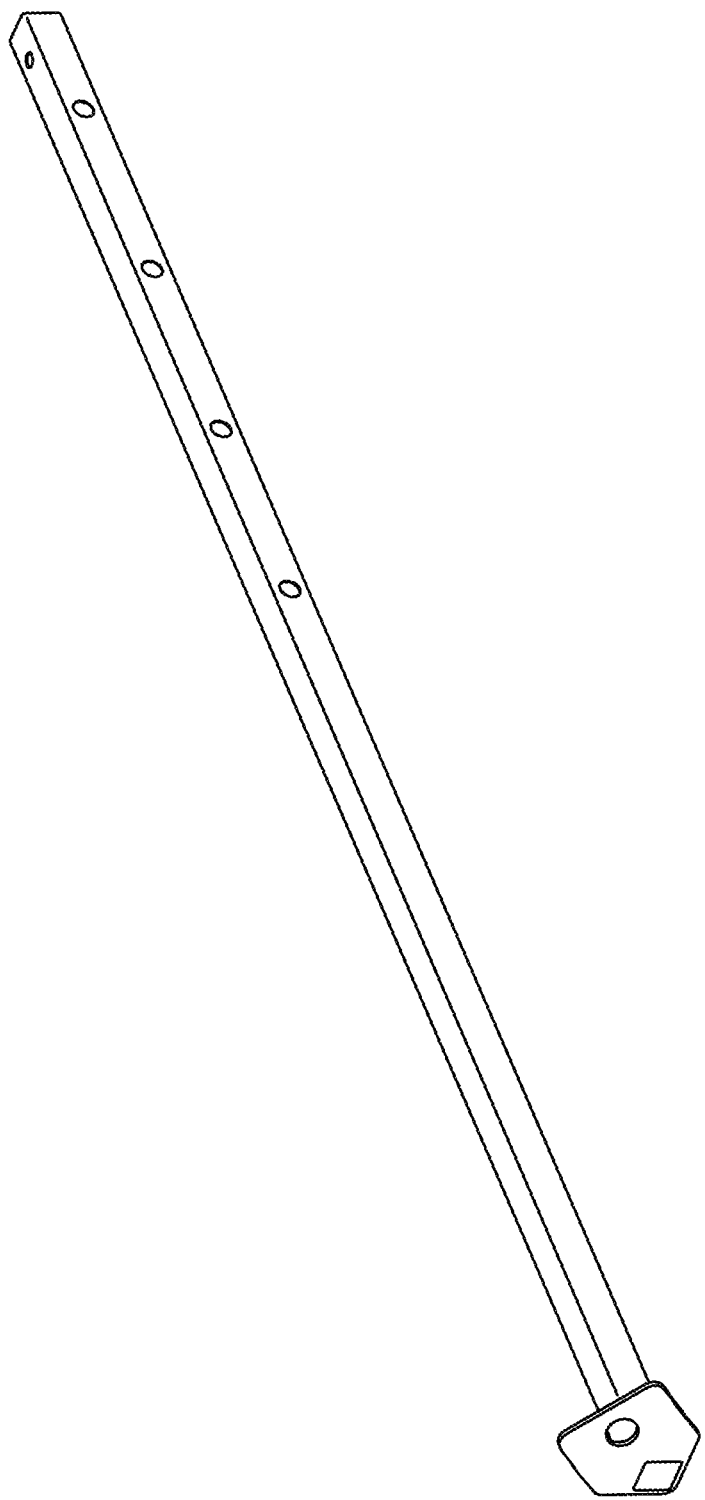
Figure 128:
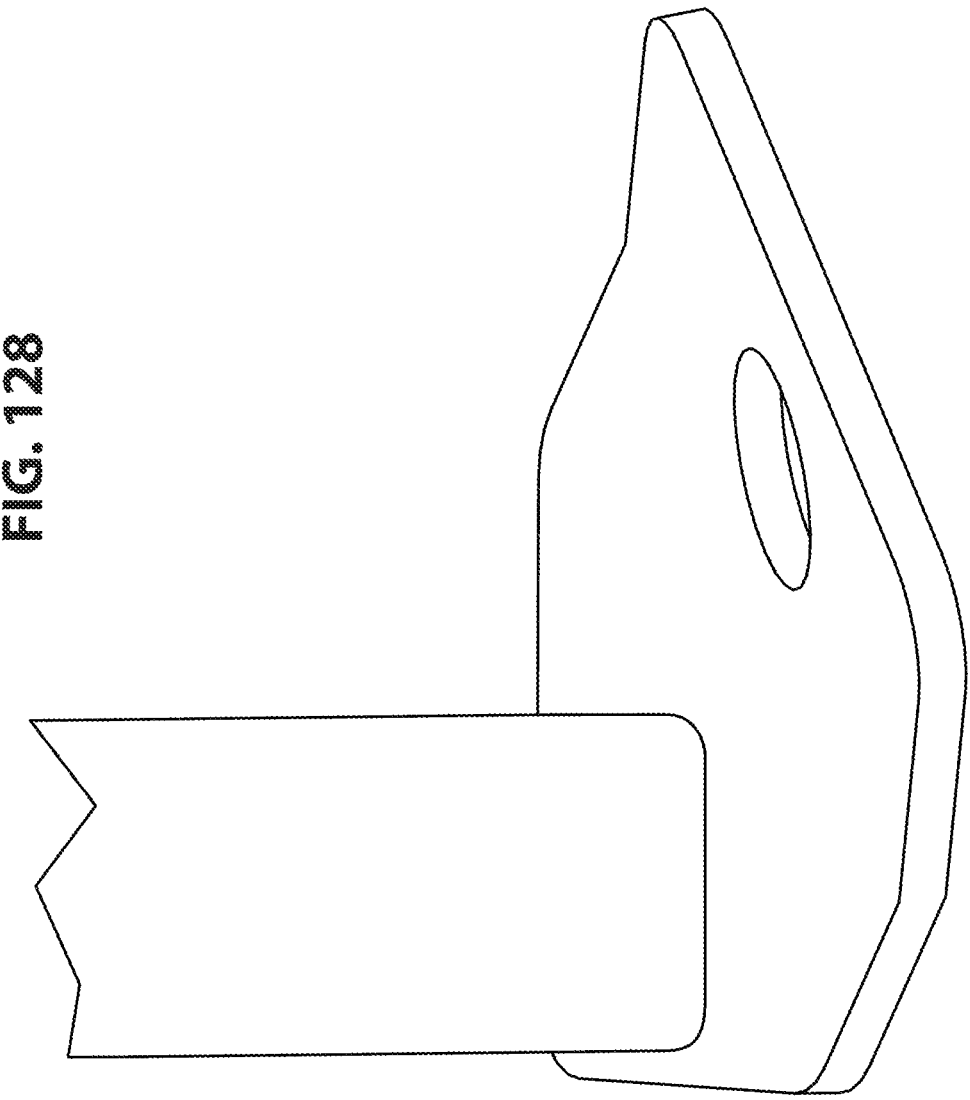
Figure 129:
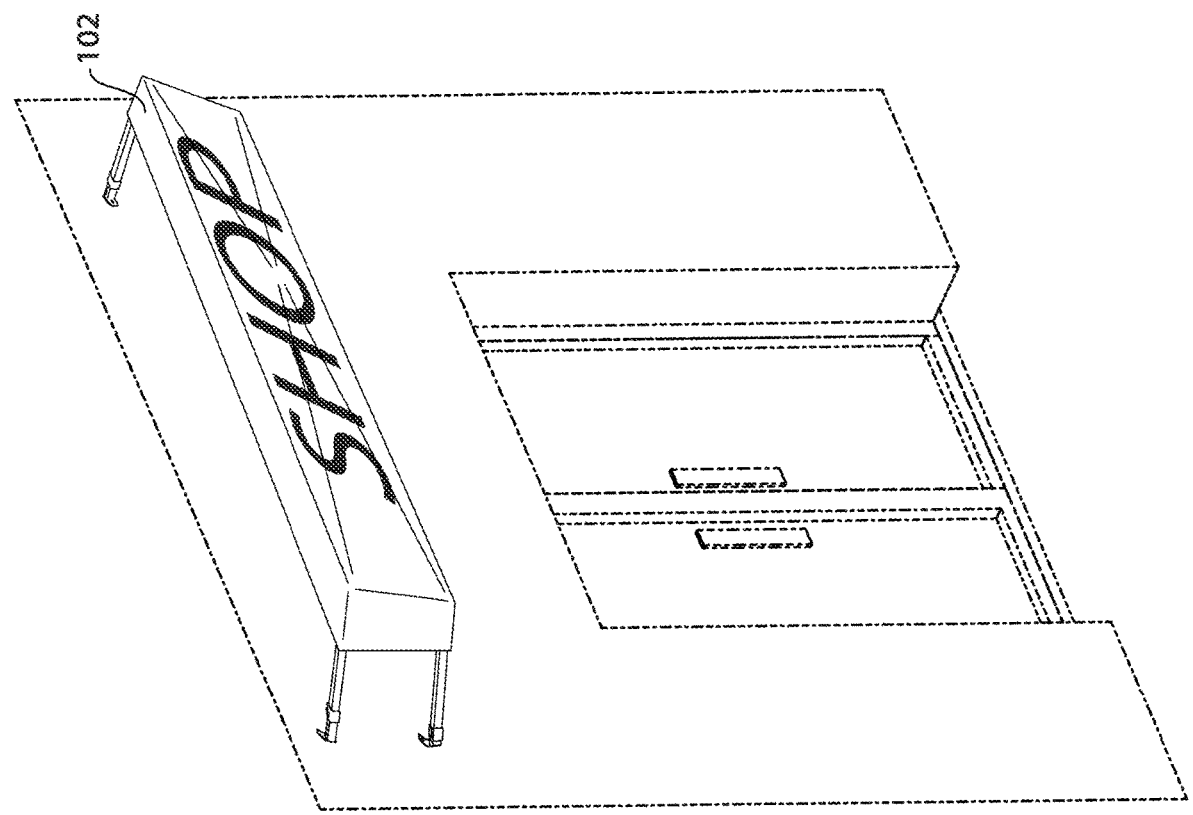
FIG. 129 and FIG. 130 illustrate perspective and cross-sectional views demonstrating how the six-device-in-one robot-assembled arthritic-assisting noise-canceling friction-reducing dog-run-adaptable anti-wobbling gazebo can function as a sign.
Figure 130:
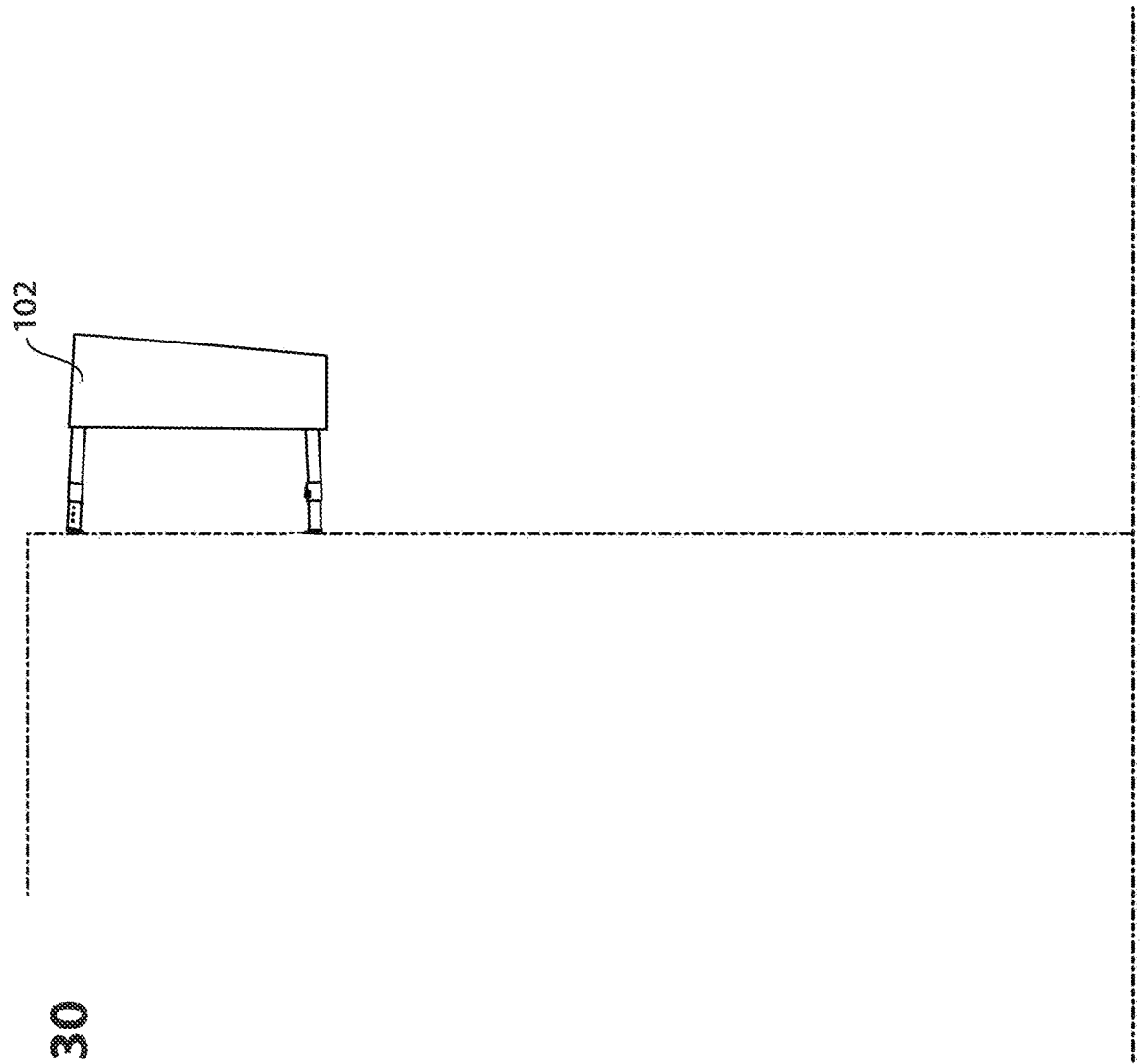
Figure 131:
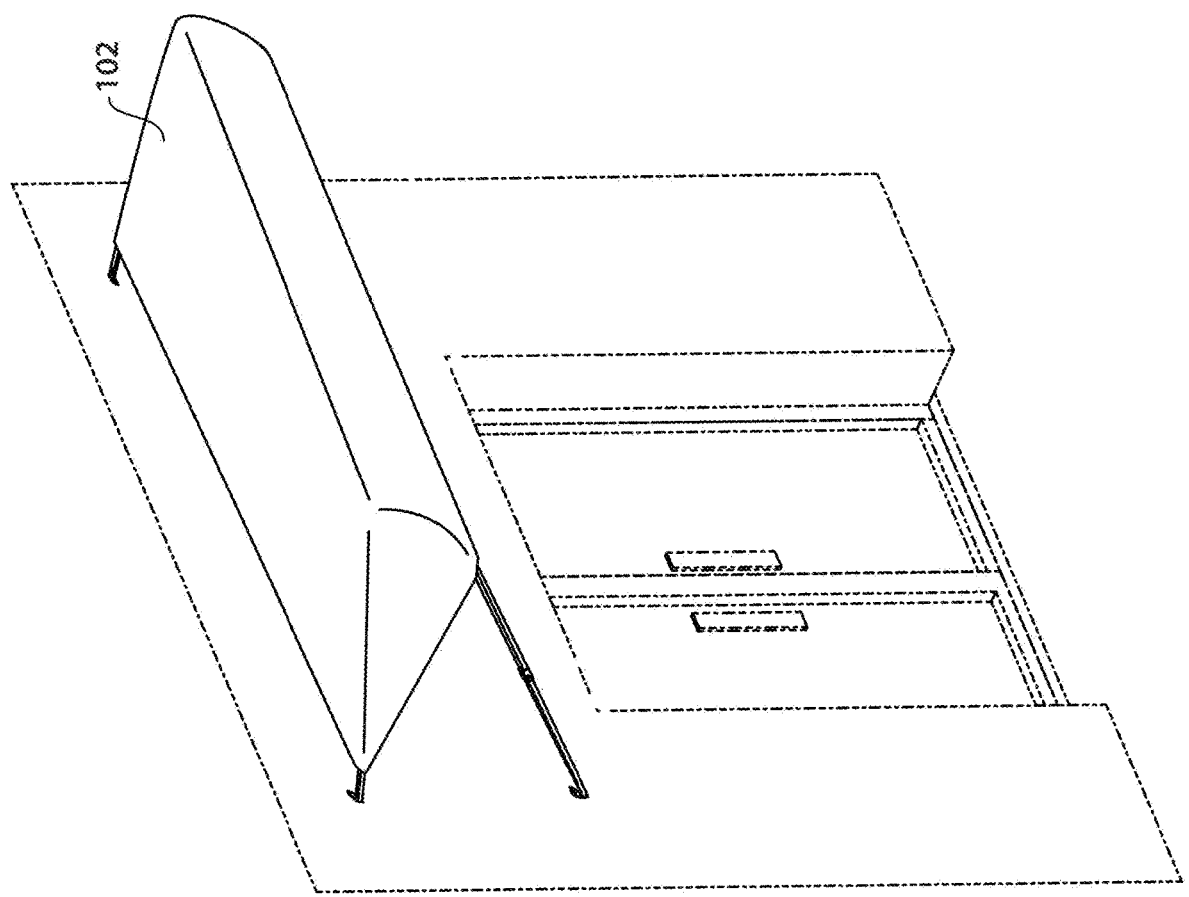
FIG. 131 and FIG. 132 illustrate perspective and cross-sectional views demonstrating how the six-device-in-one robot-assembled arthritic-assisting noise-canceling friction-reducing dog-run-adaptable anti-wobbling gazebo can function as an awning.
Figure 132:
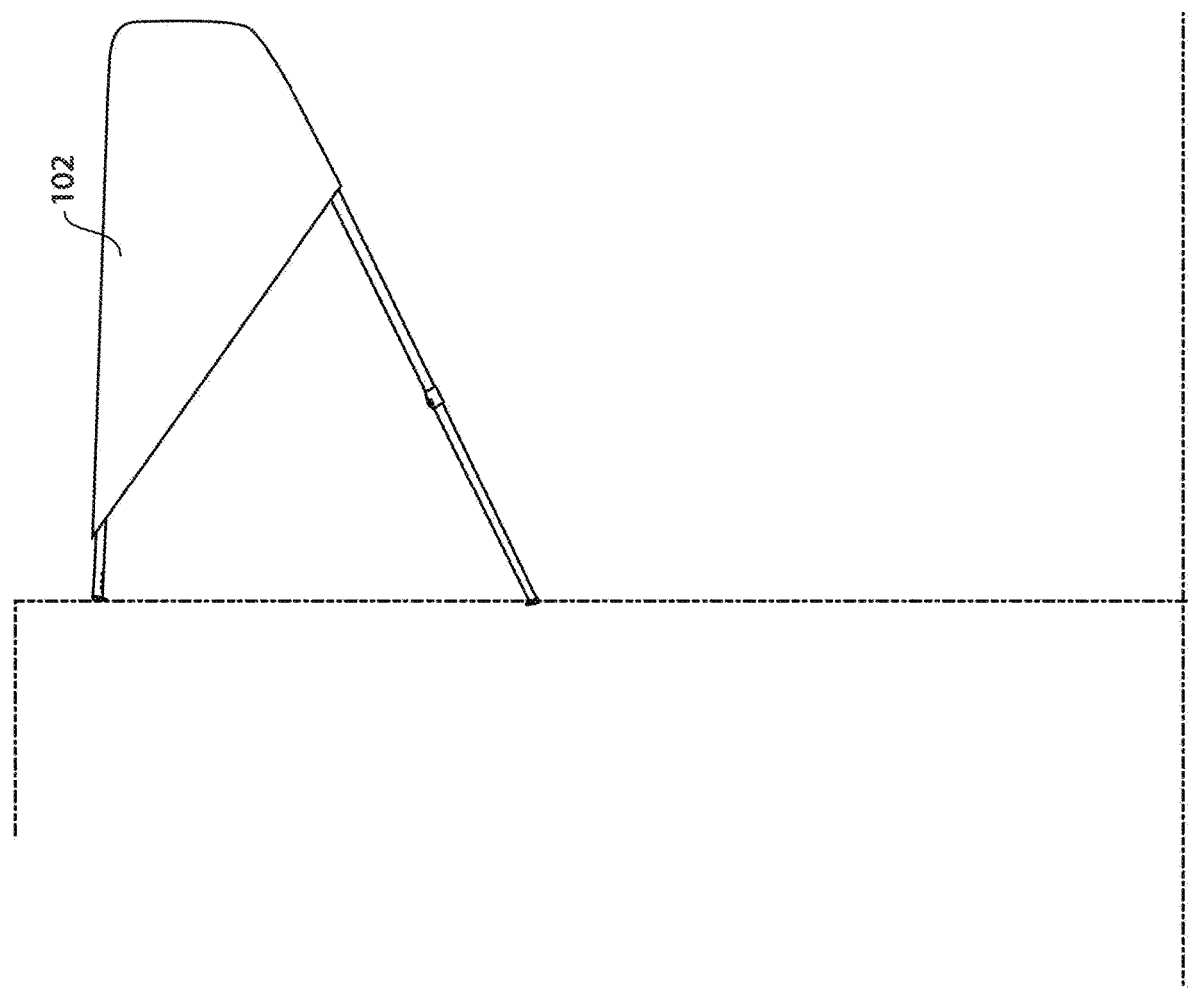
Figure 133:
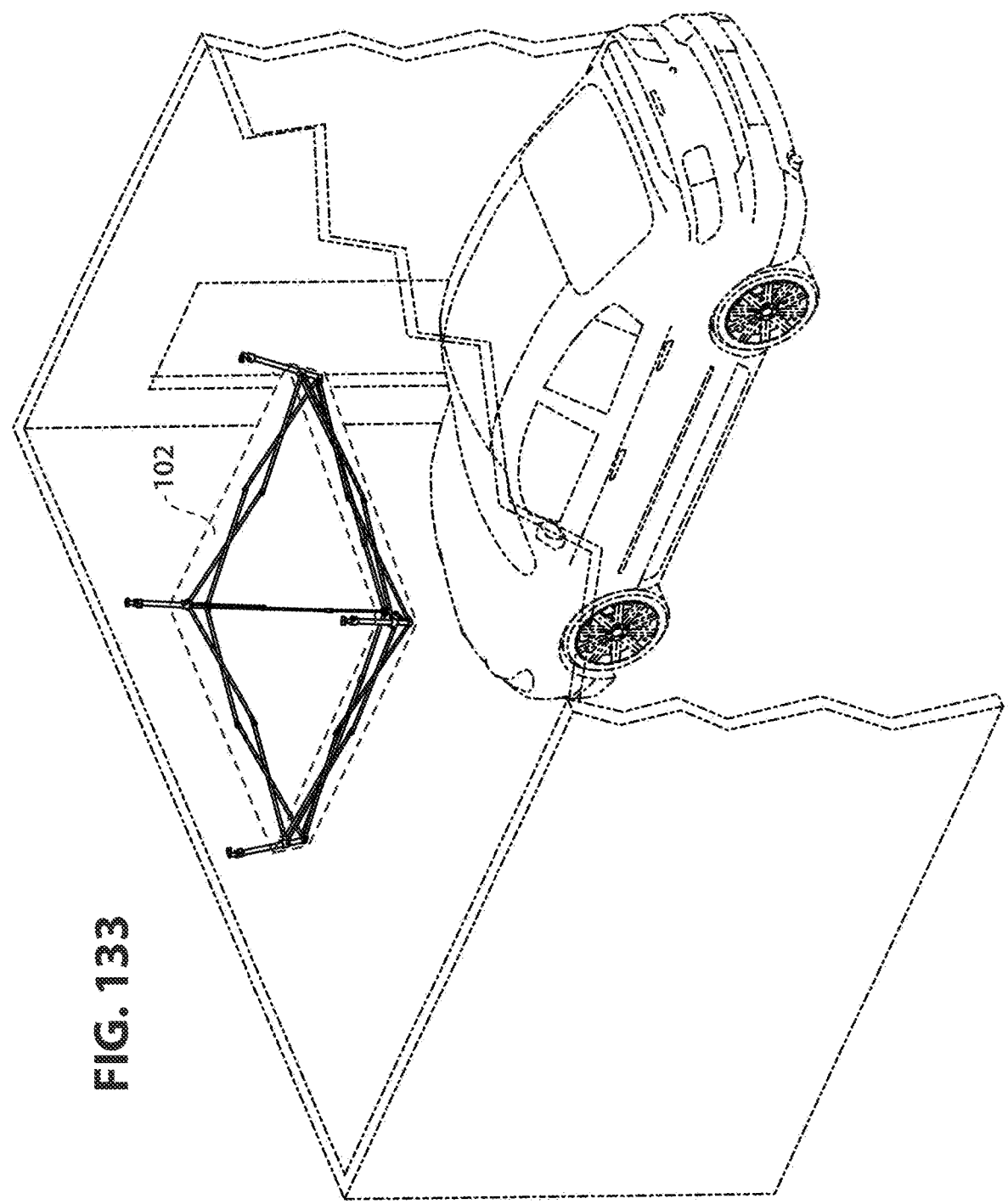
FIG. 133 and FIG. 134 illustrate perspective and cross-sectional views demonstrating how the six-device-in-one robot-assembled arthritic-assisting noise-canceling friction-reducing dog-run-adaptable anti-wobbling gazebo can function as ceiling-mounted overhead storage.
Figure 134:
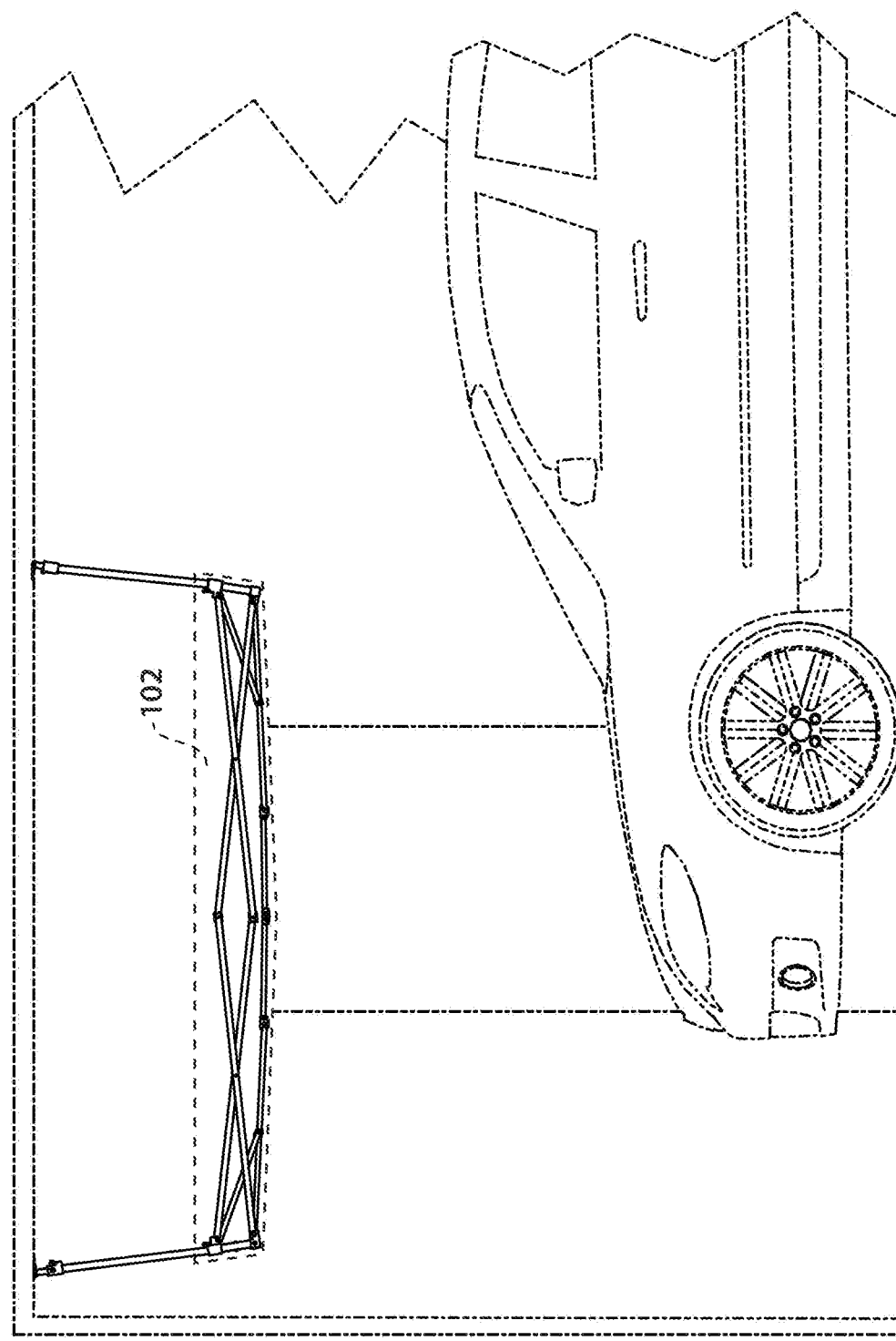

The six-device-in-one robot-assembled arthritic-assisting noise-canceling friction-reducing dog-run-adaptable anti-wobbling gazebo comprises:
1) Robot-assembled arthritic-assisting noise-canceling friction-reducing dog-run-adaptable anti-wobbling gazebo system,
2) Robot-assembled automatically-making-rivet-tail-flare noise-canceling injury-preventing top-connector system,
3) Robot-assembled heat-expandable cold-contractable interlocking anti-wobbling spiral-saw screw system,
4) Robot-assembled injury-preventing cone-shielding central intersector system,
5) Robot-assembled injury-preventing cone-shielding upper intersector system,
6) Robot-assembled arthritic-assisting injury-preventing cone-shielding lower intersector system,
7) Robot-assembled arthritic-assisting injury-preventing post-centering tick-preventing water-discharging sleeve system,
8) Robot-assembled noise-canceling injury-preventing rust-preventing truss-centering cover-cushion system,
9) Robot-assembled arthritic-assisting noise-canceling injury-preventing rust-preventing truss-centering cup-cushion system,
10) Robot-assembled arthritic-assisting noise-canceling circular-cushion system, and
11) Robot-assembled injury-preventing rust-preventing caterpillar-cover system.

Component
Referring to FIG. 1, FIG. 2, FIG. 3, FIG. 4, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65, FIG. 66, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, and FIG. 128, the six-device-in-one robot-assembled arthritic-assisting noise-canceling friction-reducing dog-run-adaptable anti-wobbling gazebo comprises:
1) Robot-assembled arthritic-assisting noise-canceling friction-reducing dog-run-adaptable anti-wobbling gazebo system 101, comprising:
2) Adjustable canopy 102,
3) Dog-run-adaptable anti-wobbling foldable top trusses 103,
4) Dog-run-adaptable anti-wobbling foldable corner trusses 104,
5) Dog-run-adaptable anti-wobbling foldable side trusses 105,
6) Dog-run-adaptable anti-wobbling foldable upper posts 106,
7) Dog-run-adaptable anti-wobbling foldable lower posts 107,
8) Dog-run-adaptable anti-wobbling arthritic-assisting feet 108,
9) Dog-run-adaptable anti-wobbling arthritic-assisting foot holes 109,
10) Truss holes 110;
11) Robot-assembled automatically-making-rivet-tail-flare noise-canceling injury-preventing top-connector system 111, comprising:
12) Top robot-assembled connectors 112,
13) Top robot-assembled heat-expandable cold-contractable holes 113,
14) Top robot-assembled automatically-flaring-and-shielding-rivet-tail injury-preventing hammer-shields 114,
15) Top robot-assembled heat-expandable cold-contractable double-tail rivets 115;
16) Robot-assembled heat-expandable cold-contractable interlocking anti-wobbling spiral-saw screw system 116, comprising:
17) Robot-assembled heat-expandable cold-contractable anti-wobbling screws 117,
18) Robot-assembled heat-expandable cold-contractable spirally-threading spiral saws 118,
19) Robot-assembled heat-expandable cold-contractable spiral-teeth 119,
20) Robot-assembled heat-expandable cold-contractable interlocking cones 120,
21) Robot-assembled heat-expandable cold-contractable interlocking spiral locks 121;
22) Robot-assembled injury-preventing cone-shielding central intersector system 122, comprising:
23) Central robot-assembled intersectors 123,
24) Central robot-assembled heat-expandable cold-contractable holes 124,
25) Central robot-assembled automatically-flaring-and-shielding-cone-head injury-preventing hammer-shields 125;
26) Robot-assembled injury-preventing cone-shielding upper intersector system 126, comprising:
27) Upper robot-assembled intersectors 127,
28) Upper robot-assembled heat-expandable cold-contractable holes 128,
29) Upper robot-assembled automatically-flaring-and-shielding-cone-head injury-preventing hammer-shields 129;
30) Robot-assembled arthritic-assisting injury-preventing cone-shielding lower intersector system 130, comprising:
31) Lower robot-assembled intersectors 131,
32) Lower robot-assembled heat-expandable cold-contractable holes 132,
33) Lower robot-assembled cone-shielding injury-preventing hammer-shields 133,
34) Lower robot-assembled arthritic-assisting height-adjusting dog-run-panel-rope hooks 134,
35) Lower robot-assembled noise-canceling friction-reducing height-adjusting nipples 135,
36) Lower robot-assembled noise-canceling friction-reducing lead-in nipple tips 136, 37) Lower robot-assembled self-securing nipple-securing pins 137,
38) Lower robot-assembled self-securing hook-securing pins 138,
39) Lower robot-assembled hook spring 139,
40) Lower robot-assembled noise-canceling friction-reducing nipple-centering tunnels 140;
41) Robot-assembled arthritic-assisting injury-preventing post-centering tick-preventing water-discharging sleeve system 141, comprising:
42) Robot-assembled sleeves 142,
43) Sleeve robot-assembled post-centering clamps 143,
44) Sleeve robot-assembled tick-preventing downward teeth 144,
45) Sleeve robot-assembled water-discharging grooves 145,
46) Sleeve robot-assembled arthritic-assisting height-adjusting dog-run-panel-rope hooks 146,
47) Sleeve robot-assembled noise-canceling friction-reducing post-height-adjusting grooved nipples 147,
48) Sleeve robot-assembled noise-canceling friction-reducing hook-jacking jacks 148,
49) Sleeve robot-assembled self-securing jack-securing pins 149,
50) Sleeve robot-assembled self-securing hook-securing pins 150,
51) Sleeve robot-assembled hook spring 151,
52) Sleeve robot-assembled noise-canceling friction-reducing flower-shaped nipple-centering holes 152;
53) Robot-assembled noise-canceling injury-preventing rust-preventing truss-centering cover-cushion system 153, comprising:
54) Robot-assembled rust-preventing truss-end covers 154,
55) Robot-assembled noise-canceling cover-cushion 155,
56) Robot-assembled injury-preventing inward-curved cover-cushion edges 156,
57) Robot-assembled heat-expandable cold-contractable double-tail cover-cushion rivets 157;
58) Robot-assembled arthritic-assisting noise-canceling injury-preventing rust-preventing truss-centering cup-cushion system 158, comprising:
59) Robot-assembled noise-canceling cup-cushion 159,
60) Robot-assembled injury-preventing inward-curved cup-cushion edges 160;
61) Robot-assembled arthritic-assisting noise-canceling circular-cushion system 161, comprising:
62) Robot-assembled noise-canceling circular-cushion 162,
63) Robot-assembled double-tail built-in circular-cushion rivets 163; and
Material Referring to FIG. 1, FIG. 2, FIG. 3, FIG. 4, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65, FIG. 66, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, and FIG. 128:

1) Robot-assembled arthritic-assisting noise-canceling friction-reducing dog-run-adaptable anti-wobbling-gazebo system 101 is (or are each) made of the combined materials of its components.
2) Adjustable canopy 102.
3) Dog-run-adaptable anti-wobbling foldable top trusses 103 is (or are each) made of the material of metal.
4) Dog-run-adaptable anti-wobbling foldable corner trusses 104 is (or are each) made of the material of metal.
5) Dog-run-adaptable anti-wobbling foldable side trusses 105 is (or are each) made of the material of metal.
6) Dog-run-adaptable anti-wobbling foldable upper posts 106 is (or are each) made of the material of metal.
7) Dog-run-adaptable anti-wobbling foldable lower posts 107 is (or are each) made of the material of metal.
8) Dog-run-adaptable anti-wobbling arthritic-assisting feet 108 is (or are each) made of the material of metal.
9) Dog-run-adaptable anti-wobbling arthritic-assisting foot holes 109 is (or are each) made of the material of empty space.
10) Truss holes 110 is (or are each) made of the material of empty space.
11) Robot-assembled automatically-making-rivet-tail-flare noise-canceling injury-preventing top-connector system 111 is (or are each) made of the combined materials of its components.
12) Top robot-assembled connectors 112 is (or are each) made of the material of plastic.
13) Top robot-assembled heat-expandable cold-contractable holes 113 is (or are each) made of the material of empty space.
14) Top robot-assembled automatically-flaring-and-shielding-rivet-tail injury-preventing hammer-shields 114 is (or are each) made of the material of plastic.
15) Top robot-assembled heat-expandable cold-contractable double-tail rivets 115 is (or are each) made of the material of plastic or metal.
16) Robot-assembled heat-expandable cold-contractable interlocking anti-wobbling spiral-saw screw system 116 is (or are each) connected by the combined connections of its components.
17) Robot-assembled heat-expandable cold-contractable anti-wobbling screws 117 is (or are each) made of the material of metal or plastic.
18) Robot-assembled heat-expandable cold-contractable spirally-threading spiral saws 118 is (or are each) made of the material of metal or plastic.
19) Robot-assembled heat-expandable cold-contractable spiral-teeth 119 is (or are each) made of the material of metal or plastic.
20) Robot-assembled heat-expandable cold-contractable interlocking cones 120 is (or are each) made of the material of metal or plastic.
21) Robot-assembled heat-expandable cold-contractable interlocking spiral locks 121 is (or are each) made of the material of metal or plastic.
22) Robot-assembled injury-preventing cone-shielding central intersector system 122 is (or are each) made of the combined materials of its components.
23) Central robot-assembled intersectors 123 is (or are each) made of the material of plastic.
24) Central robot-assembled heat-expandable cold-contractable holes 124 is (or are each) made of the material of empty space.

25) Central robot-assembled automatically-flaring-and-shielding-cone-head injury-preventing hammer-shields 125 is (or are each) made of the material of plastic.
26) Robot-assembled injury-preventing cone-shielding upper intersector system 126 is (or are each) made of the combined materials of its components.
27) Upper robot-assembled intersectors 127 is (or are each) made of the material of plastic.
28) Upper robot-assembled heat-expandable cold-contractable holes 128 is (or are each) made of the material of empty space.
29) Upper robot-assembled automatically-flaring-and-shielding-cone-head injury-preventing hammer-shields 129 is (or are each) made of the material of plastic.
30) Robot-assembled arthritic-assisting injury-preventing cone-shielding lower intersector system 130 is (or are each) made of the combined materials of its components.
31) Lower robot-assembled intersectors 131 is (or are each) made of the material of plastic.
32) Lower robot-assembled heat-expandable cold-contractable holes 132 is (or are each) made of the material of empty space.
33) Lower robot-assembled cone-shielding injury-preventing hammer-shields 133 is (or are each) made of the material of plastic.
34) Lower robot-assembled arthritic-assisting height-adjusting dog-run-panel-rope hooks 134 is (or are each) made of the material of plastic.
35) Lower robot-assembled noise-canceling friction-reducing height-adjusting nipples 135 is (or are each) made of the material of metal.
36) Lower robot-assembled noise-canceling friction-reducing lead-in nipple tips 136 is (or are each) made of the material of metal.
37) Lower robot-assembled self-securing nipple-securing pins 137 is (or are each) made of the material of metal.
38) Lower robot-assembled self-securing hook-securing pins 138 is (or are each) made of the material of metal.
39) Lower robot-assembled hook spring 139 is (or are each) made of the material of metal.
40) Lower robot-assembled noise-canceling friction-reducing nipple-centering tunnels 140 is (or are each) made of the material of empty space.
41) Robot-assembled arthritic-assisting injury-preventing post-centering tick-preventing water discharging sleeve system 141 is (or are each) made of the combined materials of its components.
42) Robot-assembled sleeves 142 is (or are each) made of the material of plastic.
43) Sleeve robot-assembled post-centering clamps 143 is (or are each) made of the material of plastic.
44) Sleeve robot-assembled tick-preventing downward teeth 144 is (or are each) made of the material of plastic.
45) Sleeve robot-assembled water-discharging grooves 145 is (or are each) made of the material of empty space.
46) Sleeve robot-assembled arthritic-assisting height-adjusting dog-run-panel-rope hooks 146 is (or are each) made of the material of plastic.
47) Sleeve robot-assembled noise-canceling friction-reducing post-height-adjusting grooved nipples 147 is (or are each) made of the material of metal.
48) Sleeve robot-assembled noise-canceling friction-reducing hook jacking jacks 148 is (or are each) made of the material of plastic.
49) Sleeve robot-assembled self-securing jack-securing pins 149 is (or are each) made of the material of metal.
50) Sleeve robot-assembled self-securing hook-securing pins 150 is (or are each) made of the material of metal.
51) Sleeve robot-assembled hook spring 151 is (or are each) made of the material of metal.
52) Sleeve robot-assembled noise-canceling friction-reducing flower-shaped nipple-centering holes 152 is (or are each) made of the material of empty space.
53) Robot-assembled noise-canceling injury-preventing rust-preventing truss-centering cover cushion system 153 is (or are each) made of the combined materials of its components.
54) Robot-assembled rust-preventing truss-end covers 154 is (or are each) made of the material of plastic.
55) Robot-assembled noise-canceling cover-cushion 155 is (or are each) made of the material of plastic.
56) Robot-assembled injury-preventing inward-curved cover-cushion edges 156 is (or are each) made of the material of plastic.
57) Robot-assembled heat-expandable cold-contractable double-tail cover-cushion rivets 157 is (or are each) made of the material of plastic.
58) Robot-assembled arthritic-assisting noise-canceling injury-preventing rust-preventing truss-centering cup-cushion system 158 is (or are each) made of the combined materials of its components.
59) Robot-assembled noise-canceling cup-cushion 159 is (or are each) made of the material of plastic.
60) Robot-assembled injury-preventing inward-curved cup-cushion edges 160 is (or are each) made of the material of plastic.
61) Robot-assembled arthritic-assisting noise-canceling circular-cushion system 161 is (or are each) made of the combined materials of its components.
62) Robot-assembled noise-canceling circular-cushion 162 is (or are each) made of the material of plastic.
63) Robot-assembled double-tail built-in circular-cushion rivets 163 is (or are each) made of the material of plastic or metal.

Shape

Referring to FIG. 1, FIG. 2, FIG. 3, FIG. 4, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65, FIG. 66, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, and FIG. 128:

1) Robot-assembled arthritic-assisting noise-canceling friction-reducing dog-run-adaptable anti-wobbling-gazebo system 101 is (or are each) formed into the combined shapes of its components.
2) Adjustable canopy 102 is (or are each) formed into the shape of (a or an) square.

3) Dog-run-adaptable anti-wobbling foldable top trusses 103 is (or are each) formed into the shape of (a or an) tube.
4) Dog-run-adaptable anti-wobbling foldable corner trusses 104 is (or are each) formed into the shape of (a or an) tube.
5) Dog-run-adaptable anti-wobbling foldable side trusses 105 is (or are each) formed into the shape of (a or an) tube.
6) Dog-run-adaptable anti-wobbling foldable upper posts 106 is (or are each) formed into the shape of (a or an) tube with a square cross-section.
7) Dog-run-adaptable anti-wobbling foldable lower posts 107 is (or are each) formed into the shape of (a or an) tube with a square cross-section.
8) Dog-run-adaptable anti-wobbling arthritic-assisting feet 108 is (or are each) formed into the shape of (a or an) rectangle plate.
9) Dog-run-adaptable anti-wobbling arthritic-assisting foot holes 109.
10) Truss holes 110 is (or are each) formed into the shape of (a or an) circle.
11) Robot-assembled automatically-making-rivet-tail-flare noise-canceling injury-preventing top-connector system 111 is (or are each) formed into the combined shapes of its components.
12) Top robot-assembled connectors 112 is (or are each) formed into the shape of (a or an) U-shaped box with at least one receiving cavity or protrusion.
13) Top robot-assembled heat-expandable cold-contractable holes 113 is (or are each) formed into the shape of (a or an) circle.
14) Top robot-assembled automatically-flaring-and-shielding-rivet-tail injury-preventing hammer-shields 114 is (or are each) formed into the shape of (a or an) rectangle.
15) Top robot-assembled heat-expandable cold-contractable double-tail rivets 115 is (or are each) formed into the shape of (a or an) tube with a circular head.
16) Robot-assembled heat-expandable cold-contractable interlocking anti-wobbling spiral-saw screw system 116 is (or are each) formed into the combined shapes of its components.
17) Robot-assembled heat-expandable cold-contractable anti-wobbling screws 117 is (or are each) formed into the shape of (a or an) cylinder.
18) Robot-assembled heat-expandable cold-contractable spirally-threading spiral saws 118 is (or are each) formed into the shape of (a or an) jagged teeth.
19) Robot-assembled heat-expandable cold-contractable spiral-teeth 119 is (or are each) formed into the shape of (a or an) angled triangle.
20) Robot-assembled heat-expandable cold-contractable interlocking cones 120 is (or are each) formed into the shape of (a or an) cone.
21) Robot-assembled heat-expandable cold-contractable interlocking spiral locks 121 is (or are each) formed into the shape of (a or an) spiral.
22) Robot-assembled injury-preventing cone-shielding central intersector system 122 is (or are each) formed into the combined shapes of its components.
23) Central robot-assembled intersectors 123 is (or are each) formed into the shape of (a or an) cylinder with at least one receiving cavity or protrusion.
24) Central robot-assembled heat-expandable cold-contractable holes 124 is (or are each) formed into the shape of (a or an) circle.
25) Central robot-assembled automatically-flaring-and-shielding-cone-head injury-preventing hammer-shields 125 is (or are each) formed into the shape of (a or an) rectangle.
26) Robot-assembled injury-preventing cone-shielding upper intersector system 126 is (or are each) formed into the combined shapes of its components.
27) Upper robot-assembled intersectors 127 is (or are each) formed into the shape of (a or an) box with at least one receiving cavity or protrusion.
28) Upper robot-assembled heat-expandable cold-contractable holes 128 is (or are each) formed into the shape of (a or an) circle.
29) Upper robot-assembled automatically-flaring-and-shielding-cone-head injury-preventing hammer-shields 129 is (or are each) formed into the shape of (a or an) rectangle.
30) Robot-assembled arthritic-assisting injury-preventing cone-shielding lower intersector system 130 is (or are each) formed into the combined shapes of its components.
31) Lower robot-assembled intersectors 131 is (or are each) formed into the shape of (a or an) box with at least one receiving cavity or protrusion.
32) Lower robot-assembled heat-expandable cold-contractable holes 132 is (or are each) formed into the shape of (a or an) circle.
33) Lower robot-assembled cone-shielding injury-preventing hammer-shields 133 is (or are each) formed into the shape of (a or an) rectangle.
34) Lower robot-assembled arthritic-assisting height-adjusting dog-run-panel-rope hooks 134 is (or are each) formed into the shape of (a or an) hook.
35) Lower robot-assembled noise-canceling friction-reducing height-adjusting nipples 135 is (or are each) formed into the shape of (a or an) cylinder.
36) Lower robot-assembled noise-canceling friction-reducing lead-in nipple tips 136 is (or are each) formed into the shape of (a or an) cylinder.
37) Lower robot-assembled self-securing nipple-securing pins 137 is (or are each) formed into the shape of (a or an) cylinder.
38) Lower robot-assembled self-securing hook-securing pins 138 is (or are each) formed into the shape of (a or an) cylinder.
39) Lower robot-assembled hook spring 139 is (or are each) formed into the shape of (a or an) spring with at least one hook end.
40) Lower robot-assembled noise-canceling friction-reducing nipple-centering tunnels 140 is (or are each) formed into the shape of (a or an) circle.
41) Robot-assembled arthritic-assisting injury-preventing post-centering tick-preventing water-discharging sleeve system 141 is (or are each) formed into the combined shapes of its components.
42) Robot-assembled sleeves 142 is (or are each) formed into the shape of (a or an) box.
43) Sleeve robot-assembled post-centering clamps 143 is (or are each) formed into the shape of (a or an) rectangle.
44) Sleeve robot-assembled tick-preventing downward teeth 144 is (or are each) formed into the shape of (a or an) triangle.
45) Sleeve robot-assembled water-discharging grooves 145 is (or are each) formed into the shape of (a or an) trough.
46) Sleeve robot-assembled arthritic-assisting height-adjusting dog-run-panel-rope hooks 146 is (or are each) formed into the shape of (a or an) hook.
47) Sleeve robot-assembled noise-canceling friction-reducing post-height-adjusting grooved nipples 147.
48) Sleeve robot-assembled noise-canceling friction-reducing hook jacking jacks 148 is (or are each) formed into the shape of (a or an) cylinder.

49) Sleeve robot-assembled self-securing jack-securing pins 149 is (or are each) formed into the shape of (a or an) cylinder.
50) Sleeve robot-assembled self-securing hook-securing pins 150 is (or are each) formed into the shape of (a or an) cylinder.
51) Sleeve robot-assembled hook spring 151 is (or are each) formed into the shape of (a or an) spring with at least one hook end.
52) Sleeve robot-assembled noise-canceling friction-reducing flower-shaped nipple-centering holes 152 is (or are each) formed into the shape of (a or an) flower.
53) Robot-assembled noise-canceling injury-preventing rust-preventing truss-centering cover-cushion system 153 is (or are each) formed into the combined shapes of its components.
54) Robot-assembled rust-preventing truss-end covers 154 is (or are each) formed into the shape of (a or an) open-top box.
55) Robot-assembled noise-canceling cover-cushion 155 is (or are each) formed into the shape of (a or an) rounded rectangle.
56) Robot-assembled injury-preventing inward-curved cover-cushion edges 156 is (or are each) formed into the shape of (a or an) inward curve.
57) Robot-assembled heat-expandable cold-contractable double-tail cover-cushion rivets 157 is (or are each) formed into the shape of (a or an) tube.
58) Robot-assembled arthritic-assisting noise-canceling injury-preventing rust-preventing truss-centering cup-cushion system 158 is (or are each) formed into the combined shapes of its components.
59) Robot-assembled noise-canceling cup-cushion 159 is (or are each) formed into the shape of (a or an) open-top box.
60) Robot-assembled injury-preventing inward-curved cup-cushion edges 160 is (or are each) formed into the shape of (a or an) inward curve.
61) Robot-assembled arthritic-assisting noise-canceling circular-cushion system 161 is (or are each) formed into the combined shapes of its components.
62) Robot-assembled noise-canceling circular-cushion 162 is (or are each) formed into the shape of (a or an) squashed sphere.
63) Robot-assembled double-tail built-in circular-cushion rivets 163 is (or are each) formed into the shape of (a or an) tube.

Connection

Referring to FIG. 1, FIG. 2, FIG. 3, FIG. 4, FIG. 5, FIG. 6A, FIG. 6B, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65, FIG. 66, FIG. 67, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, and FIG. 128:

1) Robot-assembled arthritic-assisting noise-canceling friction-reducing dog-run-adaptable anti-wobbling-gazebo system 101 is (or are each) connected by the combined connections of its components.
2) Adjustable canopy 102
   is (or are each)
   secured over dog-run-adaptable anti-wobbling foldable top trusses 103.
3) Dog-run-adaptable anti-wobbling foldable top trusses 103
   is (or are each)
   robotically attached to top robot-assembled connectors 112.
4) Dog-run-adaptable anti-wobbling foldable corner trusses 104
   is (or are each)
   robotically pivotably attached to dog-run-adaptable anti-wobbling foldable top trusses 103.
5) Dog-run-adaptable anti-wobbling foldable side trusses 105
   is (or are each)
   robotically pivotably attached to upper robot-assembled intersectors 127 and
   lower robot-assembled intersectors 131.
6) Dog-run-adaptable anti-wobbling foldable upper posts 106
   is (or are each)
   robotically inserted within upper robot-assembled intersectors 127 and lower
   robot-assembled intersectors 131.
7) Dog-run-adaptable anti-wobbling foldable lower posts 107
   is (or are each)
   slidably inserted within dog-run-adaptable anti-wobbling foldable upper posts 106.
8) Dog-run-adaptable anti-wobbling arthritic-assisting feet 108
   is (or are each)
   robotically welded to dog-run-adaptable anti-wobbling foldable lower posts 107.
9) Dog-run-adaptable anti-wobbling arthritic-assisting foot holes 109
   is (or are each)
   robotically drilled into dog-run-adaptable anti-wobbling arthritic-assisting feet 108.
10) Truss holes 110
    is (or are each)
    robotically drilled into foldable top trusses 103, foldable corner trusses 104, and foldable side trusses 105.
11) Robot-assembled automatically-making-rivet-tail-flare noise-canceling injury-preventing top-connector system 111 is (or are each) connected by the combined connections of its components.
12) Top robot-assembled connectors 112
    is (or are each) foldably
    robotically heated up to expand and robotically heat-riveted to dog-run-adaptable anti-wobbling foldable top trusses 103.
13) Top robot-assembled heat-expandable cold-contractable holes 113
    is (or are each)
    robotically heated up to expand and robotically molded in top robot-assembled connectors 112.
14) Top robot-assembled automatically-flaring-and-shielding-rivet-tail injury-preventing hammer-shields 114 is (or are each)
robotically heated up to expand and robotically molded on top robot-assembled connectors 112 to cover at least one of top robot-assembled heat-expandable cold-contractable holes 113.

15) Top robot-assembled heat-expandable cold-contractable double-tail rivets 115
is (or are each)
robotically heated up to expand and robotically heat-hammered through top robot-assembled heat-expandable cold-contractable holes 113 against top robot-assembled automatically-flaring-and-shielding-rivet-tail injury-preventing hammer-shields 114 such that hammer-shields 114 automatically bend the tails of top double-tail rivets 115 to secure top robot-assembled connectors 112 to top trusses 103, and automatically shield the tails of top double-tail rivets 115 to prevent user injury.

16) Robot-assembled heat-expandable cold-contractable interlocking anti-wobbling spiral-saw screw system 116 is (or are each) connected by the combined connections of its components.

17) Robot-assembled heat-expandable cold-contractable anti-wobbling screws 117
is (or are each)
robotically heated up to expand and inserted into top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132.

18) Robot-assembled heat-expandable cold-contractable spirally-threading spiral saws 118
is (or are each)
formed to robot-assembled heat-expandable cold-contractable anti-wobbling screws 117.

19) Robot-assembled heat-expandable cold-contractable spiral-teeth 119
is (or are each)
formed to robot-assembled heat-expandable cold-contractable spirally-threading spiral saws 118.

20) Robot-assembled heat-expandable cold-contractable interlocking cones 120
is (or are each)
formed to robot-assembled heat-expandable cold-contractable anti-wobbling screws 117.

21) Robot-assembled heat-expandable cold-contractable interlocking spiral locks 121
is (or are each)
formed to robot-assembled heat-expandable cold-contractable interlocking cones 120.

22) Robot-assembled injury-preventing cone-shielding central intersector system 122 is (or are each) connected by the combined connections of its components.

23) Central robot-assembled intersectors 123
is (or are each)
robotically heated up to expand and robotically heat-screwed to dog-run-adaptable anti-wobbling foldable top trusses 103.

24) Central robot-assembled heat-expandable cold-contractable holes 124
is (or are each)
robotically heated up to expand and robotically molded in central robot-assembled intersectors 123.

25) Central robot-assembled automatically-flaring-and-shielding-cone-head injury-preventing hammer-shields 125
is (or are each)
robotically heated up to expand and robotically molded on central robot-assembled intersectors 123 to cover at least one of central robot-assembled heat-expandable cold-contractable holes 124.

26) Robot-assembled injury-preventing cone-shielding upper intersector system 126 is (or are each) connected by the combined connections of its components.

27) Upper robot-assembled intersectors 127
is (or are each)
robotically heated up to expand and robotically heat-screwed to dog-run-adaptable anti-wobbling foldable top trusses 103 and robotically assembled to dog-run-adaptable anti-wobbling foldable upper posts 106.

28) Upper robot-assembled heat-expandable cold-contractable holes 128
is (or are each)
robotically heated up to expand and robotically molded in upper robot-assembled intersectors 127.

29) Upper robot-assembled automatically-flaring-and-shielding-cone-head injury-preventing hammer-shields 129
is (or are each)
robotically heated up to expand and robotically molded on upper robot-assembled intersectors 127 to cover at least one of upper robot-assembled heat-expandable cold-contractable holes 128.

30) Robot-assembled arthritic-assisting injury-preventing cone-shielding lower intersector system 130 is (or are each) connected by the combined connections of its components.

31) Lower robot-assembled intersectors 131
is (or are each)
robotically heated up to expand and robotically heat-screwed to dog-run-adaptable anti-wobbling foldable corner trusses 104, dog-run-adaptable anti-wobbling foldable side trusses 105, and robotically and slidably attached to dog-run-adaptable anti-wobbling foldable upper posts 106.

32) Lower robot-assembled heat-expandable cold-contractable holes 132
is (or are each)
robotically heated up to expand and robotically molded in lower robot-assembled intersectors 131.

33) Lower robot-assembled cone-shielding injury-preventing hammer-shields 133
is (or are each)
robotically heated up to expand and robotically molded on lower robot-assembled intersectors 131 to cover at least one of lower robot-assembled heat-expandable cold-contractable holes 128.

34) Lower robot-assembled arthritic-assisting height-adjusting dog-run-panel-rope hooks 134
is (or are each)
robotically and pivotably secured to lower robot-assembled intersectors 131 by robot-assembled self-securing hook-securing pins 138.

35) Lower robot-assembled noise-canceling friction-reducing height-adjusting nipples 135
is (or are each)
robotically and pivotably secured to lower robot-assembled arthritic-assisting height-adjusting dog-run-panel-rope hooks 134 by lower robot-assembled self-securing nipple-securing pins 137.

36) Lower robot-assembled noise-canceling friction-reducing lead-in nipple tips 136
is (or are each)
robotically inserted within lower robot-assembled noise-canceling friction-reducing height-adjusting nipples 135.

37) Lower robot-assembled self-securing nipple-securing pins 137
is (or are each)
robotically heated up to expand and robotically heat-pressed through lower robot-assembled arthritic-assisting height-adjusting dog-run-panel-rope hooks 134 and through lower robot-assembled noise-canceling friction-reducing height-adjusting nipples 135.

38) Lower robot-assembled self-securing hook-securing pins 138
is (or are each)
robotically heated up to expand and robotically heat-pressed into lower robot-assembled intersectors 131 and through lower robot-assembled arthritic-assisting height-adjusting dog-run-panel-rope hooks 134.

39) Lower robot-assembled hook spring 139
is (or are each)
robotically springingly inserted between lower robot-assembled intersectors 131 and lower robot-assembled arthritic-assisting height-adjusting dog-run-panel-rope hooks 134.

40) Lower robot-assembled noise-canceling friction-reducing nipple-centering tunnels 140
is (or are each)
robotically molded into lower robot-assembled intersectors 131.

41) Robot-assembled arthritic-assisting injury-preventing post-centering tick-preventing water-discharging sleeve system 141 is (or are each) connected by the combined connections of its components.

42) Robot-assembled sleeves 142
is (or are each)
robotically assembled to dog-run-adaptable anti-wobbling foldable upper posts 106.

43) Sleeve robot-assembled post-centering clamps 143
is (or are each)
robotically molded to robot-assembled sleeves 142.

44) Sleeve robot-assembled tick-preventing downward teeth 144
is (or are each)
robotically molded to sleeve robot-assembled post-centering clamps 143.

45) Sleeve robot-assembled water-discharging grooves 145
is (or are each)
robotically molded into sleeve robot-assembled post-centering clamps 143.

46) Sleeve robot-assembled arthritic-assisting height-adjusting dog-run-panel-rope hooks 146
is (or are each)
robotically and pivotably secured to robot-assembled sleeves 142 by sleeve robot-assembled self-securing hook-securing pins 150.

47) Sleeve robot-assembled noise-canceling friction-reducing post-height-adjusting grooved nipples 147
is (or are each)
robotically formed to sleeve robot-assembled noise-canceling friction-reducing hook-jacking jacks 148.

48) Sleeve robot-assembled noise-canceling friction-reducing hook-jacking jacks 148
is (or are each)
robotically assembled to sleeve robot-assembled arthritic-assisting height-adjusting dog-run-panel-rope hooks 146 by sleeve robot-assembled self-securing jack-securing pins 149.

49) Sleeve robot-assembled self-securing jack-securing pins 149
is (or are each)
robotically heated up to expand and robotically heat-pressed through sleeve robot-assembled arthritic-assisting height-adjusting dog-run-panel-rope hooks 146 and through sleeve robot-assembled noise-canceling friction-reducing hook-jacking jacks 148.

50) Sleeve robot-assembled self-securing hook-securing pins 150
is (or are each)
robotically heated up to expand and robotically heat-pressed into robot-assembled sleeves 142 and through sleeve robot-assembled arthritic-assisting height-adjusting dog-run-panel-rope hooks 146.

51) Sleeve robot-assembled hook spring 151
is (or are each)
robotically springingly inserted between robot-assembled sleeves 142 and robot-assembled arthritic-assisting height-adjusting dog-run-panel-rope hooks 146.

52) Sleeve robot-assembled noise-canceling friction-reducing flower-shaped nipple-centering holes 152
is (or are each)
robotically molded into robot-assembled sleeves 142.

53) Robot-assembled noise-canceling injury-preventing rust-preventing truss-centering cover-cushion system 153
is (or are each) connected by the combined connections of its components.

54) Robot-assembled rust-preventing truss-end covers 154
is (or are each)
robotically assembled to dog-run-adaptable anti-wobbling foldable corner trusses 104.

55) Robot-assembled noise-canceling cover-cushion 155
is (or are each)
robotically formed to robot-assembled rust-preventing truss-end covers 154.

56) Robot-assembled injury-preventing inward-curved cover-cushion edges 156
is (or are each)
robotically formed to robot-assembled noise-canceling cover-cushion 155.

57) Robot-assembled heat-expandable cold-contractable double-tail cover-cushion rivets 157
is (or are each)
robotically heated up to expand and robotically heat-hammered through robot-assembled rust-preventing truss-end covers 154 automatically bend the tails of robot-assembled heat-expandable cold-contractable double-tail cover-cushion rivets 157 to secure robot-assembled heat-expandable cold-contractable double-tail cover-cushion rivets 157 to dog-run-adaptable anti-wobbling foldable corner trusses 104, and automatically shield the tails of robot-assembled heat-expandable cold-contractable double-tail cover-cushion rivets 157 to prevent user injury.

58) Robot-assembled arthritic-assisting noise-canceling injury-preventing rust-preventing truss-centering cup-cushion system 158 is (or are each) connected by the combined connections of its components.

Figure 135:
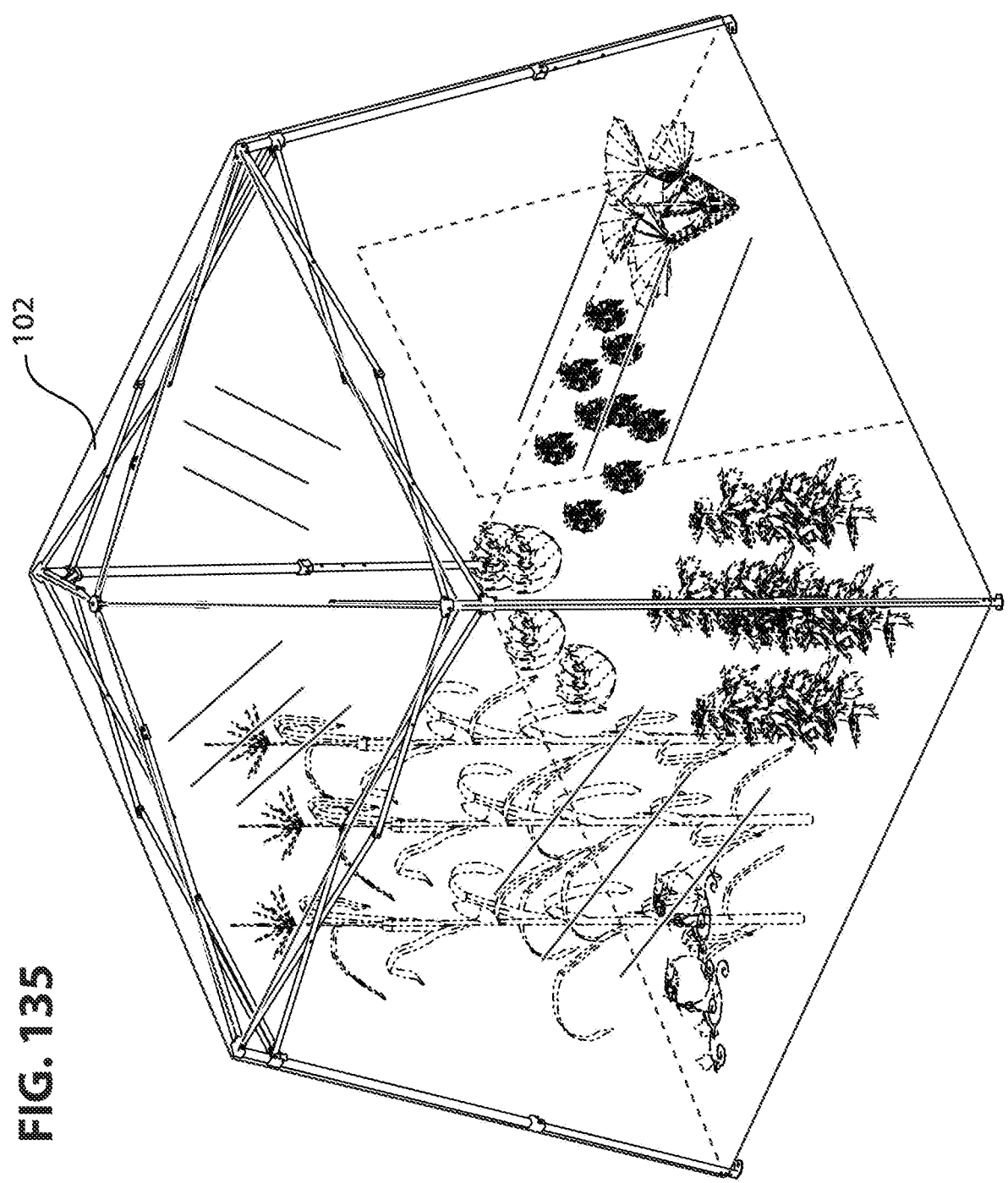
FIG. 135 and FIG. 136 illustrate perspective and cross-sectional views demonstrating how the six-device-in-one robot-assembled arthritic-assisting noise-canceling friction-reducing dog-run-adaptable anti-wobbling gazebo can function as a greenhouse.
Figure 136:
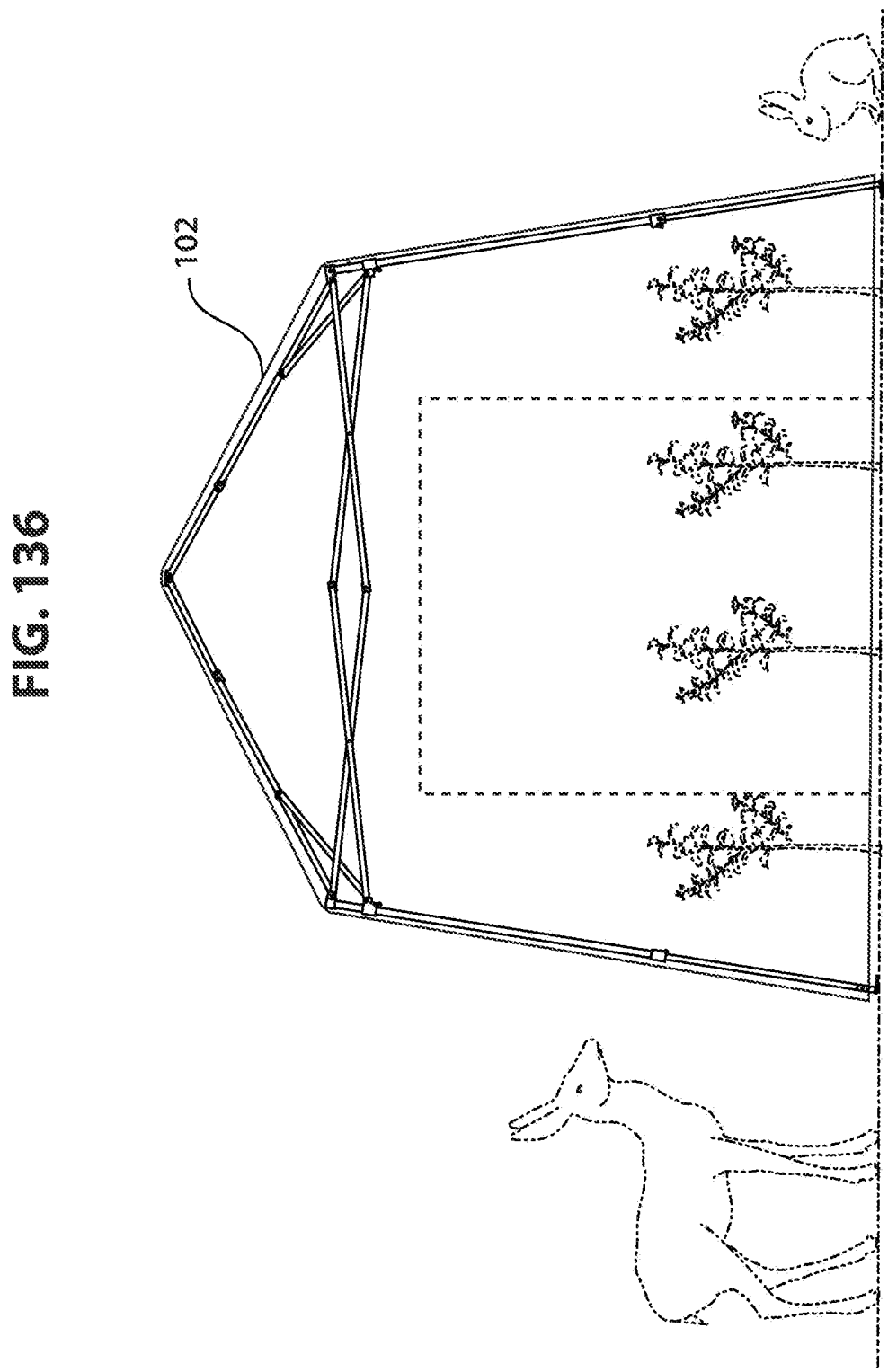
Figure 137:
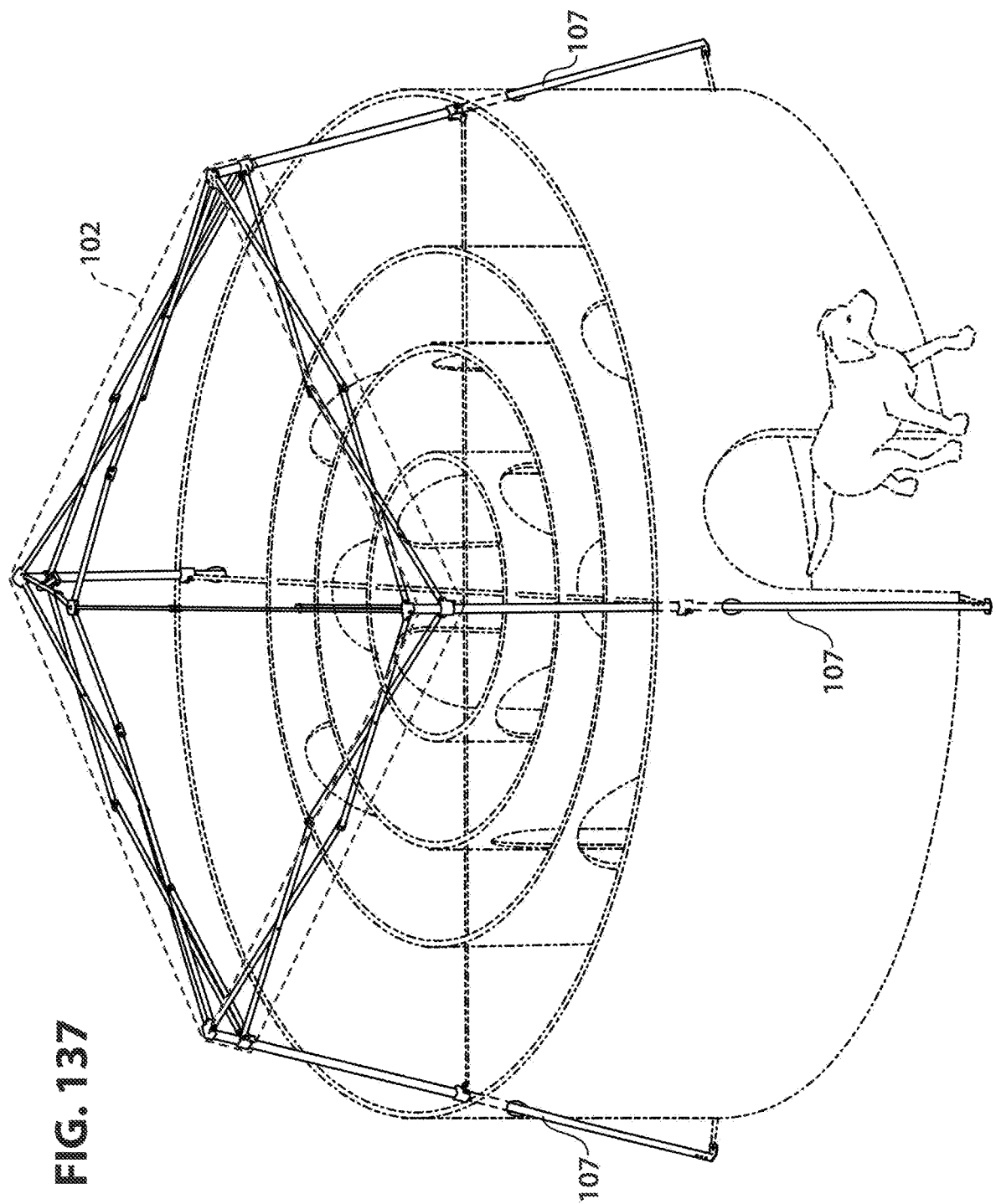
FIG. 137 and FIG. 138 illustrate perspective and cross-sectional views demonstrating how the six-device-in-one robot-assembled arthritic-assisting noise-canceling friction-reducing dog-run-adaptable anti-wobbling gazebo can function as a dog-run.
Figure 138:
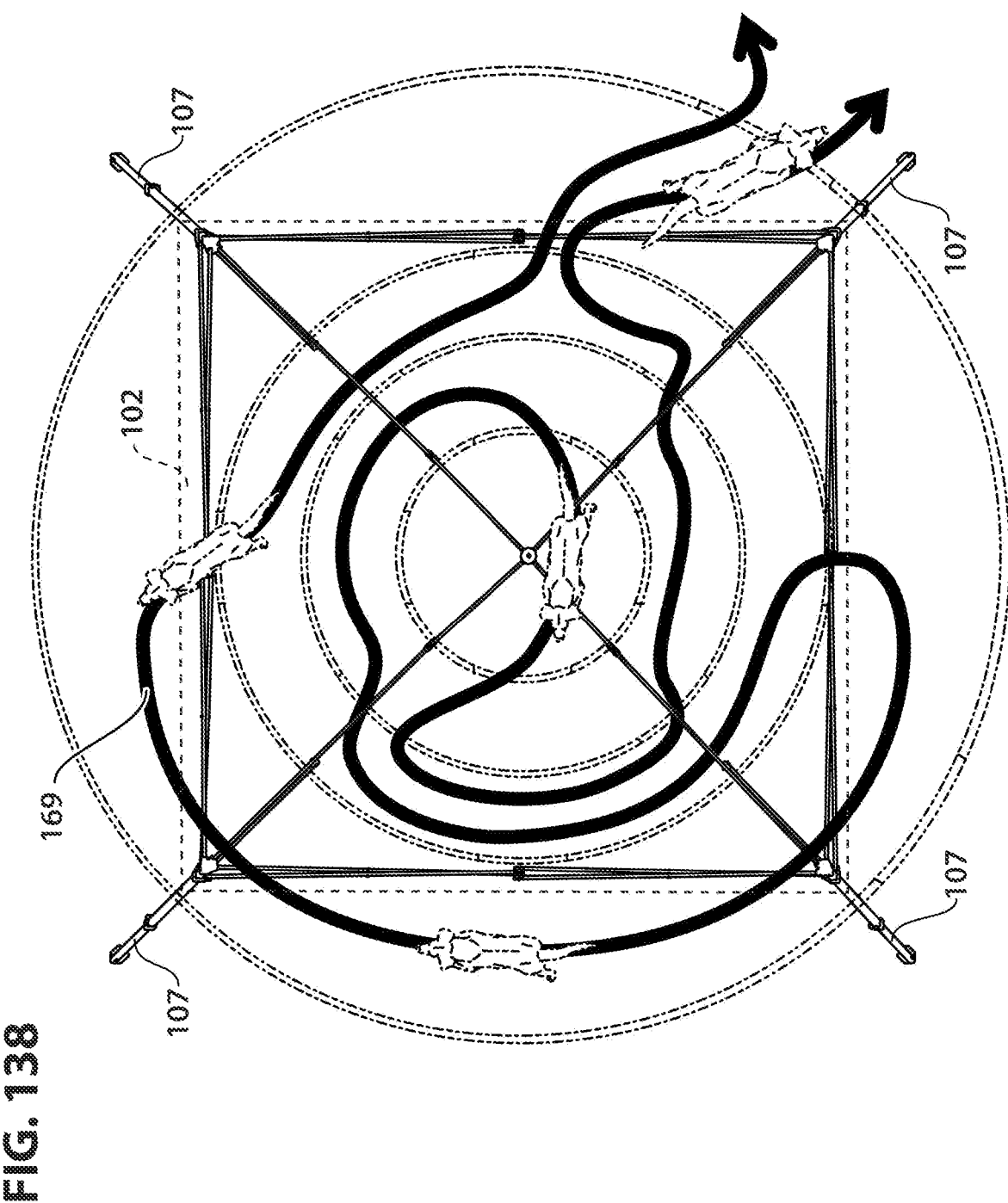
Figure 139:
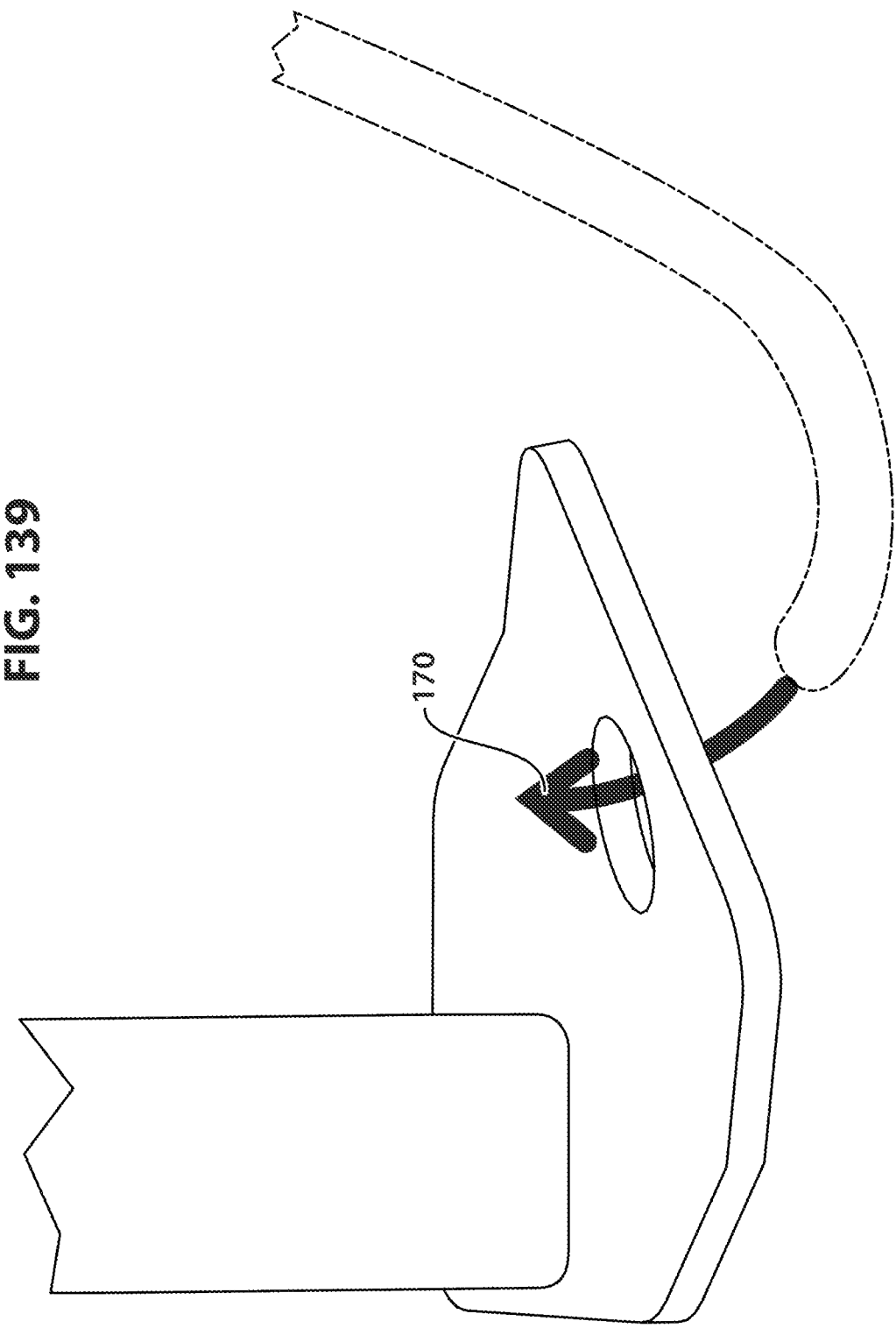
FIG. 139 and FIG. 140 illustrate perspective views demonstrating how a rope can be tied to dog-run-adaptable anti-wobbling arthritic-assisting foot holes to support a dog run.
Figure 140:
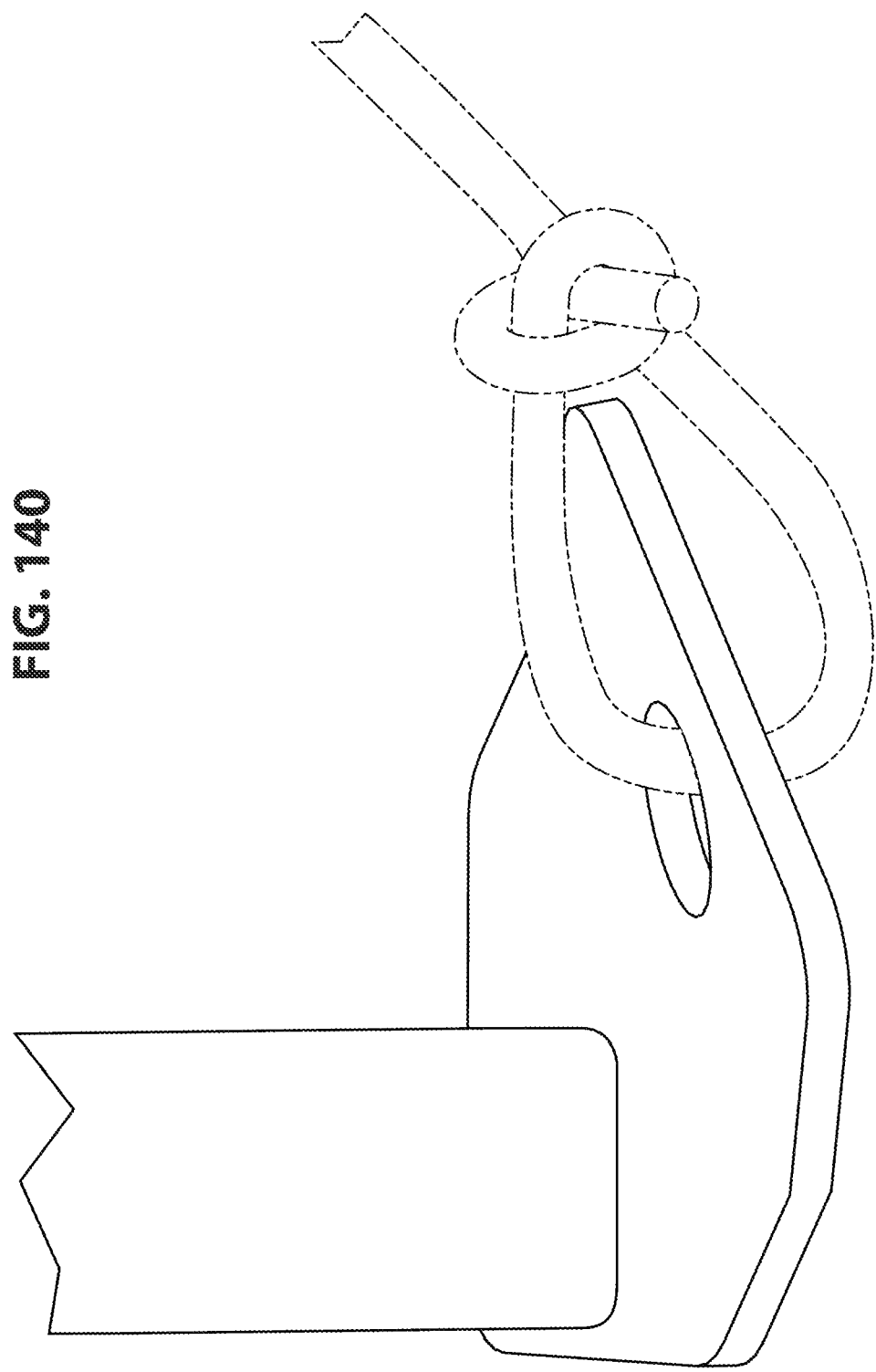
Figure 141:
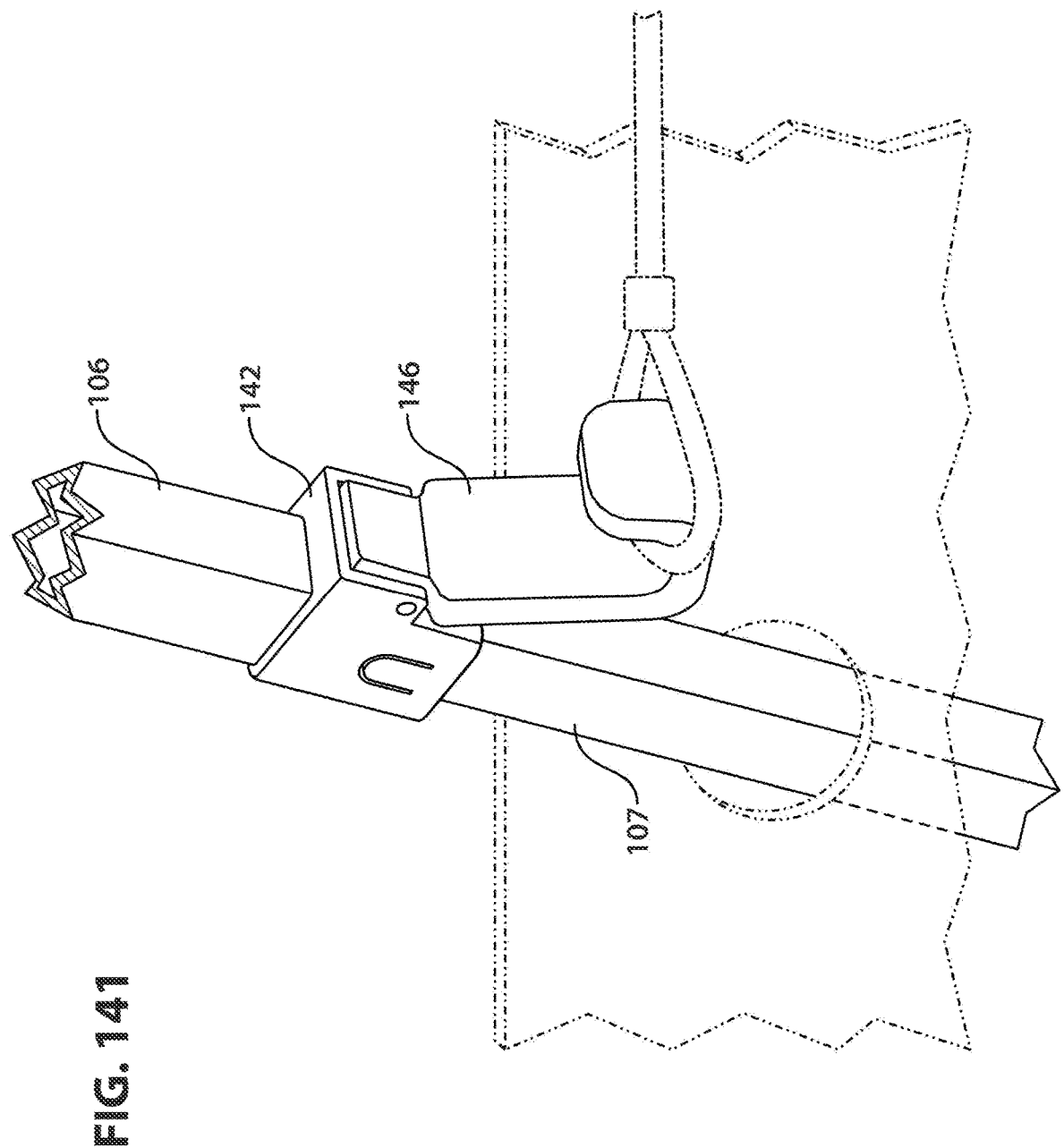
FIG. 141 illustrates a perspective view demonstrating how a rope can be tied to lower robot-assembled arthritic-assisting height-adjusting dog-run-panel-rope hooks to support a dog run.
Figure 142:
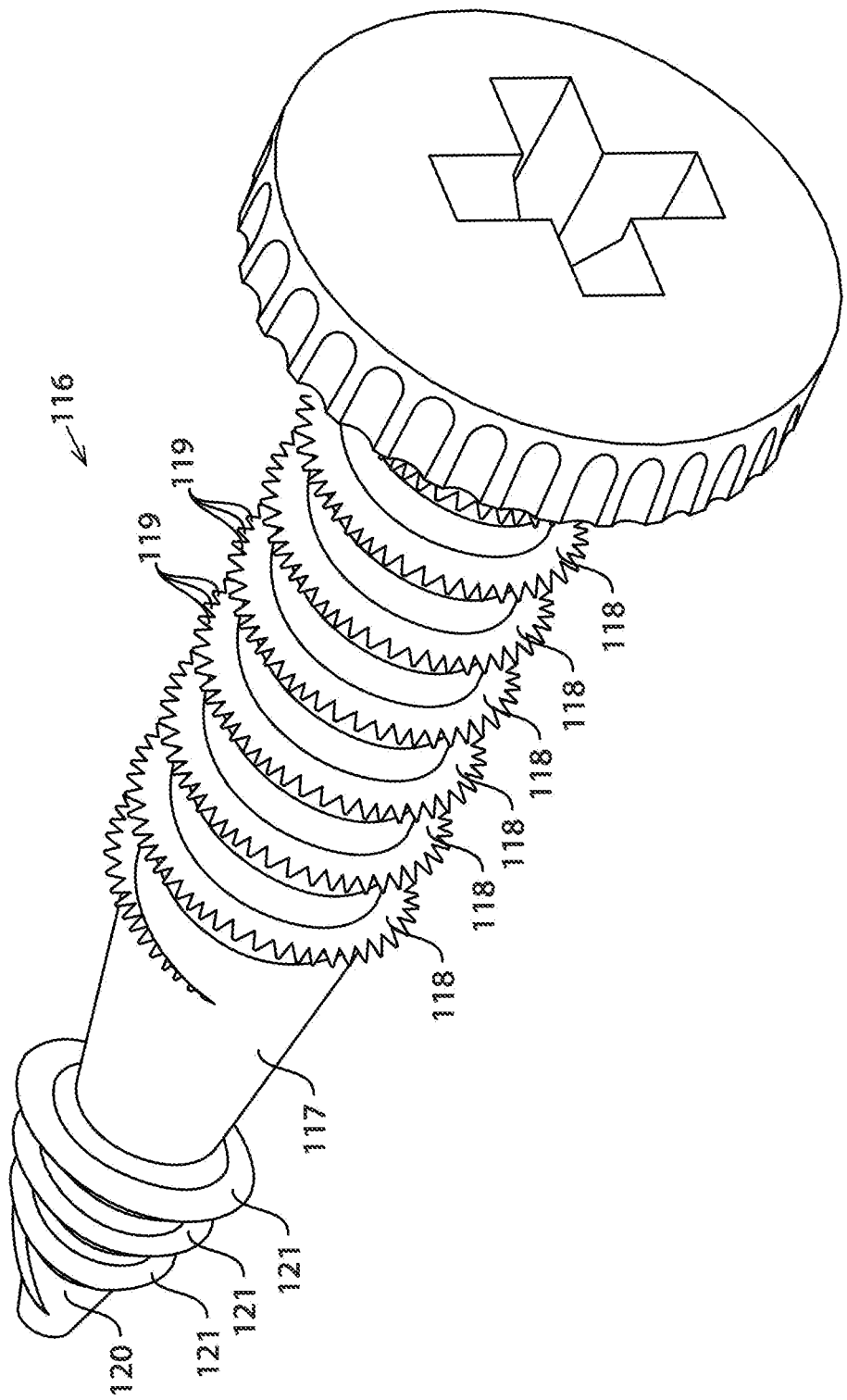
FIG. 142 and FIG. 143 illustrate perspective views of robot-assembled heat-expandable cold-contractable anti-wobbling screws.
Figure 143:
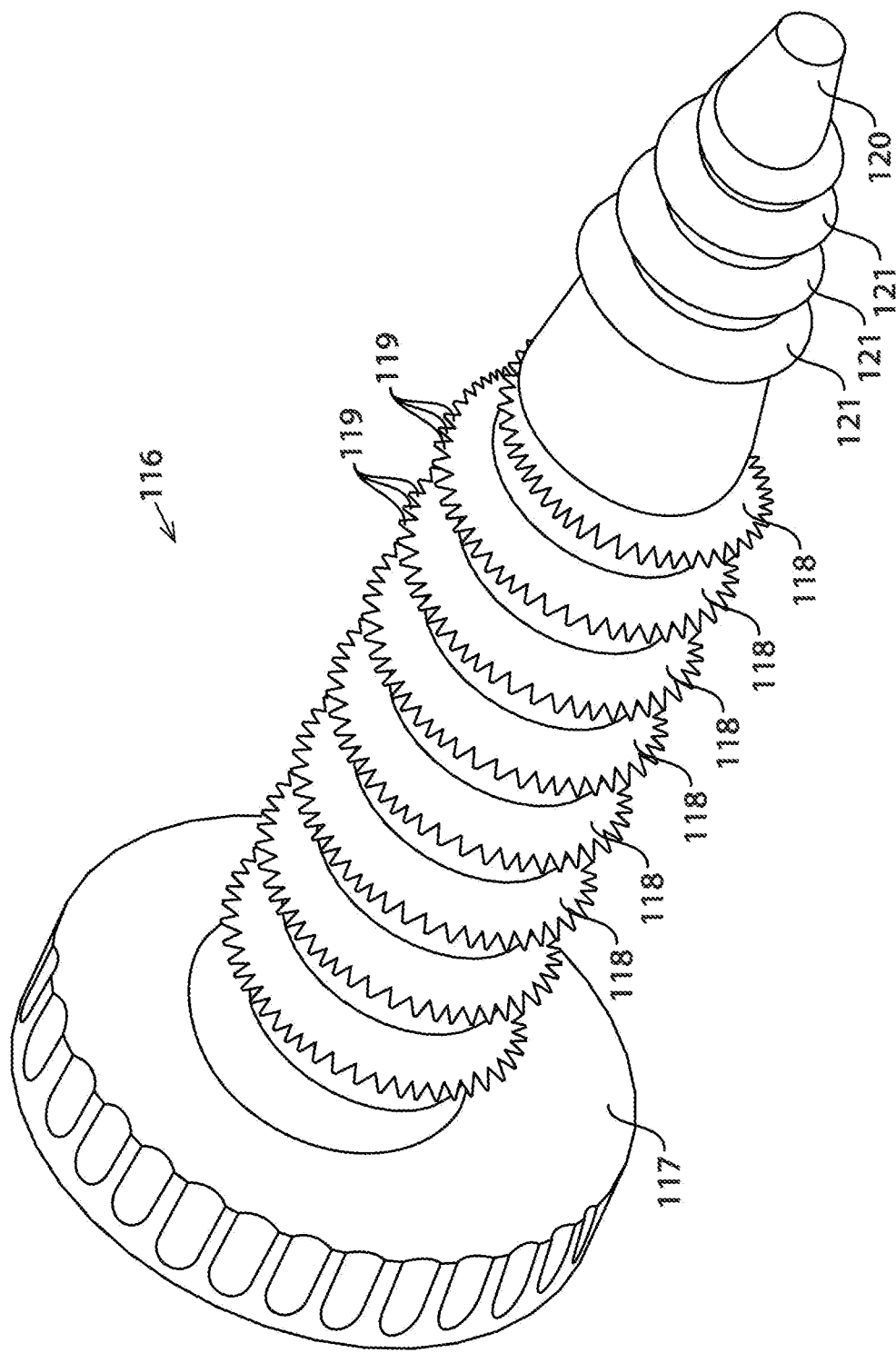
Figure 144:
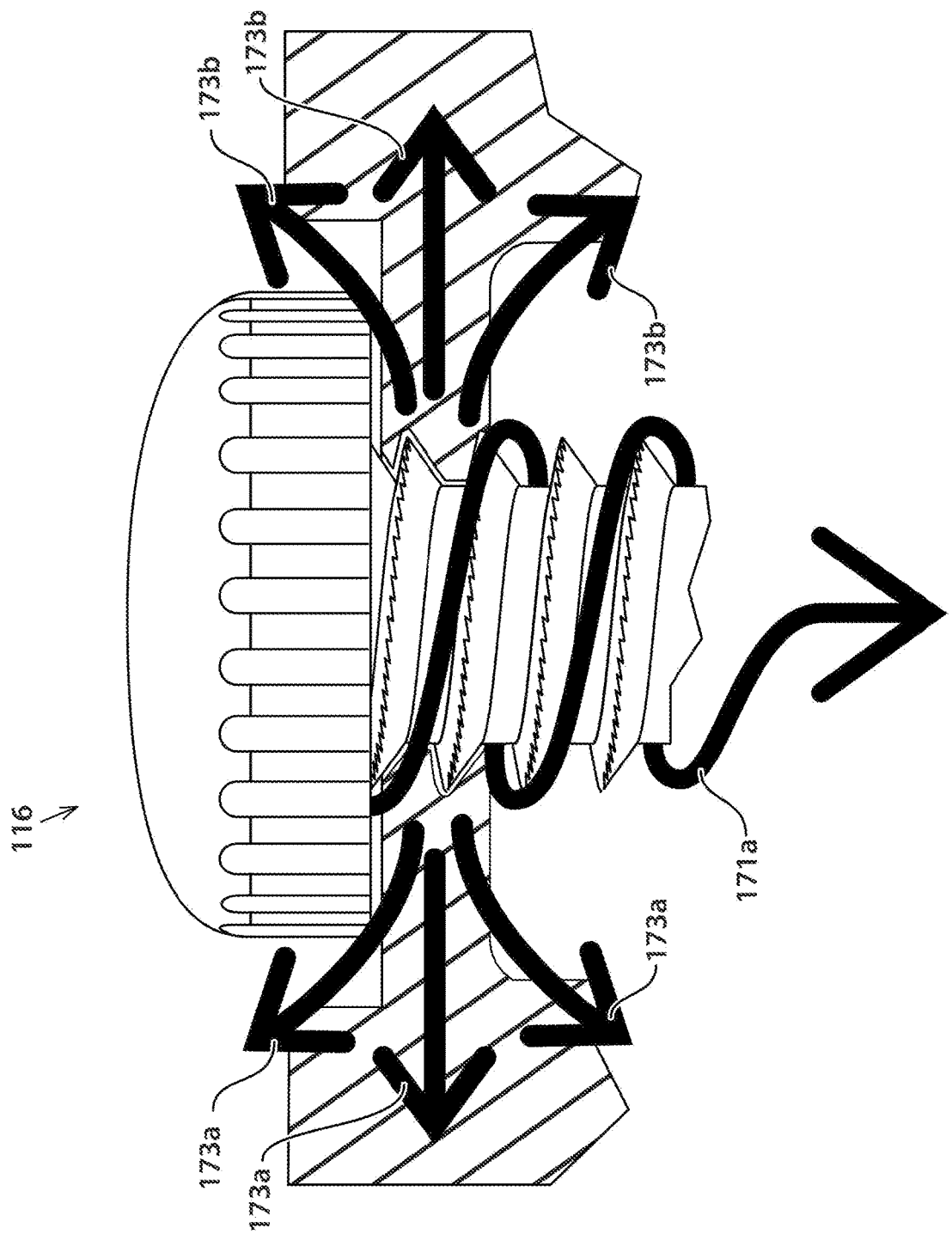
FIG. 144 illustrates a cross-sectional view demonstrating how robotically heated robot-assembled heat-expandable cold-contractable anti-wobbling screws are inserted they automatically form threads in the connector holes and then the plastic contracts as it cools.
Figure 145:
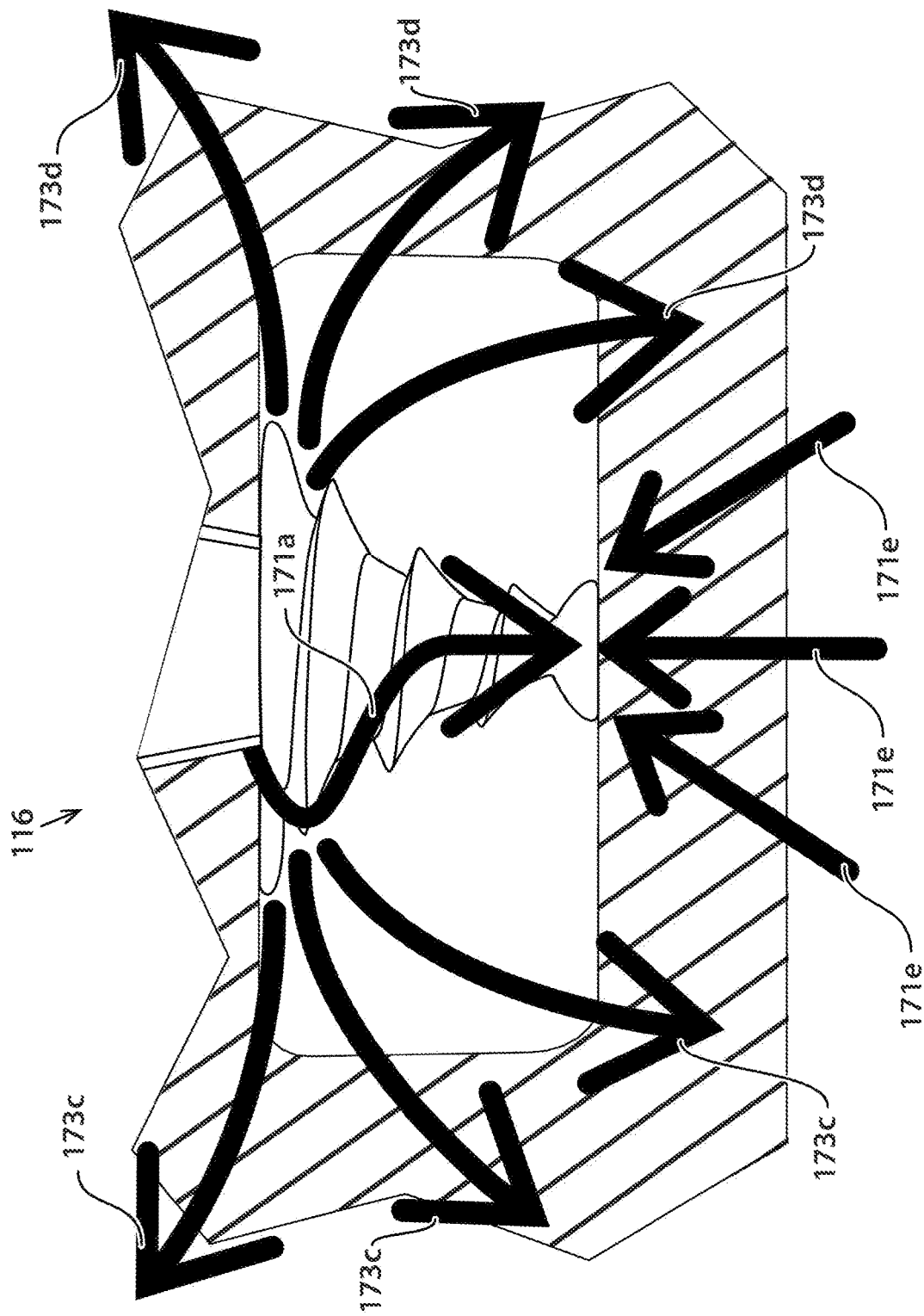
FIG. 145 illustrates a cross-sectional view demonstrating how robot-assembled heat-expandable cold-contractable interlocking cones and robot-assembled heat-expandable cold-contractable interlocking spiral locks expand when they are stopped by hammer-shields.
Figure 146:
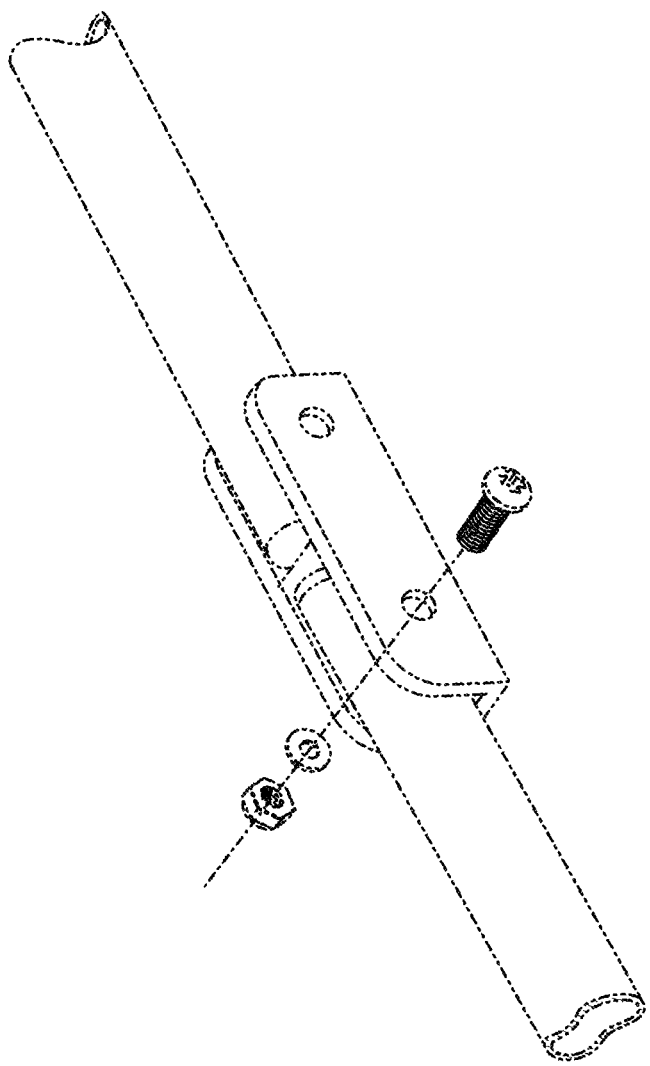
FIG. 146 (Prior Art) illustrates a perspective view of prior art of robot-assembled automatically-making-rivet-tail-flare noise-canceling injury-preventing top-connector system.
Figure 147:
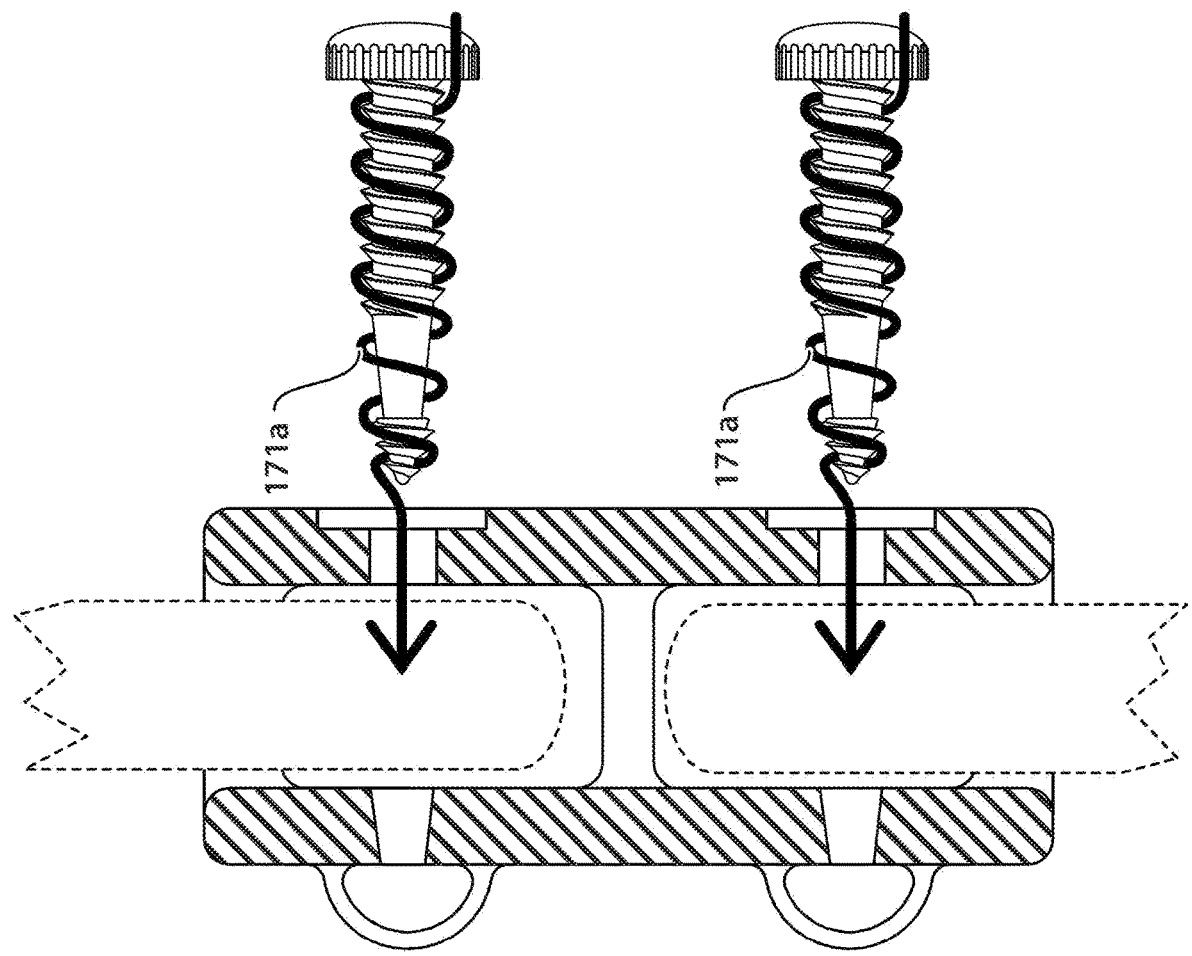
FIG. 147, FIG. 148, FIG. 149, FIG. 150, FIG. 151, FIG. 152, and FIG. 153 illustrate cross-sectional views demonstrating how robot-assembled heat-expandable cold-contractable anti-wobbling screws are inserted into robot-assembled automatically-making-rivet-tail-flare noise-canceling injury-preventing top-connector system.
Figure 148:
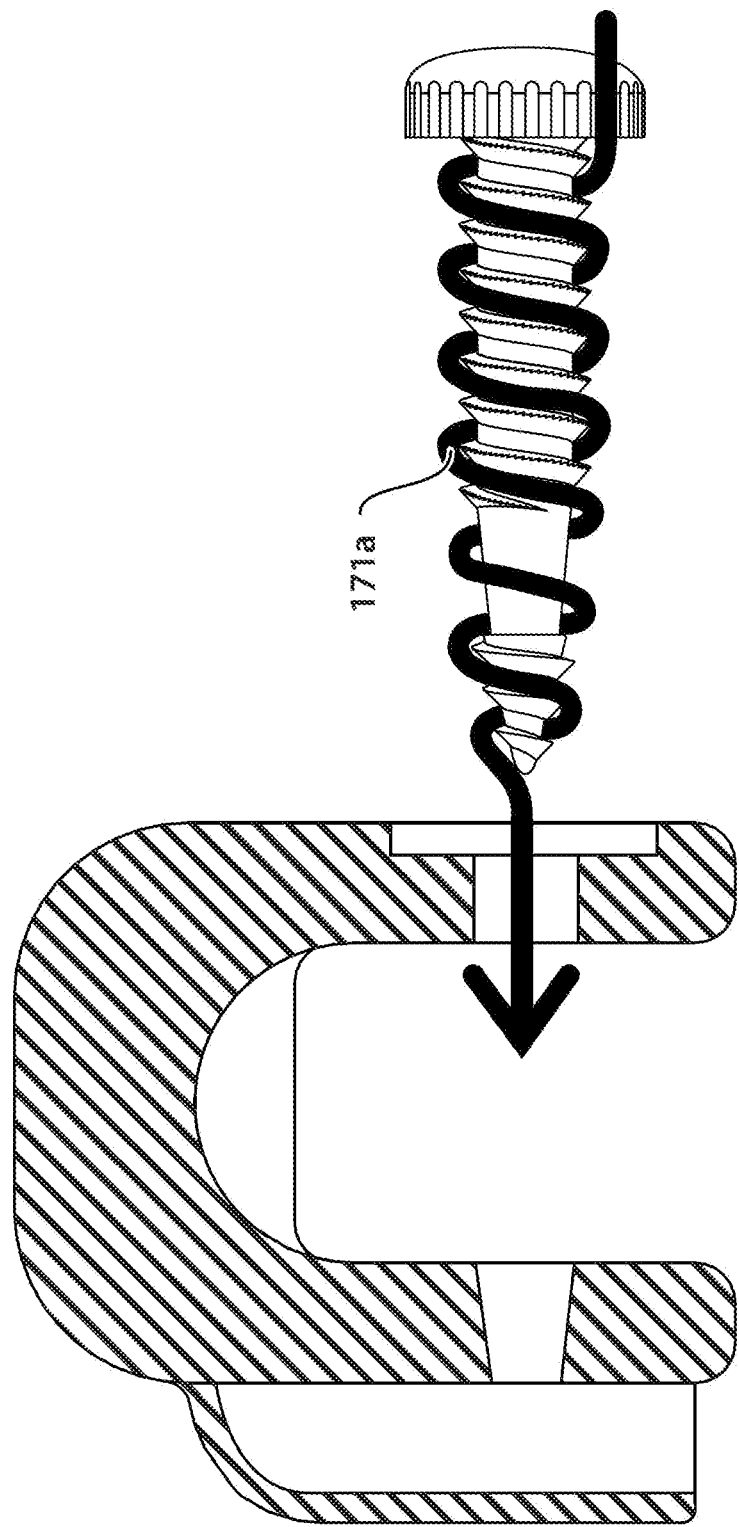
Figure 149:
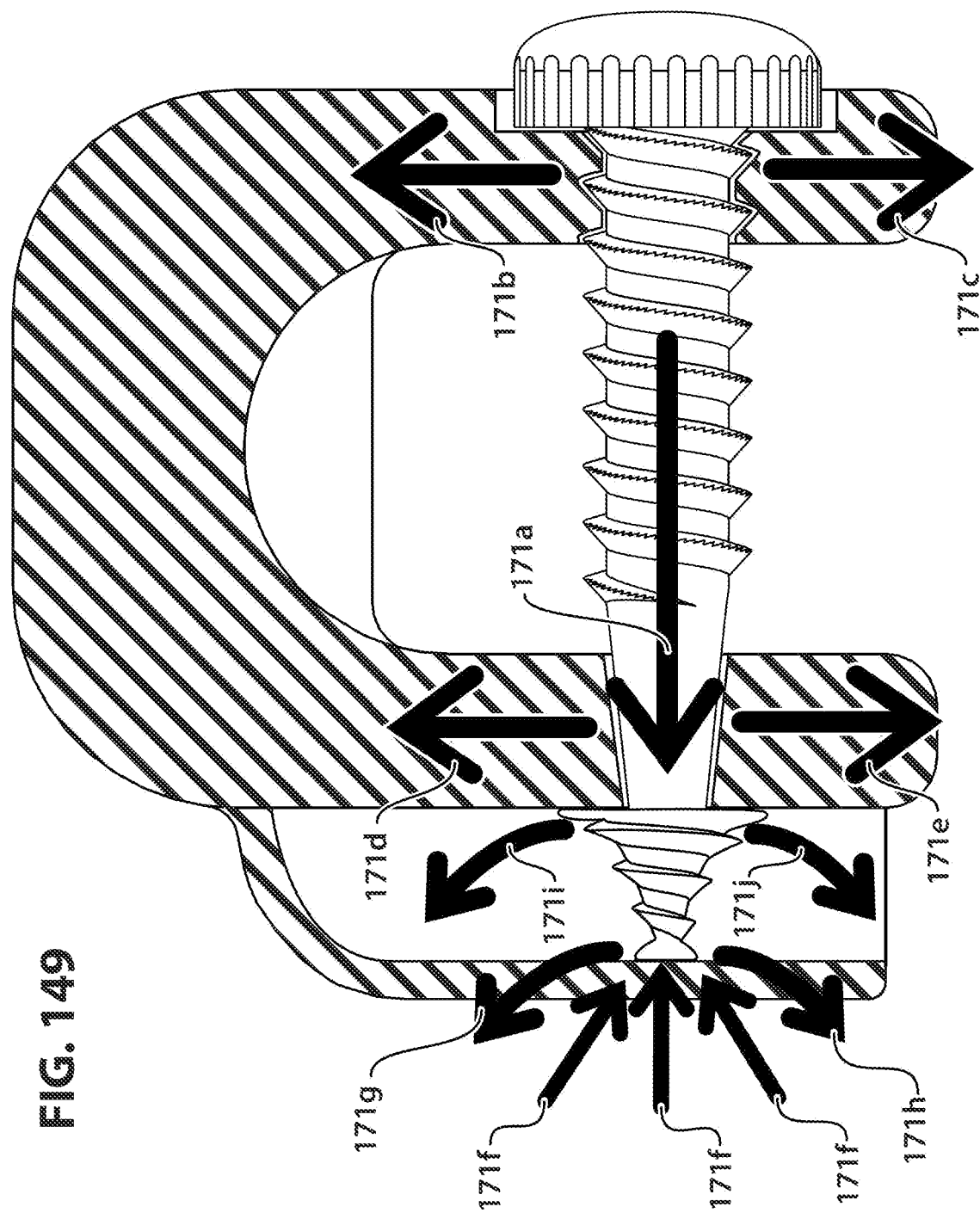
Figure 150:
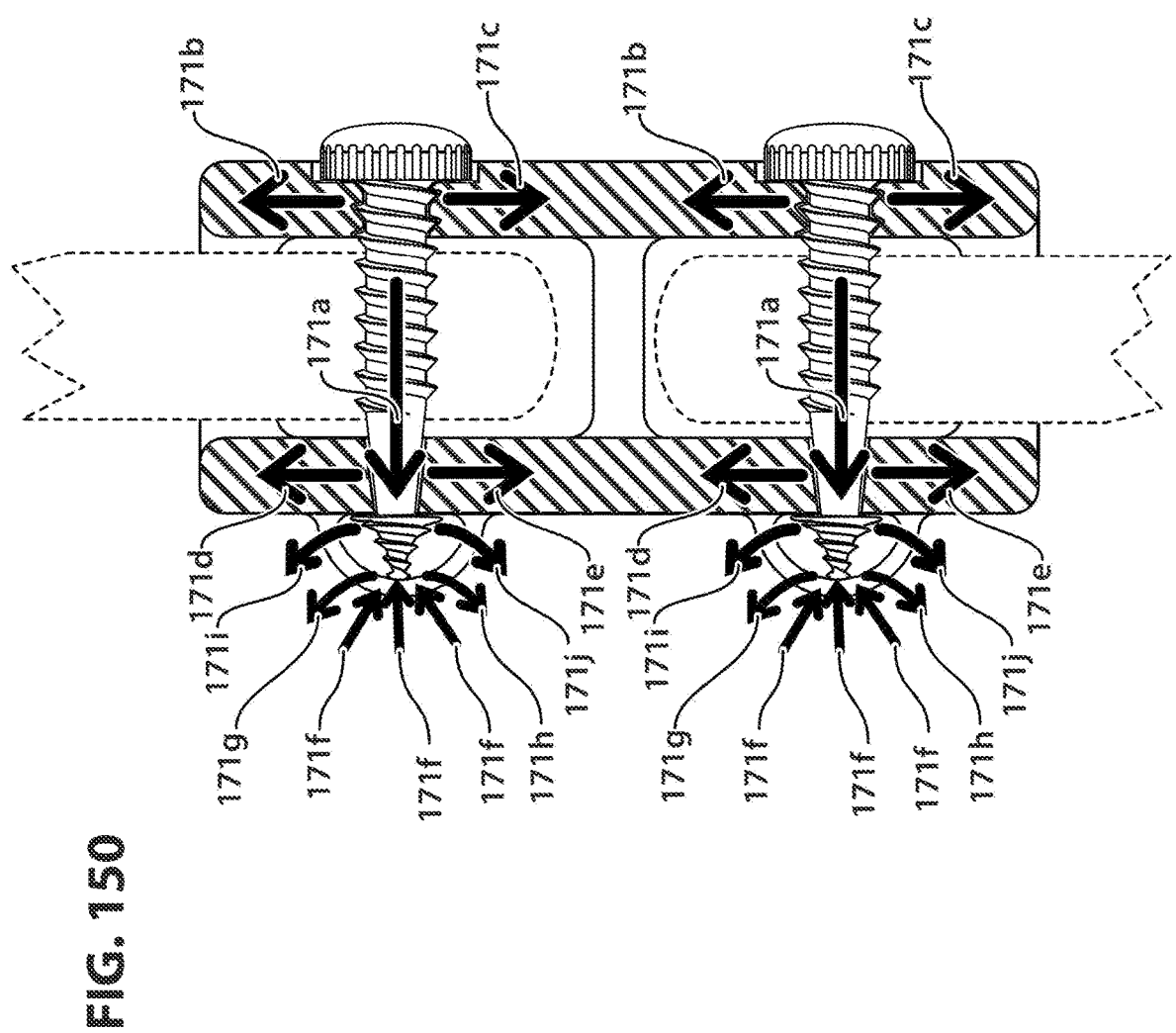
Figure 151:
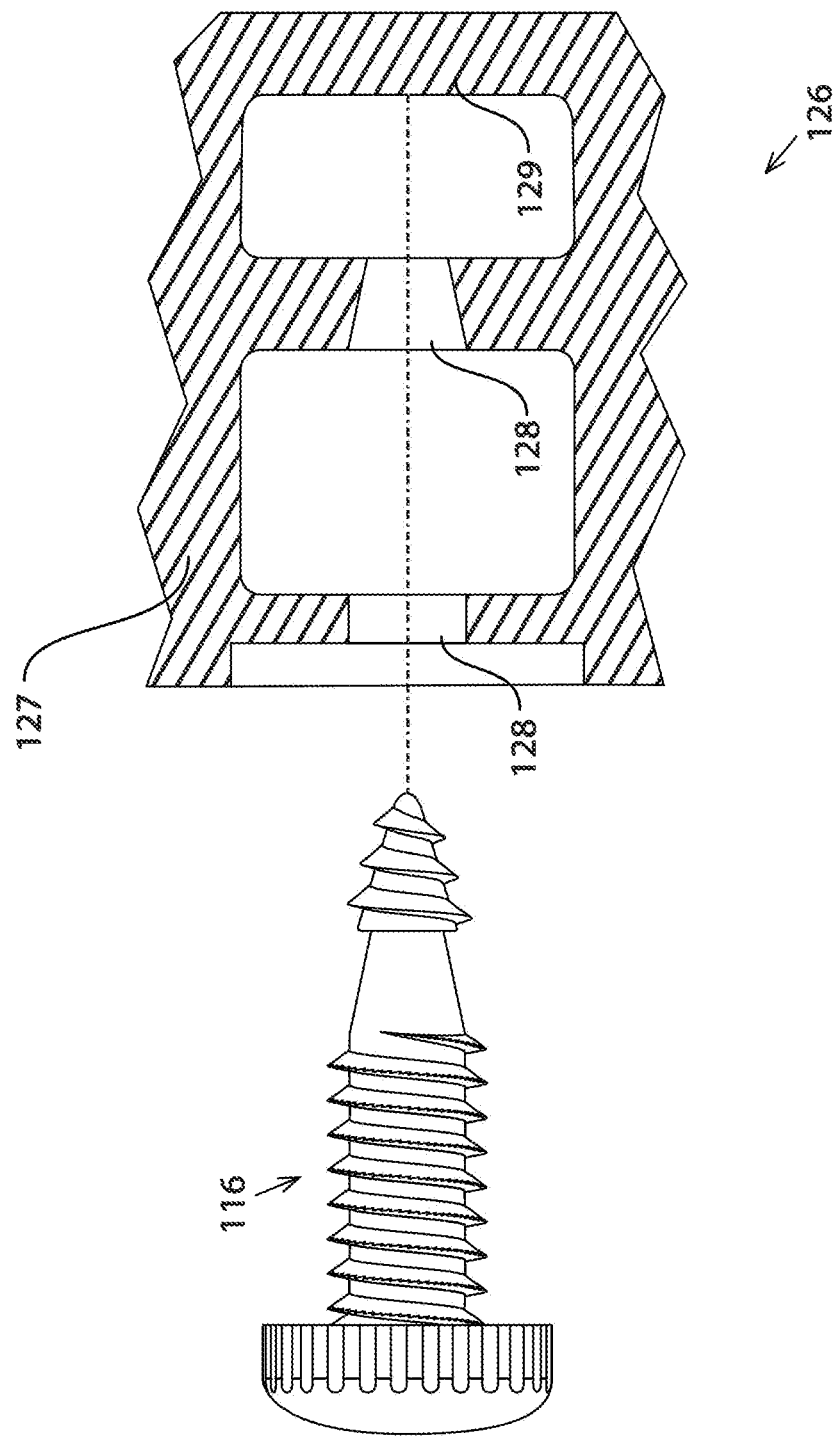
Figure 152:
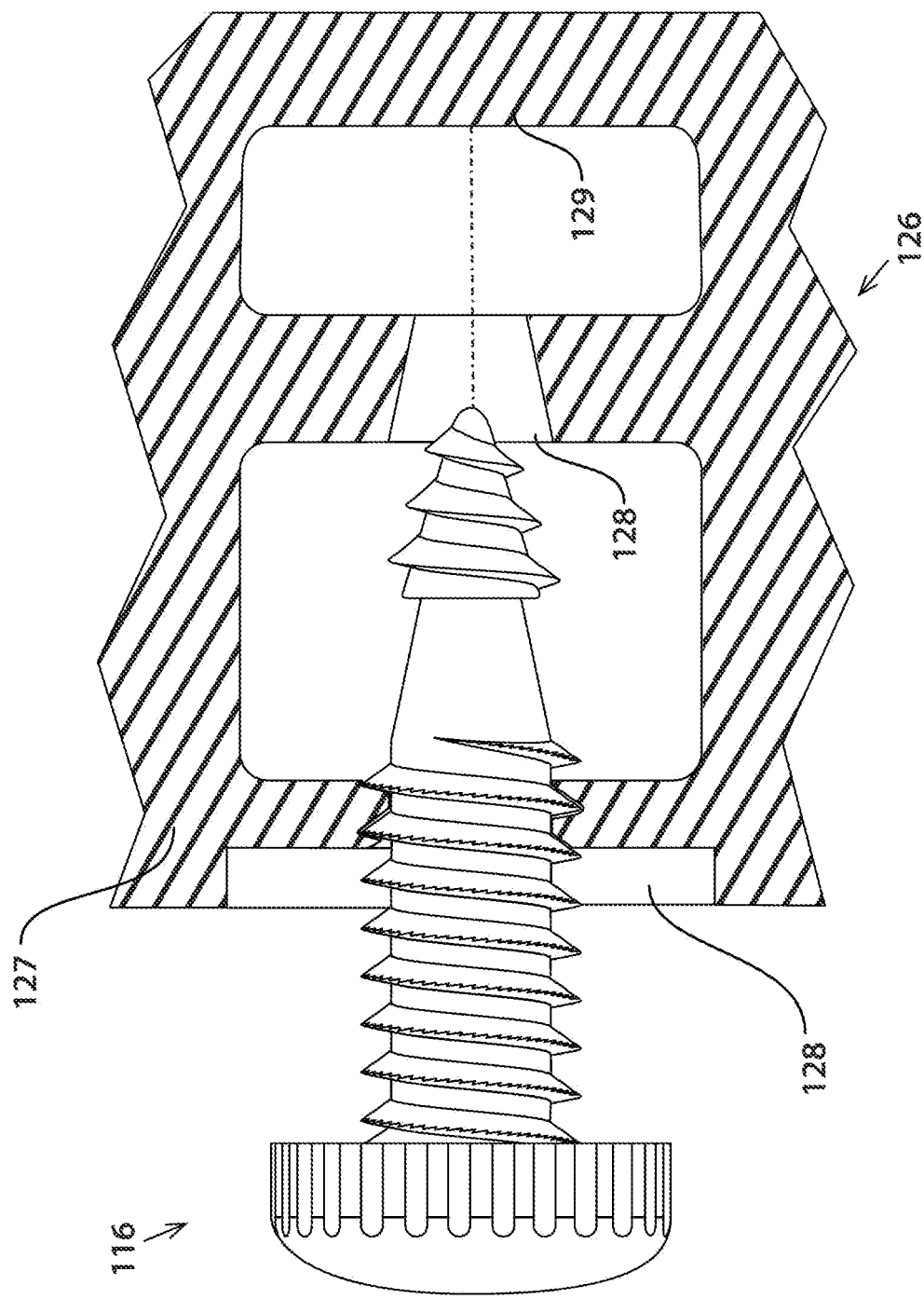
Figure 153:
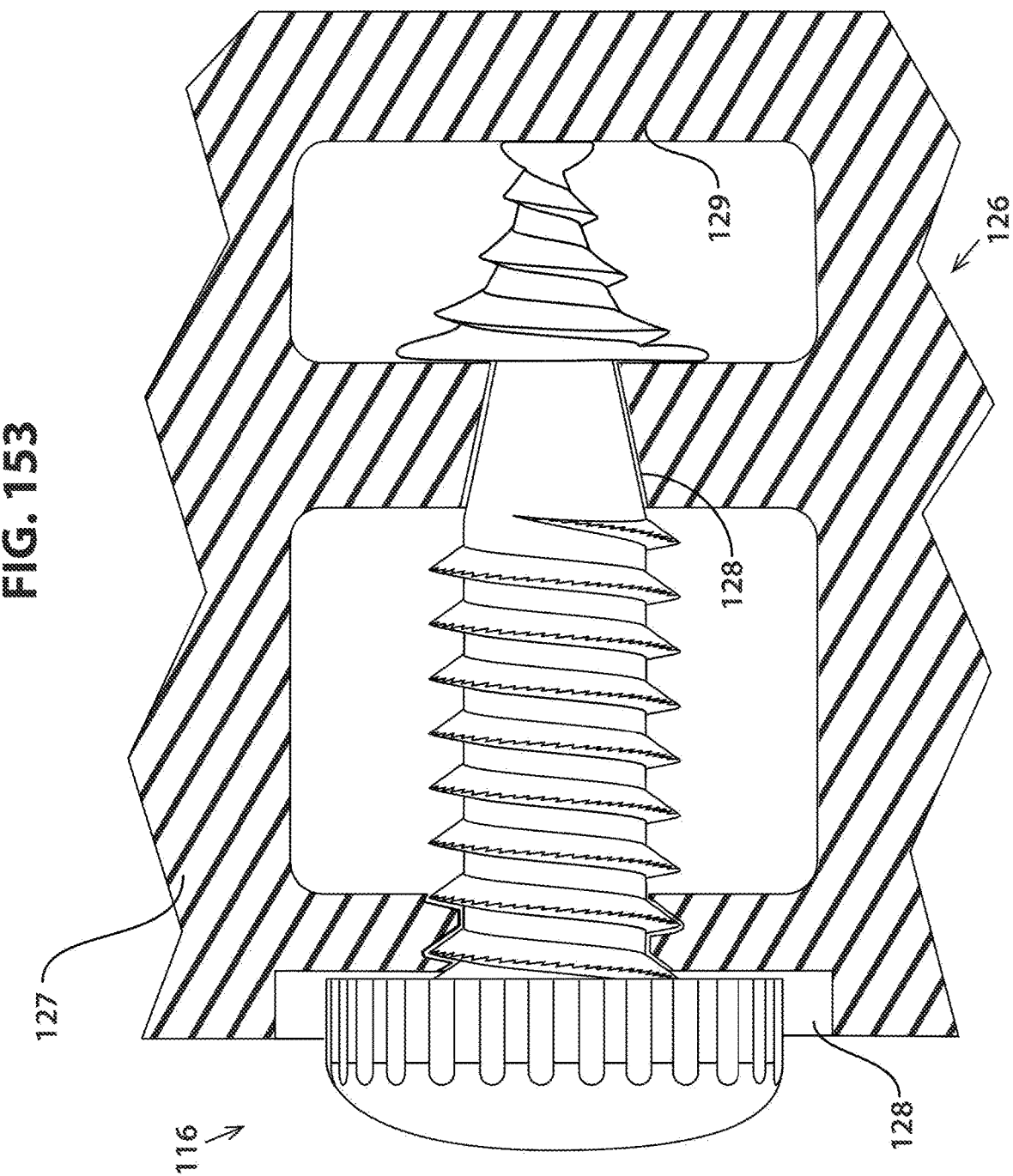
Figure 154:
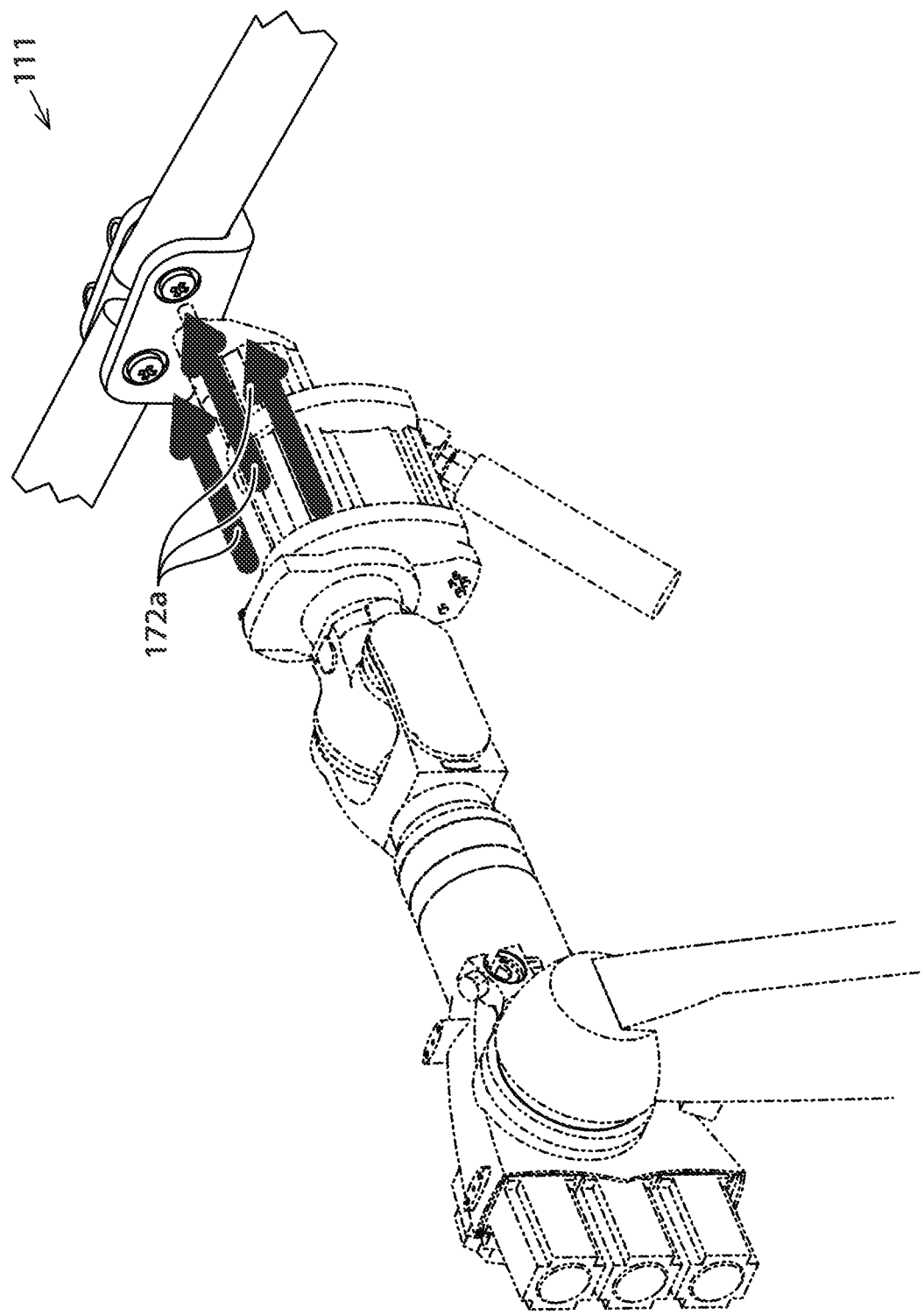
FIG. 154 illustrates a perspective view of how robot-assembled automatically-making-rivet-tail-flare noise-canceling injury-preventing top-connector system is robotically manufactured.
Figure 155:
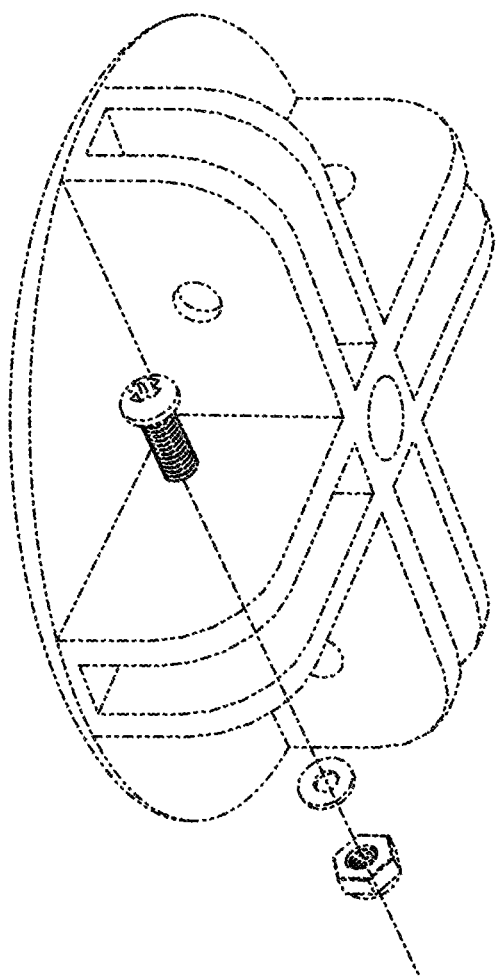
FIG. 155 (Prior Art) illustrates a perspective view of prior art of robot-assembled injury-preventing cone-shielding central intersector system.
Figure 156:
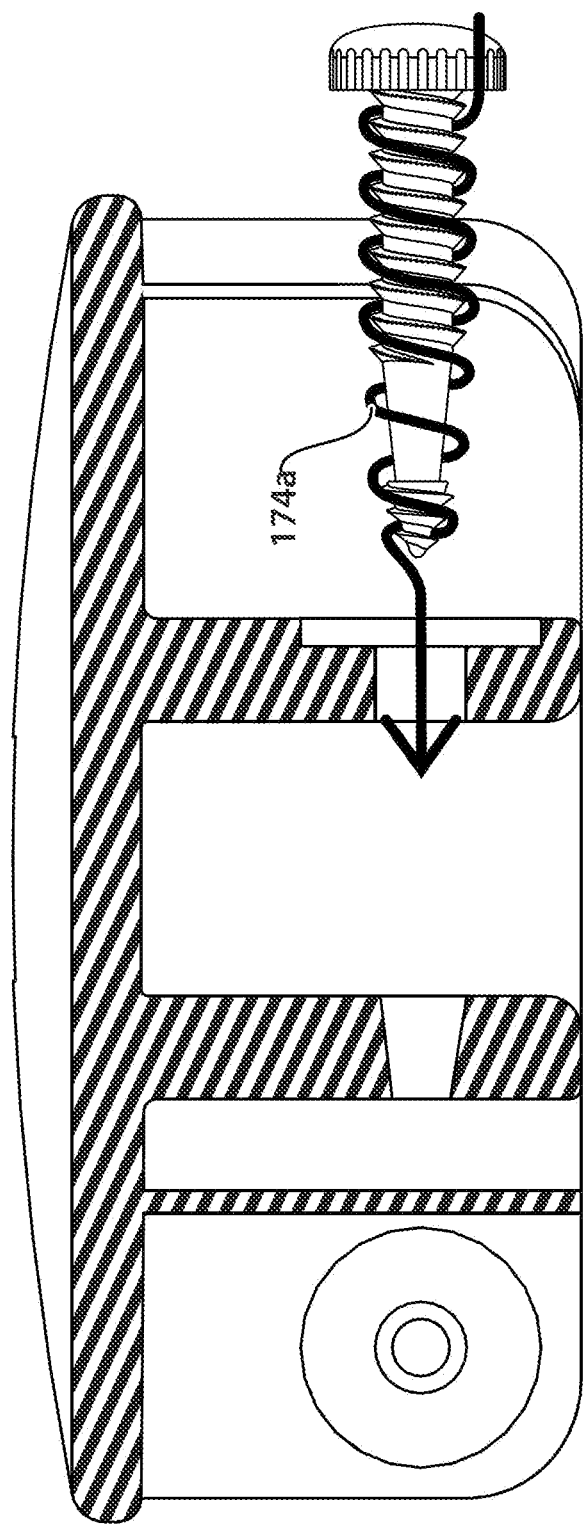
FIG. 156, FIG. 157, FIG. 158, FIG. 159, and FIG. 160 illustrate cross-sectional views demonstrating how robot-assembled heat-expandable cold-contractable anti-wobbling screws are inserted into robot-assembled injury-preventing cone-shielding central intersector system.
Figure 157:
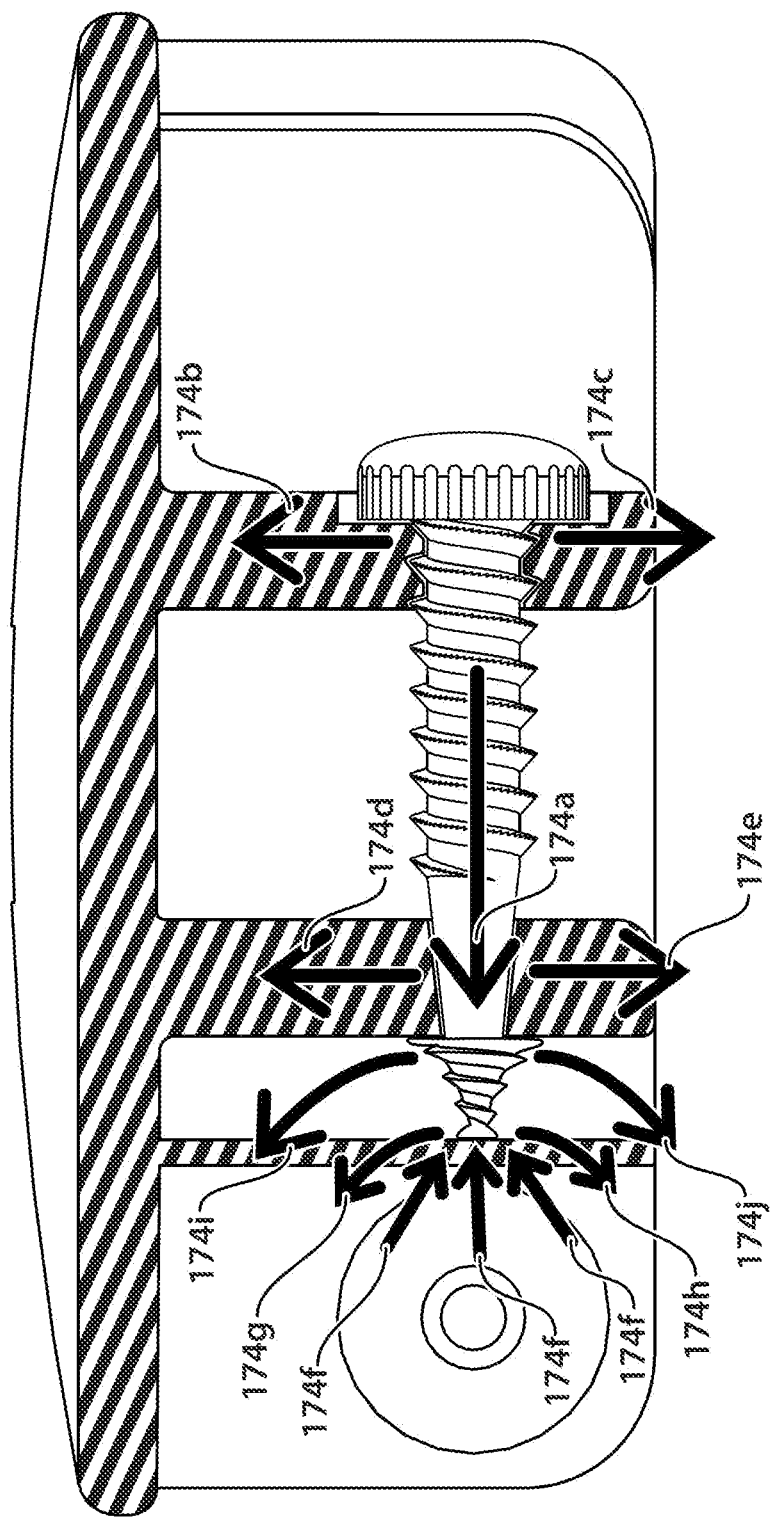
Figure 158:
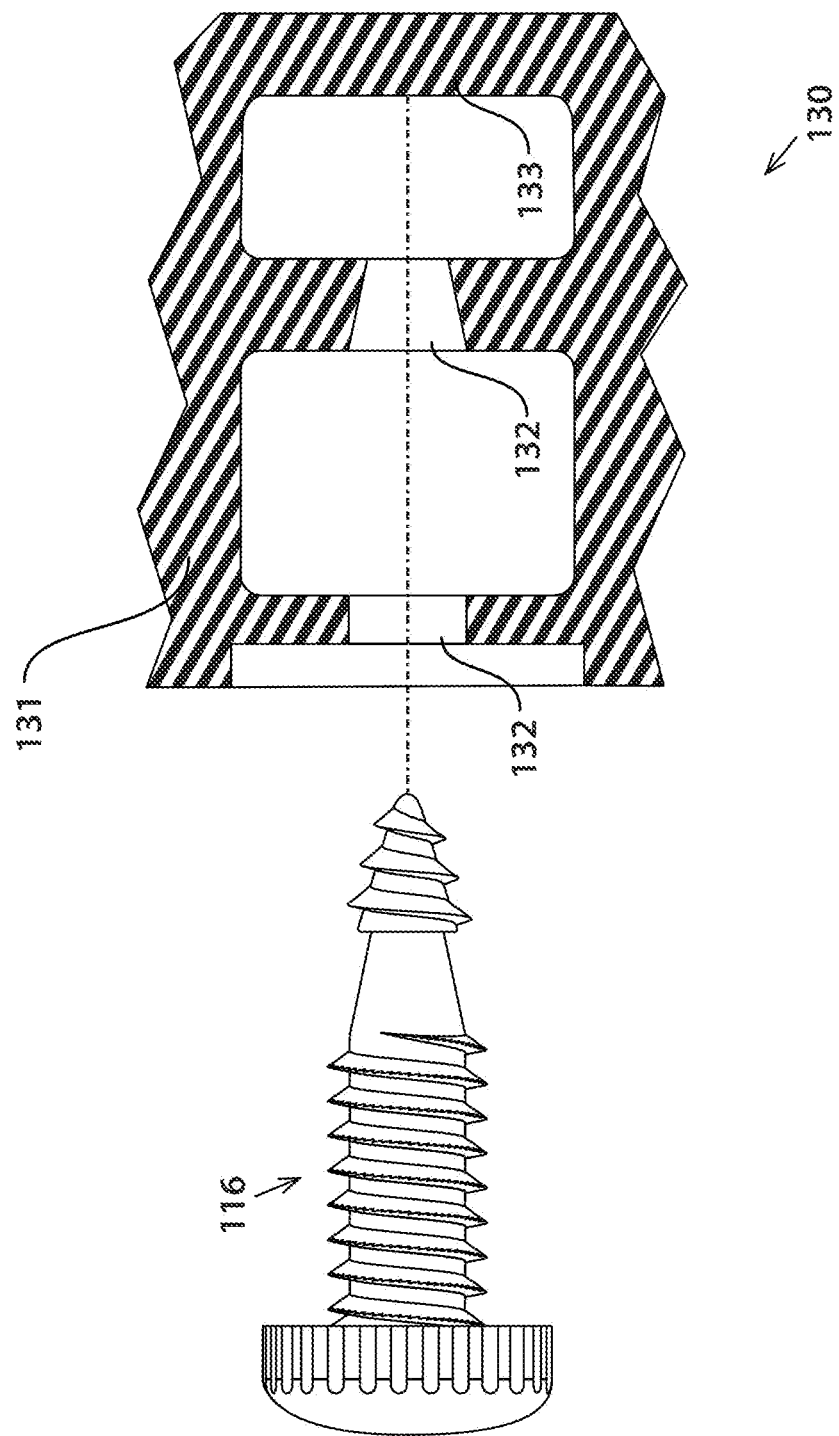
Figure 159:
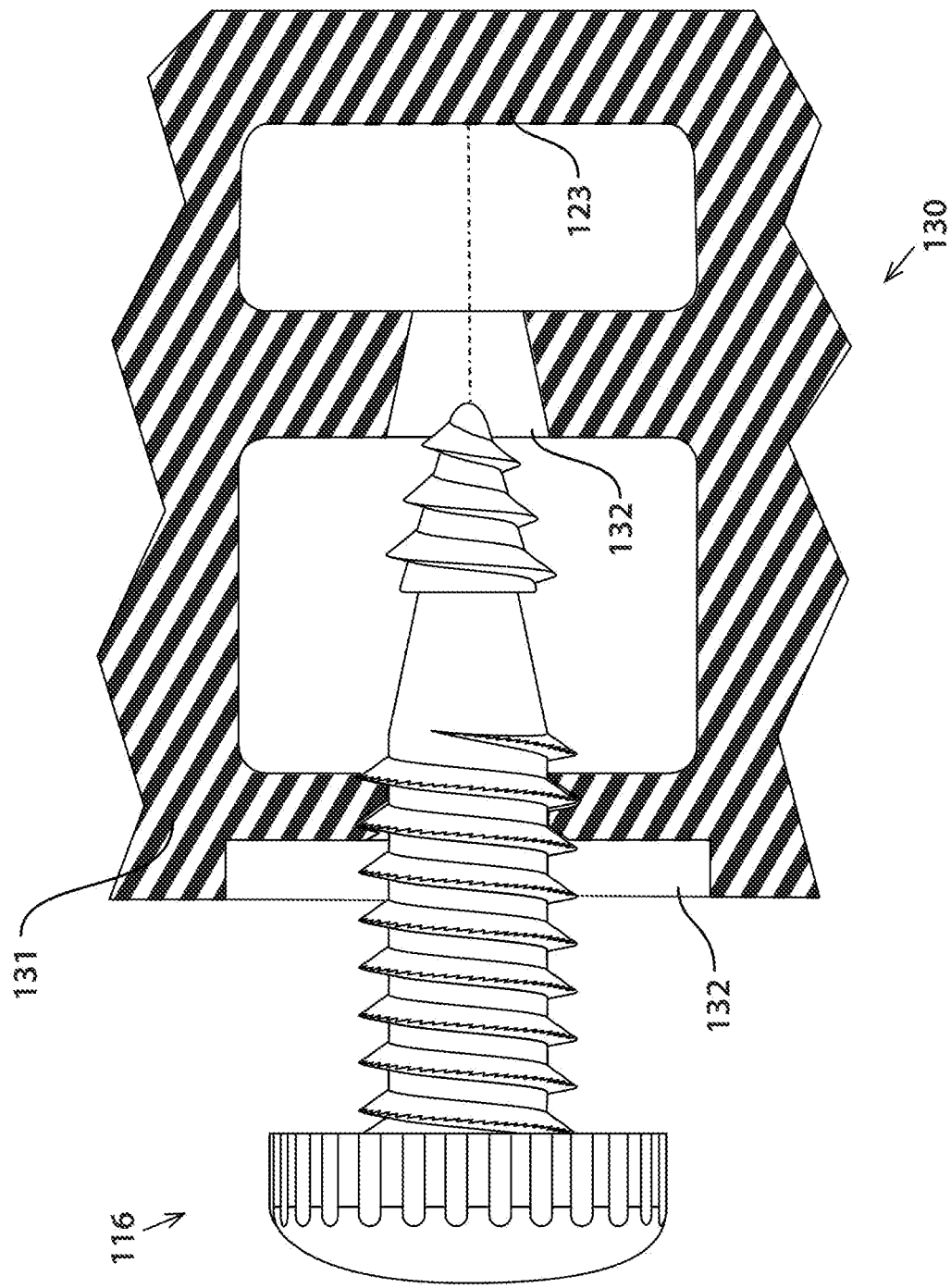
Figure 160:
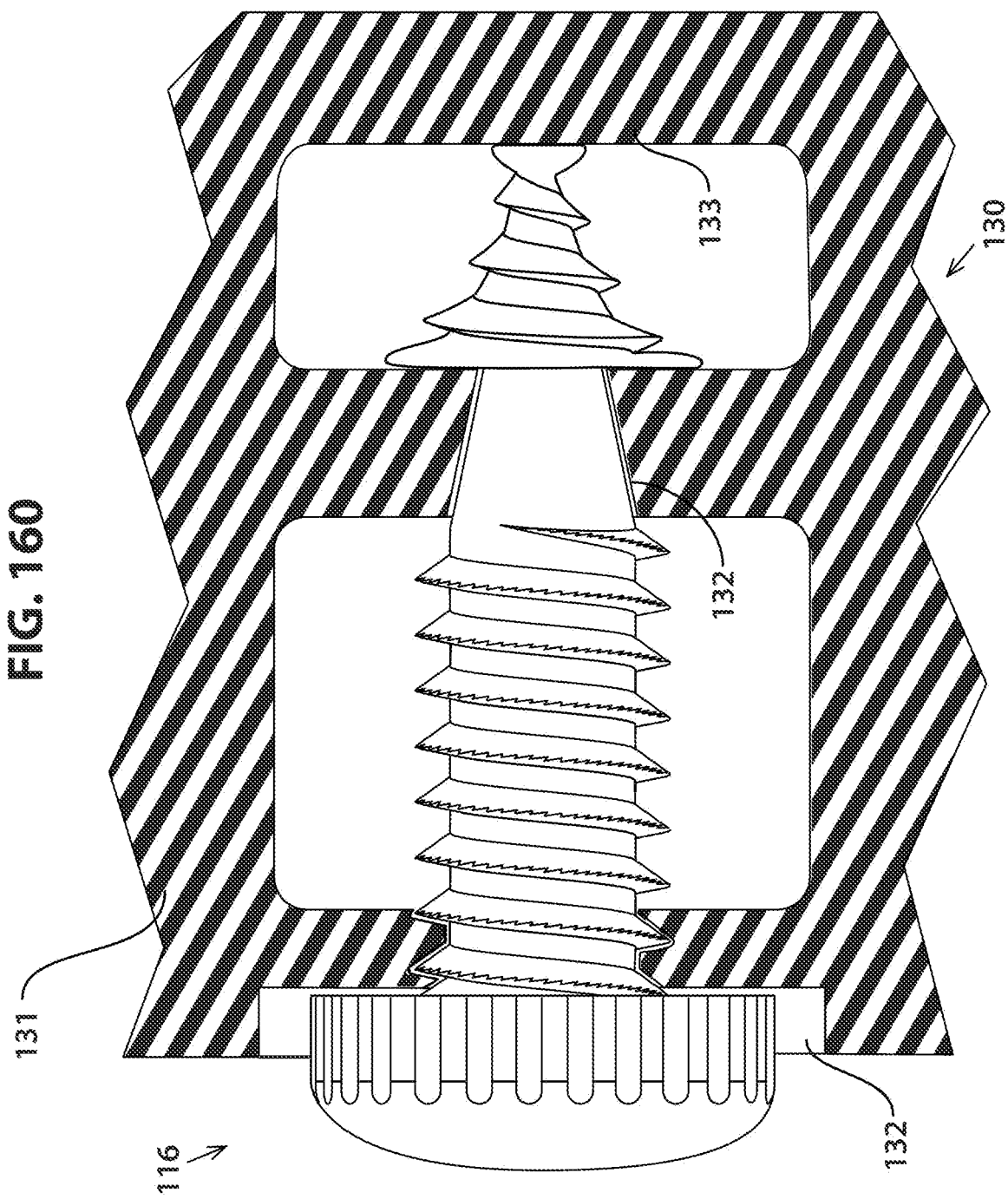
Figure 161:
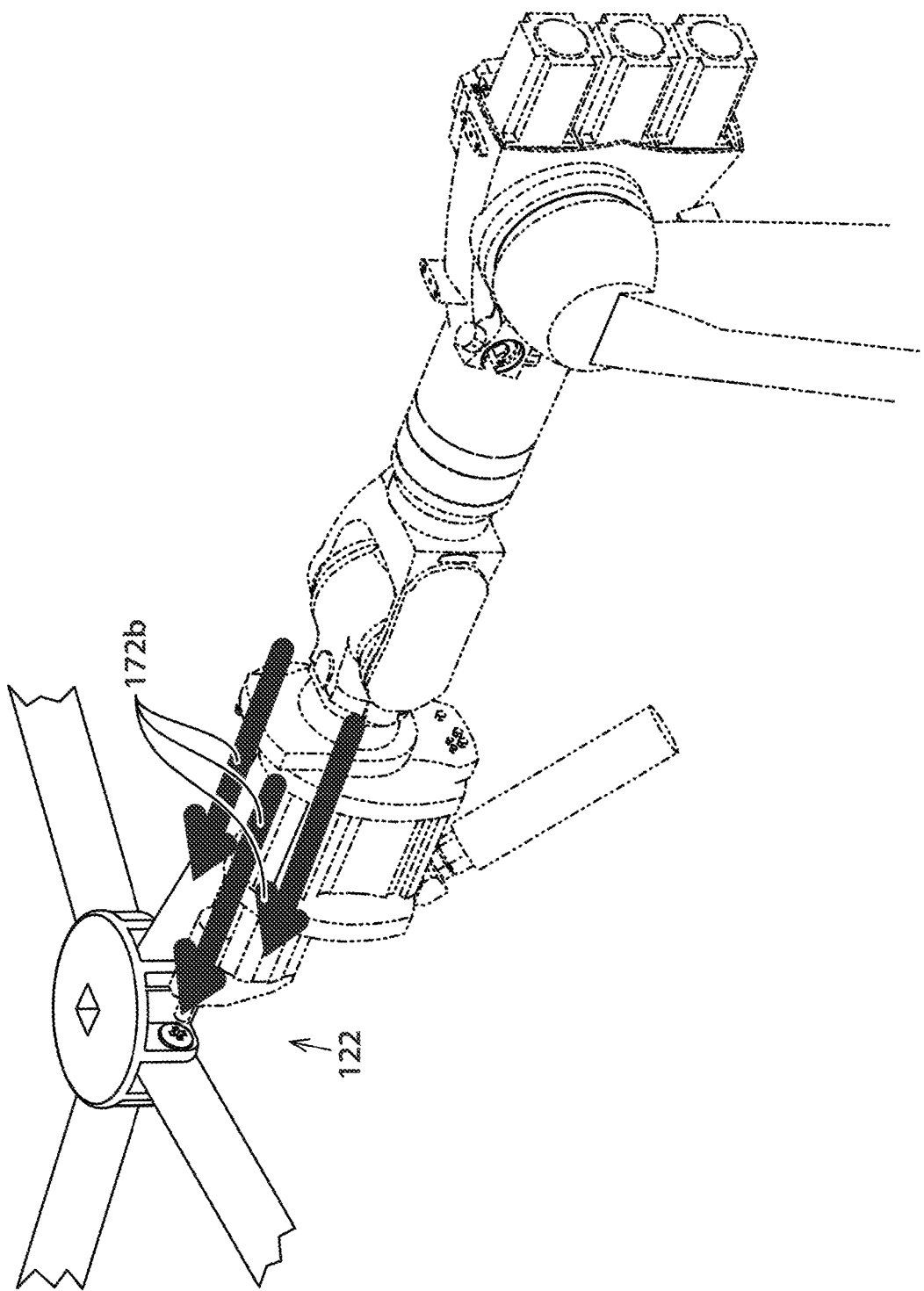
FIG. 161 illustrates a perspective view of how robot-assembled injury-preventing cone-shielding central intersector system is robotically manufactured.
Figure 162:
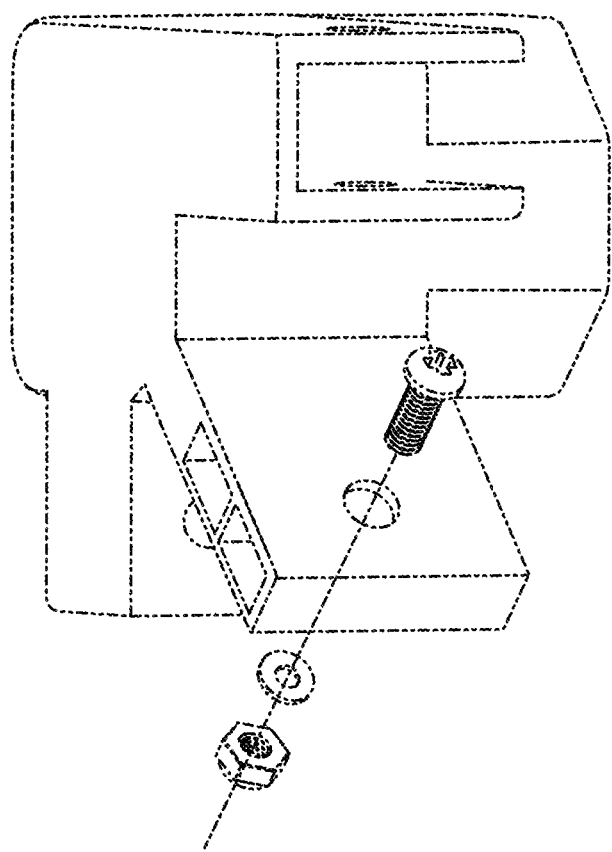
FIG. 162 (Prior Art) illustrates a perspective view of prior art of robot-assembled injury-preventing cone-shielding upper intersector system.
Figure 163:
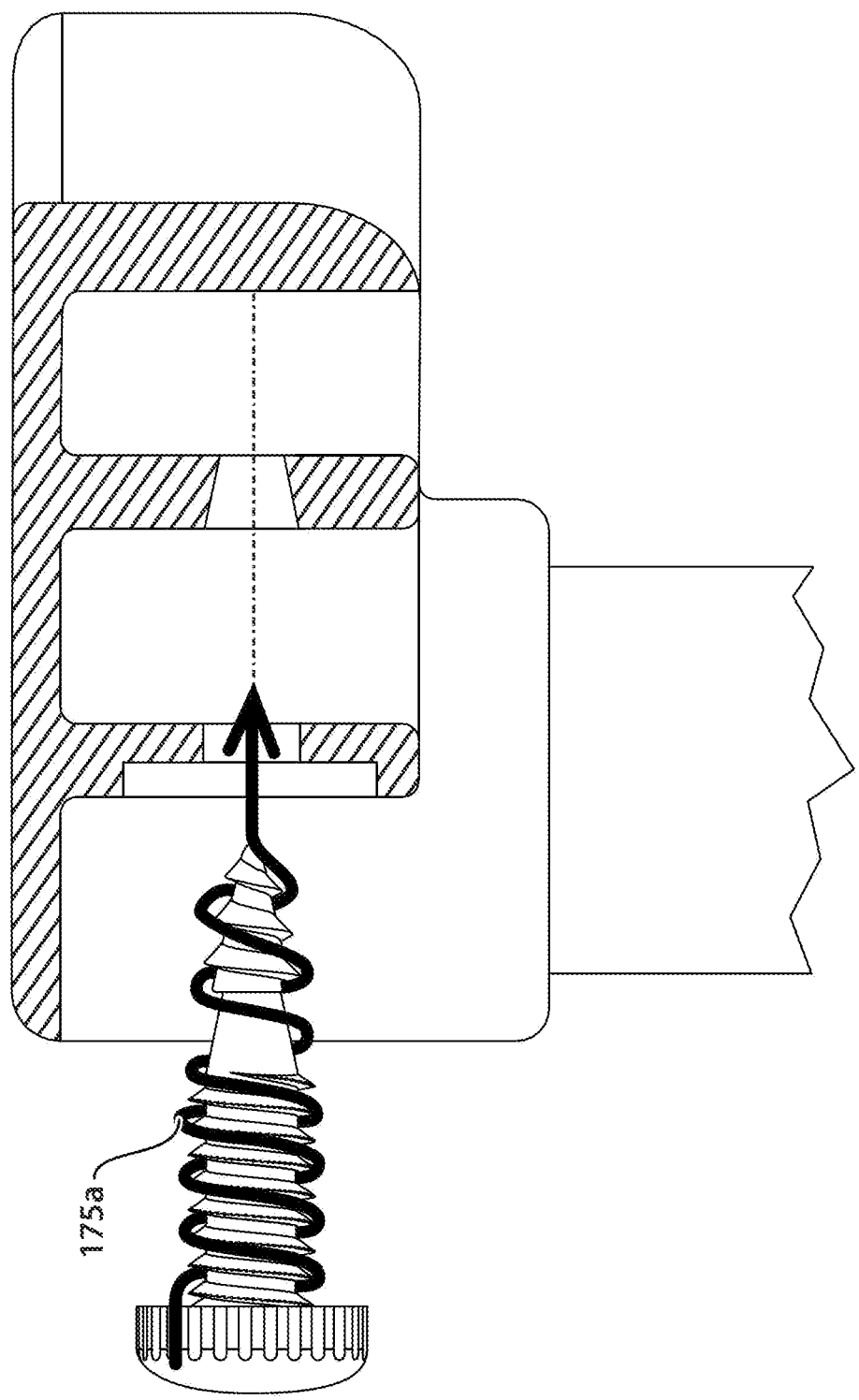
FIG. 163, FIG. 164, FIG. 165, FIG. 166, and FIG. 167 illustrate cross-sectional views how robot-assembled heat-expandable cold-contractable anti-wobbling screws are inserted into robot-assembled injury-preventing cone-shielding upper intersector system.
Figure 164:
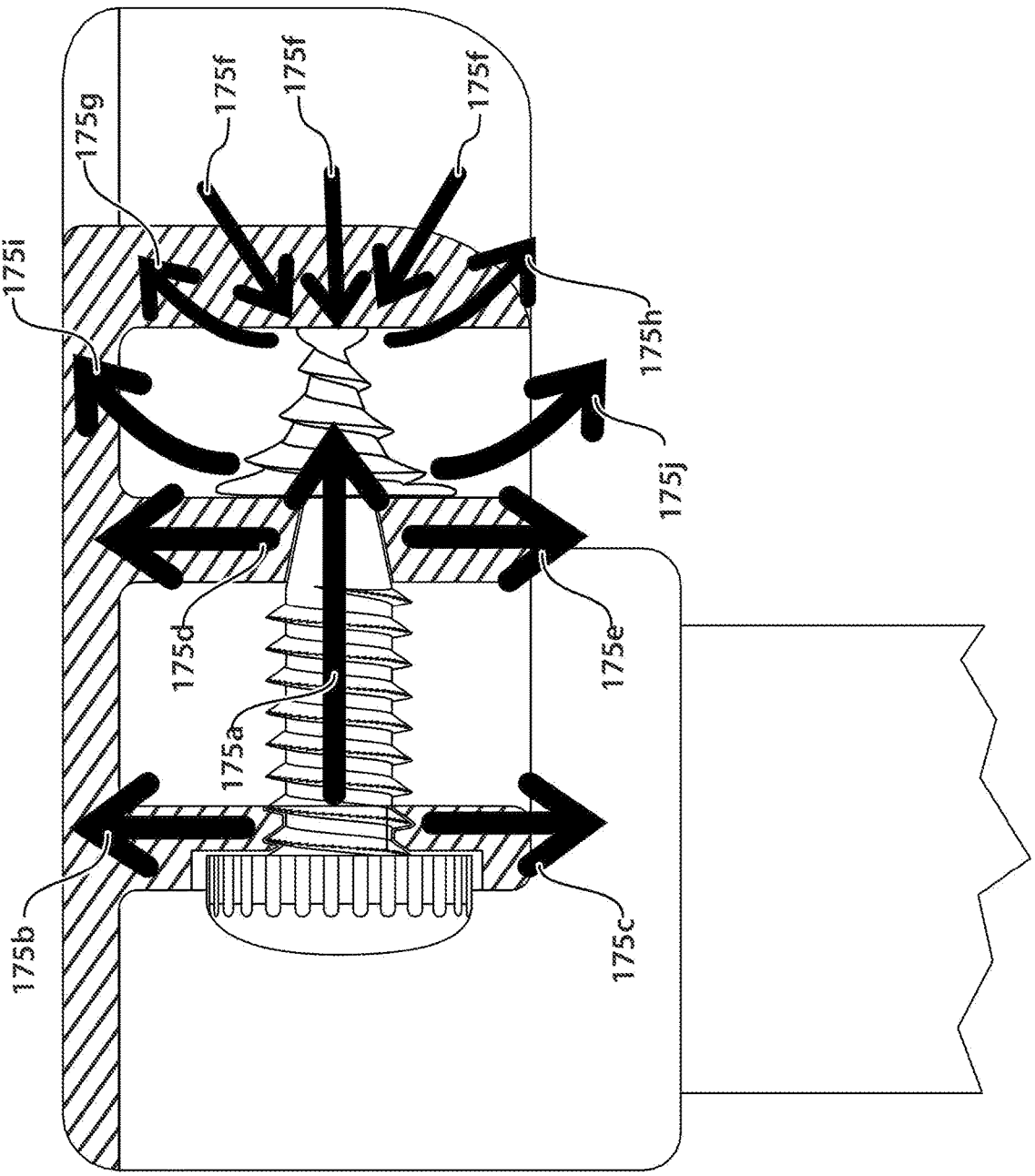
Figure 165:
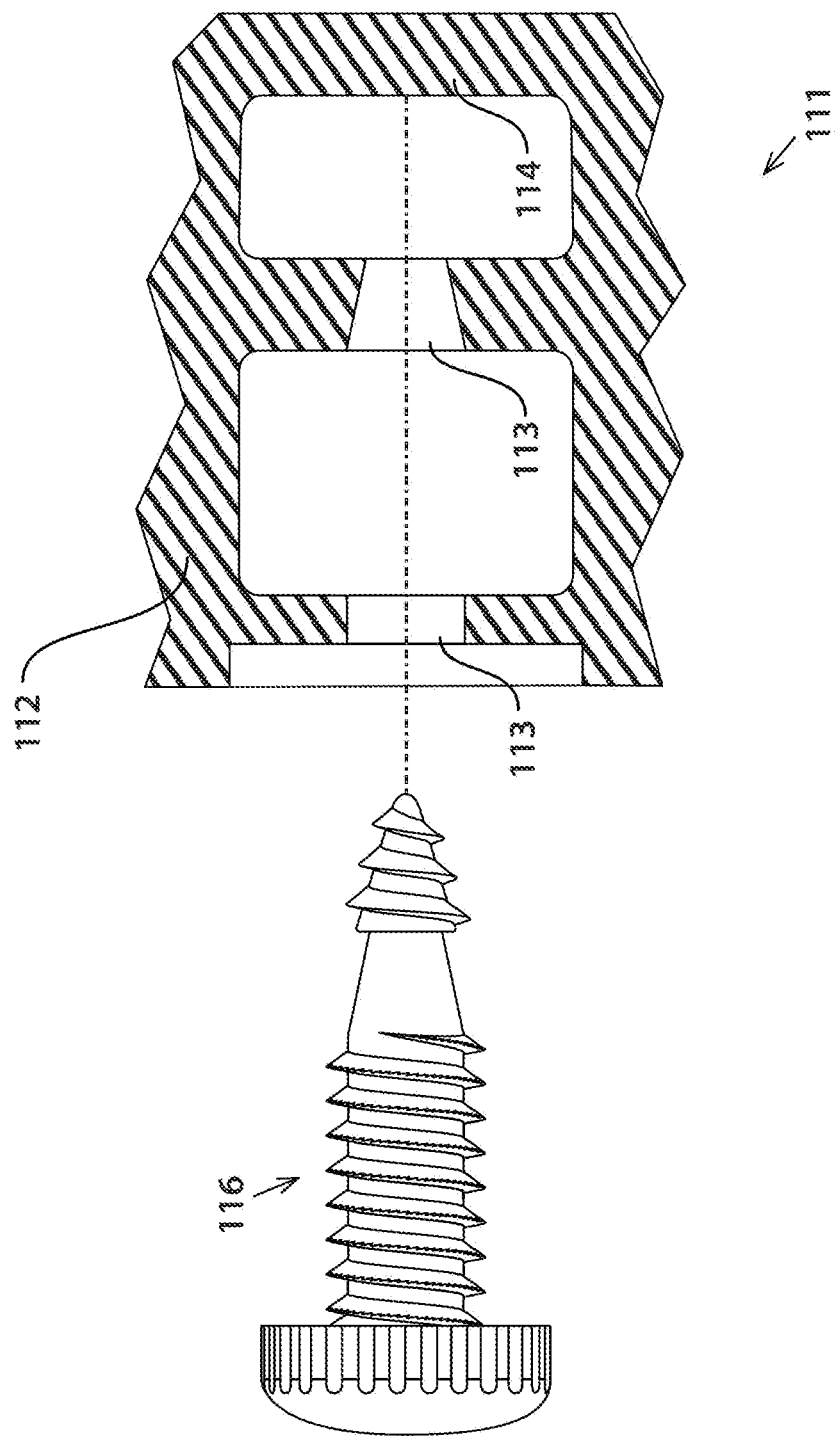
Figure 166:
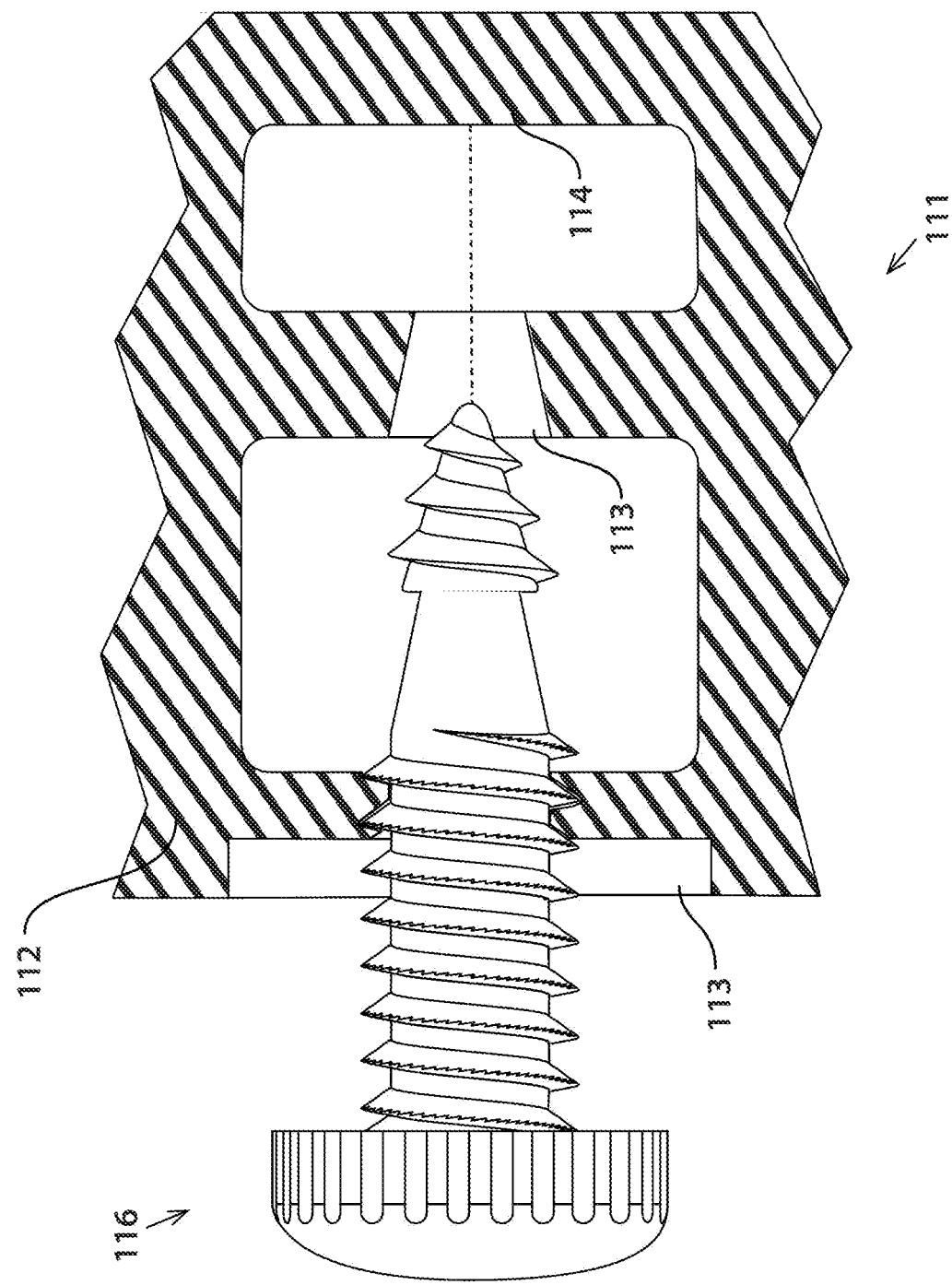
Figure 167:
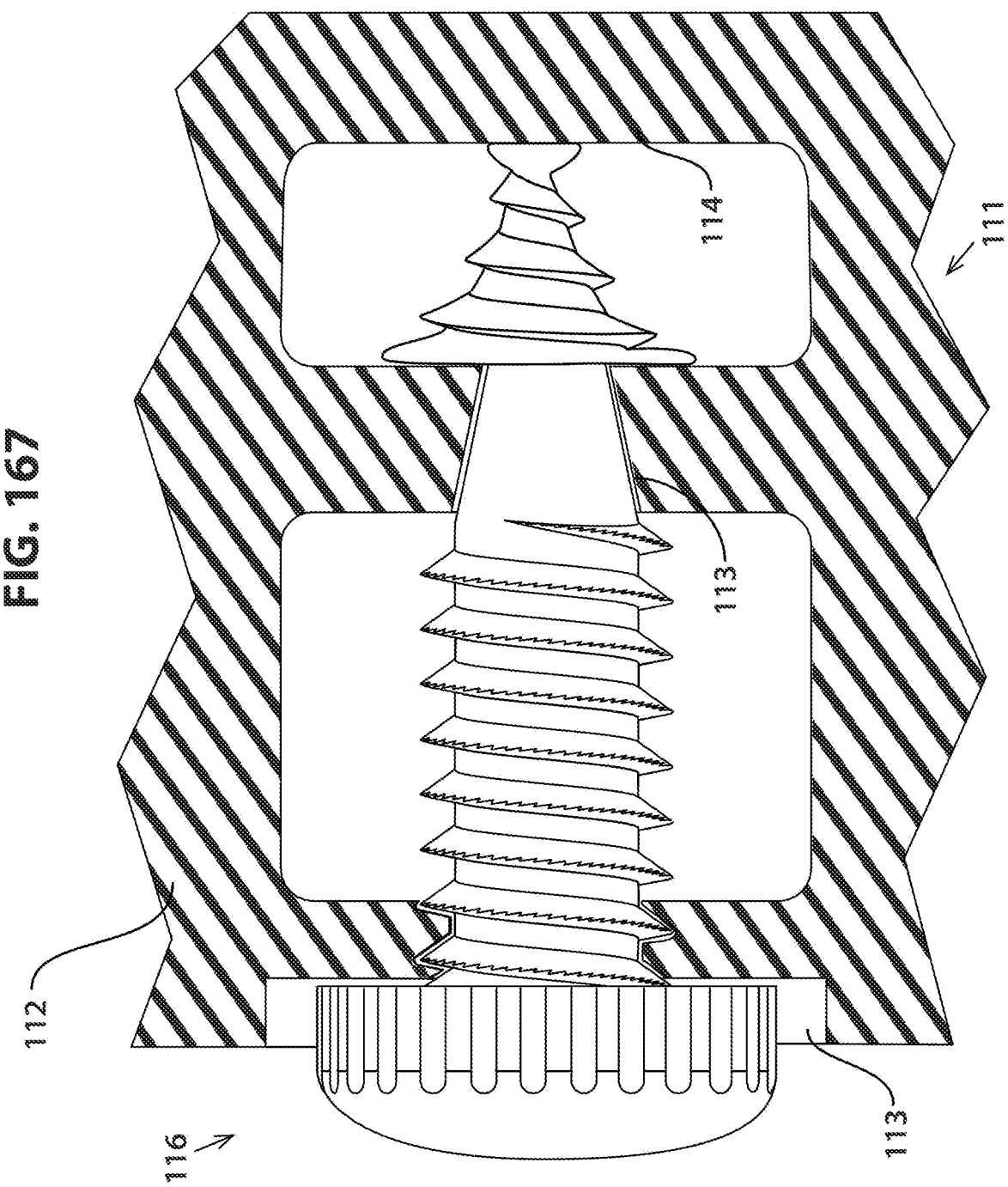
Figure 168:
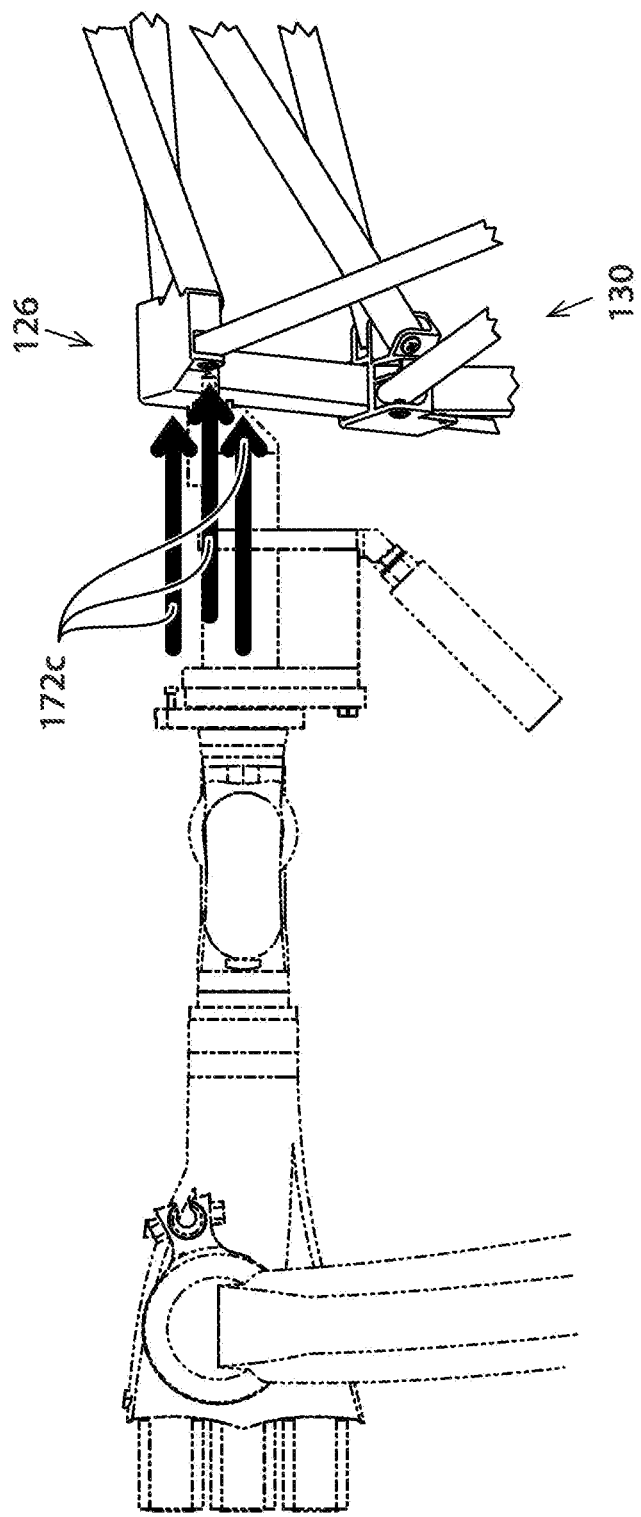
FIG. 168 illustrates a perspective view of how robot-assembled injury-preventing cone-shielding upper intersector system is robotically manufactured.
Figure 169:
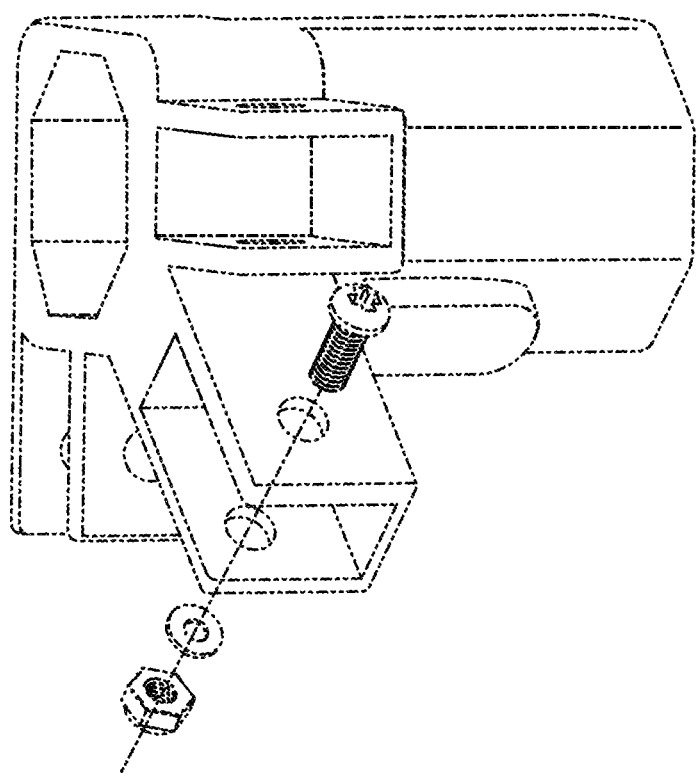
FIG. 169 (Prior Art) illustrates a perspective view of prior art of robot-assembled arthritic-assisting injury-preventing cone-shielding lower intersector system.
Figure 170:
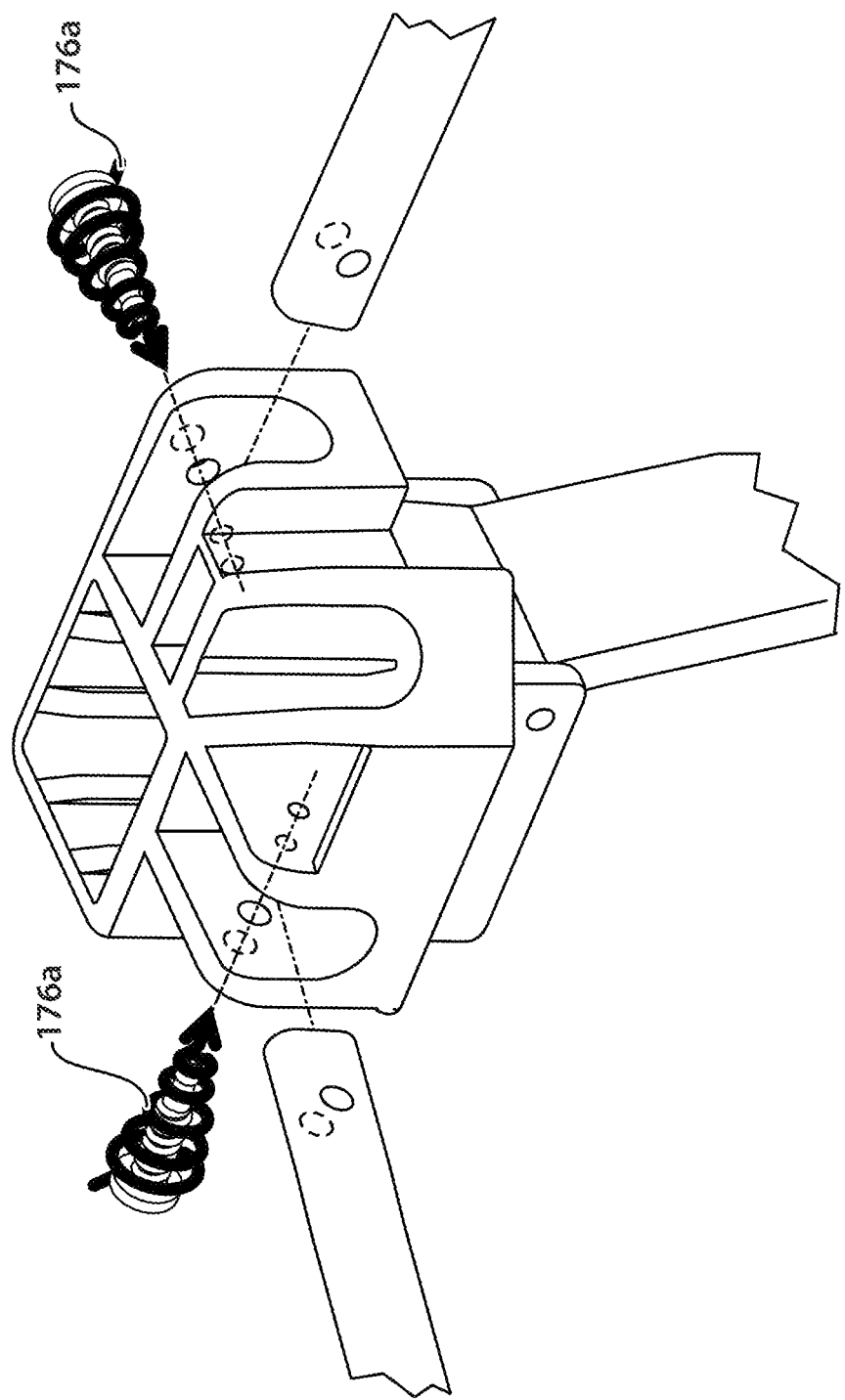
FIG. 170, FIG. 171, FIG. 172, FIG. 173, FIG. 174, FIG. 175, and FIG. 176 illustrate perspective and cross-sectional views demonstrating how robot-assembled heat-expandable cold-contractable anti-wobbling screws are inserted into robot-assembled arthritic-assisting injury-preventing cone-shielding lower intersector system.
Figure 171:
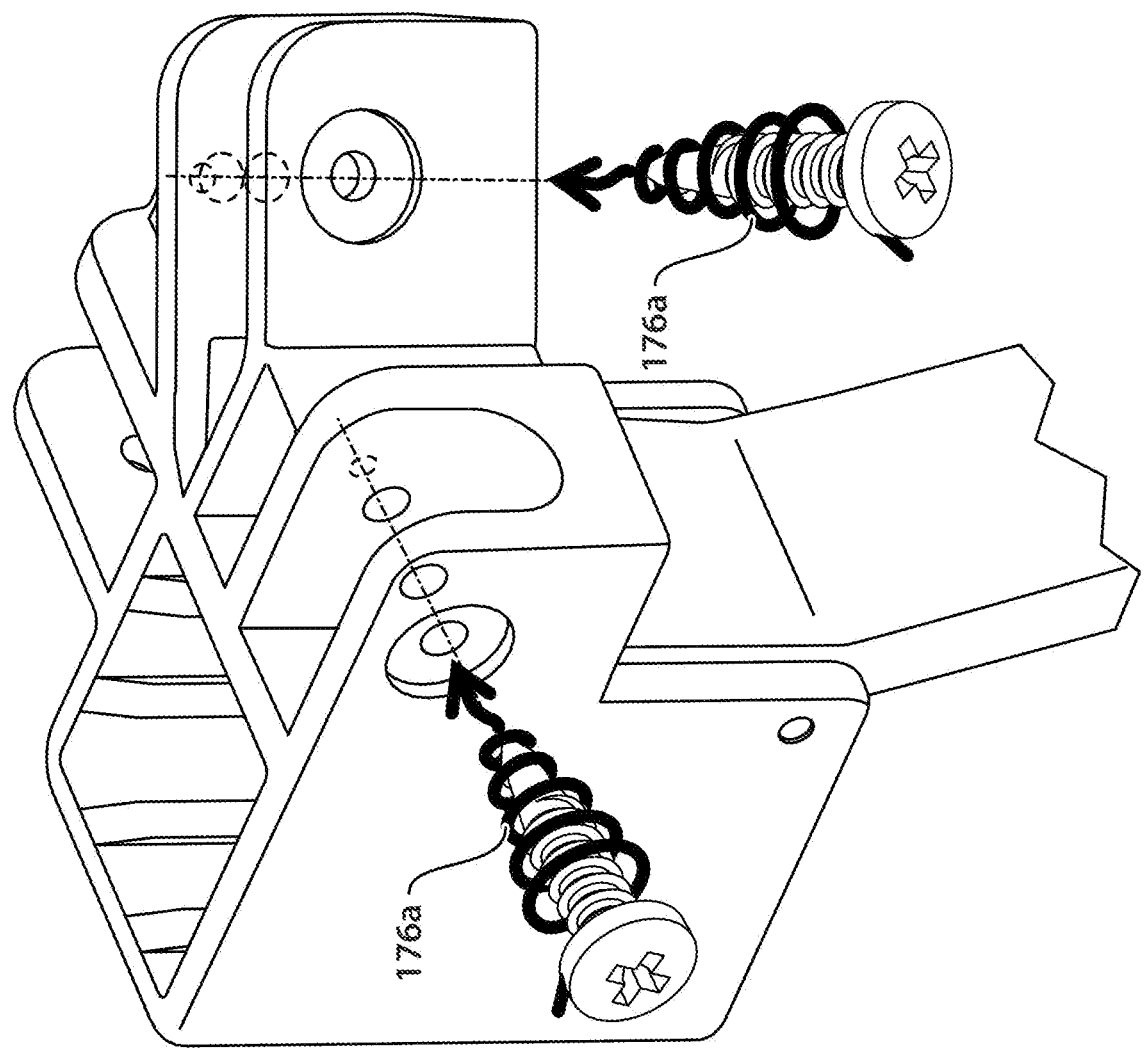
Figure 172:
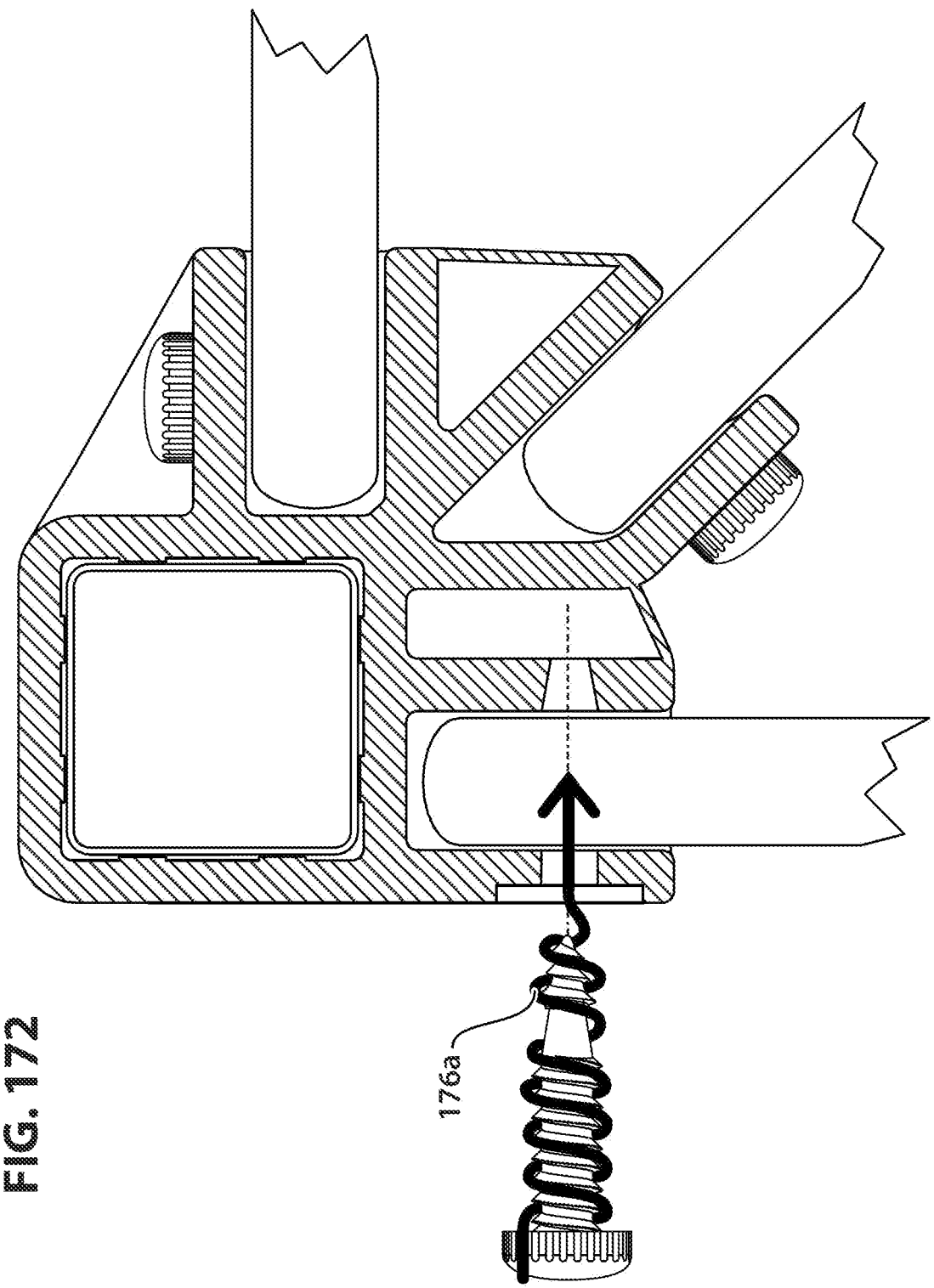
Figure 173:
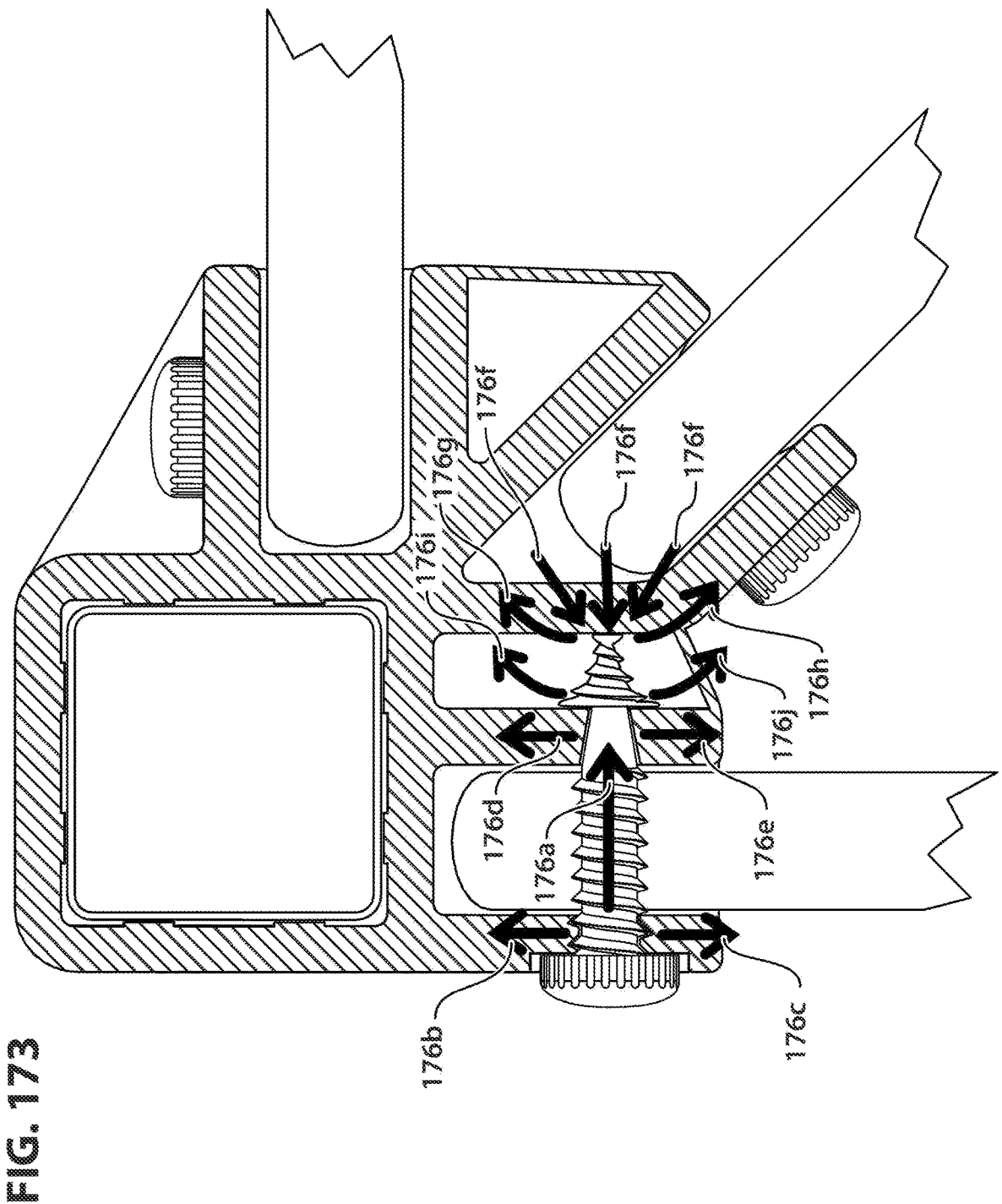
Figure 174:
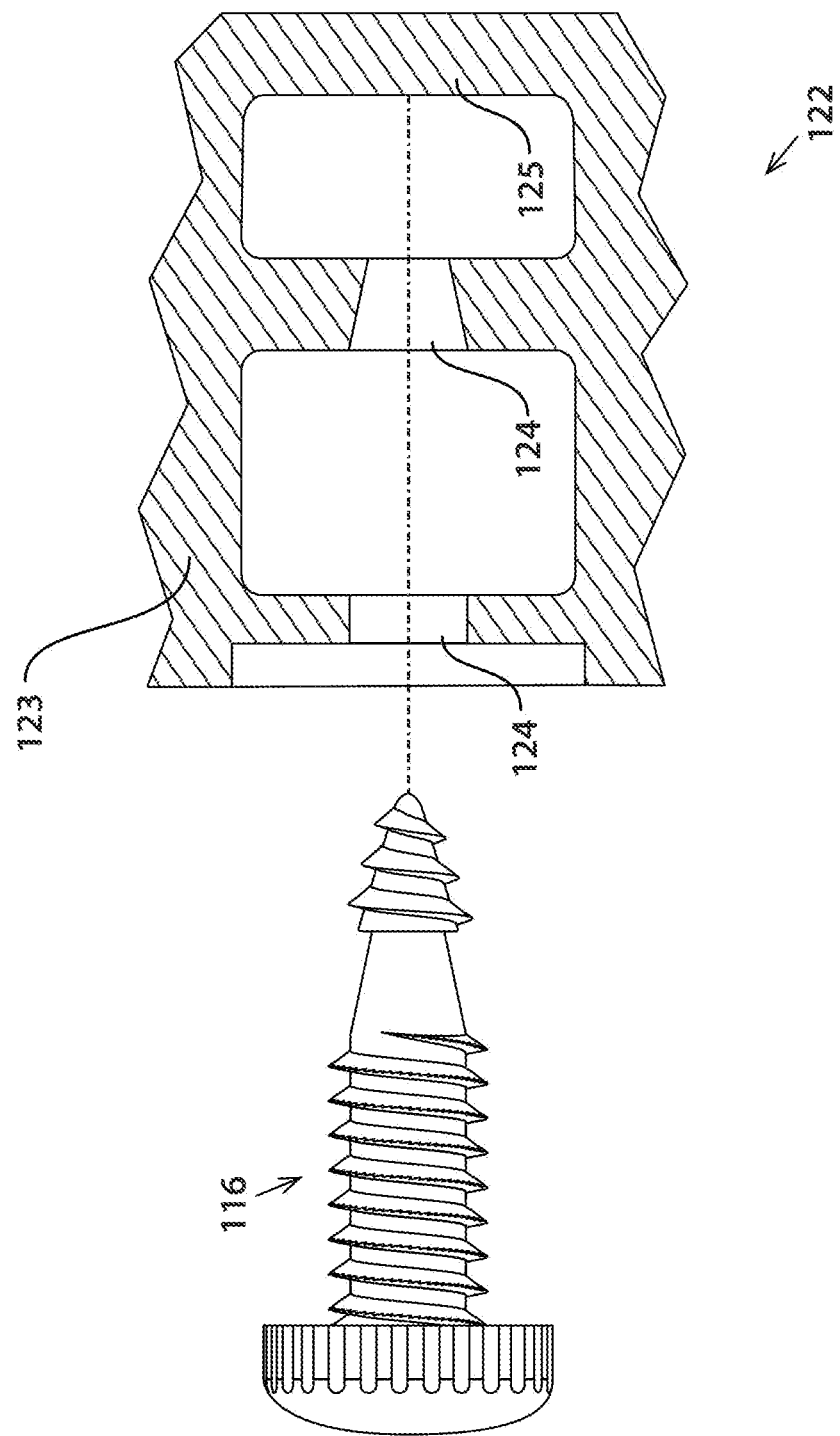
Figure 175:
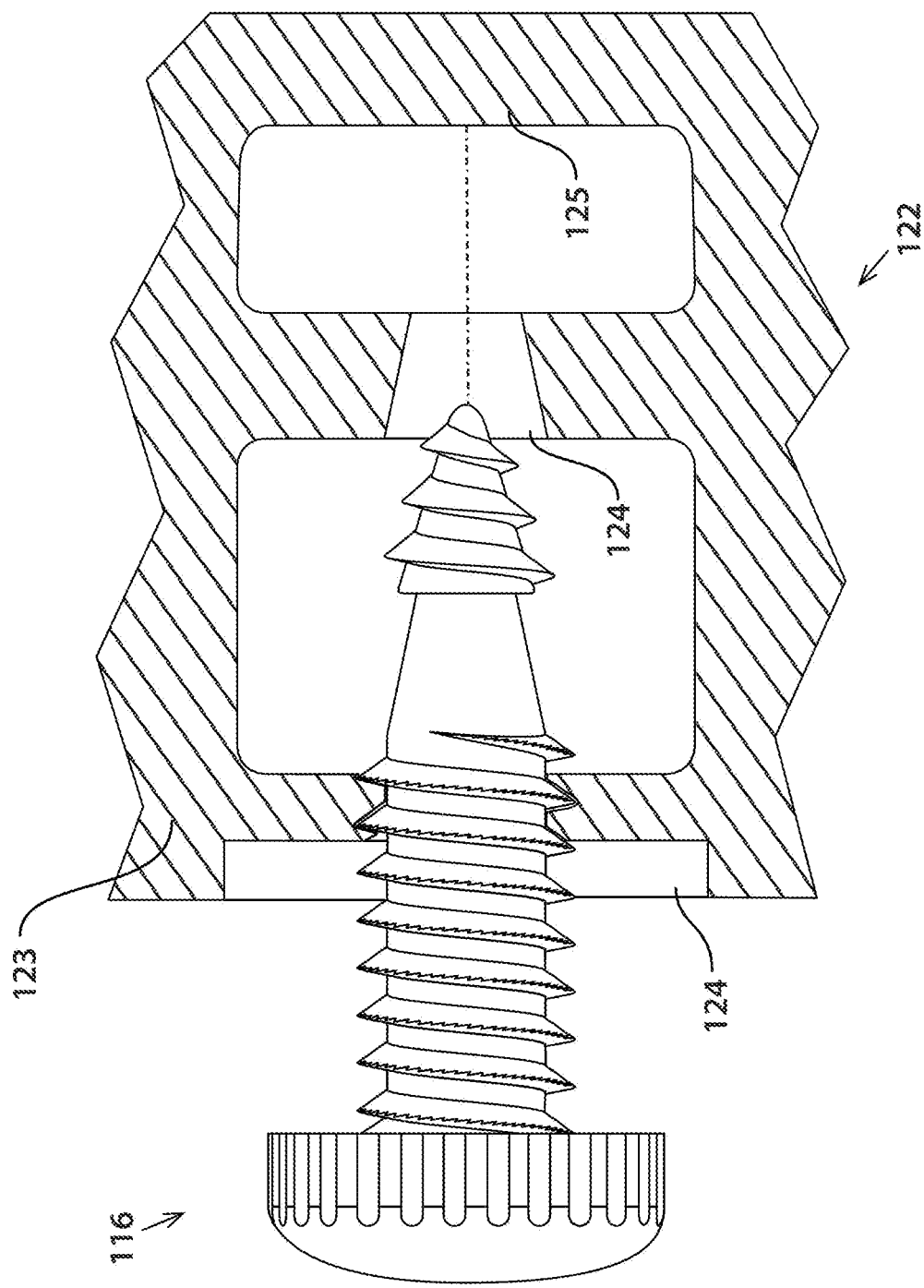
Figure 176:
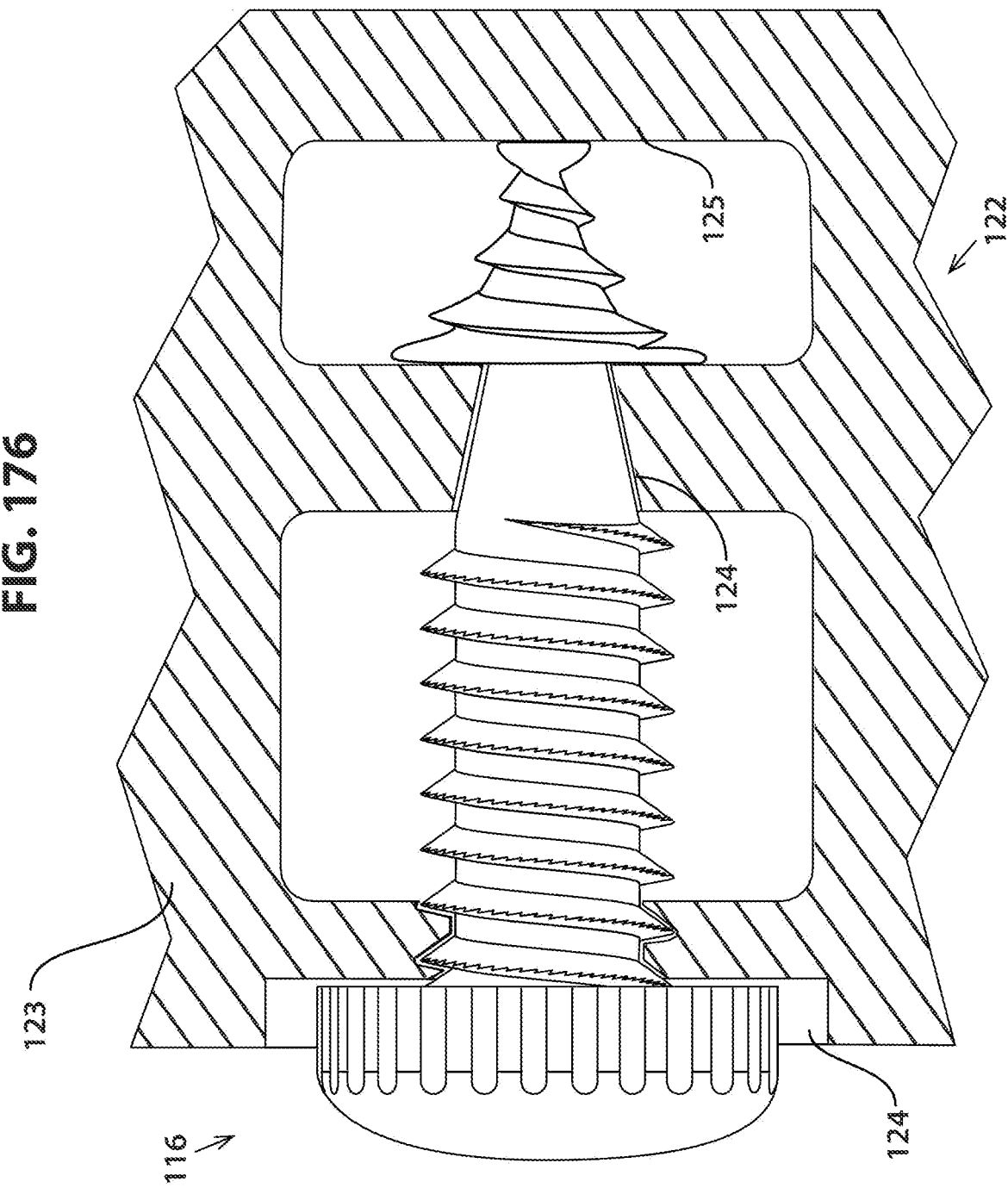
Figure 177:
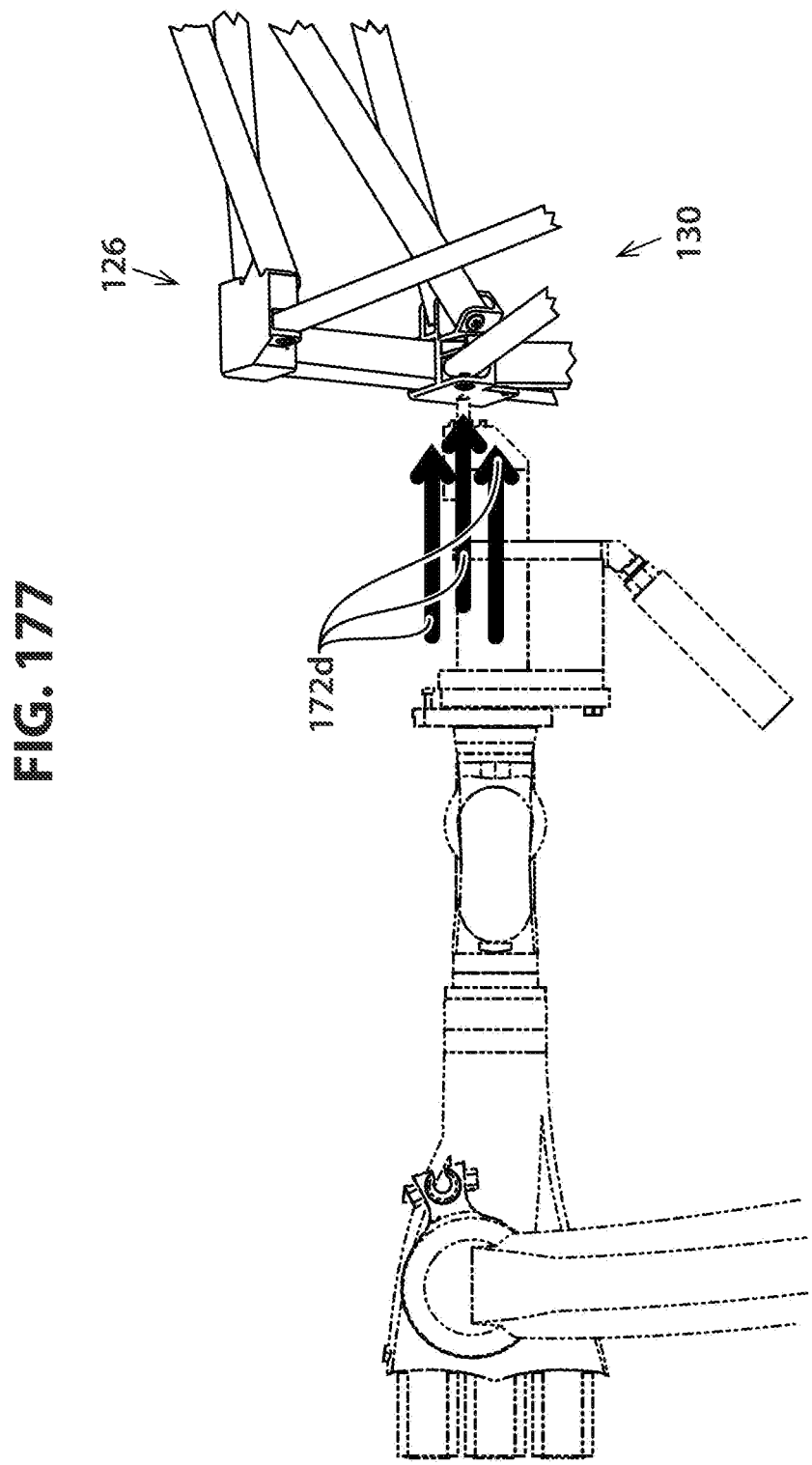
FIG. 177 illustrates a perspective view of how robot-assembled arthritic-assisting injury-preventing cone-shielding lower intersector system is robotically manufactured.
Figure 178:
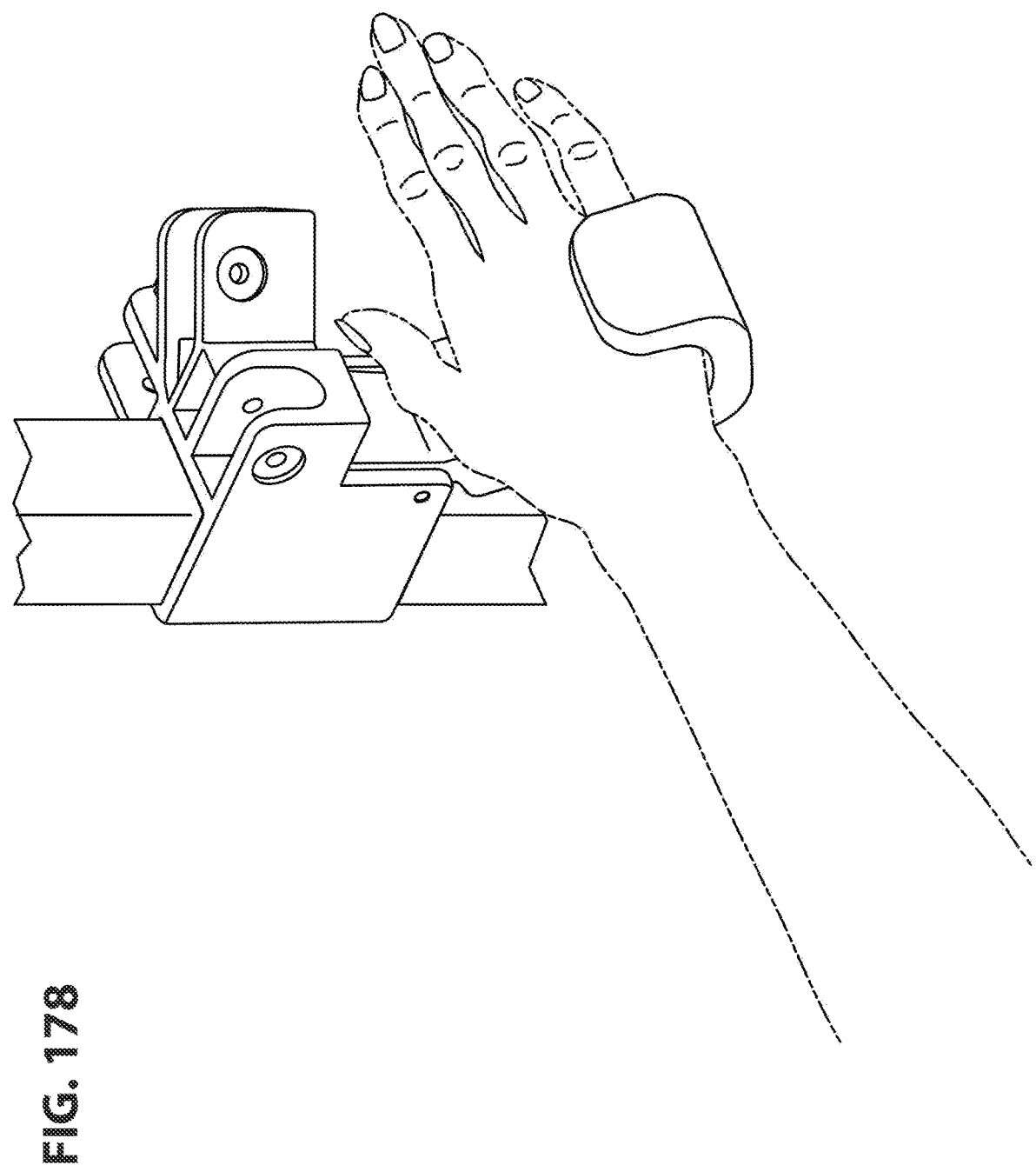
FIG. 178 illustrates a perspective view demonstrating how an arthritic can operate lower robot-assembled arthritic-assisting height-adjusting dog-run-panel-rope hooks without the need to close the hand.

59) Robot-assembled noise-canceling cup-cushion 159
is (or are each)

robotically assembled to dog-run-adaptable anti-wobbling foldable side trusses 105.
60) Robot-assembled injury-preventing inward-curved cup-cushion edges 160
is (or are each)
robotically formed into robot-assembled noise-canceling cup-cushion 159.
61) Robot-assembled arthritic-assisting noise-canceling circular-cushion system 161 is (or are each) connected by the combined connections of its components.
62) Robot-assembled noise-canceling circular-cushion 162
is (or are each)
robotically assembled to dog-run-adaptable anti-wobbling foldable side trusses 105.
63) Robot-assembled double-tail built-in circular-cushion rivets 163
is (or are each)
robotically formed into robot-assembled noise-canceling circular-cushion 162.
Function
Referring to FIG. 129, FIG. 130, FIG. 131, FIG. 132, FIG. 133, FIG. 134, FIG. 135, FIG. 136, FIG. 137, FIG. 138, FIG. 139, FIG. 140, FIG. 141, FIG. 142, FIG. 143, FIG. 144, FIG. 145, FIG. 146, FIG. 147, FIG. 148, FIG. 149, FIG. 150, FIG. 151, FIG. 152, FIG. 153, FIG. 154, FIG. 155, FIG. 156, FIG. 157, FIG. 158, FIG. 159, FIG. 160, FIG. 161, FIG. 162, FIG. 163, FIG. 164, FIG. 165, FIG. 166, FIG. 167, FIG. 168, FIG. 169, FIG. 170, FIG. 171, FIG. 172, FIG. 173, FIG. 174, FIG. 175, FIG. 176, FIG. 177, FIG. 178, FIG. 179, FIG. 180, FIG. 181, FIG. 182, FIG. 183, FIG. 184, FIG. 185, FIG. 186, FIG. 187, FIG. 188, FIG. 189, FIG. 190, FIG. 191, FIG. 192, FIG. 193, FIG. 194, FIG. 195, FIG. 196, FIG. 197, FIG. 198, FIG. 199, FIG. 200, FIG. 201, FIG. 202, FIG. 203, FIG. 204, FIG. 205, FIG. 206, FIG. 207, FIG. 208, FIG. 209, and FIG. 210:
1) Robot-assembled arthritic-assisting noise-canceling friction-reducing dog-run-adaptable anti-wobbling gazebo system 101 is (or are respectively) for performing the combined functions of its components.
2) Adjustable canopy 102 is (or are respectively) for:
    a) Protecting occupants and property users from weather elements;
    b) Functioning as a greenhouse
        (see FIG. 3, FIG. 4, FIG. 138, and FIG. 139);
    c) Functioning as a cover for a dog-run
        in the direction of arrow 169
        (see FIG. 5, FIG. 6, FIG. 140, and FIG. 141);
    d) Functioning as a surface for an advertisement sign
        (see FIG. 7, FIG. 8, FIG. 129, and FIG. 130);
    e) Functioning as an awning cover
        (see FIG. 9, FIG. 10, FIG. 131, and FIG. 132); and
    f) Functioning as ceiling-mounted overhead storage
        (see FIG. 11, FIG. 12, FIG. 133, and FIG. 134).
3) Dog-run-adaptable anti-wobbling foldable top trusses 103 is (or are respectively) for:
    Foldably supporting central robot-assembled intersectors 123.
4) Dog-run-adaptable anti-wobbling foldable corner trusses 104 is (or are respectively) for:
    Foldably supporting dog-run-adaptable anti-wobbling foldable top trusses 103.
5) Dog-run-adaptable anti-wobbling foldable side trusses 105 is (or are respectively) for:
    Foldably supporting dog-run-adaptable anti-wobbling foldable top trusses 103.
6) Dog-run-adaptable anti-wobbling foldable upper posts 106 is (or are respectively) for:
    Foldably and adjustably supporting dog-run-adaptable anti-wobbling foldable lower posts 107.
7) Dog-run-adaptable anti-wobbling foldable lower posts 107 is (or are respectively) for:
    a) Foldably and slidably raising and lowering
        to increase and decrease the height of the six-device-in-one robot-assembled arthritic-assisting noise-canceling friction-reducing dog-run-adaptable anti-wobbling gazebo; and
    b) Supporting sidewalls of dog-run.
8) Dog-run-adaptable anti-wobbling arthritic-assisting feet 108 is (or are respectively) for:
    Supporting dog-run-adaptable anti-wobbling foldable lower posts 107.
9) Dog-run-adaptable anti-wobbling arthritic-assisting foot holes 109 is (or are respectively) for:
    a) Securing a rope or cord for supporting a dog-run
        in the direction of arrow 170
        (see FIG. 135, and FIG. 136); and
    b) Securing the six-device-in-one robot-assembled arthritic-assisting noise-canceling friction-reducing dog-run-adaptable anti-wobbling gazebo to the ground with a spike.
10) Truss holes 110 is (or are respectively) for:
    Providing openings for secure and foldable attachment and operation.
11) Robot-assembled automatically-making-rivet-tail-flare noise-canceling injury-preventing top-connector system 111 is (or are respectively) for performing the combined functions of its components.
12) Top robot-assembled connectors 112 is (or are respectively) for:
    Robotically and foldably attaching two dog-run-adaptable anti-wobbling
    foldable top trusses 103 together
    in the direction of arrow 171*a*
    (see FIG. 154).
13) Top robot-assembled heat-expandable cold-contractable holes 113 is (or are respectively) for:
    a) Providing openings for robot-assembled heat-expandable cold-contractable anti-wobbling screws 117 to be robotically inserted
        to reduce end-user assembly time,
        to reduce human-involved manufacturing assembly hours,
        to decrease overall production assembly time, and
        to increase total per-unit production output
        (see FIG. 146 (Prior Art));
    b) Locking robot-assembled heat-expandable cold-contractable anti-wobbling screws 117 by expanding from friction-heat during insertion, forming threads, and then contracting inward when cooled
        in the directions of arrows 171*a*, 171*b*, 171*c*, and 171*d*
        (see FIG. 145, FIG. 149, FIG. 150, and FIG. 153).
14) Top robot-assembled automatically-flaring-and-shielding-rivet-tail injury-preventing hammer-shields 114 is (or are respectively) for:
    a) Providing a limiting surface for robot-assembled heat-expandable cold-contractable anti-wobbling screws 117 to stop
        in the directions of arrows 171*a*, 171*f*, 171*g*, 171*h*, 171*i*, and 171*j*
        (see FIG. 145, FIG. 149, FIG. 150, and FIG. 153); and
    b) Preventing injury by covering the robot-assembled heat-expandable cold-contractable interlocking cones 120.

15) Top robot-assembled heat-expandable cold-contractable double-tail rivets 115 is (or are respectively) for:
    Pivotably and robotically-assembling dog-run-adaptable anti-wobbling foldable top trusses 103 to top robot-assembled connectors 112
    in the direction of arrow 172a,
    (see FIG. 154).
16) Robot-assembled heat-expandable cold-contractable interlocking anti-wobbling spiral-saw screw system 116 is (or are respectively) for performing the combined functions of its components.
17) Robot-assembled heat-expandable cold-contractable anti-wobbling screws 117 is (or are respectively) for:
    a) Saving manufacturing time by eliminating the need for nuts and bolts
       (see FIG. 146 (Prior Art), FIG. 155 (Prior Art), FIG. 162 (Prior Art), and FIG. 169 (Prior Art));
    b) Saving manufacturing man-hours by robotically manufacturing
       in the directions of arrows 172a, 172b, 172c, and 172d
       (see FIG. 154, FIG. 158, FIG. 168, and FIG. 177);
    c) Saving end-consumer assembly time by robotically pre-installing robot-assembled heat-expandable cold-contractable anti-wobbling screws 117, at the factory
       in the directions of arrows 172a, 172b, 172c, and 172d
       (see FIG. 154, FIG. 158, FIG. 168, and FIG. 177); and
    d) Increasing overall production output of the six-device-in-one robot-assembled arthritic-assisting noise-canceling friction-reducing dog-run-adaptable anti-wobbling gazebo by robotically decreasing per-unit production time.
18) Robot-assembled heat-expandable cold-contractable spirally-threading spiral saws 118 is (or are respectively) for:
    Robotically and heatingly expanding and tapping threads into top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
    in the directions of arrows 171a, 173a, and 173b
    (see FIG. 144).
19) Robot-assembled heat-expandable cold-contractable spiral-teeth 119 is (or are respectively) for:
    Robotically and speedily cutting through plastic connector material
       to decrease production time, and
       to increase production output
    in the directions of arrows 171a, 173a, and 173b
    (see FIG. 144).
20) Robot-assembled heat-expandable cold-contractable interlocking cones 120 is (or are respectively) for:
    a) Robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
       in the directions of arrows 171a, 173a, and 173b
       (see FIG. 144);
    b) Expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
       in the directions of arrows 171a, 173c, 173d, and 173e
       (see FIG. 145); and
    c) Eliminating the need for the usage of nuts and bolts
       to robotically lessen the assembly time, and
       to robotically lessen assembly cost
       (see FIG. 146 (Prior Art), FIG. 155 (Prior Art), FIG. 162 (Prior Art), and FIG. 169 (Prior Art)).
21) Robot-assembled heat-expandable cold-contractable interlocking spiral locks 121 is (or are respectively) for:
    a) Robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
       in the directions of arrows 171a, 173a, and 173b
       (see FIG. 144); and
    b) Expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
       in the directions of arrows 171a, 173c, 173d, and 173e
       (see FIG. 145).
22) Robot-assembled injury-preventing cone-shielding central intersector system 122 is (or are respectively) for performing the combined functions of its components.
23) Central robot-assembled intersectors 123 is (or are respectively) for:
    Robotically securely attaching at least one dog-run-adaptable anti-wobbling foldable top trusses 103
    in the direction of arrow 172b
    (see FIG. 158).
24) Central robot-assembled heat-expandable cold-contractable holes 124 is (or are respectively) for:
    a) Providing openings for robot-assembled heat-expandable cold-contractable anti-wobbling screws 117 to be robotically installed
       in the direction of arrow 172b
       (see FIG. 158); and
    b) Locking robot-assembled heat-expandable cold-contractable anti-wobbling screws 117 by expanding from friction-heat during insertion, forming threads, and then contracting inward when cooled
       in the directions of arrows 174a, 174b, 174c, 174d, and 174e
       (see FIG. 156, FIG. 157, FIG. 159, FIG. 160, and FIG. 161).
25) Central robot-assembled automatically-flaring-and-shielding-cone-head injury-preventing hammer-shields 125 is (or are respectively) for:
    a) Automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place in the directions of arrows 174*a*, 174*f*, 174*g*, 174*h*, 174*i*, and 174*j*
(see FIG. 156, FIG. 157, FIG. 159, FIG. 160, and FIG. 161); and
b) Preventing injury by coving the robot-assembled heat-expandable cold-contractable interlocking cones 120.

26) Robot-assembled injury-preventing cone-shielding upper intersector system 126 is (or are respectively) for performing the combined functions of its components.

27) Upper robot-assembled intersectors 127 is (or are respectively) for:
Pivotably and foldably attaching dog-run-adaptable anti-wobbling foldable top trusses 103, dog-run-adaptable anti-wobbling foldable corner trusses 104, dog-run-adaptable anti-wobbling foldable side trusses 105, and dog-run-adaptable anti-wobbling foldable upper posts 106 together.

28) Upper robot-assembled heat-expandable cold-contractable holes 128 is (or are respectively) for:
a) Providing openings for robot-assembled heat-expandable cold-contractable anti-wobbling screws 11 to be robotically installed; and
b) Locking robot-assembled heat-expandable cold-contractable anti-wobbling screws 117 by expanding from friction-heat during insertion, forming threads, and then contracting inward when cooled
in the directions of arrows 175*a*, 175*b*, 175*c*, 175*d*, and 175*e*
(see FIG. 163, FIG. 164, FIG. 165, FIG. 166, and FIG. 167).

29) Upper robot-assembled automatically-flaring-and-shielding-cone-head injury-preventing hammer-shields 129 is (or are respectively) for:
a) Automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place; and
b) Preventing injury by coving the robot-assembled heat-expandable cold-contractable interlocking cones 120
in the directions of arrows 175*a*, 175*f*, 175*g*, 175*h*, 175*i*, and 175*j*
(see FIG. 163, FIG. 164, FIG. 165, FIG. 166, and FIG. 167).

30) Robot-assembled arthritic-assisting injury-preventing cone-shielding lower intersector system 130 is (or are respectively) for performing the combined functions of its components.

31) Lower robot-assembled intersectors 131 is (or are respectively) for:
Slidably attaching to dog-run-adaptable anti-wobbling foldable upper posts 106.

32) Lower robot-assembled heat-expandable cold-contractable holes 132 is (or are respectively) for:
Providing openings for robot-assembled heat-expandable cold-contractable anti-wobbling screws 11 to be robotically installed
in the directions of arrows 176*a*, 176*b*, 176*c*, 176*d*, and 176*e*
(see FIG. 170, FIG. 171, FIG. 172, FIG. 173, FIG. 174, FIG. 175, and FIG. 176).

33) Lower robot-assembled cone-shielding injury-preventing hammer-shields 133 is (or are respectively) for:
a) Automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place; and
b) Preventing injury by coving the robot-assembled heat-expandable cold-contractable interlocking cones 120
in the directions of arrows 176*a*, 176*f*, 176*g*, 176*h*, 176*i*, and 176*j*
(see FIG. 170, FIG. 171, FIG. 172, FIG. 173, FIG. 174, FIG. 175, and FIG. 176).

Figure 180:
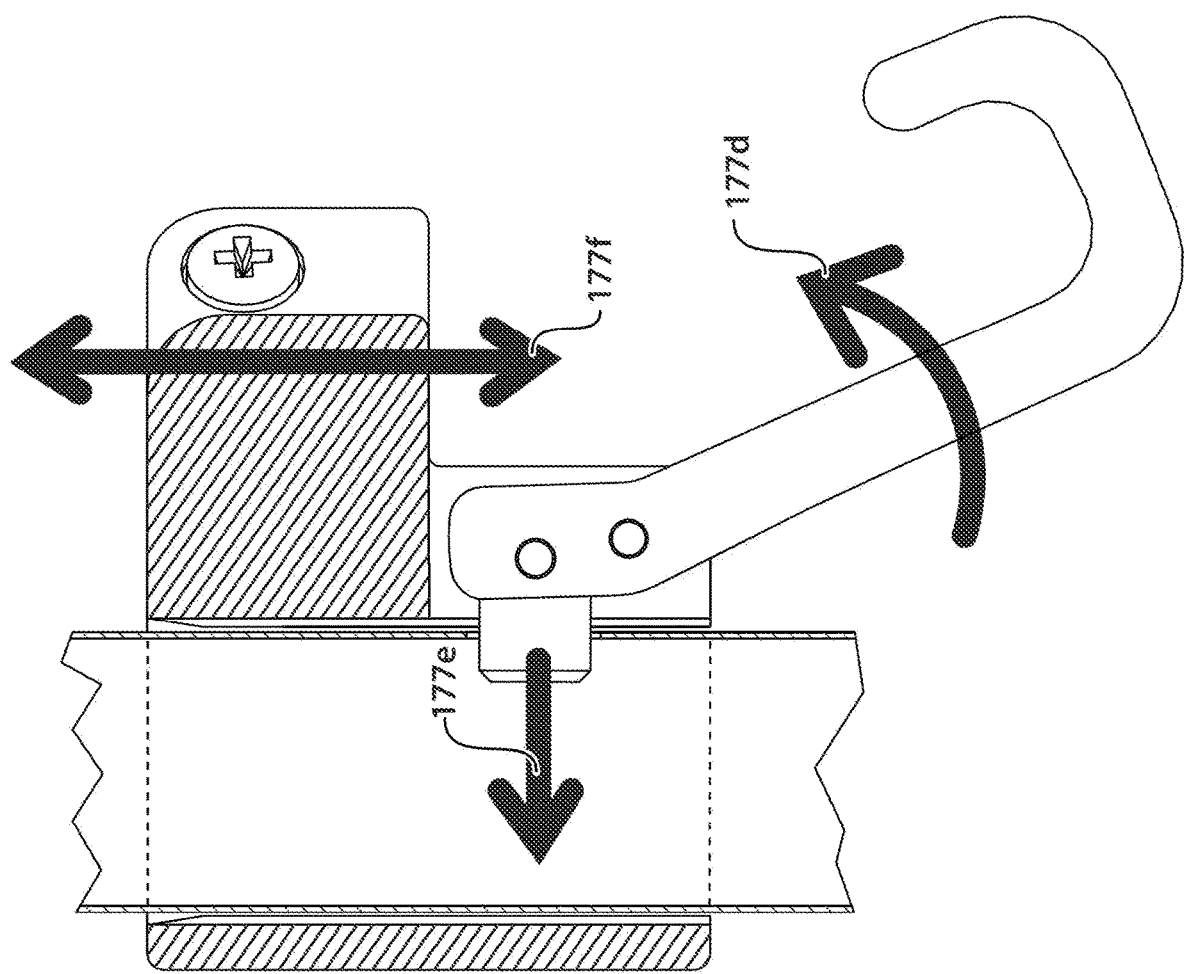
Figure 181:
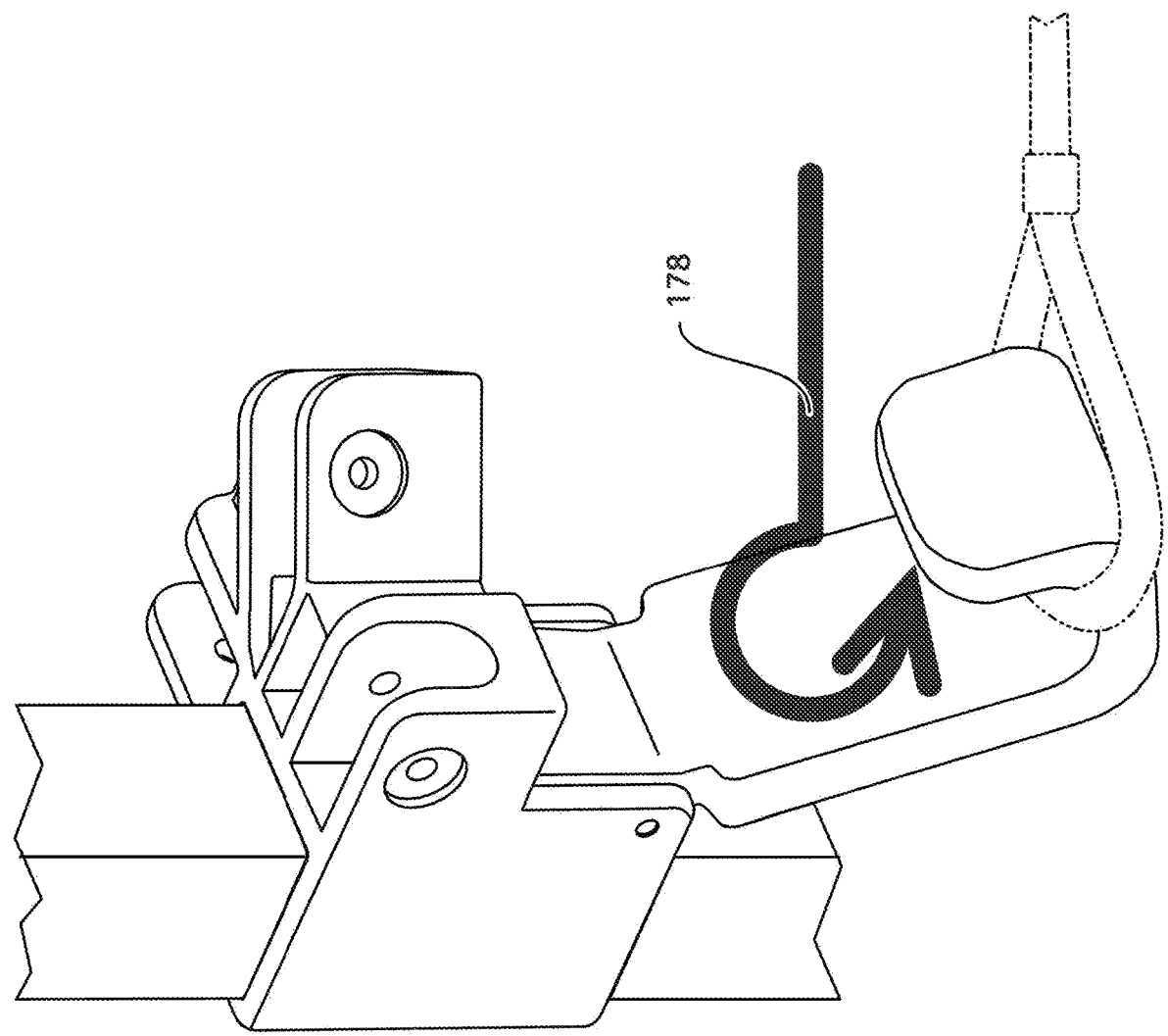
FIG. 181 illustrates a perspective view demonstrating how a rope can be tied to lower robot-assembled arthritic-assisting height-adjusting dog-run-panel-rope hooks to support a dog run.
Figure 182:
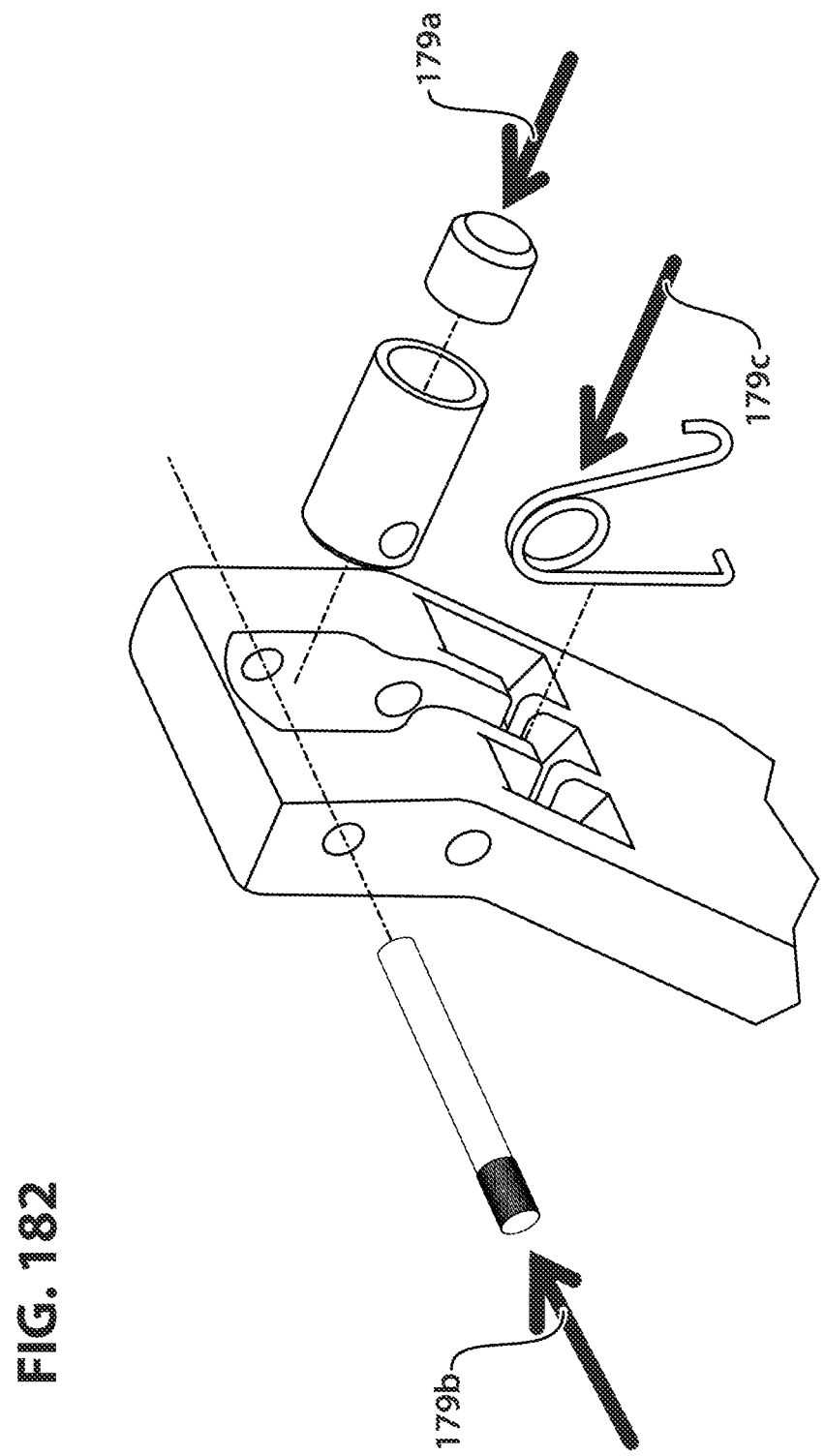
FIG. 182, FIG. 183, FIG. 184, FIG. 185, and FIG. 186 illustrate perspective views demonstrating various components of robot-assembled arthritic-assisting injury-preventing post-centering tick-preventing water-discharging sleeve system, and the assembly thereof.
Figure 183:
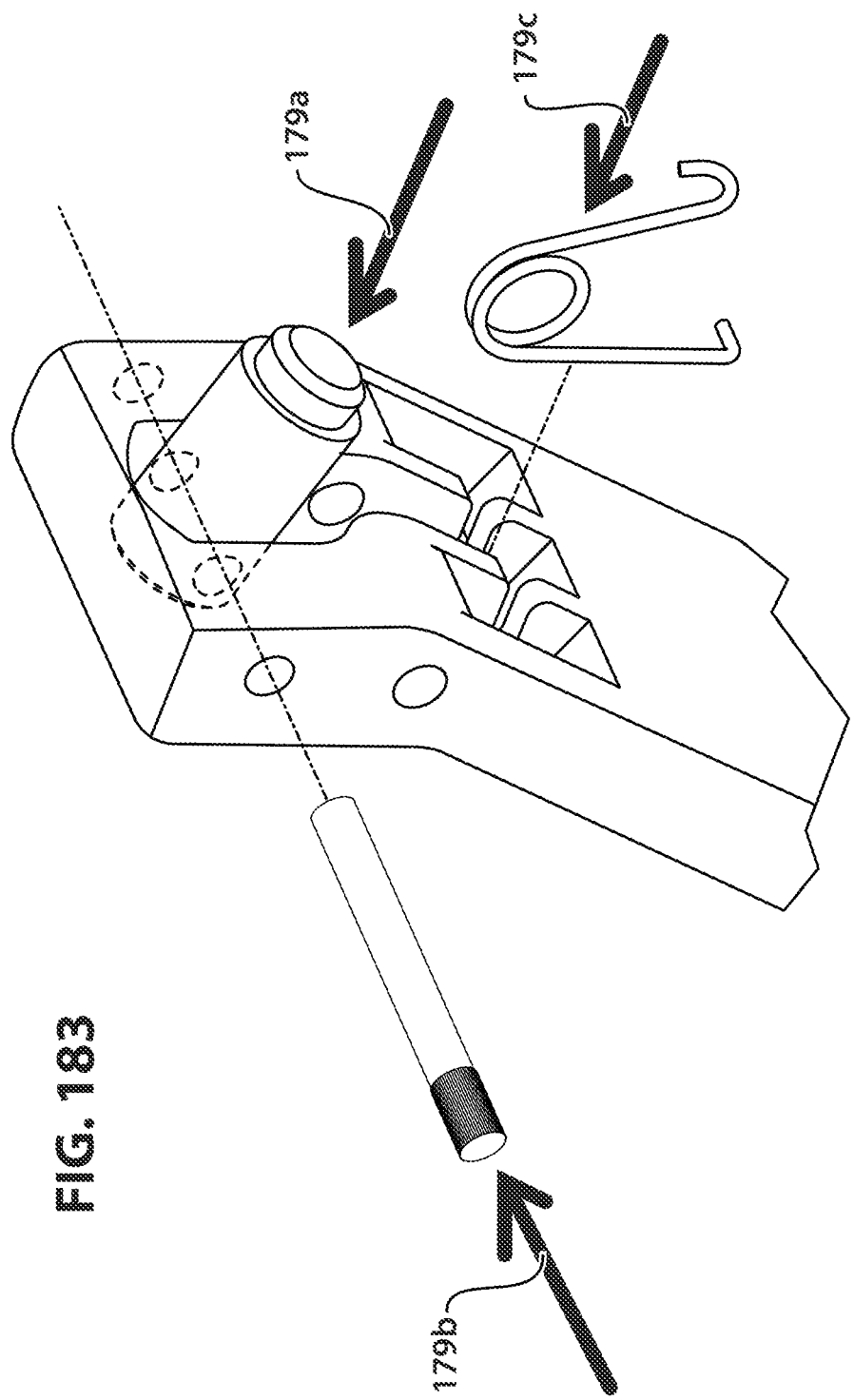
Figure 184:
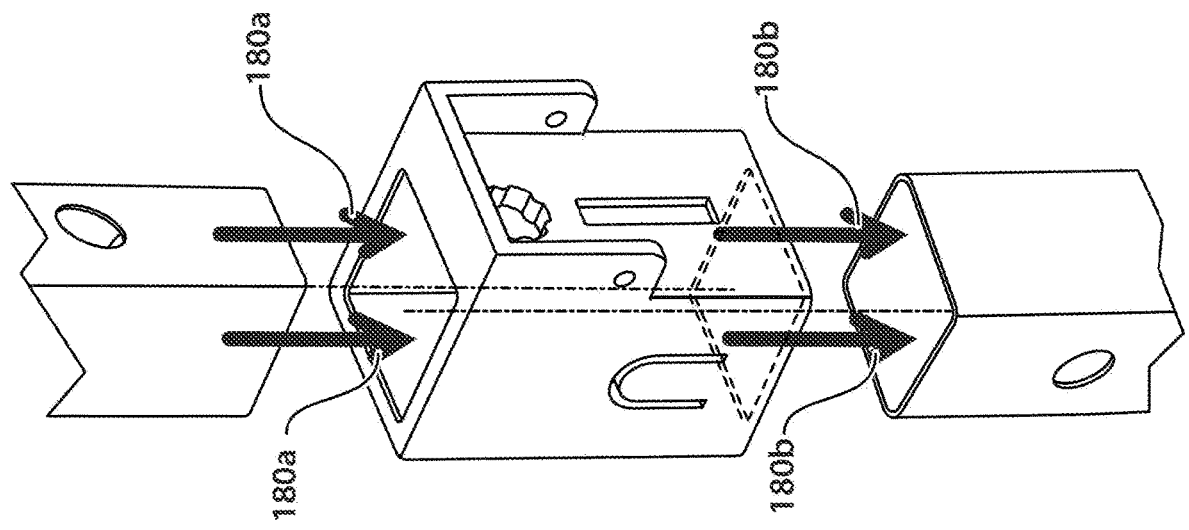
Figure 185:
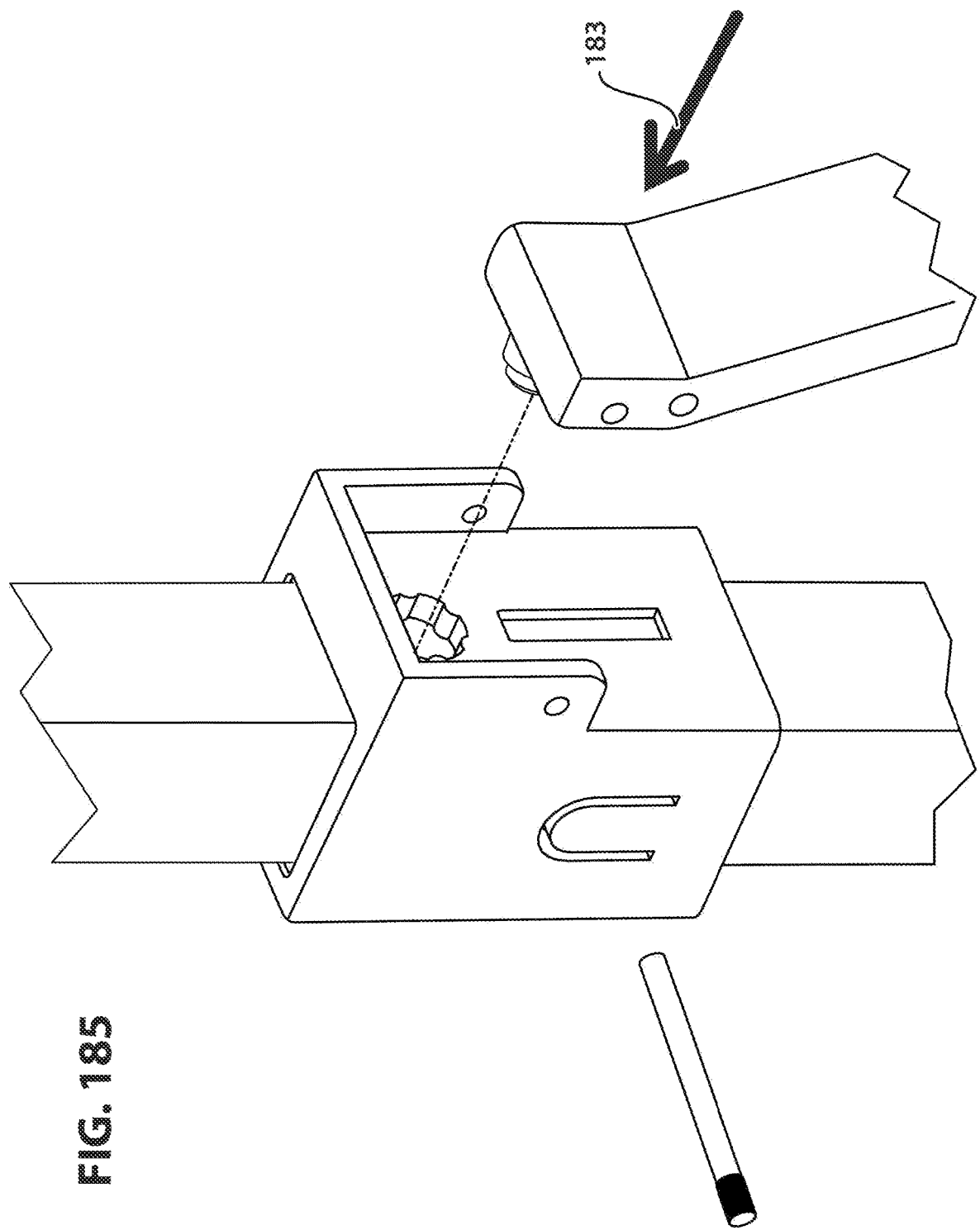
Figure 186:
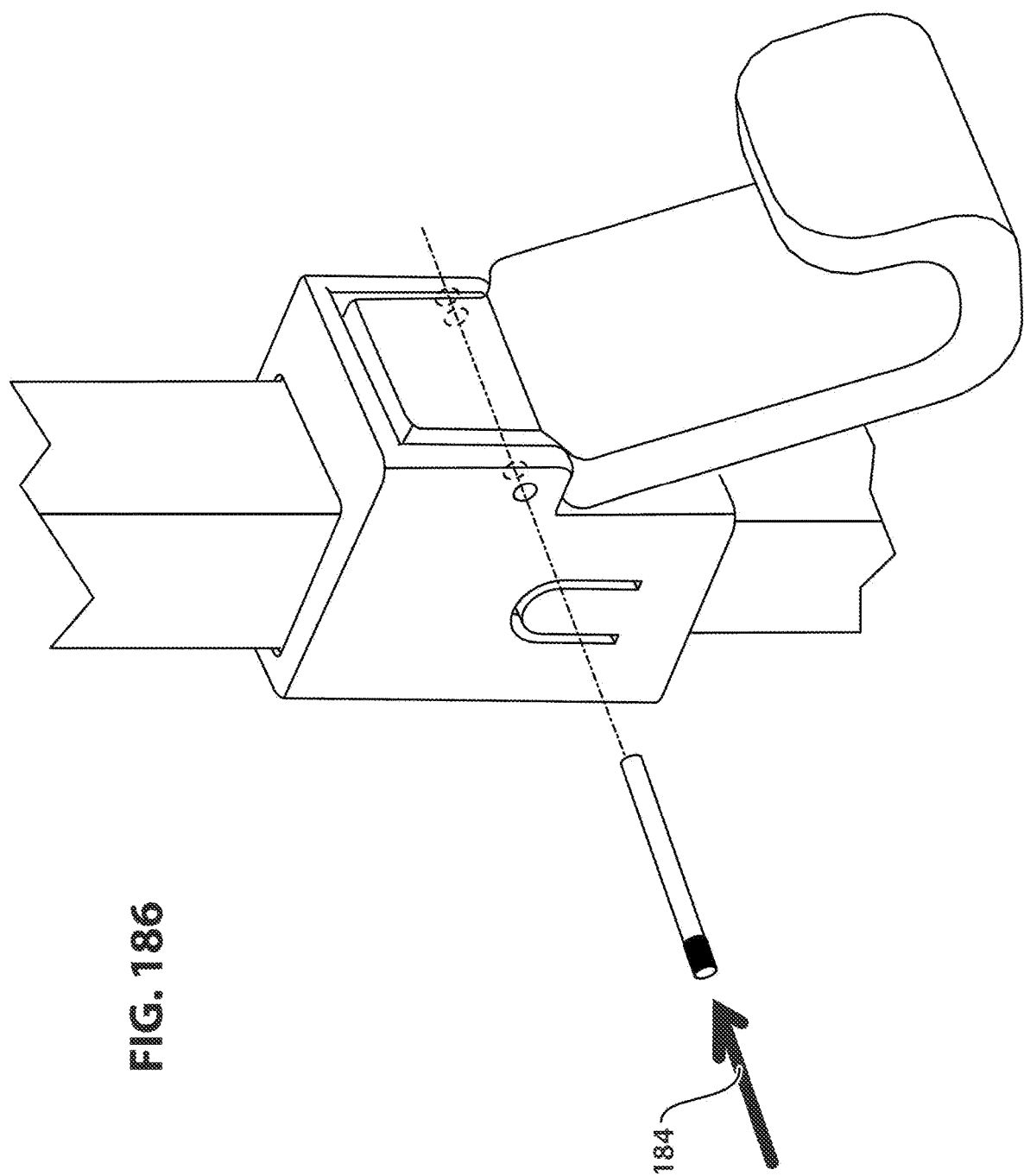
Figure 187:
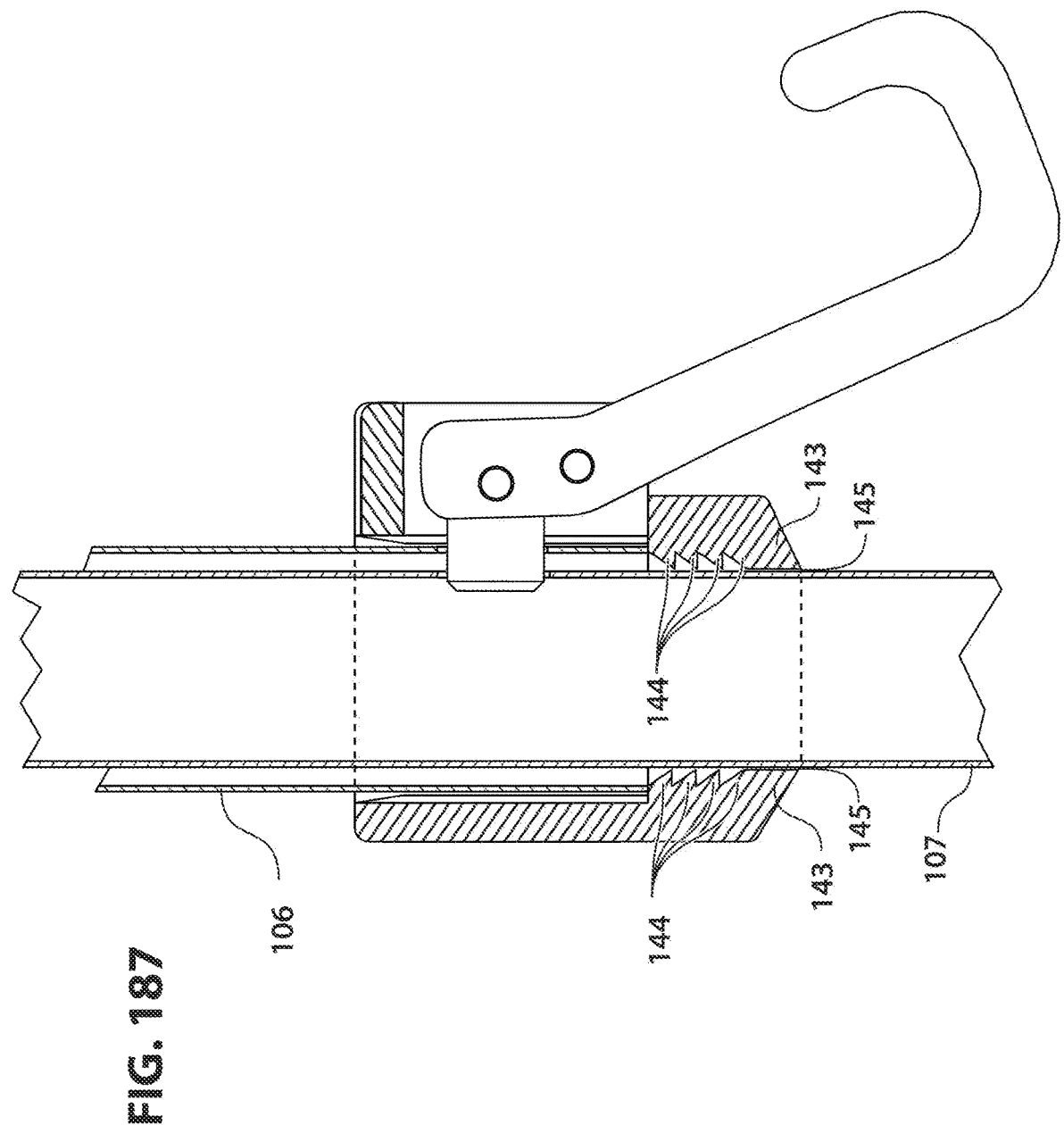
FIG. 187, FIG. 188, FIG. 189, and FIG. 190 illustrate cross-sectional and perspective views demonstrating sleeve robot-assembled post-centering clamps, sleeve robot-assembled tick-preventing downward teeth, and sleeve robot-assembled water-discharging grooves.
Figure 188:
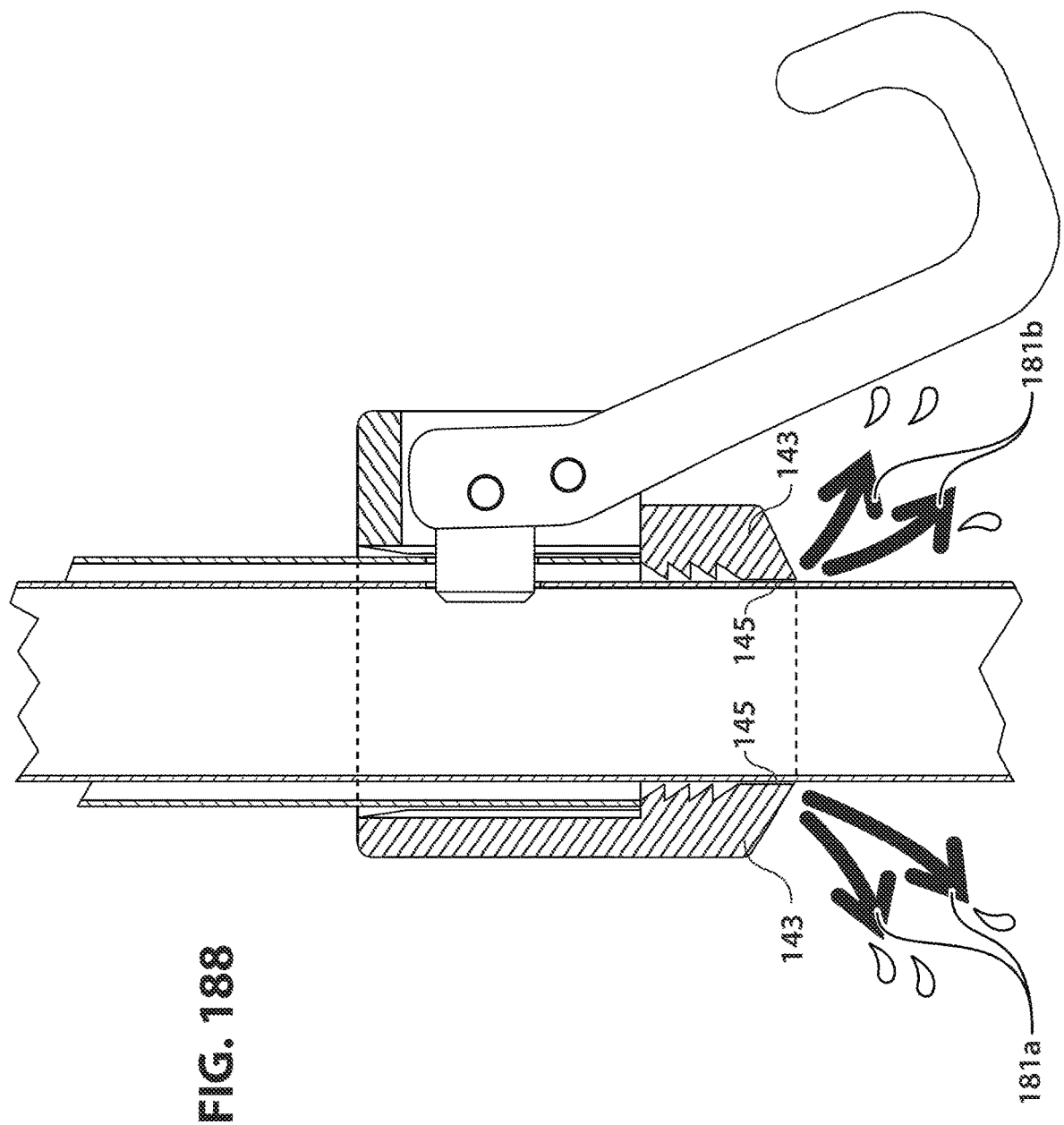
Figure 189:
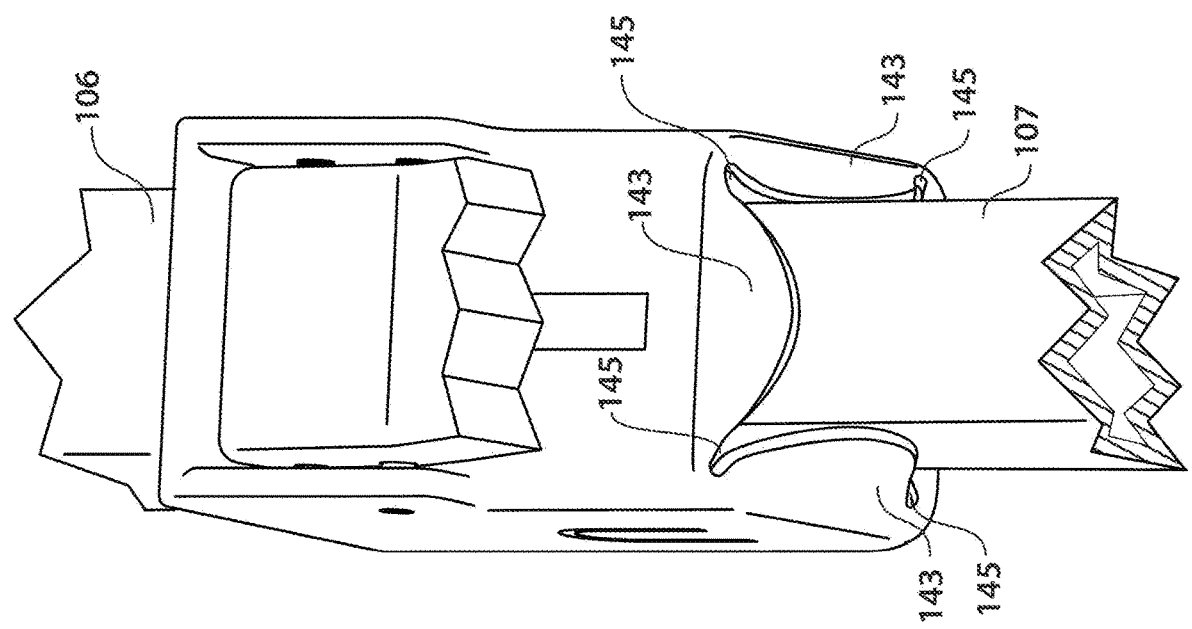
Figure 190:
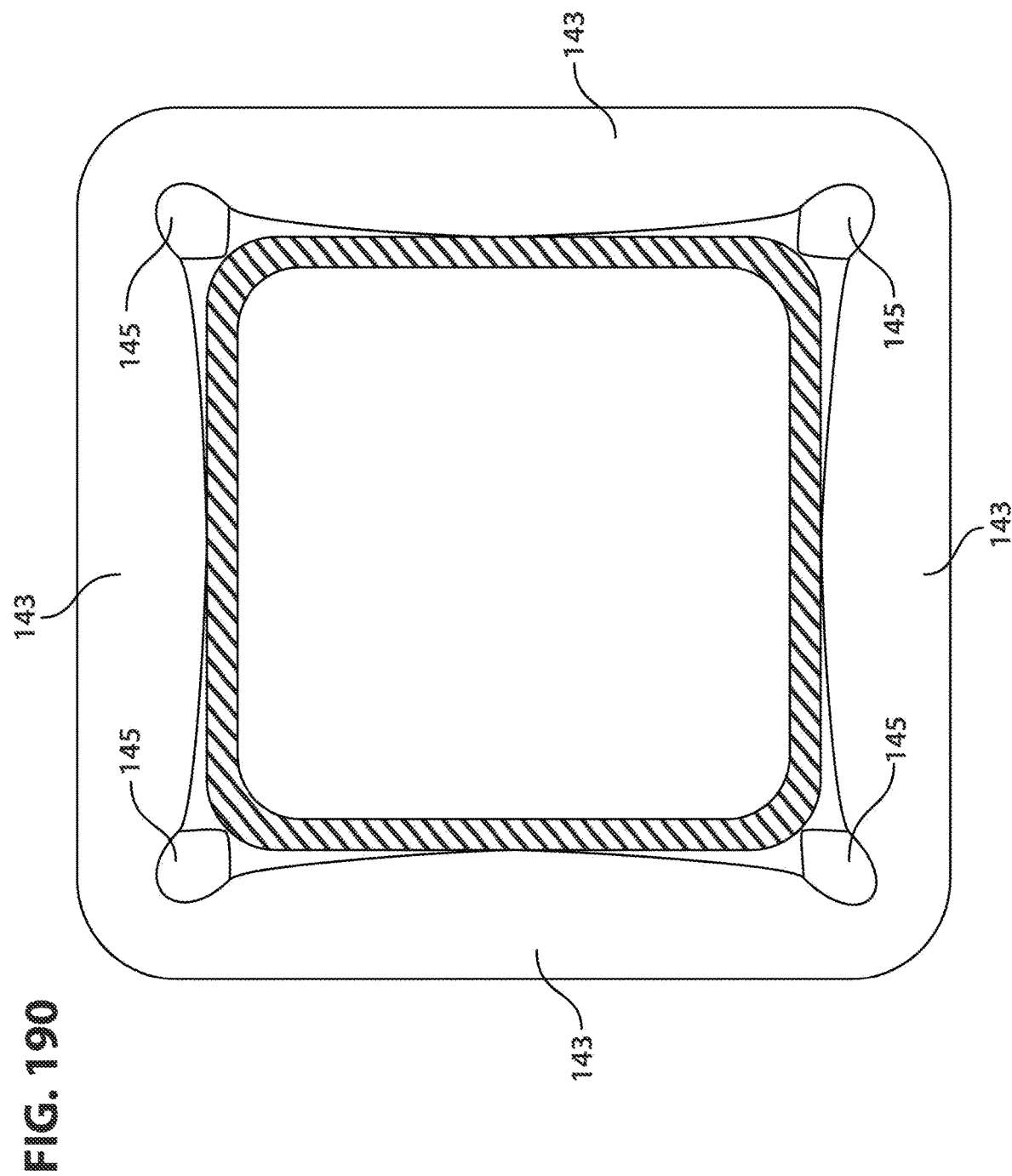
Figure 191:
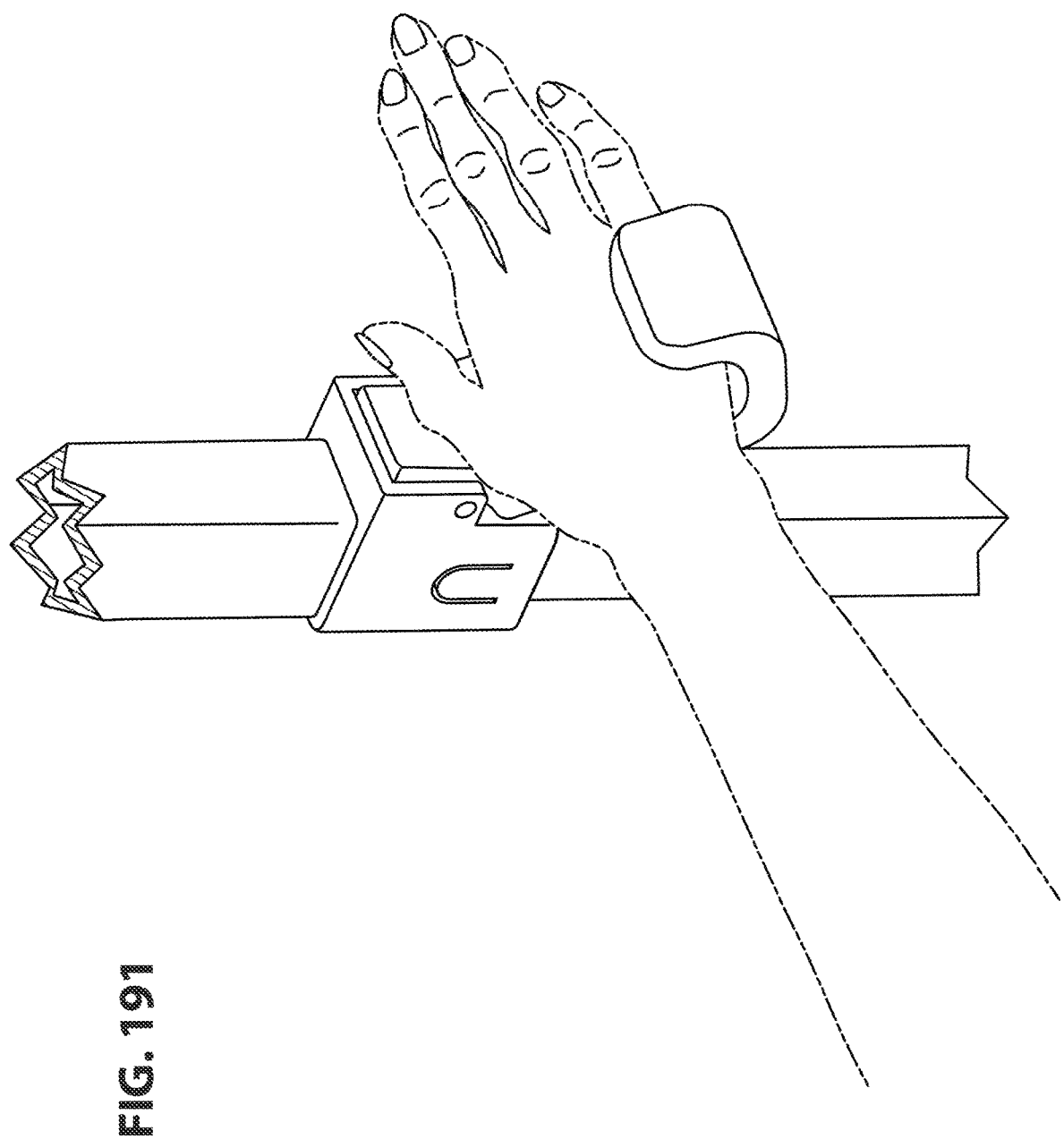
FIG. 191 illustrates a perspective view demonstrating how an arthritic can operate sleeve robot-assembled arthritic-assisting height-adjusting dog-run-panel-rope hooks without the need to close the hand.
Figure 192:
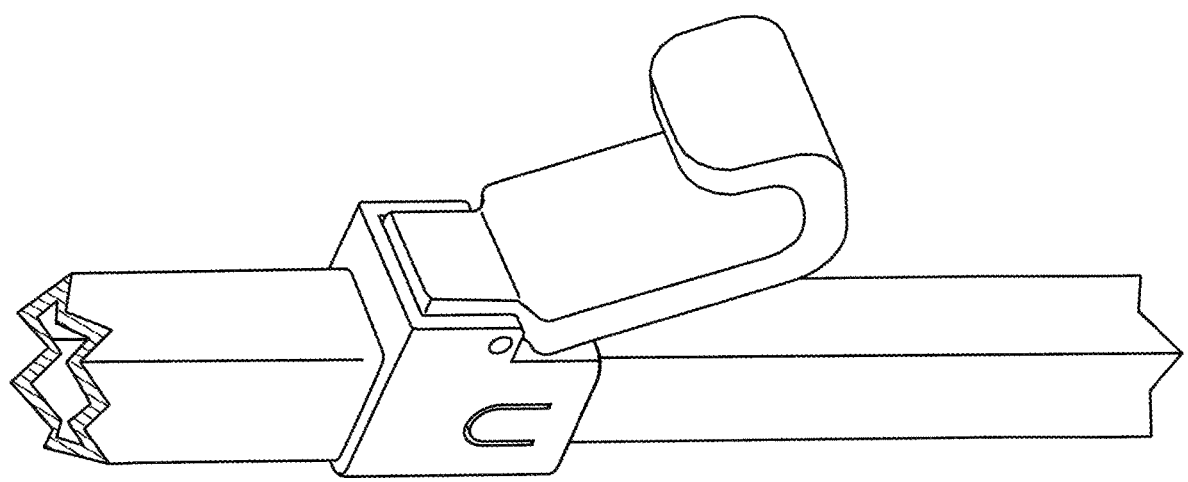
FIG. 192 and FIG. 193 illustrate perspective views demonstrating how a rope can be tied to sleeve robot-assembled arthritic-assisting height-adjusting dog-run-panel-rope hooks to support a dog run.

34) Lower robot-assembled arthritic-assisting height-adjusting dog-run-panel-rope hooks 134 is (or are respectively) for:
a) Allowing an arthritic to deploy and retract the six-device-in-one robot-assembled arthritic-assisting noise-canceling friction-reducing dog-run-adaptable anti-wobbling gazebo without the need to close the hand
in the directions of arrows 177*a*, 177*b*, 177*c*, 177*d*, 177*e*, and 177*f*
(see FIG. 178, FIG. 179, and FIG. 180); and
b) Attaching a rope or strap to support a dog run
in the direction of arrow 178
(see FIG. 181).

Figure 179:
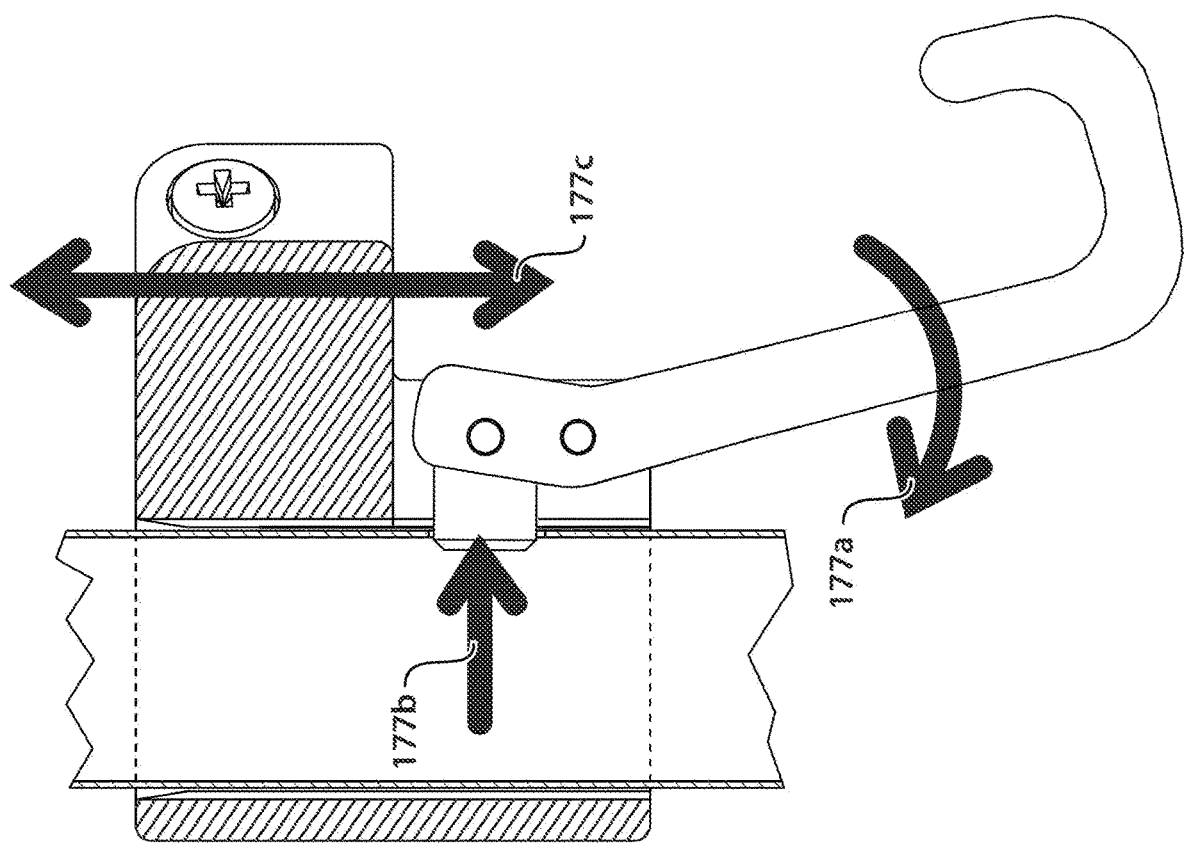
FIG. 179 and FIG. 180 illustrate cross-sectional views demonstrating how lower robot-assembled arthritic-assisting height-adjusting dog-run-panel-rope hooks engage and disengage the lower robot-assembled noise-canceling friction-reducing height-adjusting nipples to deploy and retract the six-device-in-one robot-assembled arthritic-assisting noise-canceling friction-reducing dog-run-adaptable anti-wobbling gazebo.

35) Lower robot-assembled noise-canceling friction-reducing height-adjusting nipples 135 is (or are respectively) for:
a) Securingly and pivotingly locking lower robot-assembled arthritic-assisting height-adjusting dog-run-panel-rope hooks 134; and
b) Securingly snap-locking the six-device-in-one robot-assembled arthritic-assisting noise-canceling friction-reducing dog-run-adaptable anti-wobbling gazebo from collapsing to prevent injury
in the directions of arrows 177*a*, 177*b*, 177*c*, 177*d*, 177*e*, and 177*f*
(see FIG. 179 and FIG. 180).

36) Lower robot-assembled noise-canceling friction-reducing lead-in nipple tips 136 is (or are respectively) for:
Easily allowing lower robot-assembled noise-canceling friction-reducing height-adjusting nipples 135 to be inserted into lower robot-assembled noise-canceling friction-reducing nipple-centering tunnels 140
in the direction of arrow 179*a*
(see FIG. 182, and FIG. 183).

37) Lower robot-assembled self-securing nipple-securing pins 137 is (or are respectively) for:
Hingedly securing lower robot-assembled noise-canceling friction-reducing height-adjusting nipples 135 to lower robot-assembled arthritic-assisting height-adjusting dog-run-panel-rope hooks 134
in the direction of arrow 179*b*
(see FIG. 182 and FIG. 183).

38) Lower robot-assembled self-securing hook-securing pins 138 is (or are respectively) for:
Hingedly securing lower robot-assembled arthritic-assisting height-adjusting dog-run-panel-rope hooks 134 to lower robot-assembled intersectors 131.

39) Lower robot-assembled hook spring 139 is (or are respectively) for:
Springingly providing opposing force for lower robot-assembled arthritic-assisting height-adjusting dog-run-panel-rope hooks 134 to return to its original position once depressed
in the direction of arrow 179*c*
(see FIG. 182 and FIG. 183).

40) Lower robot-assembled noise-canceling friction-reducing nipple-centering tunnels 140 is (or are respectively) for:
Securely centeringly snap-locking lower robot-assembled noise-canceling friction-reducing height-adjusting nipples 135 to securely snap-lock the deployed six-device-in-one robot-assembled arthritic-assisting noise-canceling friction-reducing dog-run-adaptable anti-wobbling gazebo from collapsing.
41) Robot-assembled arthritic-assisting injury-preventing post-centering tick-preventing water-discharging sleeve system 141 is (or are respectively) for performing the combined functions of its components.
42) Robot-assembled sleeves 142 is (or are respectively) for:
Providing easy-slide surface for dog-run-adaptable anti-wobbling foldable lower posts 107 to slide up and down within dog-run-adaptable anti-wobbling foldable upper posts 106 to prevent scratching
in the directions of arrows 180a and 180b
(see FIG. 184).
43) Sleeve robot-assembled post-centering clamps 143 is (or are respectively) for:
Centering dog-run-adaptable anti-wobbling foldable lower posts 107 within dog-run-adaptable anti-wobbling foldable upper posts 106.
44) Sleeve robot-assembled tick-preventing downward teeth 144 is (or are respectively) for:
Preventing ticks from getting inside dog-run-adaptable anti-wobbling foldable upper posts 106.
45) Sleeve robot-assembled water-discharging grooves 145 is (or are respectively) for:
Allowing water to discharge out of dog-run-adaptable anti-wobbling foldable upper posts 106
in the directions of arrows 181a and 181b
(see FIG. 188).
46) Sleeve robot-assembled arthritic-assisting height-adjusting dog-run-panel-rope hooks 146 is (or are respectively) for:
a) Allowing an arthritic to deploy and retract the six-device-in-one robot-assembled arthritic-assisting noise-canceling friction-reducing dog-run-adaptable anti-wobbling gazebo without bending the fingers
(see FIG. 191); and
b) Attaching a rope or strap to support a dog run in the direction of arrow 182
(see FIG. 193).
47) Sleeve robot-assembled noise-canceling friction-reducing post-height-adjusting grooved nipples 147 is (or are respectively) for:
Securely snap-locking the deployed six-device-in-one robot-assembled arthritic-assisting noise-canceling friction-reducing dog-run-adaptable anti-wobbling gazebo to prevent collapsing.
48) Sleeve robot-assembled noise-canceling friction-reducing hook jacking jacks 148 is (or are respectively) for:
Securely snap-locking sleeve robot-assembled arthritic-assisting height-adjusting dog-run-panel-rope hooks 146
in the direction of arrow 183
(see FIG. 185).
49) Sleeve robot-assembled self-securing jack-securing pins 149 is (or are respectively) for:
Securing sleeve robot-assembled noise-canceling friction-reducing hook-jacking jacks 148 to sleeve robot-assembled arthritic-assisting height-adjusting dog-run-panel-rope hooks 146.

Figure 218:
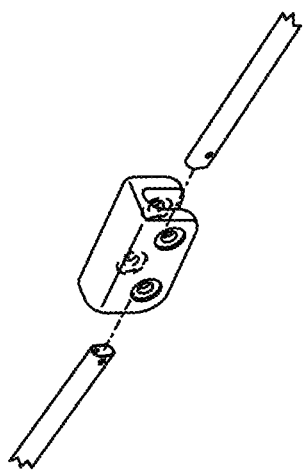
FIG. 218 and FIG. 219 illustrate perspective views of equivalent variations of robot-assembled automatically-making-rivet-tail-flare noise-canceling injury-preventing top-connector system.
Figure 219:
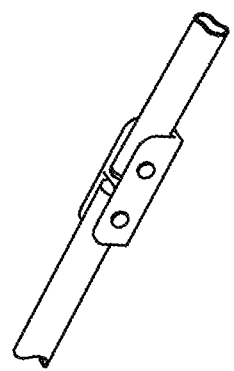
Figure 220:
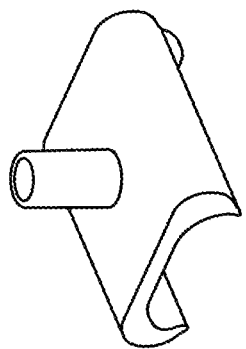
FIG. 220, FIG. 221, FIG. 222, FIG. 223, and FIG. 224 illustrate perspective views of equivalent variations of robot-assembled noise-canceling injury-preventing rust-preventing truss-centering cover-cushion system.
Figure 221:
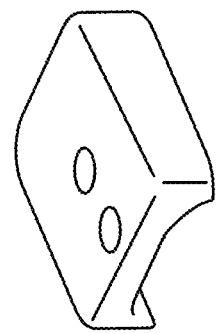
Figure 222:
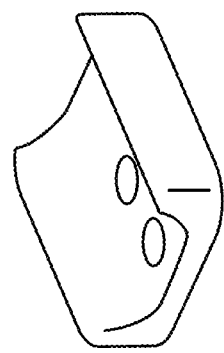
Figure 223:
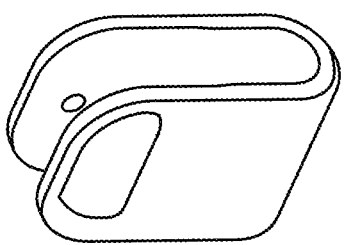
Figure 224:
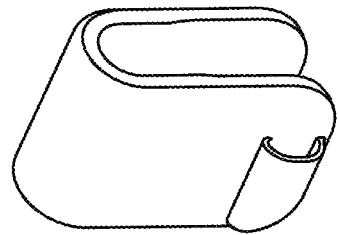
Figure 225:
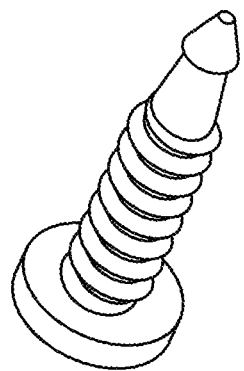
FIG. 225 and FIG. 226 illustrate perspective views of equivalent variations of robot-assembled heat-expandable cold-contractable anti-wobbling screws.
Figure 226:
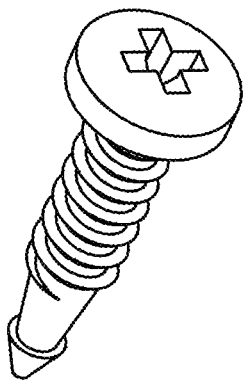
Figure 229:
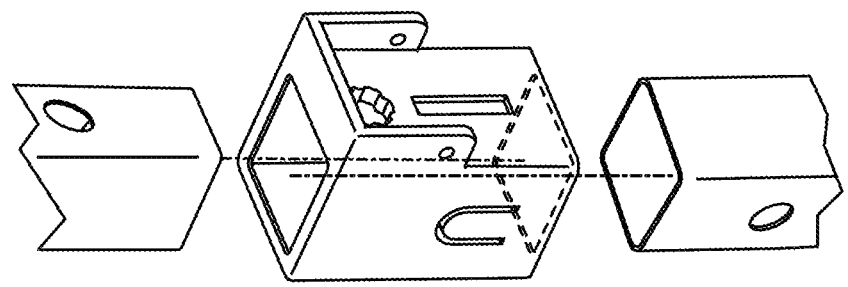
Figure 228:
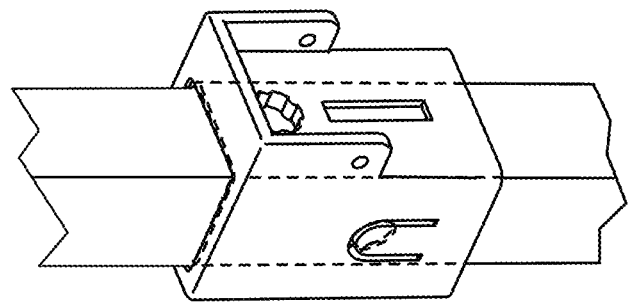
Figure 227:
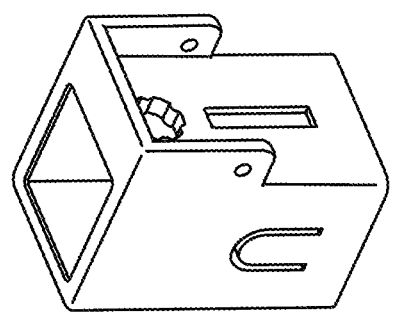
Figure 237:
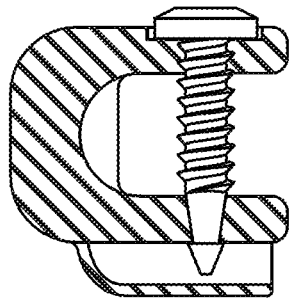
FIG. 237, FIG. 238, FIG. 239, and FIG. 240 illustrate cross-section views of equivalent variations of robot-assembled automatically-making-rivet-tail-flare noise-canceling injury-preventing top-connector system, robot-assembled injury-preventing cone-shielding central intersector system, robot-assembled injury-preventing cone-shielding upper intersector system, and robot-assembled arthritic-assisting injury-preventing cone-shielding lower intersector system and the installation of robot-assembled heat-expandable cold-contractable interlocking anti-wobbling spiral-saw screw system, respectively, therein.
Figure 240:
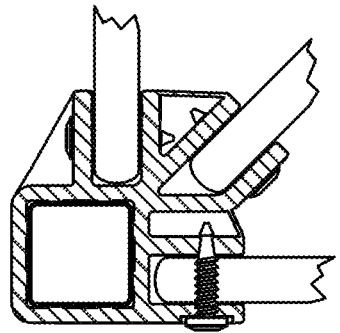
Figure 236:
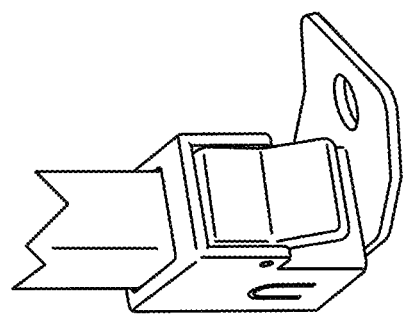
Figure 239:
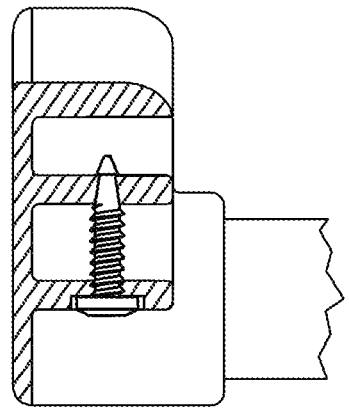
Figure 235:
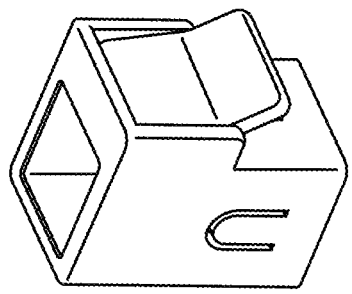
Figure 238:
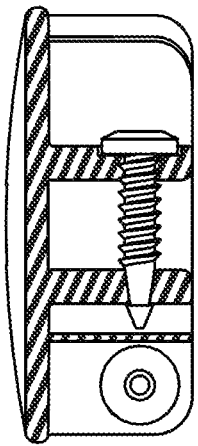
Figure 247:
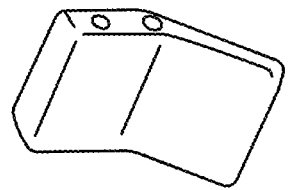
Figure 248:
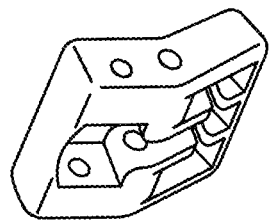
Figure 249:
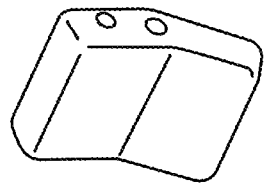
Figure 250:
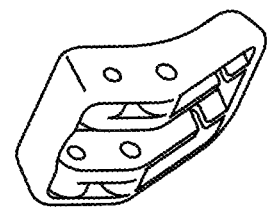
Figure 251:
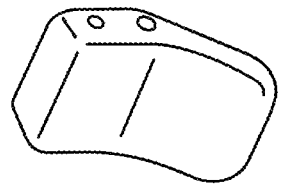
Figure 252:
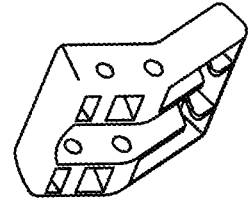
Figure 255:
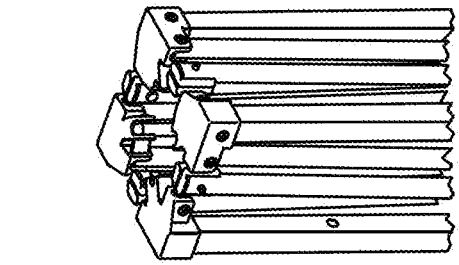
FIG. 253, FIG. 254, and FIG. 255 illustrate perspective views of equivalent variations of the six-device-in-one robot-assembled arthritic-assisting noise-canceling friction-reducing dog-run-adaptable anti-wobbling gazebo in its folded position.
Figure 254:
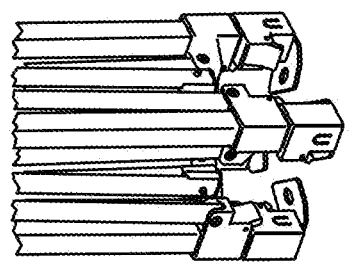
Figure 253:

50) Sleeve robot-assembled self-securing hook-securing pins 150 is (or are respectively) for:
Hingedly securing sleeve robot-assembled arthritic-assisting height-adjusting dog-run-panel-rope hooks 146 to robot-assembled sleeves 142
in the direction of arrow 184
(see FIG. 186).
51) Sleeve robot-assembled hook spring 151 is (or are respectively) for:
Springingly providing opposing force for sleeve robot-assembled arthritic-assisting height-adjusting dog-run-panel-rope hooks 146 to return to its original position once depressed.
52) Sleeve robot-assembled noise-canceling friction-reducing flower-shaped nipple-centering holes 152 is (or are respectively) for:
Securely centeringly snapping sleeve robot-assembled noise-canceling friction-reducing hook-jacking jacks 148 to securely snap-lock the deployed six-device-in-one robot-assembled arthritic-assisting noise-canceling friction-reducing dog-run-adaptable anti-wobbling gazebo to prevent collapsing.
53) Robot-assembled noise-canceling injury-preventing rust-preventing truss-centering cover-cushion system 153 is (or are respectively) for performing the combined functions of its components.
54) Robot-assembled rust-preventing truss-end covers 154 is (or are respectively) for:
a) Eliminating the need for nuts and bolts
to save manufacturing cost,
to save manufacturing time,
to save end-user assembly time, and
to increase overall production output;
b) Eliminating the need for washers
to save manufacturing cost,
to save manufacturing time,
to save end-user assembly time, and
to increase overall production output;
c) Eliminating the need for 50 truss-end-plugs, from prior art
to save manufacturing cost,
to save manufacturing time,
to save end-user assembly time, and
to increase overall production output;
d) Preventing water and insects from entering into dog-run-adaptable anti-wobbling foldable corner trusses 104; and
e) Preventing injury by covering sharp metal edges.
55) Robot-assembled noise-canceling cover-cushion 155 is (or are respectively) for:
Providing a washer to assist in easy motion and to prevent metal-to-metal contact.
56) Robot-assembled injury-preventing inward-curved cover-cushion edges 156 is (or are respectively) for:
Securely snap-locking in place eliminating the need for nuts and bolts.
57) Robot-assembled heat-expandable cold-contractable double-tail cover-cushion rivets 157 is (or are respectively) for:
a) Decreasing assembly man hours by being robotically factory-installed;
b) Decreasing end-user assembly time by being robotically factory-installed;
c) Eliminating need for washers;
d) Creating a locking ridge when robotically heat-stamped eliminating need for nuts and bolts
in the directions of arrows 185a, 185b, 185c, and 185d (see FIG. 197, FIG. 198, and FIG. 199); and
e) Creating a locking ridge when robotically heat-stamped securely and pivotably locking two dog-run-adaptable anti-wobbling foldable side trusses 105 together
in the directions of arrows 185*a*, 185*b*, 185*c*, and 185*d*
(see FIG. 197, FIG. 198, and FIG. 199).
58) Robot-assembled arthritic-assisting noise-canceling injury-preventing rust-preventing truss-centering cup-cushion system 158 is (or are respectively) for performing the combined functions of its components.
59) Robot-assembled noise-canceling cup-cushion 159 is (or are respectively) for:
a) Eliminating the need for nuts and bolts
to save manufacturing cost,
to save manufacturing time,
to save end-user assembly time, and
to increase overall production output
in the directions of arrows 186*a*, 186*b*, and 186*c*
(see FIG. 203, FIG. 204, FIG. 205, and FIG. 206);
b) Eliminating the need for washers
to save manufacturing cost,
to save manufacturing time,
to save end-user assembly time, and
to increase overall production output
in the directions of arrows 186*a*, 186*b*, and 186*c*
(see FIG. 203, FIG. 204, FIG. 205, and FIG. 206);
c) Eliminating the need for 50 truss-end-plugs, from prior art
to save manufacturing cost,
to save manufacturing time,
to save end-user assembly time, and
to increase overall production output
in the directions of arrows 186*a*, 186*b*, and 186*c*
(see FIG. 203, FIG. 204, FIG. 205, and FIG. 206);
d) Preventing water and insects from entering into dog-run-adaptable anti-wobbling foldable corner trusses 104; and
e) Preventing injury by covering sharp metal edges.
60) Robot-assembled injury-preventing inward-curved cup-cushion edges 160 is (or are respectively) for:
Securely snap-locking in place eliminating the need for securing nuts, bolts, and washers.
61) Robot-assembled arthritic-assisting noise-canceling circular-cushion system 161 is (or are respectively) for performing the combined functions of its components.
62) Robot-assembled noise-canceling circular-cushion 162 is (or are respectively) for:
a) Providing a washer between two dog-run-adaptable anti-wobbling foldable side trusses 105;
b) Pivotably connecting two dog-run-adaptable anti-wobbling foldable side trusses 105 together;
c) Eliminating the need for nuts and bolts
to save manufacturing cost,
to save manufacturing time,
to save end-user assembly time, and
to increase overall production output
in the directions of arrows 187*a*, 187*b*, 187*c*, 187*d*, 187*e*, and 186*f*
(see FIG. 207, FIG. 208, FIG. 209, and FIG. 210); and
d) Eliminating the need for washers
to save manufacturing cost,
to save manufacturing time,
to save end-user assembly time, and
to increase overall production output
in the directions of arrows 187*a*, 187*b*, 187*c*, 187*d*, 187*e*, and 186*f*
(see FIG. 207, FIG. 208, FIG. 209, and FIG. 210).
63) Robot-assembled double-tail built-in circular-cushion rivets 163 is (or are respectively) for:
a) Pivotably connecting two dog-run-adaptable anti-wobbling foldable side trusses 105 together;
b) Being robotically installed to lessen the assembly man hours
in the directions of arrows 187*a*, 187*b*, 187*c*, 187*d*, 187*e*, and 186*f*
(see FIG. 207, FIG. 208, FIG. 209, and FIG. 210);
c) Being robotically installed to lessen end-user assembly time
in the directions of arrows 187*a*, 187*b*, 187*c*, 187*d*, 187*e*, and 186*f*
(see FIG. 207, FIG. 208, FIG. 209, and FIG. 210); and
d) Being robotically heat-stamped automatically creating a locking ridge eliminating the need for nuts
in the directions of arrows 187*a*, 187*b*, 187*c*, 187*d*, 187*e*, and 186*f*
(see FIG. 207, FIG. 208, FIG. 209, and FIG. 210).
Variation
Any component of the six-device-in-one robot-assembled arthritic-assisting noise-canceling friction-reducing dog-run-adaptable anti-wobbling gazebo can have any shape and size.
Any component of the six-device-in-one robot-assembled arthritic-assisting noise-canceling friction-reducing dog-run-adaptable anti-wobbling gazebo can be replaced with an equivalent component. Any component of six-device-in-one robot-assembled arthritic-assisting noise-canceling friction-reducing dog-run-adaptable anti-wobbling gazebo can be made of any material(s) or any combination of any materials. Any component of the six-device-in-one robot-assembled arthritic-assisting noise-canceling friction-reducing dog-run-adaptable anti-wobbling gazebo can be made of any flexible, semi-flexible, bendable, semi-bendable, stretchable, semi-stretchable, rigid, or semi-rigid material(s). Any component-attaching method of the six-device-in-one robot-assembled arthritic-assisting noise-canceling friction-reducing dog-run-adaptable anti-wobbling gazebo can be replaced with an equivalent method. For example, FIG. 211, FIG. 212, FIG. 213, FIG. 214, FIG. 215, FIG. 216, and FIG. 217 illustrate perspective and cross-sectional views of equivalent variations of robot-assembled arthritic-assisting injury-preventing cone-shielding lower intersector system. For example, FIG. 218 and FIG. 219 illustrate perspective views of equivalent variations of robot-assembled automatically-making-rivet-tail-flare noise-canceling injury-preventing top-connector system. For example, FIG. 220, FIG. 221, FIG. 222, FIG. 223, and FIG. 224 illustrate perspective views of equivalent variations of robot-assembled noise-canceling injury-preventing rust-preventing truss-centering cover-cushion system. For example, FIG. 225 and FIG. 226 illustrate perspective views of equivalent variations of robot-assembled heat-expandable cold-contractable anti-wobbling screws. For example, FIG. 227, FIG. 228, FIG. 229, FIG. 230, FIG. 231, FIG. 232, FIG. 233, FIG. 234, FIG. 235, and FIG. 236 illustrate perspective views of equivalent variations of various components of robot-assembled arthritic-assisting injury-preventing post-centering tick-preventing water-discharging sleeve system. For example, FIG. 237, FIG. 238, FIG. 239, and FIG. 240 illustrate cross-section views of equivalent variations of robot-assembled automatically-making-rivet-tail-flare noise-canceling injury-preventing top-connector system, robot-assembled injury-preventing cone-shielding central intersector system, robot-assembled injury-preventing cone-shielding upper intersector system, and robot-assembled arthritic-assisting injury-preventing cone-shielding lower intersector system and the installation of robot-assembled heat-expandable cold-contractable interlocking anti-wobbling spiral-saw screw system, respectively, therein. For example, FIG. 241, FIG. 242, FIG. 243, and FIG. 244 illustrate perspective views of equivalent variations of robot-assembled automatically-making-rivet-tail-flare noise-canceling injury-preventing top-connector system. For example, FIG. 245, FIG. 246, FIG. 247, FIG. 248, FIG. 249, FIG. 250, FIG. 251, and FIG. 252 illustrate perspective views of equivalent variations of lower robot-assembled arthritic-assisting height-adjusting dog-run-panel-rope hooks and sleeve robot-assembled arthritic-assisting height-adjusting dog-run-panel-rope hooks. For example, FIG. 253, FIG. 254, and FIG. 255 illustrate perspective views of equivalent variations of the six-device-in-one robot-assembled arthritic-assisting noise-canceling friction-reducing dog-run-adaptable anti-wobbling gazebo in its folded position.

Major Advantages of the Invention

The present invention substantially departs from the conventional concepts and designs of the prior art. In doing so, the present invention provides the six-device-in-one robot-assembled arthritic-assisting noise-canceling friction-reducing dog-run-adaptable anti-wobbling gazebo, having many unique and significant features, functions, and advantages, which overcome all the disadvantages of the prior art, as follows:
1) It is an object of the new invention to provide a six-device-in-one robot-assembled arthritic-assisting noise-canceling friction-reducing dog-run-adaptable anti-wobbling gazebo, having adjustable canopy 102.
   Therefore, the six-device-in-one robot-assembled arthritic-assisting noise-canceling friction-reducing dog-run-adaptable anti-wobbling gazebo:
      a) Is capable of protecting occupants and property users from weather elements;
      b) Is capable of functioning as a greenhouse
         (see FIG. 3, FIG. 4, FIG. 138, and FIG. 139);
      c) Is capable of functioning as a cover for a dog-run in the direction of arrow 169
         (see FIG. 5, FIG. 6, FIG. 140, and FIG. 141);
      d) Is capable of functioning as a surface for an advertisement sign
         (see FIG. 7, FIG. 8, FIG. 129, and FIG. 130);
      e) Is capable of functioning as an awning cover
         (see FIG. 9, FIG. 10, FIG. 131, and FIG. 132); and
      f) Is capable of functioning as ceiling-mounted overhead storage
         (see FIG. 11, FIG. 12, FIG. 133, and FIG. 134).
2) It is another object of the new invention to provide a six-device-in-one robot-assembled arthritic-assisting noise-canceling friction-reducing dog-run-adaptable anti-wobbling gazebo, having dog-run-adaptable anti-wobbling foldable lower posts 107.
   Therefore, the six-device-in-one robot-assembled arthritic-assisting noise-canceling friction-reducing dog-run-adaptable anti-wobbling gazebo:
      a) Is capable of foldably and slidably raising and lowering to increase and decrease the height of the six-device-in-one robot-assembled arthritic-assisting noise-canceling friction-reducing dog-run-adaptable anti-wobbling gazebo; and
      b) Is capable of supporting sidewalls of dog-run.
3) It is another object of the new invention to provide a six-device-in-one robot-assembled arthritic-assisting noise-canceling friction-reducing dog-run-adaptable anti-wobbling gazebo, having
   top robot-assembled automatically-flaring-and-shielding-rivet-tail injury-preventing hammer-shields 114.
   Therefore, the six-device-in-one robot-assembled arthritic-assisting noise-canceling friction-reducing dog-run-adaptable anti-wobbling gazebo:
      a) Is capable of providing a limiting surface for robot-assembled heat-expandable cold-contractable anti-wobbling screws 117 to stop
         in the directions of arrows 171a, 171f, 171g, 171h, 171i, and 171j
         (see FIG. 145, FIG. 149, FIG. 150, and FIG. 153); and
      b) Is capable of preventing injury by covering the robot-assembled heat-expandable cold-contractable interlocking cones 120.
4) It is a further object of the new invention to provide a six-device-in-one robot-assembled arthritic-assisting noise-canceling friction-reducing dog-run-adaptable anti-wobbling gazebo, having
   robot-assembled heat-expandable cold-contractable anti-wobbling screws 117.
   Therefore, the six-device-in-one robot-assembled arthritic-assisting noise-canceling friction-reducing dog-run-adaptable anti-wobbling gazebo:
      a) Is capable of saving manufacturing time by eliminating the need for nuts and bolts
         (see FIG. 146 (Prior Art), FIG. 155 (Prior Art), FIG. 162 (Prior Art), and FIG. 169 (Prior Art));
      b) Is capable of saving manufacturing man-hours by robotically manufacturing
         in the directions of arrows 172a, 172b, 172c, and 172d
         (see FIG. 154, FIG. 158, FIG. 168, and FIG. 177);
      c) Is capable of saving end-consumer assembly time by robotically pre-installing robot-assembled heat-expandable cold-contractable anti-wobbling screws 117, at the factory
         in the directions of arrows 172a, 172b, 172c, and 172d
         (see FIG. 154, FIG. 158, FIG. 168, and FIG. 177); and
      d) Is capable of increasing overall production output of the six-device-in-one robot-assembled arthritic-assisting noise-canceling friction-reducing dog-run-adaptable anti-wobbling gazebo by robotically decreasing per-unit production time.
5) It is an even further object of the new invention to provide a six-device-in-one robot-assembled arthritic-assisting noise-canceling friction-reducing dog-run-adaptable anti-wobbling gazebo, having
   robot-assembled heat-expandable cold-contractable spirally-threading spiral saws 118.
   Therefore, the six-device-in-one robot-assembled arthritic-assisting noise-canceling friction-reducing dog-run-adaptable anti-wobbling gazebo:
      Is capable of robotically and heatingly expanding and tapping threads into top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
         in the directions of arrows 171a, 173a, and 173b (see FIG. 144).
6) It is another object of the new invention to provide a six-device-in-one robot-assembled arthritic-assisting noise-canceling friction-reducing dog-run-adaptable anti-wobbling gazebo, having
robot-assembled heat-expandable cold-contractable spiral-teeth 119.
Therefore, the six-device-in-one robot-assembled arthritic-assisting noise-canceling friction-reducing dog-run-adaptable anti-wobbling gazebo:
Is capable of robotically and speedily cutting through plastic connector material
to decrease production time, and
to increase production output
in the directions of arrows 171a, 173a, and 173b
(see FIG. 144).
7) It is yet another object of the new invention to provide a six-device-in-one robot-assembled arthritic-assisting noise-canceling friction-reducing dog-run-adaptable anti-wobbling gazebo, having
robot-assembled heat-expandable cold-contractable interlocking cones 120.
Therefore, the six-device-in-one robot-assembled arthritic-assisting noise-canceling friction-reducing dog-run-adaptable anti-wobbling gazebo:
a) Is capable of robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
in the directions of arrows 171a, 173a, and 173b
(see FIG. 144);
b) Is capable of expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
in the directions of arrows 171a, 173c, 173d, and 173e
(see FIG. 145); and
c) Is capable of eliminating the need for the usage of nuts and bolts
to robotically lessen the assembly time, and
to robotically lessen assembly cost
(see FIG. 146 (Prior Art), FIG. 155 (Prior Art), FIG. 162 (Prior Art), and FIG. 169 (Prior Art)).
8) It is still yet another object of the new invention to provide a six-device-in-one robot-assembled arthritic-assisting noise-canceling friction-reducing dog-run-adaptable anti-wobbling gazebo, having
robot-assembled heat-expandable cold-contractable interlocking spiral locks 121.
Therefore, the six-device-in-one robot-assembled arthritic-assisting noise-canceling friction-reducing dog-run-adaptable anti-wobbling gazebo:
a) Is capable of robotically and heatingly boring through top robot-assembled heat-expandable cold-contractable holes 113, central robot-assembled heat-expandable cold-contractable holes 124, upper robot-assembled heat-expandable cold-contractable holes 128, and lower robot-assembled heat-expandable cold-contractable holes 132
in the directions of arrows 171a, 173a, and 173b
(see FIG. 144); and
b) Is capable of expanding and locking when impacted by top robot-assembled automatically-flaring-and-shielding-rivet-tail injury-preventing hammer-shields 114, central robot-assembled automatically-flaring-and-shielding-cone-head injury-preventing hammer-shields 125, upper robot-assembled automatically-flaring-and-shielding-cone-head injury-preventing hammer-shields 129, and lower robot-assembled cone-shielding injury-preventing hammer-shields 133
in the directions of arrows 171a, 173c, 173d, and 173e
(see FIG. 145).
9) It is still yet an even further object of the new invention to provide a six-device-in-one robot-assembled arthritic-assisting noise-canceling friction-reducing dog-run-adaptable anti-wobbling gazebo, having
central robot-assembled automatically-flaring-and-shielding-cone-head injury-preventing hammer-shields 125.
Therefore, the six-device-in-one robot-assembled arthritic-assisting noise-canceling friction-reducing dog-run-adaptable anti-wobbling gazebo:
a) Is capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place
in the directions of arrows 174a, 174f, 174g, 174h, 174i, and 174j
(see FIG. 156, FIG. 157, FIG. 159, FIG. 160, and FIG. 161); and
b) Is capable of preventing injury by coving the robot-assembled heat-expandable cold-contractable interlocking cones 120.
10) It is still yet an even further object of the new invention to provide a six-device-in-one robot-assembled arthritic-assisting noise-canceling friction-reducing dog-run-adaptable anti-wobbling gazebo, having
upper robot-assembled automatically-flaring-and-shielding-cone-head injury-preventing hammer-shields 129.
Therefore, the six-device-in-one robot-assembled arthritic-assisting noise-canceling friction-reducing dog-run-adaptable anti-wobbling gazebo:
a) Is capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place; and
b) Is capable of preventing injury by coving the robot-assembled heat-expandable cold-contractable interlocking cones 120
in the directions of arrows 175a, 175f, 175g, 175h, 175i, and 175j
(see FIG. 163, FIG. 164, FIG. 165, FIG. 166, and FIG. 167).
11) It is still yet an even further object of the new invention to provide a six-device-in-one robot-assembled arthritic-assisting noise-canceling friction-reducing dog-run-adaptable anti-wobbling gazebo, having lower robot-assembled cone-shielding injury-preventing hammer-shields 133.

Therefore, the six-device-in-one robot-assembled arthritic-assisting noise-canceling friction-reducing dog-run-adaptable anti-wobbling gazebo:
   a) Is capable of automatically stopping robot-assembled heat-expandable cold-contractable anti-wobbling screws 117 allowing robot-assembled heat-expandable cold-contractable interlocking cones 120 and robot-assembled heat-expandable cold-contractable interlocking spiral locks 121 to expand and lock into place, and
   b) Is capable of preventing injury by coving the robot-assembled heat-expandable cold-contractable interlocking cones 120
      in the directions of arrows 176*a*, 176*f*, 176*g*, 176*h*, 176*i*, and 176*j*
      (see FIG. 170, FIG. 171, FIG. 172, FIG. 173, FIG. 174, FIG. 175, and FIG. 176).

12) It is still yet an even further object of the new invention to provide a six-device-in-one robot-assembled arthritic-assisting noise-canceling friction-reducing dog-run-adaptable anti-wobbling gazebo, having
lower robot-assembled arthritic-assisting height-adjusting dog-run-panel-rope hooks 134.

Therefore, the six-device-in-one robot-assembled arthritic-assisting noise-canceling friction-reducing dog-run-adaptable anti-wobbling gazebo:
   a) Is capable of allowing an arthritic to deploy and retract the six-device-in-one robot-assembled arthritic-assisting noise-canceling friction-reducing dog-run-adaptable anti-wobbling gazebo without the need to close the hand
      in the directions of arrows 177*a*, 177*b*, 177*c*, 177*d*, 177*e*, and 177*f*
      (see FIG. 178, FIG. 179, and FIG. 180); and
   b) Is capable of attaching a rope or strap to support a dog run
      in the direction of arrow 178
      (see FIG. 181).

13) It is still yet an even further object of the new invention to provide a six-device-in-one robot-assembled arthritic-assisting noise-canceling friction-reducing dog-run-adaptable anti-wobbling gazebo, having
sleeve robot-assembled post-centering clamps 143.

Therefore, the six-device-in-one robot-assembled arthritic-assisting noise-canceling friction-reducing dog-run-adaptable anti-wobbling gazebo:
   Is capable of centering dog-run-adaptable anti-wobbling foldable lower posts 107 within dog-run-adaptable anti-wobbling foldable upper posts 106.

14) It is still yet an even further object of the new invention to provide a six-device-in-one robot-assembled arthritic-assisting noise-canceling friction-reducing dog-run-adaptable anti-wobbling gazebo, having
sleeve robot-assembled tick-preventing downward teeth 144.

Therefore, the six-device-in-one robot-assembled arthritic-assisting noise-canceling friction-reducing dog-run-adaptable anti-wobbling gazebo:
   Is capable of preventing ticks from getting inside dog-run-adaptable anti-wobbling foldable upper posts 106.

15) It is still yet an even further object of the new invention to provide a six-device-in-one robot-assembled arthritic-assisting noise-canceling friction-reducing dog-run-adaptable anti-wobbling gazebo, having
sleeve robot-assembled water-discharging grooves 145.

Therefore, the six-device-in-one robot-assembled arthritic-assisting noise-canceling friction-reducing dog-run-adaptable anti-wobbling gazebo:
   Is capable of allowing water to discharge out of dog-run-adaptable anti-wobbling foldable upper posts 106
      in the directions of arrows 181*a* and 181*b*
      (see FIG. 188).

16) It is still yet an even further object of the new invention to provide a six-device-in-one robot-assembled arthritic-assisting noise-canceling friction-reducing dog-run-adaptable anti-wobbling gazebo, having
sleeve robot-assembled arthritic-assisting height-adjusting dog-run-panel-rope hooks 146.

Figure 193:
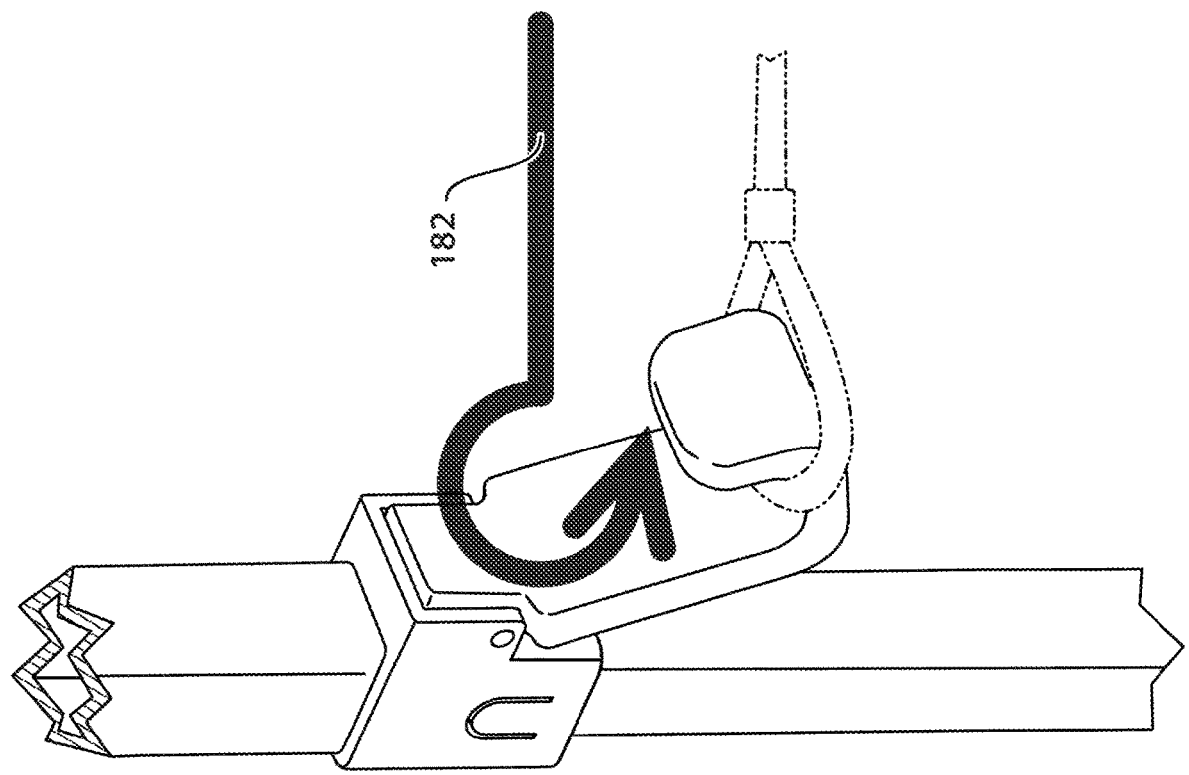
Figure 194:
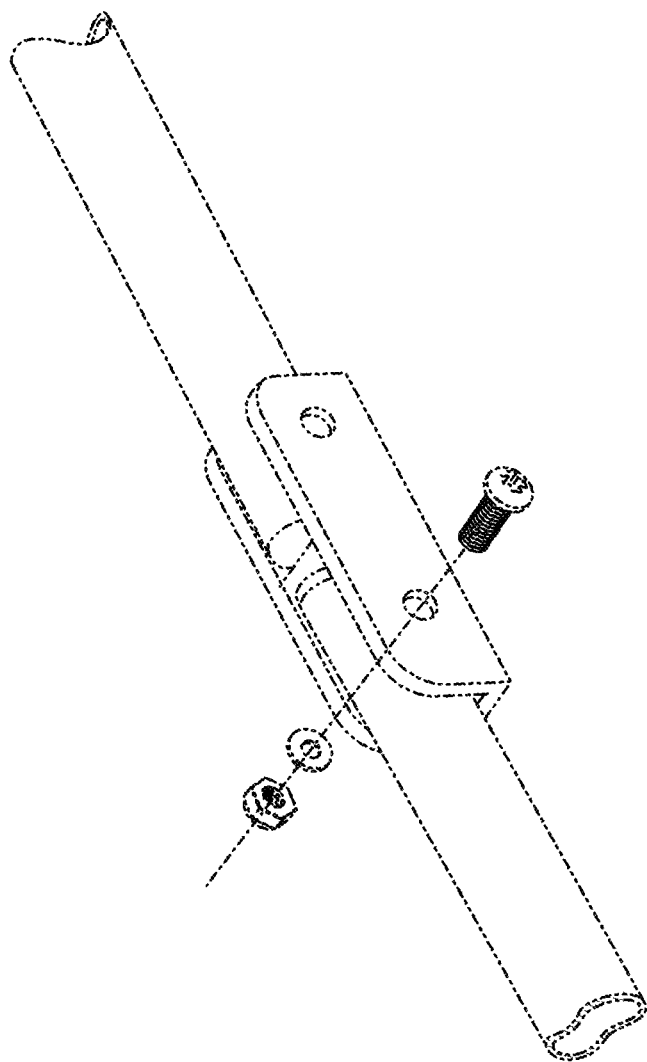
FIG. 194 (Prior Art) illustrates a perspective view of prior art demonstrating how screws, washers and nuts are used for assembly.
Figure 195:
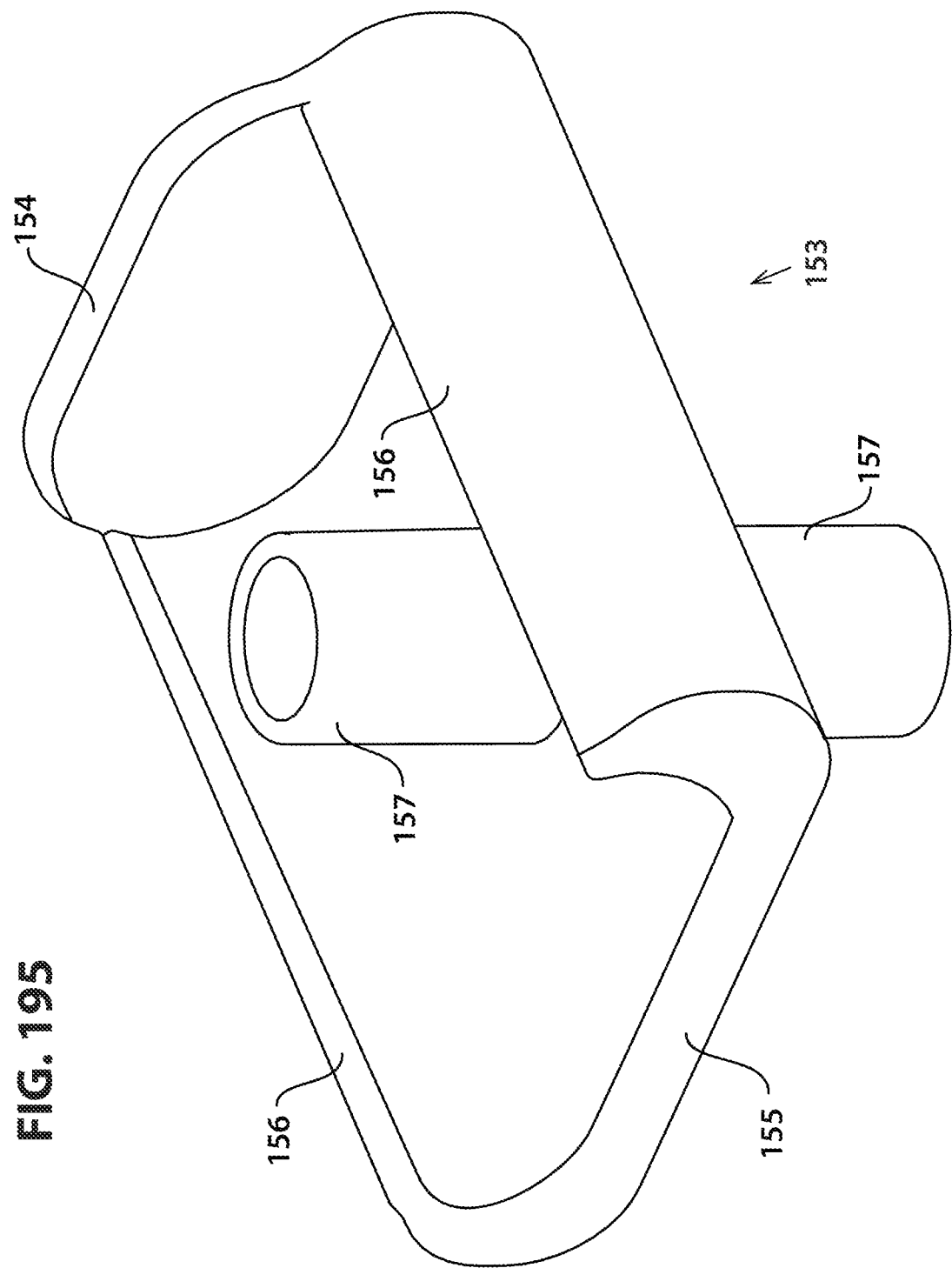
FIG. 195 and FIG. 196 illustrate perspective views of robot-assembled noise-canceling injury-preventing rust-preventing truss-centering cover-cushion system.
Figure 196:
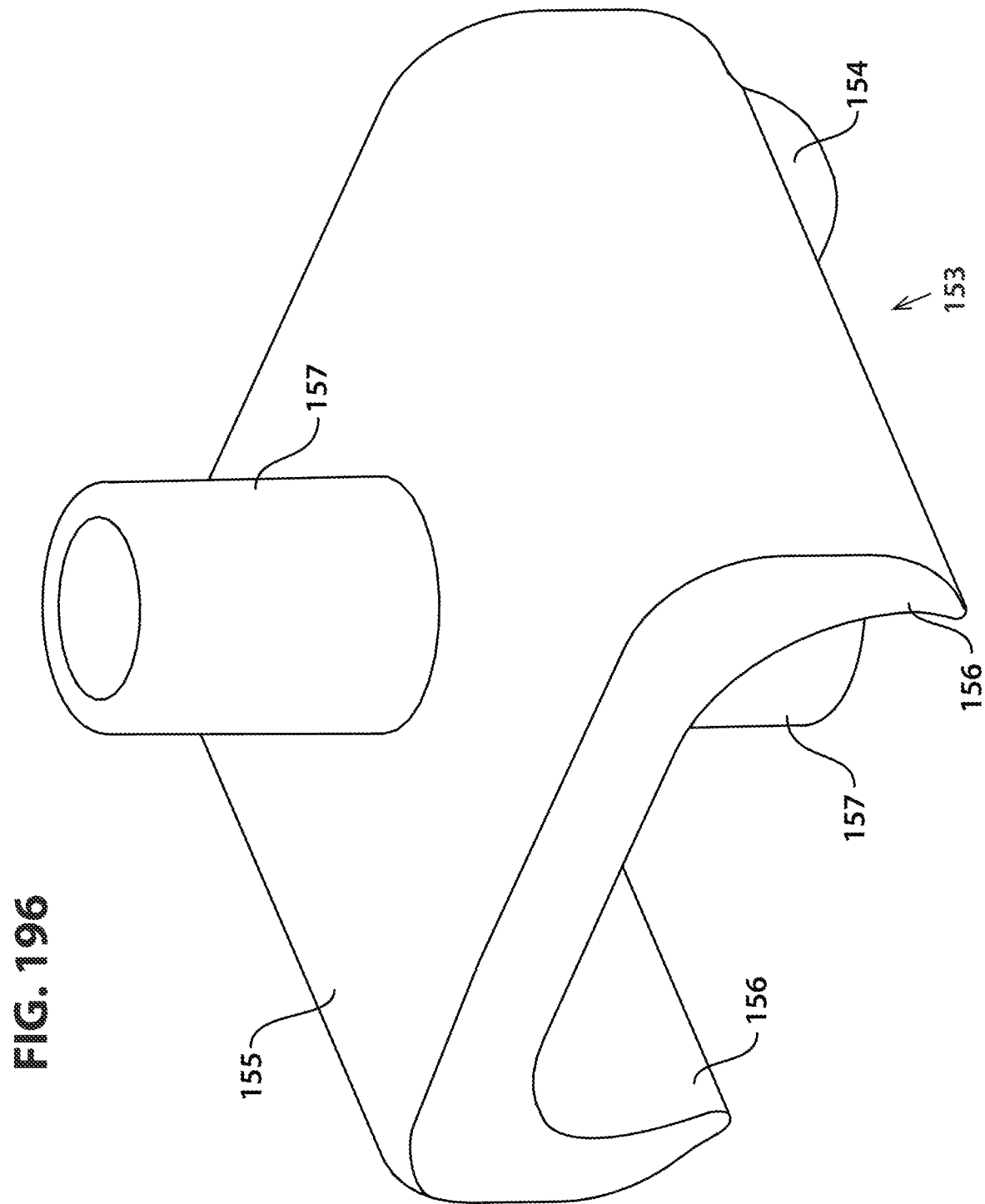

Therefore, the six-device-in-one robot-assembled arthritic-assisting noise-canceling friction-reducing dog-run-adaptable anti-wobbling gazebo:
   a) Is capable of allowing an arthritic to deploy and retract the six-device-in-one robot-assembled arthritic-assisting noise-canceling friction-reducing dog-run-adaptable anti-wobbling gazebo without bending the fingers
      (see FIG. 191); and
   b) Is capable of attaching a rope or strap to support a dog run
      in the direction of arrow 182
      (see FIG. 193).

17) It is still yet an even further object of the new invention to provide a six-device-in-one robot-assembled arthritic-assisting noise-canceling friction-reducing dog-run-adaptable anti-wobbling gazebo, having
robot-assembled rust-preventing truss-end covers 154.

Therefore, the six-device-in-one robot-assembled arthritic-assisting noise-canceling friction-reducing dog-run-adaptable anti-wobbling gazebo:
   a) Is capable of eliminating the need for nuts and bolts
      to save manufacturing cost,
      to save manufacturing time,
      to save end-user assembly time, and
      to increase overall production output;
   b) Is capable of eliminating the need for washers
      to save manufacturing cost,
      to save manufacturing time,
      to save end-user assembly time, and
      to increase overall production output;
   c) Is capable of eliminating the need for 50 truss-end-plugs, from prior art
      to save manufacturing cost,
      to save manufacturing time,
      to save end-user assembly time, and
      to increase overall production output;
   d) Is capable of preventing water and insects from entering into dog-run-adaptable anti-wobbling foldable corner trusses 104; and
   e) Is capable of preventing injury by covering sharp metal edges.

18) It is still yet an even further object of the new invention to provide a six-device-in-one robot-assembled arthritic-assisting noise-canceling friction-reducing dog-run-adaptable anti-wobbling gazebo, having
robot-assembled heat-expandable cold-contractable double-tail cover-cushion rivets 157.

Figure 197:
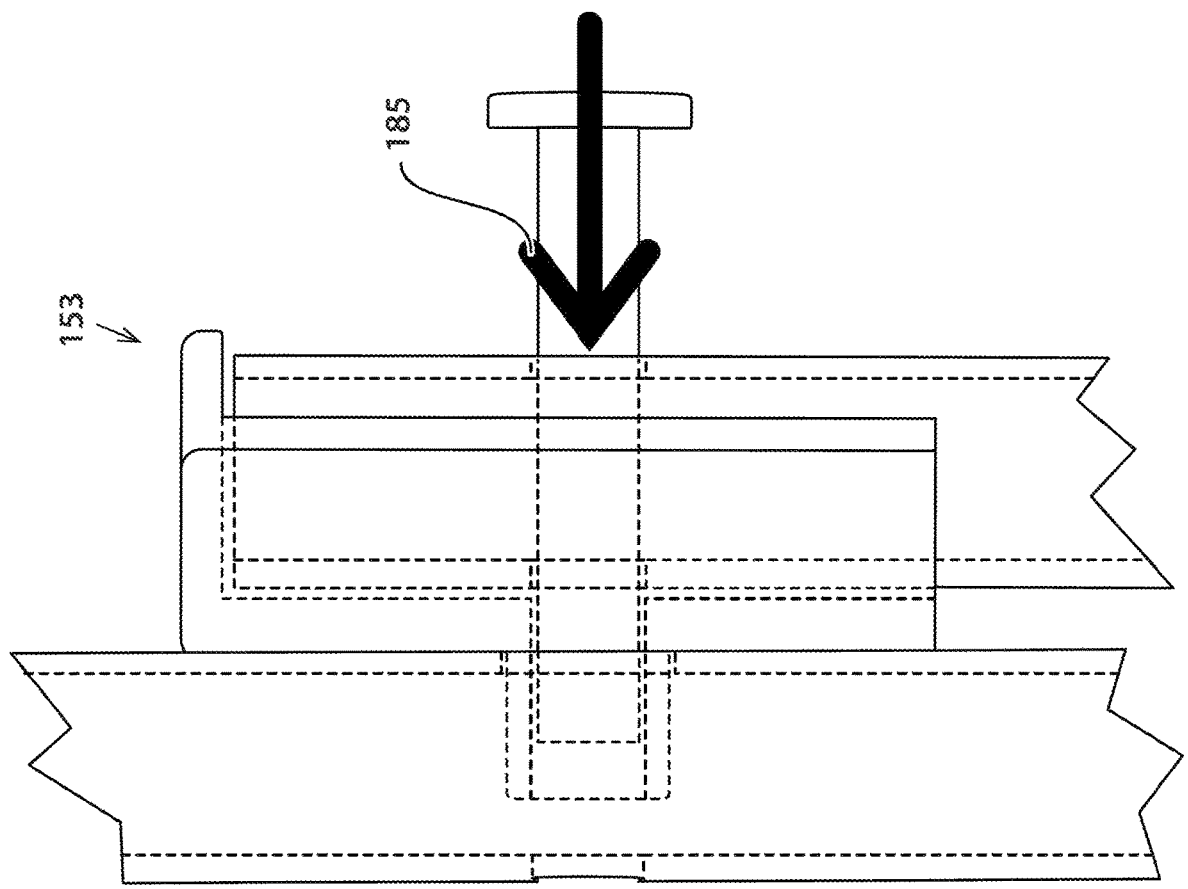
FIG. 197, FIG. 198, and FIG. 199 illustrate cross-sectional views demonstrating how robot-assembled heat-expandable cold-contractable double-tail cover-cushion rivets are inserted through robot-assembled noise-canceling injury-preventing rust-preventing truss-centering cover-cushion system and dog-run-adaptable anti-wobbling foldable top trusses to connect the components together.
Figure 198:
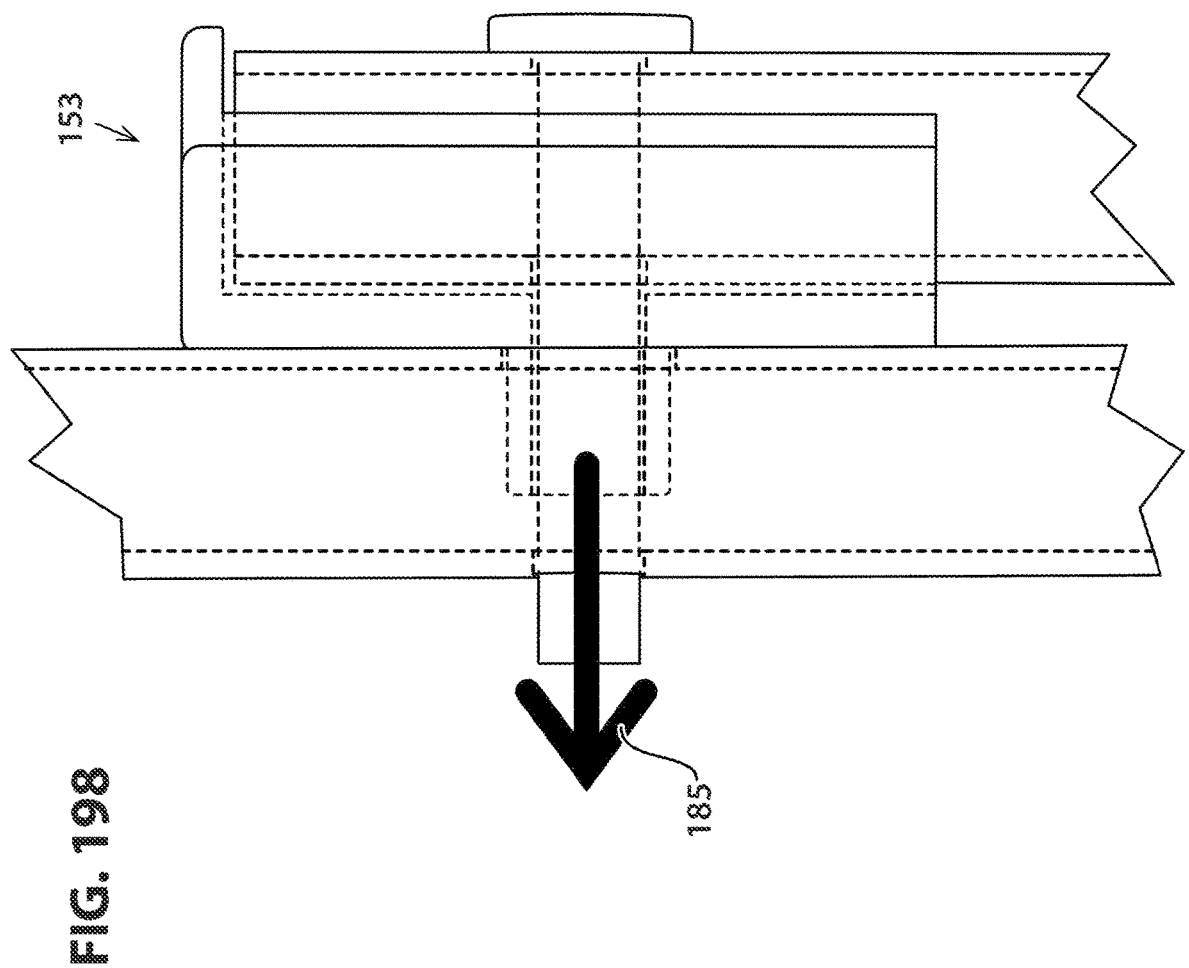
Figure 199:
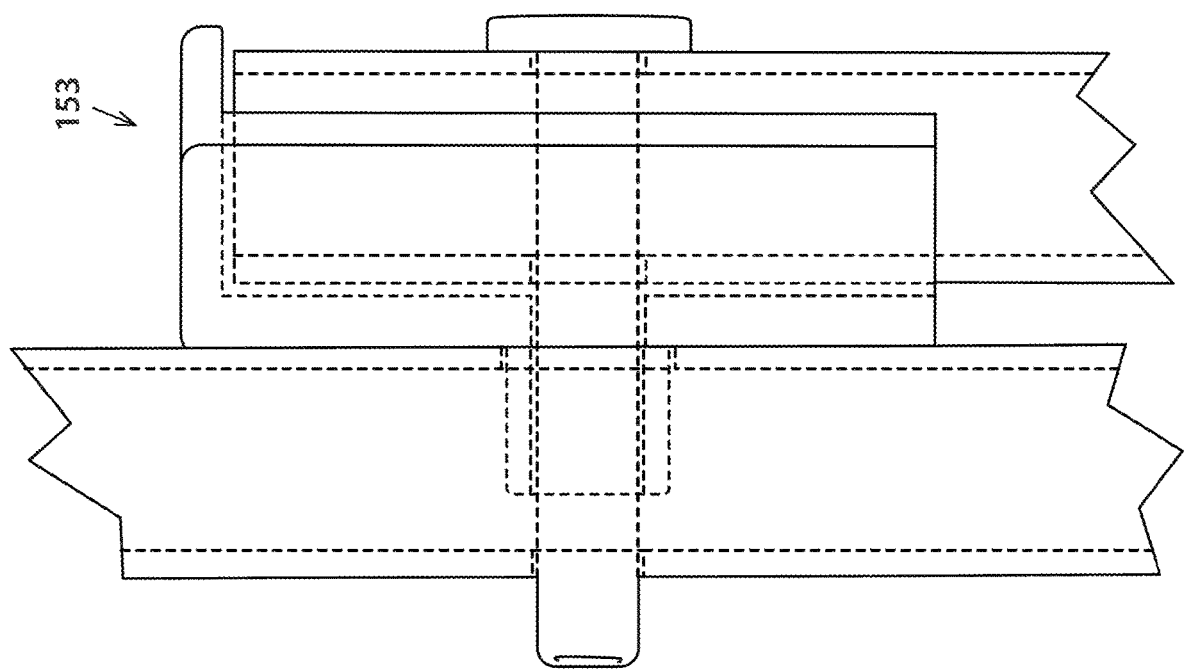
Figure 200:
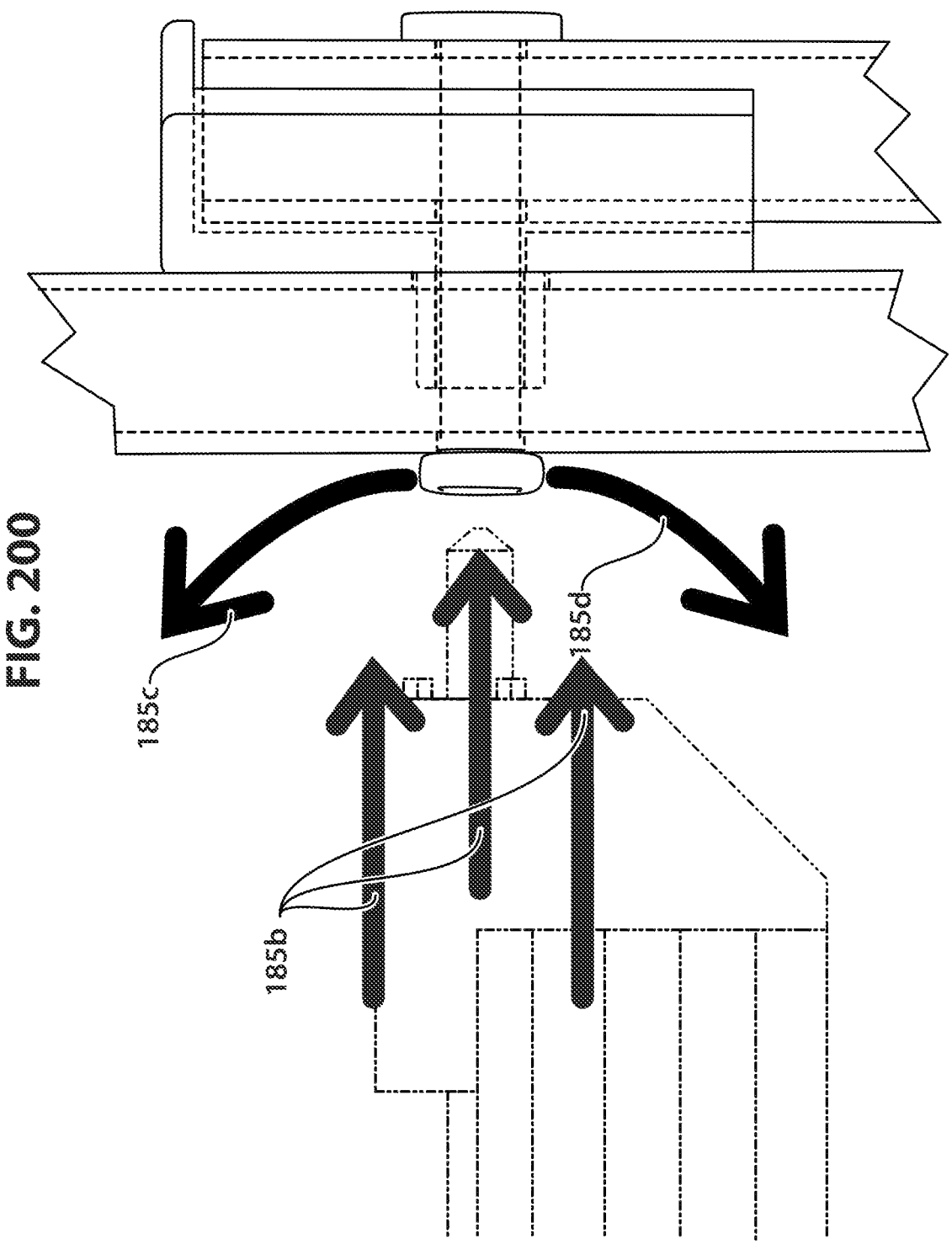
FIG. 200, FIG. 201, and FIG. 202 illustrate cross-sectional and perspective views demonstrating how robot-assembled noise-canceling injury-preventing rust-preventing truss-centering cover-cushion system is robotically installed, heat-pressing the robot-assembled heat-expandable cold-contractable double-tail cover-cushion rivets to lock them in place without the need for nuts, bolts, or washers.
Figure 201:
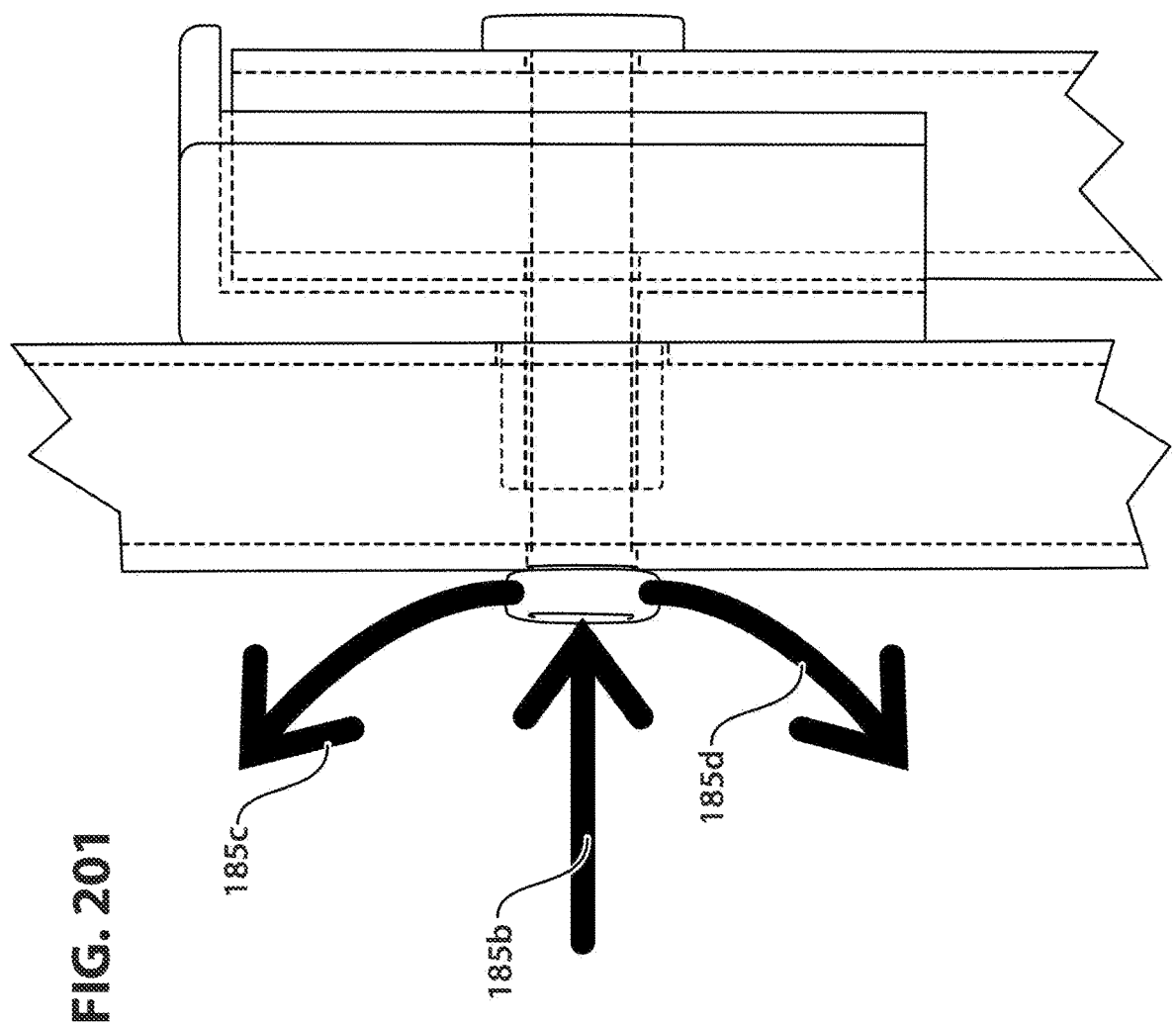
Figure 202:
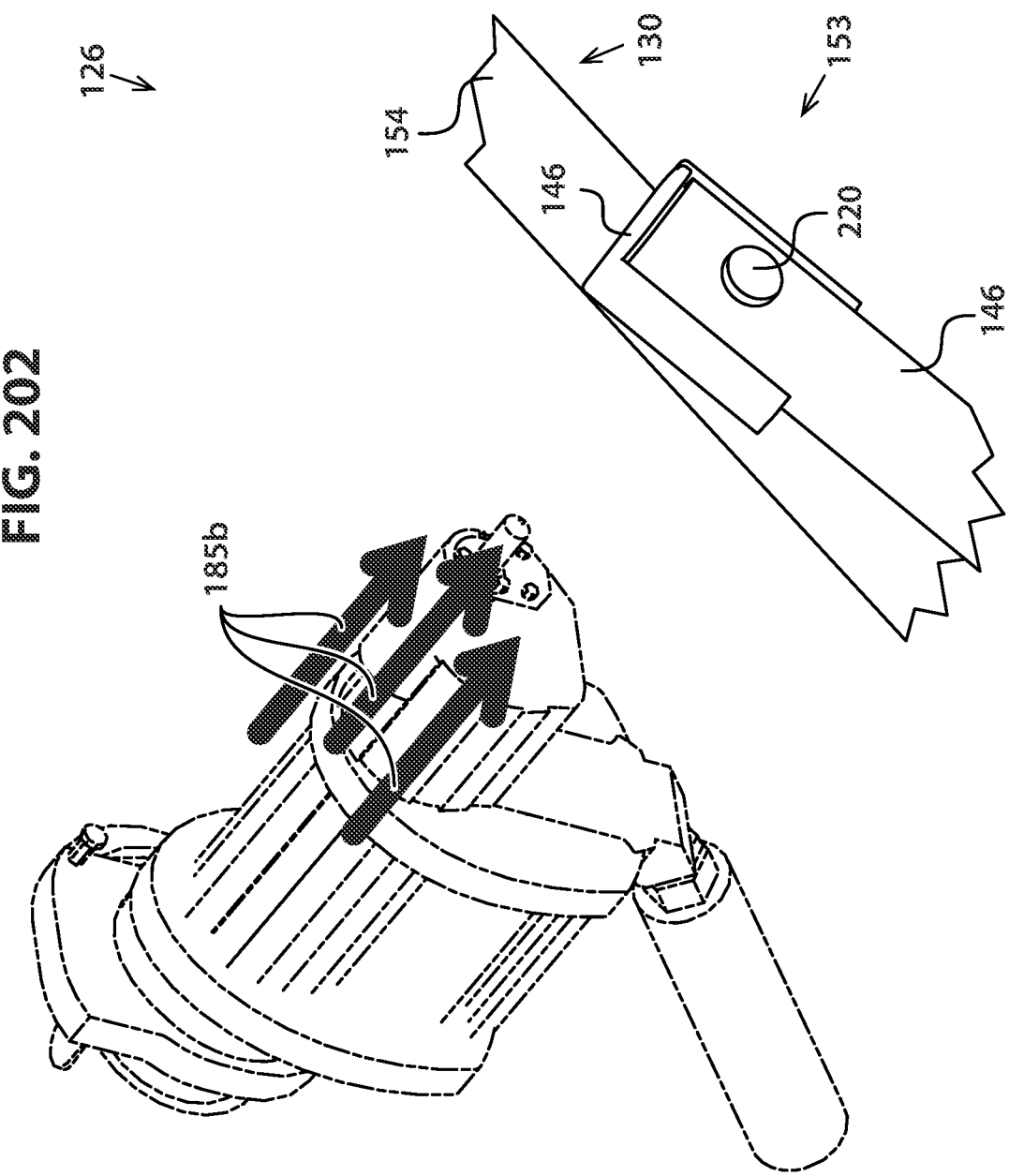
Figure 203:
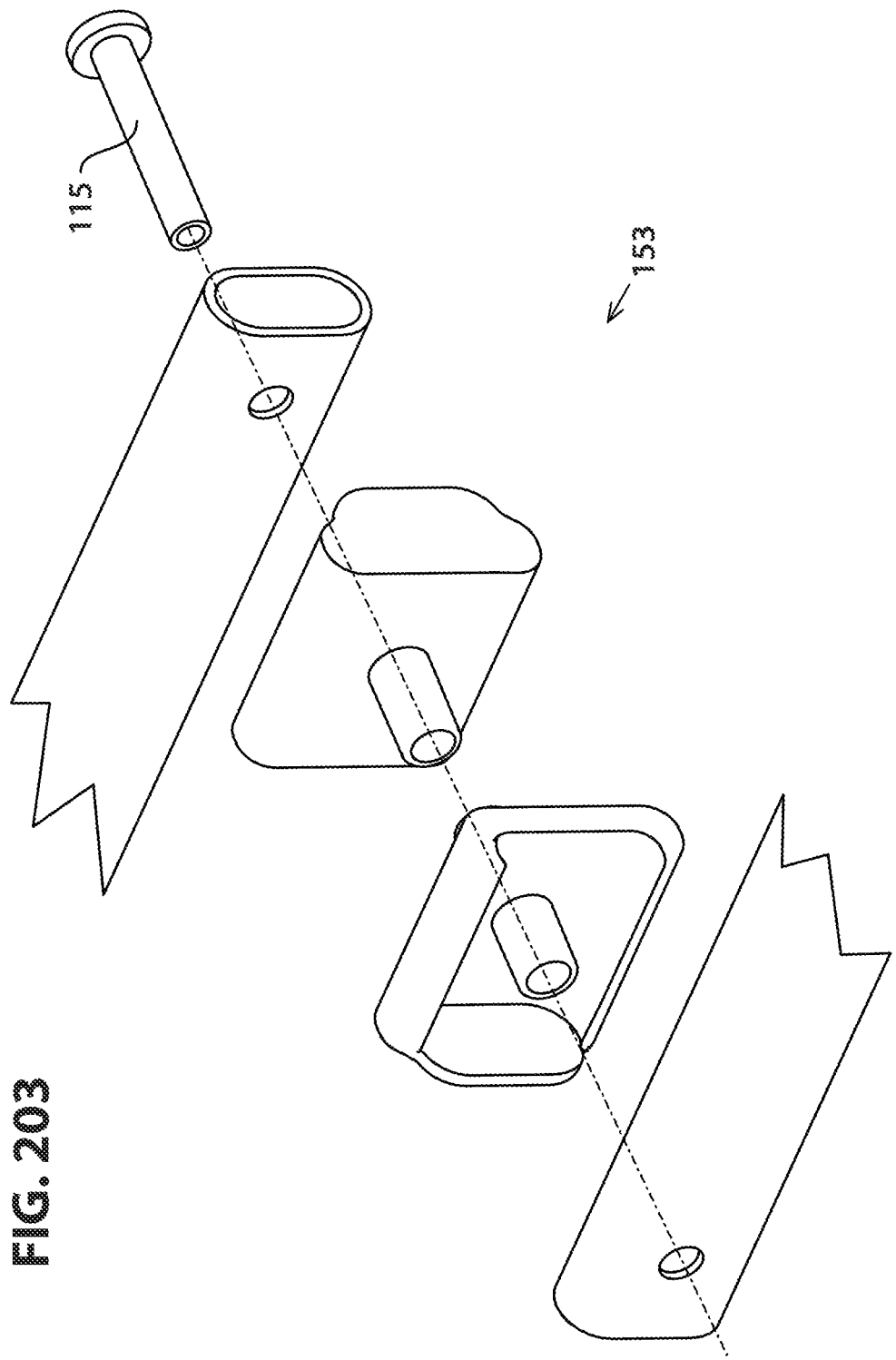
FIG. 203, FIG. 204, FIG. 205, and FIG. 206 illustrate perspective and cross-sectional views demonstrating the robotic assembly of robot-assembled arthritic-assisting noise-canceling injury-preventing rust-preventing truss-centering cup-cushion system.
Figure 204:
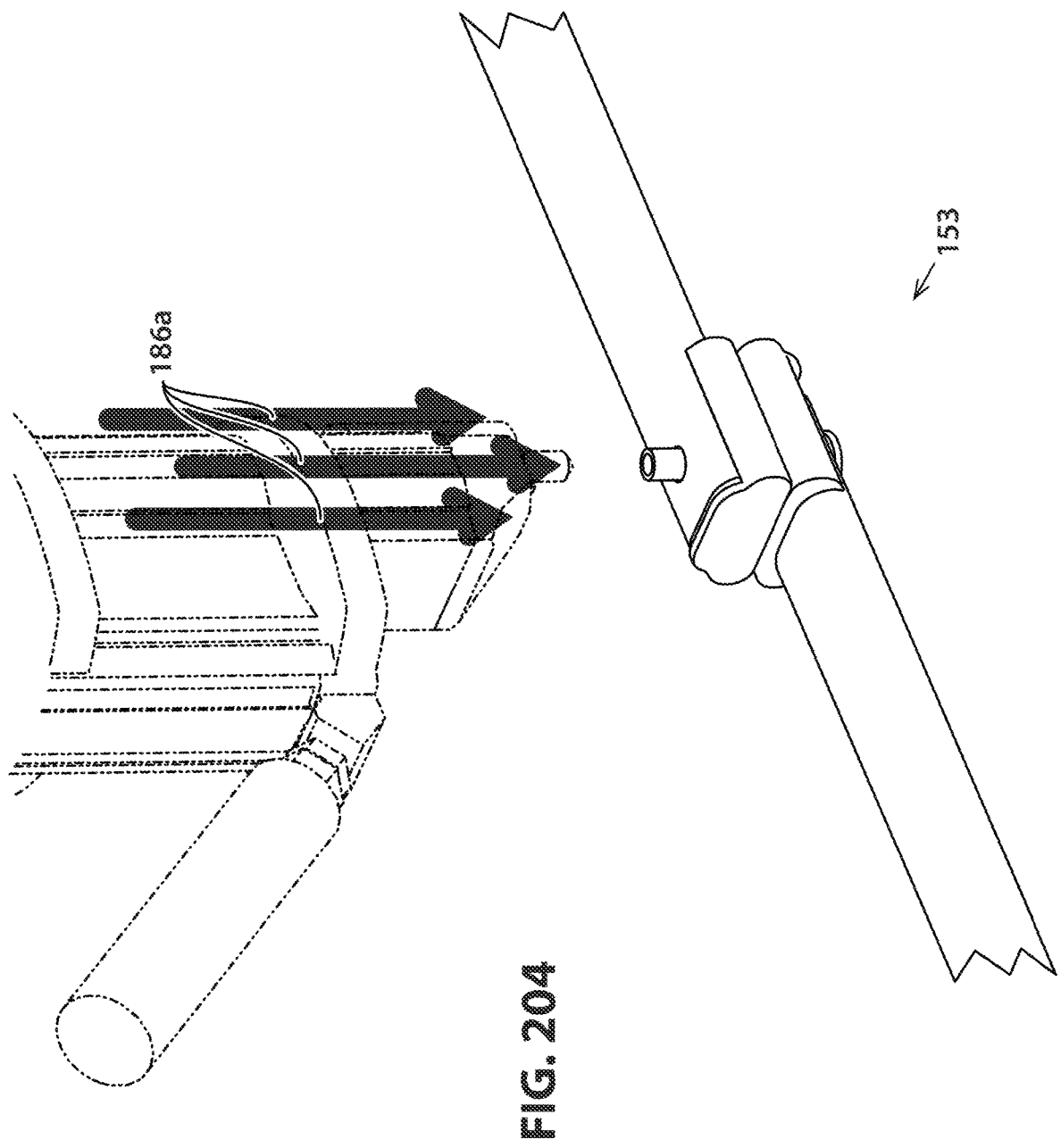
Figure 205:
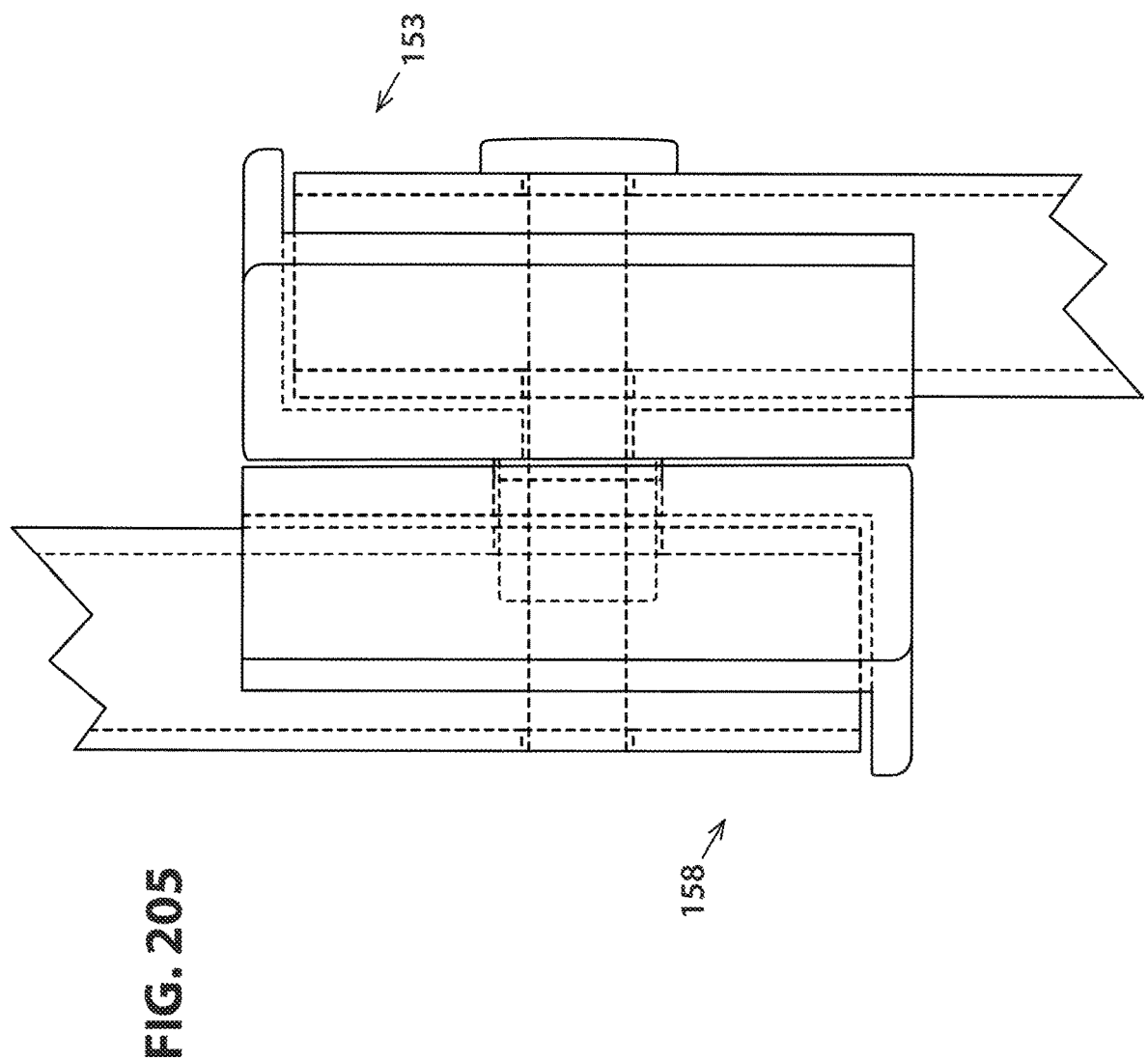
Figure 206:
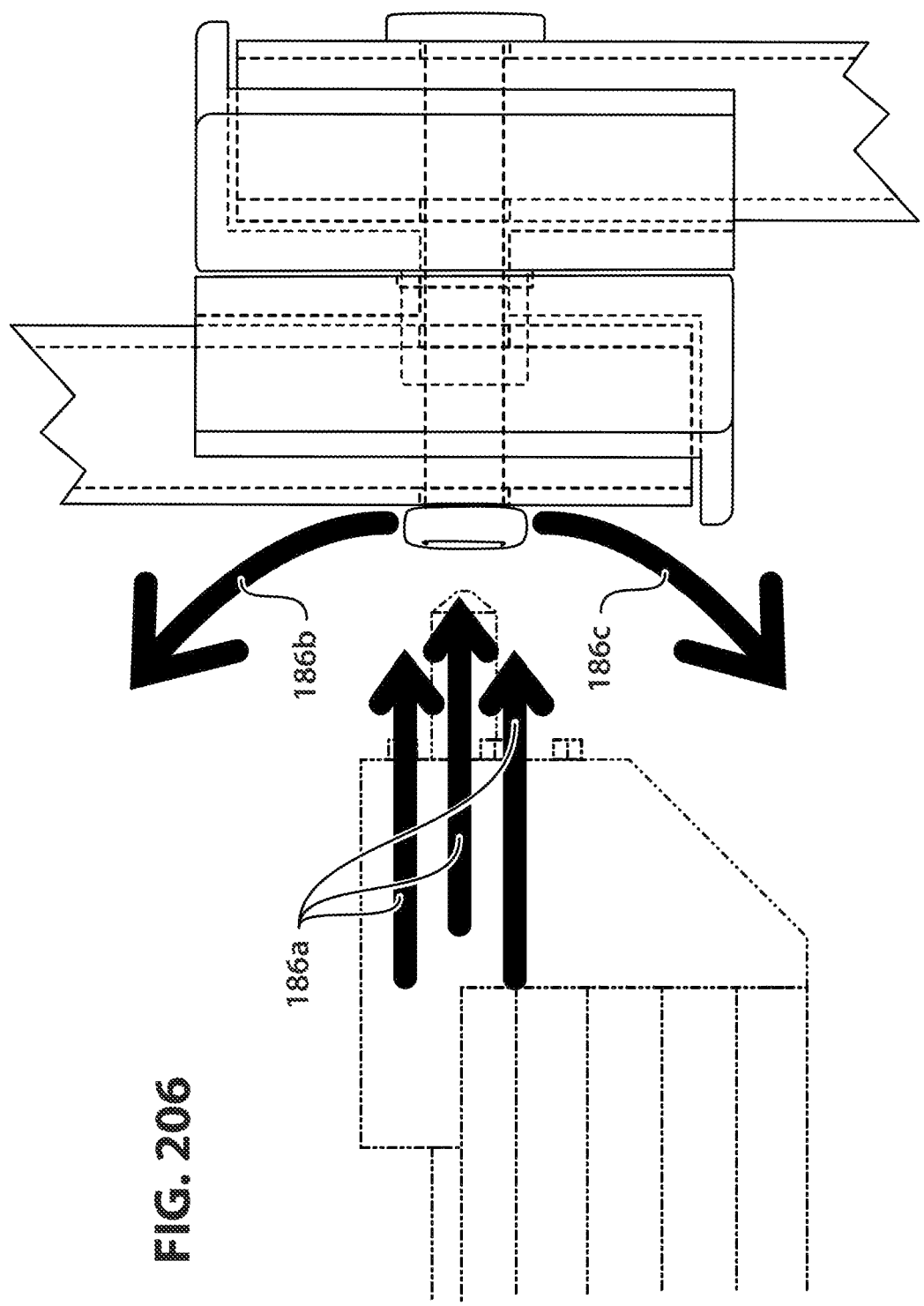
Figure 207:
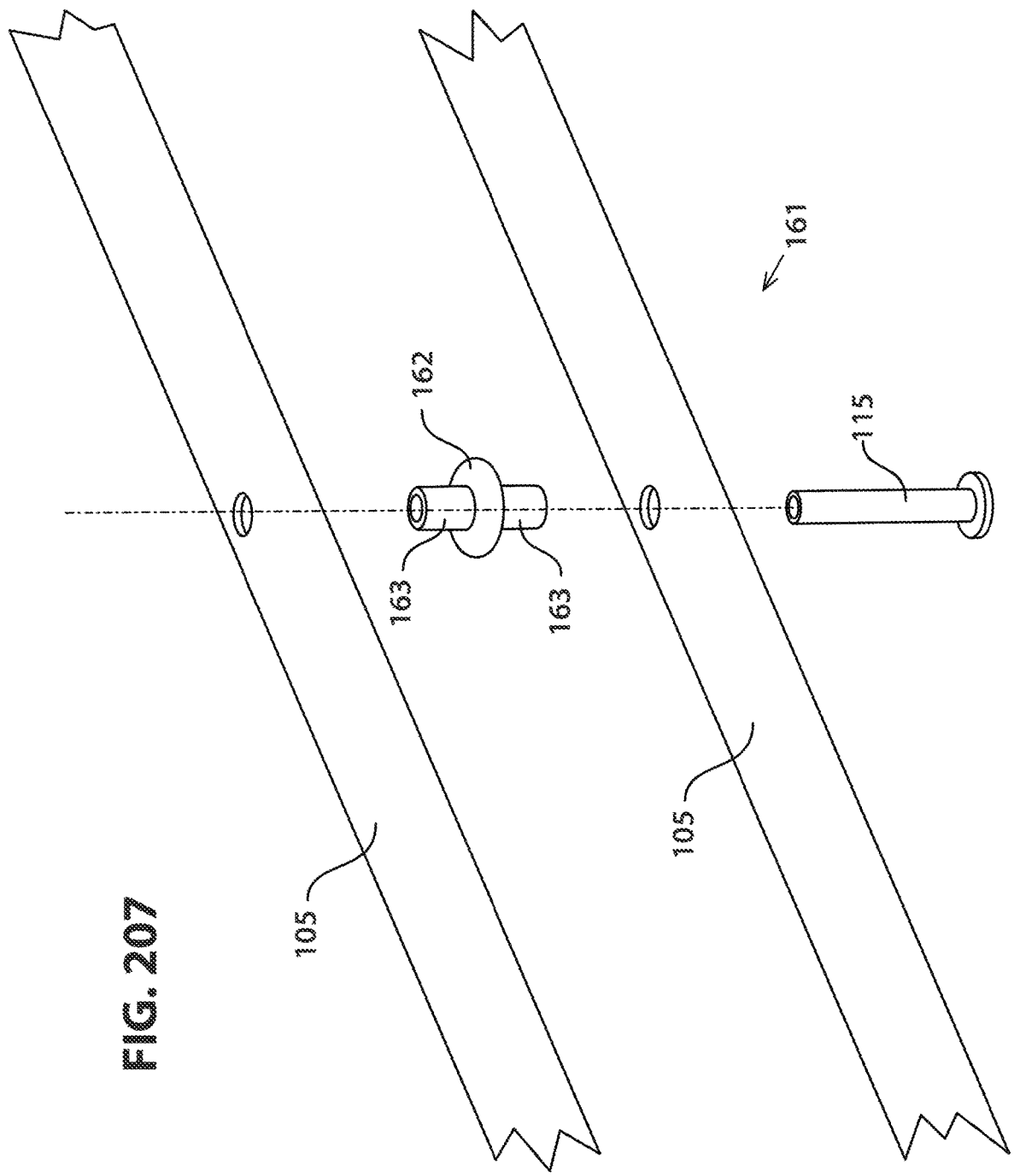
Figure 208:
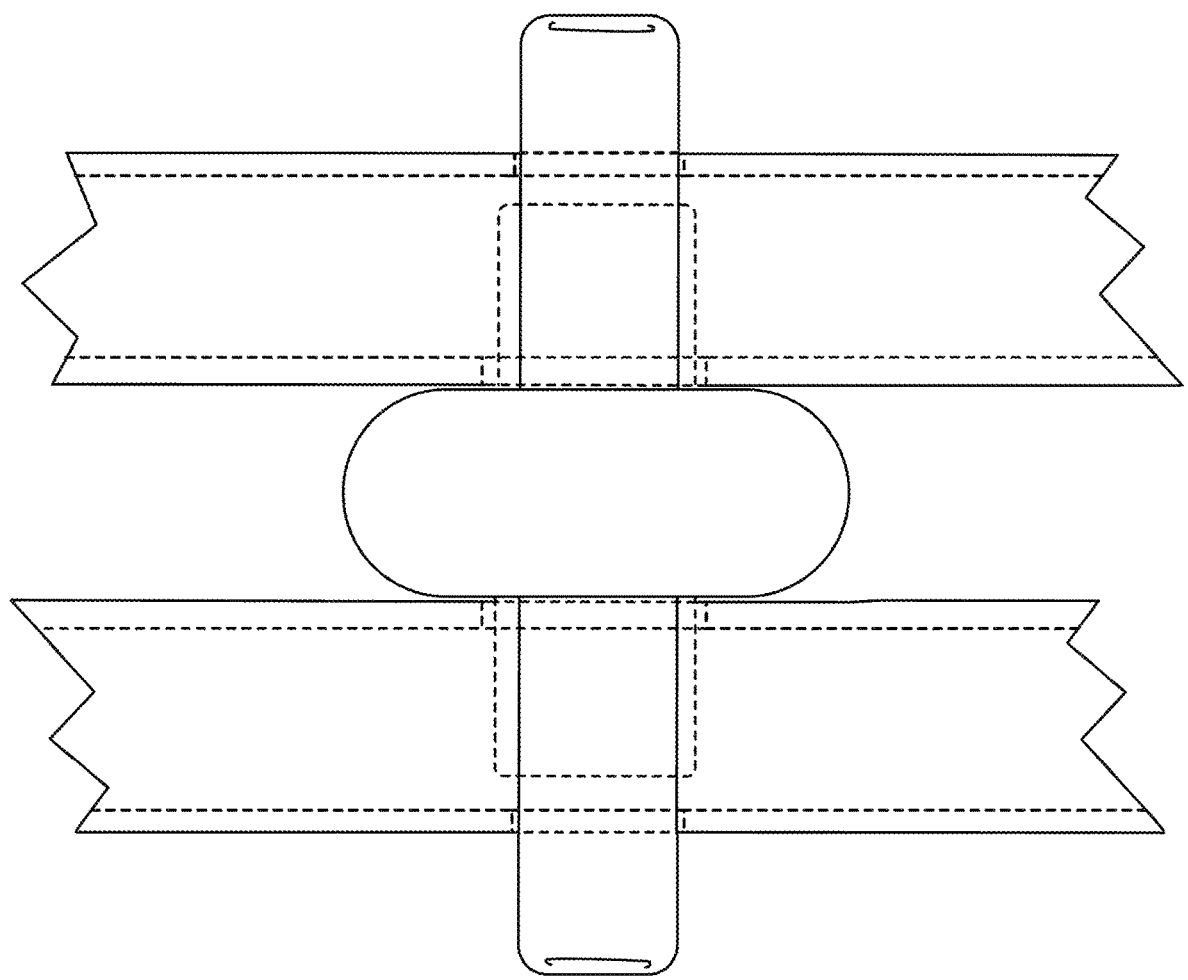
Figure 209:
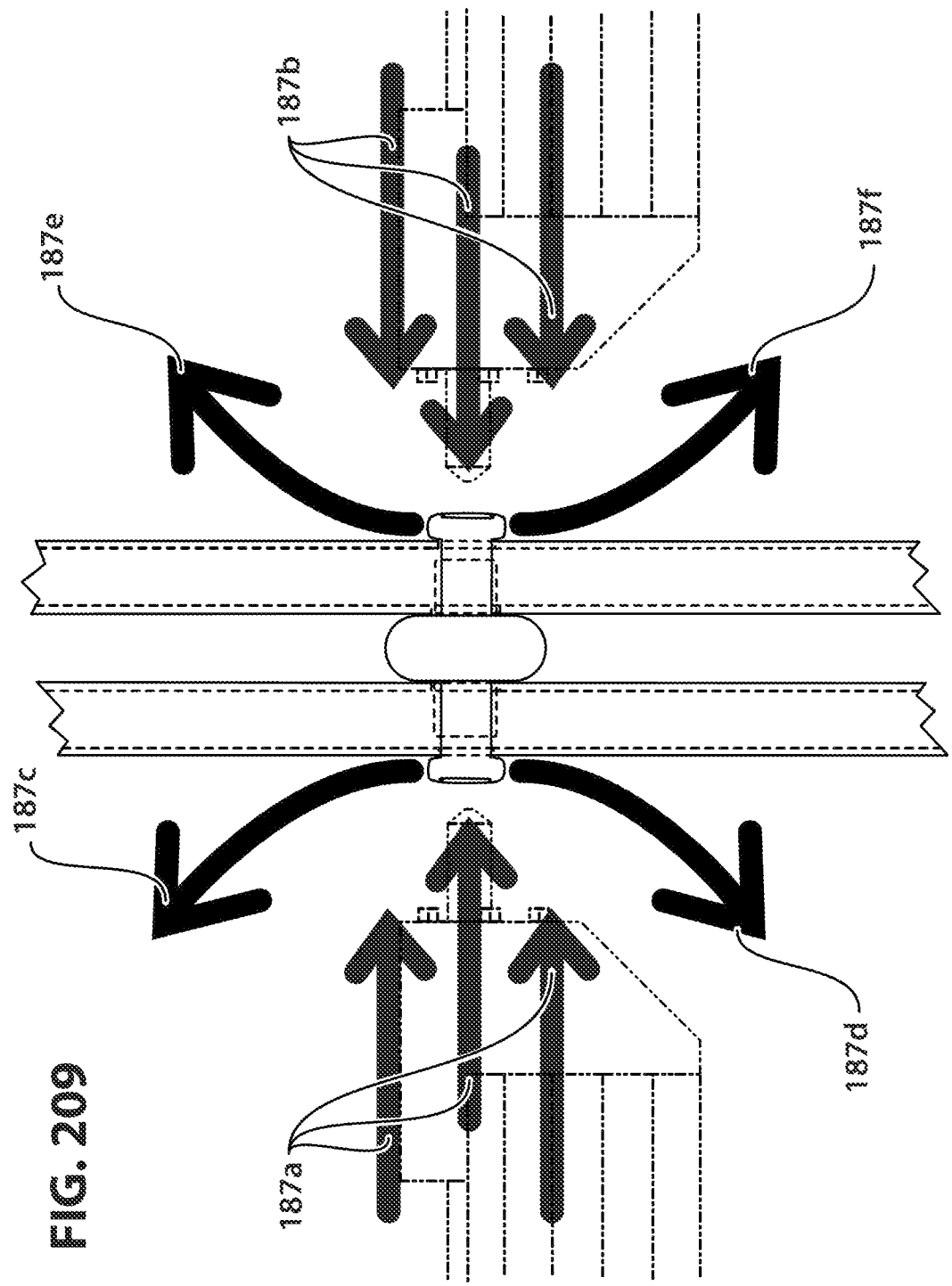
Figure 212:
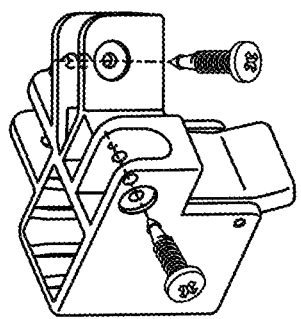
FIG. 211, FIG. 212, FIG. 213, FIG. 214, FIG. 215, FIG. 216, and FIG. 217 illustrate perspective and cross-sectional views of equivalent variations of robot-assembled arthritic-assisting injury-preventing cone-shielding lower intersector system.
Figure 214:
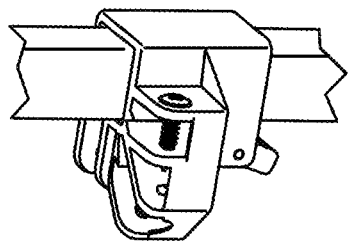
Figure 211:
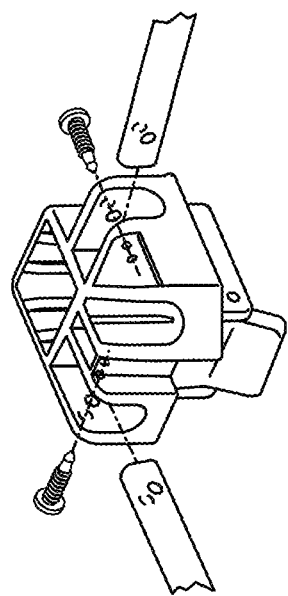
Figure 213:
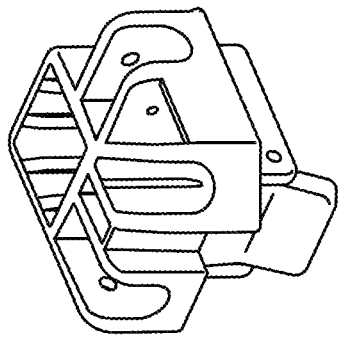
Figure 215:
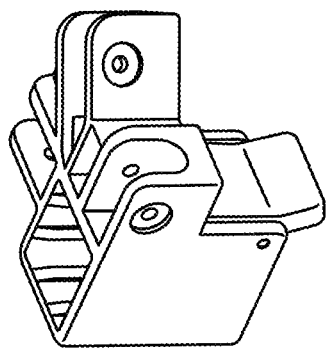
Figure 216:
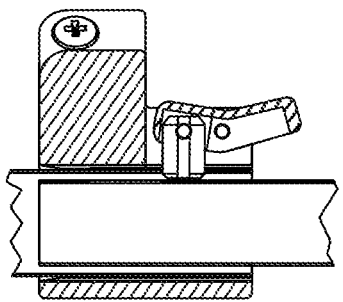
Figure 217:
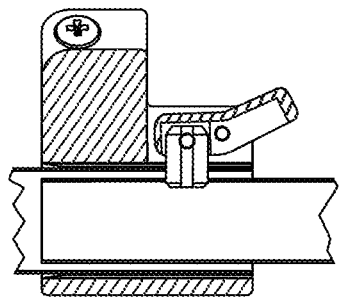

Therefore, the six-device-in-one robot-assembled arthritic-assisting noise-canceling friction-reducing dog-run-adaptable anti-wobbling gazebo:

a) Is capable of decreasing assembly man hours by being robotically factory-installed;
b) Is capable of decreasing end-user assembly time by being robotically factory-installed;
c) Is capable of eliminating need for washers;
d) Is capable of creating a locking ridge when robotically heat-stamped eliminating need for nuts and bolts
in the directions of arrows 185*a*, 185*b*, 185*c*, and 185*d*
(see FIG. 197, FIG. 198, and FIG. 199); and
e) Is capable of creating a locking ridge when robotically heat-stamped securely and pivotably locking two dog-run-adaptable anti-wobbling foldable side trusses 105 together
in the directions of arrows 185*a*, 185*b*, 185*c*, and 185*d*
(see FIG. 197, FIG. 198, and FIG. 199).

19) It is still yet an even further object of the new invention to provide a six-device-in-one robot-assembled arthritic-assisting noise-canceling friction-reducing dog-run-adaptable anti-wobbling gazebo, having robot-assembled noise-canceling cup-cushion 159.
Therefore, the six-device-in-one robot-assembled arthritic-assisting noise-canceling friction-reducing dog-run-adaptable anti-wobbling gazebo:
a) Is capable of eliminating the need for nuts and bolts
to save manufacturing cost,
to save manufacturing time,
to save end-user assembly time, and
to increase overall production output
in the directions of arrows 186*a*, 186*b*, and 186*c*
(see FIG. 203, FIG. 204, FIG. 205, and FIG. 206);
b) Is capable of eliminating the need for washers
to save manufacturing cost,
to save manufacturing time,
to save end-user assembly time, and
to increase overall production output
in the directions of arrows 186*a*, 186*b*, and 186*c*
(see FIG. 203, FIG. 204, FIG. 205, and FIG. 206);
c) Is capable of eliminating the need for 50 truss-end-plugs, from prior art
to save manufacturing cost,
to save manufacturing time,
to save end-user assembly time, and
to increase overall production output
in the directions of arrows 186*a*, 186*b*, and 186*c*
(see FIG. 203, FIG. 204, FIG. 205, and FIG. 206);
d) Is capable of preventing water and insects from entering into dog-run-adaptable anti-wobbling foldable corner trusses 104; and
e) Is capable of preventing injury by covering sharp metal edges.

20) It is still yet an even further object of the new invention to provide a six-device-in-one robot-assembled arthritic-assisting noise-canceling friction-reducing dog-run-adaptable anti-wobbling gazebo, having robot-assembled noise-canceling circular-cushion 162.
Therefore, the six-device-in-one robot-assembled arthritic-assisting noise-canceling friction-reducing dog-run-adaptable anti-wobbling gazebo:
a) Is capable of providing a washer between two dog-run-adaptable anti-wobbling foldable side trusses 105;
b) Is not capable of pivotably connecting two dog-run-adaptable anti-wobbling foldable side trusses 105 together;
c) Is capable of eliminating the need for nuts and bolts
to save manufacturing cost,
to save manufacturing time,
to save end-user assembly time, and
to increase overall production output
in the directions of arrows 187*a*, 187*b*, 187*c*, 187*d*, 187*e*, and 186*f*
(see FIG. 207, FIG. 208, FIG. 209, and FIG. 210); and
d) Is capable of eliminating the need for washers
to save manufacturing cost,
to save manufacturing time,
to save end-user assembly time, and
to increase overall production output
in the directions of arrows 187*a*, 187*b*, 187*c*, 187*d*, 187*e*, and 186*f*
(see FIG. 207, FIG. 208, FIG. 209, and FIG. 210).

21) It is still yet an even further object of the new invention to provide a six-device-in-one robot-assembled arthritic-assisting noise-canceling friction-reducing dog-run-adaptable anti-wobbling gazebo, having robot-assembled double-tail built-in circular-cushion rivets 163.
Therefore, the six-device-in-one robot-assembled arthritic-assisting noise-canceling friction-reducing dog-run-adaptable anti-wobbling gazebo:
a) Is capable of pivotably connecting two dog-run-adaptable anti-wobbling foldable side trusses 105 together;
b) Is capable of being robotically installed to lessen the assembly man hours
in the directions of arrows 187*a*, 187*b*, 187*c*, 187*d*, 187*e*, and 186*f*
(see FIG. 207, FIG. 208, FIG. 209, and FIG. 210);
c) Is capable of being robotically installed to lessen end-user assembly time
in the directions of arrows 187*a*, 187*b*, 187*c*, 187*d*, 187*e*, and 186*f*
(see FIG. 207, FIG. 208, FIG. 209, and FIG. 210); and
d) Is capable of being robotically heat-stamped automatically creating a locking ridge eliminating the need for nuts
in the directions of arrows 187*a*, 187*b*, 187*c*, 187*d*, 187*e*, and 186*f*
(see FIG. 207, FIG. 208, FIG. 209, and FIG. 210).

What is claimed is:
1. A six-device-in-one robot-assembled arthritic-assisting noise-canceling friction-reducing dog-run-adaptable anti-wobbling gazebo, comprising:
an adjustable canopy
for protecting occupants and property users from weather elements,
for functioning as a greenhouse,
for functioning as a cover for a dog-run,
for functioning as a surface for an advertisement sign,
for functioning as an awning cover, and
for functioning as ceiling-mounted overhead storage;
a plurality of dog-run-adaptable anti-wobbling foldable top trusses,
said adjustable canopy secured over said dog-run-adaptable anti-wobbling foldable top trusses;
a plurality of dog-run-adaptable anti-wobbling foldable corner trusses
robotically pivotably attached to said dog-run-adaptable anti-wobbling foldable top trusses;

a plurality of dog-run-adaptable anti-wobbling foldable side trusses;

a plurality of dog-run-adaptable anti-wobbling foldable upper posts;

a plurality of dog-run-adaptable anti-wobbling foldable lower posts
- slidably inserted within said dog-run-adaptable anti-wobbling foldable upper posts
  - for foldably and slidably raising and lowering
    - to increase and decrease height of said six-device-in-one robot-assembled arthritic-assisting noise-canceling friction-reducing dog-run-adaptable anti-wobbling gazebo, and
  - for supporting sidewalls of dog-run;

a plurality of dog-run-adaptable anti-wobbling arthritic-assisting feet
- robotically welded to said dog-run-adaptable anti-wobbling foldable lower posts;

a plurality of dog-run-adaptable anti-wobbling arthritic-assisting foot holes
- robotically drilled into said dog-run-adaptable anti-wobbling arthritic-assisting feet
  - for securing a rope or cord for supporting a dog-run, and
  - for securing said six-device-in-one robot-assembled arthritic-assisting noise-canceling friction-reducing dog-run-adaptable anti-wobbling gazebo to ground with a spike;

a plurality of truss holes
- robotically drilled into said foldable top trusses, said foldable corner trusses, and said foldable side trusses;

a plurality of robot-assembled heat-expandable cold-contractable anti-wobbling screws
- robotically heated up to expand and inserted into said top robot-assembled heat-expandable cold-contractable holes
  - for saving manufacturing time by eliminating need for nuts and bolts,
  - for saving manufacturing man-hours by robotically manufacturing,
  - for saving end-consumer assembly time by robotically pre-installing robot-assembled heat-expandable cold-contractable anti-wobbling screws, at factories, and
  - for increasing overall production output of said six-device-in-one robot-assembled arthritic-assisting noise-canceling friction-reducing dog-run-adaptable anti-wobbling gazebo by robotically decreasing production time;

a plurality of robot-assembled heat-expandable cold-contractable spirally-threading spiral saws
- formed to said robot-assembled heat-expandable cold-contractable anti-wobbling screws;

a plurality of robot-assembled heat-expandable cold-contractable spiral-teeth
- formed to said robot-assembled heat-expandable cold-contractable spirally-threading spiral saws;

a plurality of robot-assembled heat-expandable cold-contractable interlocking cones
- formed to said robot-assembled heat-expandable cold-contractable anti-wobbling screws;

a plurality of robot-assembled heat-expandable cold-contractable interlocking spiral locks
- formed to said robot-assembled heat-expandable cold-contractable interlocking cones;

a plurality of top robot-assembled connectors
- robotically heated up to expand and
- robotically heat-riveted to said dog-run-adaptable anti-wobbling foldable top trusses;

a plurality of top robot-assembled heat-expandable cold-contractable holes
- robotically heated up to expand and
- robotically molded in said top robot-assembled connectors
  - for providing openings for said robot-assembled heat-expandable cold-contractable anti-wobbling screws to be robotically inserted
    - to reduce end-user assembly time,
    - to reduce human-involved manufacturing assembly hours,
    - to decrease overall production assembly time, and
    - to increase total production output, and
  - for locking said robot-assembled heat-expandable cold-contractable anti-wobbling screws by expanding from friction-heat during insertion, forming threads, and then contracting inward when cooled;

a plurality of top robot-assembled automatically-flaring-and-shielding-rivet-tail injury-preventing hammer-shields
- robotically heated up to expand and
- robotically molded on said top robot-assembled connectors
  - covering at least one of said top robot-assembled heat-expandable cold-contractable holes,
  - for providing a blocking surface for robot-assembled heat-expandable cold-contractable anti-wobbling screws to stop, and
  - for preventing injury by covering said robot-assembled heat-expandable cold-contractable interlocking cones,
- wherein:
  - said robot-assembled heat-expandable cold-contractable interlocking cones and said robot-assembled heat-expandable cold-contractable interlocking spiral locks
    - are each for robotically and heatingly boring through said top robot-assembled heat-expandable cold-contractable holes,
    - are each for expanding and locking when impacted by said top robot-assembled automatically-flaring-and-shielding-rivet-tail injury-preventing hammer-shields, and
    - are each for eliminating need for nuts and bolts
      - to robotically lessen manufacturing time, and
      - to robotically lessen assembly cost;

a plurality of top robot-assembled heat-expandable cold-contractable double-tail rivets having top rivet tails,
- said top robot-assembled heat-expandable cold-contractable double-tail rivets robotically heated up to expand and
- robotically heat-hammered
- through said top rivet tails robot-assembled heat-expandable cold-contractable holes
- against said top rivet tails robot-assembled automatically-flaring-and-shielding-rivet-tail injury-preventing hammer-shields
- such that
- said hammer-shields
- automatically bend said top rivet tails of said top double-tail rivets
  - to secure said top robot-assembled connectors to said top trusses, and automatically shield said top rivet tails of said top double-tail rivets;

at least one central robot-assembled intersectors
robotically heated up to expand and
robotically heat-screwed to said dog-run-adaptable anti-wobbling foldable top trusses;

a plurality of central robot-assembled heat-expandable cold-contractable holes
robotically heated up to expand and
robotically molded in said central robot-assembled intersectors,
said robot-assembled heat-expandable cold-contractable anti-wobbling screws,
robotically heated up to expand and inserted into said central robot-assembled heat-expandable cold-contractable holes,
for providing openings for said robot-assembled heat-expandable cold-contractable anti-wobbling screws to be robotically installed, and
for locking said robot-assembled heat-expandable cold-contractable anti-wobbling screws by expanding from friction-heat during insertion, forming threads, and then contracting inward when cooled;

a plurality of central robot-assembled automatically-flaring-and-shielding-cone-head injury-preventing hammer-shields
robotically heated up to expand and
robotically molded on said central robot-assembled intersectors
to cover at least one of said central robot-assembled heat-expandable cold-contractable holes
for automatically stopping said robot-assembled heat-expandable cold-contractable anti-wobbling screws allowing said robot-assembled heat-expandable cold-contractable interlocking cones and said robot-assembled heat-expandable cold-contractable interlocking spiral locks to expand and lock into place, and
for preventing injury by coving said robot-assembled heat-expandable cold-contractable interlocking cones;

a plurality of upper robot-assembled intersectors
robotically heated up to expand and
robotically heat-screwed to said dog-run-adaptable anti-wobbling foldable top trusses, said dog-run-adaptable anti-wobbling foldable side trusses, and
robotically assembled to said dog-run-adaptable anti-wobbling foldable upper posts;

a plurality of upper robot-assembled heat-expandable cold-contractable holes
robotically heated up to expand and
robotically molded in said upper robot-assembled intersectors,
said robot-assembled heat-expandable cold-contractable anti-wobbling screws robotically heated up to expand and inserted into said upper robot-assembled heat-expandable cold-contractable holes,
for locking said robot-assembled heat-expandable cold-contractable anti-wobbling screws by expanding from friction-heat during insertion, forming threads, and then contracting inward when cooled;

a plurality of upper robot-assembled automatically-flaring-and-shielding-cone-head injury-preventing hammer-shields
robotically heated up to expand and
robotically molded on said upper robot-assembled intersectors
to cover at least one of said upper robot-assembled heat-expandable cold-contractable holes
for automatically stopping said robot-assembled heat-expandable cold-contractable anti-wobbling screws allowing said robot-assembled heat-expandable cold-contractable interlocking cones and said robot-assembled heat-expandable cold-contractable interlocking spiral locks to expand and lock into place, and
for preventing injury by coving said robot-assembled heat-expandable cold-contractable interlocking cones;

a plurality of lower robot-assembled intersectors
robotically heated up to expand and
robotically heat-screwed to said dog-run-adaptable anti-wobbling foldable corner trusses, said dog-run-adaptable anti-wobbling foldable side trusses, and
robotically and slidably attached to said dog-run-adaptable anti-wobbling foldable upper posts;

a plurality of lower robot-assembled heat-expandable cold-contractable holes
robotically heated up to expand and
robotically molded in said lower robot-assembled intersectors,
to cover at least one of said lower robot-assembled heat-expandable cold-contractable holes,
said robot-assembled heat-expandable cold-contractable anti-wobbling screws robotically heated up to expand and inserted into said lower robot-assembled heat-expandable cold-contractable holes,
for locking said robot-assembled heat-expandable cold-contractable anti-wobbling screws by expanding from friction-heat during insertion, forming threads, and then contracting inward when cooled;

a lower robot-assembled cone-shielding injury-preventing hammer-shields
robotically heated up to expand and
robotically molded on said lower robot-assembled intersectors
to cover at least one of said lower robot-assembled heat-expandable cold contractable holes
for automatically stopping said robot-assembled heat-expandable cold-contractable anti-wobbling screws allowing said robot-assembled heat-expandable cold-contractable interlocking cones and said robot-assembled heat-expandable cold-contractable interlocking spiral locks to expand and lock into place, and
for preventing injury by coving said robot-assembled heat-expandable cold-contractable interlocking cones;

a plurality of lower robot-assembled arthritic-assisting height-adjusting dog-run-panel-rope hooks
robotically and pivotably secured to said lower robot-assembled intersectors;

a plurality of lower robot-assembled noise-canceling friction-reducing height-adjusting nipples
robotically and pivotably secured to said lower robot-assembled arthritic-assisting height-adjusting dog-run-panel-rope hooks;

a plurality of lower robot-assembled noise-canceling friction-reducing lead-in nipple tips
robotically inserted within said lower robot-assembled noise-canceling friction-reducing height-adjusting nipples;

a plurality of lower robot-assembled self-securing nipple-securing pins
  robotically heated up to expand and
  robotically heat-pressed through said lower robot-assembled arthritic-assisting height-adjusting dog-run-panel-rope hooks and through said lower robot-assembled noise-canceling friction-reducing height-adjusting nipples;
a plurality of lower robot-assembled self-securing hook-securing pins
  robotically heated up to expand and
  robotically heat-pressed into said lower robot-assembled intersectors and through said lower robot-assembled arthritic-assisting height-adjusting dog-run-panel-rope hooks;
a lower robot-assembled hook spring
  robotically springingly inserted between said lower robot-assembled intersectors and said lower robot-assembled arthritic-assisting height-adjusting dog-run-panel-rope hooks;
a plurality of lower robot-assembled noise-canceling friction-reducing nipple-centering tunnels
  robotically molded into said lower robot-assembled intersectors;
a plurality of robot-assembled sleeves
  robotically assembled to said dog-run-adaptable anti-wobbling foldable upper posts;
a plurality of sleeve robot-assembled post-centering clamps
  robotically molded to said robot-assembled sleeves;
a plurality of sleeve robot-assembled tick-preventing downward teeth
  robotically molded to said sleeve robot-assembled post-centering clamps;
a plurality of sleeve robot-assembled water-discharging grooves
  robotically molded into said sleeve robot-assembled post-centering clamps;
a plurality of sleeve robot-assembled arthritic-assisting height-adjusting dog-run-panel-rope hooks
  robotically and pivotably secured to said robot-assembled sleeves;
a plurality of sleeve robot-assembled noise-canceling friction-reducing hook jacking jacks
  robotically assembled to said sleeve robot-assembled arthritic-assisting height-adjusting dog-run-panel-rope hooks;
a plurality of sleeve robot-assembled noise-canceling friction-reducing post-height-adjusting grooved nipples
  robotically formed to said sleeve robot-assembled noise-canceling friction-reducing hook-jacking jacks;
a plurality of sleeve robot-assembled self-securing jack-securing pins
  robotically heated up to expand and
  robotically heat-pressed through said sleeve robot-assembled arthritic-assisting height-adjusting dog-run-panel-rope hooks and through said sleeve robot-assembled noise-canceling friction-reducing hook-jacking jacks;
a plurality of sleeve robot-assembled self-securing hook-securing pins
  robotically heated up to expand and
  robotically heat-pressed into said robot-assembled sleeves and through said sleeve robot-assembled arthritic-assisting height-adjusting dog-run-panel-rope hooks;
a sleeve robot-assembled hook spring
  robotically springingly inserted between said robot-assembled sleeves and said robot-assembled arthritic-assisting height-adjusting dog-run-panel-rope hooks;
a plurality of sleeve robot-assembled noise-canceling friction-reducing flower-shaped nipple-centering holes
  robotically molded into said robot-assembled sleeves;
a plurality of robot-assembled rust-preventing truss-end covers
  robotically assembled to said dog-run-adaptable anti-wobbling foldable corner trusses
  for eliminating need for nuts and bolts
    to save manufacturing cost,
    to save manufacturing time,
    to save end-user assembly time, and
    to increase overall production output,
  for eliminating need for washers
    to save manufacturing cost,
    to save manufacturing time,
    to save end-user assembly time, and
    to increase overall production output,
  for eliminating need for 50 truss-end plugs, from prior art gazebos
    to save manufacturing cost,
    to save manufacturing time,
    to save end-user assembly time, and
    to increase overall production output,
  for preventing water and insects from entering into said dog-run-adaptable anti-wobbling foldable corner trusses, and
  for preventing injury by covering sharp metal edges;
a robot-assembled noise-canceling cover-cushion
  robotically formed to said robot-assembled rust-preventing truss-end covers;
a plurality of robot-assembled injury-preventing inward-curved cover-cushion edges
  robotically formed to said robot-assembled noise-canceling cover-cushion;
a plurality of robot-assembled heat-expandable cold-contractable double-tail cover-cushion rivets
  having cover-cushion tails and a cover-cushion locking ridge,
  said robot-assembled heat-expandable cold-contractable double-tail cover-cushion rivets
  robotically heated up to expand and
  robotically heat-hammered
  through said robot-assembled rust-preventing truss-end covers automatically bend said cover-cushion tails of said robot-assembled heat-expandable cold-contractable double-tail cover-cushion rivets
    to secure said robot-assembled heat-expandable cold-contractable double-tail cover-cushion rivets to said dog-run-adaptable anti-wobbling foldable corner trusses, and
    automatically shield said cover-cushion tails of said robot-assembled heat-expandable cold-contractable double-tail cover-cushion rivets
  for decreasing assembly man hours by being robotically factory-installed,
  for decreasing end-user assembly time by being robotically factory-installed,
  for eliminating need for washers, for creating said cover-cushion locking ridge when robotically heat-stamped eliminating need for nuts and bolts, and for creating said cover-cushion locking ridge when robotically heat-stamped securely and pivotably locking two said dog-run-adaptable anti-wobbling foldable side trusses together;

a robot-assembled noise-canceling cup-cushion
robotically assembled to said dog-run-adaptable anti-wobbling foldable side trusses
for eliminating need for nuts and bolts
to save manufacturing cost,
to save manufacturing time,
to save end-user assembly time, and
to increase overall production output,
for eliminating need for washers
to save manufacturing cost,
to save manufacturing time,
to save end-user assembly time, and
to increase overall production output,
for eliminating need for 50 truss-end plugs, from prior art gazebos
to save manufacturing cost,
to save manufacturing time,
to save end-user assembly time, and
to increase overall production output,
for preventing water and insects from entering into said dog-run-adaptable anti-wobbling foldable corner trusses, and
for preventing injury by covering sharp metal edges;

a plurality of robot-assembled injury-preventing inward-curved cup-cushion edges
robotically formed into said robot-assembled noise-canceling cup-cushion;

a robot-assembled noise-canceling circular-cushion
robotically assembled to said dog-run-adaptable anti-wobbling foldable side trusses
for providing a washer between two dog-run-adaptable anti-wobbling foldable side trusses,
for pivotably connecting two dog-run-adaptable anti-wobbling foldable side trusses together,
for eliminating need for nuts and bolts
to save manufacturing cost,
to save manufacturing time,
to save end-user assembly time, and
to increase overall production output, and
for eliminating need for washers
to save manufacturing cost,
to save manufacturing time,
to save end-user assembly time, and
to increase overall production output; and a plurality of robot-assembled double-tail built-in circular-cushion rivets
having a circular-cushion locking ridge,
said robot-assembled double-tail built-in circular-cushion rivets robotically formed into said robot-assembled noise-canceling circular-cushion
for pivotably connecting two said dog-run-adaptable anti-wobbling foldable side trusses together
for being robotically installed to lessen assembly man hours,
for being robotically installed to lessen end-user assembly time, and
for being robotically heat-stamped to automatically create said circular-cushion locking ridge, eliminating need for nuts and bolts.

2. The six-device-in-one robot-assembled arthritic-assisting noise-canceling friction-reducing dog-run-adaptable anti-wobbling gazebo of claim 1:
further comprising:
jagged teeth,
said jagged teeth molded to said robot-assembled heat-expandable cold-contractable spirally-threading spiral saws.

3. The six-device-in-one robot-assembled arthritic-assisting noise-canceling friction-reducing dog-run-adaptable anti-wobbling gazebo of claim 1:
wherein:
said sleeve robot-assembled noise-canceling friction-reducing hook-jacking jacks are each formed into the shape of a cylinder.

4. The six-device-in-one robot-assembled arthritic-assisting noise-canceling friction-reducing dog-run-adaptable anti-wobbling gazebo of claim 1:
wherein:
said robot-assembled heat-expandable cold-contractable spirally-threading spiral saws are each made of the material of metal or plastic.

5. The six-device-in-one robot-assembled arthritic-assisting noise-canceling friction-reducing dog-run-adaptable anti-wobbling gazebo of claim 1:
wherein:
said robot-assembled heat-expandable cold-contractable spiral-teeth are each made of the material of metal or plastic.

6. The six-device-in-one robot-assembled arthritic-assisting noise-canceling friction-reducing dog-run-adaptable anti-wobbling gazebo of claim 1:
wherein:
said robot-assembled heat-expandable cold-contractable interlocking cones are each made of the material of metal or plastic.

7. The six-device-in-one robot-assembled arthritic-assisting noise-canceling friction-reducing dog-run-adaptable anti-wobbling gazebo of claim 1:
wherein:
said robot-assembled heat-expandable cold-contractable interlocking spiral locks are each made of the material of metal or plastic.

8. The six-device-in-one robot-assembled arthritic-assisting noise-canceling friction-reducing dog-run-adaptable anti-wobbling gazebo of claim 1:
wherein:
said robot-assembled rust-preventing truss-end covers are each made of the material of plastic.

9. The six-device-in-one robot-assembled friction-reducing dog-run-adaptable anti-wobbling gazebo of claim 1:
wherein:
Robot-assembled double-tail built-in circular-cushion rivets are each made of the material of plastic or metal.

10. A six-device-in-one robot-assembled friction-reducing dog-run-adaptable gazebo, comprising:
an adjustable canopy
for protecting occupants and property users from weather elements,
for functioning as a greenhouse,
for functioning as a cover for a dog-run,
for functioning as a surface for an advertisement sign,
for functioning as an awning cover, and
for functioning as ceiling-mounted overhead storage;

a plurality of dog-run-adaptable foldable top trusses, said adjustable canopy secured over said dog-run-adaptable foldable top trusses;
a plurality of dog-run-adaptable foldable corner trusses
robotically pivotably attached to said dog-run-adaptable foldable top trusses;
a plurality of dog-run-adaptable foldable side trusses;
a plurality of dog-run-adaptable foldable upper posts;
a plurality of dog-run-adaptable foldable lower posts
slidably inserted within said dog-run-adaptable foldable upper posts
for foldably and slidably raising and lowering
to increase and decrease height of said six-device-in-one robot-assembled friction-reducing dog-run-adaptable gazebo, and
for supporting sidewalls of dog-run;
a plurality of dog-run-adaptable feet
robotically welded to said dog-run-adaptable foldable lower posts;
a plurality of dog-run-adaptable foot holes
robotically drilled into said dog-run-adaptable feet
for securing a rope or cord for supporting a dog-run, and
for securing said six-device-in-one robot-assembled friction-reducing dog-run-adaptable gazebo to ground with a spike;
a plurality of truss holes
robotically drilled into said foldable top trusses, said foldable corner trusses, and said foldable side trusses;
a plurality of robot-assembled heat-expandable screws
robotically heated up to expand and inserted into said top robot-assembled heat-expandable holes
for saving manufacturing time by eliminating need for nuts and bolts,
for saving manufacturing man-hours by robotically manufacturing,
for saving end-consumer assembly time by robotically pre-installing robot-assembled heat-expandable screws, at factories, and
for increasing overall production output of said six-device-in-one robot-assembled friction-reducing dog-run-adaptable gazebo by robotically decreasing production time;
a plurality of robot-assembled heat-expandable spirally-threading spiral saws
formed to said robot-assembled heat-expandable screws;
a plurality of robot-assembled heat-expandable spiral-teeth
formed to said robot-assembled heat-expandable spirally-threading spiral saws;
a plurality of robot-assembled heat-expandable interlocking cones
formed to said robot-assembled heat-expandable screws;
a plurality of robot-assembled heat-expandable interlocking spiral locks
formed to said robot-assembled heat-expandable interlocking cones;
a plurality of top robot-assembled connectors
robotically heated up to expand and
robotically heat-riveted to said dog-run-adaptable foldable top trusses;
a plurality of top robot-assembled heat-expandable holes
robotically heated up to expand and
robotically molded in said top robot-assembled connectors
for providing openings for said robot-assembled heat-expandable screws to be robotically inserted
to reduce end-user assembly time,
to reduce human-involved manufacturing assembly hours,
to decrease overall production assembly time, and
to increase total production output, and
for locking said robot-assembled heat-expandable screws by expanding from friction-heat during insertion, forming threads, and then contracting inward when cooled;
a plurality of top robot-assembled heat-expandable double-tail rivets
having top rivet tails,
said top robot-assembled heat-expandable double-tail rivets
robotically heated up to expand and
robotically heat-hammered
through said top rivet tails robot-assembled heat-expandable holes
such that
said hammer-shields
said top rivet tails of said top double-tail rivets automatically bend
to secure said top robot-assembled connectors to said top trusses;
at least one central robot-assembled intersectors
robotically heated up to expand and
robotically heat-screwed to said dog-run-adaptable foldable top trusses;
a plurality of central robot-assembled heat-expandable holes
robotically heated up to expand and
robotically molded in said central robot-assembled intersectors,
said robot-assembled heat-expandable screws, robotically heated up to expand and inserted into said central robot-assembled heat-expandable holes,
for providing openings for said robot-assembled heat-expandable screws to be robotically installed, and
for locking said robot-assembled heat-expandable screws by expanding from friction-heat during insertion, forming threads, and then contracting inward when cooled;
a plurality of central robot-assembled automatically-flaring-cone-head injury-preventing hammer-shields
robotically heated up to expand and
robotically molded on said central robot-assembled intersectors
to cover at least one of said central robot-assembled heat-expandable holes
for automatically stopping said robot-assembled heat-expandable screws allowing said robot-assembled heat-expandable interlocking cones and said robot-assembled heat-expandable interlocking spiral locks to expand and lock into place, and
for preventing injury by coving said robot-assembled heat-expandable interlocking cones;
a plurality of upper robot-assembled intersectors
robotically heated up to expand and
robotically heat-screwed to said dog-run-adaptable foldable top trusses, said dog-run-adaptable foldable side trusses, and robotically assembled to said dog-run-adaptable foldable upper posts;

a plurality of upper robot-assembled heat-expandable holes
  robotically heated up to expand and
  robotically molded in said upper robot-assembled intersectors,
    said robot-assembled heat-expandable screws robotically heated up to expand and inserted into said upper robot-assembled heat-expandable holes,
    for locking said robot-assembled heat-expandable screws by expanding from friction-heat during insertion, forming threads, and then contracting inward when cooled;
a plurality of upper robot-assembled automatically-flaring-cone-head injury-preventing hammer-shields
  robotically heated up to expand and
  robotically molded on said upper robot-assembled intersectors
    to cover at least one of said upper robot-assembled heat-expandable holes
      for automatically stopping said robot-assembled heat-expandable screws allowing said robot-assembled heat-expandable interlocking cones and said robot-assembled heat-expandable interlocking spiral locks to expand and lock into place, and
      for preventing injury by coving said robot-assembled heat-expandable interlocking cones;
a plurality of lower robot-assembled intersectors
  robotically heated up to expand and
  robotically heat-screwed to said dog-run-adaptable foldable corner trusses, said dog-run-adaptable foldable side trusses, and robotically and slidably attached to said dog-run-adaptable foldable upper posts;
a plurality of lower robot-assembled heat-expandable holes
  robotically heated up to expand and
  robotically molded in said lower robot-assembled intersectors,
    to cover at least one of said lower robot-assembled heat-expandable holes,
    said robot-assembled heat-expandable screws robotically heated up to expand and inserted into said lower robot-assembled heat-expandable holes,
    for locking said robot-assembled heat-expandable screws by expanding from friction-heat during insertion, forming threads, and then contracting inward when cooled;
a lower robot-assembled cone-shielding injury-preventing hammer-shields
  robotically heated up to expand and
  robotically molded on said lower robot-assembled intersectors
    to cover at least one of said lower robot-assembled heat-expandable holes for automatically stopping said robot-assembled heat-expandable screws allowing said robot-assembled heat-expandable interlocking cones and said robot-assembled heat-expandable interlocking spiral locks to expand and lock into place, and
    for preventing injury by coving said robot-assembled heat-expandable interlocking cones;
a plurality of lower robot-assembled height-adjusting dog-run-panel-rope hooks
  robotically and pivotably secured to said lower robot-assembled intersectors;
a plurality of lower robot-assembled friction-reducing height-adjusting nipples
  robotically and pivotably secured to said lower robot-assembled height-adjusting dog-run-panel-rope hooks;
a plurality of lower robot-assembled friction-reducing lead-in nipple tips
  robotically inserted within said lower robot-assembled friction-reducing height-adjusting nipples;
a plurality of lower robot-assembled self-securing nipple-securing pins
  robotically heated up to expand and
  robotically heat-pressed through said lower robot-assembled height-adjusting dog-run-panel-rope hooks and through said lower robot-assembled friction-reducing height-adjusting nipples;
a plurality of lower robot-assembled self-securing hook-securing pins
  robotically heated up to expand and
  robotically heat-pressed into said lower robot-assembled intersectors and through said lower robot-assembled height-adjusting dog-run-panel-rope hooks;
a lower robot-assembled hook spring
  robotically springingly inserted between said lower robot-assembled intersectors and said lower robot-assembled height-adjusting dog-run-panel-rope hooks;
a plurality of lower robot-assembled friction-reducing nipple-centering tunnels
  robotically molded into said lower robot-assembled intersectors;
a plurality of robot-assembled sleeves
  robotically assembled to said dog-run-adaptable foldable upper posts;
a plurality of sleeve robot-assembled post-centering clamps
  robotically molded to said robot-assembled sleeves;
a plurality of sleeve robot-assembled tick-preventing downward teeth
  robotically molded to said sleeve robot-assembled post-centering clamps;
a plurality of sleeve robot-assembled water-discharging grooves
  robotically molded into said sleeve robot-assembled post-centering clamps;
a plurality of sleeve robot-assembled height-adjusting dog-run-panel-rope hooks
  robotically and pivotably secured to said robot-assembled sleeves;
a plurality of sleeve robot-assembled friction-reducing hook-jacking jacks robotically
  assembled to said sleeve robot-assembled height-adjusting dog-run-panel-rope hooks;
a plurality of sleeve robot-assembled friction-reducing post-height-adjusting grooved nipples
  robotically formed to said sleeve robot-assembled friction-reducing hook-jacking jacks;
a plurality of sleeve robot-assembled self-securing jack-securing pins
  robotically heated up to expand and
  robotically heat-pressed through said sleeve robot-assembled height-adjusting dog-run-panel-rope hooks and through said sleeve robot-assembled friction-reducing hook-jacking jacks;
a plurality of sleeve robot-assembled self-securing hook-securing pins
  robotically heated up to expand and robotically heat-pressed into said robot-assembled sleeves and through said sleeve robot-assembled height-adjusting dog-run-panel-rope hooks;
a sleeve robot-assembled hook spring
robotically springingly inserted between said robot-assembled sleeves and said robot-assembled height-adjusting dog-run-panel-rope hooks;
a plurality of sleeve robot-assembled friction-reducing flower-shaped nipple-centering holes
robotically molded into said robot-assembled sleeves;
a plurality of robot-assembled rust-preventing truss-end covers
robotically assembled to said dog-run-adaptable foldable corner trusses
for eliminating need for nuts and bolts
to save manufacturing cost,
to save manufacturing time,
to save end-user assembly time, and
to increase overall production output,
for eliminating need for washers
to save manufacturing cost,
to save manufacturing time,
to save end-user assembly time, and
to increase overall production output,
for eliminating need for 50 truss-end plugs, from prior art gazebos
to save manufacturing cost,
to save manufacturing time,
to save end-user assembly time, and
to increase overall production output,
for preventing water and insects from entering into said dog-run-adaptable foldable corner trusses, and
for preventing injury by covering sharp metal edges;
a robot-assembled cover-cushion
robotically formed to said robot-assembled rust-preventing truss-end covers;
a plurality of robot-assembled injury-preventing inward-curved cover-cushion edges
robotically formed to said robot-assembled cover-cushion;
a plurality of robot-assembled heat-expandable double-tail cover-cushion rivets
having cover-cushion tails and a cover-cushion locking ridge,
said robot-assembled heat-expandable double-tail cover-cushion rivets
robotically heated up to expand and
robotically heat-hammered
through said robot-assembled rust-preventing truss-end covers automatically bend said cover-cushion tails of said robot-assembled heat-expandable double-tail cover-cushion rivets
to secure said robot-assembled heat-expandable double-tail cover-cushion rivets to said dog-run-adaptable foldable corner trusses, and
automatically shield said cover-cushion tails of said robot-assembled heat-expandable double-tail cover-cushion rivets
for decreasing assembly man hours by being robotically factory-installed,
for decreasing end-user assembly time by being robotically factory-installed,
for eliminating need for washers,
for creating said cover-cushion locking ridge when robotically heat-stamped eliminating need for nuts and bolts, and
for creating said cover-cushion locking ridge when robotically heat-stamped securely and pivotably locking two said dog-run-adaptable foldable side trusses together;
a robot-assembled cup-cushion
robotically assembled to said dog-run-adaptable foldable side trusses
for eliminating need for nuts and bolts
to save manufacturing cost,
to save manufacturing time,
to save end-user assembly time, and
to increase overall production output,
for eliminating need for washers
to save manufacturing cost,
to save manufacturing time,
to save end-user assembly time, and
to increase overall production output,
for eliminating need for 50 truss-end plugs, from prior art gazebos
to save manufacturing cost,
to save manufacturing time,
to save end-user assembly time, and
to increase overall production output,
for preventing water and insects from entering into said dog-run-adaptable
foldable corner trusses, and
for preventing injury by covering sharp metal edges;
a plurality of robot-assembled injury-preventing inward-curved cup-cushion edges
robotically formed into said robot-assembled cup-cushion;
a robot-assembled circular-cushion
robotically assembled to said dog-run-adaptable foldable side trusses
for providing a washer between two dog-run-adaptable foldable side trusses,
for pivotably connecting two dog-run-adaptable foldable side trusses together,
for eliminating need for nuts and bolts
to save manufacturing cost,
to save manufacturing time,
to save end-user assembly time, and
to increase overall production output, and
for eliminating need for washers
to save manufacturing cost,
to save manufacturing time,
to save end-user assembly time, and
to increase overall production output; and
a plurality of robot-assembled double-tail built-in circular-cushion rivets
having a circular-cushion locking ridge,
said robot-assembled double-tail built-in circular-cushion rivets robotically
formed into said robot-assembled circular-cushion
for pivotably connecting two said dog-run-adaptable foldable side trusses together
for being robotically installed to lessen assembly man hours,
for being robotically installed to lessen end-user assembly time, and
for being robotically heat-stamped to automatically create said circular-cushion locking ridge, eliminating need for nuts and bolts.

11. The six-device-in-one robot-assembled friction-reducing dog-run-adaptable gazebo of claim 10:
further comprising:
jagged teeth, said jagged teeth molded to said robot-assembled heat-expandable spirally-threading spiral saws.

12. The six-device-in-one robot-assembled friction-reducing dog-run-adaptable gazebo of claim 10:
wherein:
said sleeve robot-assembled friction-reducing hook-jacking jacks are each formed into the shape of a cylinder.

13. The six-device-in-one robot-assembled friction-reducing dog-run-adaptable gazebo of claim 10:
wherein:
said robot-assembled heat-expandable spirally-threading spiral saws are each made of the material of metal or plastic.

14. The six-device-in-one robot-assembled friction-reducing dog-run-adaptable gazebo of claim 10:
wherein:
said robot-assembled heat-expandable spiral-teeth are each made of the material of metal or plastic.

15. The six-device-in-one robot-assembled friction-reducing dog-run-adaptable gazebo of claim 10:
wherein:
said robot-assembled heat-expandable interlocking cones are each made of the material of metal or plastic.

16. The six-device-in-one robot-assembled friction-reducing dog-run-adaptable gazebo of claim 10:
wherein:
said robot-assembled heat-expandable interlocking spiral locks are each made of the material of metal or plastic.

17. The six-device-in-one robot-assembled friction-reducing dog-run-adaptable gazebo of claim 10:
wherein:
said robot-assembled rust-preventing truss-end covers are each made of the material of plastic.

18. The six-device-in-one robot-assembled friction-reducing dog-run-adaptable gazebo of claim 10:
wherein:
Robot-assembled double-tail built-in circular-cushion rivets are each made of the material of plastic or metal.

19. A robot-assembled friction-reducing gazebo, comprising:
an adjustable canopy;
a plurality of foldable top trusses,
said adjustable canopy secured over said foldable top trusses;
a plurality of foldable corner trusses
robotically pivotably attached to said foldable top trusses;
a plurality of foldable side trusses;
a plurality of foldable upper posts;
a plurality of foldable lower posts
slidably inserted within said foldable upper posts;
a plurality of feet
robotically welded to said foldable lower posts;
a plurality of foot holes
robotically drilled into said feet;
a plurality of truss holes
robotically drilled into said foldable top trusses, said foldable corner trusses, and said foldable side trusses;
a plurality of robot-assembled screws
robotically heated up to expand and inserted into said top robot-assembled holes;
a plurality of robot-assembled spiral saws
formed to said robot-assembled screws;
a plurality of robot-assembled spiral teeth
formed to said robot-assembled spiral saws;
a plurality of robot-assembled interlocking cones
formed to said robot-assembled screws;
a plurality of robot-assembled interlocking locks
formed to said robot-assembled interlocking cones;
a plurality of top robot-assembled connectors
robotically heated up to expand and
robotically heat-riveted to said foldable top trusses;
a plurality of top robot-assembled holes
robotically heated up to expand and
robotically molded in said top robot-assembled connectors;
a plurality of top robot-assembled double-tail rivets
robotically heated up to expand and
robotically heat-hammered
through said robot-assembled holes
such that
said top double-tail rivets automatically bend
to secure said top robot-assembled connectors to said top trusses;
at least one central robot-assembled intersectors
robotically heated up to expand and
robotically heat-screwed to said foldable top trusses;
a plurality of central robot-assembled holes
robotically heated up to expand and
robotically molded in said central robot-assembled intersectors,
said robot-assembled screws, robotically heated up to expand and inserted into said central robot-assembled holes;
a plurality of central robot-assembled hammer-shields
robotically heated up to expand and
robotically molded on said central robot-assembled intersectors
to cover at least one of said central robot-assembled holes;
a plurality of upper robot-assembled intersectors
robotically heated up to expand and
robotically heat-screwed to said foldable top trusses, said foldable side trusses, and robotically assembled to said foldable upper posts;
a plurality of upper robot-assembled holes
robotically heated up to expand and
robotically molded in said upper robot-assembled intersectors,
said robot-assembled screws robotically heated up to expand and inserted into said upper robot-assembled holes;
a plurality of upper robot-assembled hammer-shields
robotically heated up to expand and
robotically molded on said upper robot-assembled intersectors
to cover at least one of said upper robot-assembled holes;
a plurality of lower robot-assembled intersectors
robotically heated up to expand and
robotically heat-screwed to said foldable corner trusses, said foldable side trusses, and robotically and slidably attached to said foldable upper posts;
a plurality of lower robot-assembled holes
robotically heated up to expand and
robotically molded in said lower robot-assembled intersectors, to cover at least one of said lower robot-assembled holes,
said robot-assembled screws robotically heated up to expand and inserted into said lower robot-assembled holes;
a lower robot-assembled hammer-shields
robotically heated up to expand and
robotically molded on said lower robot-assembled intersectors
to cover at least one of said lower robot-assembled holes;
a plurality of lower robot-assembled height-adjusting hooks
robotically and pivotably secured to said lower robot-assembled intersectors;
a plurality of lower robot-assembled height-adjusting nipples
robotically and pivotably secured to said lower robot-assembled height-adjusting hooks;
a plurality of lower robot-assembled nipple tips
robotically inserted within said lower robot-assembled height-adjusting nipples;
a plurality of lower robot-assembled nipple-securing pins
robotically heated up to expand and
robotically heat-pressed through said lower robot-assembled height-adjusting hooks and through said lower robot-assembled height-adjusting nipples;
a plurality of lower robot-assembled hook-securing pins
robotically heated up to expand and
robotically heat-pressed into said lower robot-assembled intersectors and through said lower robot-assembled height-adjusting hooks;
a lower robot-assembled hook spring
robotically springingly inserted between said lower robot-assembled intersectors and said lower robot-assembled height-adjusting hooks;
a plurality of lower robot-assembled tunnels
robotically molded into said lower robot-assembled intersectors;
a plurality of robot-assembled sleeves
robotically assembled to said foldable upper posts;
a plurality of sleeve robot-assembled clamps
robotically molded to said robot-assembled sleeves;
a plurality of sleeve robot-assembled downward teeth
robotically molded to said sleeve robot-assembled clamps;
a plurality of sleeve robot-assembled grooves
robotically molded into said sleeve robot-assembled clamps;
a plurality of sleeve robot-assembled height-adjusting hooks
robotically and pivotably secured to said robot-assembled sleeves;
a plurality of sleeve robot-assembled jacks robotically assembled to said sleeve robot-assembled height-adjusting hooks;
a plurality of sleeve robot-assembled grooved nipples
robotically formed to said sleeve robot-assembled jacks;
a plurality of sleeve robot-assembled jack-securing pins
robotically heated up to expand and
robotically heat-pressed through said sleeve robot-assembled height-adjusting hooks and through said sleeve robot-assembled jacks;
a plurality of sleeve robot-assembled hook-securing pins
robotically heated up to expand and
robotically heat-pressed into said robot-assembled sleeves and through said sleeve robot-assembled height-adjusting hooks;
a sleeve robot-assembled hook spring
robotically springingly inserted between said robot-assembled sleeves and said robot-assembled height-adjusting hooks;
a plurality of sleeve robot-assembled flower-shaped nipple-centering holes
robotically molded into said robot-assembled sleeves;
a plurality of robot-assembled truss-end covers
robotically assembled to said foldable corner trusses;
a robot-assembled cover-cushion
robotically formed to said robot-assembled truss-end covers;
a plurality of robot-assembled cover-cushion edges
robotically formed to said robot-assembled cover-cushion;
a plurality of robot-assembled double-tail cover-cushion rivets
robotically heated up to expand and
robotically heat-hammered
through said robot-assembled truss-end covers automatically bend said robot-assembled double-tail cover-cushion rivets
to secure said robot-assembled double-tail cover-cushion rivets to said foldable corner trusses, and
automatically shield said robot-assembled double-tail cover-cushion rivets;
a robot-assembled cup-cushion
robotically assembled to said foldable side trusses;
a plurality of robot-assembled cup-cushion edges
robotically formed into said robot-assembled cup-cushion;
a robot-assembled circular-cushion
robotically assembled to said foldable side trusses; and
a plurality of robot-assembled circular-cushion rivets
robotically formed into said robot-assembled circular-cushion.

20. The robot-assembled friction-reducing gazebo of claim 19:
wherein:
said robot-assembled interlocking cones are each made of the material of metal or plastic.

* * * * *